US007258651B2

United States Patent
Clarke

(10) Patent No.: US 7,258,651 B2
(45) Date of Patent: Aug. 21, 2007

(54) FITNESS METHOD UTILIZING MOVING PLATFORMS

(76) Inventor: Kappel Leroy Clarke, 84-20 51st Ave. Apt. 1K, Elmhurst, NY (US) 11373

( * ) Notice: Subject to any disclaimer, the term of this patent is extended or adjusted under 35 U.S.C. 154(b) by 384 days.

(21) Appl. No.: 10/389,591

(22) Filed: Mar. 17, 2003

(65) Prior Publication Data

US 2004/0043870 A1 Mar. 4, 2004

Related U.S. Application Data

(60) Provisional application No. 60/370,094, filed on Apr. 4, 2002.

(51) Int. Cl.
*A63B 22/02* (2006.01)
(52) U.S. Cl. .......................................... 482/54; 482/51
(58) Field of Classification Search .................. 482/51, 482/54; 434/247, 250, 255; 273/440, 455
See application file for complete search history.

(56) References Cited

U.S. PATENT DOCUMENTS

| | | | | |
|---|---|---|---|---|
| 4,274,625 A | * | 6/1981 | Gaetano | 482/54 |
| 5,088,729 A | * | 2/1992 | Dalebout | 482/54 |
| 5,476,430 A | * | 12/1995 | Lee et al. | 482/54 |
| 6,350,218 B1 | * | 2/2002 | Dalebout et al. | 482/54 |
| 6,436,008 B1 | * | 8/2002 | Skowronski et al. | 482/54 |
| 2001/0016543 A1 | * | 8/2001 | Dalebout | 482/54 |
| 2002/0183170 A1 | * | 12/2002 | Wu | 482/54 |
| 2004/0171465 A1 | * | 9/2004 | Hald et al. | 482/54 |

OTHER PUBLICATIONS

Copy of VHS video cassette tape by Surteg S. Sandhu (Treadmill Aerobics and Dance Company).

* cited by examiner

*Primary Examiner*—Danton D. DeMille
*Assistant Examiner*—Tom Nguyen
(74) *Attorney, Agent, or Firm*—Dickstein Shapiro LLP

(57) ABSTRACT

A fitness method for an exerciser in a format that utilizes a moving surface (the moving belt of a standard treadmill); and two types of fixed surfaces: the first type being the narrow platform edges that run along the right and left sides of the moving belt of standard treadmills; the second type of fixed surface being the floor space immediately surrounding the treadmill 3 to 5 feet out and away from it on all 4 sides, front, back, night and left. The format involves specific movements of the feet that take the practitioner from occupying a position on the moving surface (the moving belt of a standard treadmill) to occupying a position on either of the 2 types of fixed surfaces (the narrow platform edges that run along the right and left sides of the moving belt of standard treadmills or the floor space immediately surrounding the treadmill 3 to 5 feet out and away from it on all 4 sides, front, back, right and left) and back to the moving surface one time or more repeatedly.

5 Claims, 426 Drawing Sheets

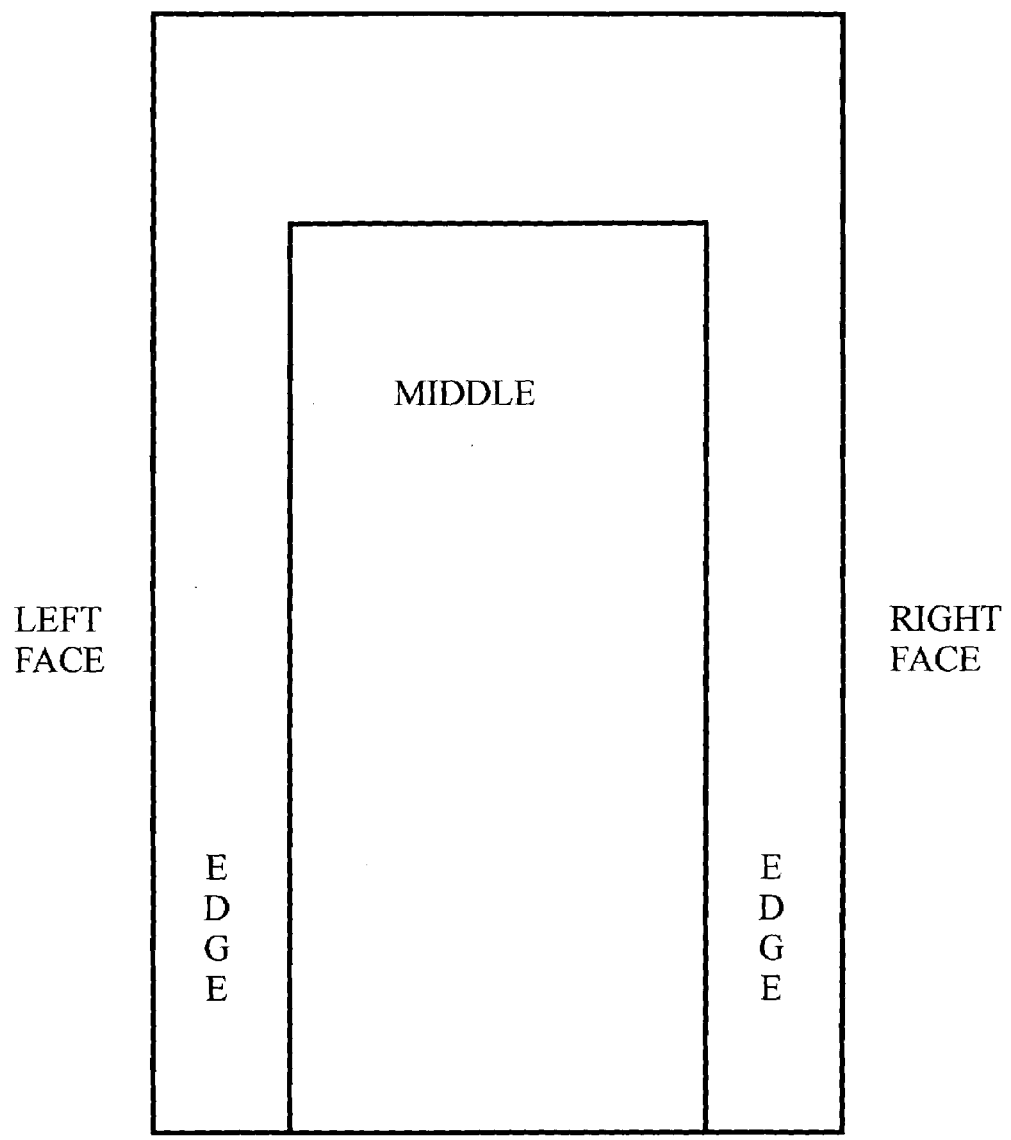
DIAGRAM 1

FRONT FACE

R1- Standing on the right EDGE with your weight on the balls of your feet, knees and toes pointing in toward the MIDDLE, and heels hanging off the EDGE, is CP-R1.

MIDDLE

LEFT FACE

RIGHT FACE

E D G E

E D G E

BACKFACE

FIGURE 2A

FRONT FACE

B-stra- Standing on the EDGES with your weight on the balls of your feet, straddling the MIDDLE with one foot on each EDGE, knees, toes and body pointing backward in BACK FACE, and heels up off the EDGES, is CP-B-stra.

MIDDLE

LEFT FACE

RIGHT FACE

E D G E

E D G E

BACKFACE

FIGURE 2F

FRONT FACE

B2- Standing on the FLOOR to the back of the treadmill with your weight on the balls of your feet, knees and toes pointing backward away from the MIDDLE in BACK FACE, and heels up off the FLOOR, is CP-B2.

MIDDLE

LEFT
FACE

RIGHT
FACE

E
D
G
E

E
D
G
E

BACK FACE

FRONT FACE

BR- Standing on the FLOOR to the back of the treadmill with your weight on the balls of your feet, knees and toes pointing right in RIGHT FACE, and heels up off the FLOOR is CP-BR.

MIDDLE

LEFT FACE

RIGHT FACE

E D G E

E D G E

BACK

EXERCISE 1

S T E P 1 - From a standing position up on the balls of your feet take 2 walking steps forward followed by 2 walking steps backward (right foot to lead is shown here).

EXERCISE 1

S T E P  2 - 1 walking step forward is taken by YOUR 1 (right foot), and with your weight now transferred onto it, you are prepared to take the second walking step forward with YOUR 2 (left foot).

EXERCISE 1

S T E P 3 - The second walking step forward is taken by YOUR 2, and with your weight now transferred onto it, you are prepared to bring YOUR 1 alongside YOUR 2 to complete the first half of the action.

EXERCISE 1

S T E P  4 - With 2 walking steps forward completed, you are prepared to take 2 walking steps backward (left to lead is shown here).

EXERCISE 1

STEP 5 - 1 walking step backward is taken by YOUR 1 (left foot now), and with your weight now transferred onto it, you are prepared to take the second walking step backward with YOUR 2 (right foot).

EXERCISE 1

S T E P 6 - The second walking step backward is taken by YOUR 2, and with your weight now transferred onto it, you are prepared to bring YOUR 1 alongside YOUR 2 to complete the action.

EXERCISE 1

STEP 7 - Action completed...  "!"

EXERCISE 2

S T E P 1 - From a standing position up on the balls of your feet take 2 steps to one side, followed by 2 steps to the opposite side (right foot to lead sideways step is shown here).

EXERCISE 2

S T E P 2 - 1 step sideways is taken by YOUR 1 (right foot), and with your weight now transferred onto it, you are prepared to follow with a step sideways with YOUR 2 (left foot).

EXERCISE 2

S T E P  3 - A new location is secured with a step sideways taken by YOUR 2 bringing it alongside YOUR 1, as YOUR 1 prepares to step sideways a second time.

EXERCISE 2

S T E P  4 - A second step sideways is taken by YOUR 1, and with your weight now transferred onto it, you are prepared to follow with a second step sideways with YOUR 2.

EXERCISE 2

STEP 5 A second location is secured with the second step sideways taken by YOUR 2 bringing it alongside YOUR 1, completing the first half of the action; you are now prepared to take 2 steps sideways to the opposite side (left foot to lead is shown here).

EXERCISE 2

S T E P  6 - 1 step sideways to the opposite side is taken by YOUR 1 (left foot now), and with your weight now transferred onto it, you are prepared to follow with a step sideways with YOUR 2 (right foot).

EXERCISE 2

STEP 7 - The previous location is secured again with a step sideways taken by YOUR 2 bringing it alongside YOUR 1, as YOUR 1 prepares to step sideways a second time.

EXERCISE 2

S T E P  8 - A second step sideways is taken by YOUR 1, and with your weight now transferred onto it, you are prepared to follow with a second step sideways with YOUR 2 to complete the action.

EXERCISE 2

STEP 9 - Action completed...        "!"

EXERCISE 3

S T E P 1 - From a standing position up on the balls of your feet take 2 hops forward, followed by 2 hops backward.

EXERCISE 3

STEP 2 - 1 hop forward is taken securing a new location and you are automatically prepared to take a second hop forward.

EXERCISE 3

S T E P  3 - The second hop forward is taken securing a second location and you are automatically prepared to take the first hop backward.

EXERCISE 3

S T E P  4 - With the first hop backward taken securing the previous location, you are automatically prepared to take the second hop backward to complete the action.

EXERCISE 3

S T E P 5 - Action completed... "!"

EXERCISE 4

S T E P 1 - From a standing position up on the balls of your feet take 2 hops to one side (right side is shown here), followed by 2 hops to the opposite side.

EXERCISE 4

STEP 2 - 1 hop sideways (right) is taken securing a new location and you are automatically prepared to take a second hop sideways in the same direction.

EXERCISE 4

STEP 3 - The second hop sideways (right) is taken securing a second location and you are automatically prepared to take the first hop sideways in the opposite direction (left side is shown here).

EXERCISE 4

S T E P 4 - With the first hop sideways in the opposite direction (left) taken securing the previous location, you are automatically prepared to take the second hop sideways in the same direction (left) to complete the action.

EXERCISE 4

STEP 5 - Action completed... "!"

FRONT FACE

RIGHT to RIGHT FACE

STEP 1 - A ¼ right turn from FRONT FACE on the MIDDLE (shown) to RIGHT FACE is executed by turning YOUR 1 (right foot), so that it lands pointing in RIGHT FACE as indicated to be done.

MIDDLE

LEFT FACE

RIGHT FACE

EDGE

EDGE

BACKFACE

FIGURE 5A

FRONT FACE

RIGHT to LEFT FACE

STEP 6 - With YOUR 1 landing in LEFT FACE and your weight now transferred onto it, you are prepared to follow with YOUR 2.

MIDDLE

R

1

LEFT FACE

RIGHT FACE

EDGE

EDGE

BACKFACE

FIGURE 5F

FRONT FACE

2LEFT, RIGHT to BACK FACE, LEFT to LEFT FACE, 1RIGHT to RIGHT FACE

STEP 2 - With YOUR 1 landing in FRONT FACE and your weight now transferred onto it, you are prepared to follow with YOUR 2 (right foot).

MIDDLE

LEFT FACE

RIGHT FACE

EDGE

EDGE

BACKFACE

FIGURE 5T

FRONT FACE

2LEFT, RIGHT to BACK FACE, LEFT to LEFT FACE, 1RIGHT to RIGHT FACE

STEP 3 - FRONT FACE on the MIDDLE is secured by also landing YOUR 2 in FRONT FACE alongside YOUR 1 (shown). To continue turning left to LEFT FACE on the MIDDLE, turn YOUR 1 so that it lands pointing in LEFT FACE as indicated to be done.

MIDDLE

LEFT FACE

RIGHT FACE

EDGE

EDGE

BACKFACE

FIGURE 5U

FRONT FACE

2LEFT, RIGHT to BACK FACE, LEFT to LEFT FACE, 1 RIGHT to RIGHT FACE

STEP 4 - With YOUR 1 landing in LEFT FACE and your weight now transferred onto it, you are prepared to follow with YOUR 2.

MIDDLE

LEFT FACE

RIGHT FACE

E D G E

E D G E

BACKFACE

FIGURE 5V

FRONT FACE

2LEFT, RIGHT to BACK FACE, LEFT to LEFT FACE, 1 RIGHT to RIGHT FACE

STEP 6 - With YOUR 1 landing in BACK FACE and your weight now transferred onto it, you are prepared to follow with YOUR 2.

MIDDLE

LEFT FACE

RIGHT FACE

EDGE

EDGE

BACKFACE

FRONT FACE

2LEFT, <u>RIGHT to BACK FACE</u>, LEFT to LEFT FACE, 1RIGHT to RIGHT FACE

STEP 11 - BACK FACE on the MIDDLE is secured by also landing YOUR 2 in BACK FACE alongside YOUR 1 (shown) completing <u>RIGHT to BACK FACE.</u> To continue with LEFT to LEFT FACE, a ¼ left turn from BACK FACE to LEFT FACE is executed by turning YOUR 1 (left foot) so that it lands pointing in RIGHT FACE as indicated to be done.

LEFT FACE

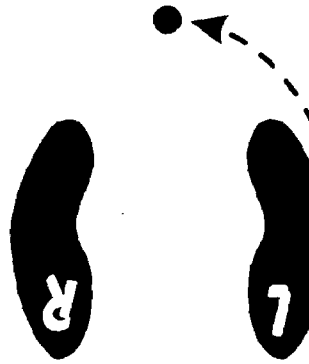

MIDDLE

EDGE

EDGE

RIGHT FACE

BACKFACE

FIGURE 5AC

FRONT FACE

2LEFT, RIGHT to BACK FACE, <u>LEFT to LEFT FACE</u>, 1RIGHT to RIGHT FACE

S T E P 15 - FRONT FACE on the MIDDLE is secured by also landing YOUR 2 in FRONT FACE alongside YOUR 1 (shown). To continue turning left to LEFT FACE on the MIDDLE, turn YOUR 1 so that it lands pointing in LEFT FACE as indicated to be done.

MIDDLE

LEFT FACE

RIGHT FACE

E D G E

E D G E

BACKFACE

FRONT FACE

2LEFT, RIGHT to BACK FACE, LEFT to LEFT FACE, 1RIGHT to RIGHT FACE

STEP 18 - With YOUR 1 landing in FRONT FACE and your weight now transferred onto it, you are prepared to follow with YOUR 2.

LEFT FACE

MIDDLE

RIGHT FACE

EDGE

EDGE

BACKFACE

FIGURE 5AJ

FRONT FACE

2LEFT, RIGHT to BACK FACE, LEFT to LEFT FACE, 1RIGHT to RIGHT FACE

STEP 24 - With YOUR 1 landing in LEFT FACE and your weight now transferred onto it, you are prepared to follow with YOUR 2.

MIDDLE

LEFT FACE

RIGHT FACE

E D G E

E D G E

BACKFACE

FIGURE 5AP

FRONT FACE

2LEFT, RIGHT to BACK FACE, LEFT to LEFT FACE, 1RIGHT to RIGHT FACE

STEP 25 - LEFT FACE on the MIDDLE is secured by also landing YOUR 2 in LEFT FACE alongside YOUR 1 (shown) completing 1 full right turn; however, to complete 1RIGHT to RIGHT FACE, an additional ½right turn from LEFT FACE to RIGHT FACE is executed by turning YOUR 1 (right foot) so that it lands pointing in FRONT FACE as indicated to be done.

MIDDLE

LEFT FACE

RIGHT FACE

EDGE

EDGE

BACKFACE

FIGURE 5AQ

FRONT FACE

2LEFT, RIGHT to BACK FACE, LEFT to LEFT FACE, 1RIGHT to RIGHT FACE

STEP 27 - FRONT FACE on the MIDDLE is secured by also landing YOUR 2 in FRONT FACE alongside YOUR 1 (shown). To continue turning right to RIGHT FACE on the MIDDLE, turn YOUR 1 so that it lands pointing in RIGHT FACE as indicated to be done.

LEFT FACE

MIDDLE

RIGHT FACE

EDGE

EDGE

BACKFACE

DIAGRAMS 6-
STEP OR HOP TO CPs AND BACK

FRONT FACE

R2

STEP 8 - With YOUR 1 landing in FRONT FACE on the MIDDLE and your weight now transferred onto it, you are prepared to follow with YOUR 2 (now the right foot).

MIDDLE

LEFT FACE

RIGHT FACE

E D G E

E D G E

BACKFACE

FRONT FACE

R2

STEP 9 - FRONT FACE on the MIDDLE is secured by also landing YOUR 2 in FRONT FACE alongside YOUR 1 (shown) completing R2. To continue on to L1, turn YOUR 1 (left foot) so that it lands on the left EDGE pointing <u>in</u> toward the MIDDLE as indicated to be done.

MIDDLE

LEFT FACE

RIGHT FACE

EDGE

EDGE

BACKFACE

FIGURE 6-05

FRONT FACE

L1

STEP 13 - FRONT FACE on the MIDDLE is secured by also landing YOUR 2 in FRONT FACE alongside YOUR 1 (shown) completing L1. To continue on to L2, turn YOUR 1 (left foot) so that it lands on the left EDGE pointing out away from MIDDLE as indicated to be done.

MIDDLE

LEFT FACE

RIGHT FACE

EDGE

EDGE

BACKFACE

FRONT FACE
L2
STEP 17 - FRONT FACE on the MIDDLE is secured by also landing YOUR 2 in FRONT FACE alongside YOUR 1 (shown) completing L2. To continue on to F-stra, land YOUR 1 (right foot) on the right EDGE pointing in FRONT FACE as indicated to be done.
MIDDLE
LEFT FACE
  
RIGHT FACE
E D G E
E D G E
BACKFACE
FIGURE 6-13

FRONT FACE
F-stra
STEP 21 - FRONT FACE on the MIDDLE is secured by also landing YOUR 2 in FRONT FACE alongside YOUR 1 (shown) completing F-stra. To continue on to B-stra, first execute a RIGHT to BACK FACE by turning YOUR 1 (right foot) so that it lands pointing in RIGHT FACE as indicated to be done.
MIDDLE
LEFT FACE
 
RIGHT FACE
EDGE
EDGE
BACKFACE
FIGURE 6-17

FRONT FACE
B-stra
STEP 22 - With YOUR 1 landing in RIGHT FACE and your weight now transferred onto it, you are prepared to follow with YOUR 2 (left foot).
MIDDLE
LEFT FACE
RIGHT FACE
E D G E
E D G E
BACKFACE
FIGURE 6-18

FRONT FACE

B-stra

STEP 23 - RIGHT FACE on the MIDDLE is secured by also landing YOUR 2 in RIGHT FACE alongside YOUR 1 (shown). To continue turning right to BACK FACE on the MIDDLE, turn YOUR 1 so that it lands pointing in BACK FACE as indicated to be done.

MIDDLE

LEFT FACE

RIGHT FACE

EDGE

EDGE

BACKFACE

FIGURE 6-19

FRONT FACE

B-stra

STEP 24 - With YOUR 1 landing in BACK FACE and your weight now transferred onto it, you are prepared to follow with YOUR 2.

MIDDLE

LEFT FACE

RIGHT FACE

E D G E

E D G E

BACKFACE

FRONT FACE
B-stra
STEP 28 - With YOUR 1 landing in BACK FACE on the MIDDLE and your weight now transferred onto it, you are prepared to follow with YOUR 2 (now the left foot).
MIDDLE
LEFT FACE
 
RIGHT FACE
E D G E
E D G E
BACKFACE
FIGURE 6-24

FRONT FACE

B-stra

STEP 30 - With YOUR 1 landing in LEFT FACE and your weight now transferred onto it, you are prepared to follow with YOUR 2.

LEFT FACE

MIDDLE

EDGE

EDGE

RIGHT FACE

BACKFACE

FIGURE 6-26

FRONT FACE
***SR1
STEP 34 - With YOUR 1 landing on the FLOOR to the immediate right side of the treadmill pointing in toward the MIDDLE and your weight now transferred onto it, you are prepared to follow with YOUR 2 (left foot).
MIDDLE
LEFT FACE
RIGHT FACE
E D G E
E D G E
BACKFACE
FIGURE 6-30

FRONT FACE

***SR1

STEP 35 - SR1 (the location) is secured by also landing YOUR 2 on the FLOOR to the immediate right side of the treadmill pointing in toward the MIDDLE alongside YOUR 1 (shown). To complete SR1 (the MANEUVER), return to FRONT FACE on the MIDDLE by turning YOUR 1 (now the left foot) so that it lands on the MIDDLE pointing in FRONT FACE as indicated to be done.

LEFT FACE

MIDDLE

RIGHT FACE

E D G E

E D G E

BACKFACE

FIGURE 6-31

FRONT FACE
\*\*\*SR1
STEP 36 - With YOUR 1 landing in FRONT FACE on the MIDDLE and your weight now transferred onto it, you are prepared to follow with YOUR 2 (now the right foot).
MIDDLE
LEFT FACE
RIGHT FACE
E D G E
E D G E
BACKFACE
FIGURE 6-32

FRONT FACE

**\*\*\*SR2**

S T E P 39 - SR2 (the location) is secured by also landing YOUR 2 on the FLOOR to the immediate right side of the treadmill pointing out away from the MIDDLE alongside YOUR 1 (shown). To complete SR2 (the MANEUVER), return to FRONT FACE the MIDDLE by turning YOUR 1 (now the left foot) so that it lands on the MIDDLE pointing in FRONT FACE as indicated to be done.

MIDDLE

LEFT FACE

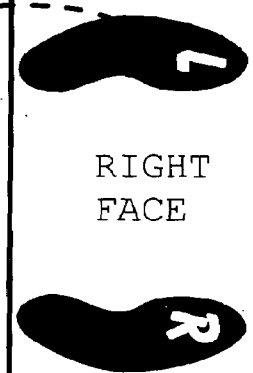

RIGHT FACE

EDGE

EDGE

BACKFACE

FIGURE 6-35

FRONT FACE
***SRF
STEP 42 - With YOUR 1 landing on the FLOOR to the immediate right side of the treadmill pointing forward in FRONT FACE and your weight now transferred onto it, you are prepared to follow with YOUR 2 (left foot).
MIDDLE
LEFT FACE
RIGHT FACE
E D G E
E D G E
BACKFACE
FIGURE 6-38

FRONT FACE

\*\*\*SRF

| STEP 43 - SRF (the location) is secured by also landing YOUR 2 on the FLOOR to the immediate right side of the treadmill pointing forward in FRONT FACE alongside YOUR 1 (shown). To complete SRF (the MANEUVER), return to FRONT FACE on the MIDDLE by landing YOUR 1 (now the left foot) on the MIDDLE pointing in FRONT FACE as indicated to be done. |
|---|

LEFT FACE

MIDDLE

RIGHT FACE

E D G E

E D G E

BACKFACE

FIGURE 6-39

FRONT FACE
\*\*\*SRB
STEP 48 - With YOUR 1 landing in FRONT FACE on the MIDDLE and your weight now transferred onto it, you are prepared to follow with YOUR 2 (now the right foot).
MIDDLE
LEFT FACE
RIGHT FACE
E D G E
E D G E
BACKFACE
FIGURE 6-44

FRONT FACE
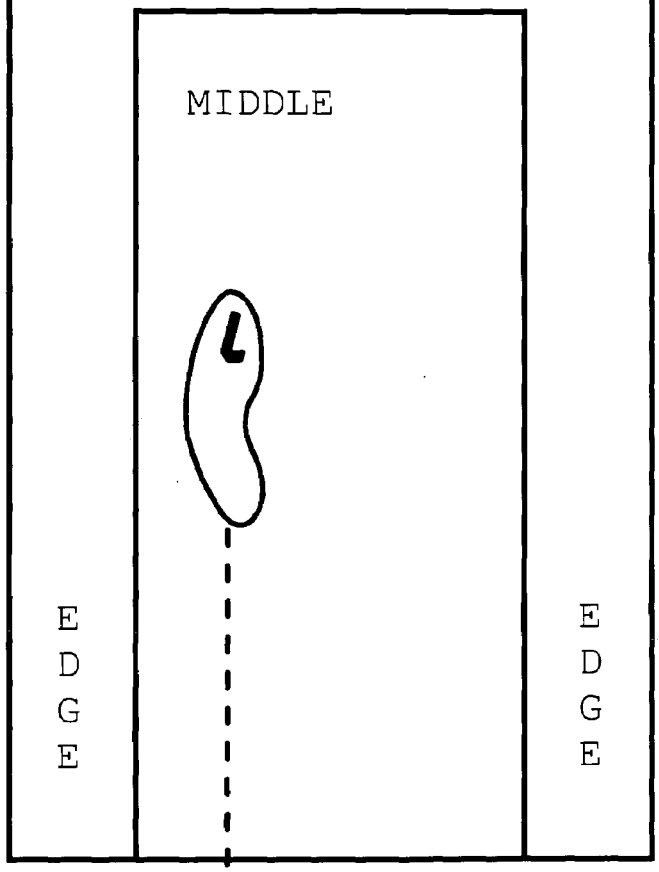
***B1
STEP 66 - With YOUR 1 landing on the FLOOR to the immediate rear of the treadmill pointing in toward the MIDDLE and your weight now transferred onto it, you are prepared to follow with YOUR 2 (left foot).
MIDDLE
LEFT FACE
RIGHT FACE
E D G E
E D G E
BACK FACE
FIGURE 6-62

FRONT FACE

***B2

STEP 71 - LEFT FACE on the MIDDLE is secured by also landing YOUR 2 in LEFT FACE alongside YOUR 1 (shown). To continue turning left to BACK FACE on the MIDDLE, turn YOUR 1 so that it lands pointing in BACK FACE as indicated to be done.

MIDDLE

LEFT FACE

RIGHT FACE

E D G E

E D G E

BACKFACE

FIGURE 6-67

FRONT FACE

***B2

STEP 85 - FRONT FACE on the MIDDLE is secured by also landing YOUR 2 in FRONT FACE alongside YOUR 1 (shown) completing BR. To continue on to BL, turn YOUR 1 (left foot) so that it lands on the FLOOR to the immediate rear of the treadmill pointing in LEFT FACE as indicated to be done.

MIDDLE

LEFT FACE

RIGHT FACE

EDGE

EDGE

BACKFACE

FIGURE 6-81

FRONT FACE

***BL

STEP 89 - FRONT FACE on the MIDDLE is secured by also landing YOUR 2 in FRONT FACE alongside YOUR 1 (shown) completing BL, and all 18 MANEUVERS... "!"

MIDDLE

LEFT FACE

RIGHT FACE

E D G E

E D G E

BACKFACE

FIGURE 6-85

DIAGRAMS 6.A-
SERIES OF MANEUVERS(A)

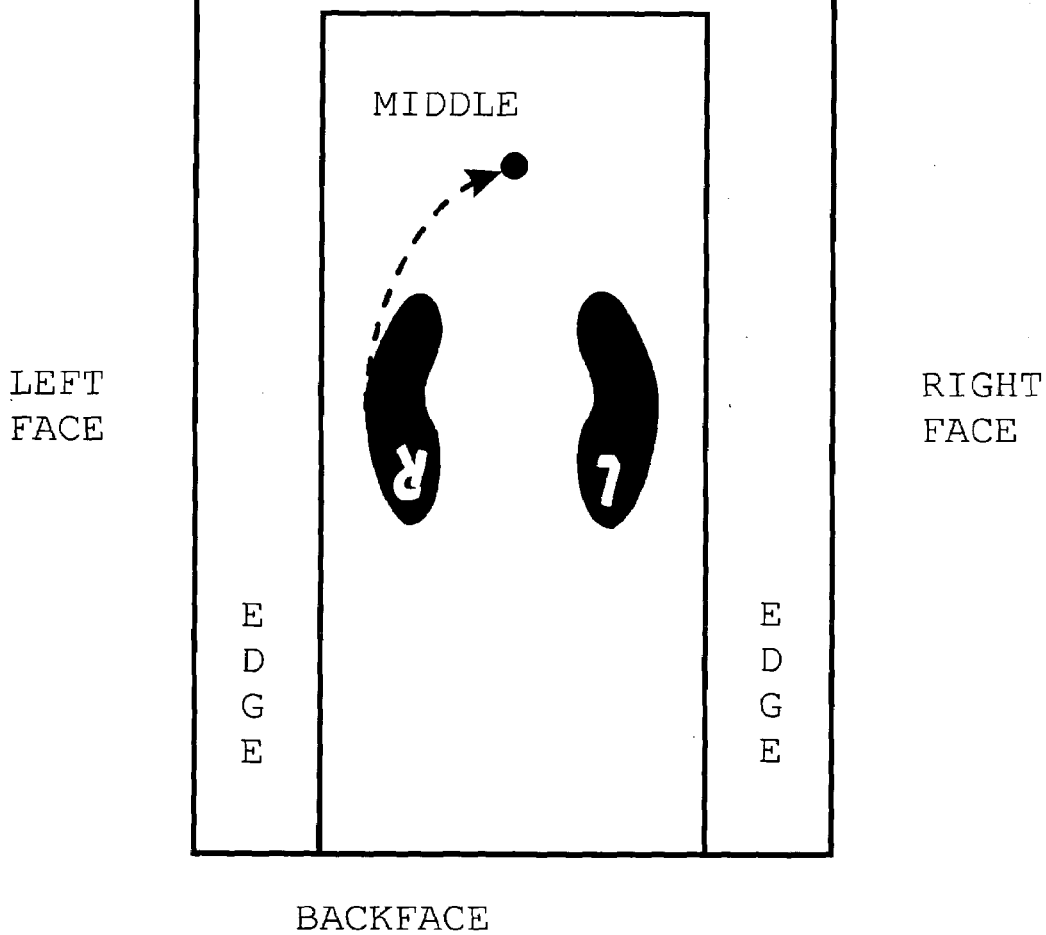
FIGURE 6.A-01

FRONT FACE

**\*\*\*3RIGHT to LEFT FACE, L1, RIGHT FACE, SLF (in one)**

STEP 2 - With YOUR 1 landing in LEFT FACE and your weight now transferred onto it, you are prepared to follow with YOUR 2 (left foot).

LEFT FACE

MIDDLE

RIGHT FACE

EDGE

EDGE

BACKFACE

FIGURE 6.A-02

***3RIGHT to LEFT FACE, L1, RIGHT FACE, SLF (in one)
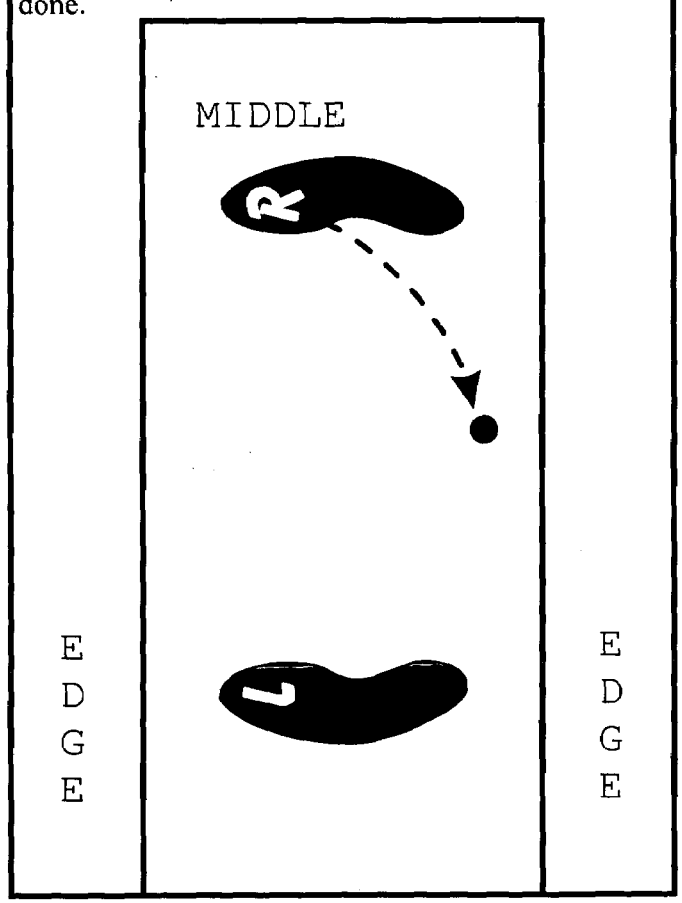
FIGURE 6.A-03

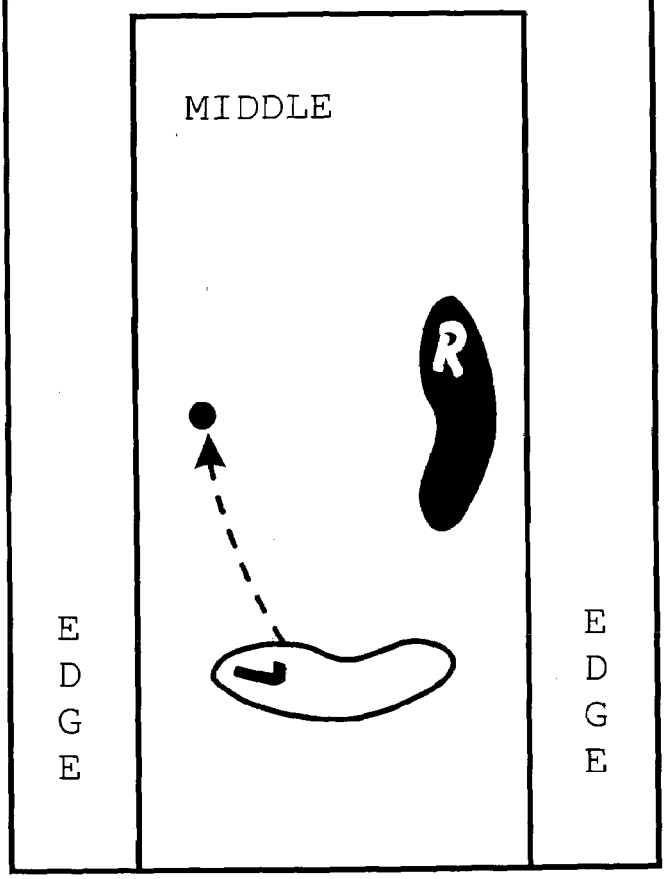
FIGURE 6.A-04

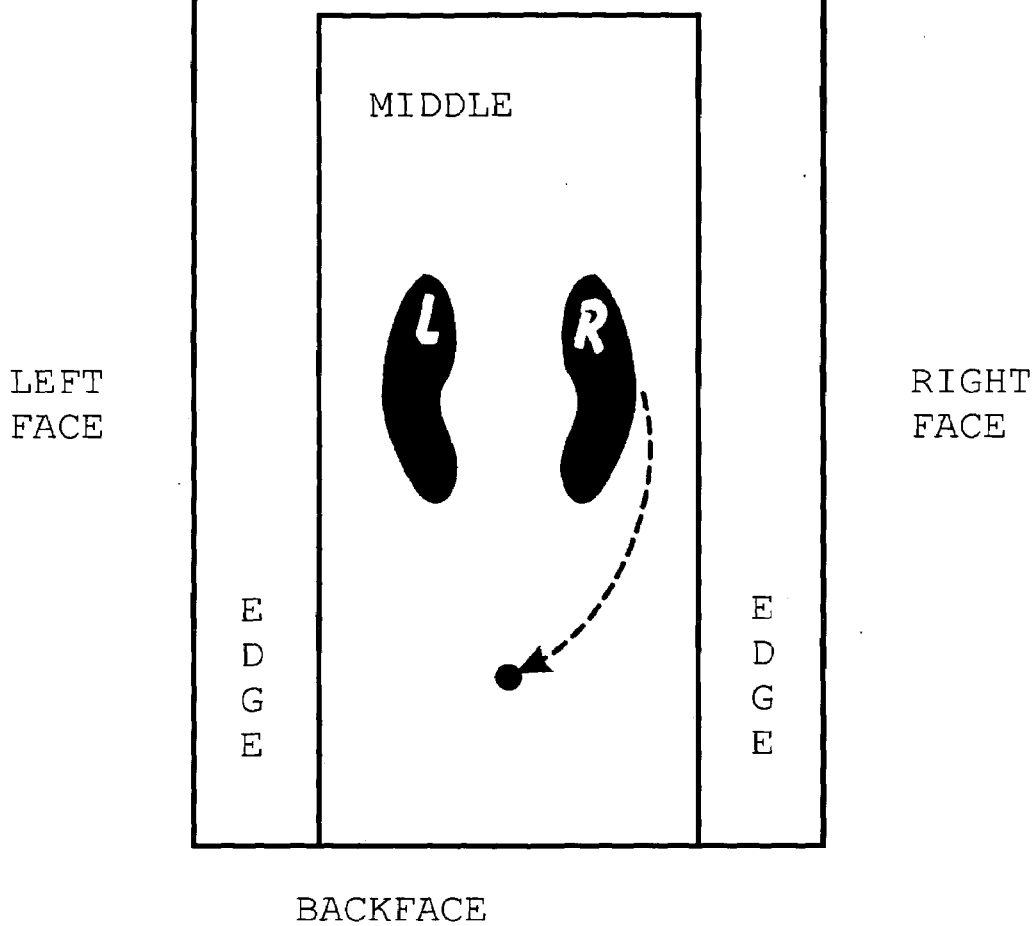
FIGURE 6.A-05

FRONT FACE
**\*\*\*3RIGHT to LEFT FACE, L1, RIGHT FACE, SLF (in one)**
STEP 6 - With YOUR 1 landing in RIGHT FACE and your weight now transferred onto it, you are prepared to follow with YOUR 2 (left foot).
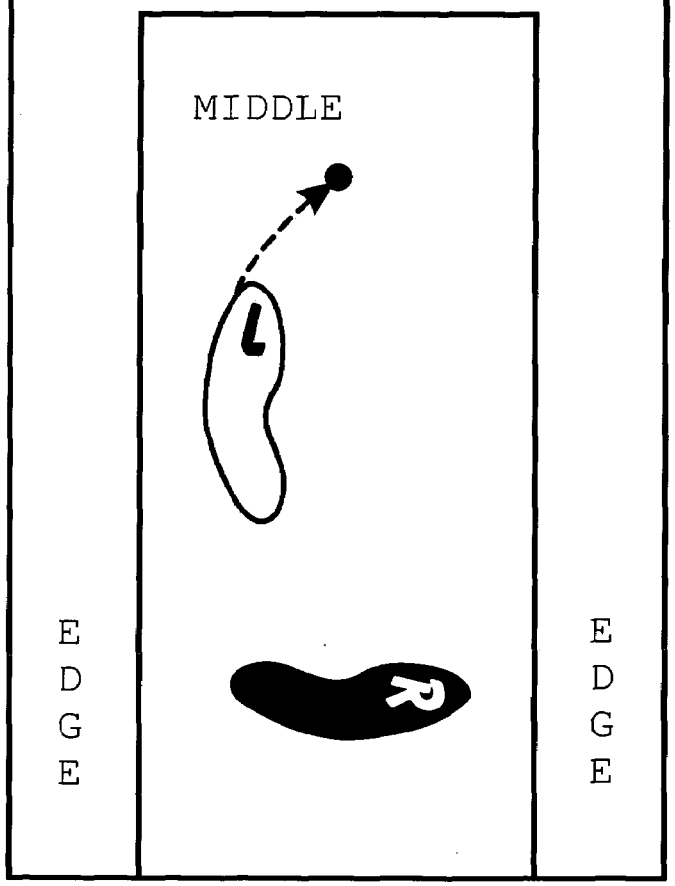
LEFT FACE
RIGHT FACE
BACKFACE
FIGURE 6.A-06

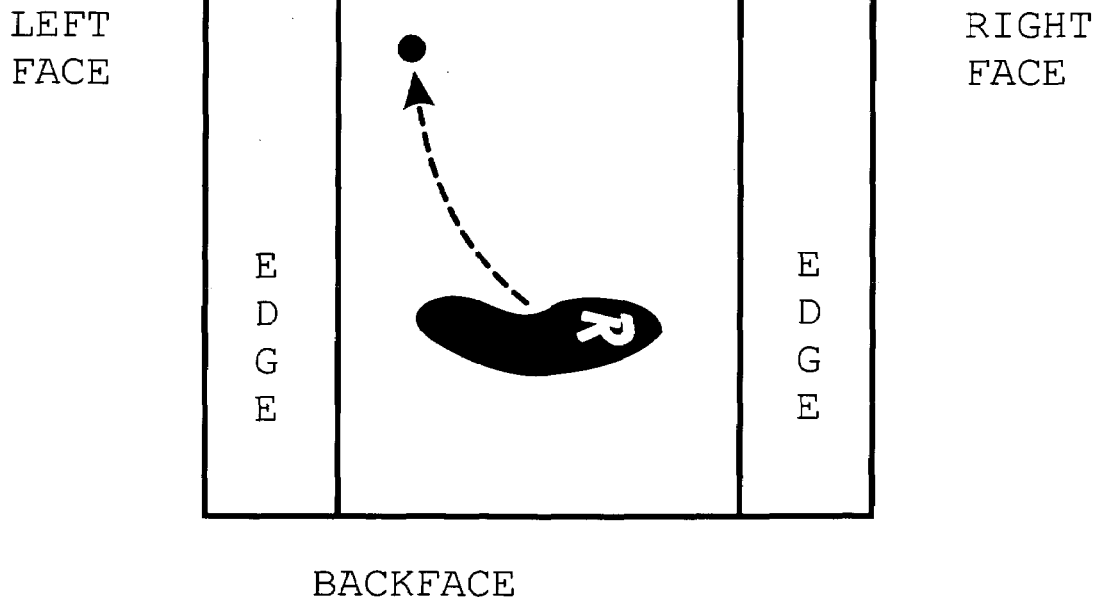
FIGURE 6.A-07

FRONT FACE
***3RIGHT to LEFT FACE, L1, RIGHT FACE, SLF (in one)
STEP 8 - With YOUR 1 landing in BACK FACE and your weight now transferred onto it, you are prepared to follow with YOUR 2.
MIDDLE
LEFT FACE
RIGHT FACE
EDGE
EDGE
BACKFACE
FIGURE 6.A-08

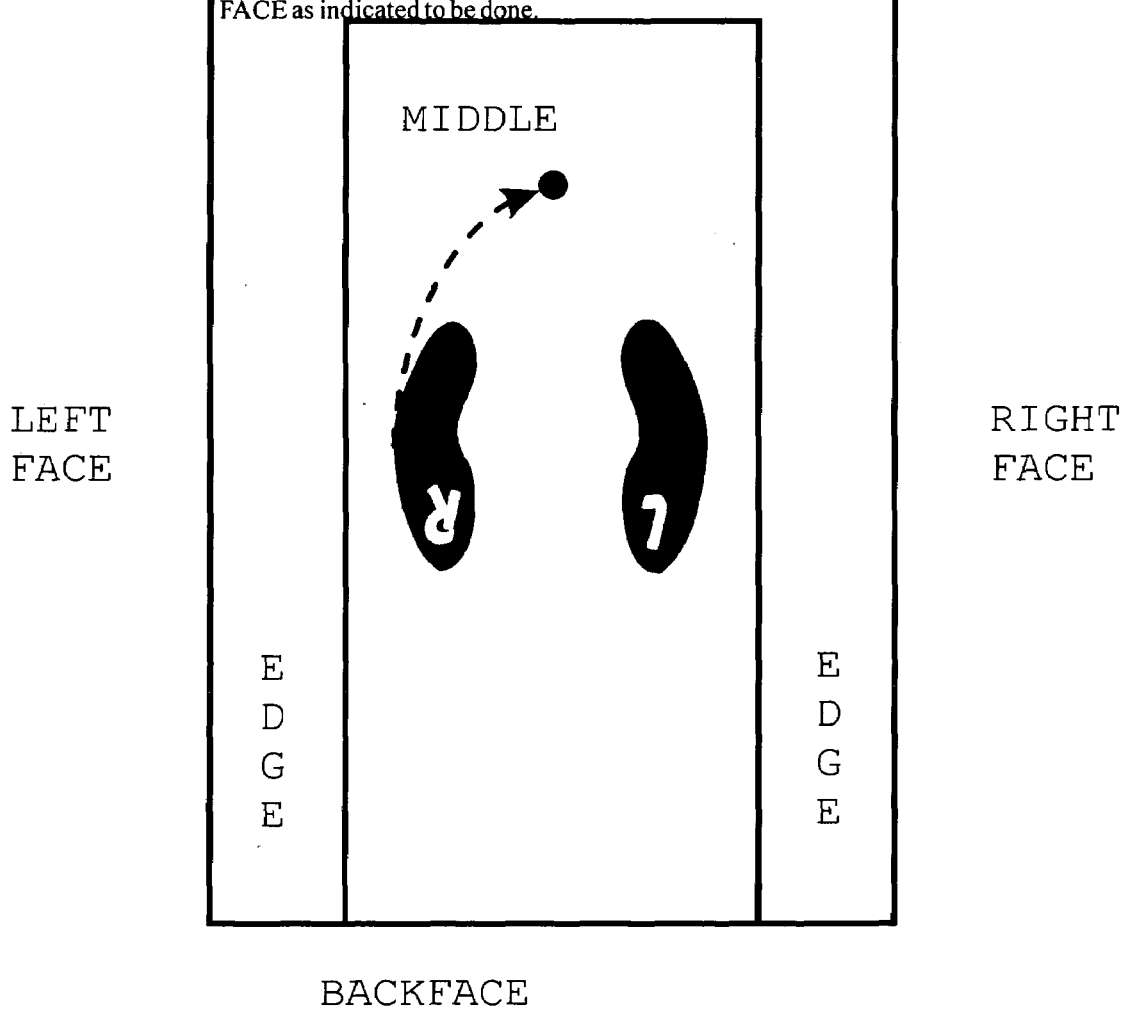
FIGURE 6.A-09

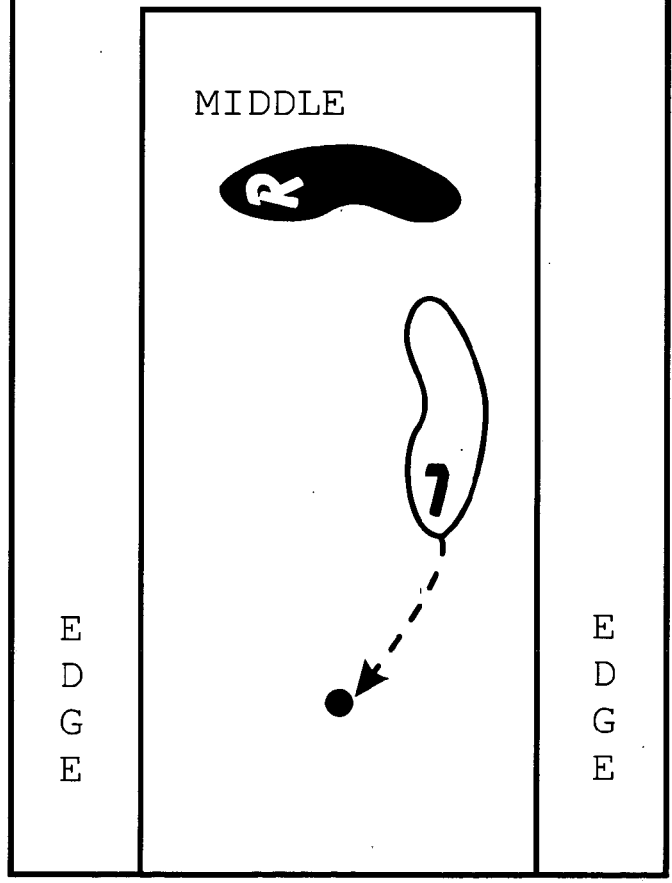
FIGURE 6.A-10

FRONT FACE

**\*\*\*3RIGHT to LEFT FACE, L1, RIGHT FACE, SLF (in one)**

STEP 11 - LEFT FACE on the MIDDLE is secured by also landing YOUR 2 in LEFT FACE alongside YOUR 1 (shown) completing 3RIGHT to LEFT FACE. To continue with L1, turn YOUR 1 (left foot) so that it lands on the left EDGE pointing in toward the MIDDLE, while simultaneously pivoting on YOUR 2 (right foot) clockwise from LEFT FACE to FRONT FACE as indicated to be done.

MIDDLE

LEFT FACE

RIGHT FACE

E D G E

E D G E

BACKFACE

FIGURE 6.A-11

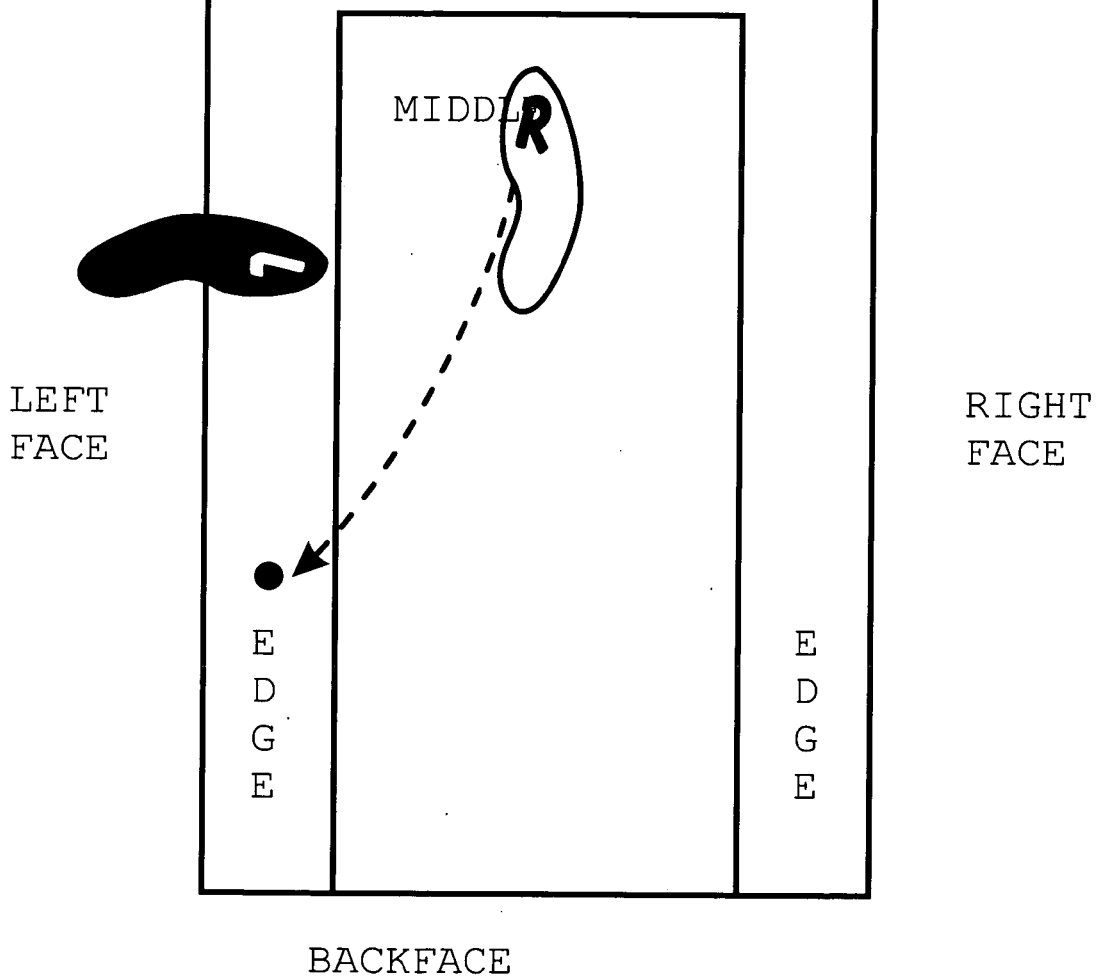
FIGURE 6.A-12

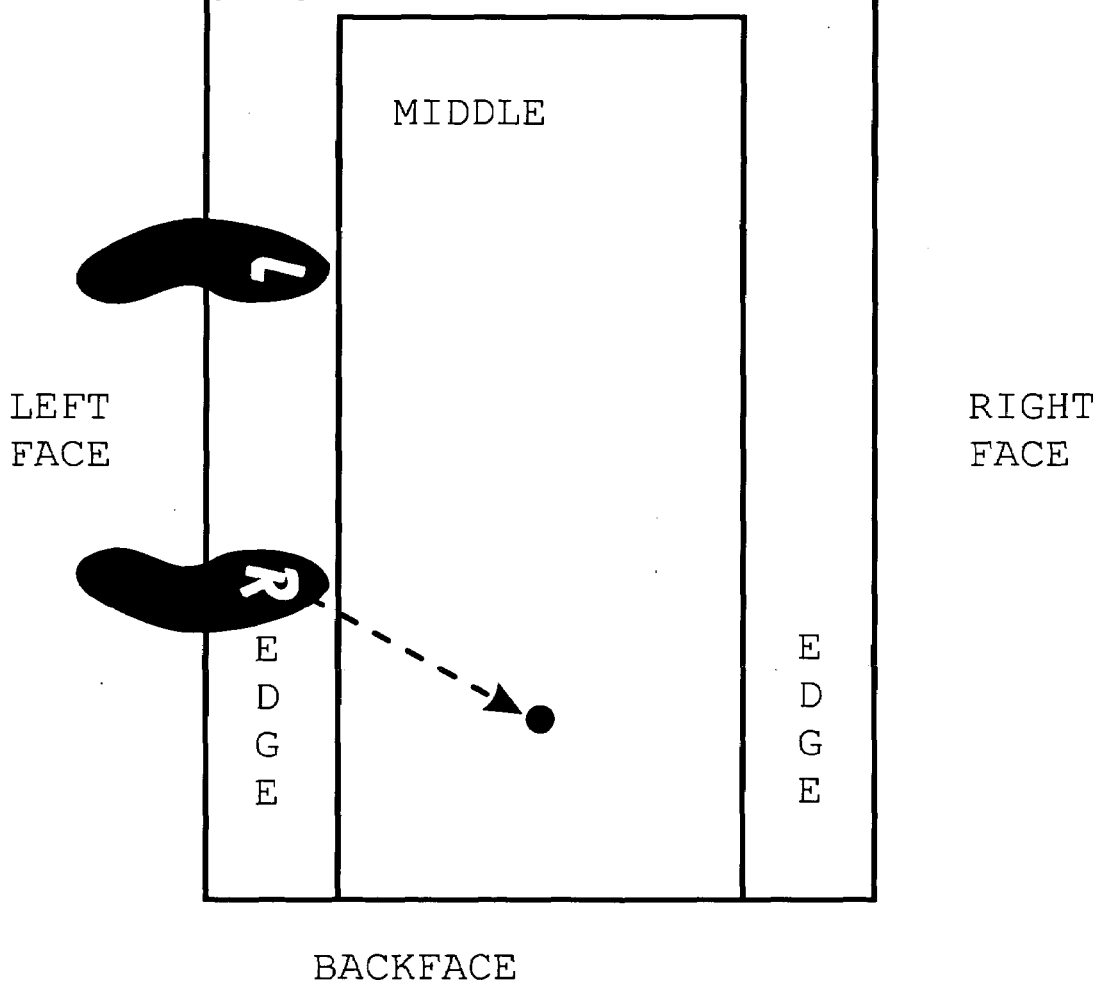
FIGURE 6.A-13

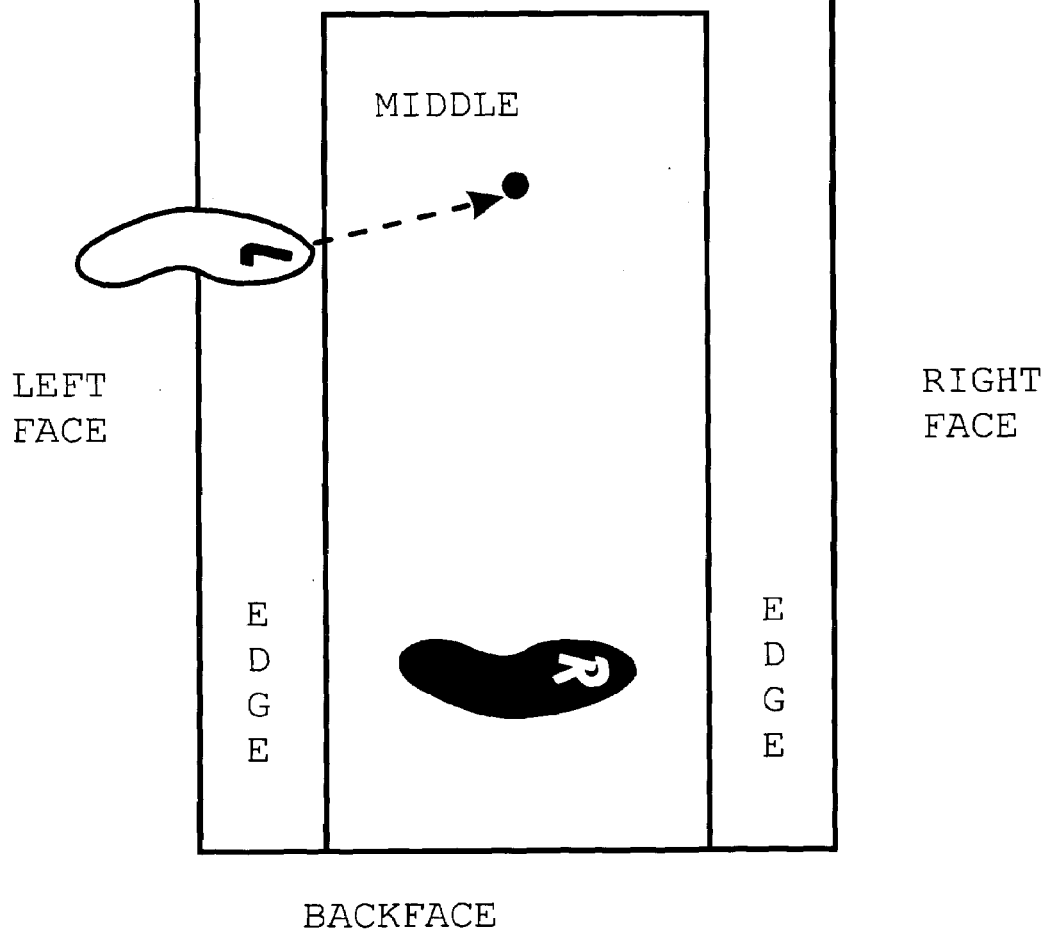
FIGURE 6.A-14

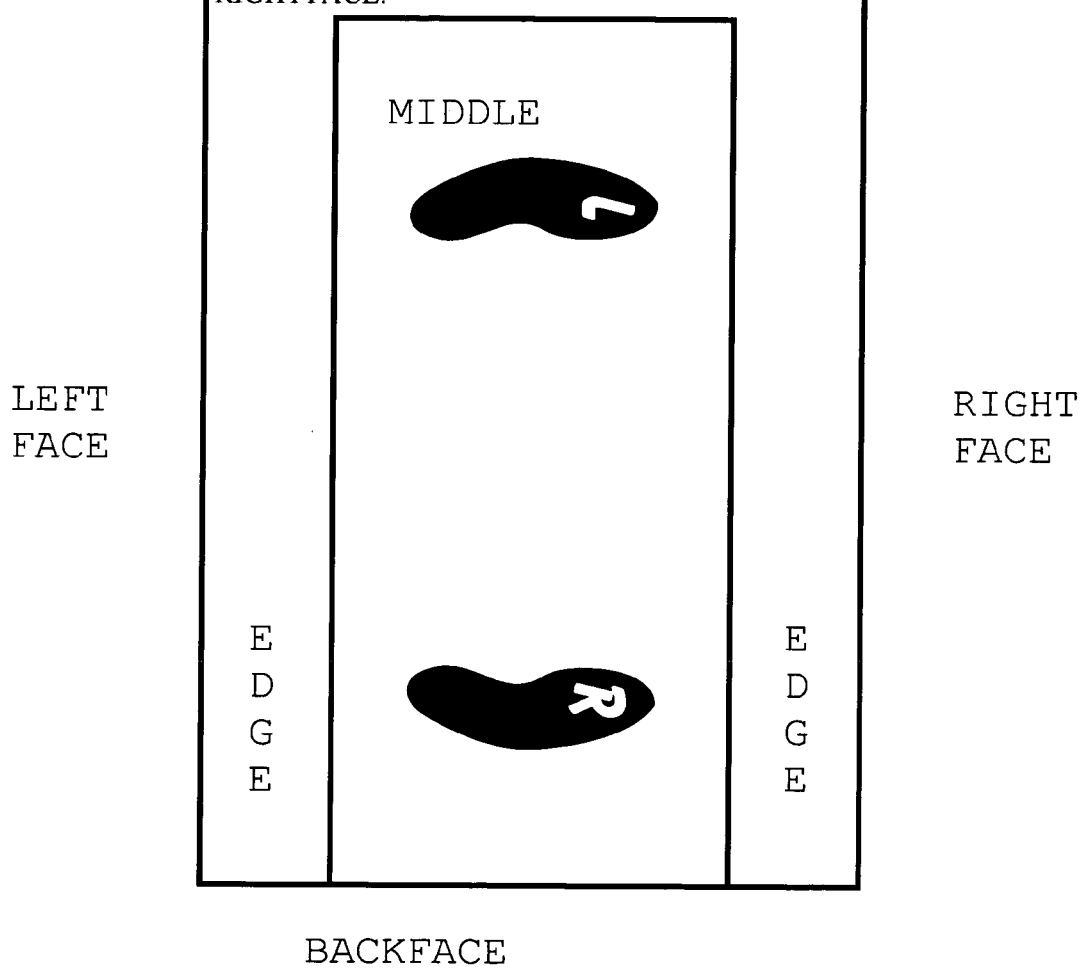
FIGURE 6.A-15

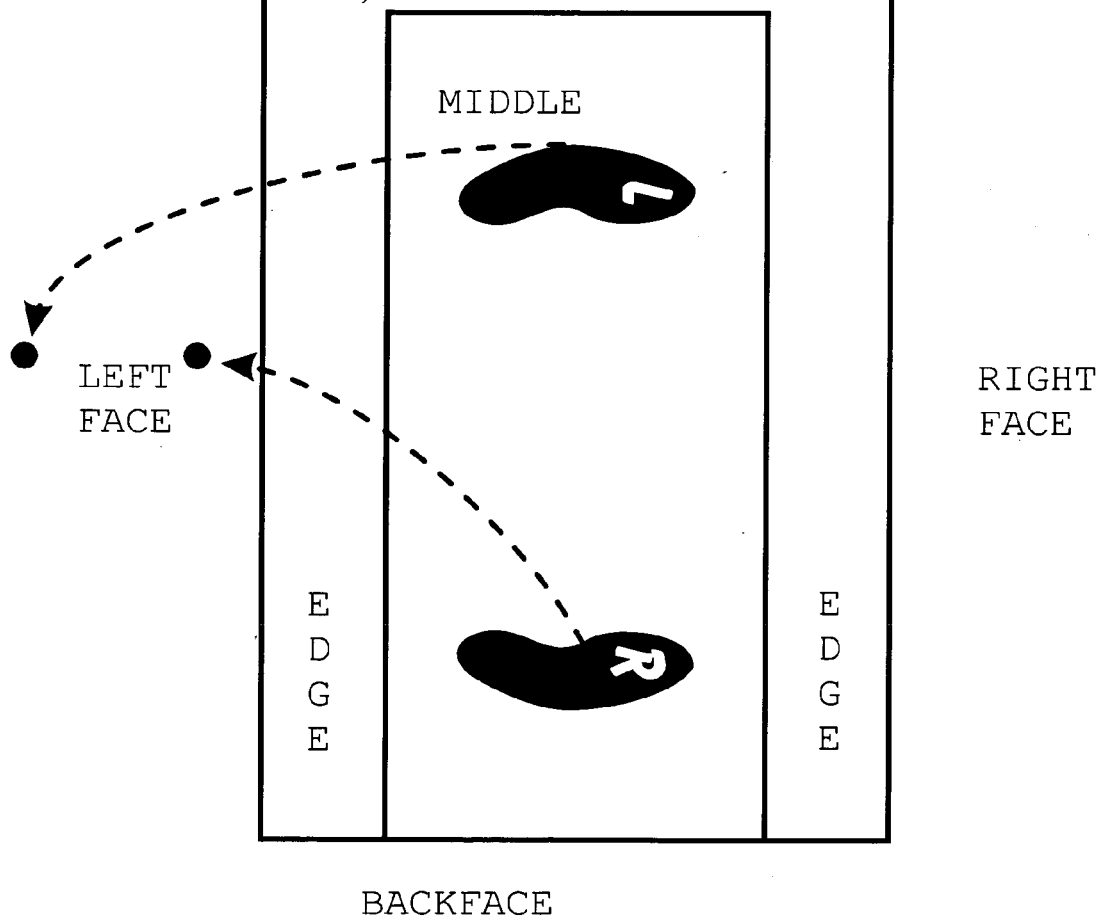
FIGURE 6.A-16

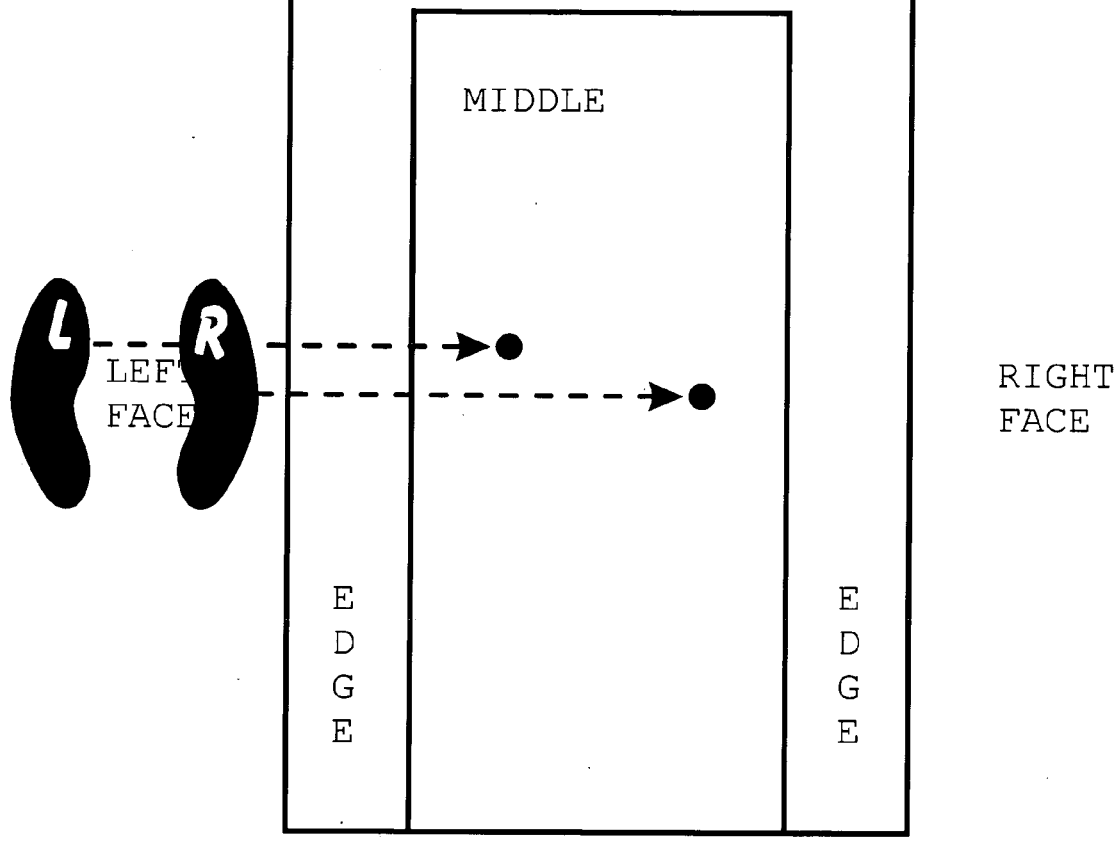
FIGURE 6.A-17

FRONT FACE
***3RIGHT to LEFT FACE, L1, RIGHT FACE, SLF (in one)
STEP 18 - FRONT FACE is secured by landing on the MIDDLE in FRONT FACE (shown) completing SLF (in one), and the entire series of MANEUVERS... "!"
LEFT FACE
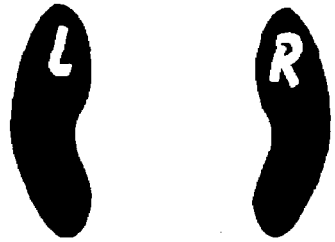
RIGHT FACE
BACKFACE
FIGURE 6.A-18

DIAGRAMS 6.B-
SERIES OF MANEUVERS(B)

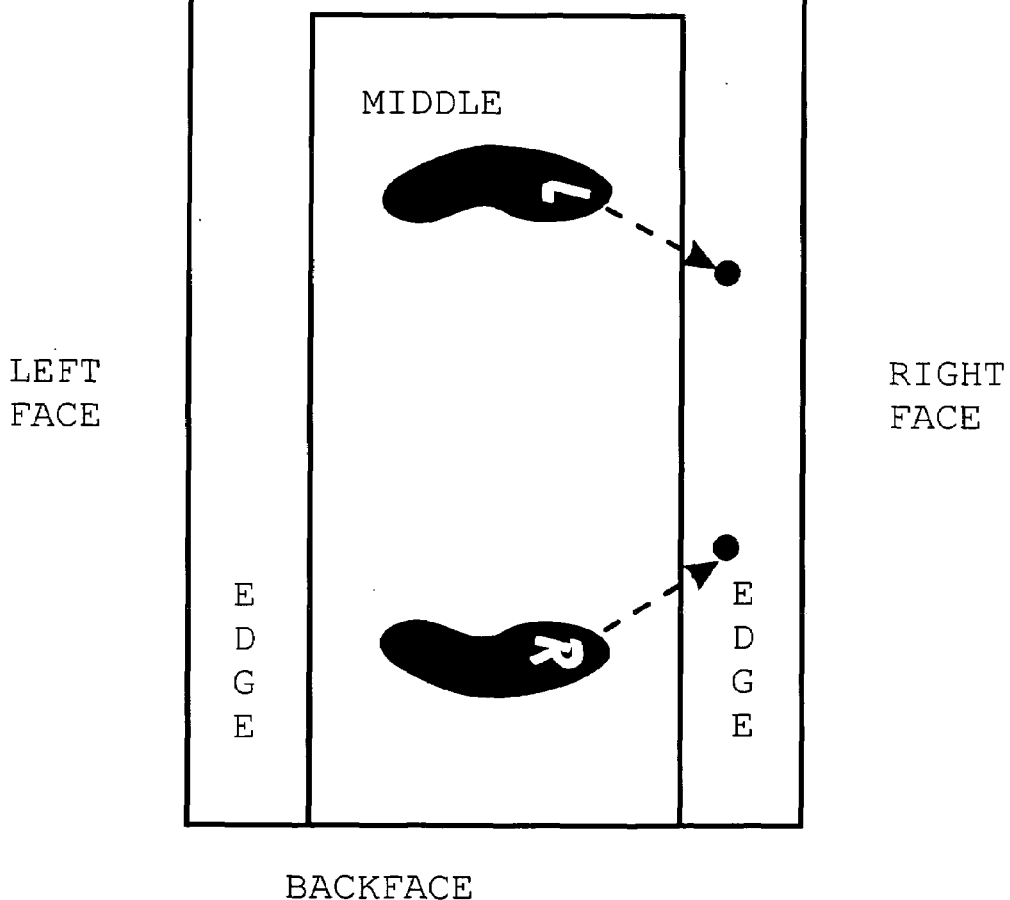
FIGURE 6.B-01

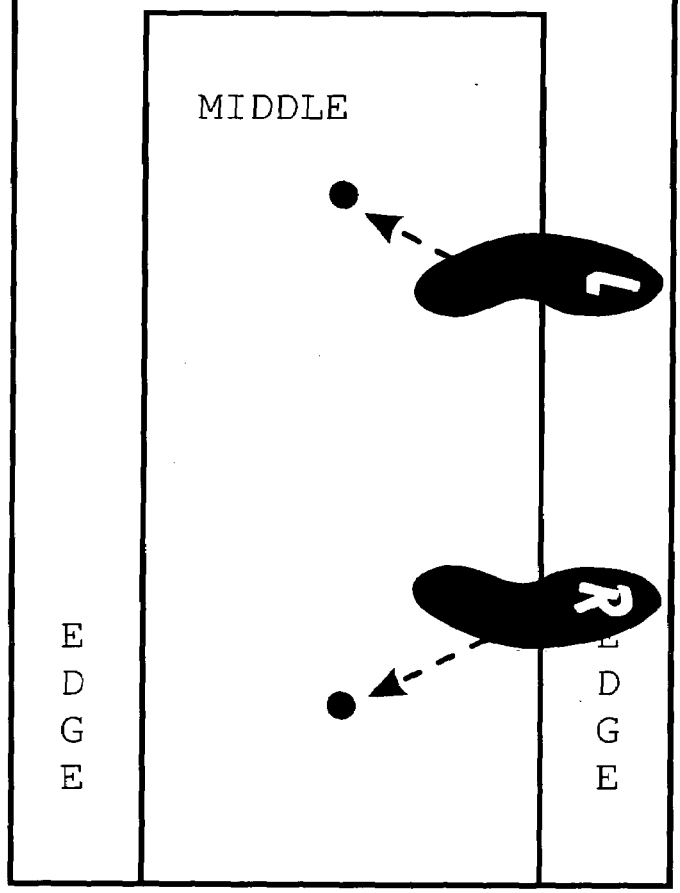
FIGURE 6.B-02

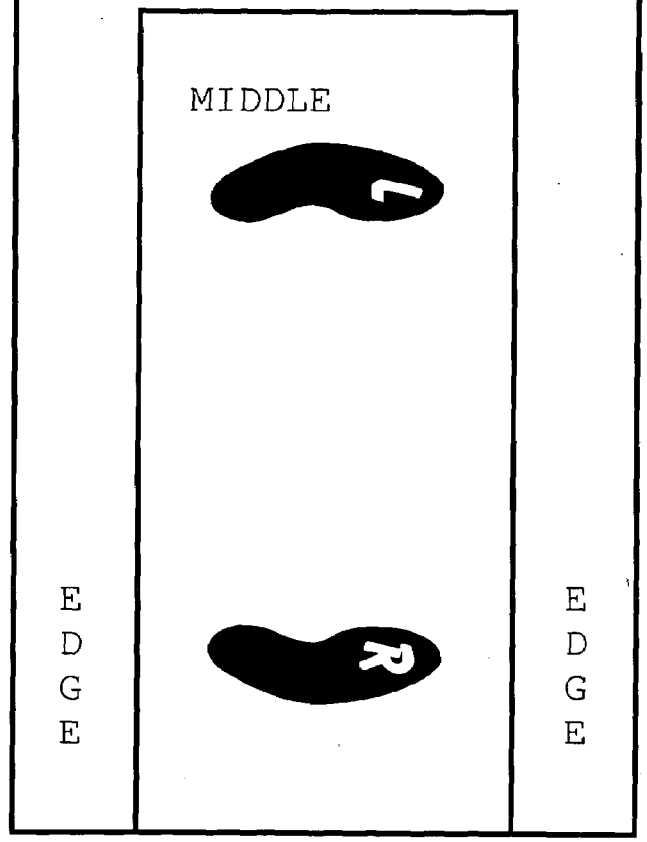
FIGURE 6.B-03

2C-B'PAN-LEFT
S T E P 2 - After pivoting ½left backward and around to the opposite FACE (shown), you are prepared to continue pivoting ½left backward and around to the original FACE (in a single MANEUVER) creating a circular motion as indicated to be done.
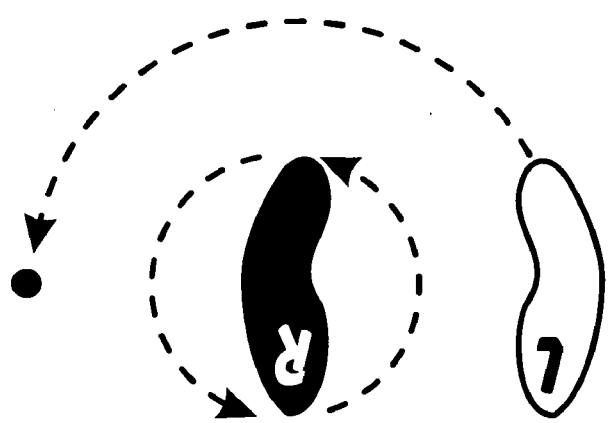
FIGURE 6.B-04

2C-B'PAN-LEFT
STEP 3 - Action completed... "!"
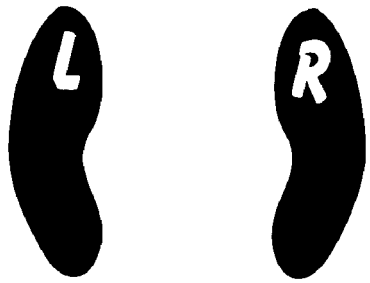
FIGURE 6.B-05

2C-B'PAN-RIGHT
STEP 3 - Action completed... "!"
FIGURE 6.B-06

2C-B'PAN-LEFT

STEP 1 - 2 consecutive backward left PANS done in the C-PAN METHOD (in a single MANEUVER) from a standing position up on the balls of your feet are executed by putting your weight on the ball of YOUR 1 (right foot), and <u>first pivoting on it ½left backward</u> and around to the opposite FACE, by pushing your body backward and right with YOUR 2 (left foot) as indicated to be done.

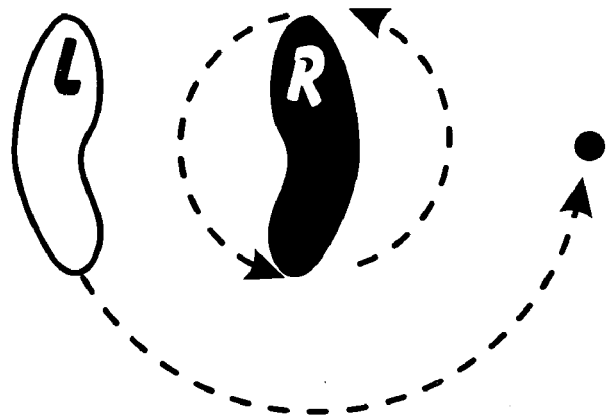

FIGURE 6.B-07

3C-B'PAN-RIGHT

S T E P 1 - 3 consecutive backward right PANS done in the C-PAN METHOD (in a single MANEUVER) from a standing position up on the balls of your feet are executed by putting your weight on the ball of YOUR 1 (left foot), and <u>first pivoting on it ½ right backward</u> and around to the opposite FACE, by pushing your body backward and left with YOUR 2 (right foot) as indicated to be done.

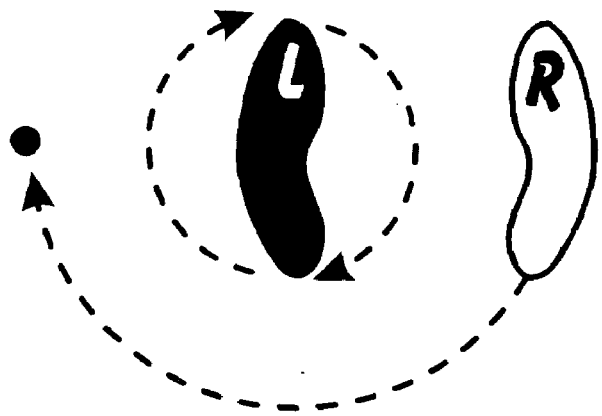

FIGURE 6.B-08

3C-B'PAN-RIGHT
S T E P  2 - After pivoting ½right backward and around to the opposite FACE (shown), you are prepared to continue pivoting ½right backward and around to the original FACE (in a single MANEUVER) as indicated to be done.
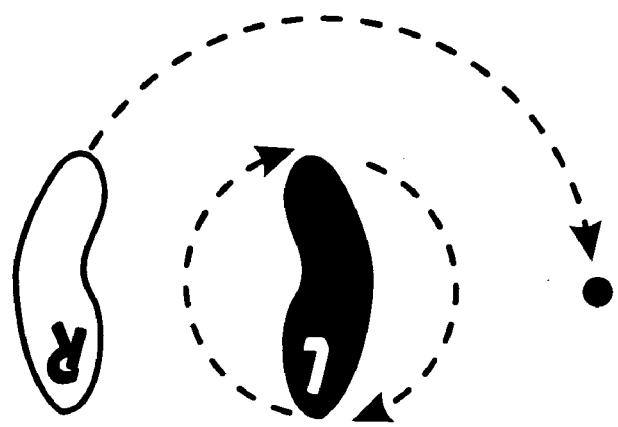
FIGURE 6.B-09

3C-B'PAN-RIGHT
S T E P  3 - After pivoting ½right backward and around to the original FACE (shown), you are prepared to pivot ½right backward and around to the opposite FACE again (in a single MANEUVER), repeating the circular motion as indicated to be done.
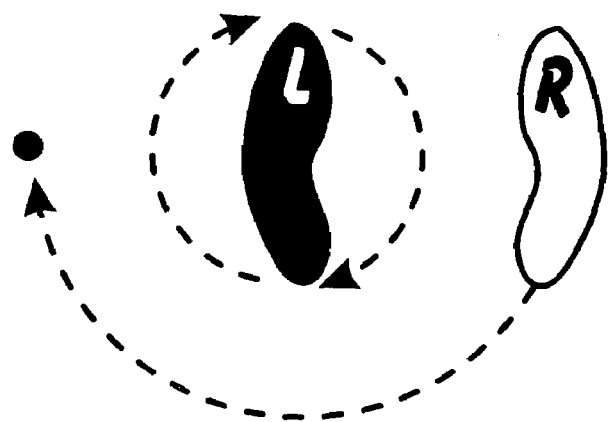
FIGURE 6.B-10

3C-B'PAN-RIGHT
STEP 4 - Action completed...            "!"
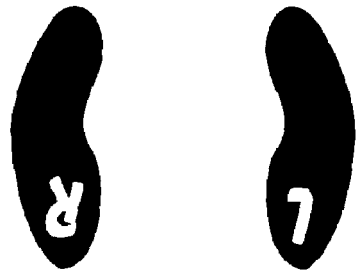
FIGURE 6.B-11

3C-B'PAN-LEFT
STEP 1 - 3 consecutive backward left PANS done in the C-PAN METHOD (in a single MANEUVER) from a standing position up on the balls of your feet are executed by putting your weight on the ball of YOUR 1 (right foot), and <u>first pivoting on it ½left backward</u> and around to the opposite FACE, by pushing your body backward and right with YOUR
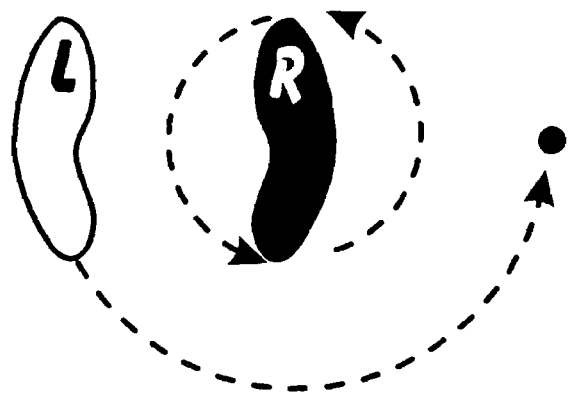
FIGURE 6.B-12

3C-B'PAN-LEFT
S T E P 2 - After pivoting ½left backward and around to the opposite FACE (shown), you are prepared to continue pivoting ½left backward and around to the original FACE (in a single MANEUVER) as indicated to be done.
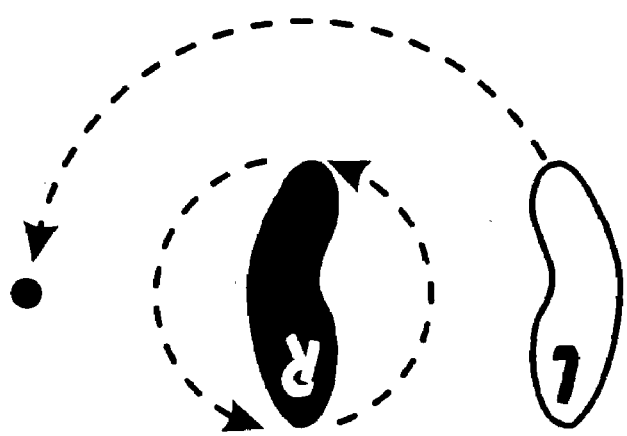
FIGURE 6.B-13

3C-B'PAN-LEFT
S T E P 3 - After pivoting ½left backward and around to the original FACE (shown), you are prepared to pivot ½left backward and around to the opposite FACE again (in a single MANEUVER), repeating the circular motion as indicated to be done.
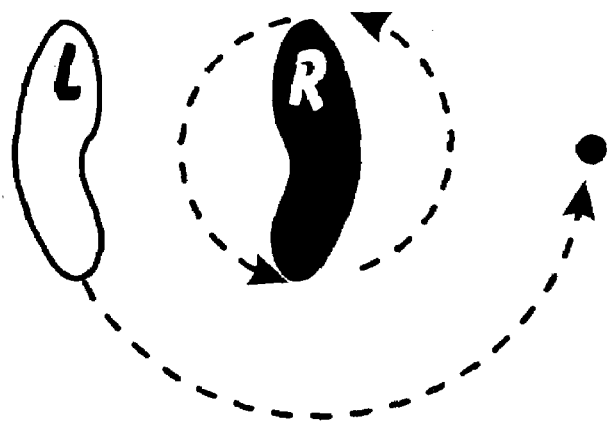
FIGURE 6.B-14

3C-B'PAN-LEFT
STEP 4 - Action completed                "!"
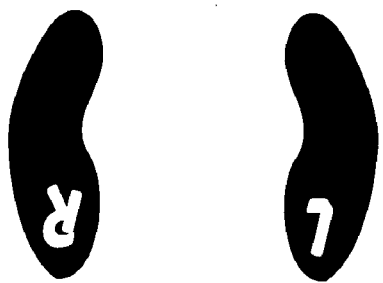
FIGURE 6.B-15

DIAGRAMS 7- SWITCH, STANDARD SWITCHES, AND C-SWITCHES

SWITCH-RIGHT

S T E P 1 - From a standing position up on the balls of your feet, hop ½right to the opposite FACE (in a single MANEUVER), creating a semi-circular motion as indicated to be done.

SWITCH-RIGHT
STEP 2 - Action completed "!"

SWITCH-LEFT

STEP 1 - From a standing position up on the balls of your feet, hop ½ left to the opposite FACE (in a single MANEUVER), creating a semi-circular motion as indicated to be done.

SWITCH-LEFT
STEP 2 - Action completed    "!"

2SWITCH-RIGHT

STEP 1 - 2 consecutive right and left SWITCHES done in the STANDARD METHOD (in a single MANEUVER) from a standing position up on the balls of your feet are executed by <u>first hopping ½right</u> to the opposite FACE as indicated to be done.

2SWITCH-RIGHT

S T E P  2 - After landing in the opposite FACE (shown), you are prepared to hop ½left back to the original FACE (in a single MANEUVER) repeating the semi-circular motion as indicated to be done.

2SWITCH-RIGHT

STEP 3 - Action completed...  "!"

2SWITCH-LEFT

S T E P 1 - 2 consecutive left and right SWITCHES done in the STANDARD METHOD (in a single MANEUVER) from a standing position up on the balls of your feet are executed by <u>first hopping ½left</u> to the opposite FACE as indicated to be done.

STEP 2 - After landing in the opposite FACE (shown), you are prepared to hop ½right back to the original FACE (in a single MANEUVER) repeating the semi-circular motion as indicated to be done.

2SWITCH-LEFT
STEP 3 - Action completed...  "!"

3SWITCH-RIGHT

S T E P 1 - 3 consecutive right, left, and right SWITCHES done in the STANDARD METHOD (in a single MANEUVER) from a standing position up on the balls of your feet are executed by <u>first hopping ½right</u> to the opposite FACE as indicated to be done.

3SWITCH-RIGHT

S T E P 2 - After landing in the opposite FACE (shown), you are prepared to hop ½left back to the original FACE (in a single MANEUVER) as indicated to be done.

3SWITCH-RIGHT

STEP 3 - After landing back in the original FACE (shown), you are prepared to hop ½right to the opposite FACE again (in a single MANEUVER), repeating the semi-circular motion as indicated to be done.

3SWITCH-RIGHT
STEP 4 - Action completed "!"

3SWITCH-LEFT

S T E P 1 - 3 consecutive left, right, and left SWITCHES done in the STANDARD METHOD (in a single MANEUVER) from a standing position up on the balls of your feet are executed by first hopping ½left to the opposite FACE as indicated to be done.

3SWITCH-LEFT

S T E P  2 - After landing in the opposite FACE (shown), you are prepared to hop ½right back to the original FACE (in a single MANEUVER) as indicated to be done.

3SWITCH-LEFT

S T E P 3 - After landing back in the original FACE (shown), you are prepared to hop ½left to the opposite FACE again (in a single MANEUVER), repeating the semi-circular motion as indicated to be done.

3SWITCH-LEFT
STEP 4 - Action completed                    "!"

2C-SWITCH-RIGHT

S T E P 1 - 2 right SWITCHES done in the C-SWITCH METHOD (in a single MANEUVER) from a standing position up on the balls of your feet, are executed by hopping ½right to the opposite FACE as indicated to be done.

2C-SWITCH-RIGHT

S T E P 2 - After landing in the opposite FACE (shown), you are prepared to continue hopping ½right around back to the original FACE, creating a circular motion as indicated to be done.

2C-SWITCH-RIGHT
STEP 3 - Action completed...   "!"

2C-SWITCH-LEFT

S T E P 1 - 2 left SWITCHES done in the C-SWITCH METHOD (in a single MANEUVER) from a standing position up on the balls of your feet, are executed by hopping ½ left to the opposite FACE as indicated to be done.

2C-SWITCH-LEFT

STEP 2 - After landing in the opposite FACE (shown), you are prepared to continue hopping ½left around back to the original FACE, creating a circular motion as indicated to be done.

2C-SWITCH-LEFT
STEP 3 - Action completed... "!"

3C-SWITCH-RIGHT

S T E P 1 - 3 right SWITCHES done in the C-SWITCH METHOD (as a single MANEUVER) from a standing position up on the balls of your feet, are executed by hopping ½right to the opposite FACE as indicated to be done.

3C-SWITCH-RIGHT

S T E P  2 - After landing in the opposite FACE (shown), you are prepared to continue hopping ½right around back to the original FACE as indicated to be done.

3C-SWITCH-RIGHT

STEP 4 - Action completed        "!"

3C-SWITCH-LEFT

S T E P 1 - 3 left SWITCHES done in the C-SWITCH METHOD (as a single MANEUVER) from a standing position up on the balls of your feet, are executed by hopping ½ left to the opposite FACE as indicated to be done.

3C-SWITCH-LEFT

S T E P  2 - After landing in the opposite FACE (shown), you are prepared to continue hopping ½left around back to the original FACE as indicated to be done.

3C-SWITCH-LEFT

S T E P 3 - After landing back in the original FACE (shown), you are prepared to hop ½ left to the opposite FACE again (in a single MANEUVER) in a circular motion.

3C-SWITCH-LEFT
STEP 4 - Action completed "!"

DIAGRAMS 7.A-
SERIES OF MANEUVERS(A)

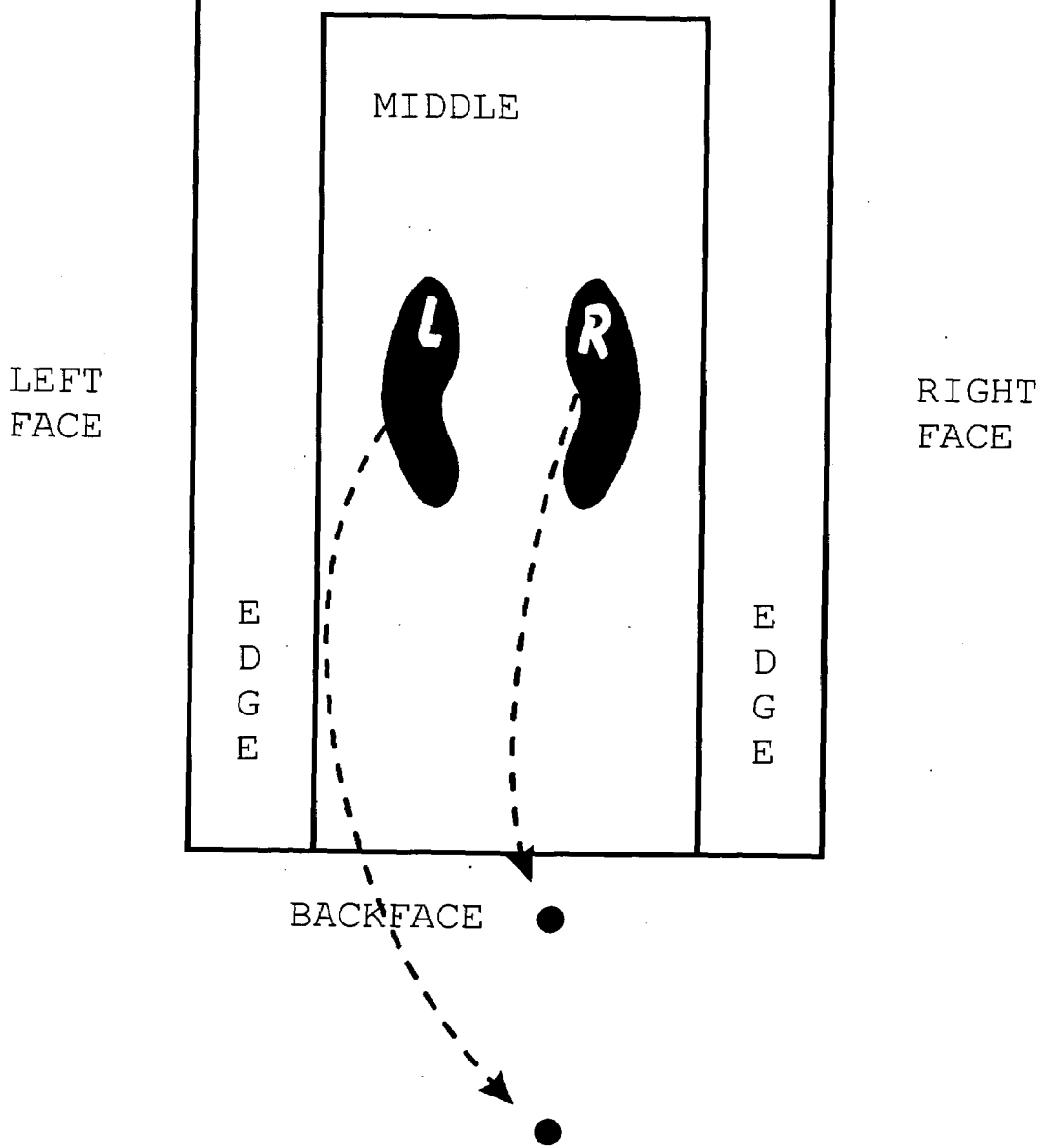
FIGURE 7.A-01

FRONT FACE
*BL (in one)/2C-SWITCH-LEFT, SR1 (in one), LEFT FACE, 2RIGHT, L1 (in one)/SWITCH-LEFT, R1 (in one)/SWITCH-RIGHT
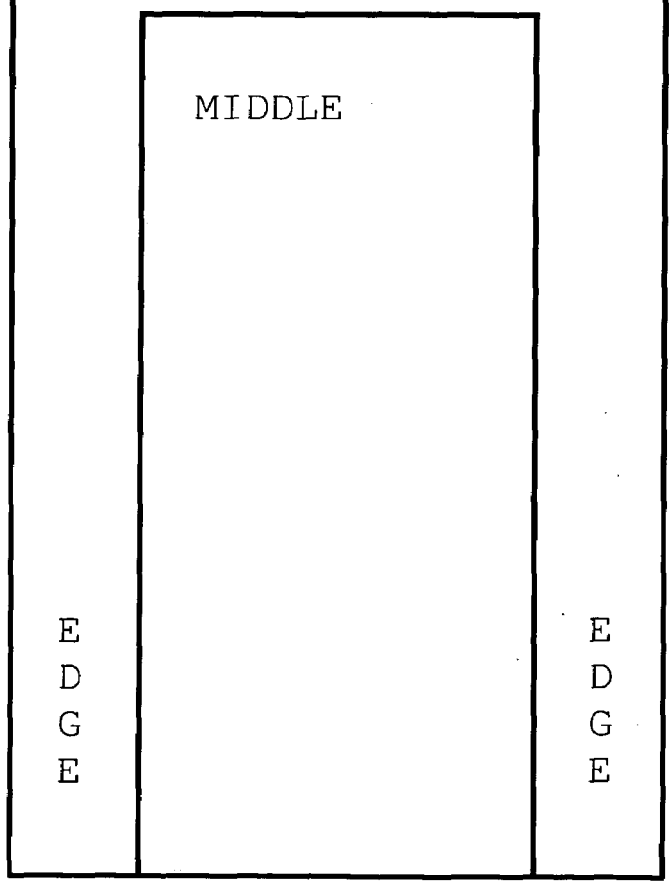
STEP 2 - After landing on BL (shown), you are prepared to hop ½ left to BR as indicated to be done.
LEFT FACE — MIDDLE — RIGHT FACE
EDGE — EDGE
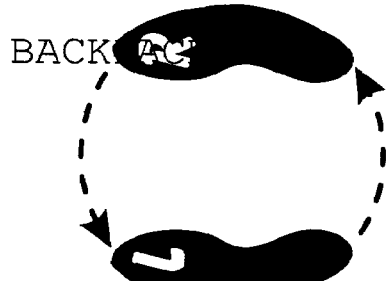
BACK
FIGURE 7.A-02

FRONT FACE
**\*\*\*BL (in one)/2C-SWITCH-LEFT**, SR1 (in one), LEFT FACE, 2RIGHT, L1 (in one)/SWITCH-LEFT, R1 (in one)/SWITCH-RIGHT
STEP 3 - After landing on BR (shown), you are prepared to continue hopping ½left in a circular motion around back to BL as indicated to be done.
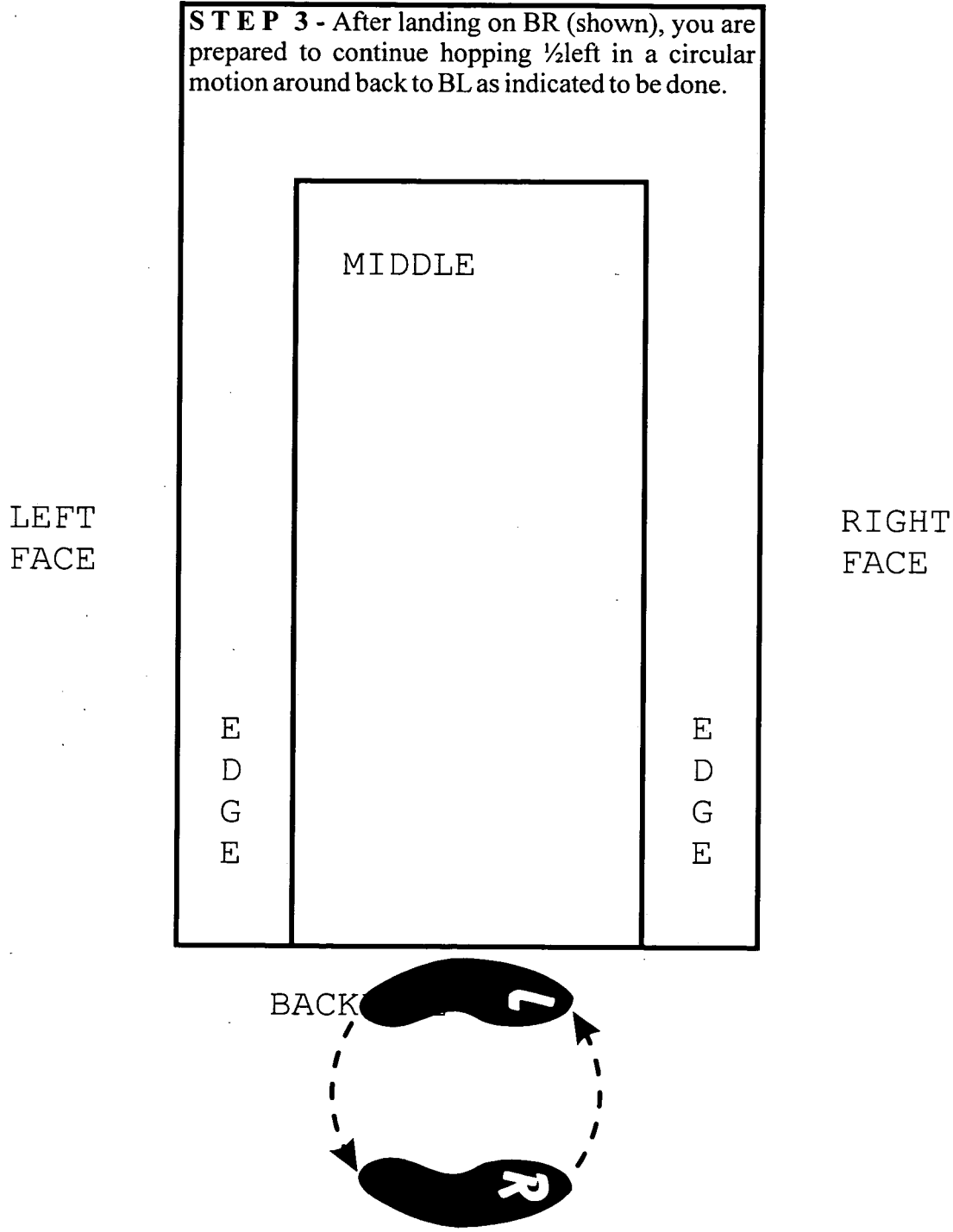
FIGURE 7.A-03

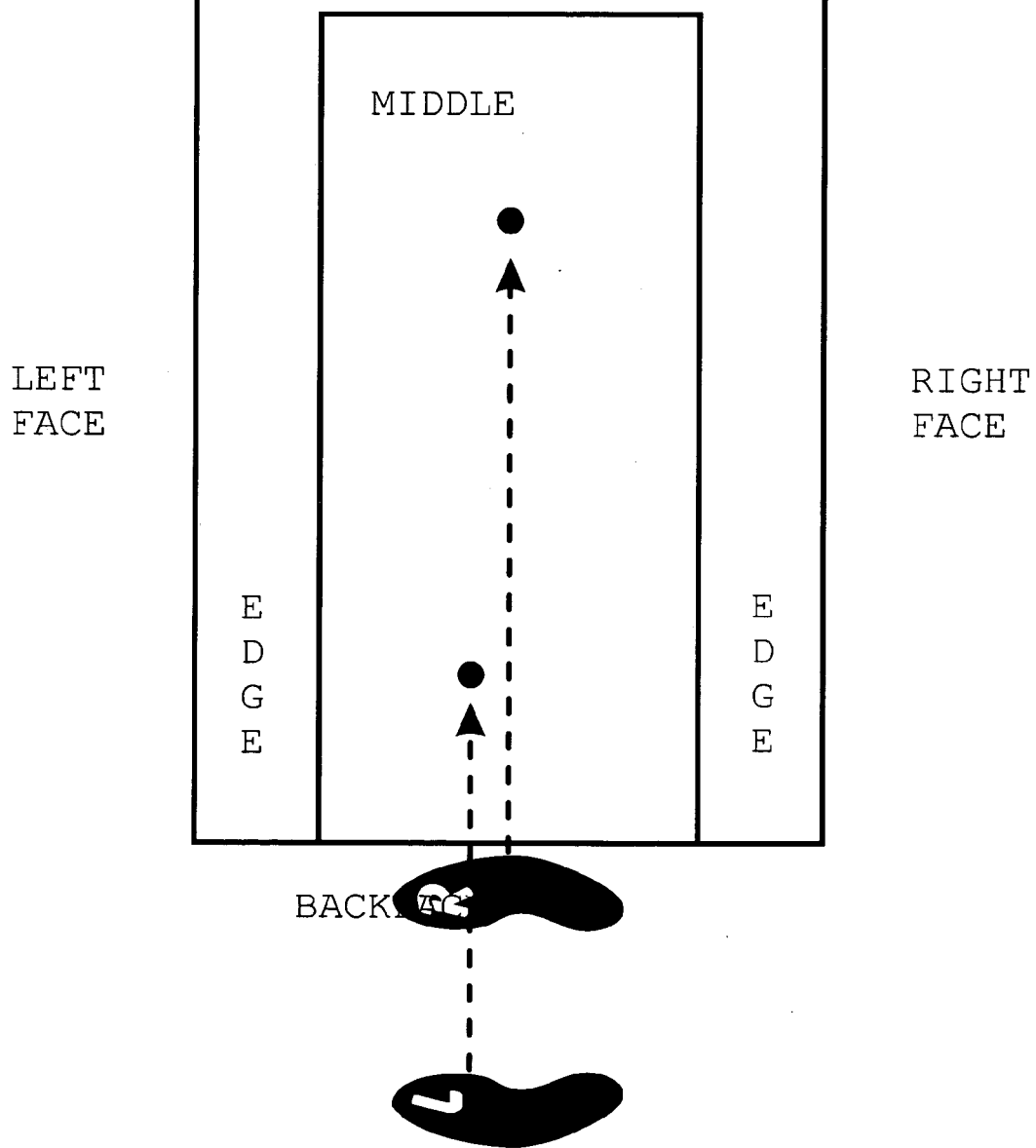
FIGURE 7.A-04

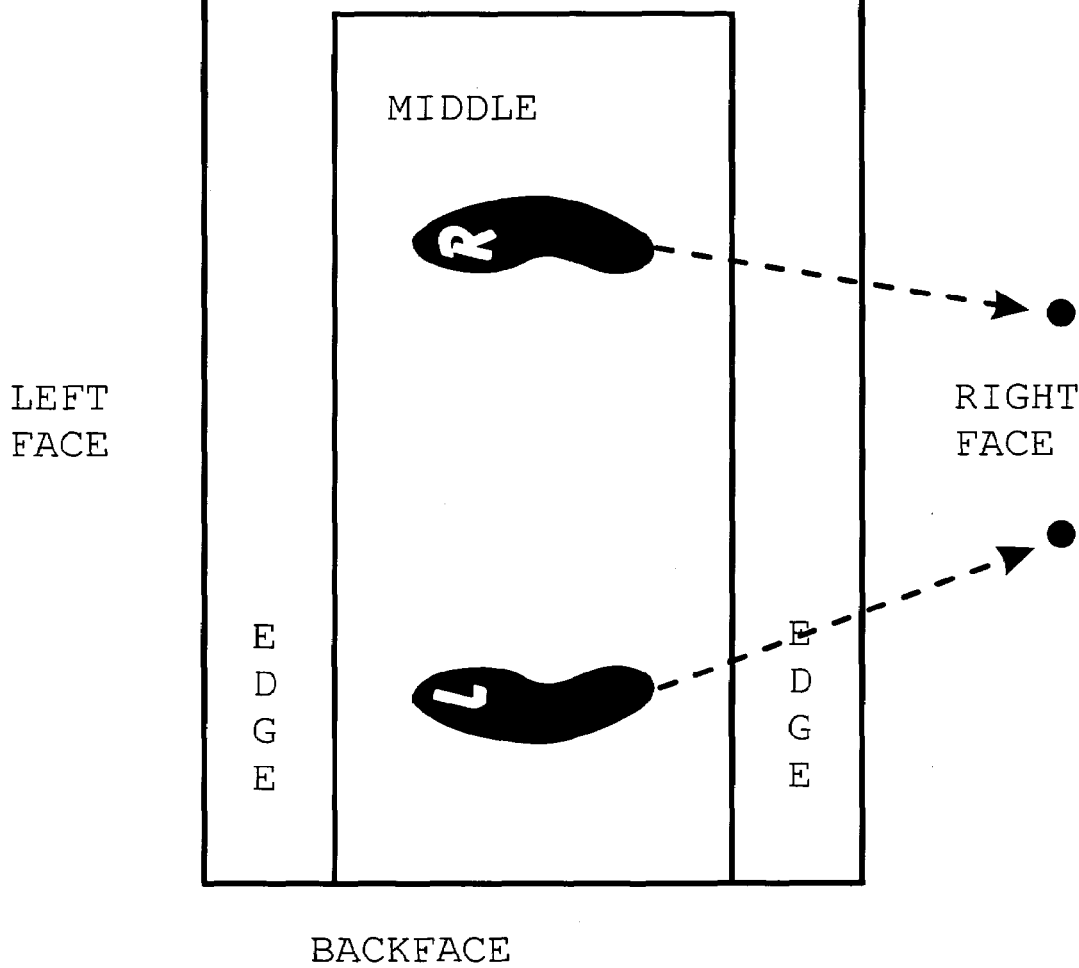
FIGURE 7.A-05

FRONT FACE
***BL (in one)/2C-SWITCH-LEFT, SR1 (in one), LEFT FACE, 2RIGHT, L1 (in one)/SWITCH-LEFT, R1 (in one)/SWITCH-RIGHT STEP 6 - After landing on SR1 (shown), you are prepared to hop back to the MIDDLE in LEFT FACE (in a single MANEUVER) as indicated to be done.

MIDDLE

LEFT FACE

RIGHT FACE

EDGE

EDGE

BACKFACE

FIGURE 7.A-06

***BL (in one)/2C-SWITCH-LEFT, SR1 (in one), LEFT FACE, 2RIGHT, L1 (in one)/SWITCH-LEFT, R1 (in one)/SWITCH-RIGHT
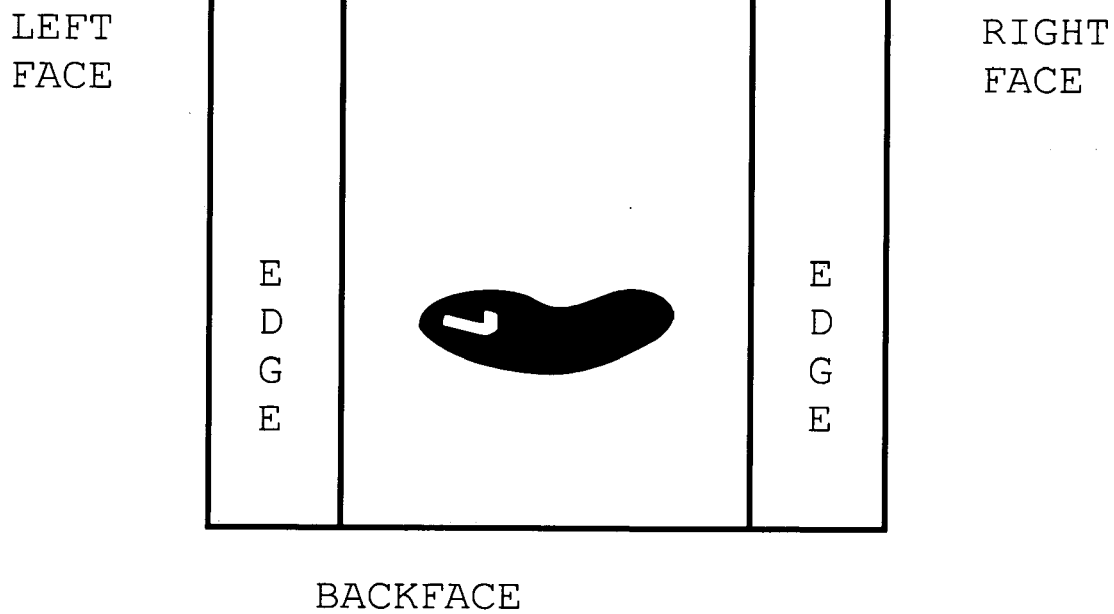
FIGURE 7.A-07

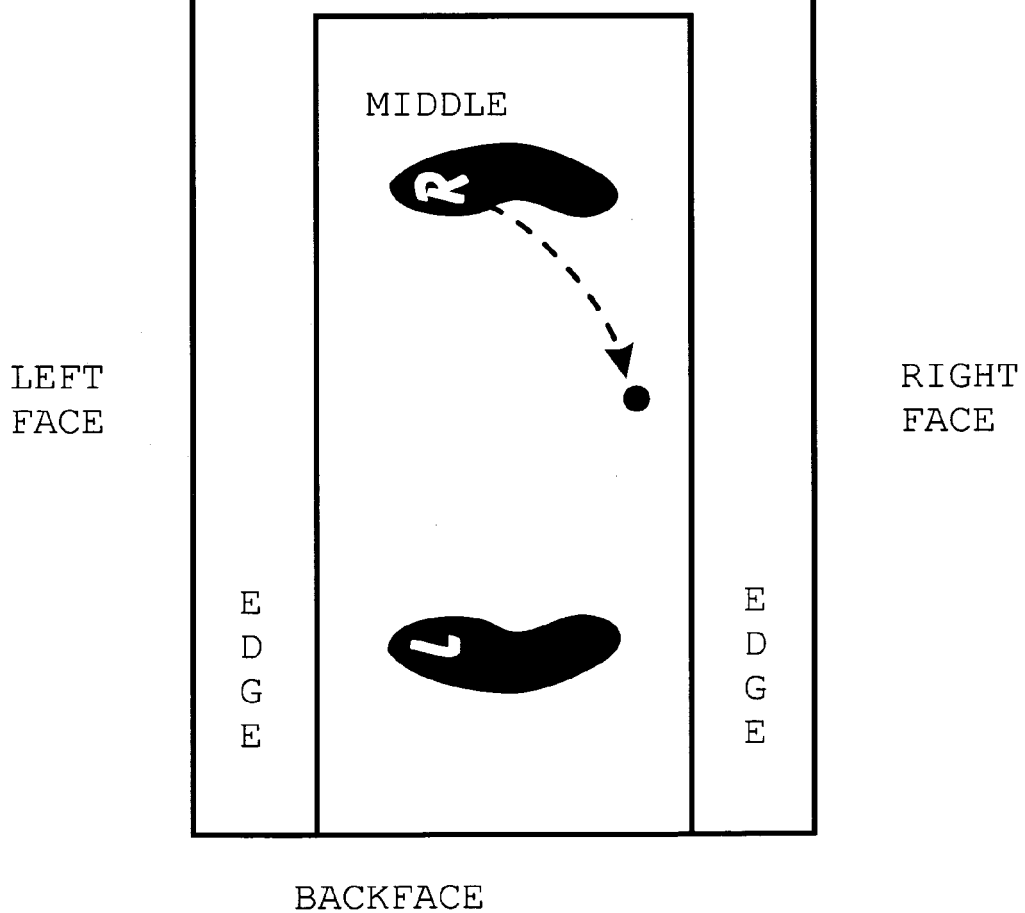
FIGURE 7.A-08

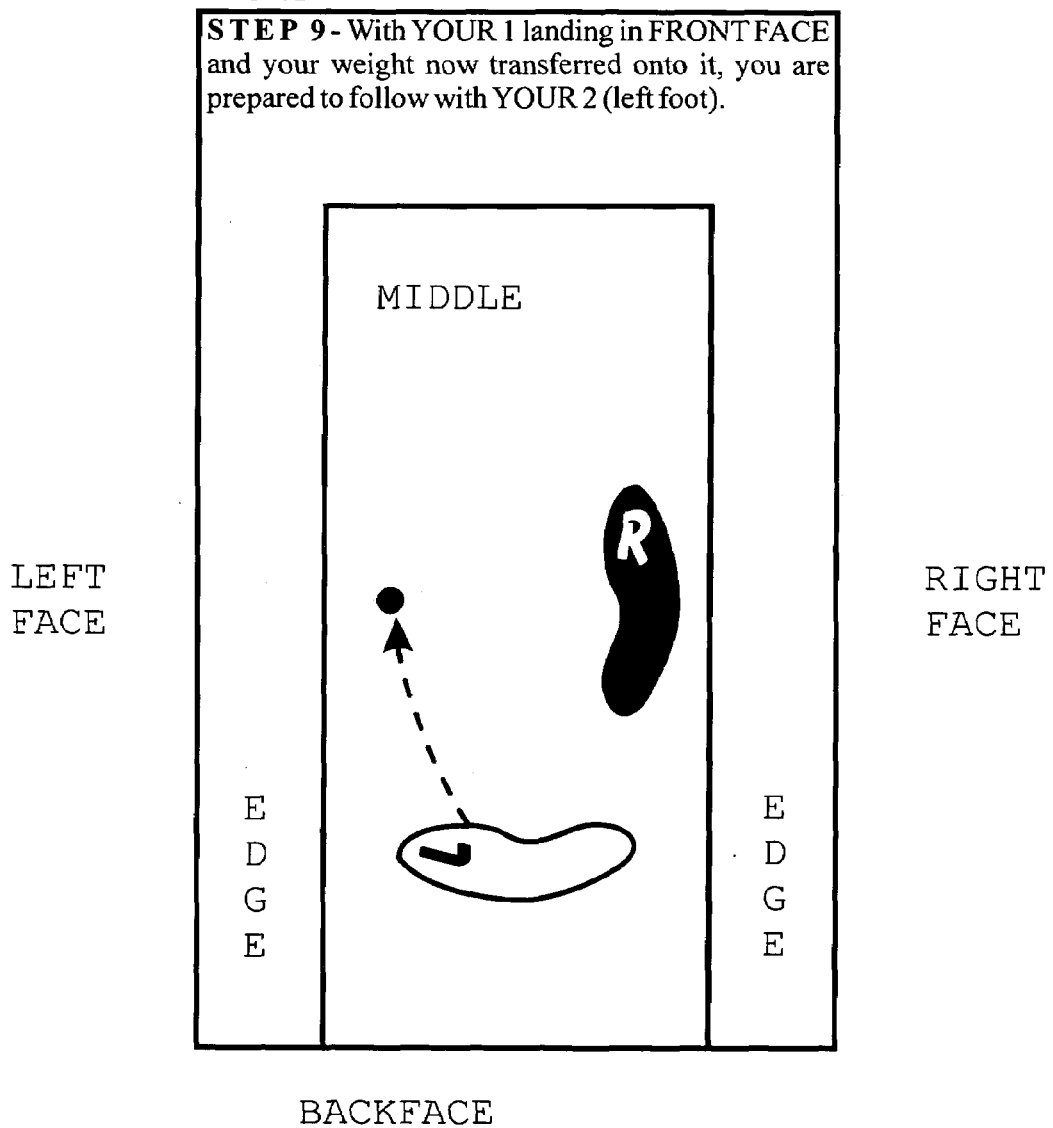
FIGURE 7.A-09

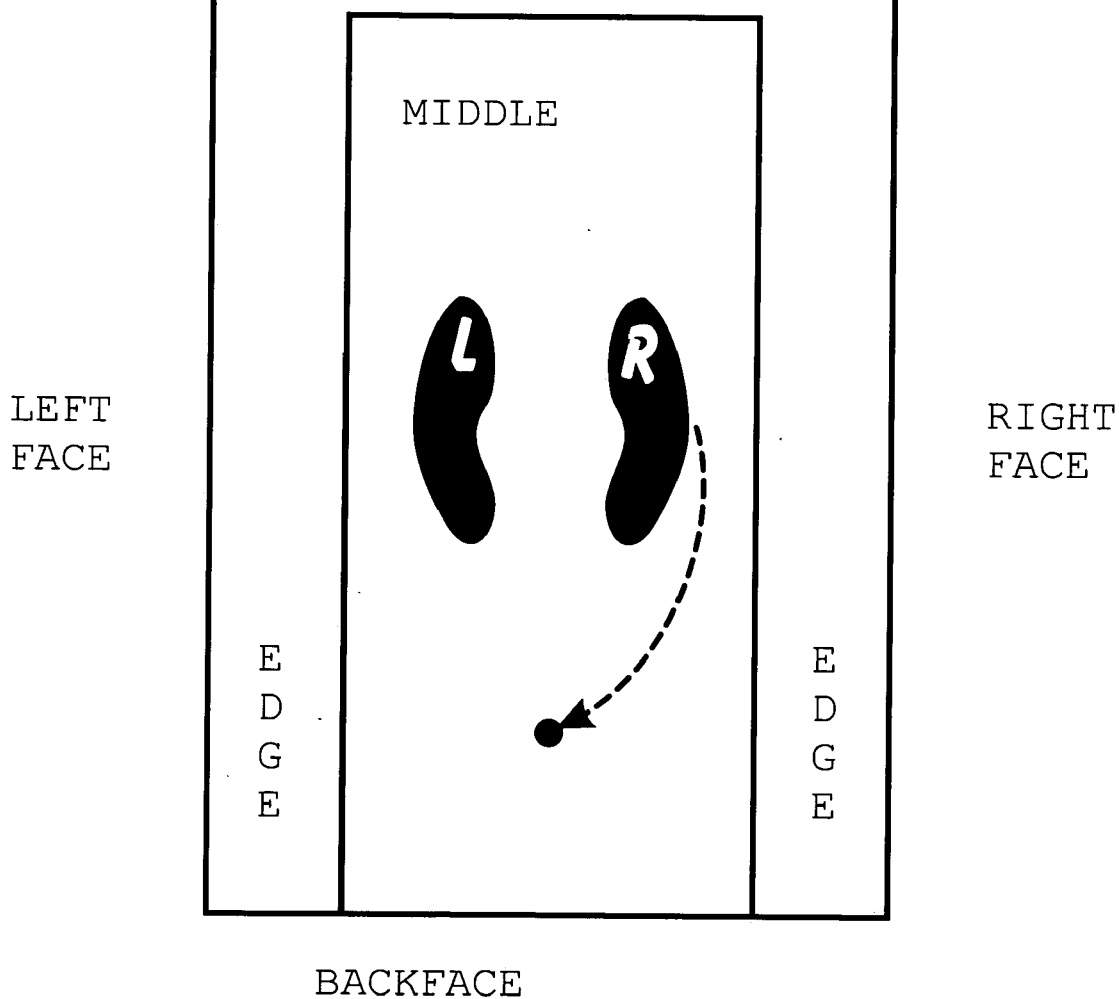
FIGURE 7.A-10

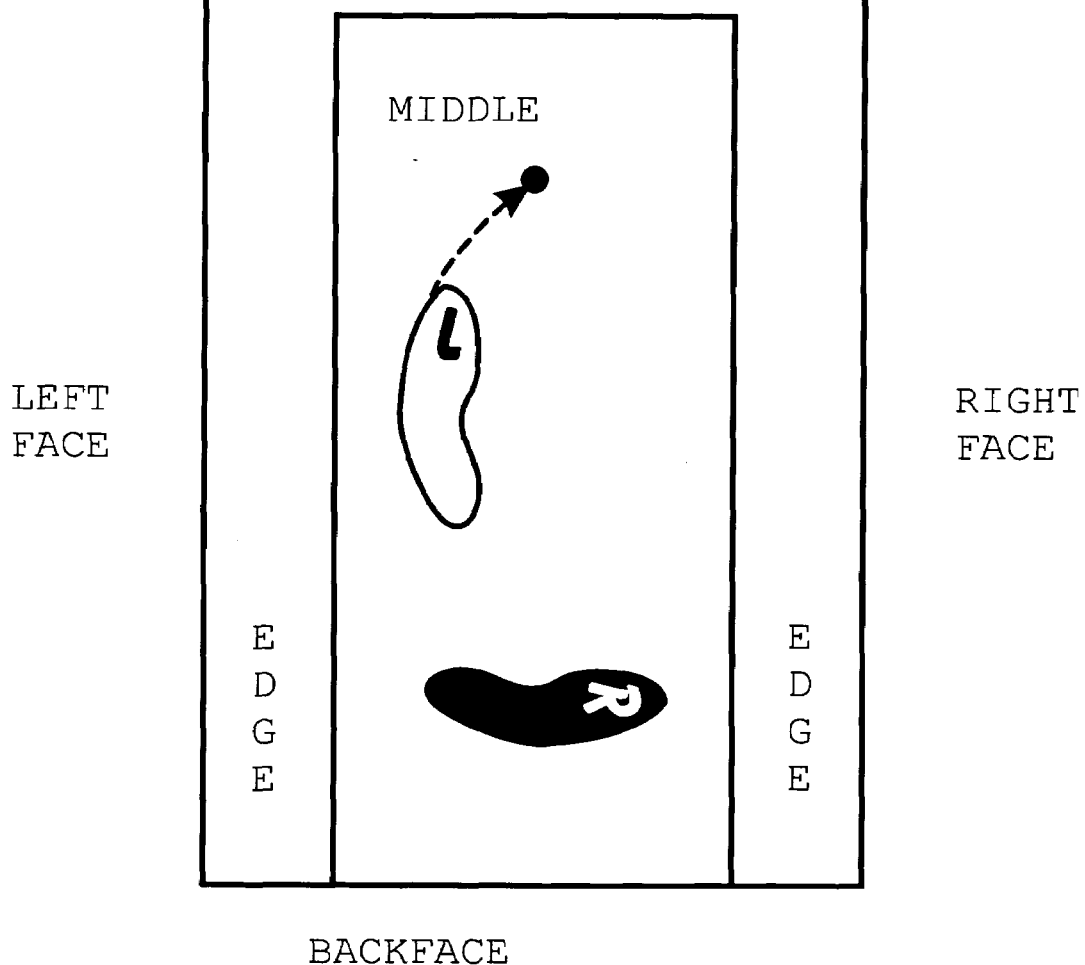
FIGURE 7.A-11

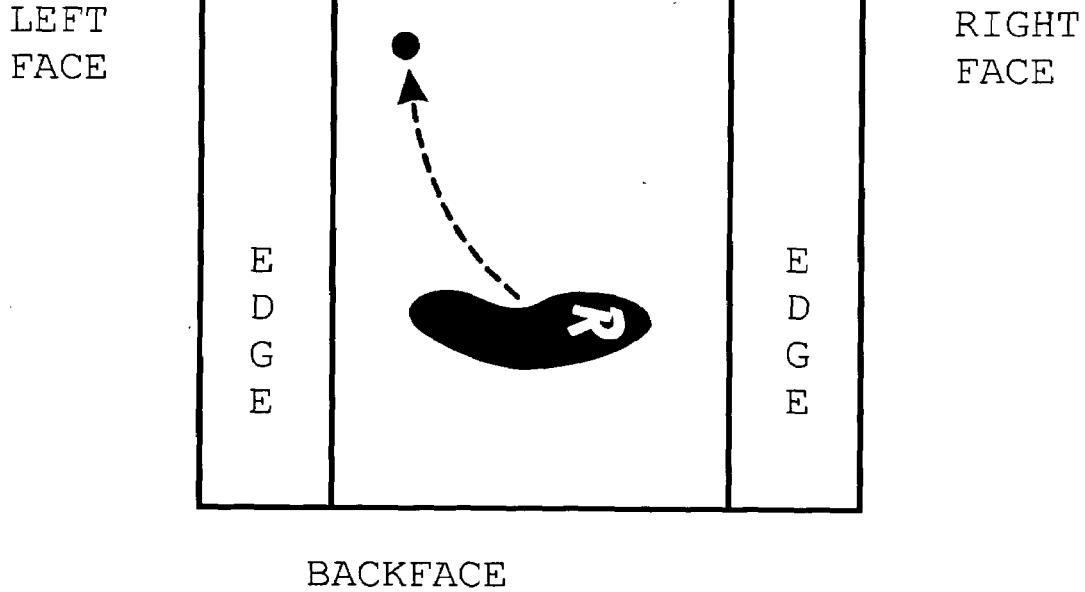
FIGURE 7.A-12

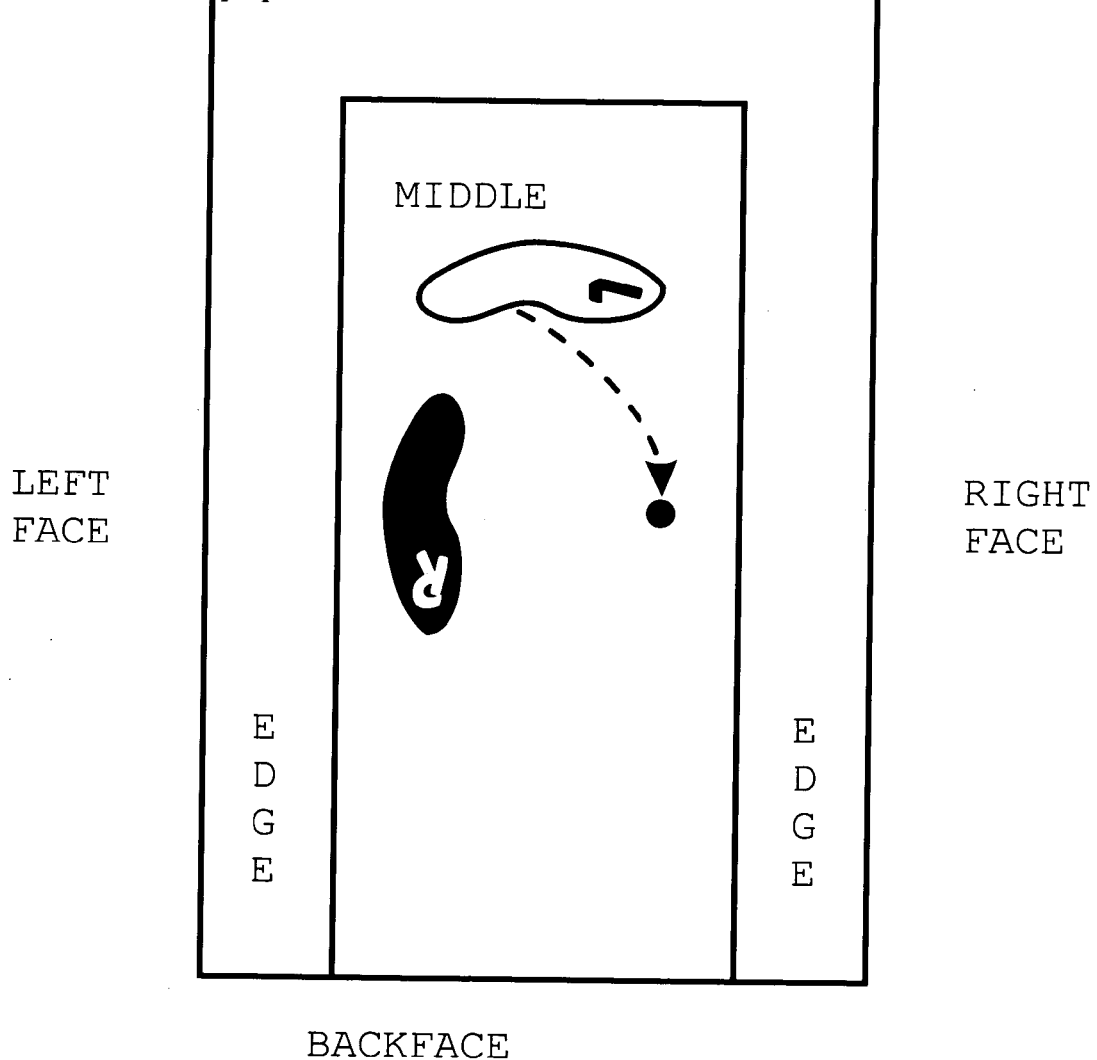
FIGURE 7.A-13

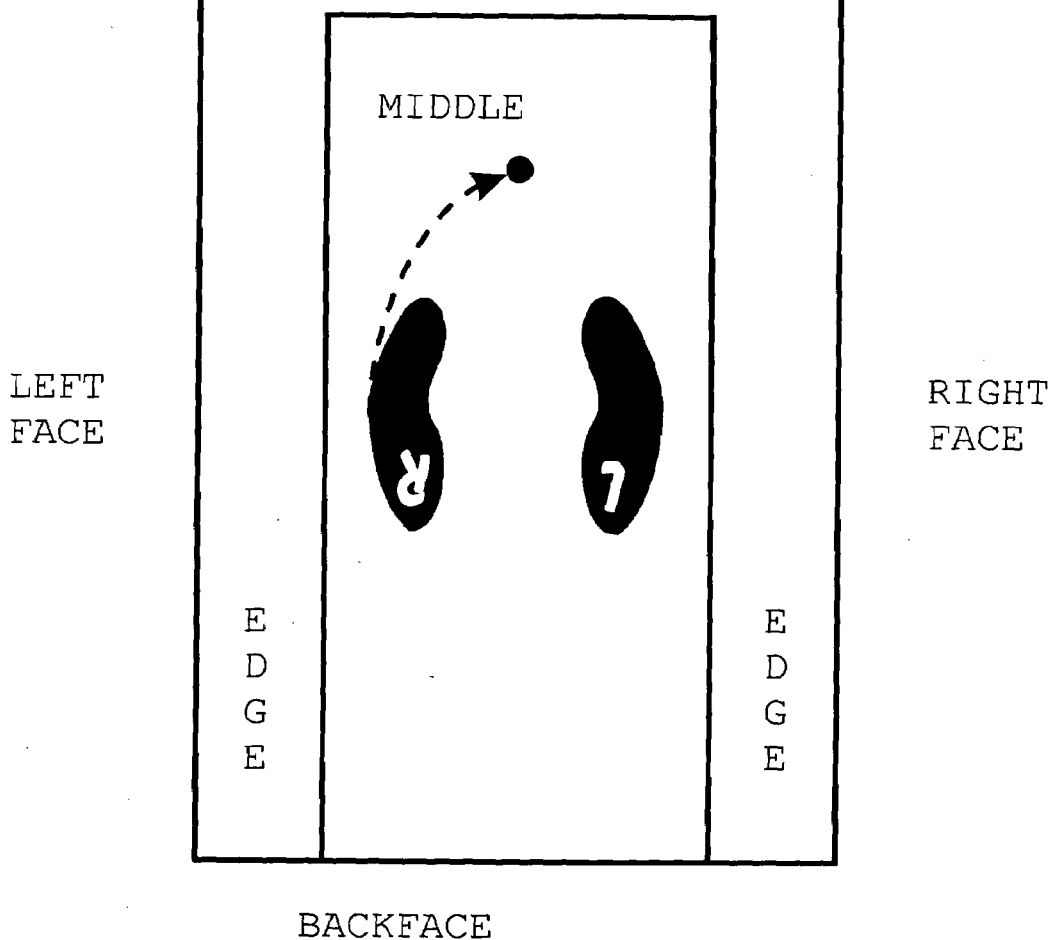
FIGURE 7.A-14

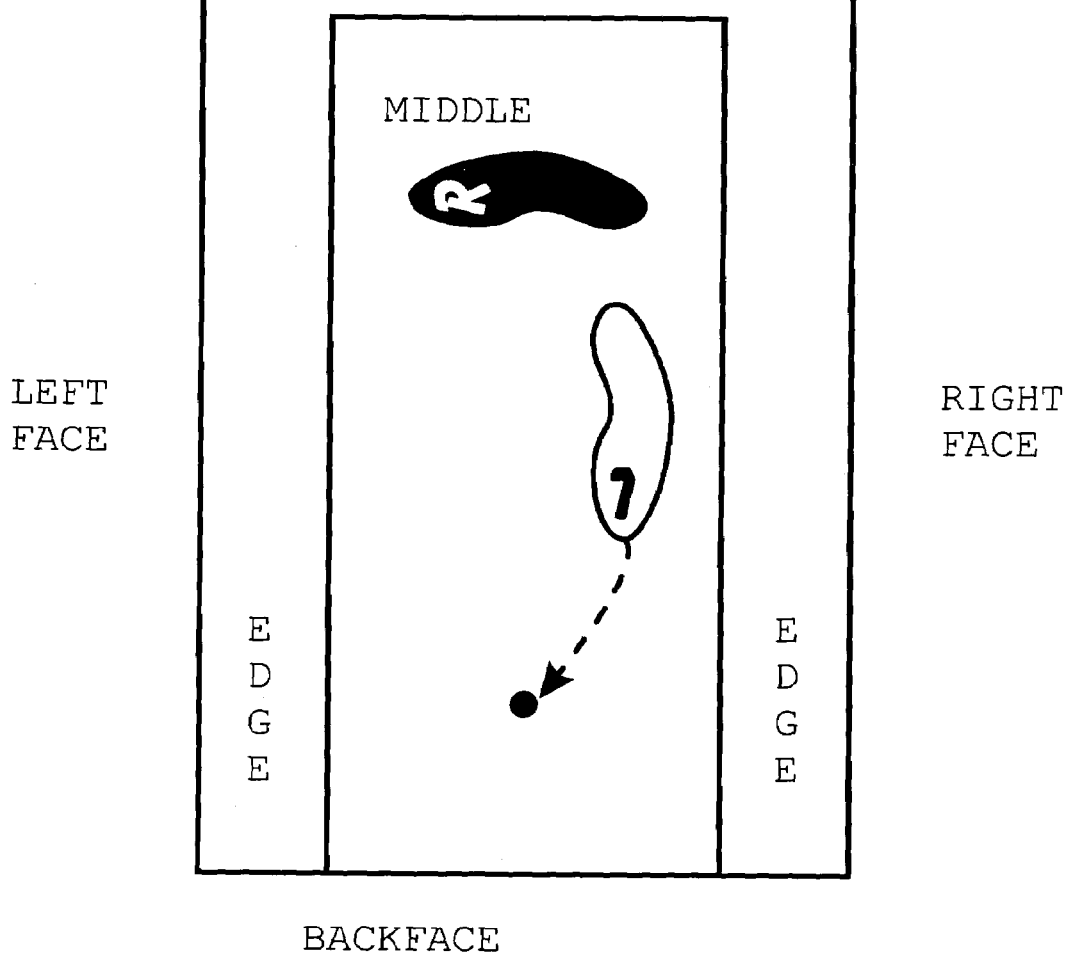
FIGURE 7.A-15

FRONT FACE

***BL (in one)/2C-SWITCH-LEFT, SR1 (in one), LEFT FACE, 2RIGHT, L1 (in one)/SWITCH-LEFT, R1 (in one)/SWITCH-RIGHT STEP 16 - LEFT FACE on the MIDDLE is secured by also landing YOUR 2 in LEFT FACE alongside YOUR 1 (shown); to complete 2RIGHT, repeat STEPS 9 16 one more time for 2 full right turns. To continue with L1 (in one)/SWITCH-LEFT, LEFT FACE on the MIDDLE to L1 (in a single MANEUVER) with a rapid-fire semi-circular ½left (in one) turn to L2 immediately after landing on it is executed by hopping clockwise left to L1 (the location) as indicated to be done.

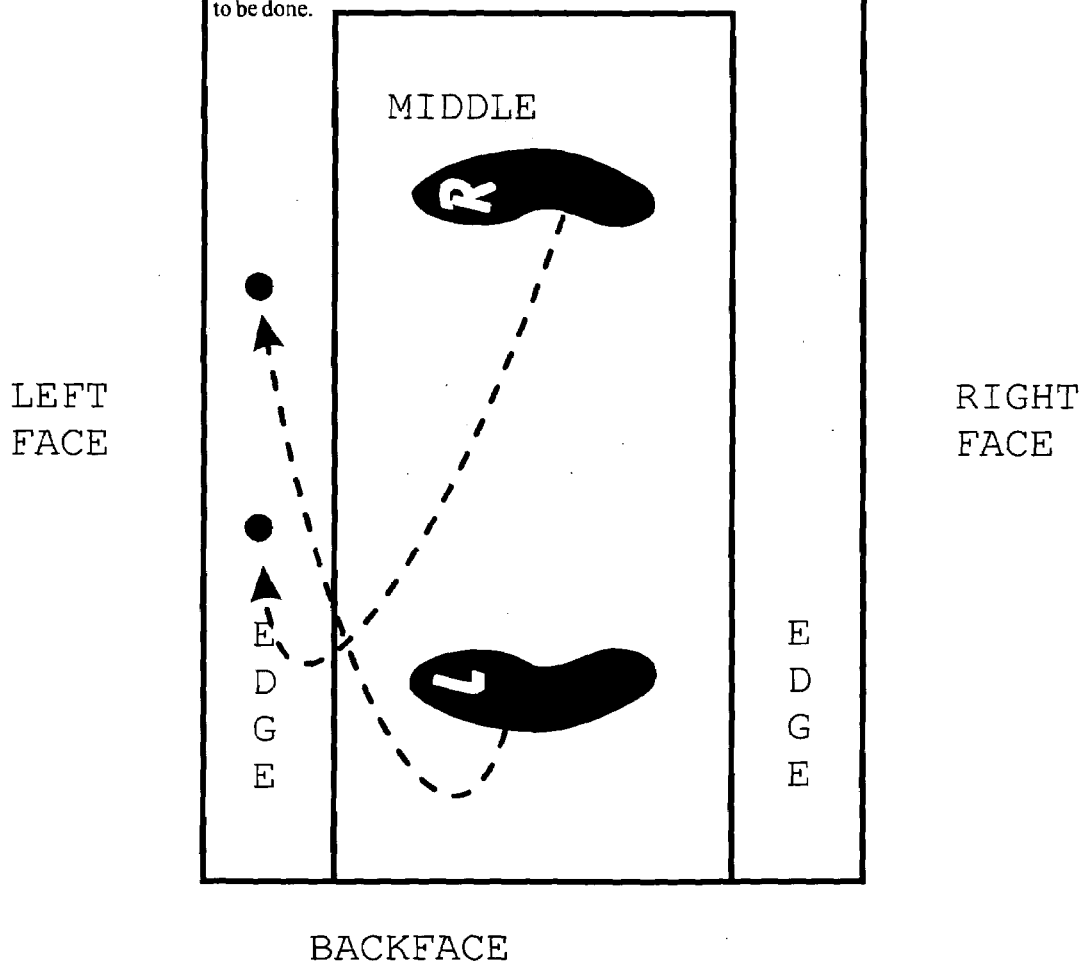

LEFT FACE

RIGHT FACE

BACKFACE

FIGURE 7.A-16

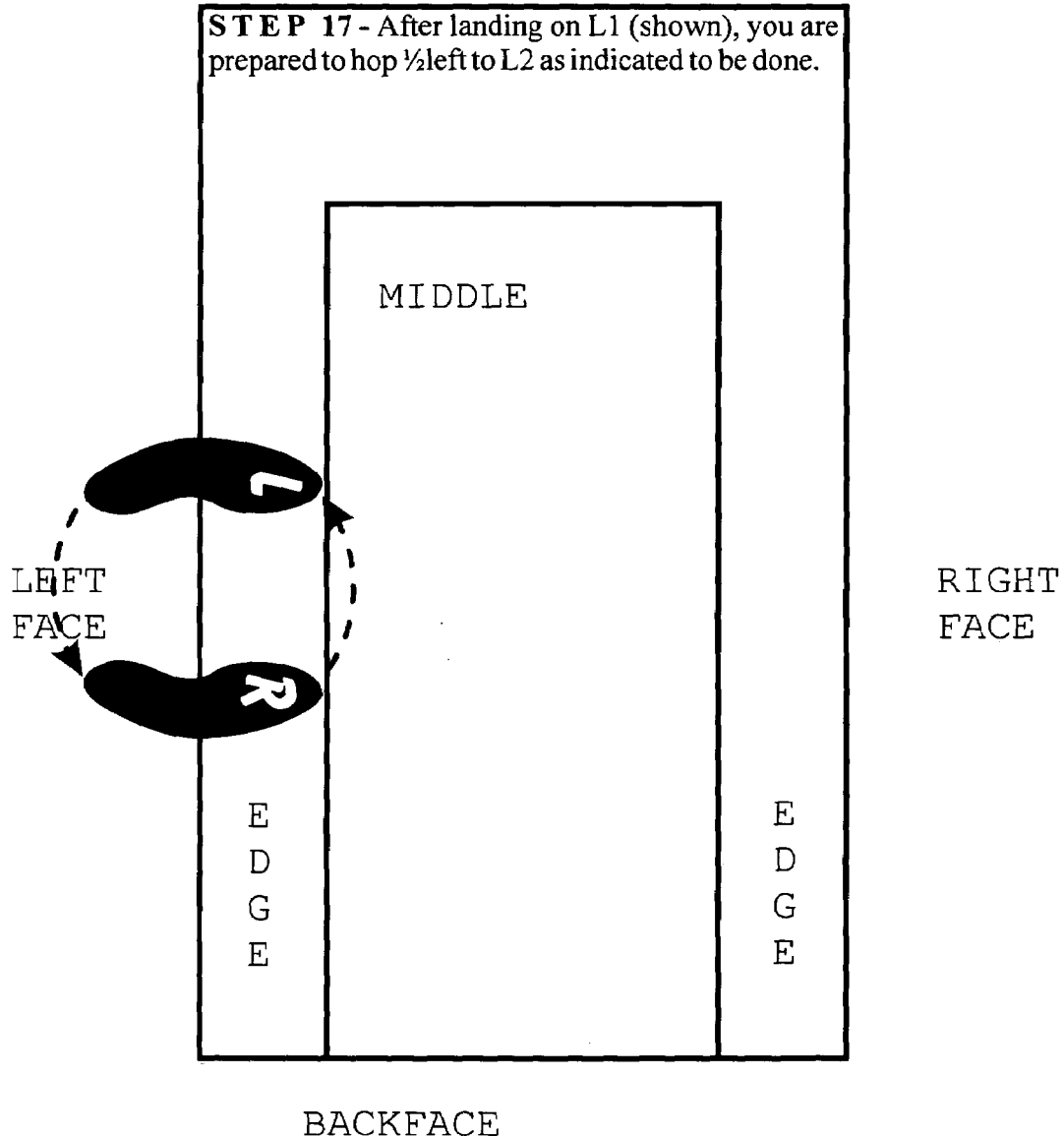
FIGURE 7.A-17

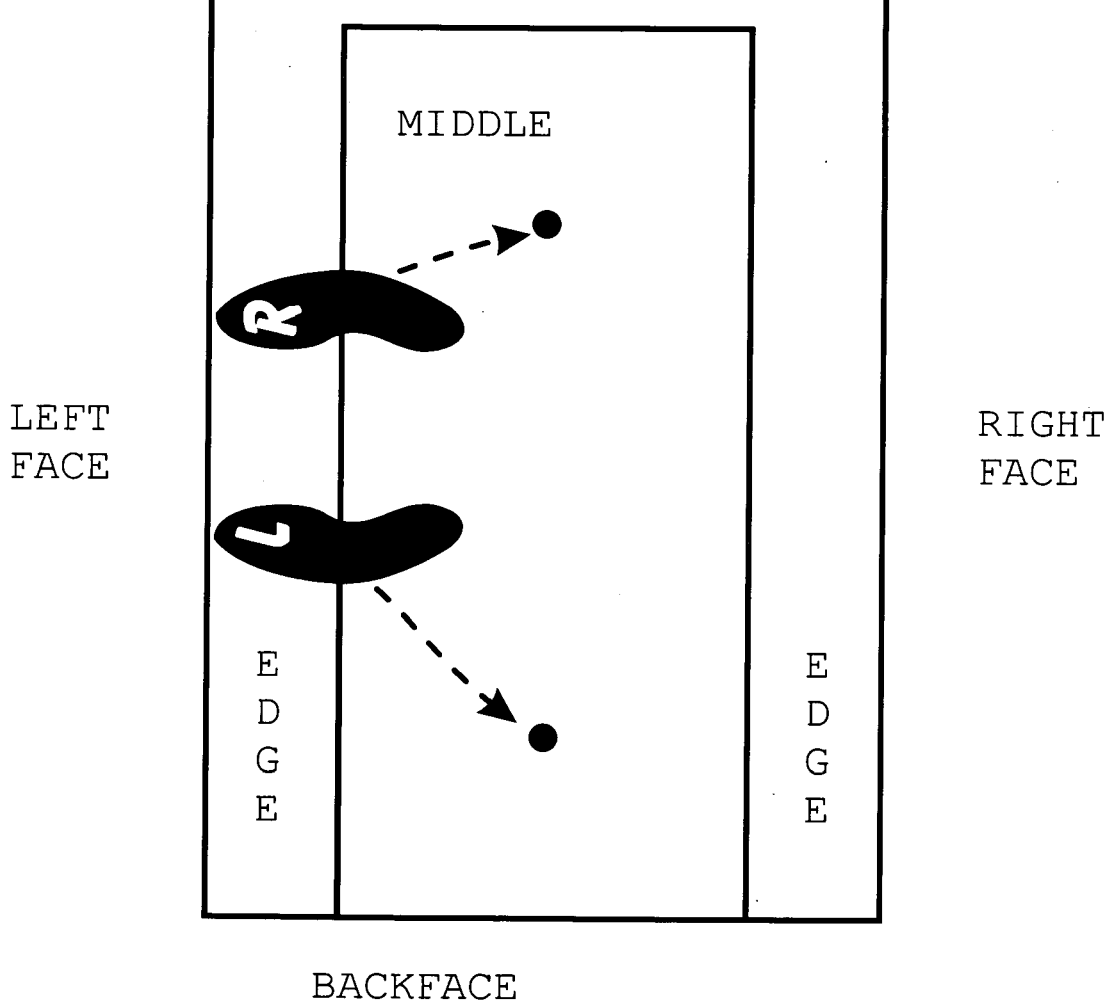
FIGURE 7.A-18

FRONT FACE
***BL (in one)/2C-SWITCH-LEFT, SR1 (in one), LEFT FACE, 2RIGHT, L1 (in one)/SWITCH-LEFT, R1 (in one)/SWITCH-RIGHT
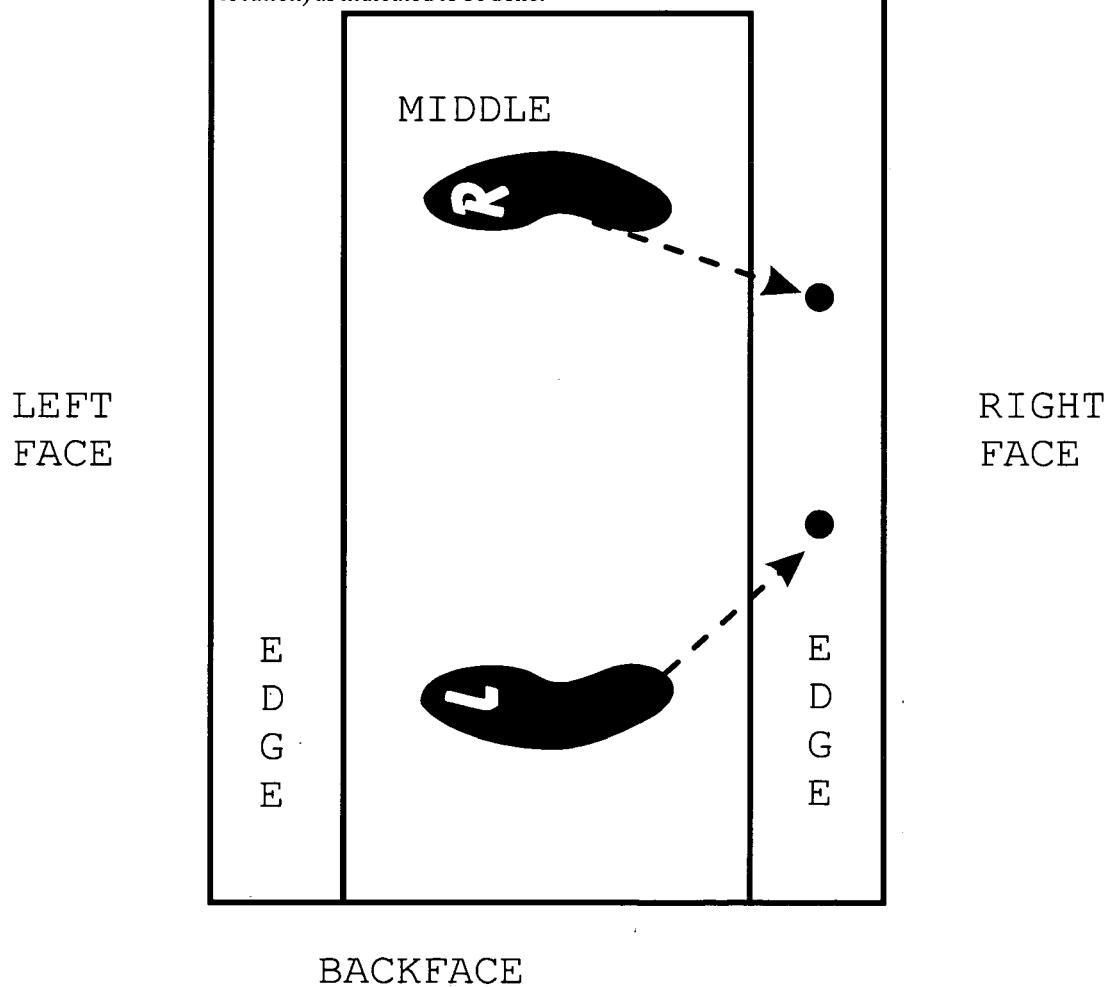
FIGURE 7.A-19

FRONT FACE
***BL (in one)/2C-SWITCH-LEFT, SR1 (in one), LEFT FACE, 2RIGHT, L1 (in one)/SWITCH-LEFT, <u>R1 (in one)/SWITCH-RIGHT</u>
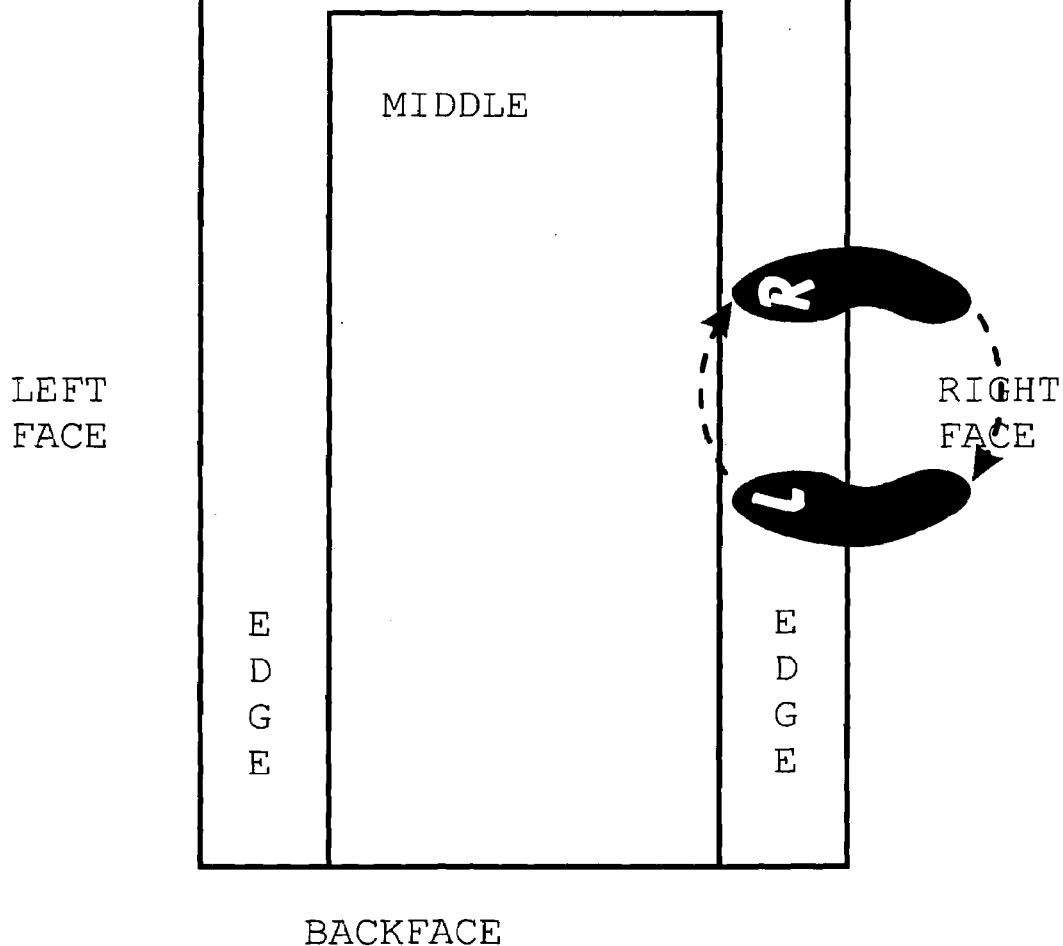
STEP 20 - After landing on R1 (shown), you are prepared to hop ½right to R2 as indicated to be done.
BACKFACE
FIGURE 7.A-20

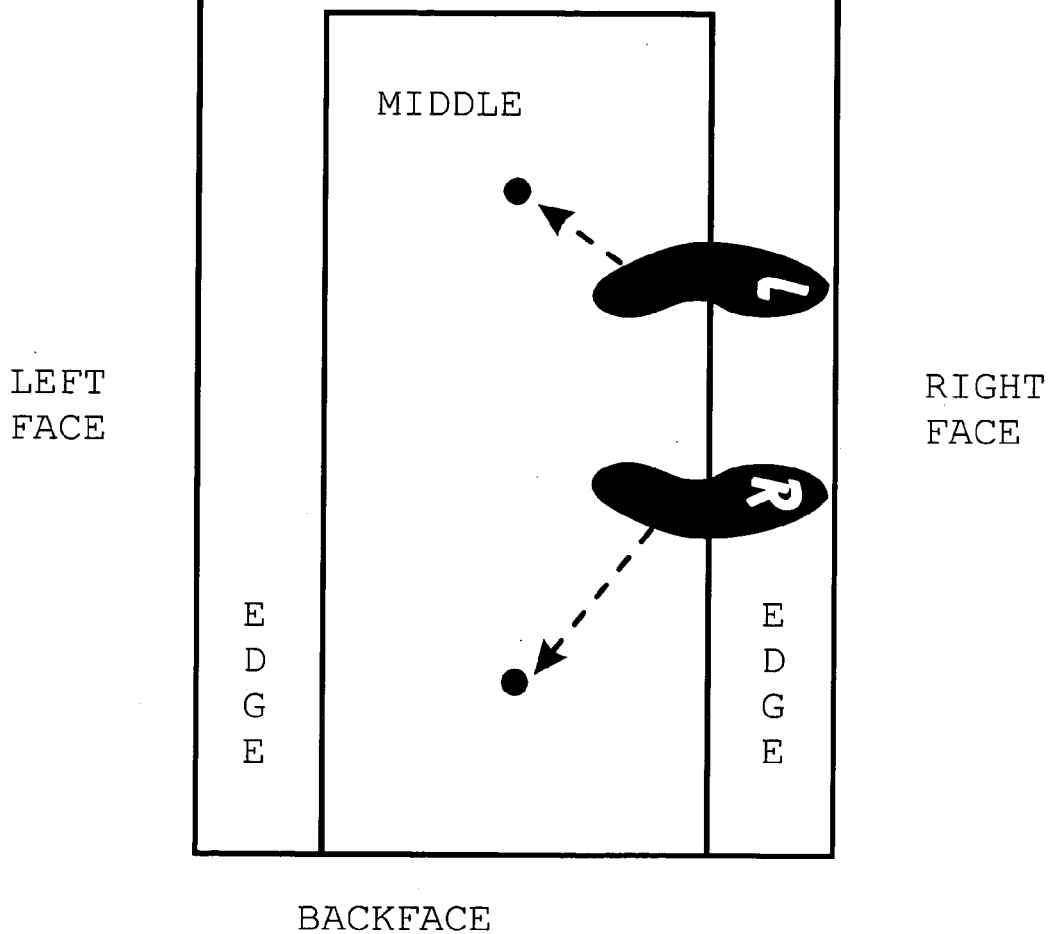
FIGURE 7.A-21

FRONT FACE
***BL (in one)/2C-SWITCH-LEFT, SR1 (in one), LEFT FACE, 2RIGHT, L1 (in one)/SWITCH-LEFT, <u>R1 (in one)/SWITCH-RIGHT</u>
STEP 22 - RIGHT FACE is secured by landing on the MIDDLE in RIGHT FACE (shown) completing <u>R1 (in one)/SWITCH-RIGHT</u>, and the entire series of MANEUVERS...                "!"
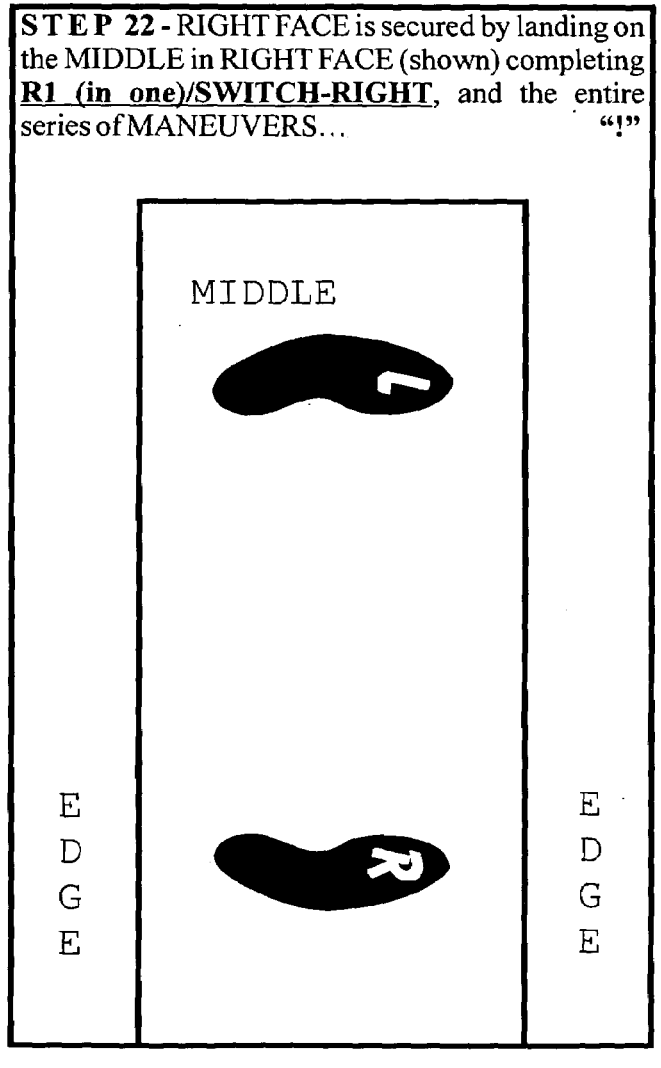
LEFT FACE
RIGHT FACE
EDGE
EDGE
BACKFACE
FIGURE 7.A-22

DIAGRAMS 7.B- SERIES OF MANEUVERS(B)

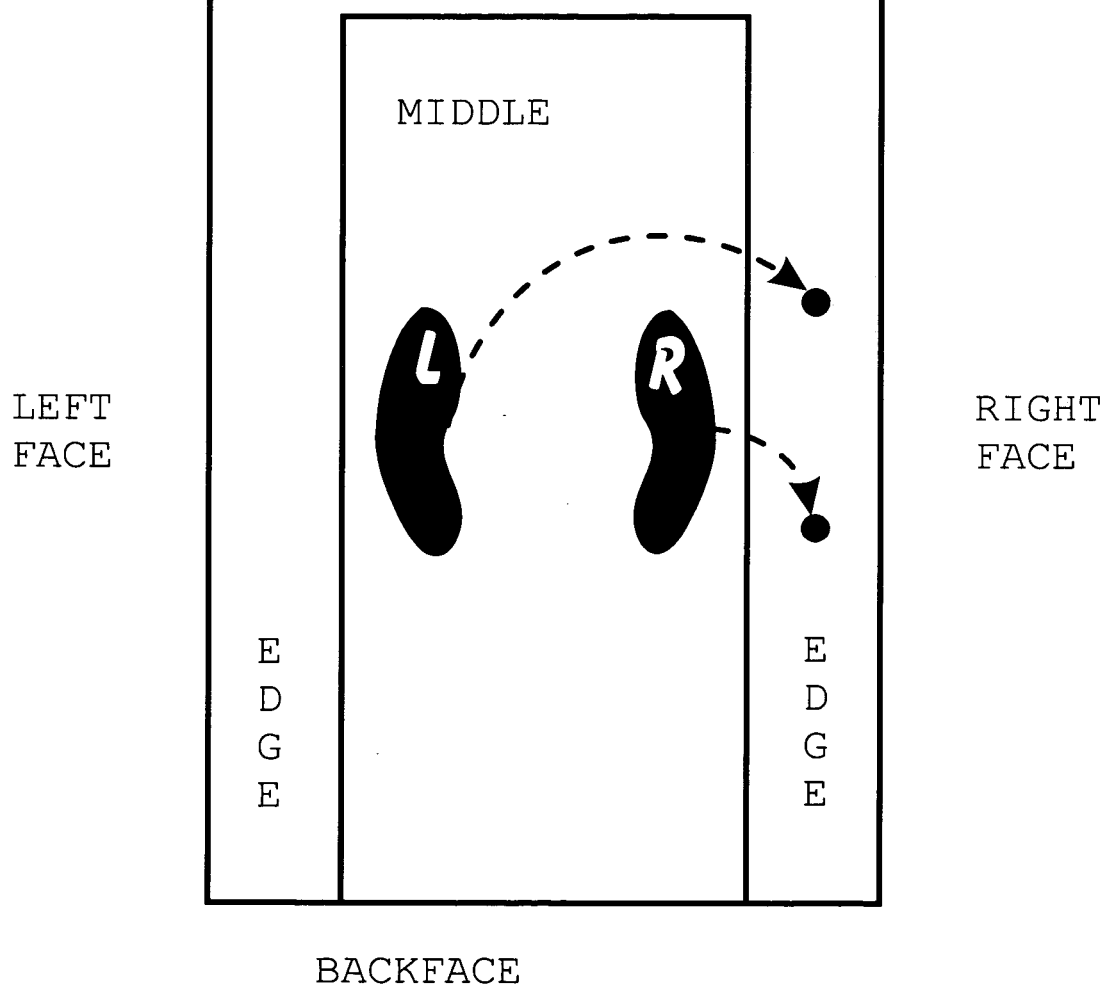
FIGURE 7.B-01

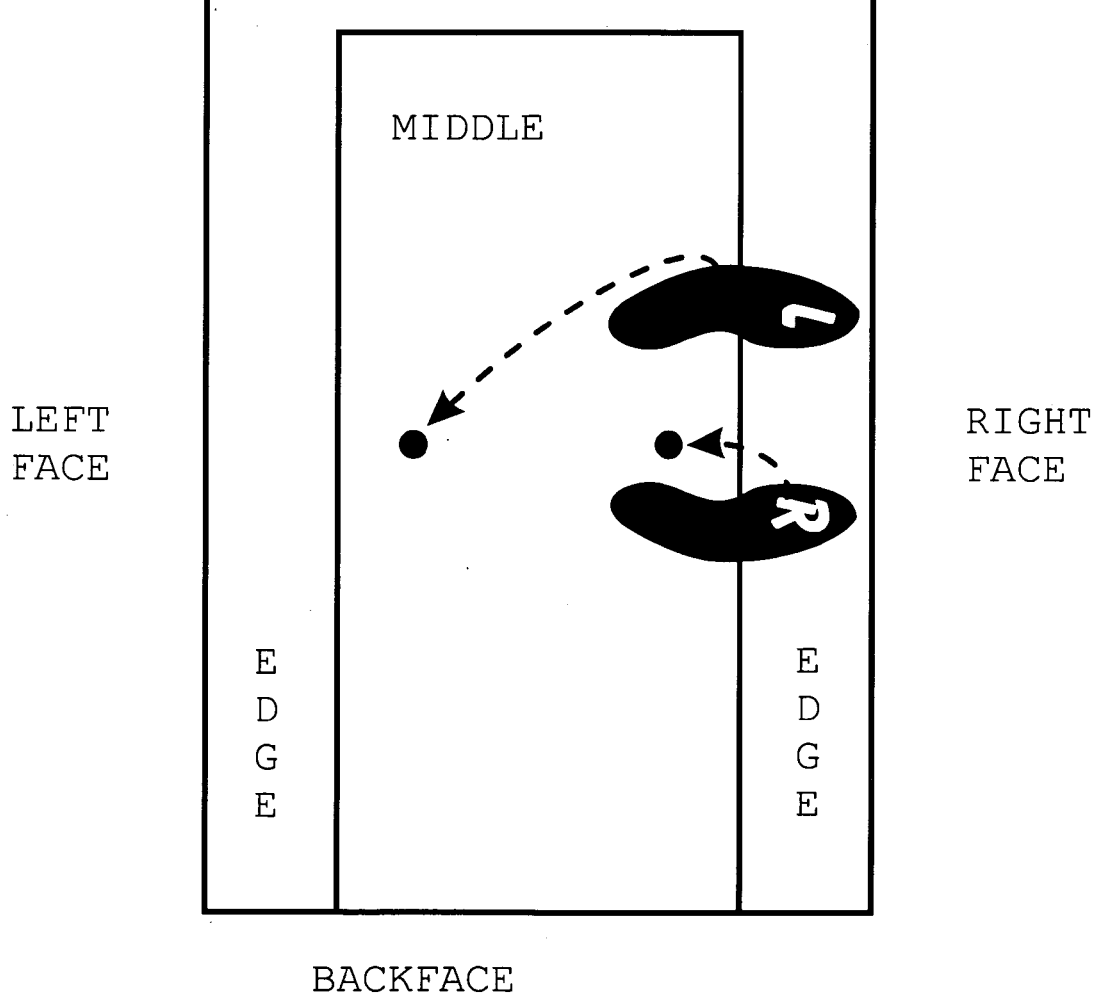
FIGURE 7.B-02

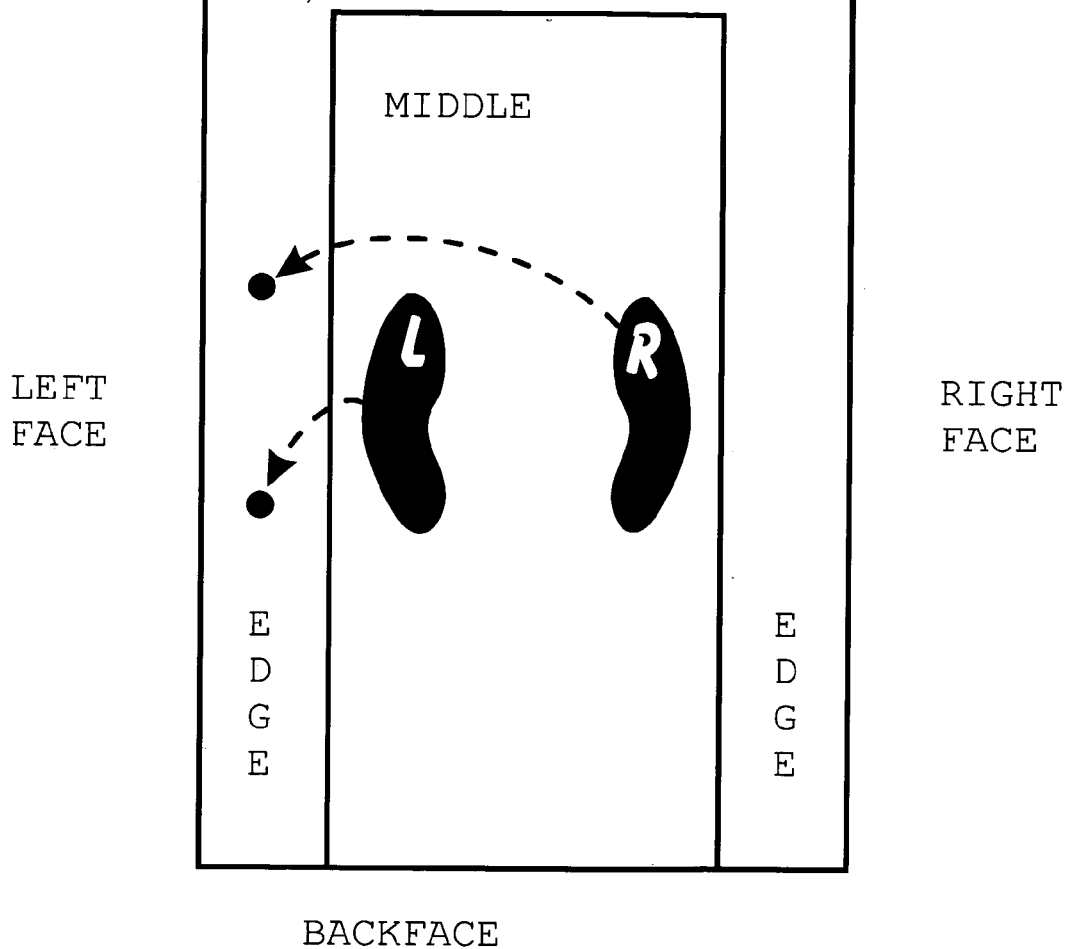
FIGURE 7.B-03

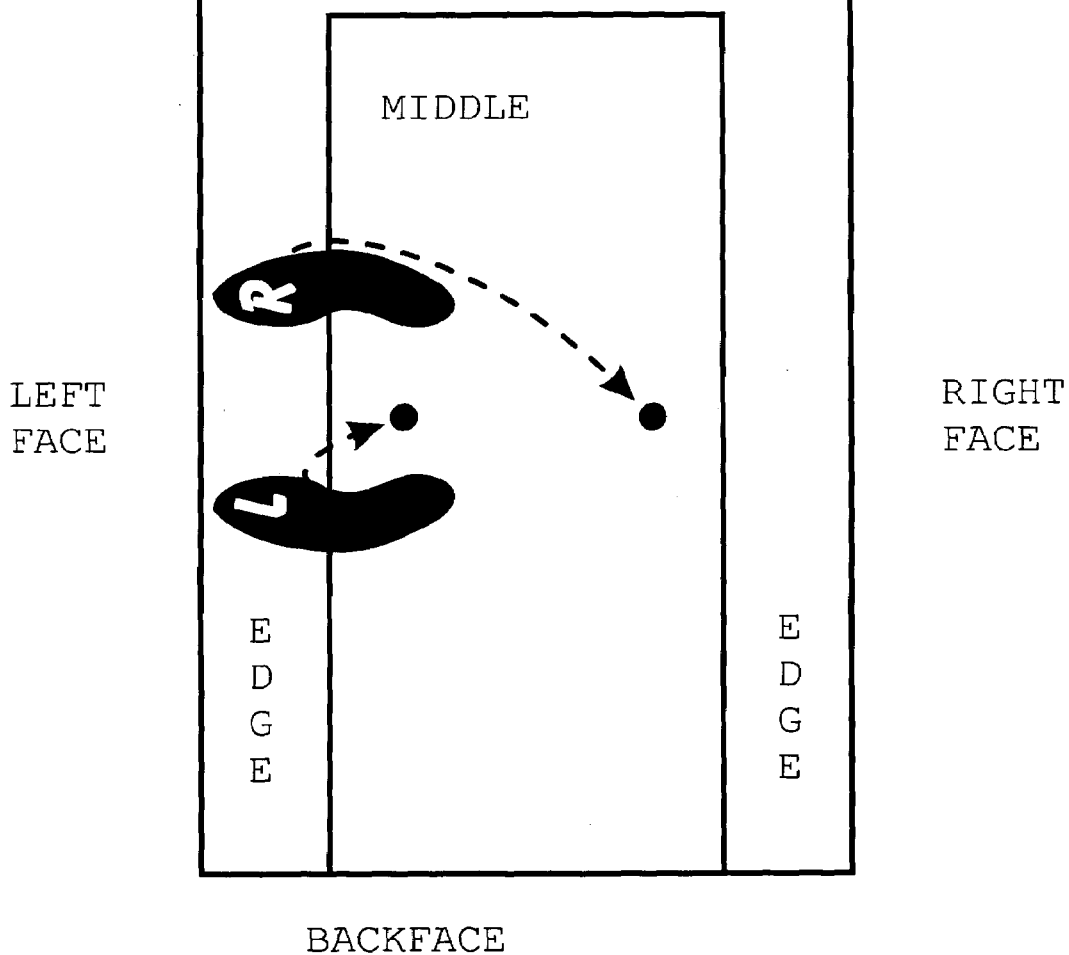
FIGURE 7.B-04

FRONT FACE
R2 (in one), <u>L2 (in one)</u>, R2 (in one)/SWITCH-RIGHT, L2/ 2C-SWITCH-LEFT, LEFT FACE, 2LEFT to FRONT FACE/2SWITCH-LEFT STEP 5 - FRONT FACE is secured by landing on the MIDDLE in FRONT FACE (shown) completing <u>L2 (in one)</u>. To continue with <u>R2 (in one)/SWITCH-RIGHT</u>, FRONT FACE on the MIDDLE to R2 (in a single MANEUVER) with a rapid-fire <u>semicircular</u> ½right (in one) turn to R1 immediately after landing on it is executed by hopping clockwise right to R2 (the location) as indicated to be done.

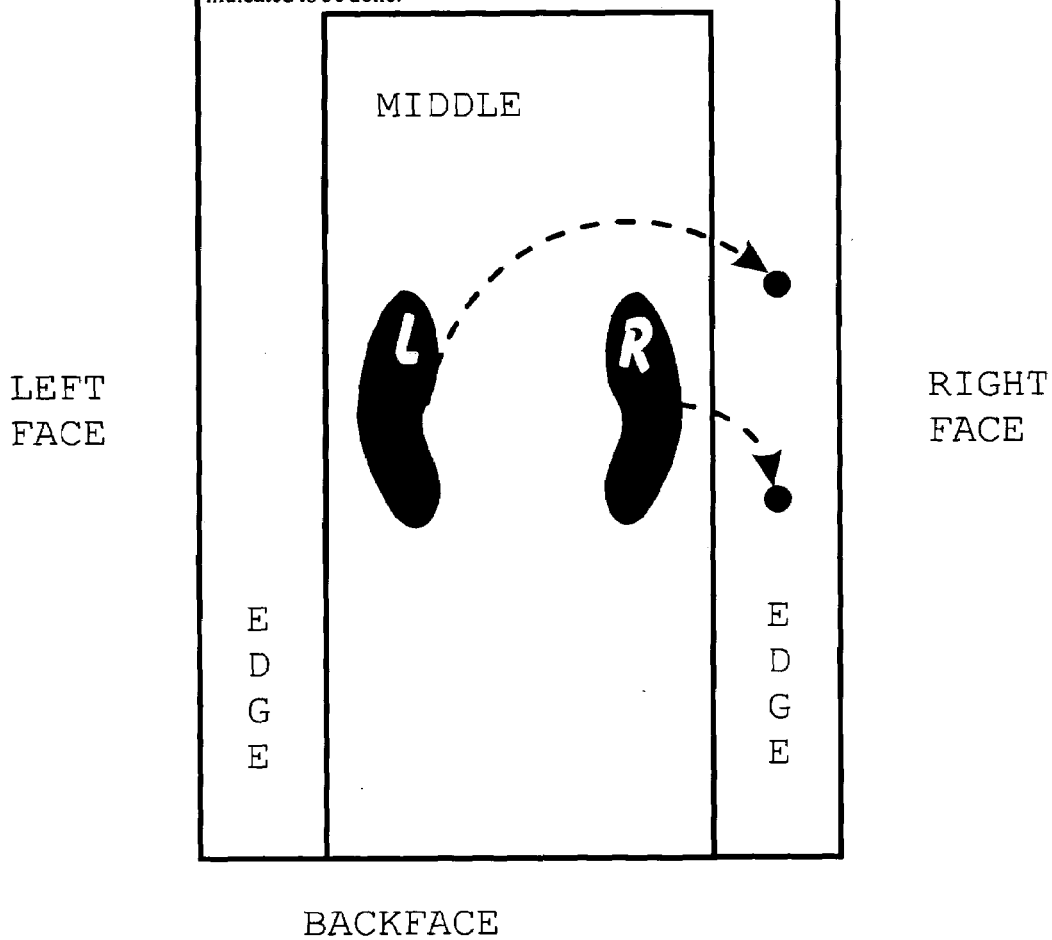

FIGURE 7.B-05

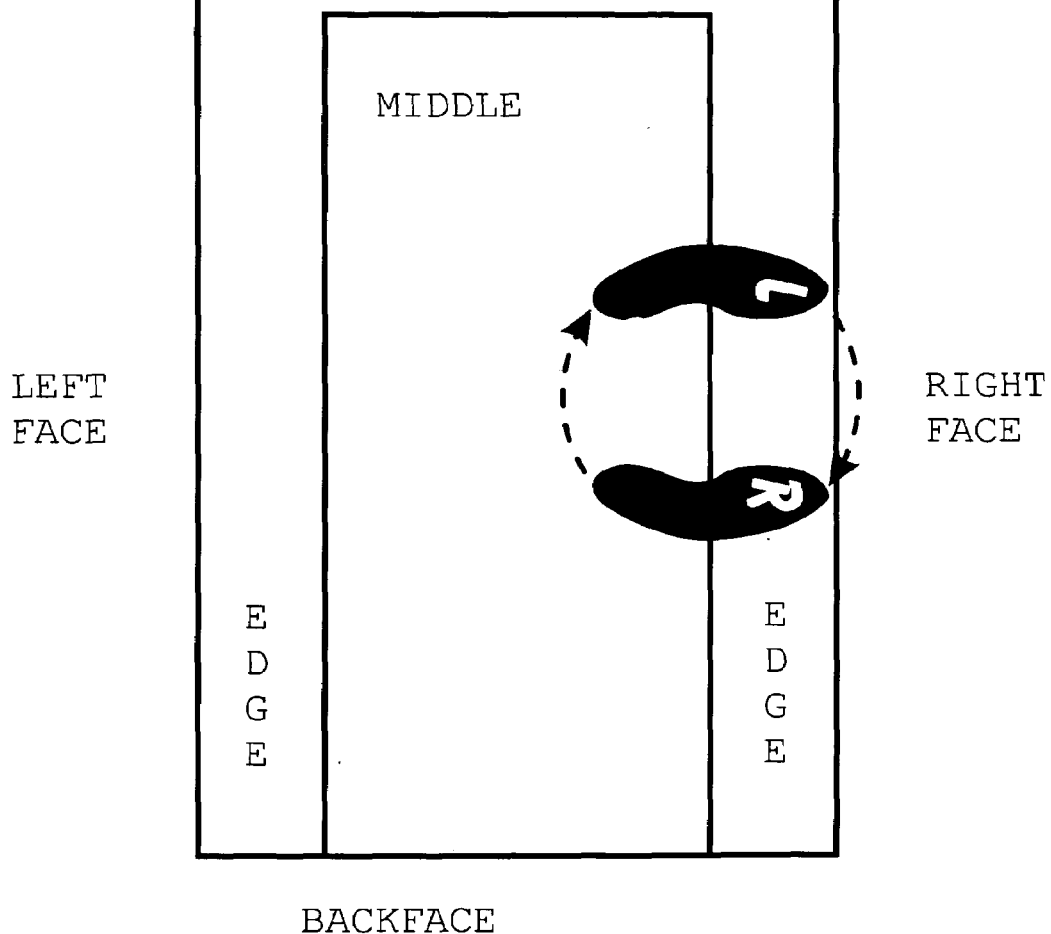
FIGURE 7.B-06

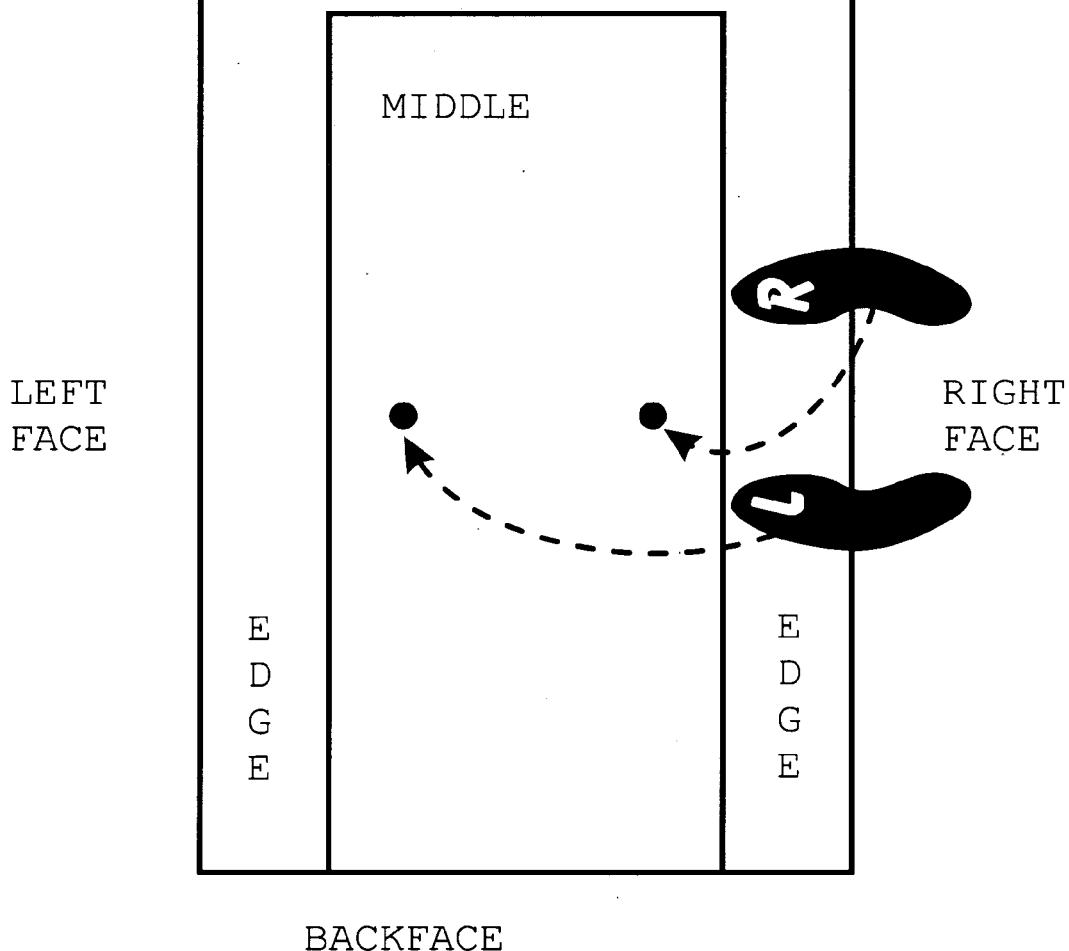
FIGURE 7.B-07

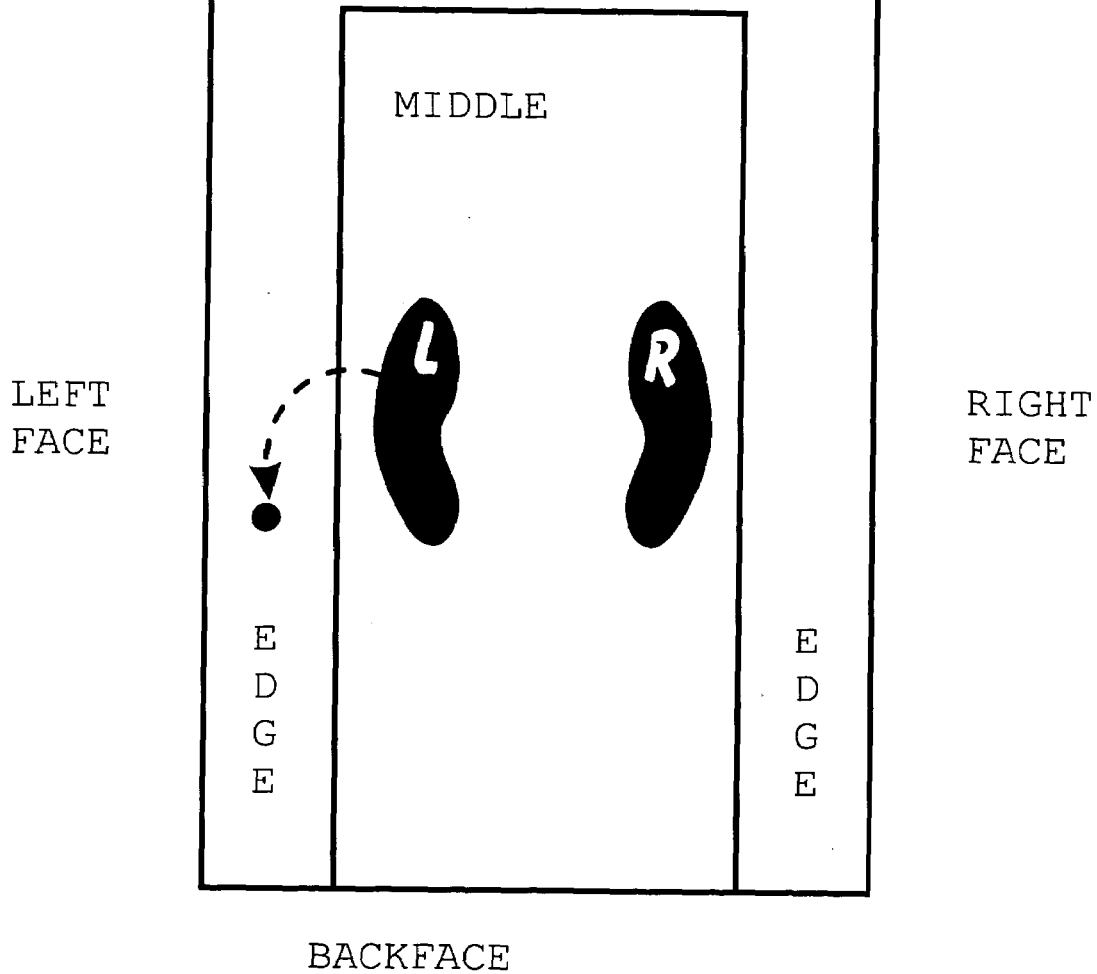
FIGURE 7.B-08

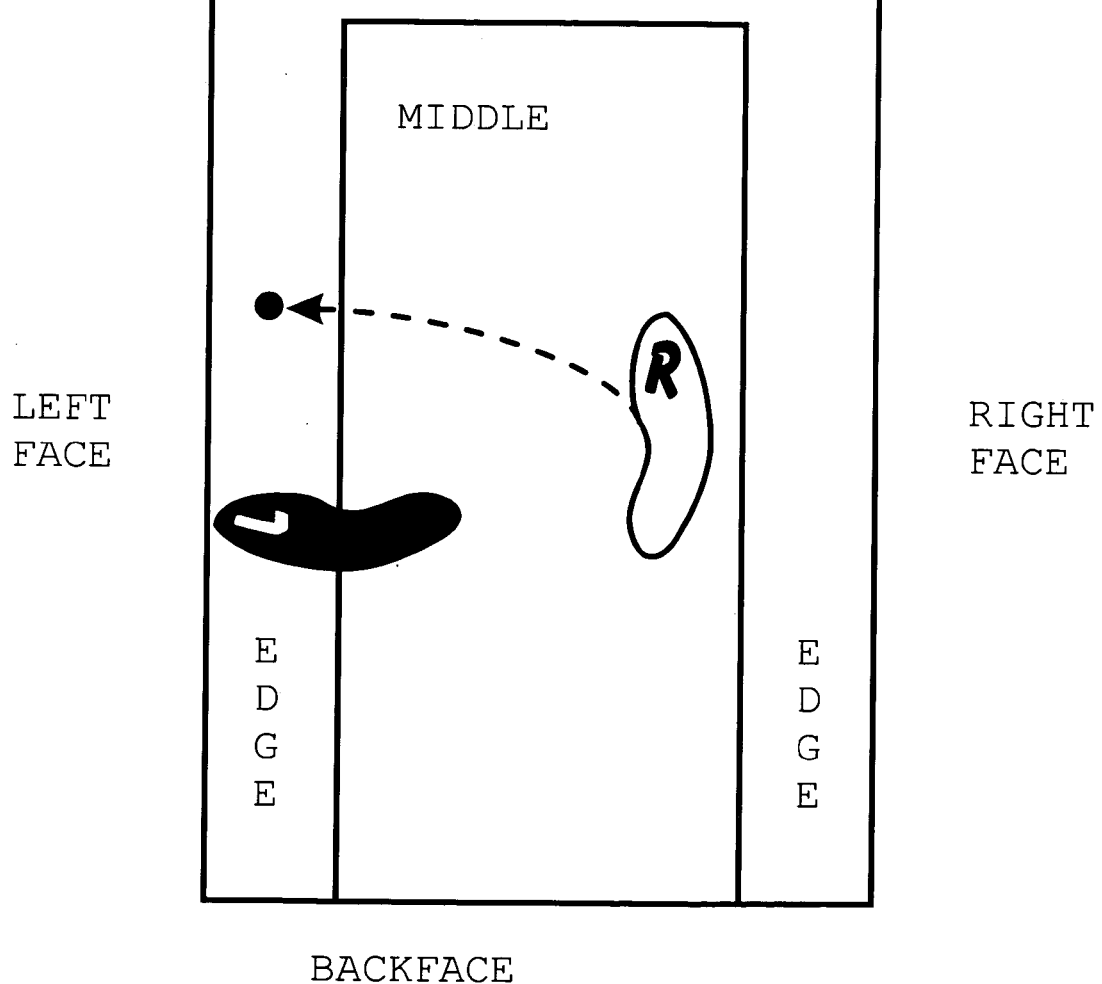
FIGURE 7.B-09

FRONT FACE
R2 (in one), L2 (in one), R2 (in one)/SWITCH-RIGHT, L2/ 2C-SWITCH-LEFT, LEFT FACE, 2LEFT to FRONT FACE/2SWITCH-LEFT
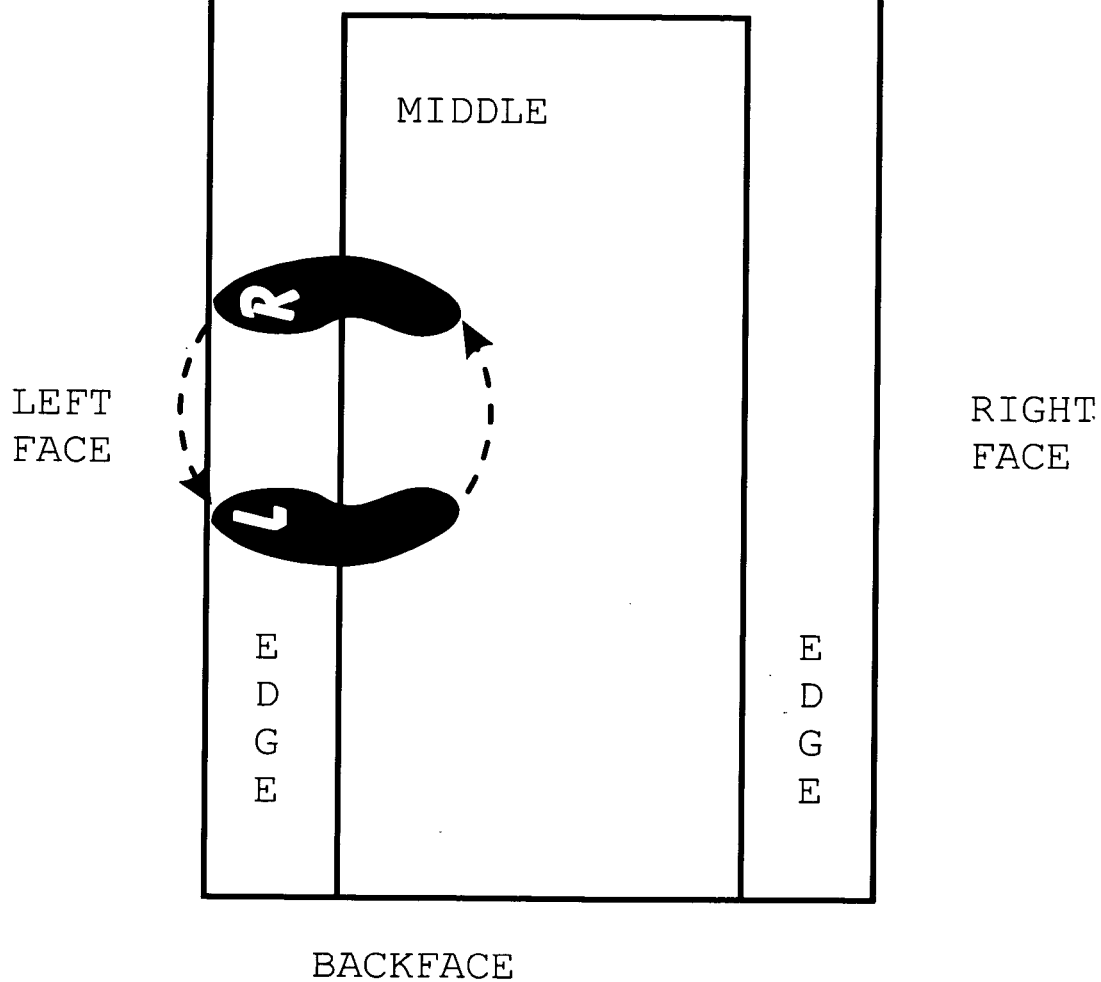
STEP 10 - After securing L2 (the location) by also landing YOUR 2 on the left EDGE pointing out away from the MIDDLE alongside YOUR 1 (shown), you are prepared to hop ½left to L1 as indicated to be done.
FIGURE 7.B-10

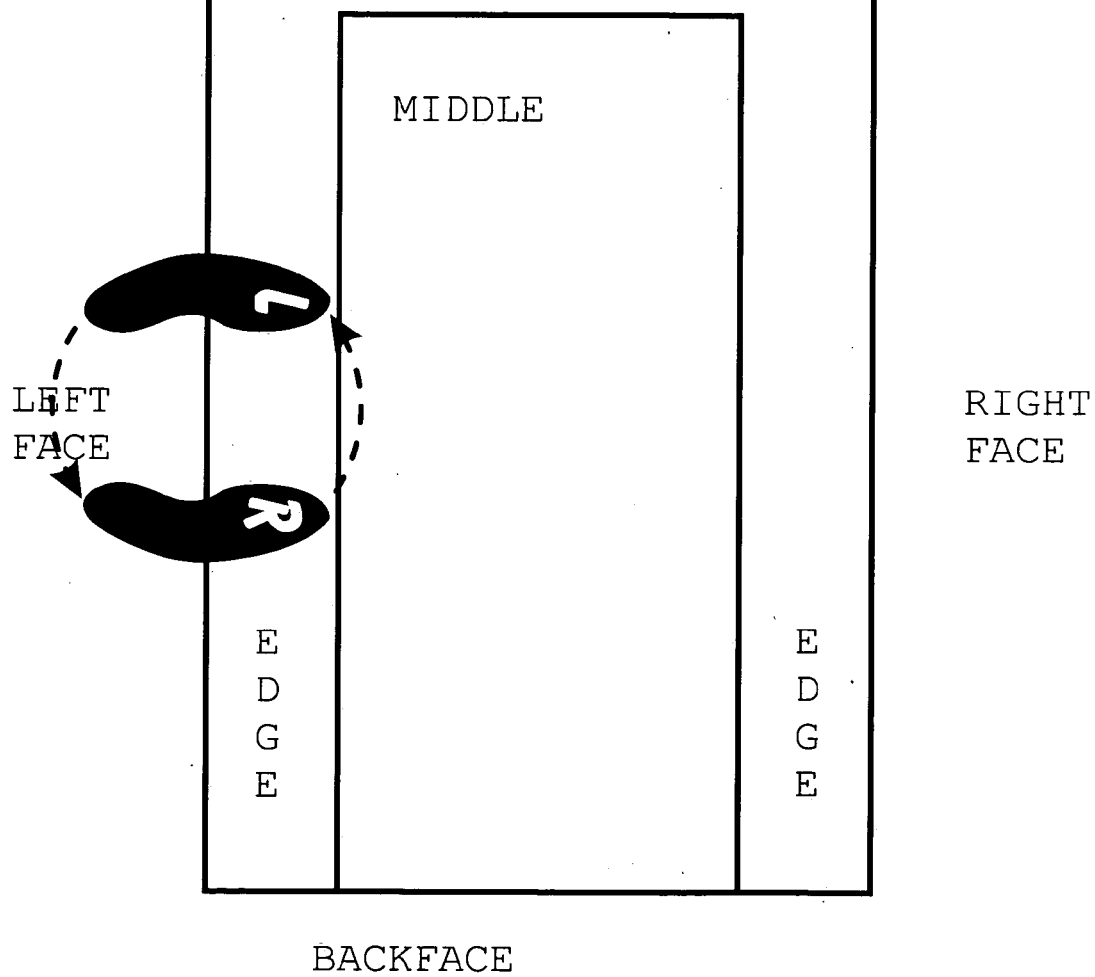
FIGURE 7.B-11

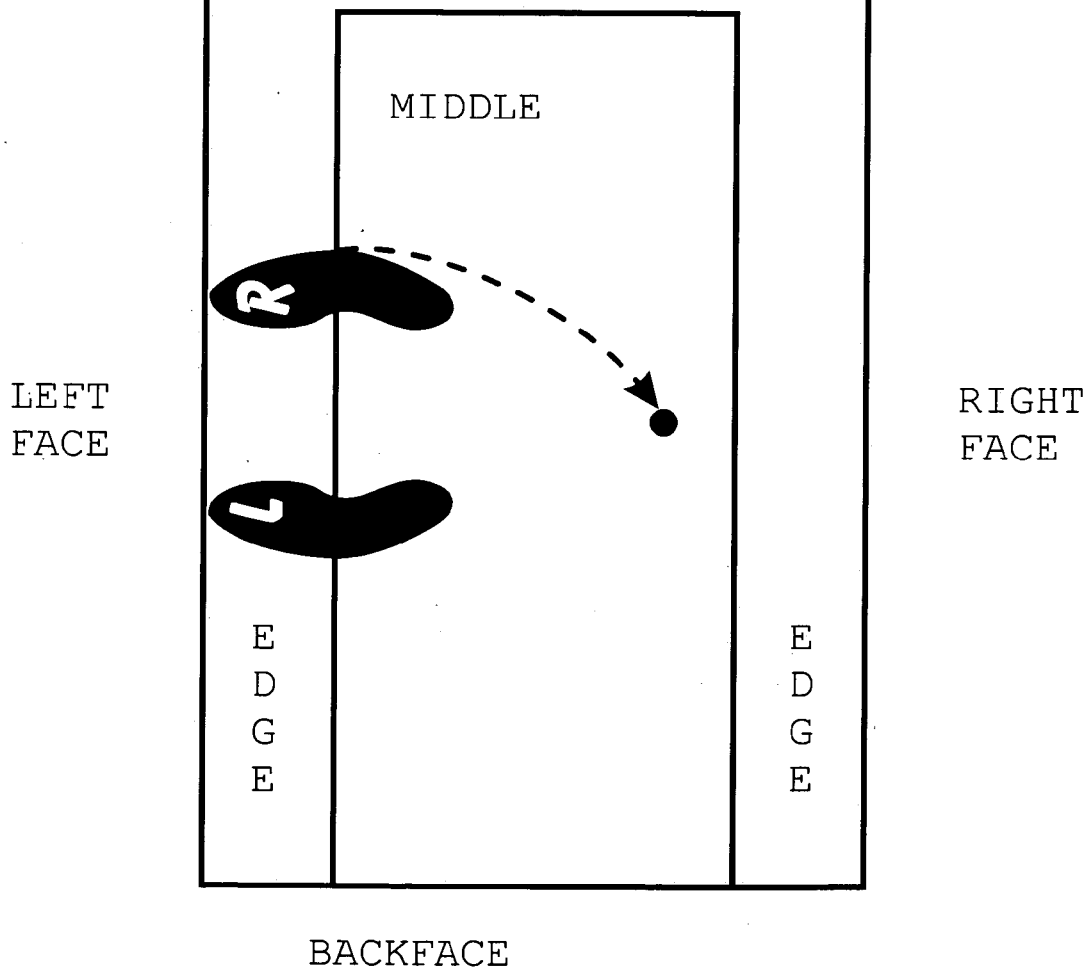
FIGURE 7.B-12

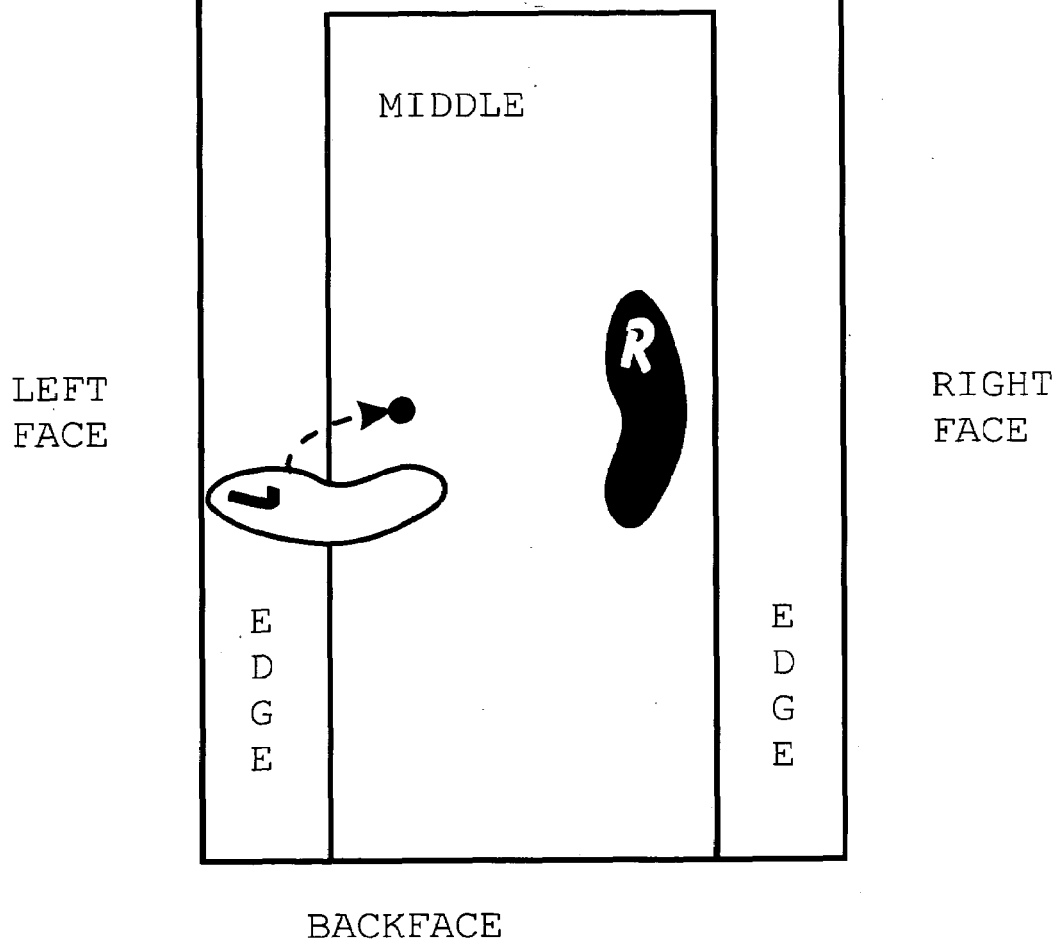
FIGURE 7.B-13

FRONT FACE
R2 (in one), L2 (in one), R2 (in one)/SWITCH-RIGHT, L2/ 2C-SWITCH-LEFT, LEFT FACE, 2LEFT to FRONT FACE/2SWITCH-LEFT

STEP 14 - FRONT FACE on the MIDDLE is secured by also landing YOUR 2 in FRONT FACE alongside YOUR 1 (shown) completing L2/ 2C-SWITCH-LEFT. To continue with LEFT FACE, a ¼ left turn from FRONT FACE on the MIDDLE to LEFT FACE is executed by turning YOUR 1 (left foot) so that it lands pointing in LEFT FACE as indicated to be done.

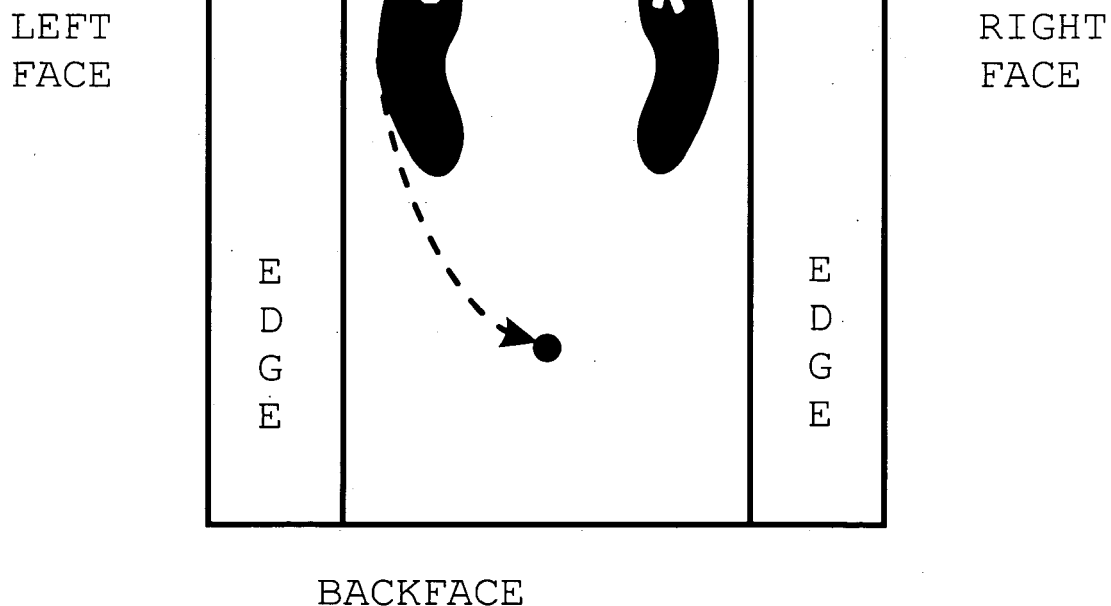

FIGURE 7.B-14

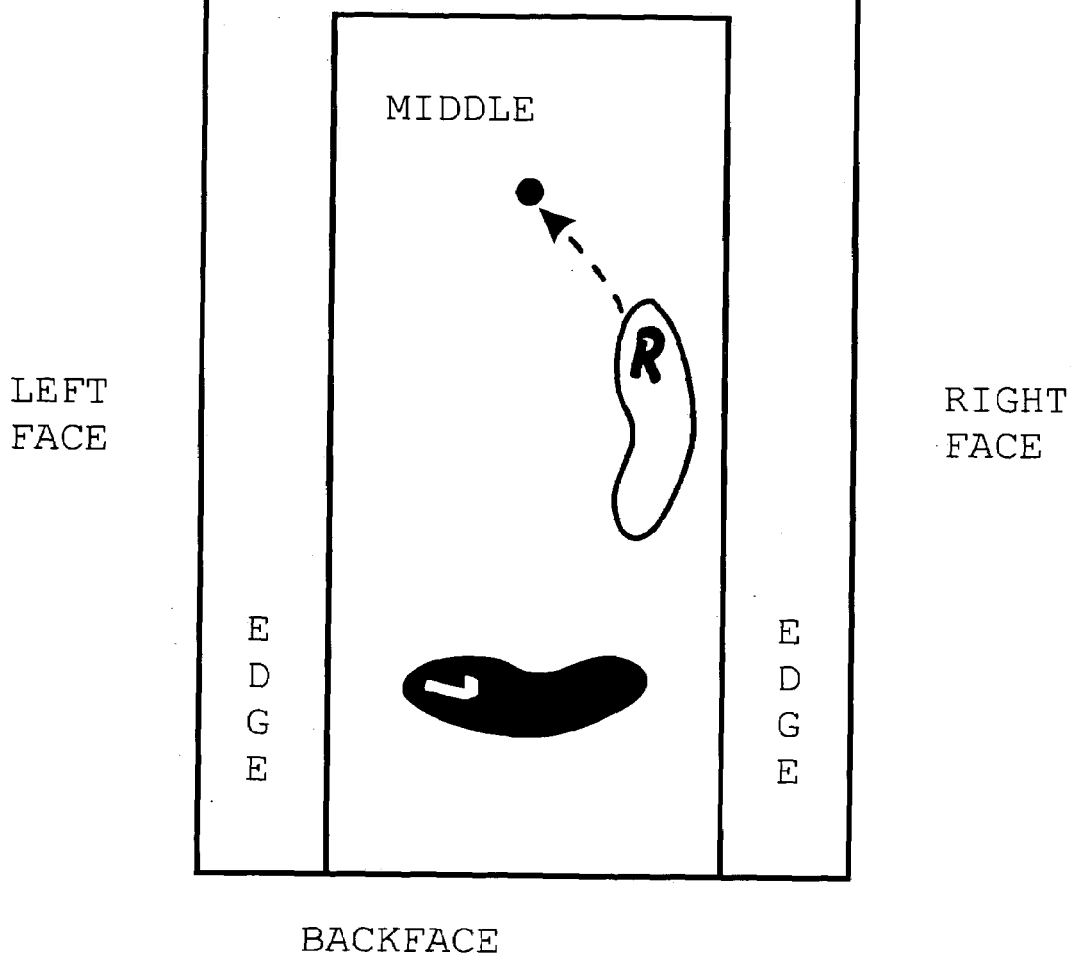
FIGURE 7.B-15

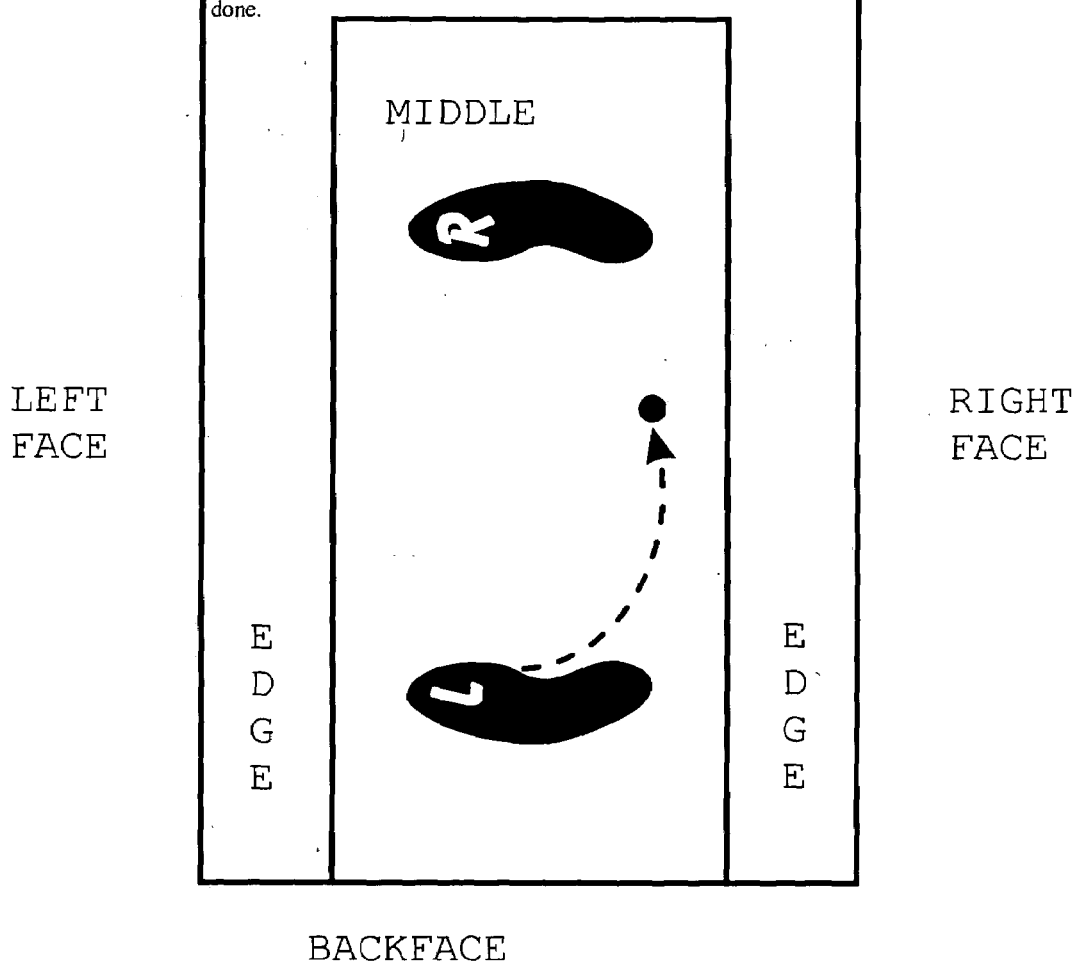
FIGURE 7.B-16

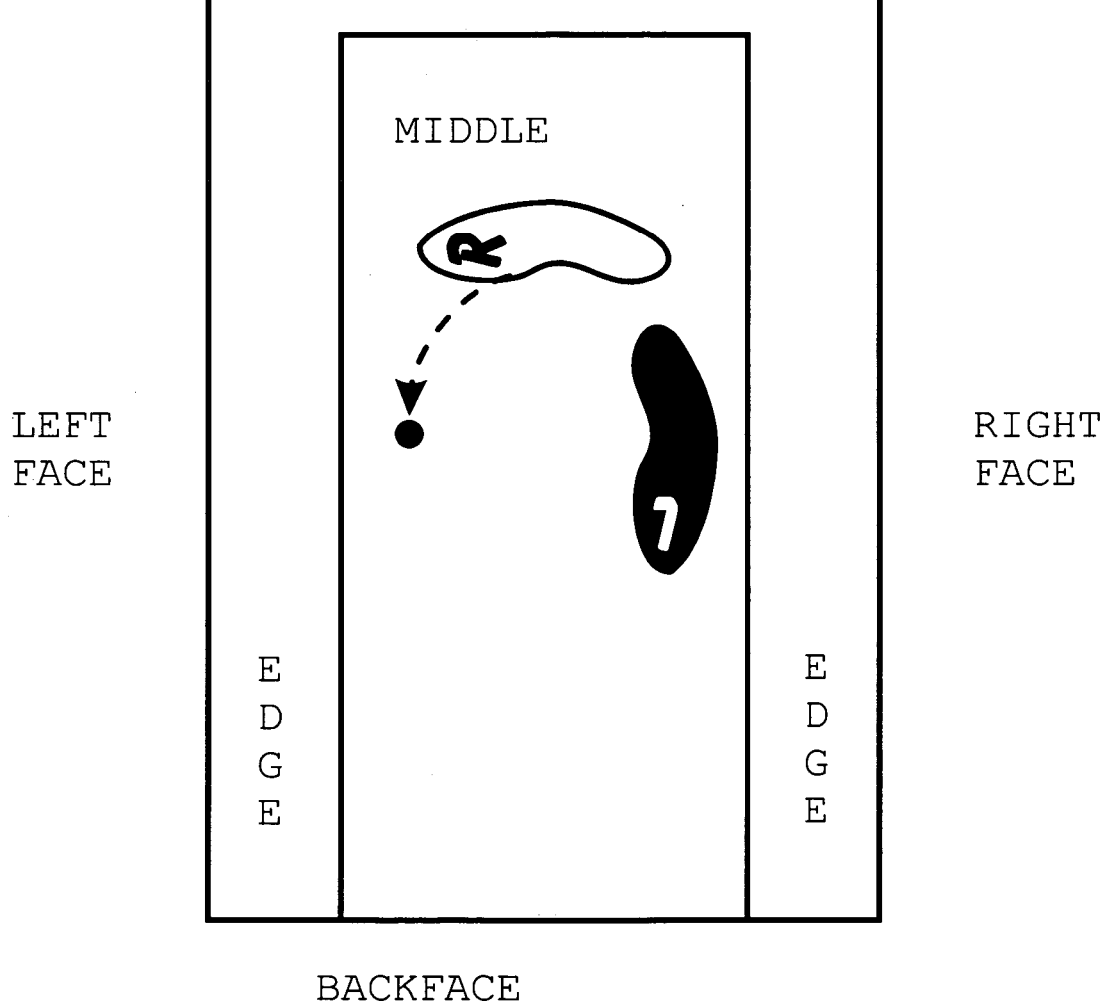
FIGURE 7.B-17

FRONT FACE
R2 (in one), L2 (in one), R2 (in one)/SWITCH-RIGHT, L2/ 2C-SWITCH-LEFT, LEFT FACE, 2LEFT to FRONT FACE/2SWITCH-LEFT

STEP 18 - BACK FACE on the MIDDLE is secured by also landing YOUR 2 in BACK FACE alongside YOUR 1 (shown). To continue turning left to RIGHT FACE on the MIDDLE, turn YOUR 1 so that it lands pointing in RIGHT FACE as indicated to be done.

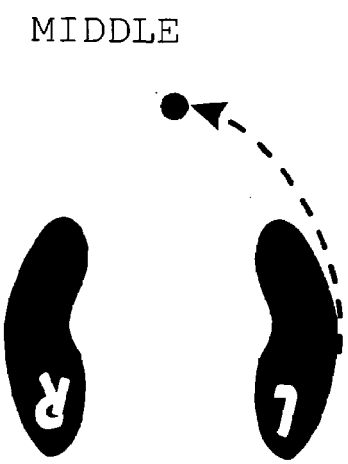

LEFT FACE

MIDDLE

RIGHT FACE

EDGE

EDGE

BACKFACE

FIGURE 7.B-18

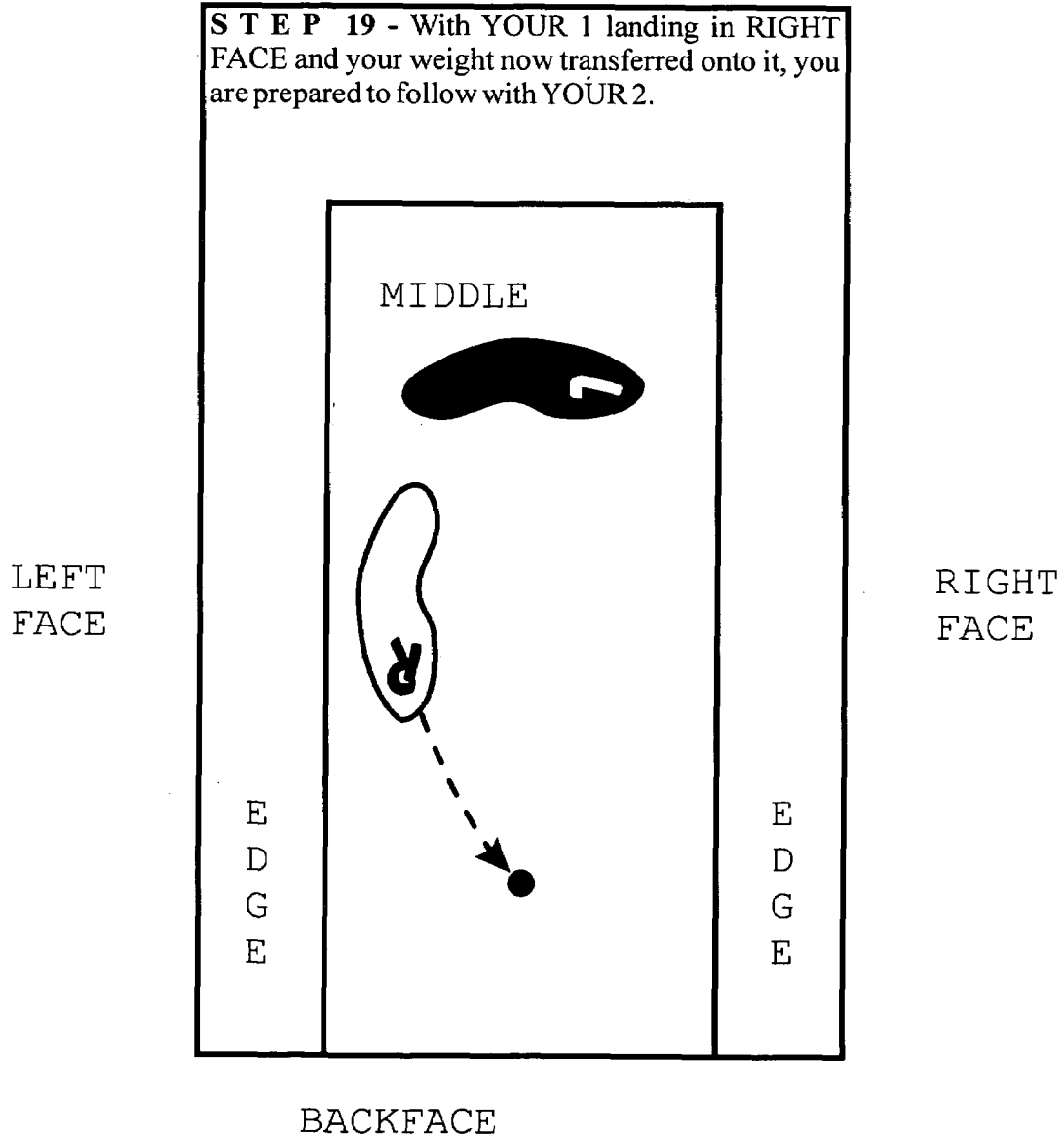
FIGURE 7.B-19

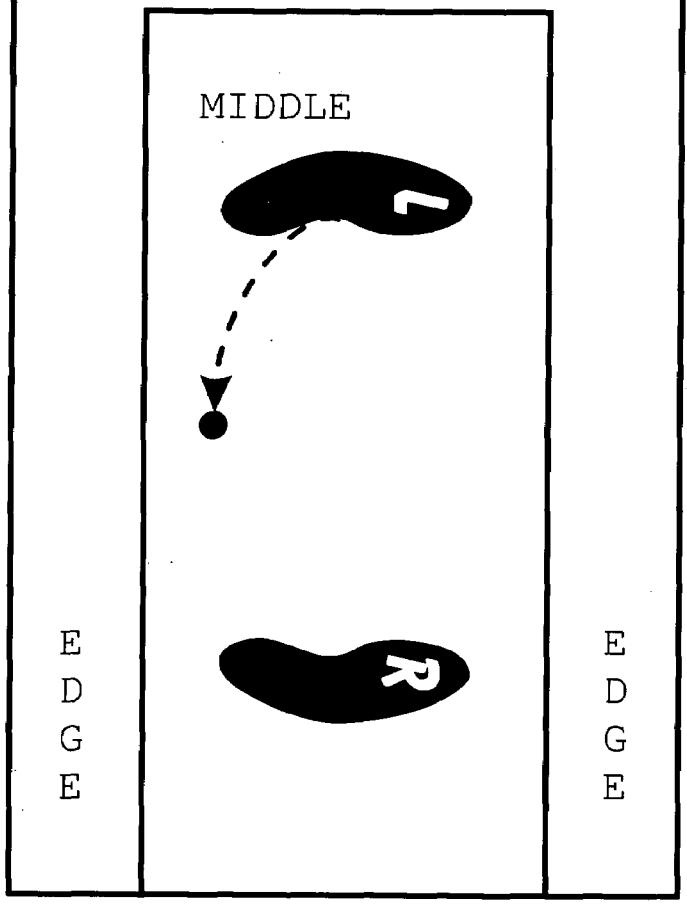
FIGURE 7.B-20

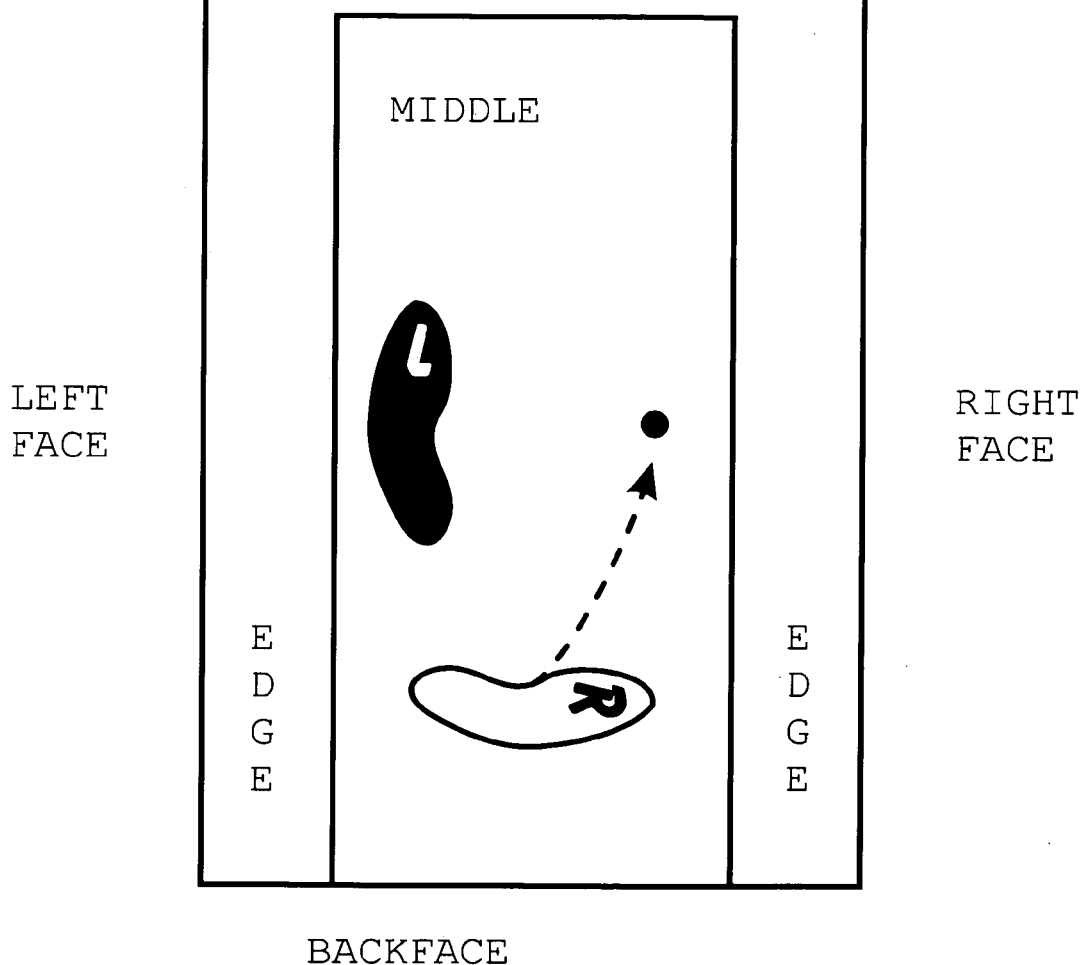
FIGURE 7.B-21

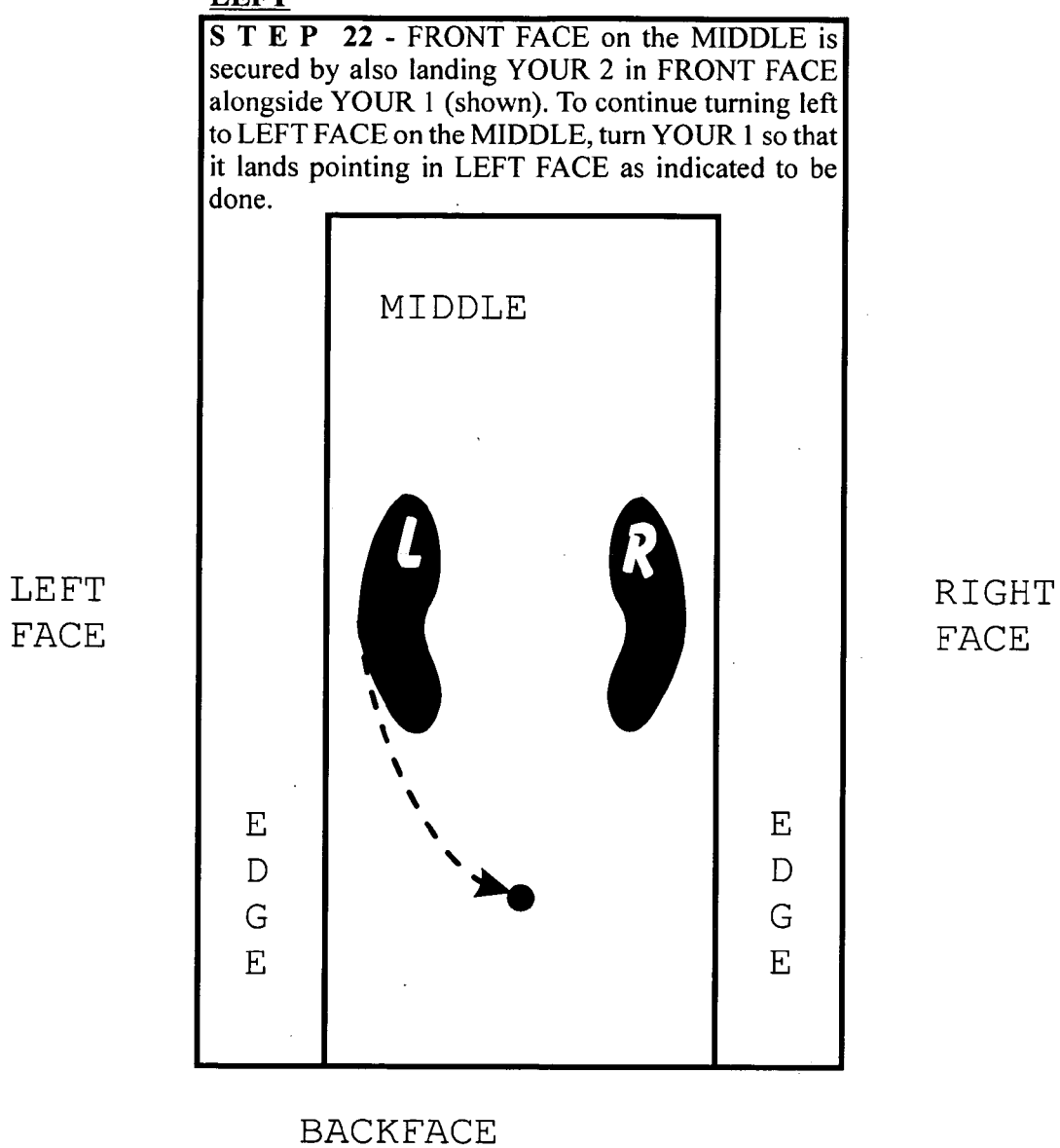
FIGURE 7.B-22

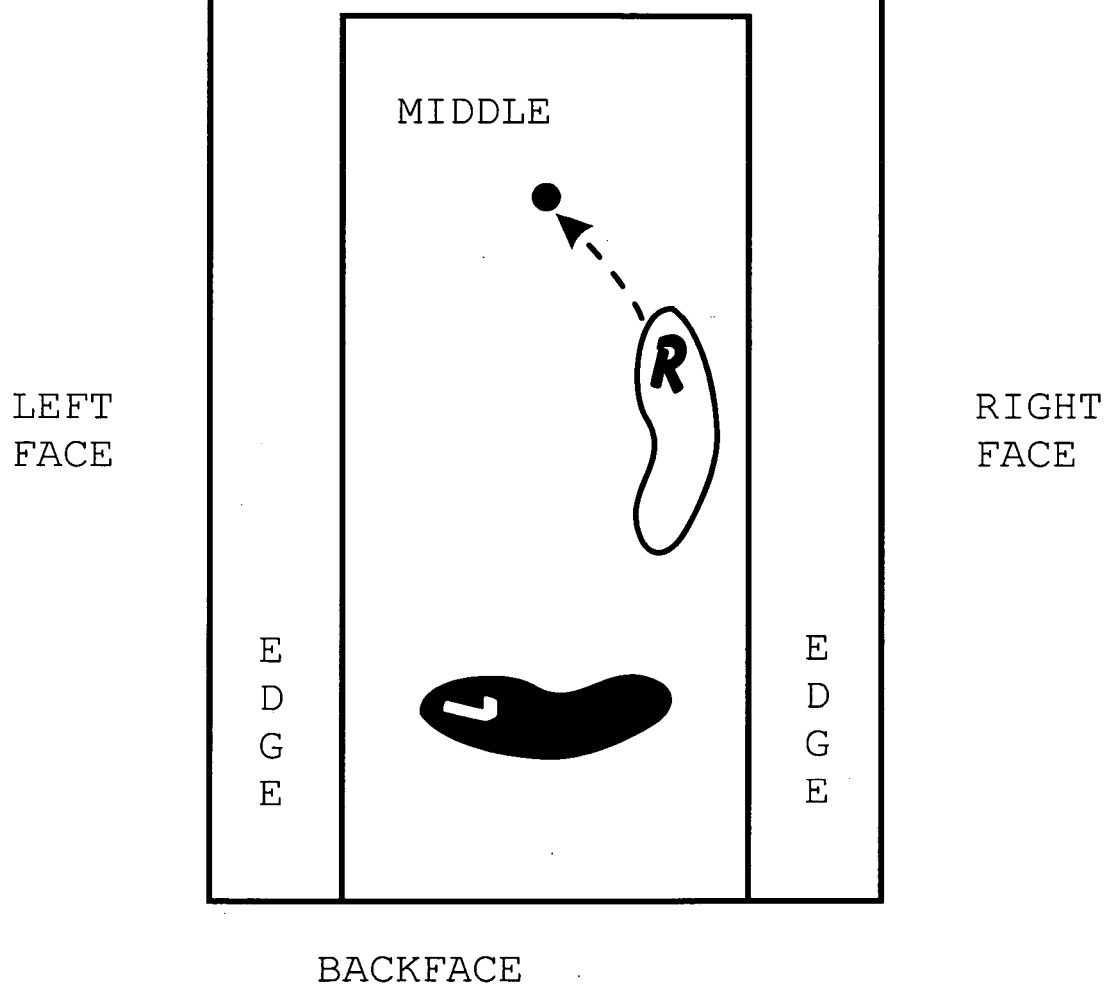
FIGURE 7.B-23

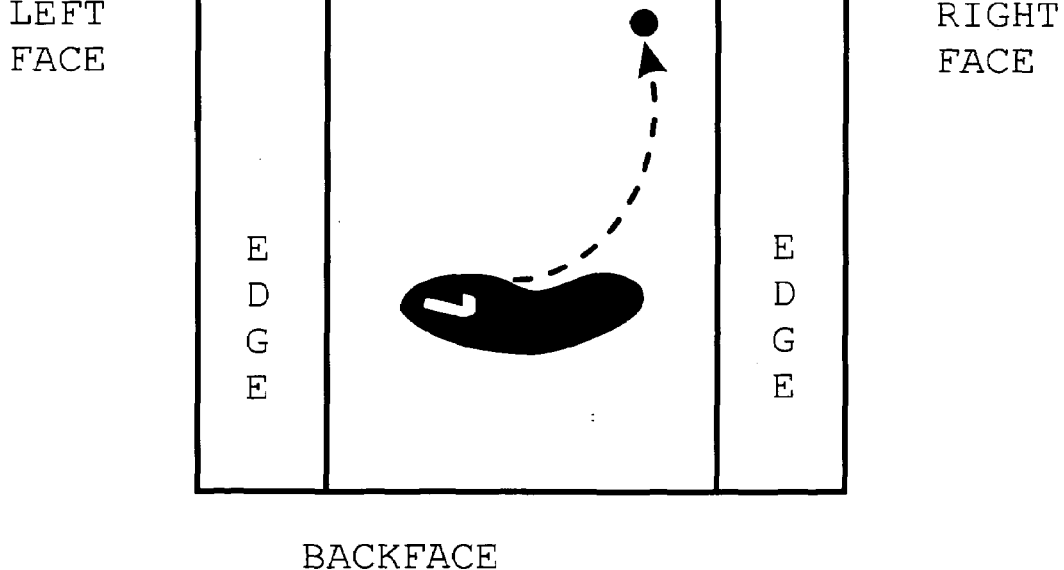
FIGURE 7.B-24

FRONT FACE
R2 (in one), L2 (in one), R2 (in one)/SWITCH-RIGHT, L2/ 2C-SWITCH-LEFT, LEFT FACE, 2LEFT to FRONT FACE/2SWITCH-LEFT
STEP 25 - With YOUR 1 landing in BACK FACE and your weight now transferred onto it, you are prepared to follow with YOUR 2.
MIDDLE
LEFT FACE
RIGHT FACE
E D G E
E D G E
BACKFACE
FIGURE 7.B-25

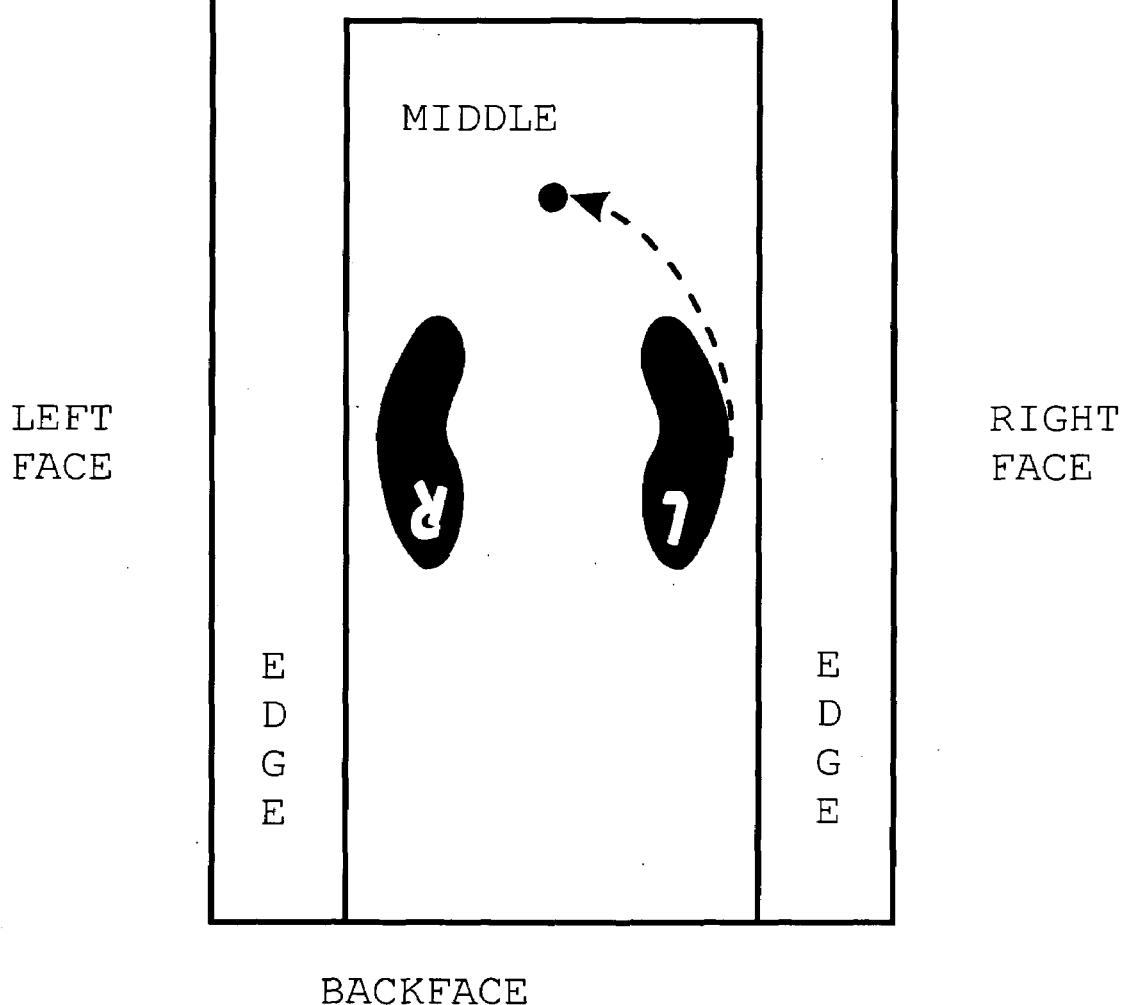
FIGURE 7.B-26

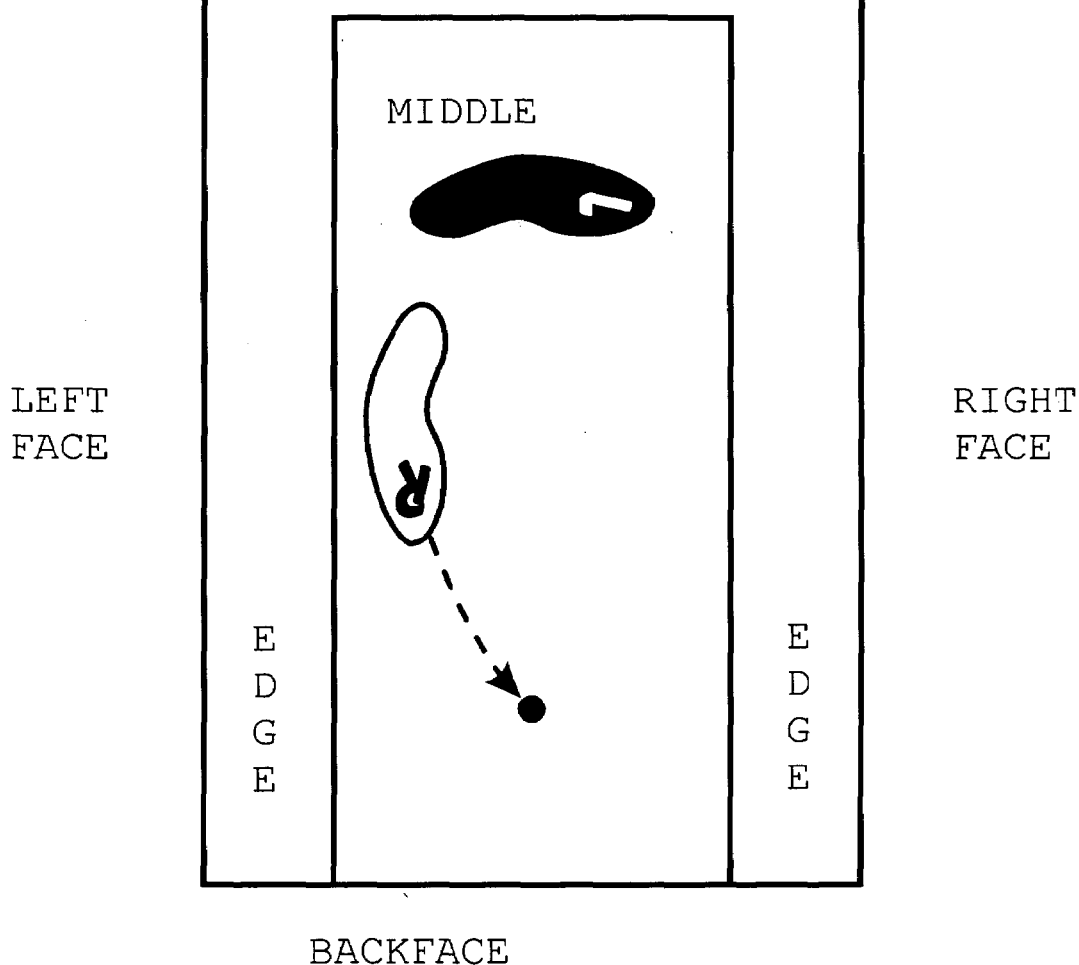
FIGURE 7.B-27

FRONT FACE
R2 (in one), L2 (in one), R2 (in one)/SWITCH-RIGHT, L2/ 2C-SWITCH-LEFT, LEFT FACE, 2LEFT to FRONT FACE/2SWITCH-LEFT
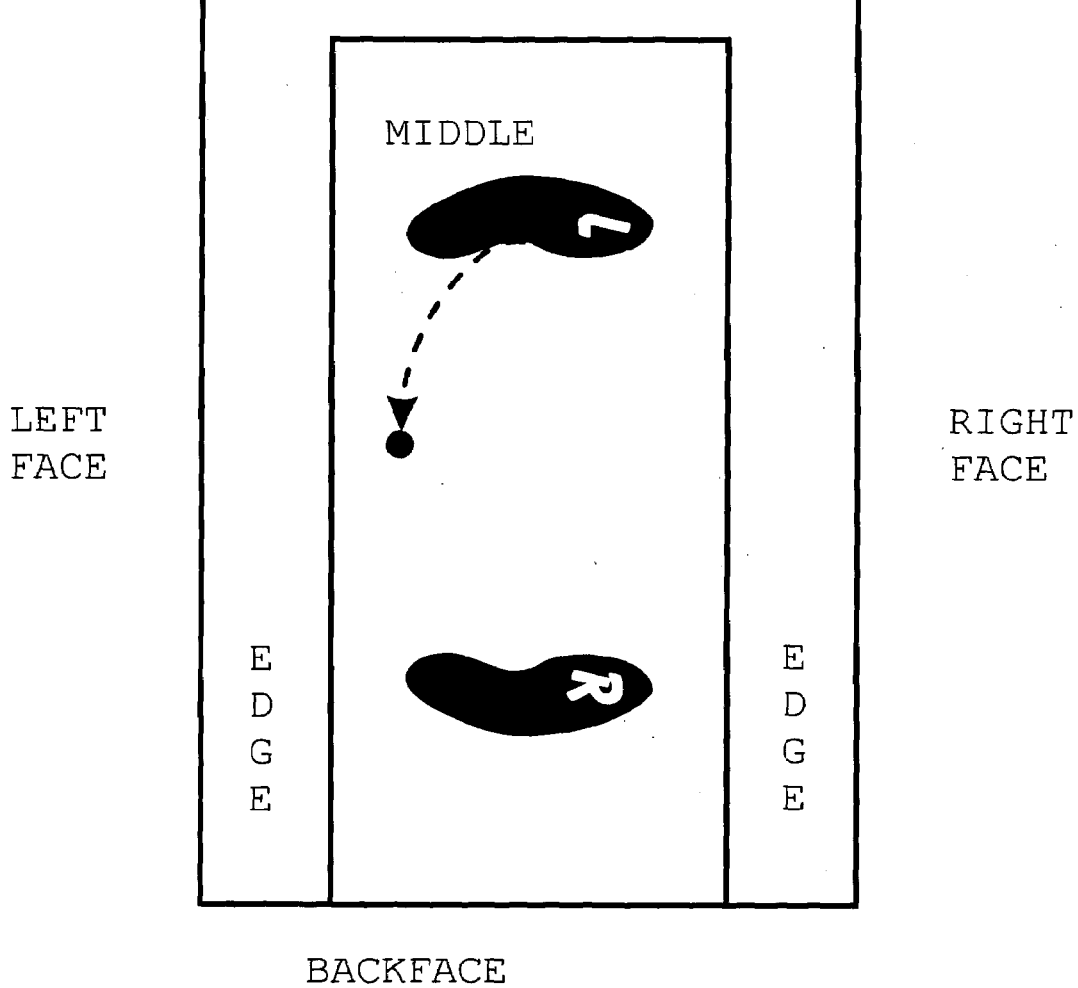
FIGURE 7.B-28

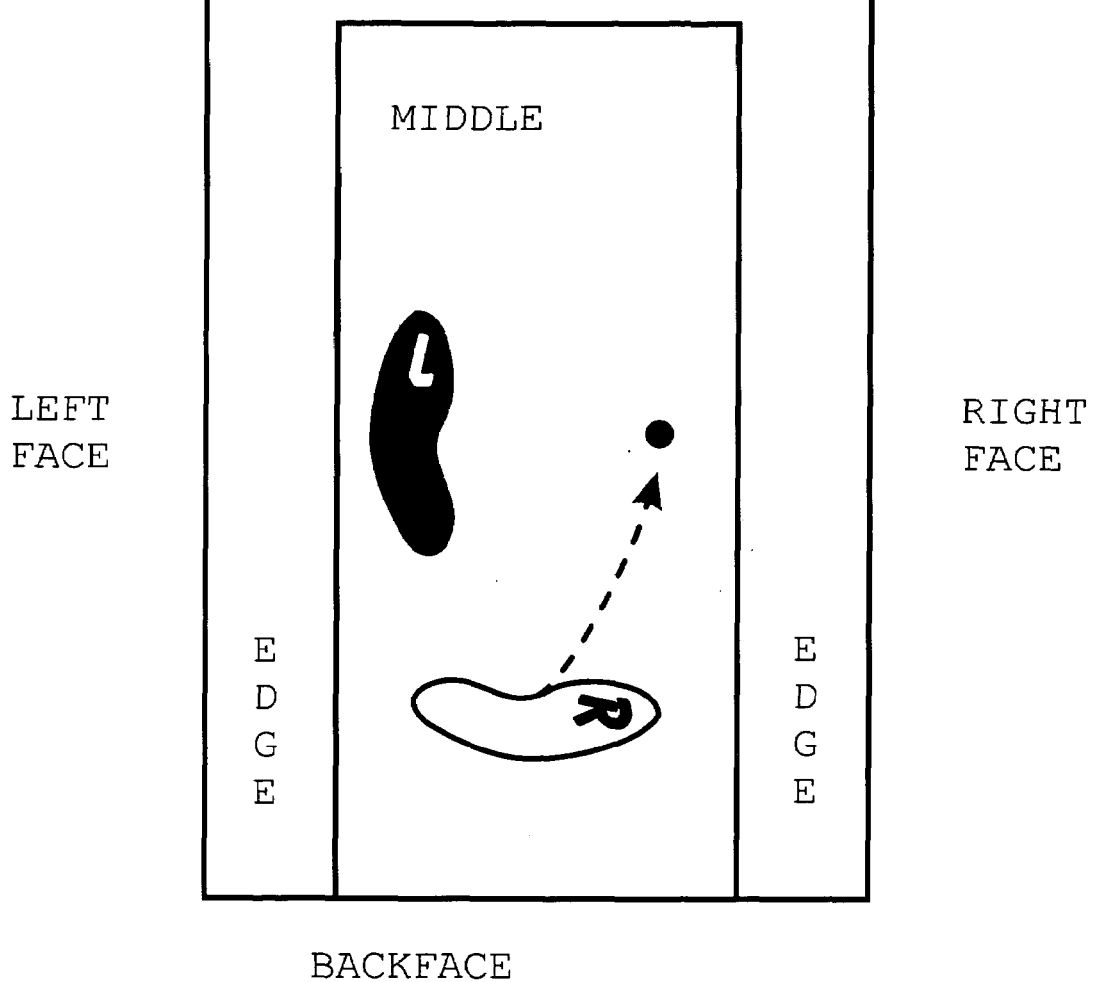
FIGURE 7.B-29

FRONT FACE
R2 (in one), L2 (in one), R2 (in one)/SWITCH-RIGHT, L2/ 2C-SWITCH-LEFT, LEFT FACE, 2LEFT to FRONT FACE/2SWITCH-LEFT
STEP 30 - After securing FRONT FACE on the MIDDLE by also landing YOUR 2 in FRONT FACE alongside YOUR 1 (shown), you are prepared to hop ½left to BACK FACE as indicated to be done.
MIDDLE
LEFT FACE
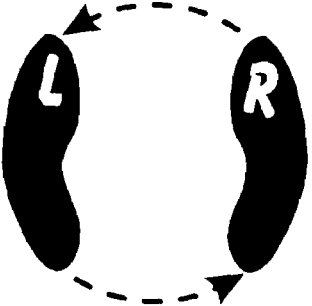
RIGHT FACE
EDGE
EDGE
BACKFACE
FIGURE 7.B-30

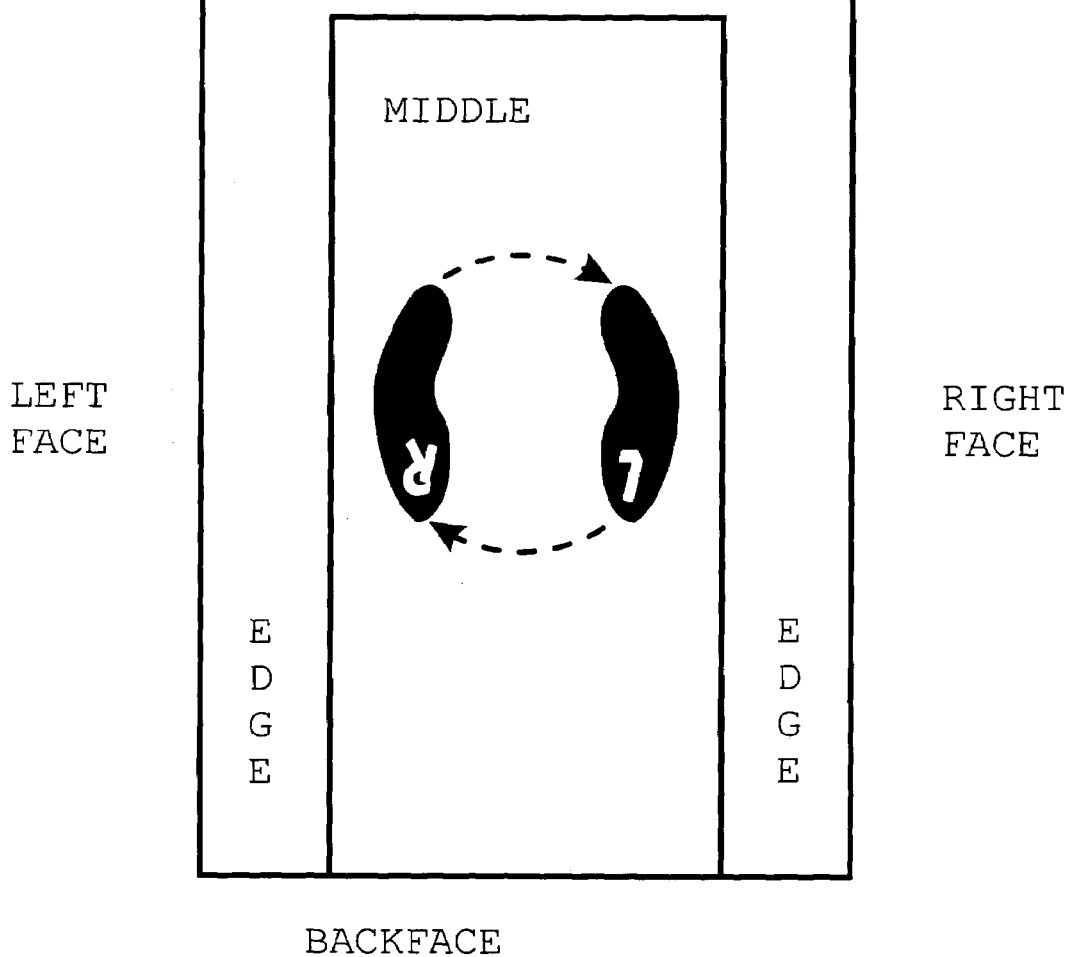
FIGURE 7.B-31

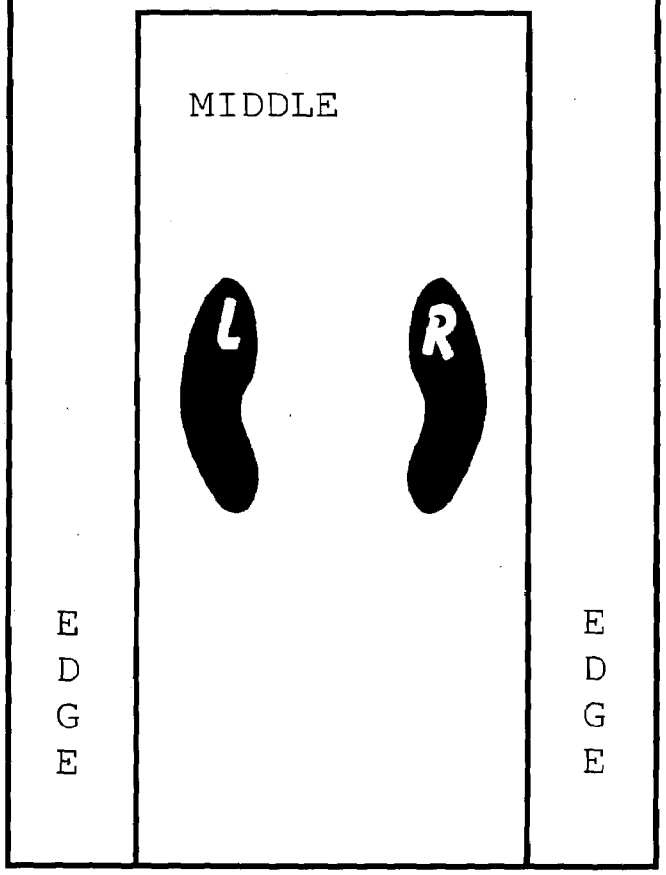
FIGURE 7.B-32

DIAGRAMS 8- PANS, PANS, AND MORE PANS

PAN-RIGHT

STEP 1 - From a standing position up on the balls of your feet, put your weight on the ball of YOUR 1 (right foot) and pivot on it ½right forward and around to the opposite FACE, by pushing your body forward and right with the YOUR 2 (left foot), creating a semi-circular motion as indicated to be done.

PAN-RIGHT
STEP 2 - Action completed "!"

PAN-LEFT

STEP 1 - From a standing position up on the balls of your feet, put your weight on the ball of YOUR 1 (left foot) and pivot on it ½ left forward and around to the opposite FACE, by pushing your body forward and left with the YOUR 2 (right foot), creating a semi-circular motion as indicated to be done.

PAN-LEFT
STEP 2 - Action completed                "!"

B'PAN-RIGHT

S T E P 1 - From a standing position up on the balls of your feet, put your weight on the ball of YOUR 1 (left foot) and pivot on it ½right backward and around to the opposite FACE, by pushing your body backward and left with the YOUR 2 (right foot), creating a semi-circular motion as indicated to be done.

B'PAN-RIGHT
STEP 2 - Action completed          "!"

B'PAN-LEFT

S T E P 1 - From a standing position up on the balls of your feet, put your weight on the ball of YOUR 1 (right foot) and pivot on it ½left backward and around to the opposite FACE, by pushing your body backward and right with the YOUR 2 (left foot), creating a semi-circular motion as indicated to be done.

B'PAN-LEFT
STEP 2 - Action completed     "!"

2PAN-RIGHT

S T E P 1 - 2 consecutive forward right and backward left PANS done in the STANDARD METHOD (in a single MANEUVER) from a standing position up on the balls of your feet are executed by putting your weight on the ball of YOUR 1 (right foot), and <u>first pivoting on it ½right forward</u> and around to the opposite FACE, by pushing your body forward and right with YOUR 2 (left foot) as indicated to be done.

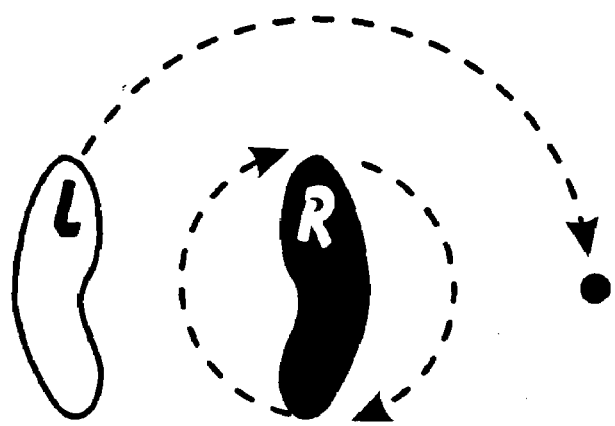

FIGURE 8-09

2PAN-RIGHT

S T E P  2 - After pivoting ½right forward and around to the opposite FACE (shown), you are prepared to pivot ½left backward and around to the original FACE (in a single MANEUVER) repeating the semi-circular motion as indicated to be done.

2PAN-RIGHT

S T E P 3 - Action completed...    "!"

2PAN-LEFT

S T E P 1 - 2 consecutive forward left and backward right PANS done in the STANDARD METHOD (in a single MANEUVER) from a standing position up on the balls of your feet are executed by putting your weight on the ball of YOUR 1 (left foot), and <u>first pivoting on it ½ left forward</u> and around to the opposite FACE, by pushing your body forward and right with YOUR 2 (right foot) as indicated to be done.

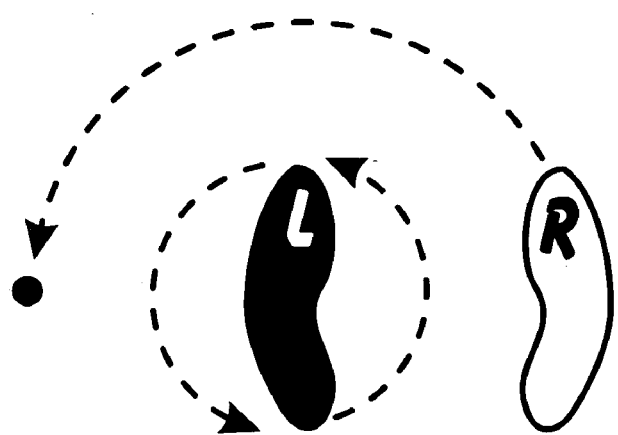

FIGURE 8-12

2PAN-LEFT

STEP 2 - After pivoting ½left forward and around to the opposite FACE (shown), you are prepared to pivot ½right backward and around to the original FACE (in a single MANEUVER) repeating the semi-circular motion as indicated to be done.

2PAN-LEFT

STEP 3 - Action completed... "!"

3PAN-RIGHT

S T E P  1 - 3 consecutive forward right, backward left, and forward right PANS done in the STANDARD METHOD (in a single MANEUVER) from a standing position up on the balls of your feet are executed by putting your weight on the ball of YOUR 1 (right foot), and <u>first pivoting on it ½right forward</u> and around to the opposite FACE, by pushing your body forward and right with YOUR 2 (left foot) as indicated to be done.

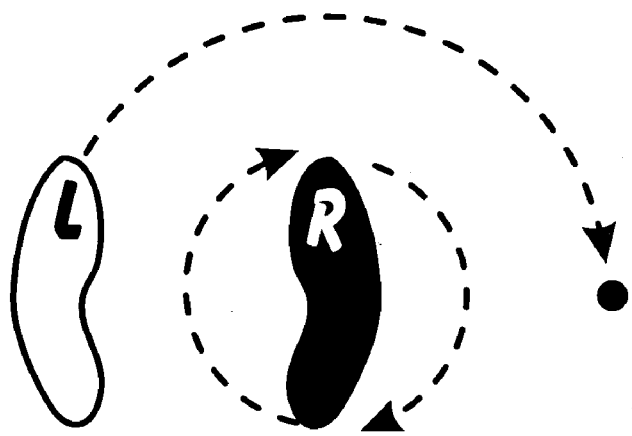

FIGURE 8-15

3PAN-RIGHT

S T E P  2 - After pivoting ½right forward and around to the opposite FACE (shown), you are prepared to pivot ½left backward and around to the original FACE (in a single MANEUVER) as indicated to be done.

3PAN-RIGHT

S T E P 3 - After pivoting ½left backward and around to the original FACE (shown), you are prepared to pivot ½right forward and around to the opposite FACE again (in a single MANEUVER), repeating the semi-circular motion as indicated to be done.

3PAN-RIGHT
S T E P  4 - Action completed             "!"

3PAN-LEFT

S T E P 1 - 3 consecutive forward left, backward right, and forward left PANS done in the STANDARD METHOD (in a single MANEUVER) from a standing position up on the balls of your feet are executed by putting your weight on the ball of YOUR 1 (left foot), and <u>first pivoting on it ½left forward</u> and around to the opposite FACE, by pushing your body forward and left with YOUR 2 (right foot) as indicated to be done.

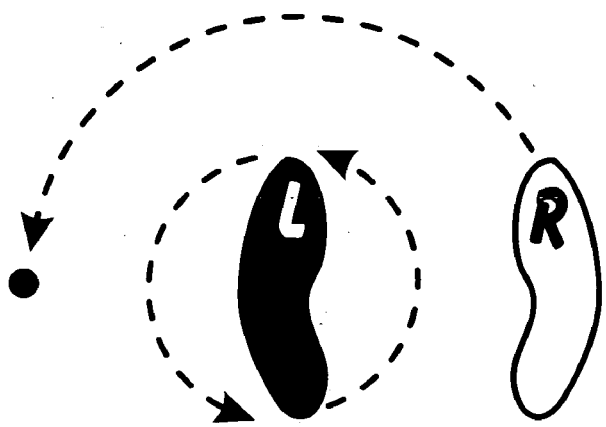

FIGURE 8-19

3PAN-LEFT

S T E P 2 - After pivoting ½left forward and around to the opposite FACE (shown), you are prepared to pivot ½right backward and around to the original FACE (in a single MANEUVER) as indicated to be done.

3PAN-LEFT

S T E P 3 - After pivoting ½right backward and around to the original FACE (shown), you are prepared to pivot ½left forward and around to the opposite FACE again (in a single MANEUVER), repeating the semi-circular motion as indicated to be done.

3PAN-LEFT
S T E P 4 - Action completed "!"

2B'PAN-RIGHT

S T E P 1 - 2 consecutive backward right and forward left PANS done in the STANDARD METHOD (in a single MANEUVER) from a standing position up on the balls of your feet are executed by putting your weight on the ball of YOUR 1 (left foot), and <u>first pivoting on it ½right backward</u> and around to the opposite FACE, by pushing your body backward and left with YOUR 2 (right foot) as indicated to be done.

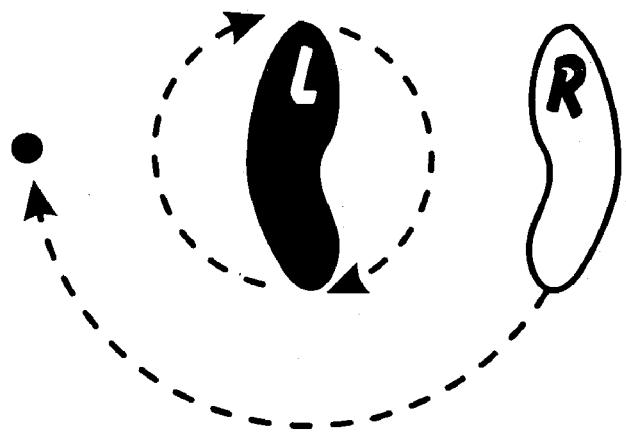

FIGURE 8-23

2B'PAN-RIGHT

S T E P  2 - After pivoting ½right backward and around to the opposite FACE (shown), you are prepared to pivot ½left forward and around to the original FACE (in a single MANEUVER) repeating the semi-circular motion as indicated to be done.

2B'PAN-RIGHT
S T E P 3 - Action completed... "!"

2B'PAN-LEFT

S T E P 1 - 2 consecutive backward left and forward right PANS done in the STANDARD METHOD (in a single MANEUVER) from a standing position up on the balls of your feet are executed by putting your weight on the ball of YOUR 1 (right foot), and first pivoting on it ½left backward and around to the opposite FACE, by pushing your body backward and right with YOUR 2 (left foot) as indicated to be done.

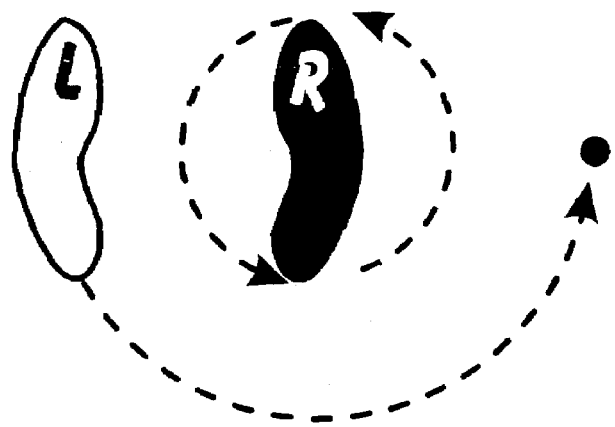

FIGURE 8-26

2B'PAN-LEFT

S T E P  2 - After pivoting ½left backward and around to the opposite FACE (shown), you are prepared to pivot ½right forward and around to the original FACE (in a single MANEUVER) repeating the semi-circular motion as indicated to be done.

2B'PAN-LEFT
STEP 3 - Action completed... "!"

3B'PAN-RIGHT

S T E P 1 - 3 consecutive backward right, forward left and backward right PANS done in the STANDARD METHOD (in a single MANEUVER) from a standing position up on the balls of your feet are executed by putting your weight on the ball of YOUR 1 (left foot), and <u>first pivoting on it ½ right backward</u> and around to the opposite FACE, by pushing your body backward and left with YOUR 2 (right foot) as indicated to be done.

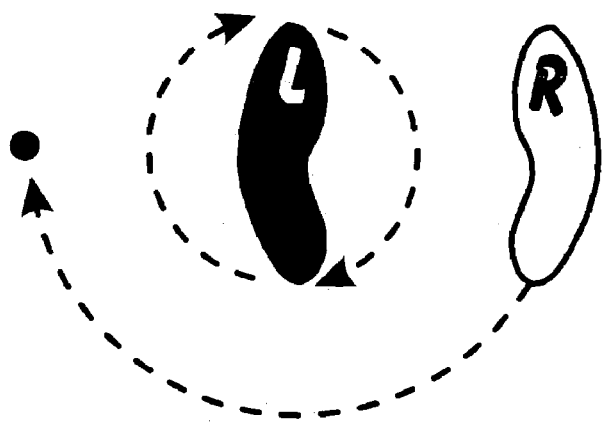

FIGURE 8-29

3B'PAN-RIGHT

S T E P 2 - After pivoting ½right backward and around to the opposite FACE (shown), you are prepared to pivot ½left forward and around to the original FACE (in a single MANEUVER) as indicated to be done.

3B'PAN-RIGHT

STEP 3 - After pivoting ½ left forward and around to the original FACE (shown), you are prepared to pivot ½ right backward and around to the opposite FACE again (in a single MANEUVER), repeating the semi-circular motion as indicated to be done.

3B'PAN-RIGHT

STEP 4 - Action completed "!"

3B'PAN-LEFT

S T E P 1 - 3 consecutive backward left, forward right and backward left PANS done in the STANDARD METHOD (in a single MANEUVER) from a standing position up on the balls of your feet are executed by putting your weight on the ball of YOUR 1 (right foot), and <u>first pivoting on it ½ left backward</u> and around to the opposite FACE, by pushing your body backward and right with YOUR 2 (left foot) as indicated to be done.

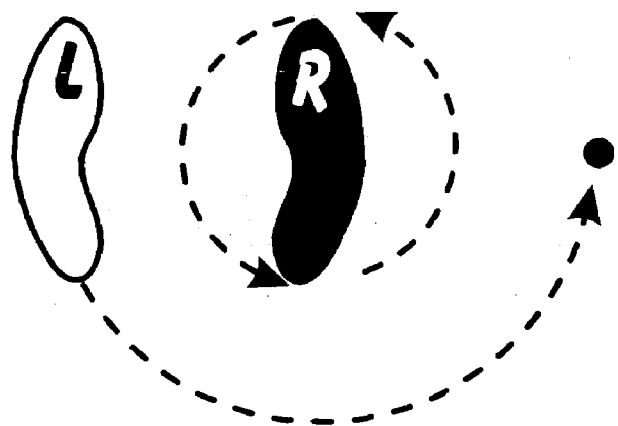

FIGURE 8-33

3B'PAN-LEFT

S T E P  2 - After pivoting ½left backward and around to the opposite FACE (shown), you are prepared to pivot ½right forward and around to the original FACE (in a single MANEUVER) as indicated to be done.

3B'PAN-LEFT

S T E P  3 - After pivoting ½right forward and around to the original FACE (shown), you are prepared to pivot ½left backward and around to the opposite FACE again (in a single MANEUVER), repeating the semi-circular motion as indicated to be done.

3B'PAN-LEFT
STEP 4 - Action completed          "!"

2C-PAN-RIGHT

S T E P 1 - 2 consecutive forward right PANS done in the C-PAN METHOD (in a single MANEUVER) from a standing position up on the balls of your feet are executed by putting your weight on the ball of YOUR 1 (right foot), and <u>first pivoting on it ½right forward</u> and around to the opposite FACE, by pushing your body forward and right with YOUR 2 (left foot) as indicated to be done.

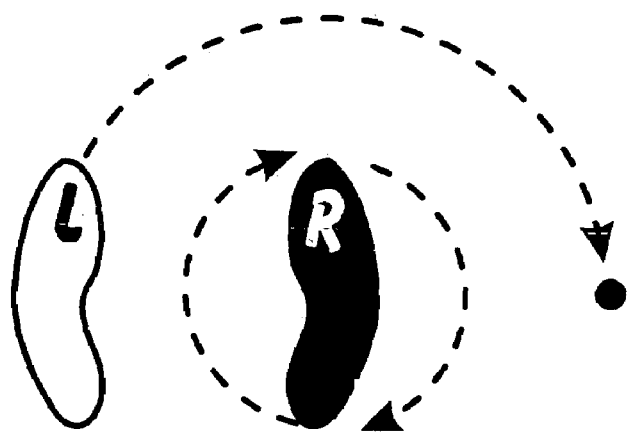

FIGURE 8-37

2C-PAN-RIGHT

S T E P  2 - After pivoting ½right forward and around to the opposite FACE (shown), you are prepared to continue pivoting ½right forward and around to the original FACE (in a single MANEUVER) creating a circular motion as indicated to be done.

2C-PAN-RIGHT
STEP 3 - Action completed...                    "!"

2C-PAN-LEFT

STEP 1 - 2 consecutive forward left PANS done in the C-PAN METHOD (in a single MANEUVER) from a standing position up on the balls of your feet are executed by putting your weight on the ball of YOUR 1 (left foot), and <u>first pivoting on it ½left forward</u> and around to the opposite FACE, by pushing your body forward and left with YOUR 2 (right foot) as indicated to be done.

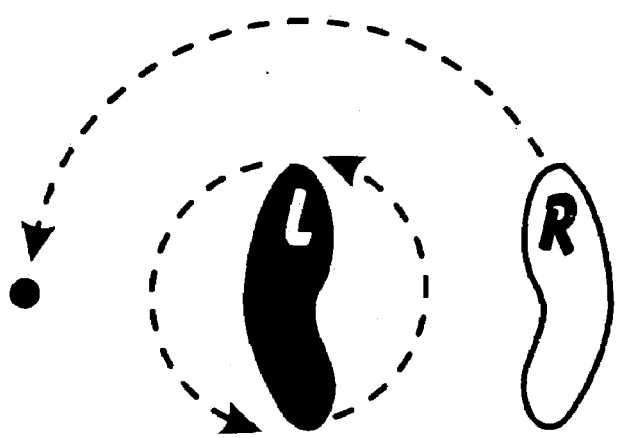

FIGURE 8-40

2C-PAN-LEFT

STEP 2 - After pivoting ½ left forward and around to the opposite FACE (shown), you are prepared to continue pivoting ½ left forward and around to the original FACE (in a single MANEUVER) creating a circular motion as indicated to be done.

2C-PAN-LEFT
STEP 3 - Action completed...  "!"

3C-PAN-RIGHT

STEP 3 - Action completed... "!"STEP 1 - 3 consecutive forward right PANS done in the C-PAN METHOD (in a single MANEUVER) from a standing position up on the balls of your feet are executed by putting your weight on the ball of YOUR 1 (right foot), and first pivoting on it ½right forward and around to the opposite FACE, by pushing your body forward and right with YOUR 2 (left foot) as indicated to be done.

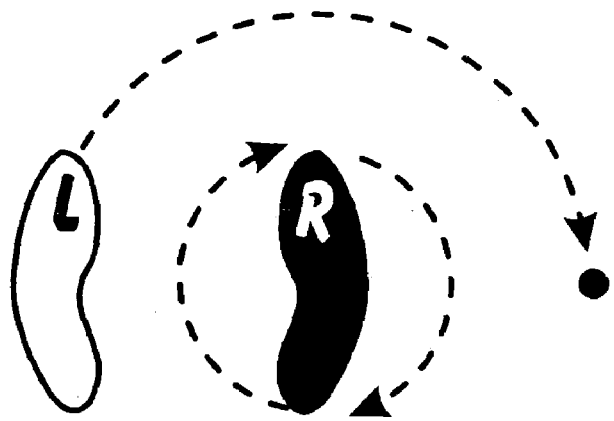

FIGURE 8-43

3C-PAN-RIGHT

S T E P  2 - After pivoting ½right forward and around to the opposite FACE (shown), you are prepared to continue pivoting ½right forward and around to the original FACE (in a single MANEUVER) as indicated to be done.

3C-PAN-RIGHT

S T E P  3 - After pivoting ½right forward and around to the original FACE (shown), you are prepared to pivot ½right forward and around to the opposite FACE again (in a single MANEUVER), repeating the circular motion as indicated to be done.

3C-PAN-RIGHT
STEP 4 - Action completed            "!"

3C-PAN-LEFT

S T E P 1 - 3 consecutive forward left PANS done in the C-PAN METHOD (in a single MANEUVER) from a standing position up on the balls of your feet are executed by putting your weight on the ball of YOUR 1 (left foot), and <u>first pivoting on it ½ left forward</u> and around to the opposite FACE, by pushing your body forward and left with YOUR 2 (right foot) as indicated to be done.

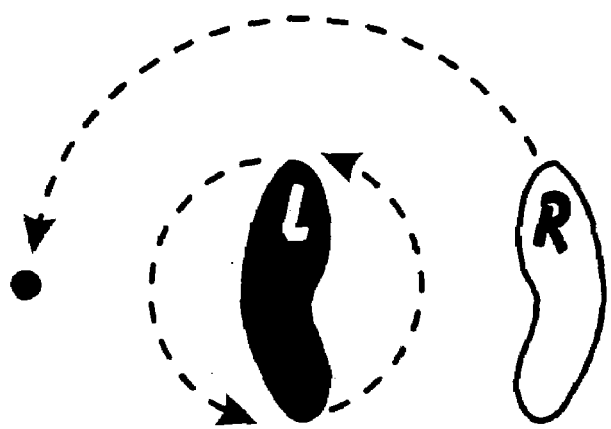

FIGURE 8-47

3C-PAN-LEFT

STEP 2 - After pivoting ½ left forward and around to the opposite FACE (shown), you are prepared to continue pivoting ½ left forward and around to the original FACE (in a single MANEUVER) as indicated to be done.

3C-PAN-LEFT

STEP 3 - After pivoting ½ left forward and around to the original FACE (shown), you are prepared to pivot ½ left forward and around to the opposite FACE again (in a single MANEUVER), repeating the circular motion as indicated to be done.

3C-PAN-LEFT
STEP 4 - Action completed "!"

2C-B'PAN-RIGHT

STEP 1 - 2 consecutive backward right PANS done in the C-PAN METHOD (in a single MANEUVER) from a standing position up on the balls of your feet are executed by putting your weight on the ball of YOUR 1 (left foot), and <u>first pivoting on it ½right backward</u> and around to the opposite FACE, by pushing your body backward and left with YOUR 2 (right foot) as indicated to be done.

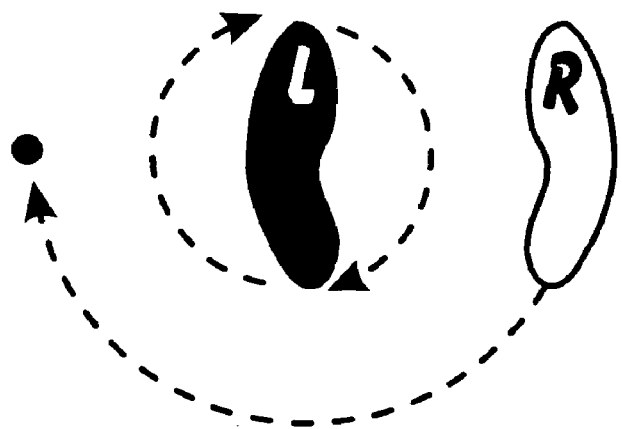

FIGURE 8-51

2C-B'PAN-RIGHT

S T E P  2 - After pivoting ½right backward and around to the opposite FACE (shown), you are prepared to continue pivoting ½right backward and around to the original FACE (in a single MANEUVER) creating the semi-circular motion as indicated to be done.

**DIAGRAMS 8-A
SERIES OF MANEUVERS (A)**

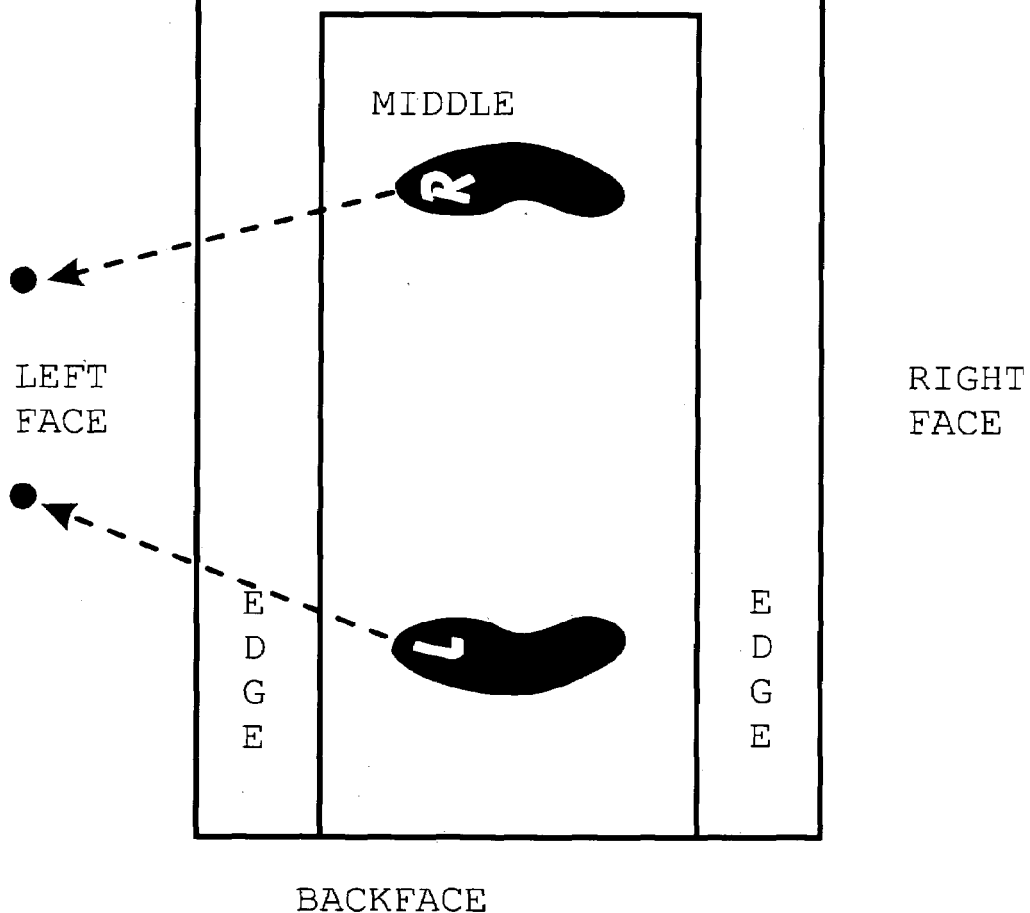
FIGURE 8.A-01

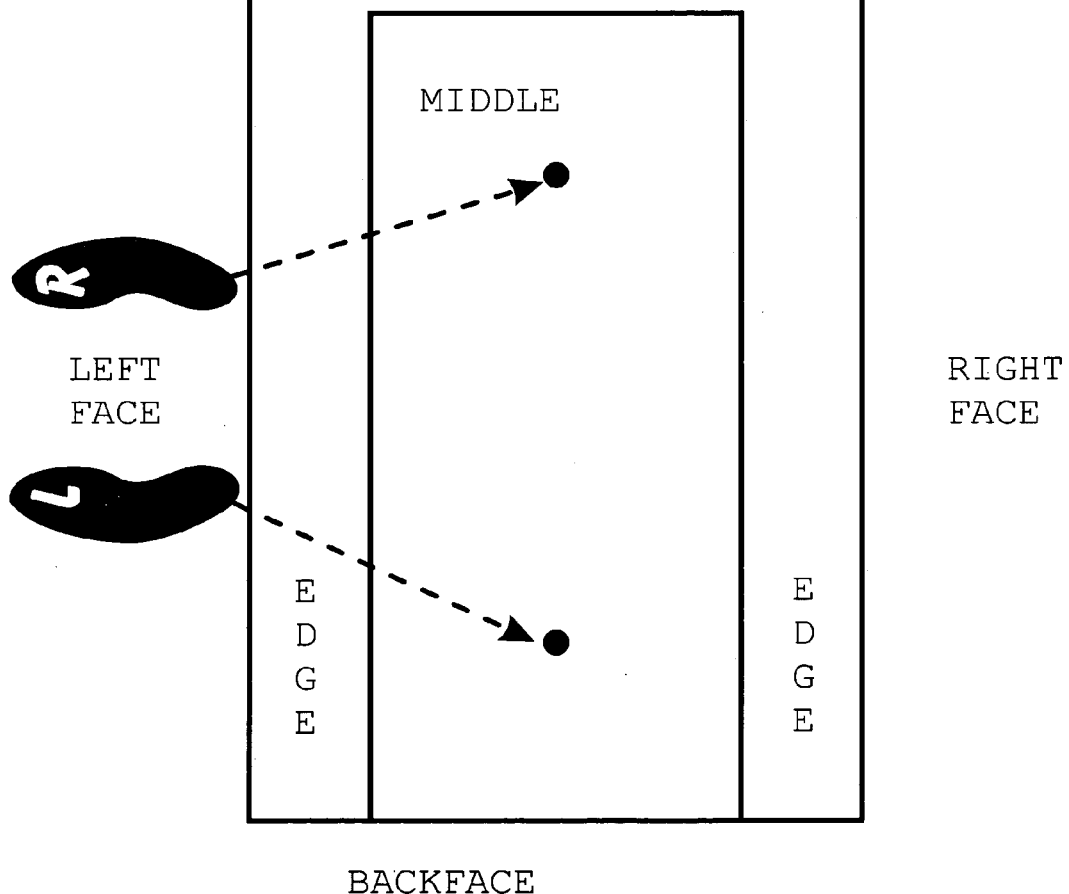
FIGURE 8.A-02

FRONT FACE

**\*\*\*SL2 (in one), RIGHT FACE, 5LEFT to FRONT FACE, R1 (in one), R2 (in one)/2C-B'PAN-LEFT, L2 (in one)/2SWITCH-LEFT, BR (in one)/SWITCH-LEFT, L1 (in one)/3C-PAN-RIGHT**

STEP 3 - LEFT FACE is secured by landing on the MIDDLE in LEFT FACE (shown) completing SL2 (in one). To continue with RIGHT FACE, a ½right turn from LEFT FACE to RIGHT FACE is executed by turning YOUR 1 (right foot) so that it lands pointing in FRONT FACE as indicated to be done.

MIDDLE

LEFT FACE

RIGHT FACE

E D G E

E D G E

BACKFACE

FIGURE 8.A-03

FRONT FACE
\*\*\*SL2 (in one), <u>RIGHT FACE</u>, 5LEFT to FRONT FACE, R1 (in one), R2 (in one)/2C-B'PAN-LEFT, L2 (in one)/2SWITCH-LEFT, BR (in one)/SWITCH-LEFT, L1 (in one)/3C-PAN-RIGHT
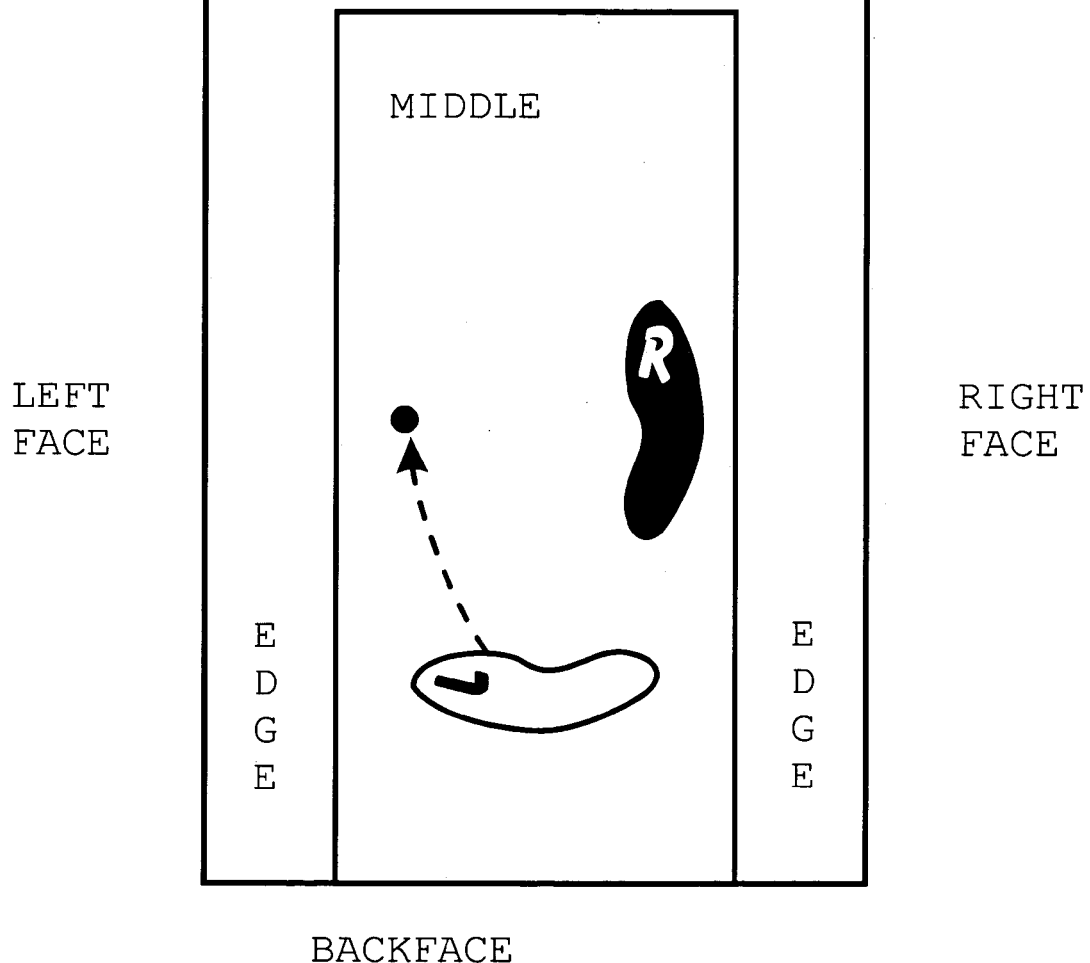
FIGURE 8.A-04

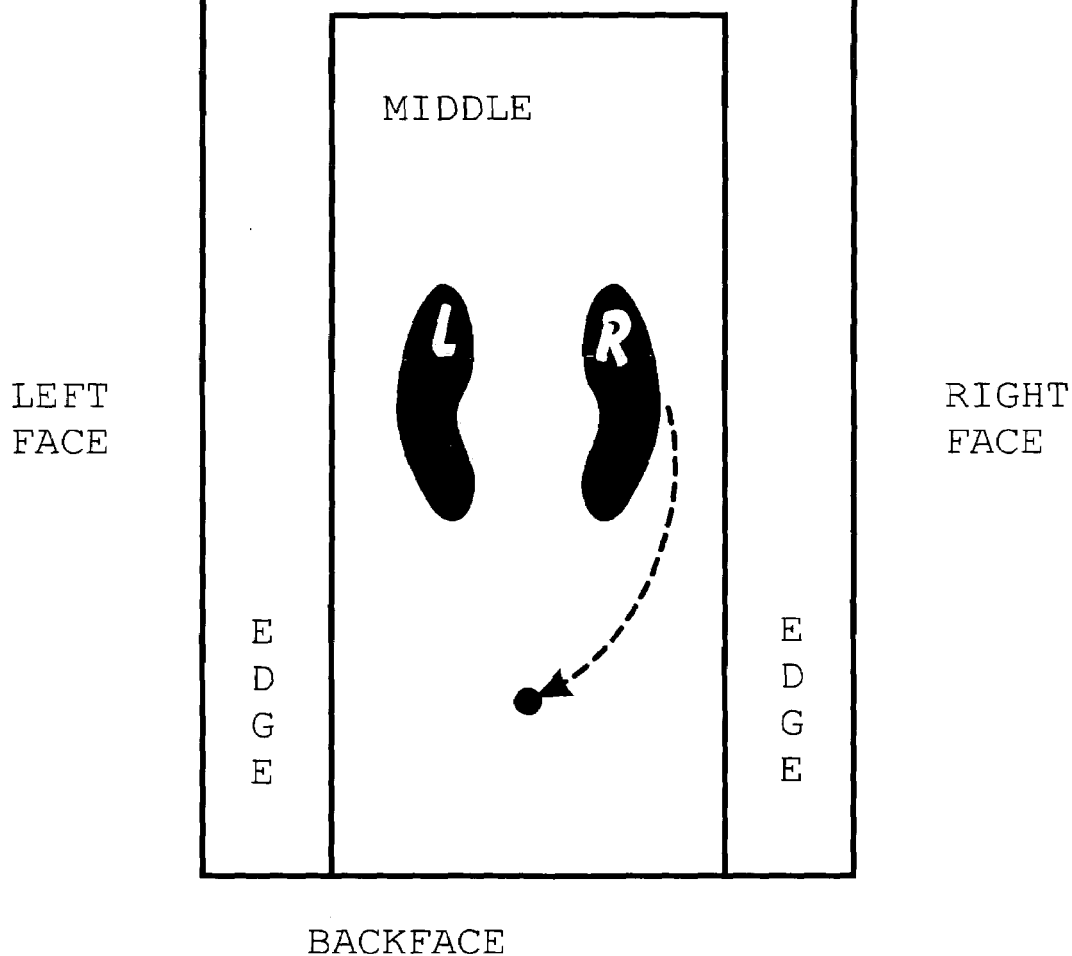
FIGURE 8.A-05

***SL2 (in one), <u>RIGHT FACE</u>, 5LEFT to FRONT FACE, R1 (in one), R2 (in one)/2C-B'PAN-LEFT, L2 (in one)/2SWITCH-LEFT, BR (in one)/SWITCH-LEFT, L1 (in one)/3C-PAN-RIGHT
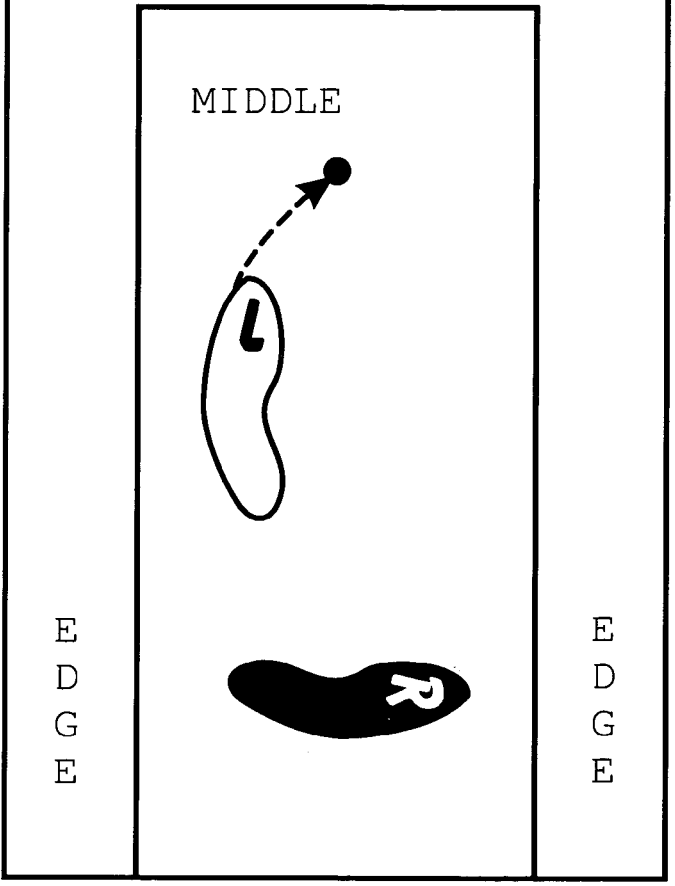
STEP 6 - With YOUR 1 landing in RIGHT FACE and your weight now transferred onto it, you are prepared to follow with YOUR 2.
FIGURE 8.A-06

FRONT FACE
*SL2 (in one), <u>RIGHT FACE</u>, 5LEFT to FRONT FACE**, R1 (in one), R2 (in one)/2C-B'PAN-LEFT, L2 (in one)/2SWITCH-LEFT, BR (in one)/SWITCH-LEFT, L1 (in one)/3C-PAN-RIGHT

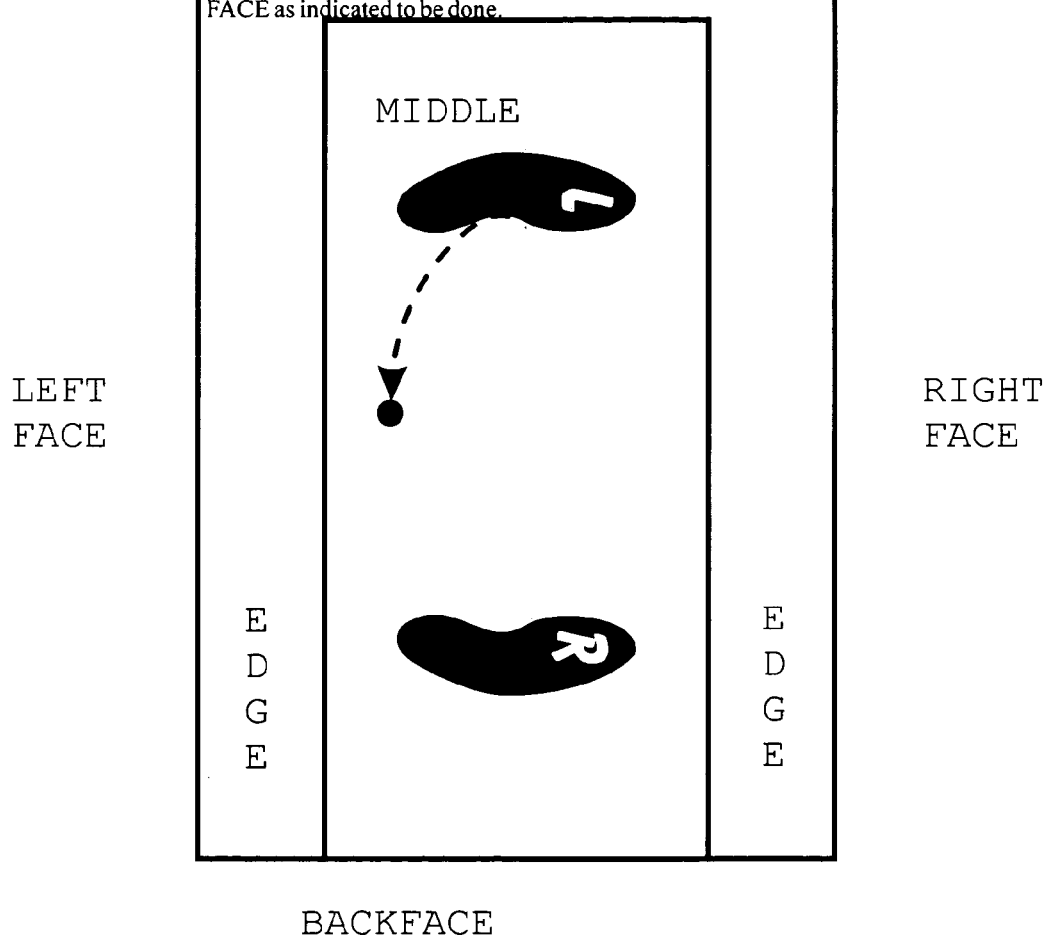

S T E P 7 - RIGHT FACE on the MIDDLE is secured by also landing YOUR 2 in RIGHT FACE alongside YOUR 1 (shown) completing RIGHT FACE. To continue with 5LEFT to FRONT FACE, 5¼left turns from RIGHT FACE on the MIDDLE (shown) to FRONT FACE are executed by turning YOUR 1 (left foot) so that it lands pointing in FRONT FACE as indicated to be done.

LEFT FACE

RIGHT FACE

BACKFACE

FIGURE 8.A-07

FRONT FACE
***SL2 (in one), RIGHT FACE, 5LEFT to FRONT FACE, R1 (in one), R2 (in one)/2C-B'PAN-LEFT, L2 (in one)/2SWITCH-LEFT, BR (in one)/SWITCH-LEFT, L1 (in one)/3C-PAN-RIGHT
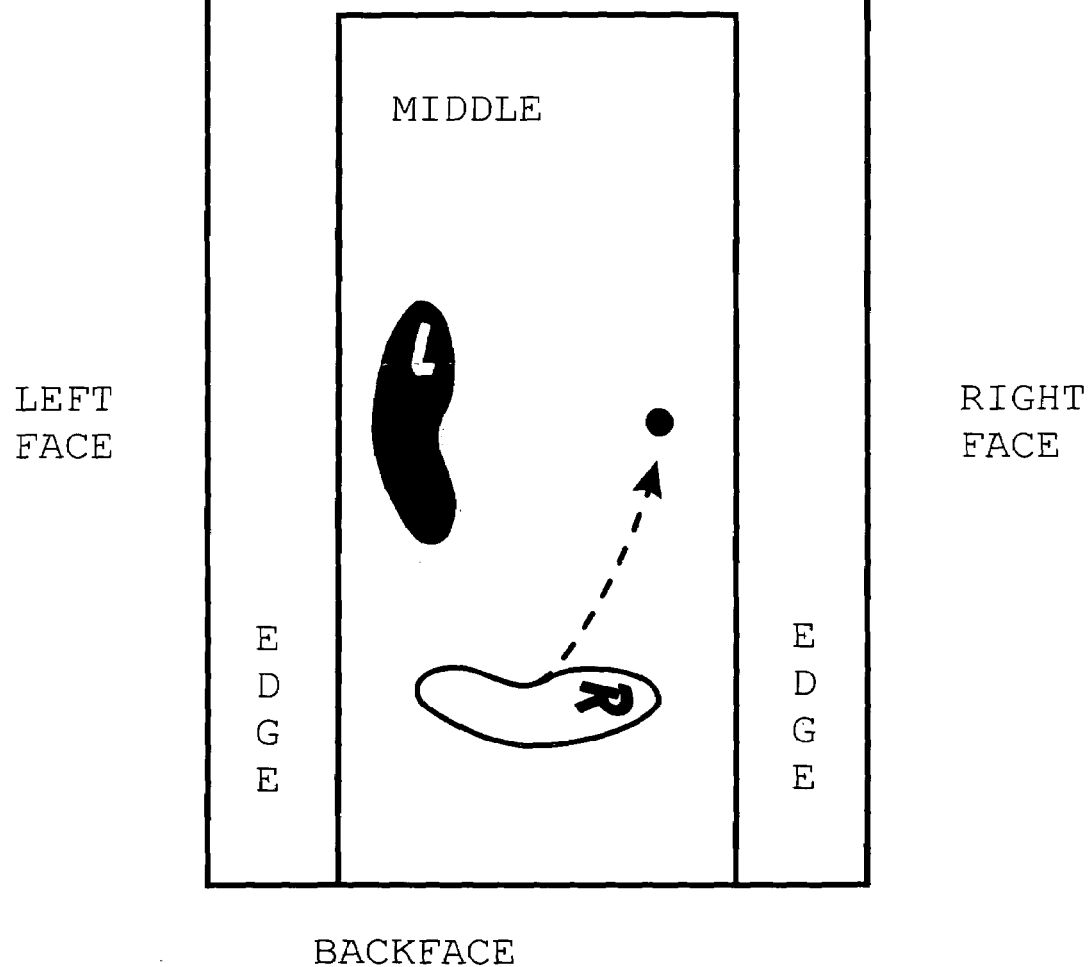
FIGURE 8.A-08

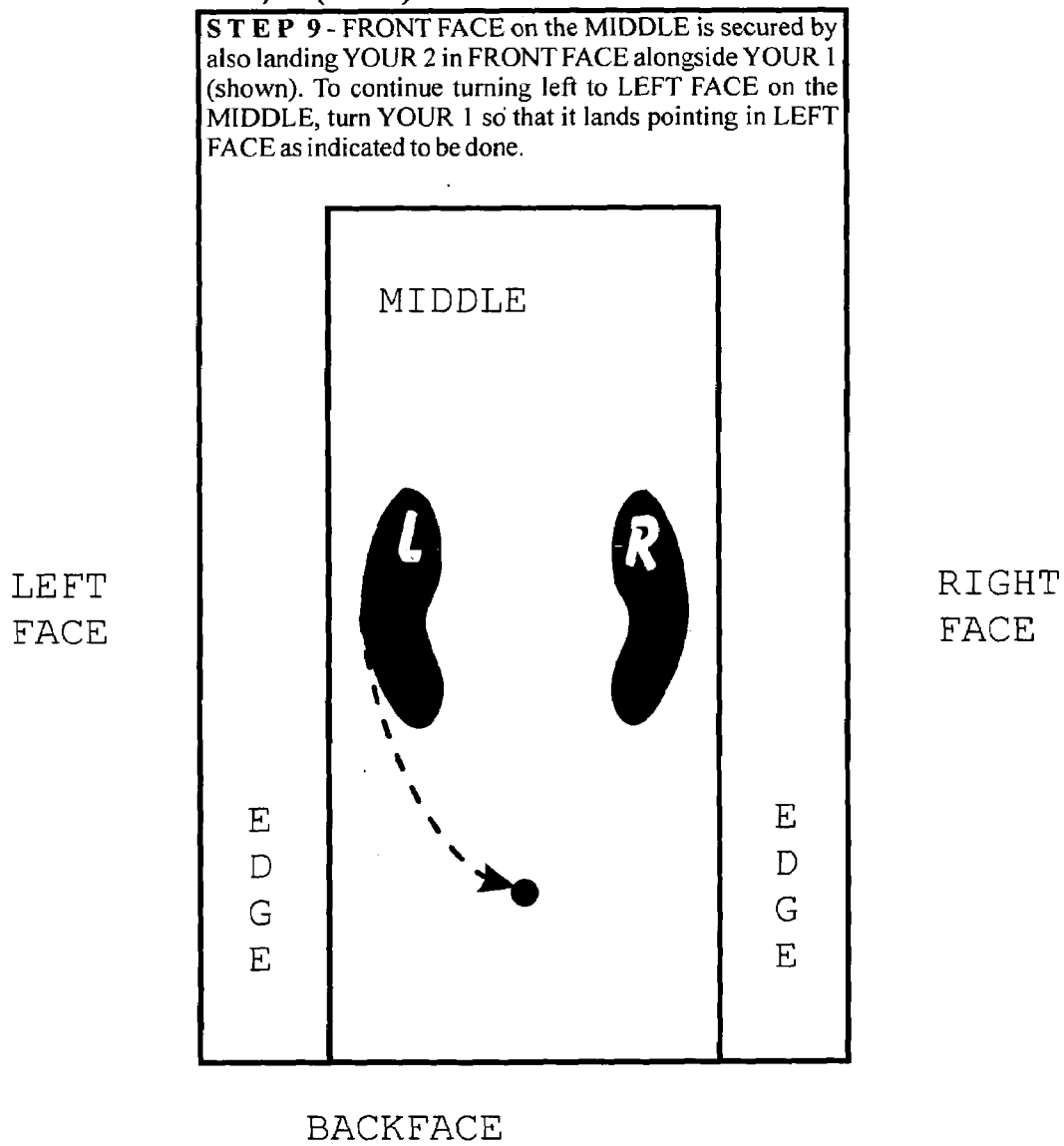
FIGURE 8.A-09

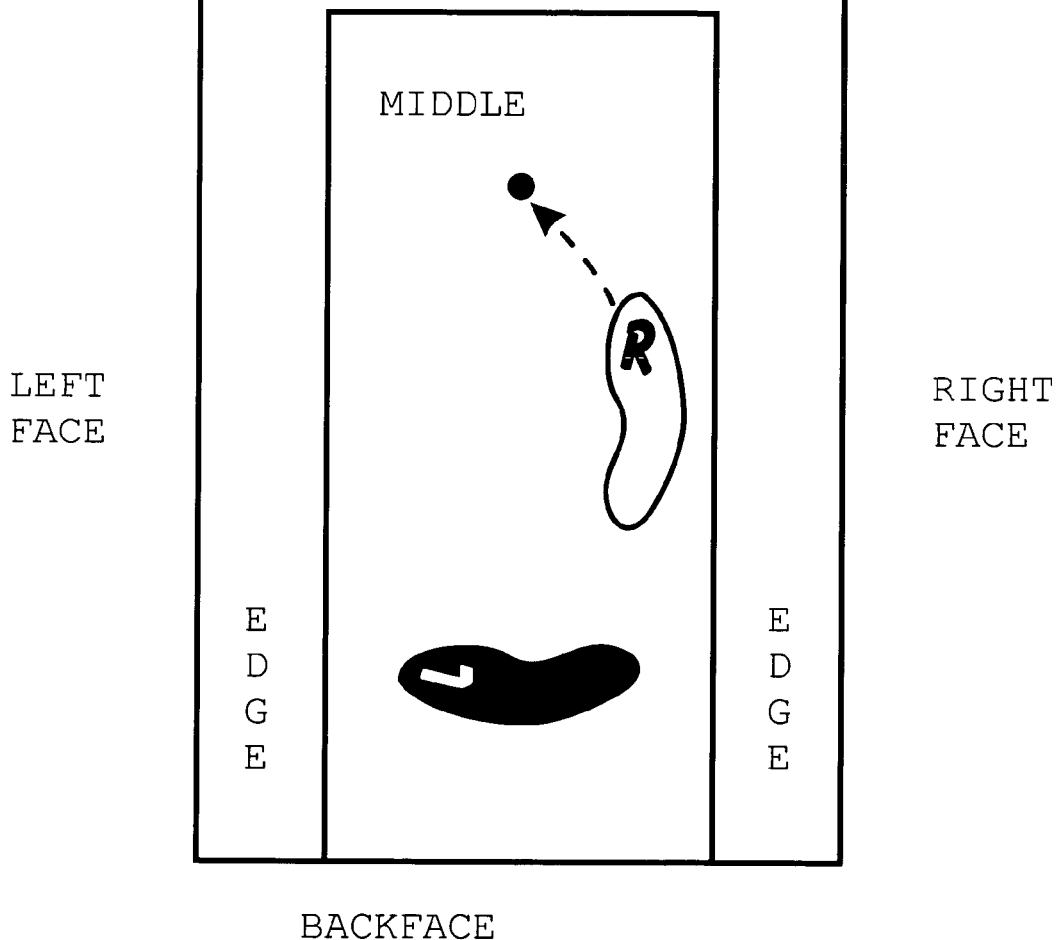
FIGURE 8.A-10

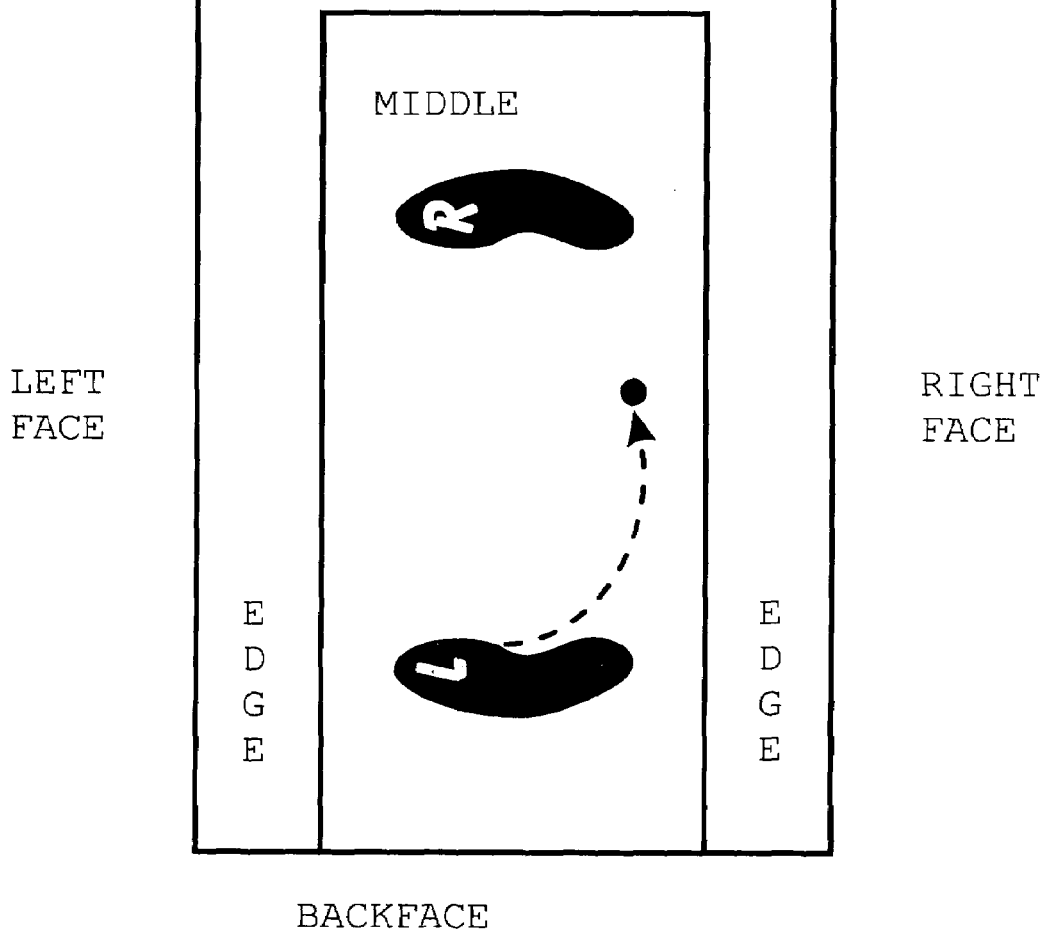
FIGURE 8.A-11

FRONT FACE

***SL2 (in one), RIGHT FACE, <u>5LEFT to FRONT FACE,</u> R1 (in one), R2 (in one)/2C-B'PAN-LEFT, L2 (in one)/2SWITCH-LEFT, BR (in one)/SWITCH-LEFT, L1 (in one)/3C-PAN-RIGHT STEP 12 - With YOUR 1 landing in BACK FACE and your weight now transferred onto it, you are prepared to follow with YOUR 2.

MIDDLE

LEFT FACE

RIGHT FACE

EDGE

EDGE

BACKFACE

FIGURE 8.A-12

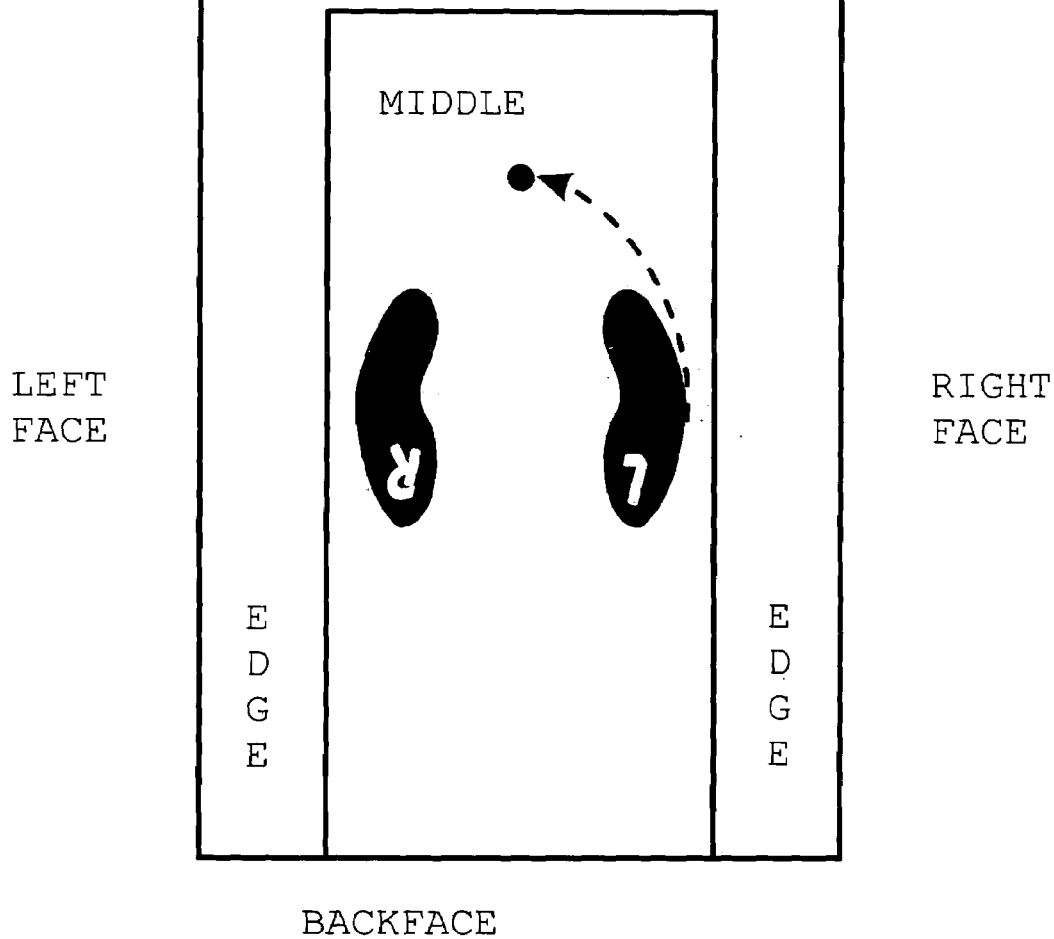
FIGURE 8.A-13

FRONT FACE
***SL2 (in one), RIGHT FACE, 5LEFT to FRONT FACE, R1 (in one), R2 (in one)/2C-B'PAN-LEFT, L2 (in one)/2SWITCH-LEFT, BR (in one)/SWITCH-LEFT, L1 (in one)/3C-PAN-RIGHT STEP 14 - With YOUR 1 landing in RIGHT FACE and your weight now transferred onto it, you are prepared to follow with YOUR 2.

MIDDLE

LEFT FACE

RIGHT FACE

EDGE

EDGE

BACKFACE

FIGURE 8.A-14

FRONT FACE
\*\*\*SL2 (in one), RIGHT FACE, 5LEFT to FRONT FACE, R1 (in one), R2 (in one)/2C-B'PAN-LEFT, L2 (in one)/2SWITCH-LEFT, BR (in one)/SWITCH-LEFT, L1 (in one)/3C-PAN-RIGHT

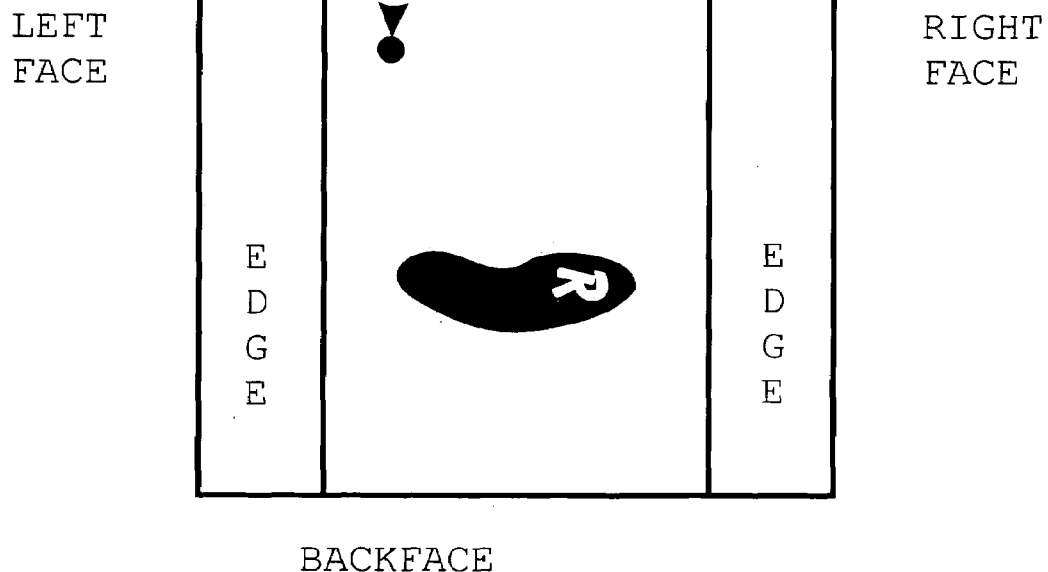

STEP 15 - RIGHT FACE on the MIDDLE is secured by also landing YOUR 2 in RIGHT FACE alongside YOUR 1 (shown); to complete 5LEFT to FRONT FACE, repeat STEPS 8 15 four more times for 5 full left turns, and then execute an additional ¼left turn from RIGHT FACE to FRONT FACE by turning YOUR 1 so that it lands pointing in FRONT FACE as indicated to be done.

FIGURE 8.A-15

FRONT FACE
***SL2 (in one), RIGHT FACE, <u>5LEFT to FRONT FACE</u>, R1 (in one), R2 (in one)/2C-B'PAN-LEFT, L2 (in one)/2SWITCH-LEFT, BR (in one)/SWITCH-LEFT, L1 (in one)/3C-PAN-RIGHT
STEP 16 - With YOUR 1 landing in FRONT FACE and your weight now transferred onto it, you are prepared to follow with YOUR 2.
LEFT FACE
MIDDLE
EDGE
RIGHT FACE
EDGE
BACKFACE
FIGURE 8.A-16

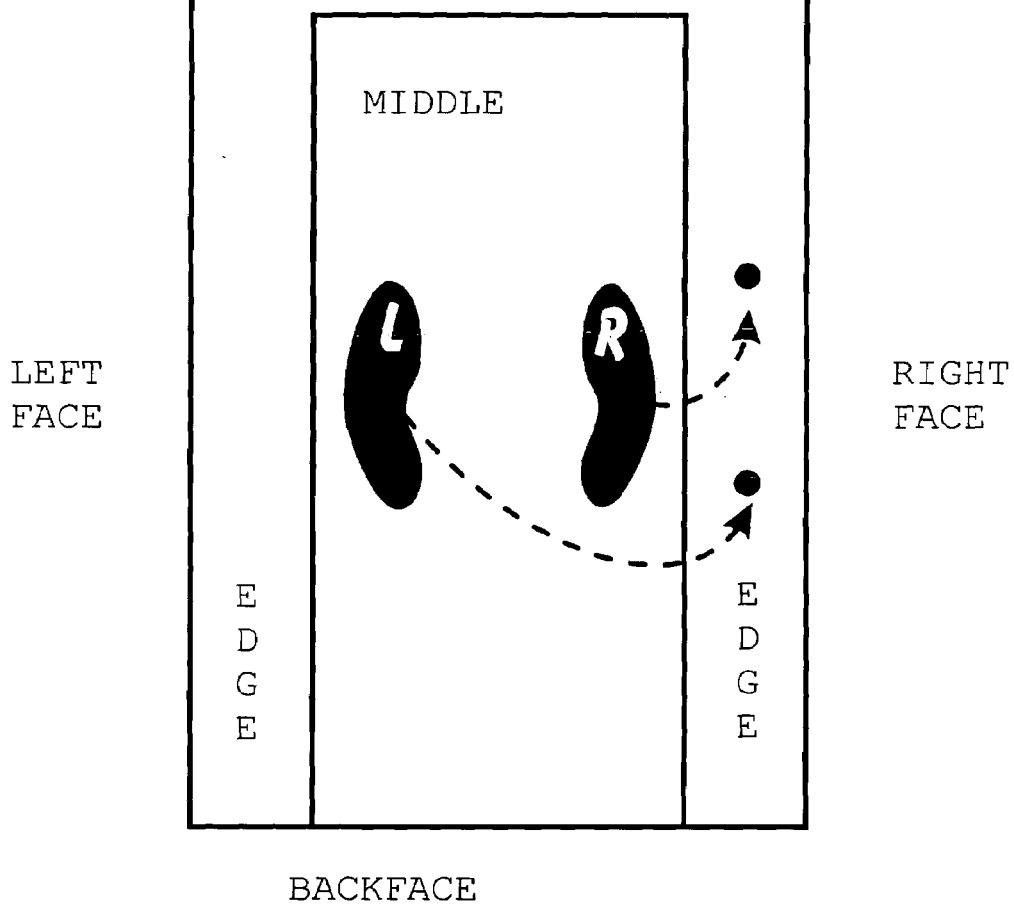
FIGURE 8.A-17

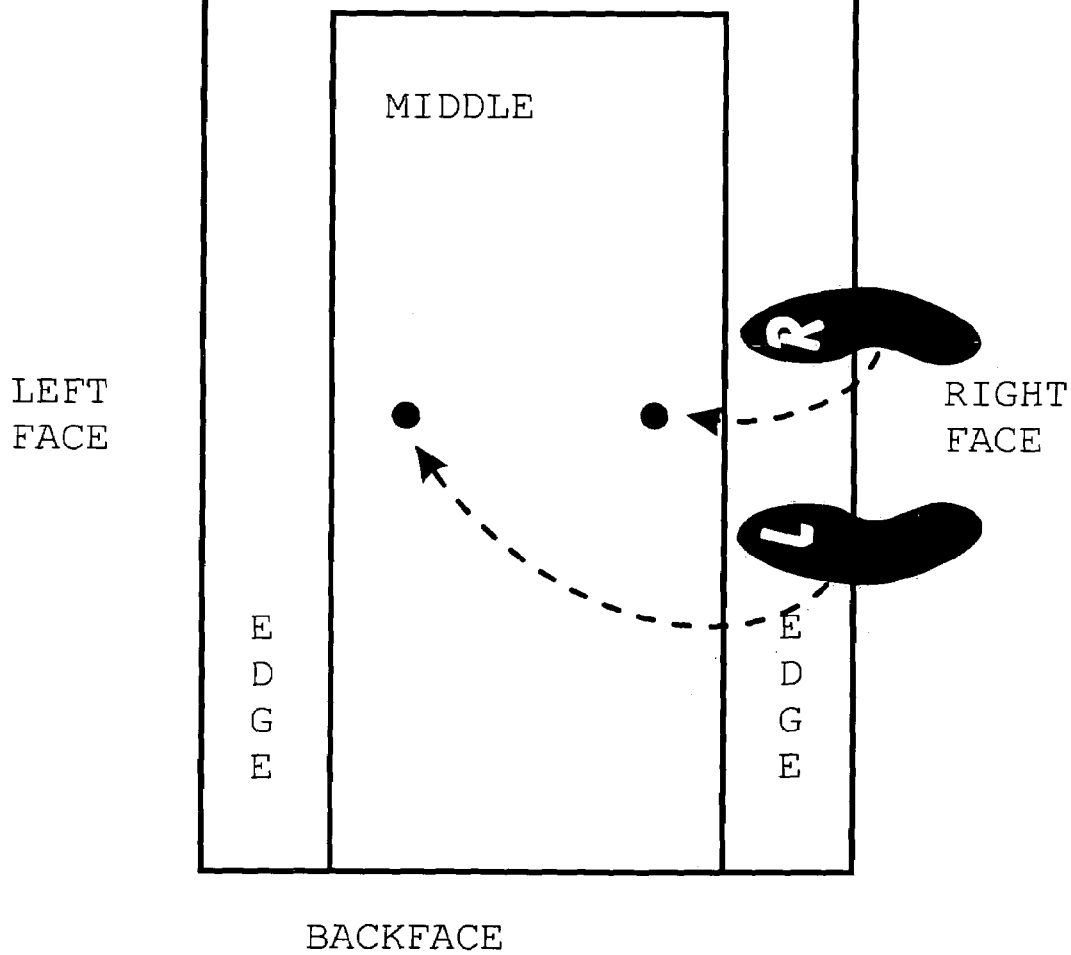
FIGURE 8.A-18

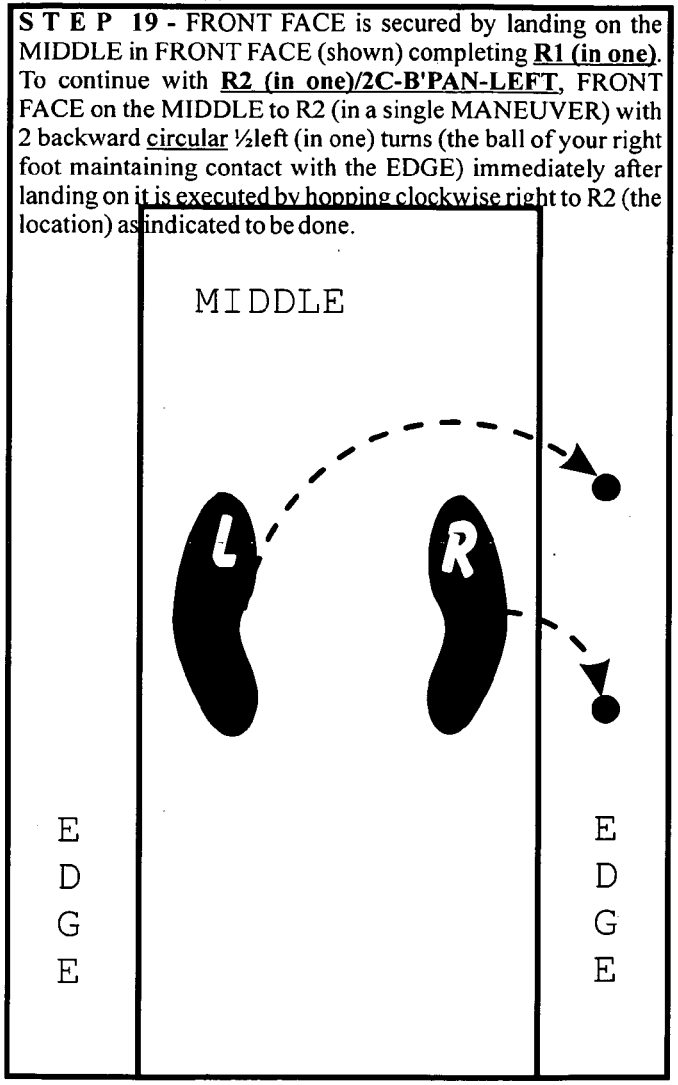
FIGURE 8.A-19

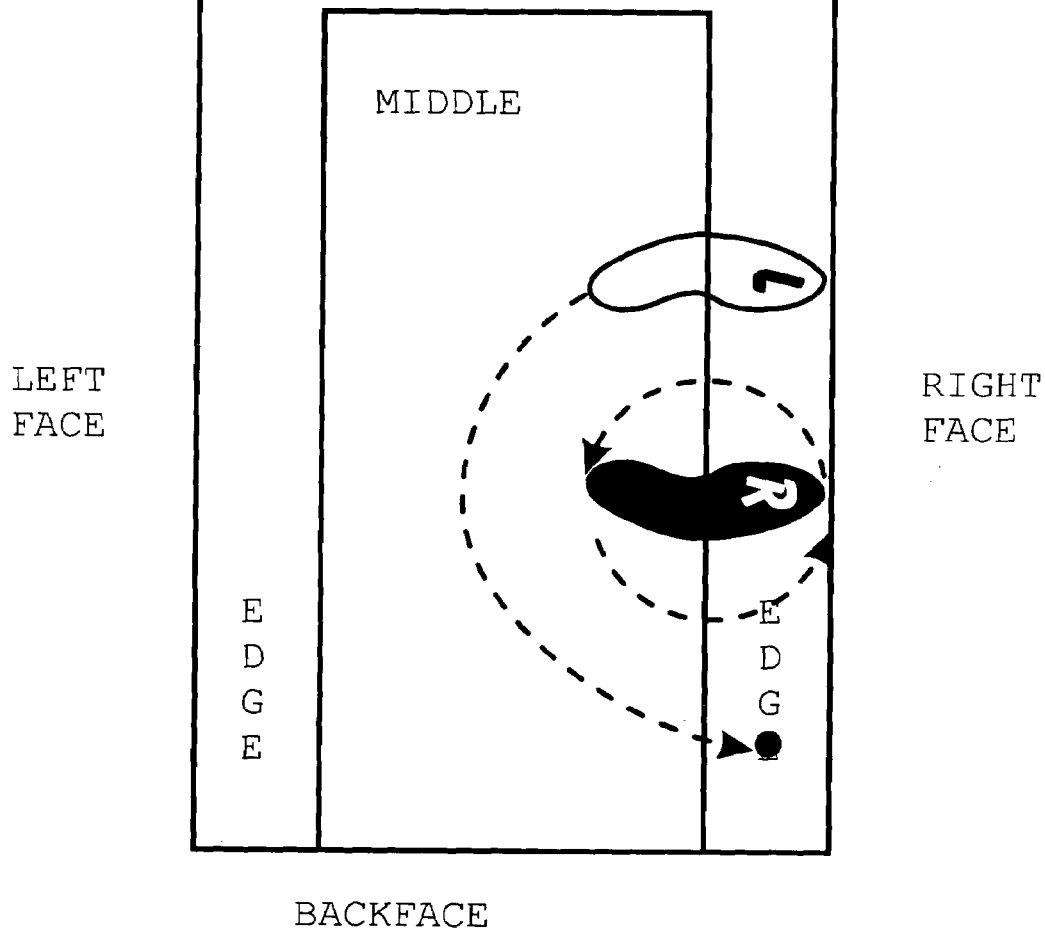
FIGURE 8.A-20

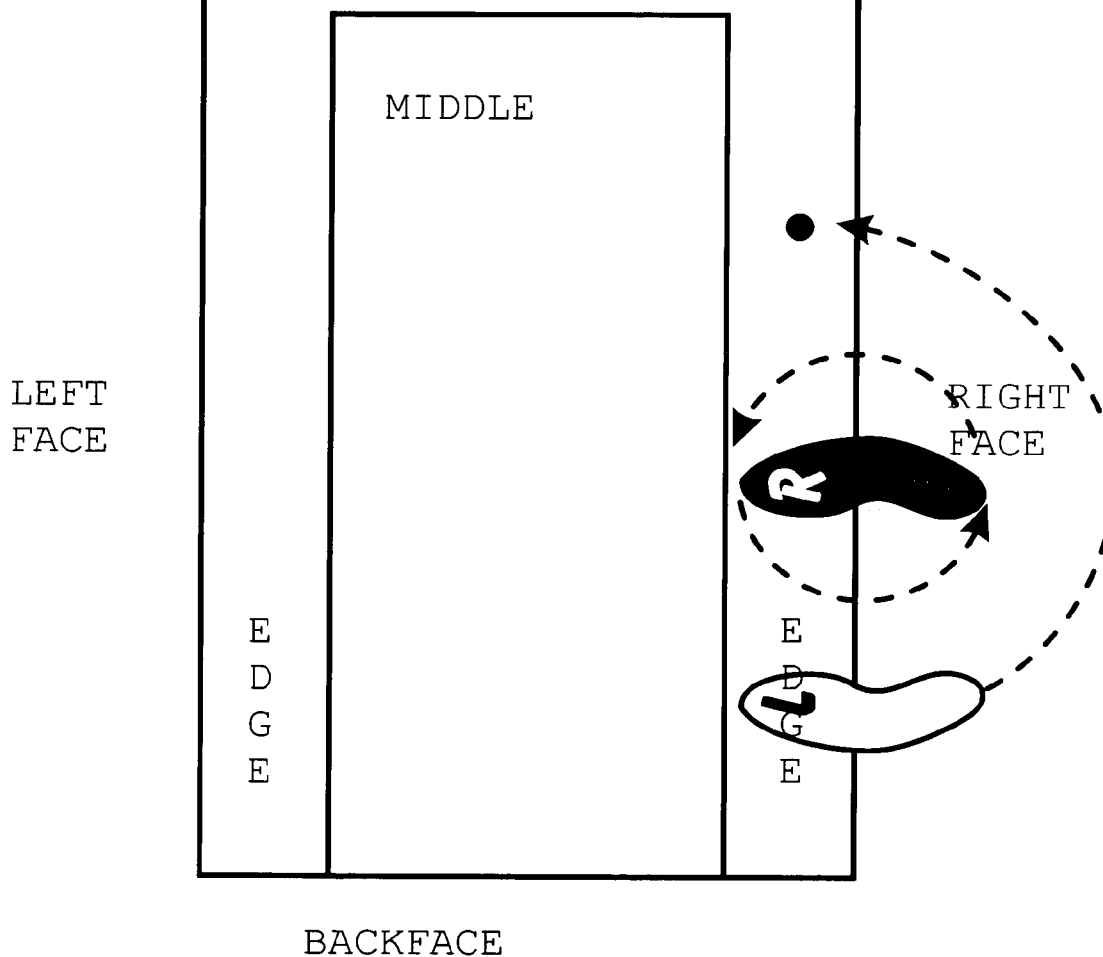
FIGURE 8.A-21

FRONT FACE
***SL2 (in one), RIGHT FACE, 5LEFT to FRONT FACE, R1 (in one), <u>R2 (in one)/2C-B'PAN-LEFT</u>, L2 (in one)/2SWITCH-LEFT, BR (in one)/SWITCH-LEFT, L1 (in one)/3C-PAN-RIGHT
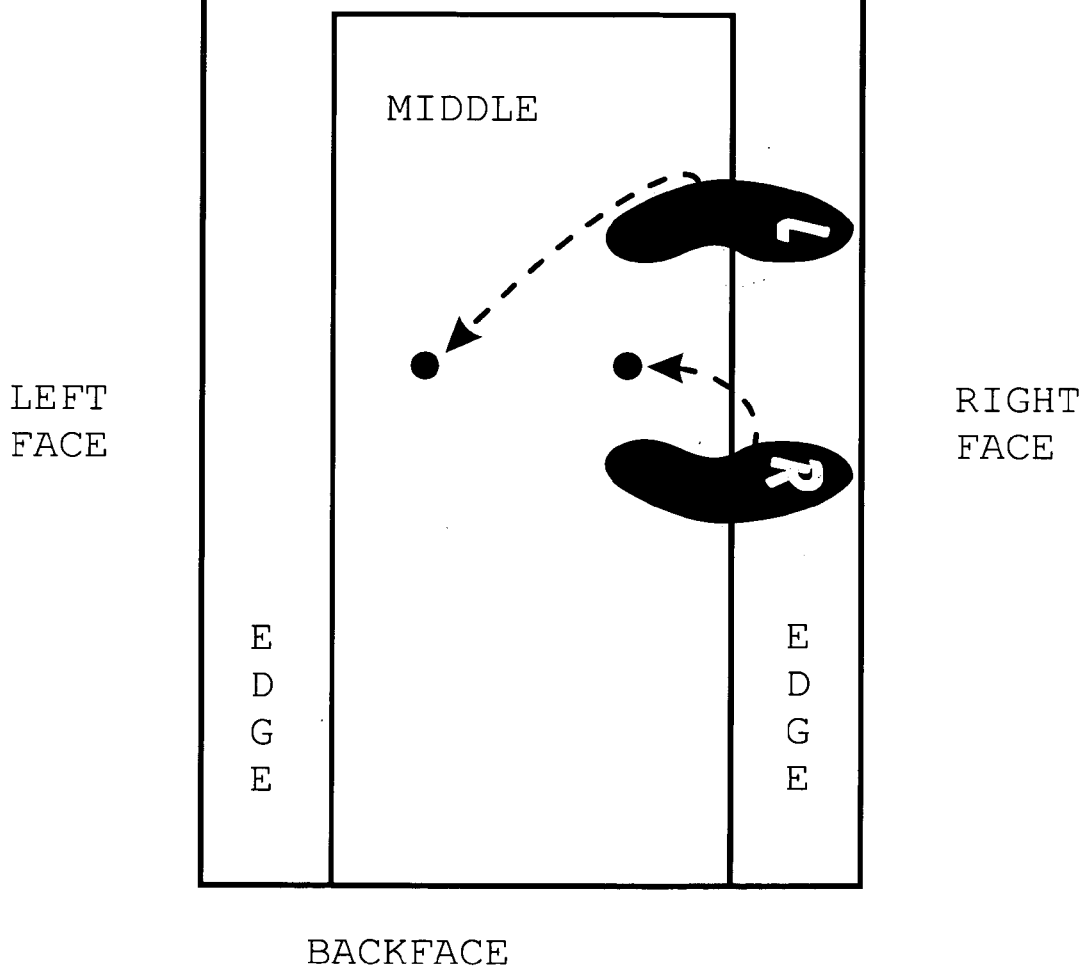
STEP 22 - After pivoting ½left backward and around to R2 (shown), you are prepared to hop back to the MIDDLE in FRONT FACE (in a single MANEUVER) as indicated to be done.
FIGURE 8.A-22

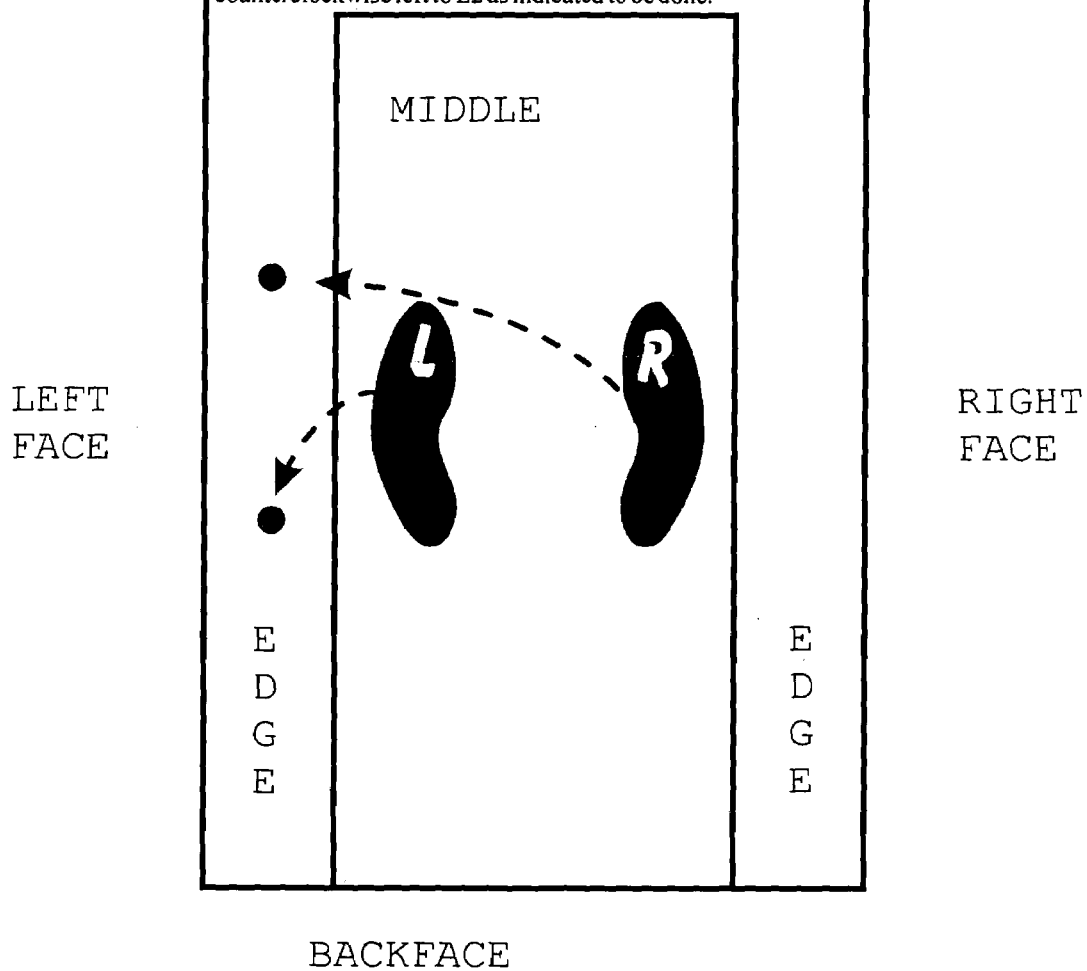
FIGURE 8.A-23

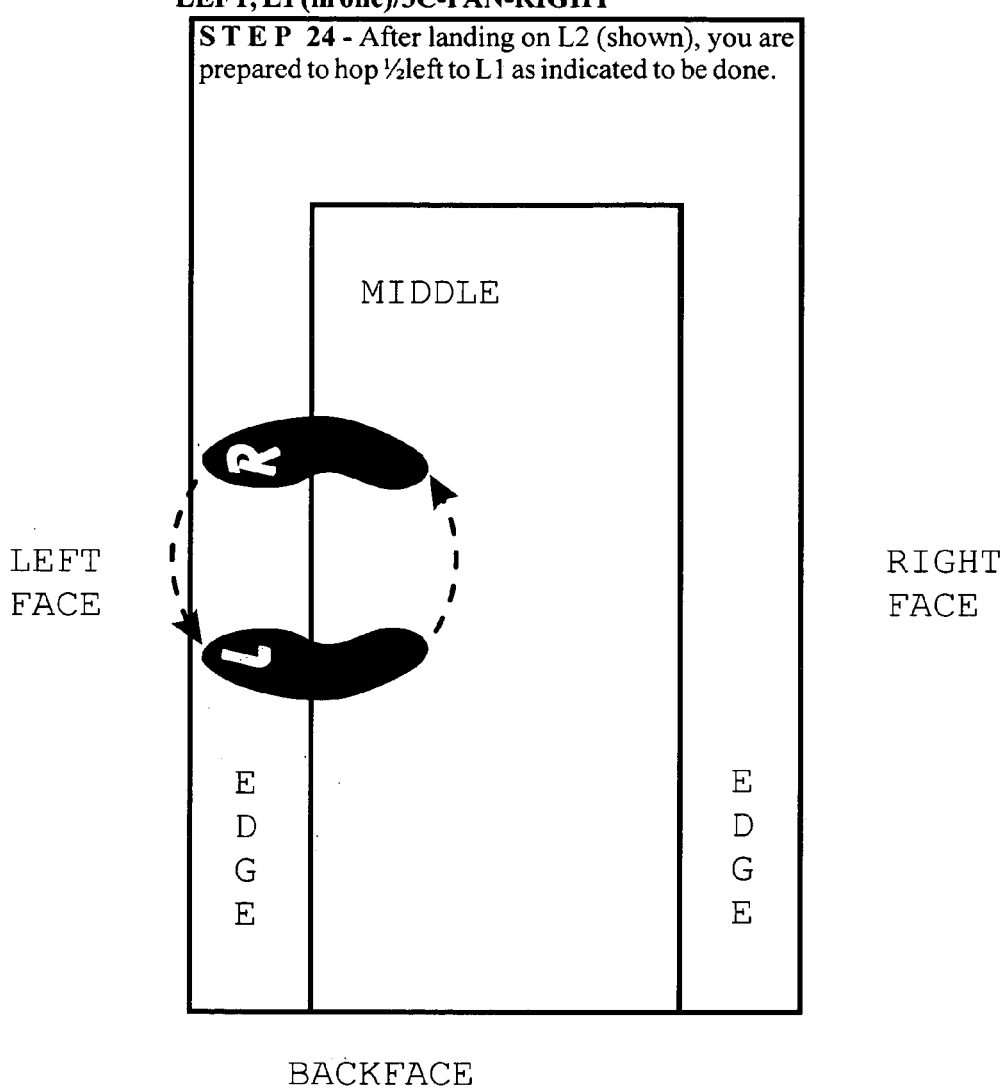
FIGURE 8.A-24

FRONT FACE
***SL2 (in one), RIGHT FACE, 5LEFT to FRONT
FACE, R1 (in one), R2 (in one)/2C-B'PAN-LEFT, <u>L2
(in one)/2SWITCH-LEFT</u>, BR (in one)/SWITCH-
LEFT, L1 (in one)/3C-PAN-RIGHT
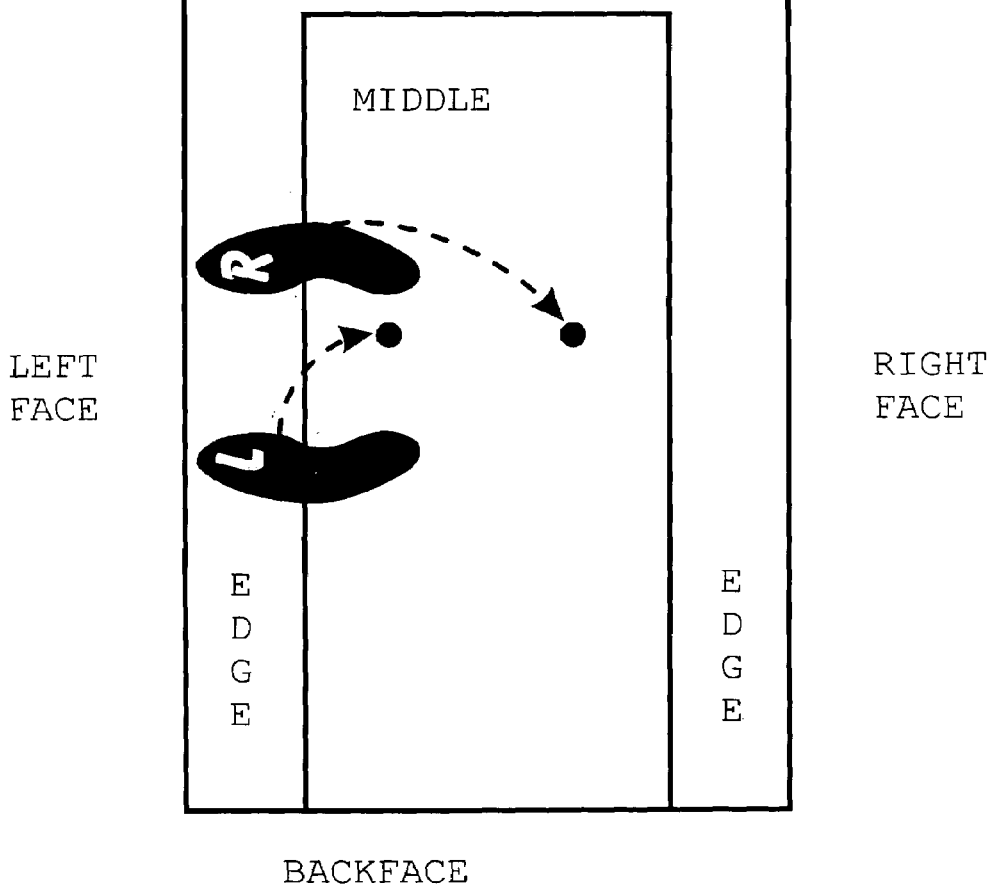
STEP 26 - After landing on L2 (shown), you are prepared to hop back to the MIDDLE in FRONT FACE (in a single MANEUVER) as indicated to be done.
FIGURE 8.A-26

FRONT FACE
*SL2 (in one), RIGHT FACE, 5LEFT to FRONT FACE, R1 (in one), R2 (in one)/2C-B'PAN-LEFT, L2 (in one)/2SWITCH-LEFT**, BR (in one)/SWITCH-LEFT, L1 (in one)/3C-PAN-RIGHT

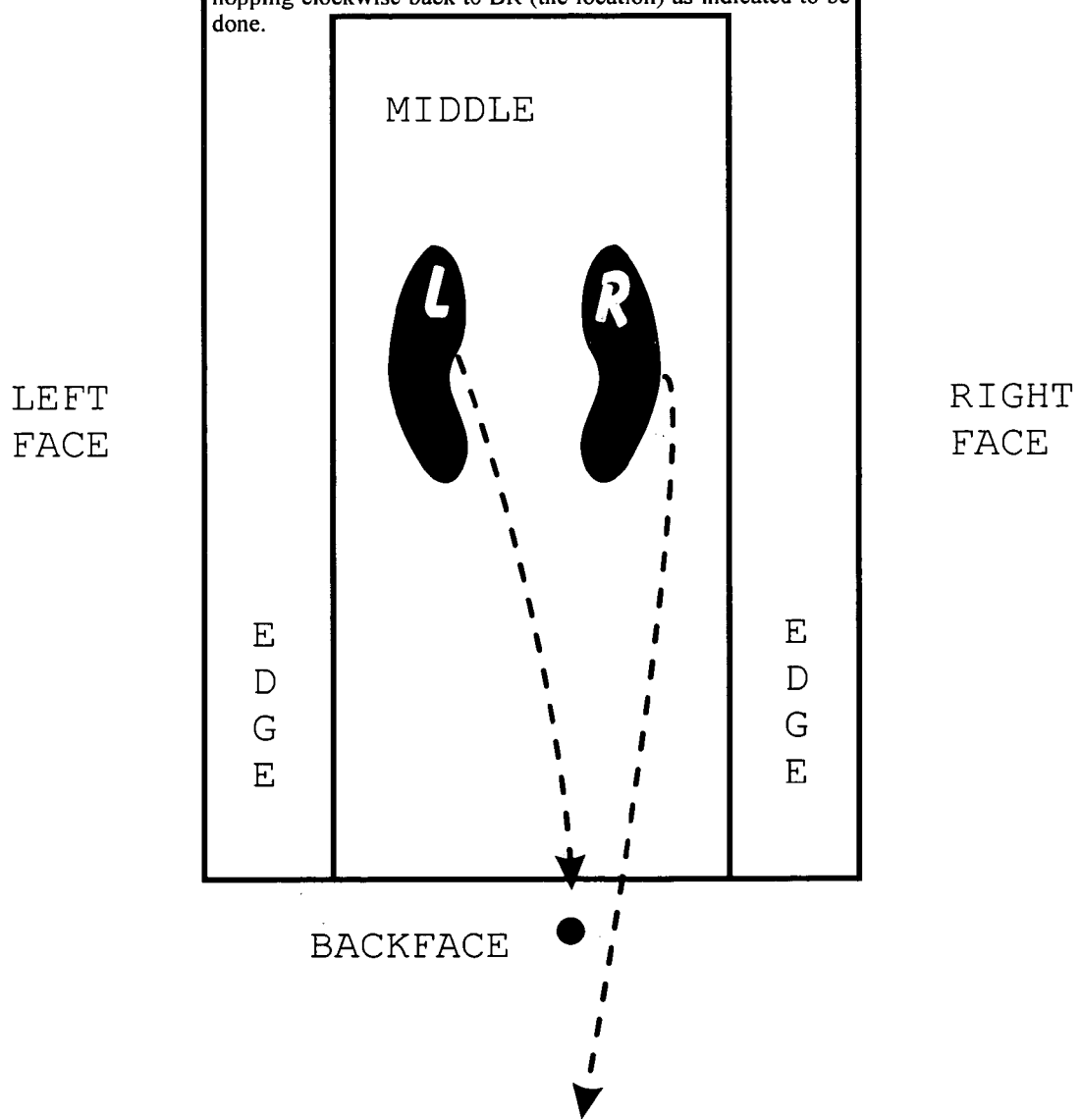

STEP 27 - FRONT FACE is secured by landing on the MIDDLE in FRONT FACE (shown) completing L2 (in one)/2SWITCH-LEFT. To continue with BR (in one)/SWITCH-LEFT, FRONT FACE on the MIDDLE to BR (in a single MANEUVER) with a rapid-fire semi-circular ½left (in one) turn to BL immediately after landing on it is executed by hopping clockwise back to BR (the location) as indicated to be done.

FIGURE 8.A-27

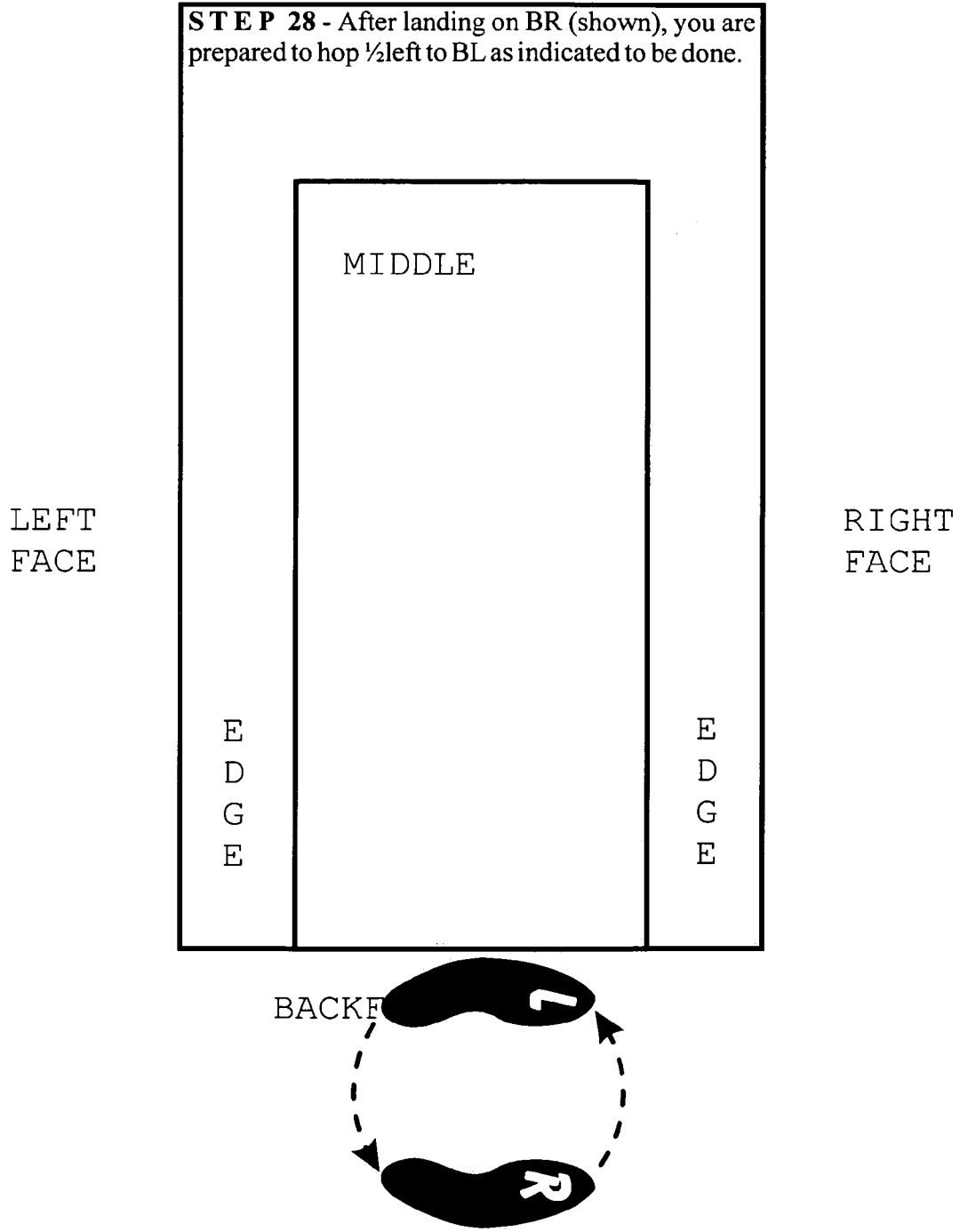
FIGURE 8.A-28

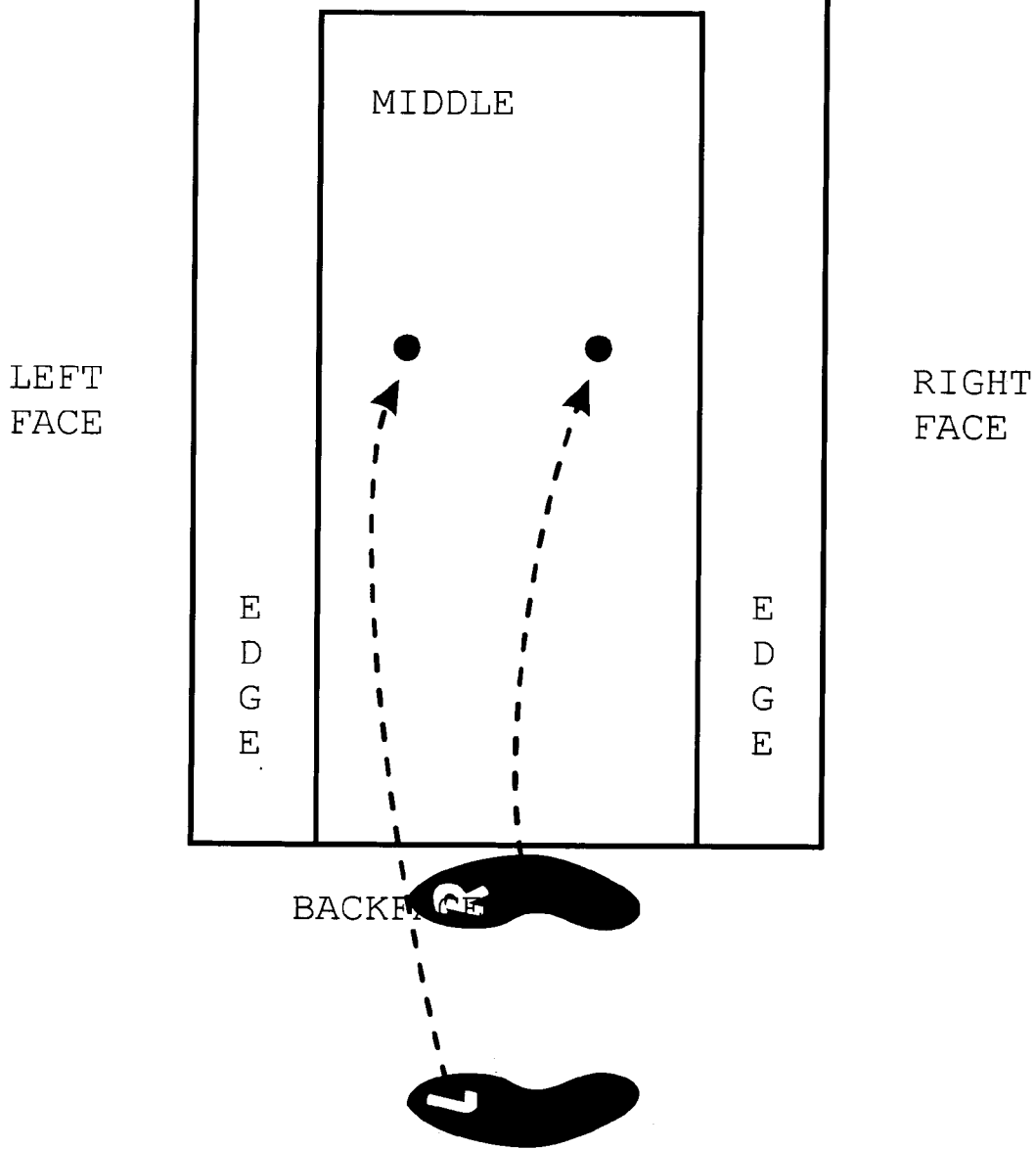
FIGURE 8.A-29

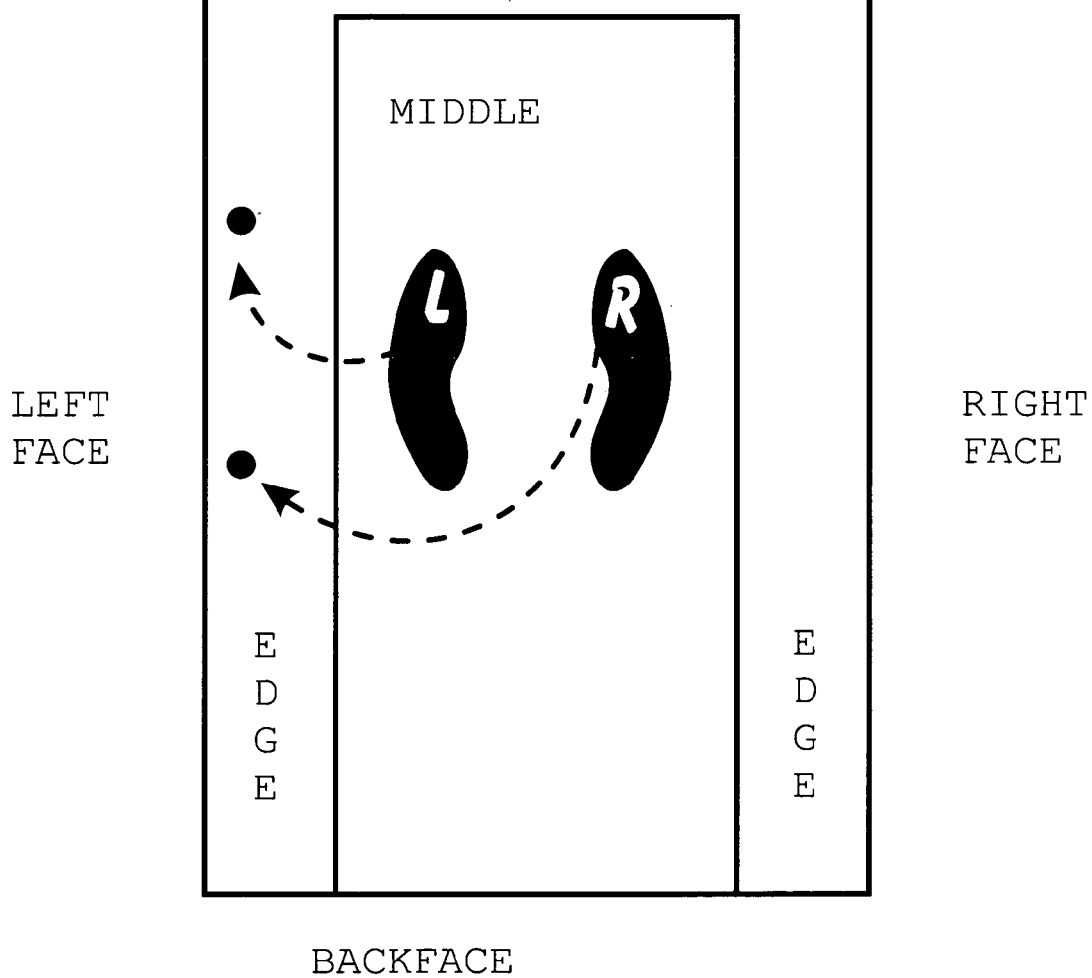
FIGURE 8.A-30

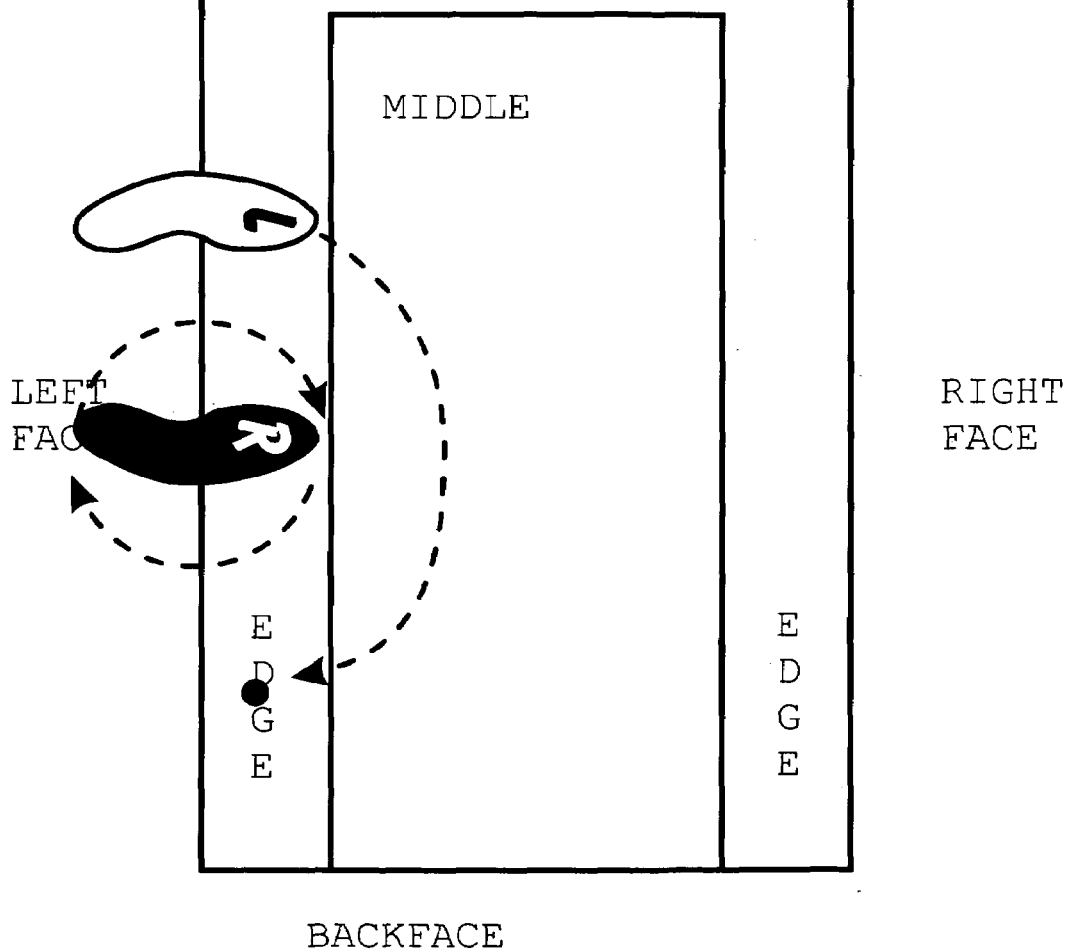
FIGURE 8.A-31

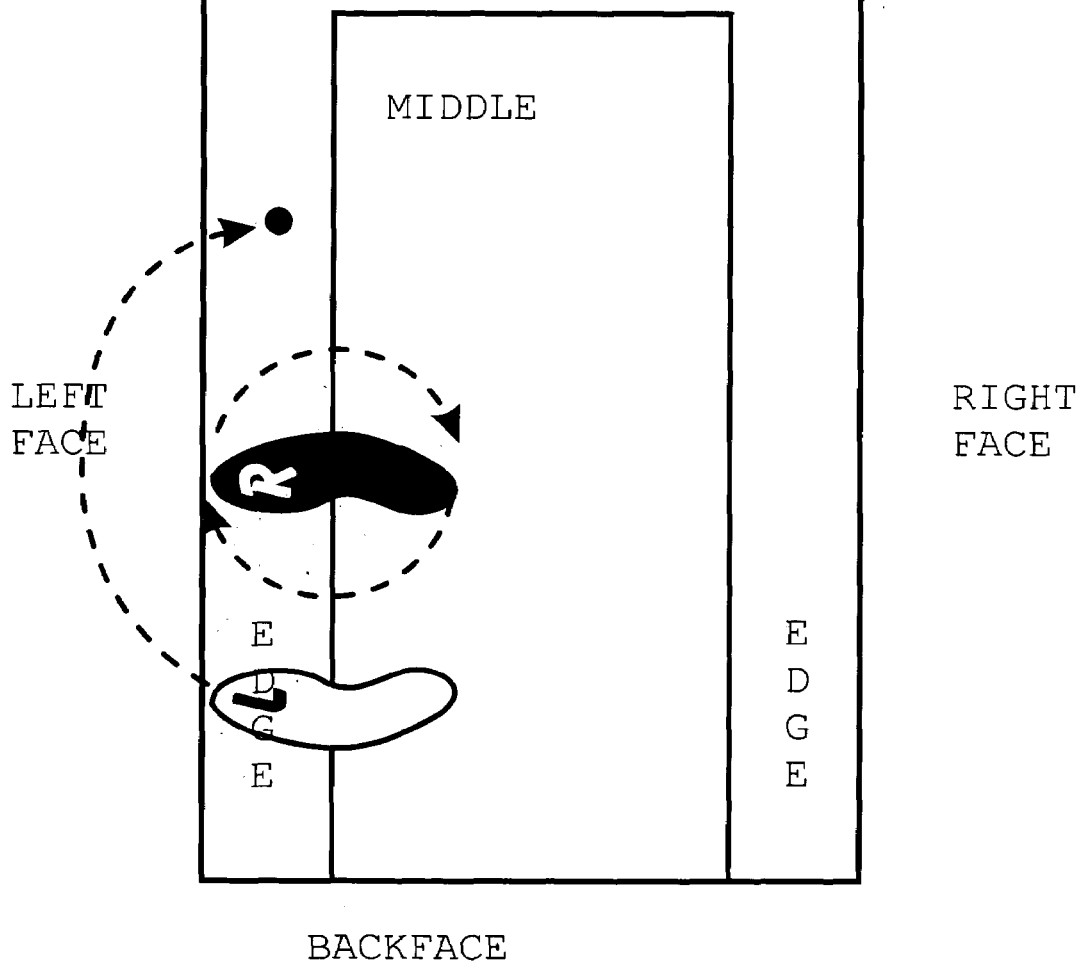
FIGURE 8.A-32

FRONT FACE
***SL2 (in one), RIGHT FACE, 5LEFT to FRONT FACE, R1 (in one), R2 (in one)/2C-B'PAN-LEFT, L2 (in one)/2SWITCH-LEFT, BR (in one)/SWITCH-LEFT, L1 (in one)/3C-PAN-RIGHT
STEP 33 - After pivoting ½right forward and around to L1 (shown), you are prepared to pivot ½right forward and around to L2 again (in a single MANEUVER), repeating the circular motion as indicated to be done.
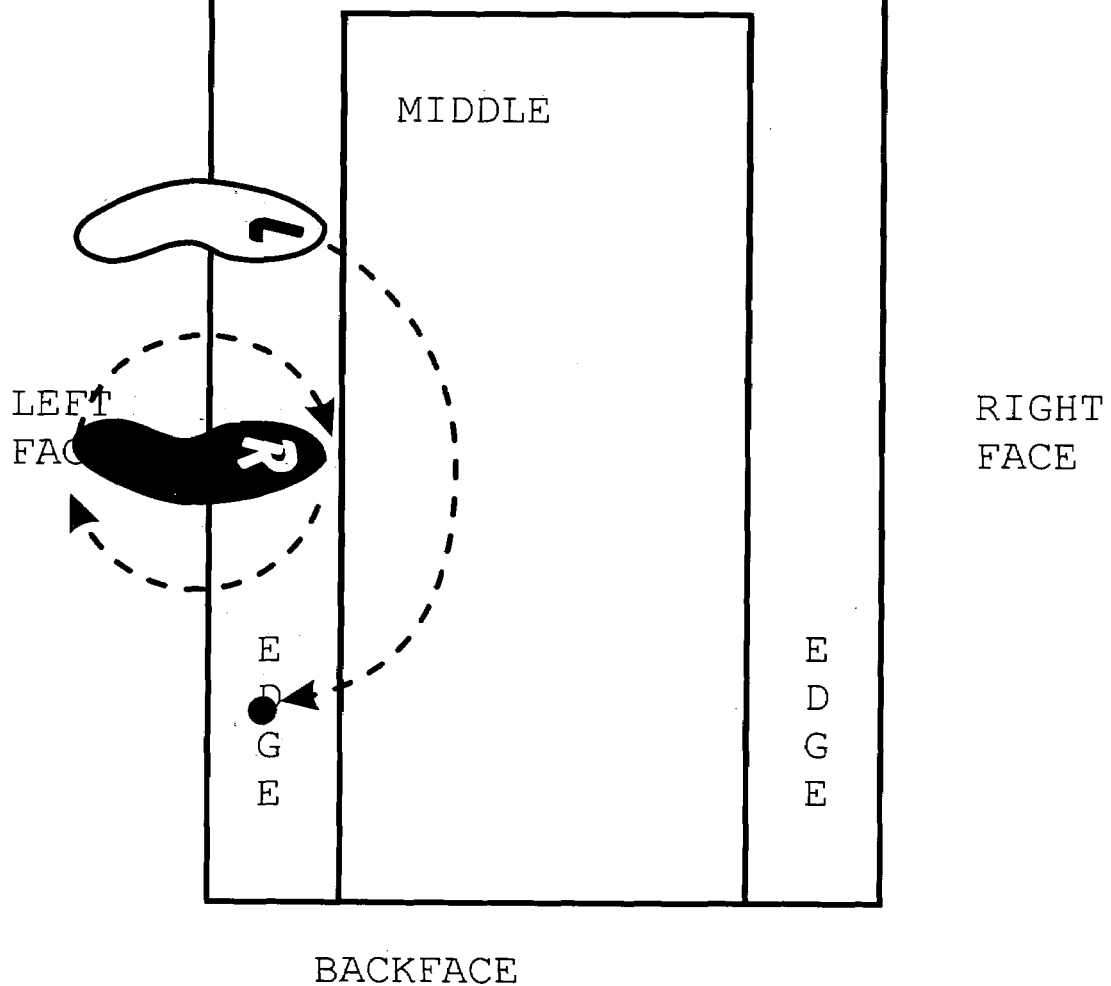
FIGURE 8.A-33

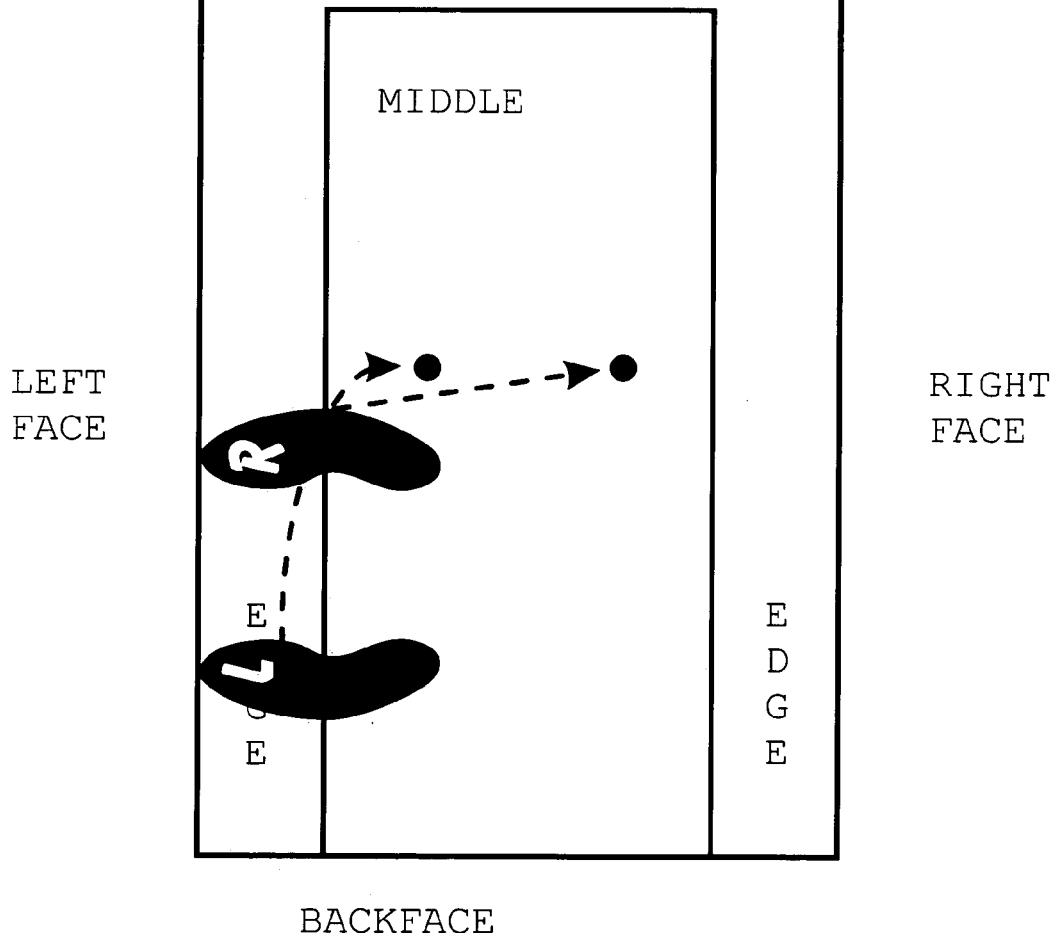
FIGURE 8.A-34

FRONT FACE
***SL2 (in one), RIGHT FACE, 5LEFT to FRONT FACE, R1 (in one), R2 (in one)/2C-B'PAN-LEFT, L2 (in one)/2SWITCH-LEFT, BR (in one)/SWITCH-LEFT, L1 (in one)/3C-PAN-RIGHT
STEP 35 - FRONT FACE is secured by landing on the MIDDLE in FRONT FACE (shown) completing L1 (in one)/3C-PAN-RIGHT, and the entire series of MANEUVERS... "!"
LEFT FACE
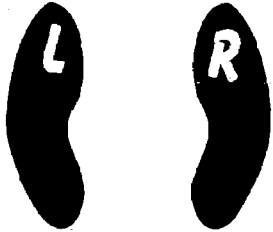
MIDDLE
EDGE
RIGHT FACE
EDGE
BACKFACE
FIGURE 8.A-35

**DIAGRAMS 8-B
SERIES OF MANEUVERS (B)**

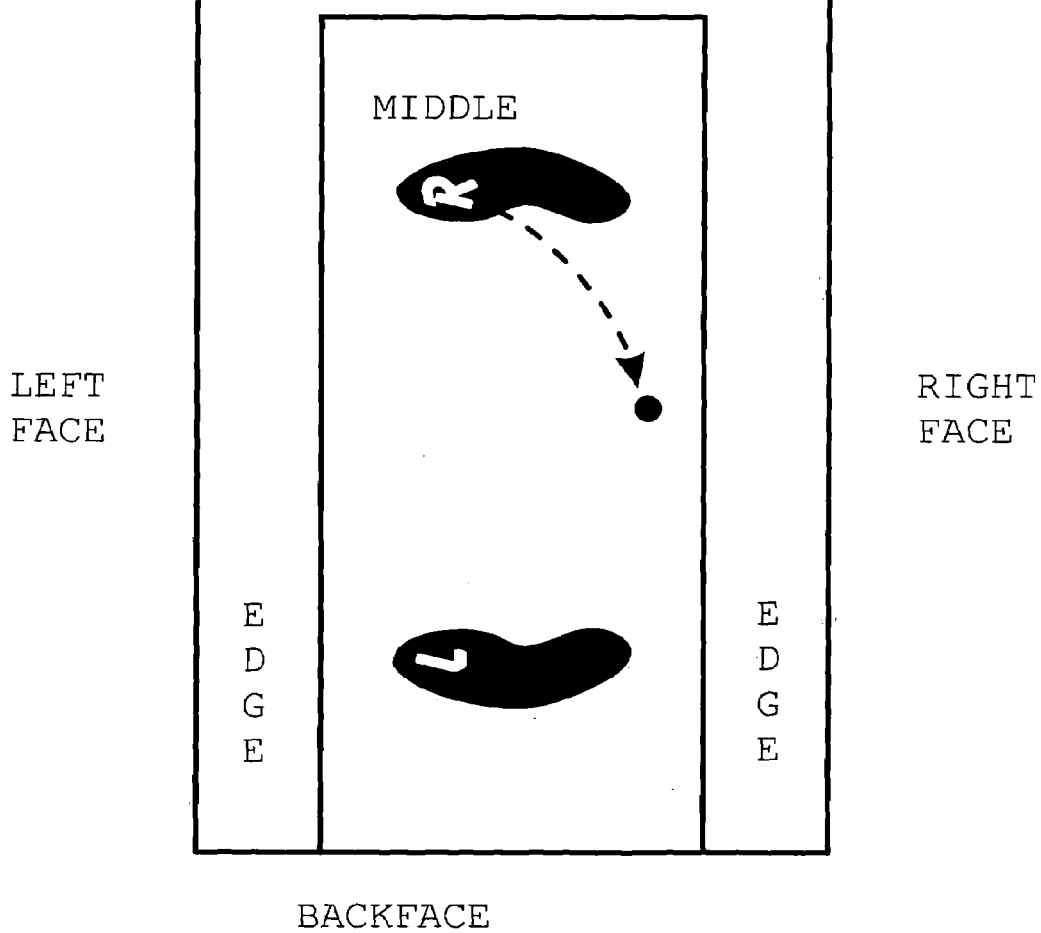
FIGURE 8.B-01

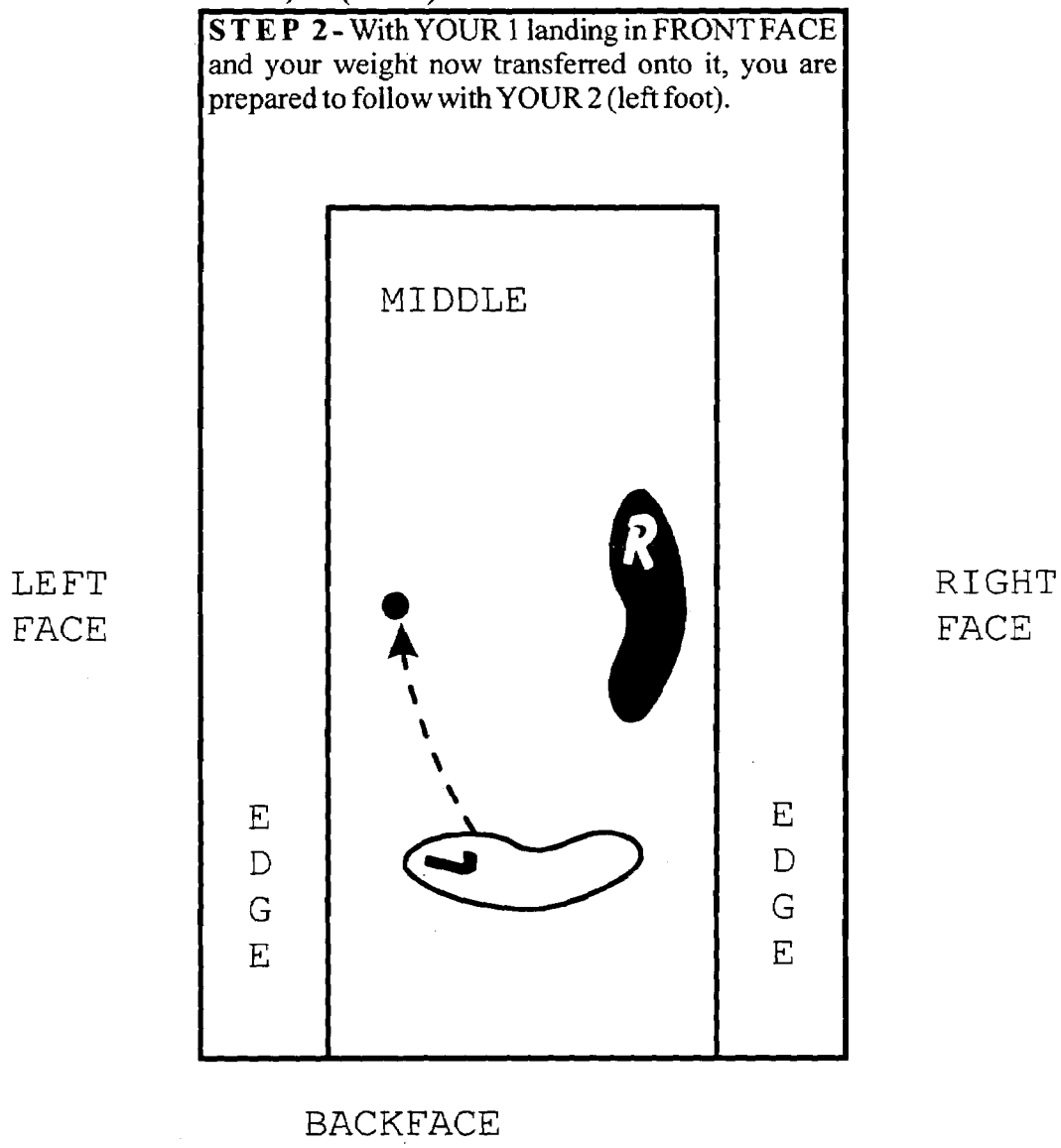
FIGURE 8.B-02

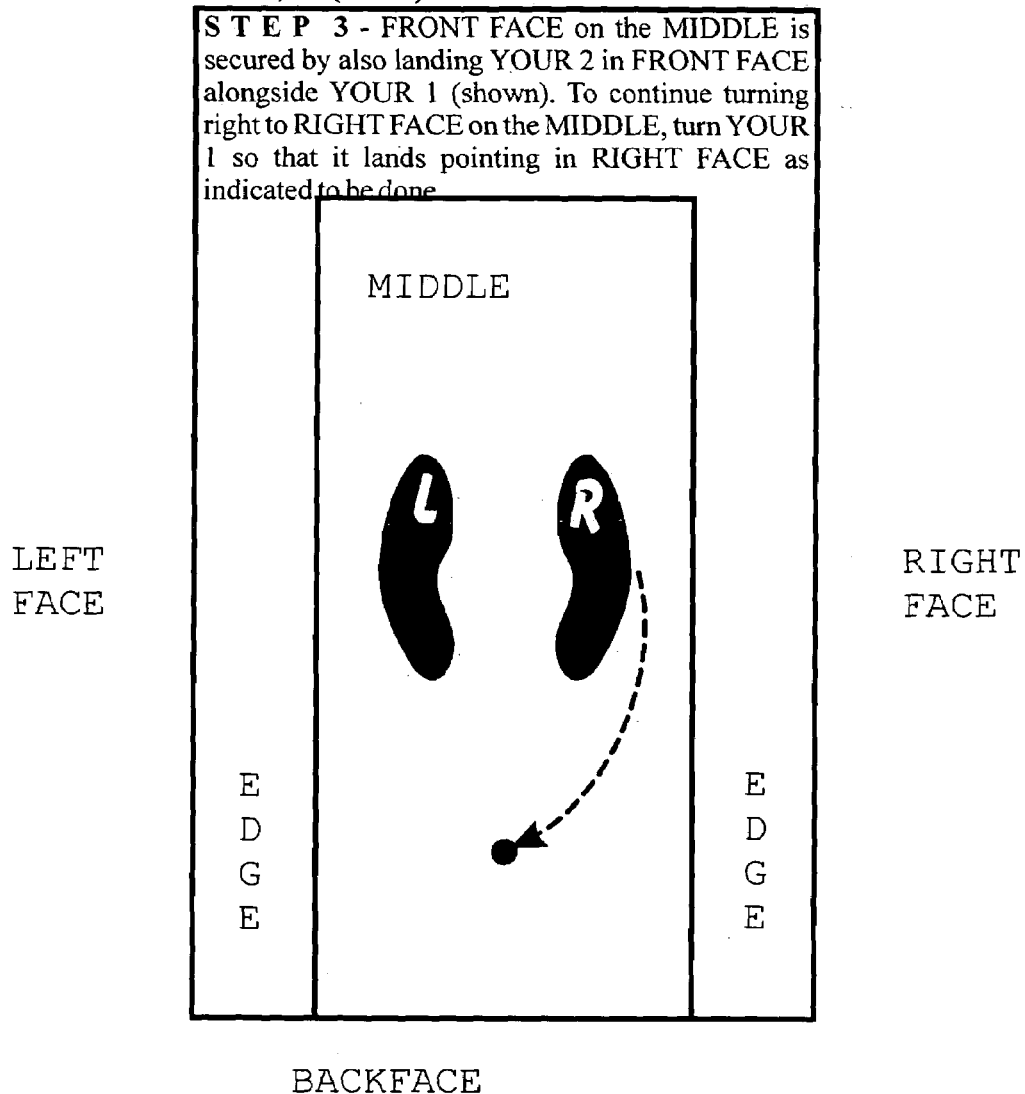
FIGURE 8.B-03

FRONT FACE

3RIGHT, L1 (in one)/3C-PAN-LEFT, R2 (in one)/2SWITCH-LEFT, LEFT FACE/4C-SWITCH-RIGHT, L2 (in one), R2 (in one), R2 (in one)/PAN-RIGHT, R1 (in one)/B'PAN-LEFT STEP 4 - With YOUR 1 landing in RIGHT FACE and your weight now transferred onto it, you are prepared to follow with YOUR 2 (left foot).

MIDDLE

LEFT FACE

RIGHT FACE

EDGE

EDGE

BACKFACE

FIGURE 8.B-04

FRONT FACE
3RIGHT, L1 (in one)/3C-PAN-LEFT, R2 (in one)/2SWITCH-LEFT, LEFT FACE/4C-SWITCH-RIGHT, L2 (in one), R2 (in one), R2 (in one)/PAN-RIGHT, R1 (in one)/B'PAN-LEFT
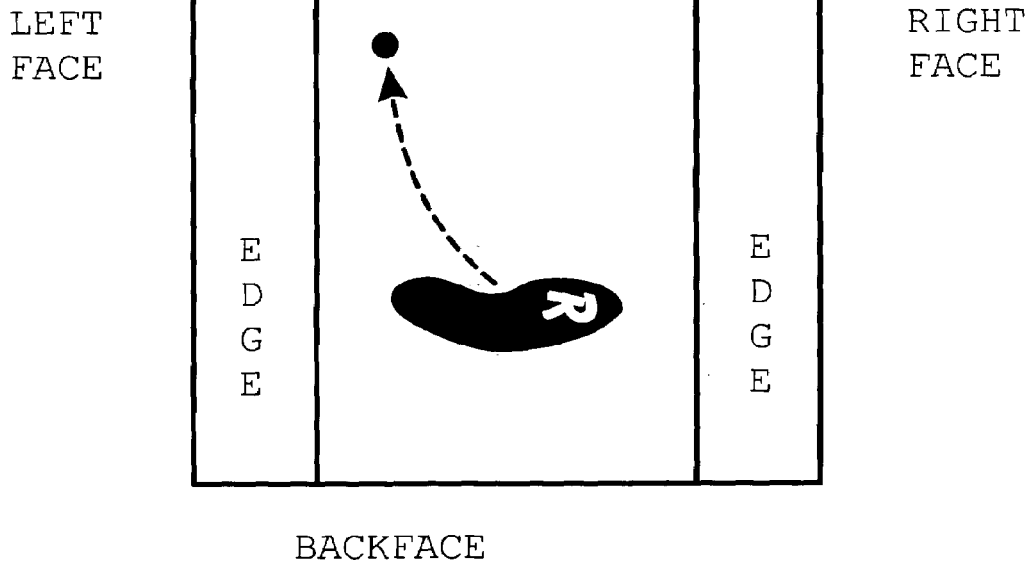
FIGURE 8.B-05

FRONT FACE
3RIGHT, L1 (in one)/3C-PAN-LEFT, R2 (in one)/2SWITCH-LEFT, LEFT FACE/4C-SWITCH-RIGHT, L2 (in one), R2 (in one), R2 (in one)/PAN-RIGHT, R1 (in one)/B'PAN-LEFT
STEP 6 - With YOUR 1 landing in BACK FACE and your weight now transferred onto it, you are prepared to follow with YOUR 2.
LEFT FACE
RIGHT FACE
EDGE
EDGE
BACKFACE
FIGURE 8.B-06

FRONT FACE

3RIGHT, L1 (in one)/3C-PAN-LEFT, R2 (in one)/2SWITCH-LEFT, LEFT FACE/4C-SWITCH-RIGHT, L2 (in one), R2 (in one), R2 (in one)/PAN-RIGHT, R1 (in one)/B'PAN-LEFT STEP 7 - BACK FACE on the MIDDLE is secured by also landing YOUR 2 in BACK FACE alongside YOUR 1 (shown). To continue turning right to LEFT FACE on the MIDDLE, turn YOUR 1 so that it lands pointing in LEFT FACE as indicated to be done.

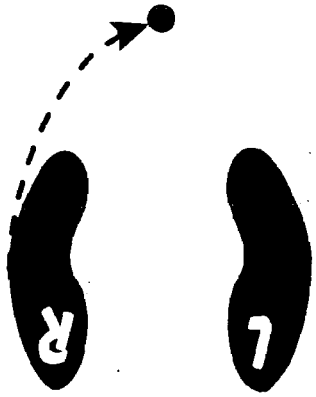

LEFT FACE

RIGHT FACE

BACKFACE

FIGURE 8.B-07

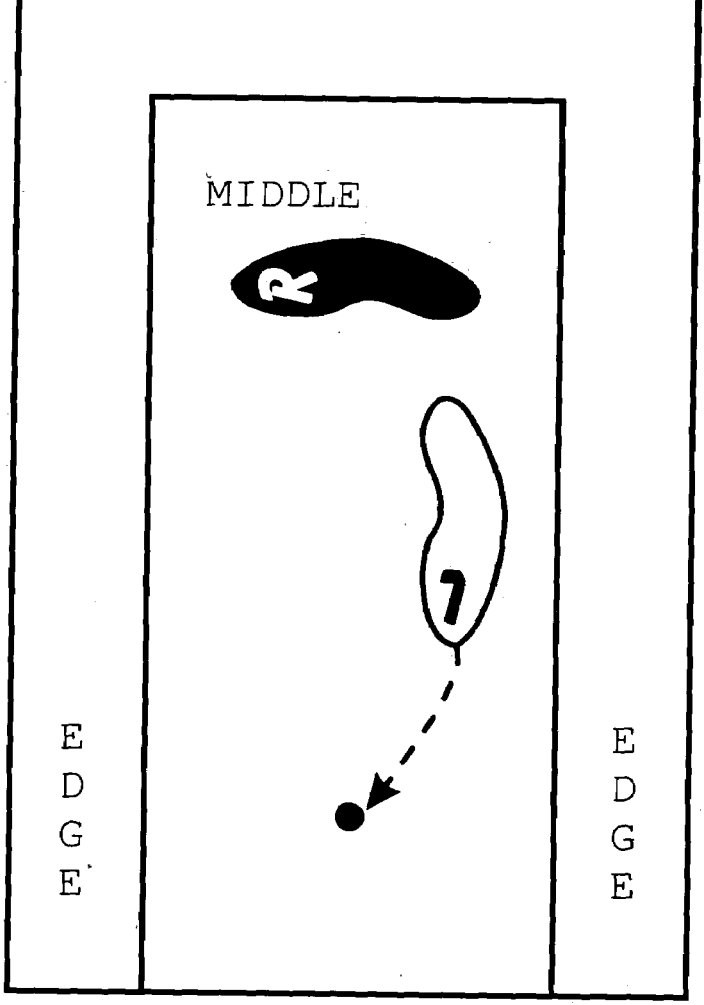
FIGURE 8.B-08

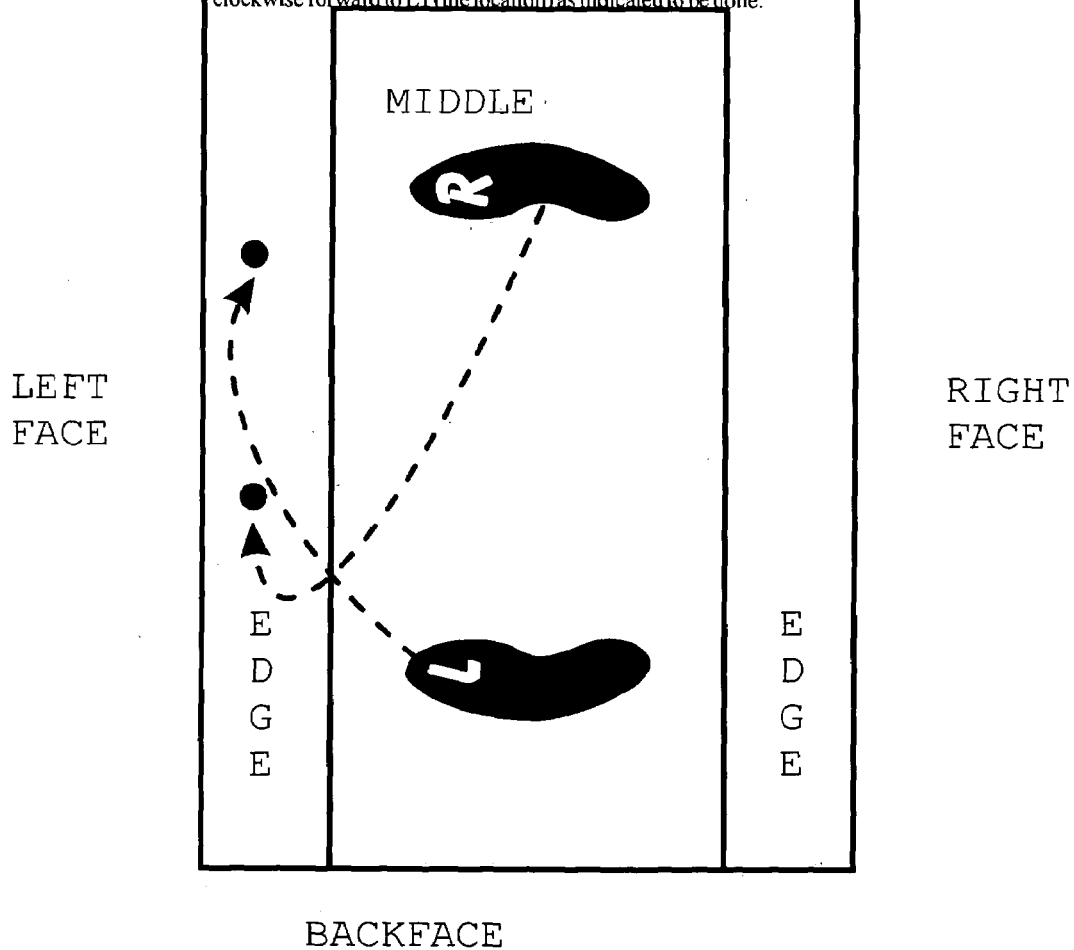
FIGURE 8.B-09

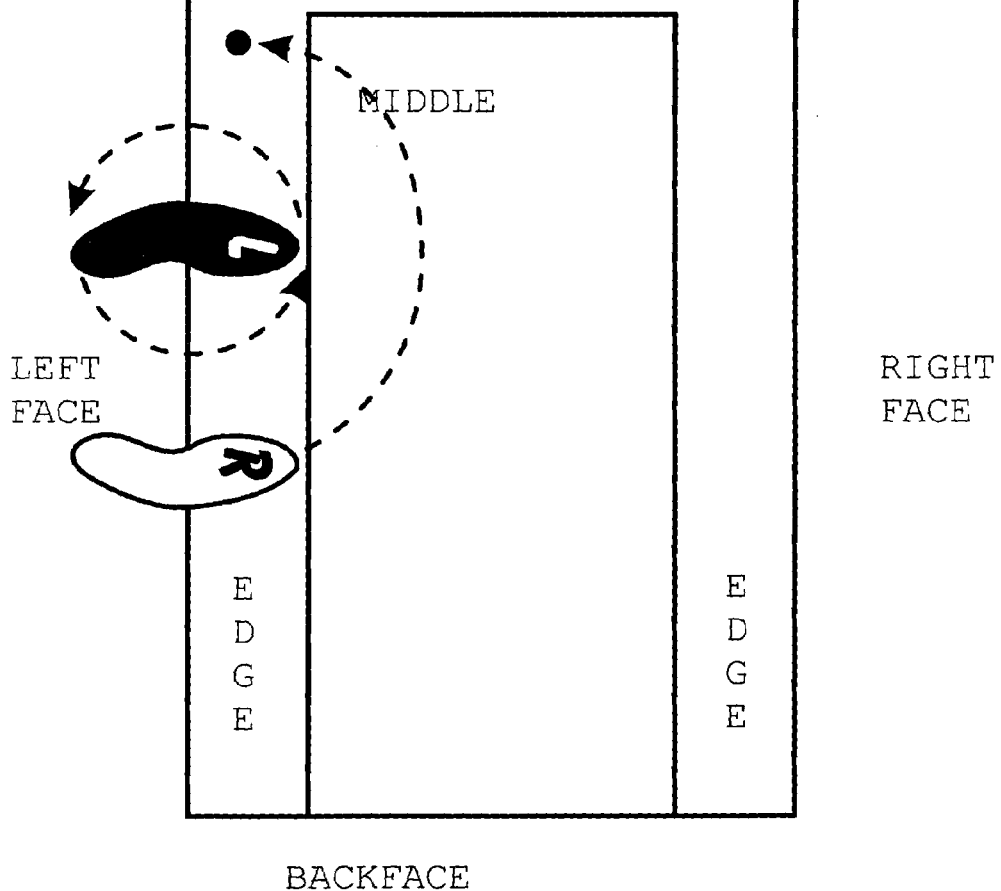
FIGURE 8.B-10

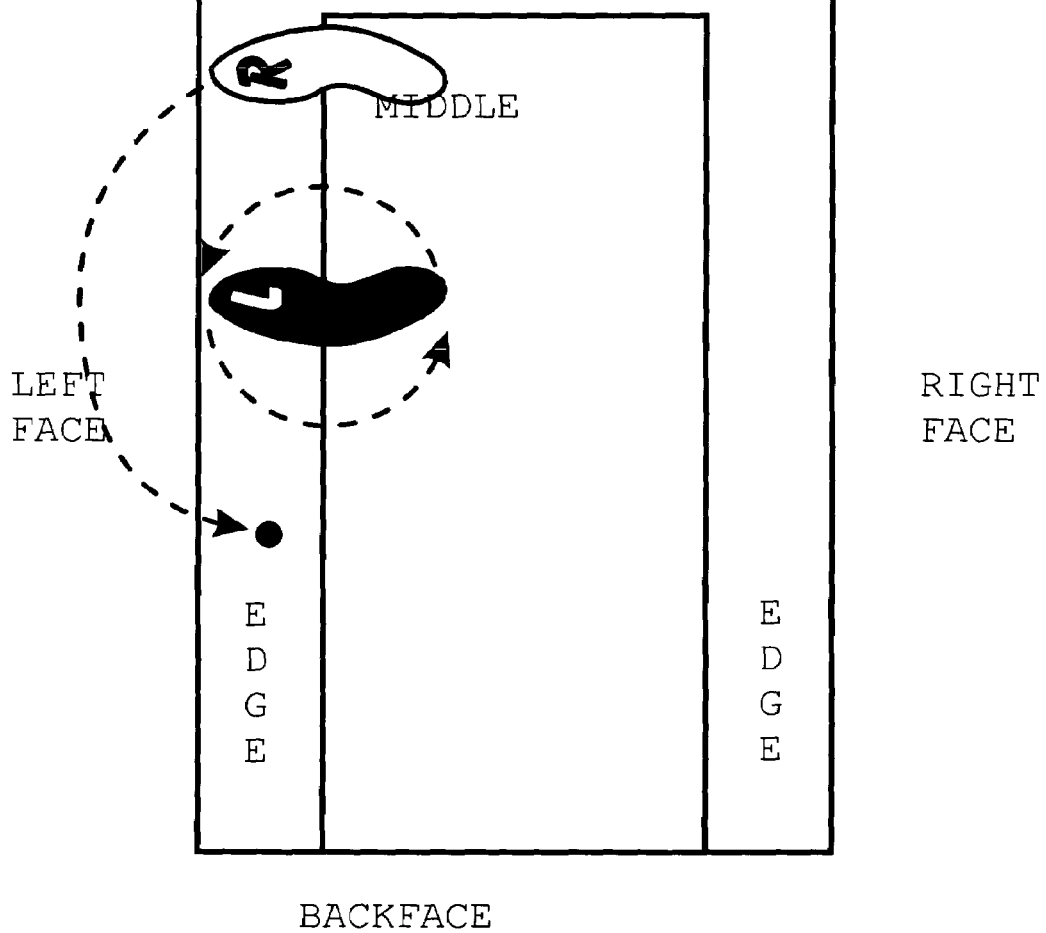
FIGURE 8.B-11

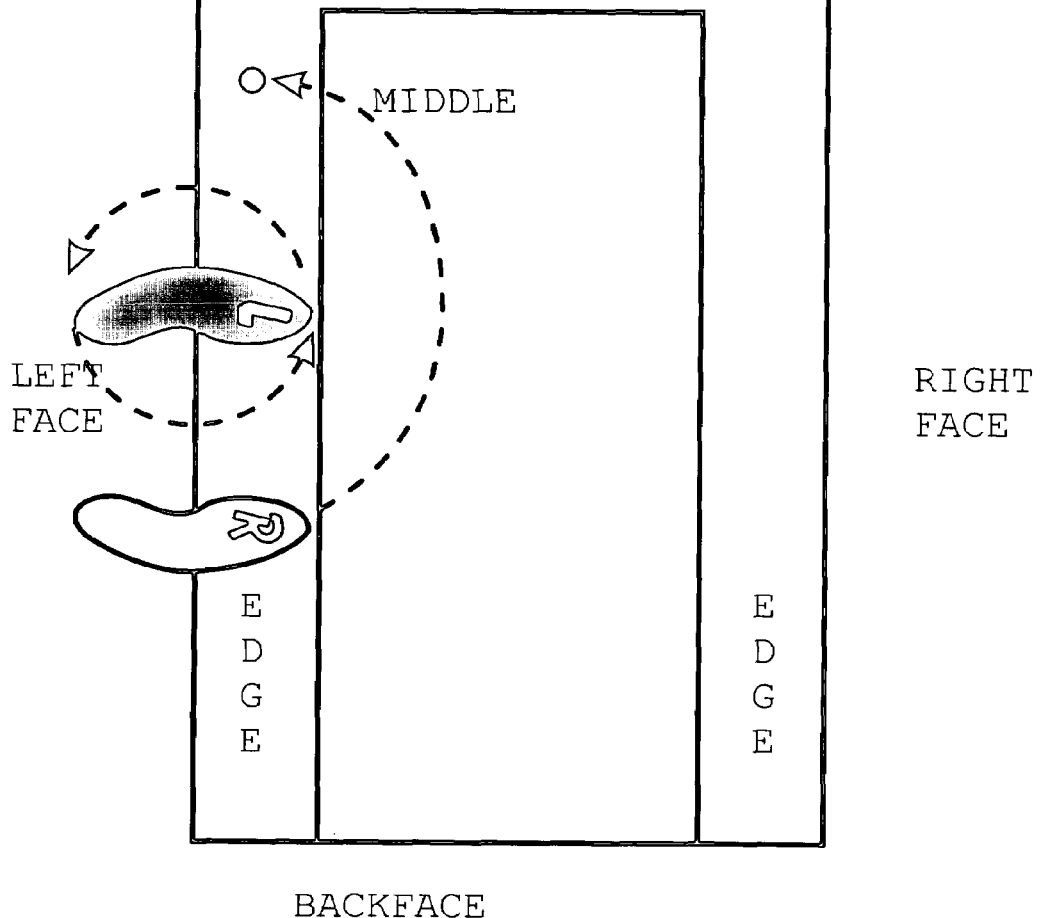
FIGURE 8.B-12

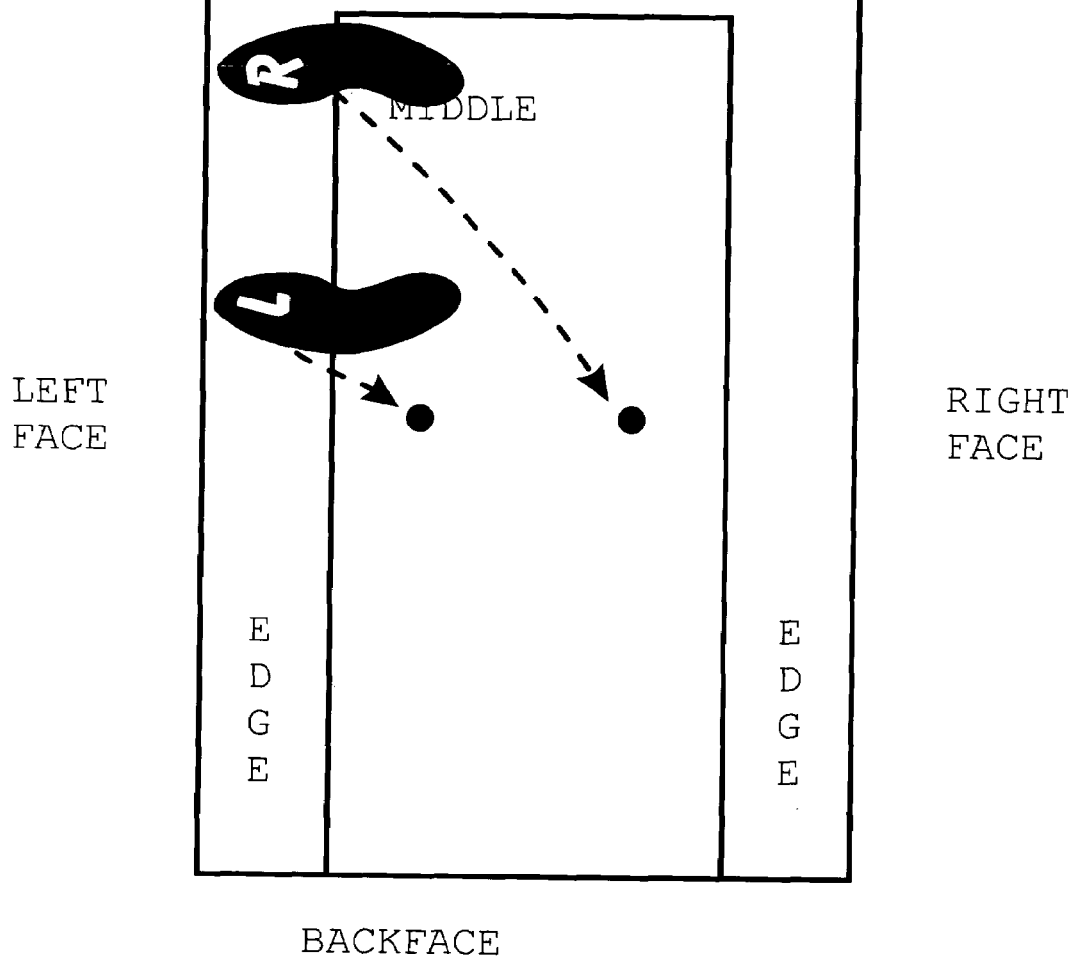
FIGURE 8.B-13

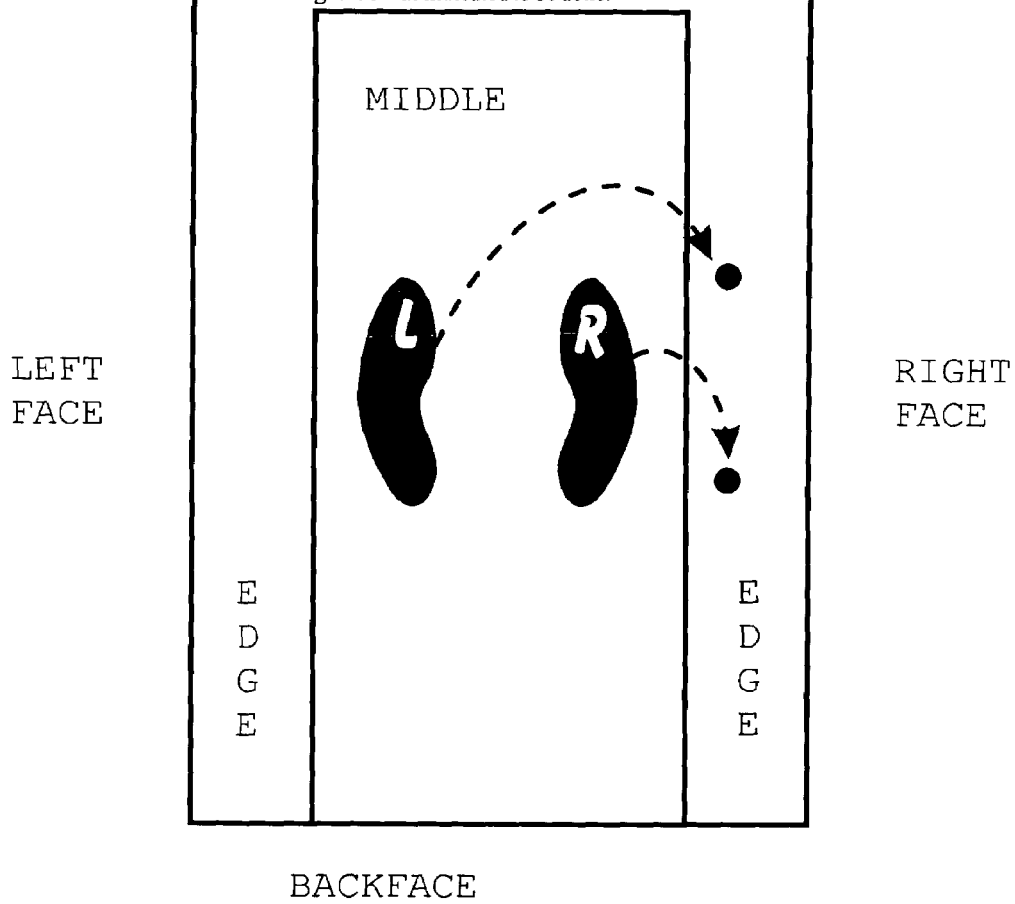
FIGURE 8.B-14

FRONT FACE
3RIGHT, L1 (in one)/3C-PAN-LEFT, R2 (in one)/2SWITCH-LEFT, LEFT FACE/4C-SWITCH-RIGHT, L2 (in one), R2 (in one), R2 (in one)/PAN-RIGHT, R1 (in one)/B'PAN-LEFT
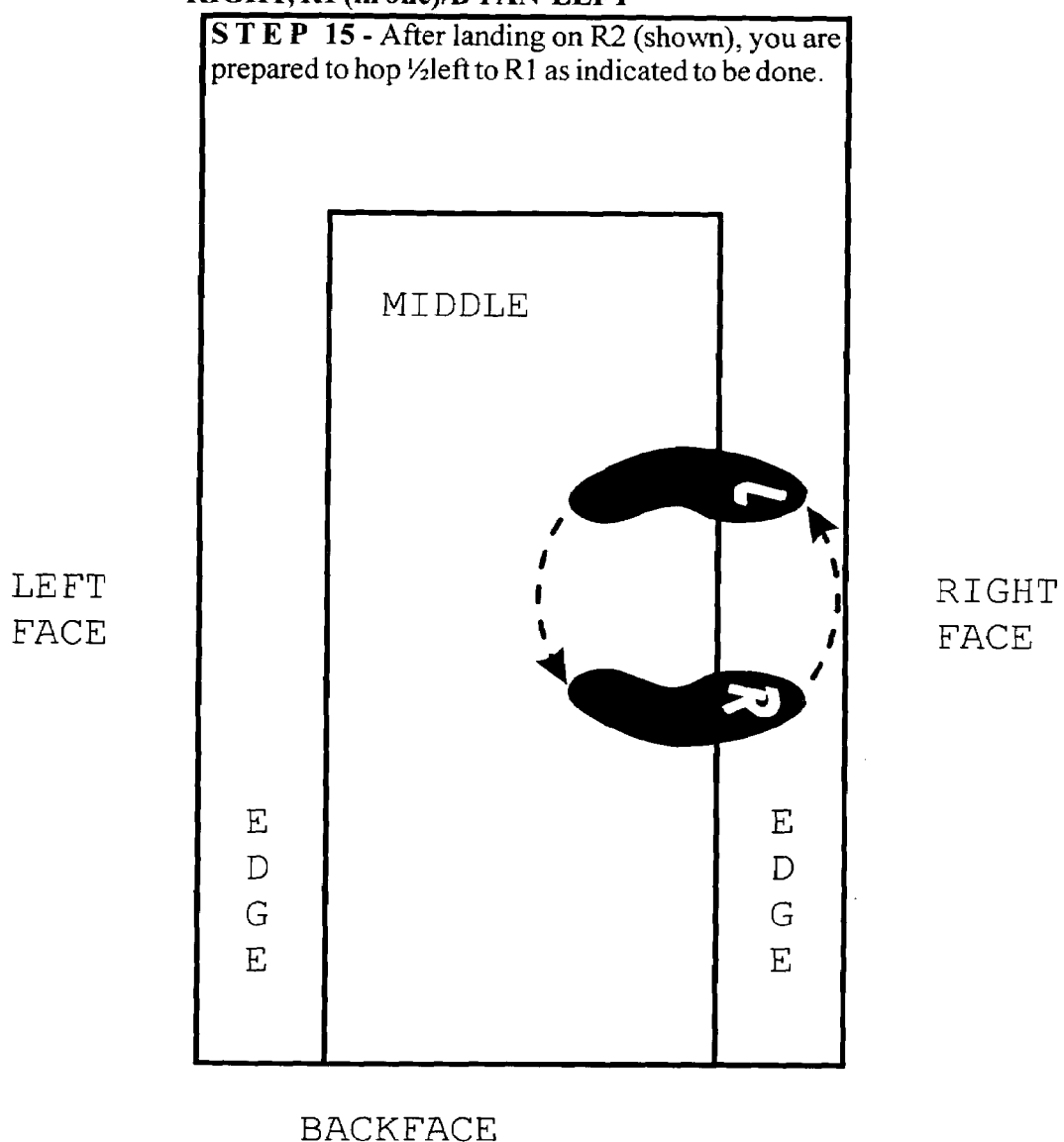
FIGURE 8.B-15

FRONT FACE
3RIGHT, L1 (in one)/3C-PAN-LEFT, R2 (in one)/2SWITCH-LEFT, LEFT FACE/4C-SWITCH-RIGHT, L2 (in one), R2 (in one), R2 (in one)/PAN-RIGHT, R1 (in one)/B'PAN-LEFT

STEP 16 - After landing on R1 (shown), you are prepared to hop ½right back to R2 repeating the semi-circular motion as indicated to be done.

LEFT FACE

MIDDLE

RIGHT FACE

EDGE

EDGE

BACKFACE

FIGURE 8.B-16

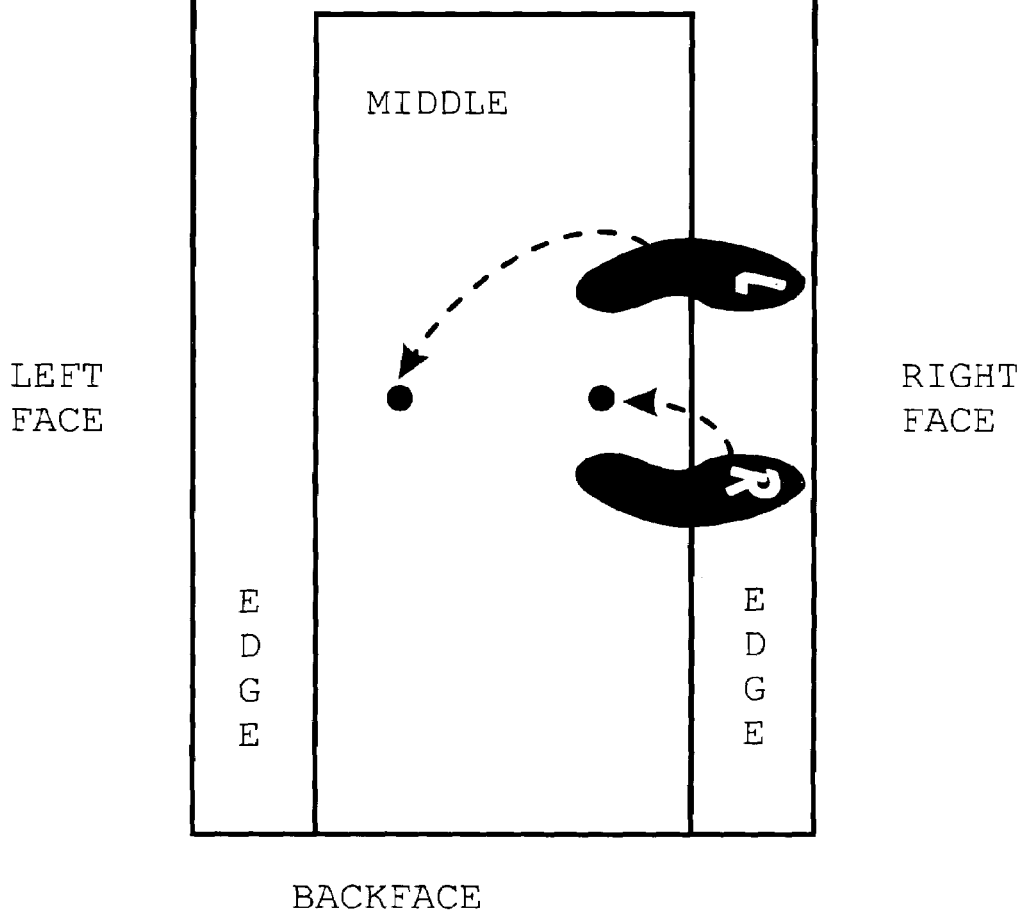
FIGURE 8.B-17

FRONT FACE

3RIGHT, L1 (in one)/3C-PAN-LEFT, R2 (in one)/2SWITCH-LEFT, LEFT FACE/4C-SWITCH-RIGHT, L2 (in one), R2 (in one), R2 (in one)/PAN-RIGHT, R1 (in one)/B'PAN-LEFT

| |
|---|
| S T E P  18 - FRONT FACE is secured by landing on the MIDDLE in FRONT FACE (shown) completing R2 (in one)/2SWITCH-LEFT. To continue with LEFT FACE/4C-SWITCH-RIGHT, a ¼left turn from FRONT FACE to LEFT FACE with 4 rapid-fire circular ½right (in one) turns immediately after landing there is executed by turning YOUR 1 (left foot) so that it lands pointing in LEFT FACE as indicated to be done. |

MIDDLE

LEFT FACE          RIGHT FACE

EDGE          EDGE

BACKFACE

FIGURE 8.B-18

FRONT FACE
3RIGHT, L1 (in one)/3C-PAN-LEFT, R2 (in one)/2SWITCH-LEFT, LEFT FACE/4C-SWITCH-RIGHT, L2 (in one), R2 (in one), R2 (in one)/PAN-RIGHT, R1 (in one)/B'PAN-LEFT
STEP 19 - With YOUR 1 landing in LEFT FACE and your weight now transferred onto it, you are prepared to follow with YOUR 2.
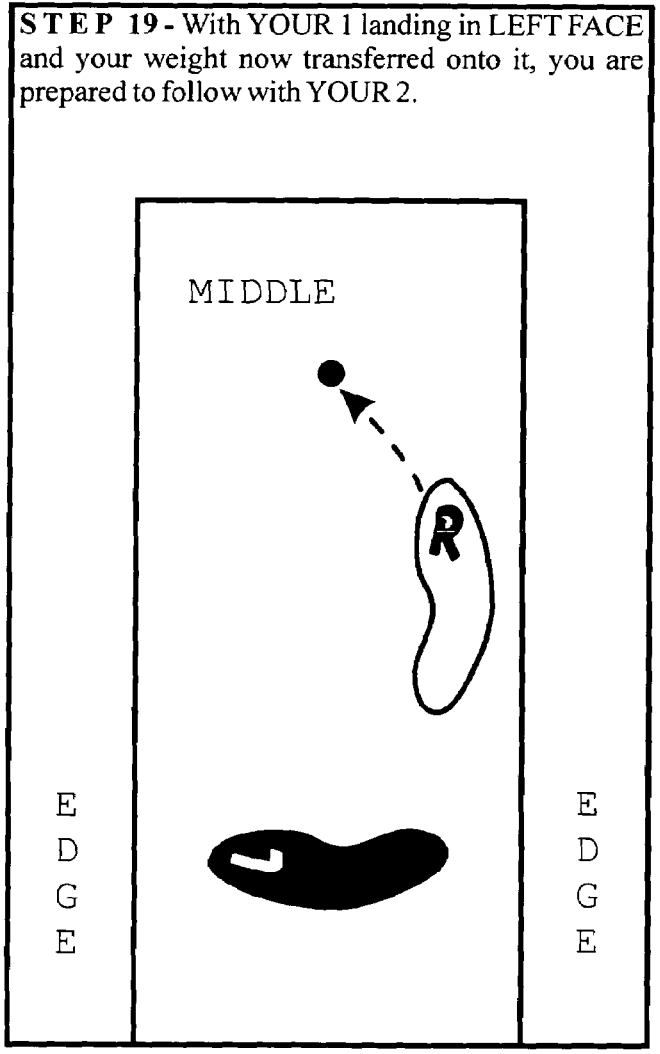
FIGURE 8.B-19

FRONT FACE
3RIGHT, L1 (in one)/3C-PAN-LEFT, R2 (in one)/2SWITCH-LEFT, LEFT FACE/4C-SWITCH-RIGHT, L2 (in one), R2 (in one), R2 (in one)/PAN-RIGHT, R1 (in one)/B'PAN-LEFT
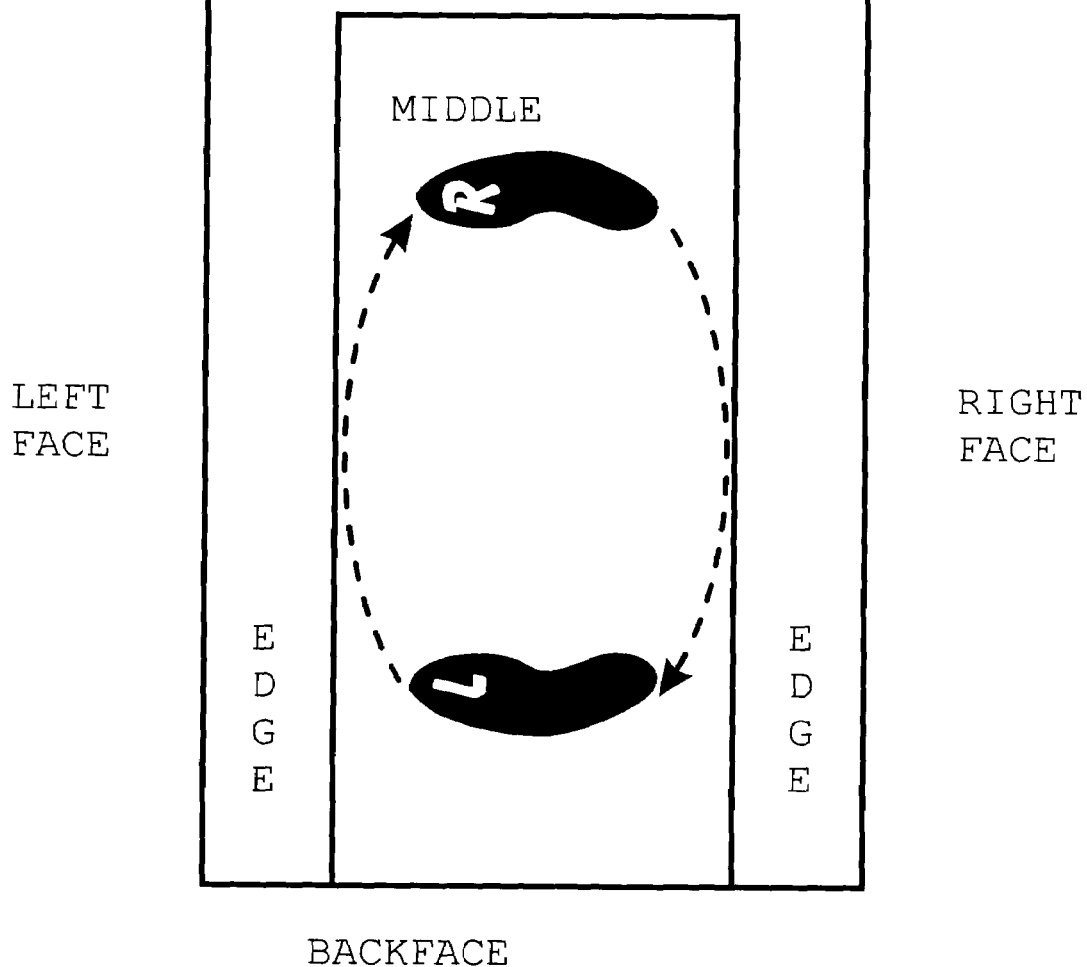
S T E P 20 - LEFT FACE on the MIDDLE is secured by also landing YOUR 2 in LEFT FACE alongside YOUR 1 (shown); to complete LEFT FACE/4C-SWITCH-RIGHT, hop ½right to RIGHT FACE as indicated to be done.
FIGURE 8.B-20

FRONT FACE
3RIGHT, L1 (in one)/3C-PAN-LEFT, R2 (in one)/2SWITCH-LEFT, LEFT FACE/4C-SWITCH-RIGHT, L2 (in one), R2 (in one), R2 (in one)/PAN-RIGHT, R1 (in one)/B'PAN-LEFT
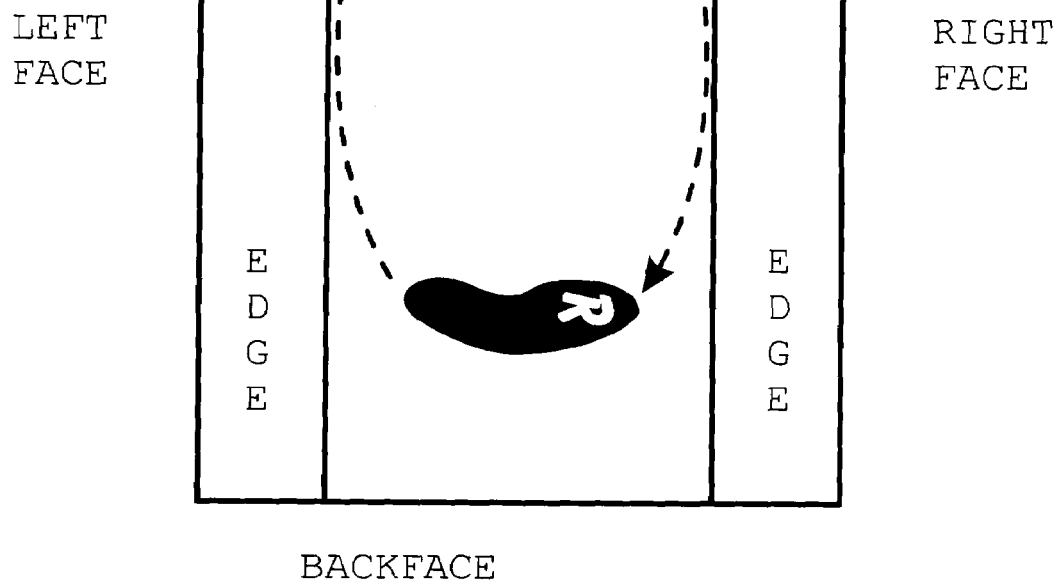
STEP 21 - After landing in RIGHT FACE (shown), you are prepared to continue hopping ½ right around back to the LEFT FACE as indicated to be done.
FIGURE 8.B-21

FRONT FACE
3RIGHT, L1 (in one)/3C-PAN-LEFT, R2 (in one)/2SWITCH-LEFT, <u>LEFT FACE/4C-SWITCH-RIGHT</u>, L2 (in one), R2 (in one), R2 (in one)/PAN-RIGHT, R1 (in one)/B'PAN-LEFT
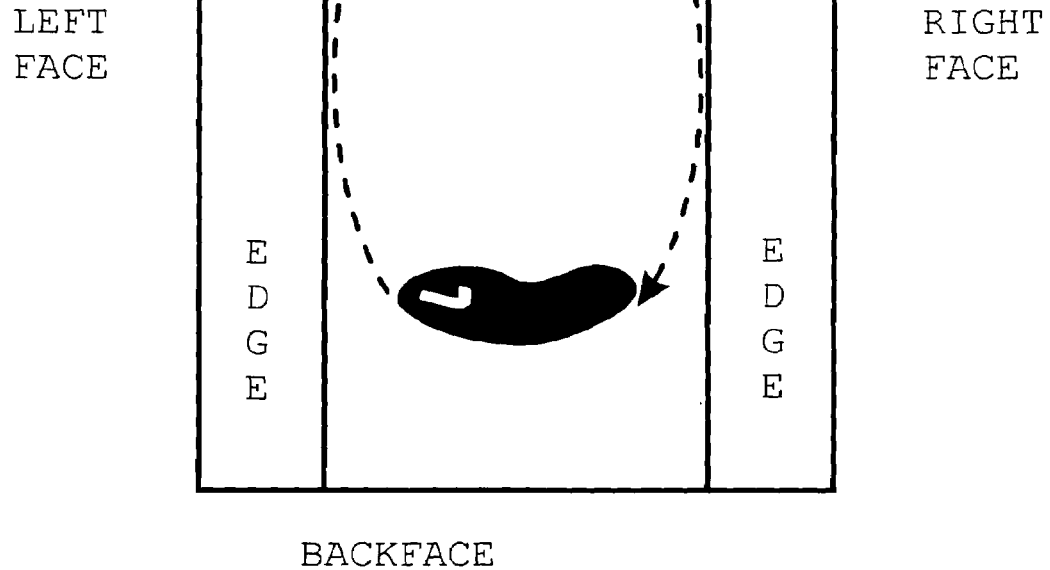
STEP 22 - After landing back in LEFT FACE (shown), you are prepared to hop ½right to RIGHT FACE again (in a single MANEUVER), repeating the circular motion as indicated to be done.
FIGURE 8.B-22

FRONT FACE
3RIGHT, L1 (in one)/3C-PAN-LEFT, R2 (in one)/2SWITCH-LEFT, <u>LEFT FACE/4C-SWITCH-RIGHT</u>, L2 (in one), R2 (in one), R2 (in one)/PAN-RIGHT, R1 (in one)/B'PAN-LEFT
S T E P 23 - After landing in RIGHT FACE again (shown), you are prepared to hop ½right back to LEFT FACE (in a single MANEUVER), continuing in a circular motion as indicated to be done.
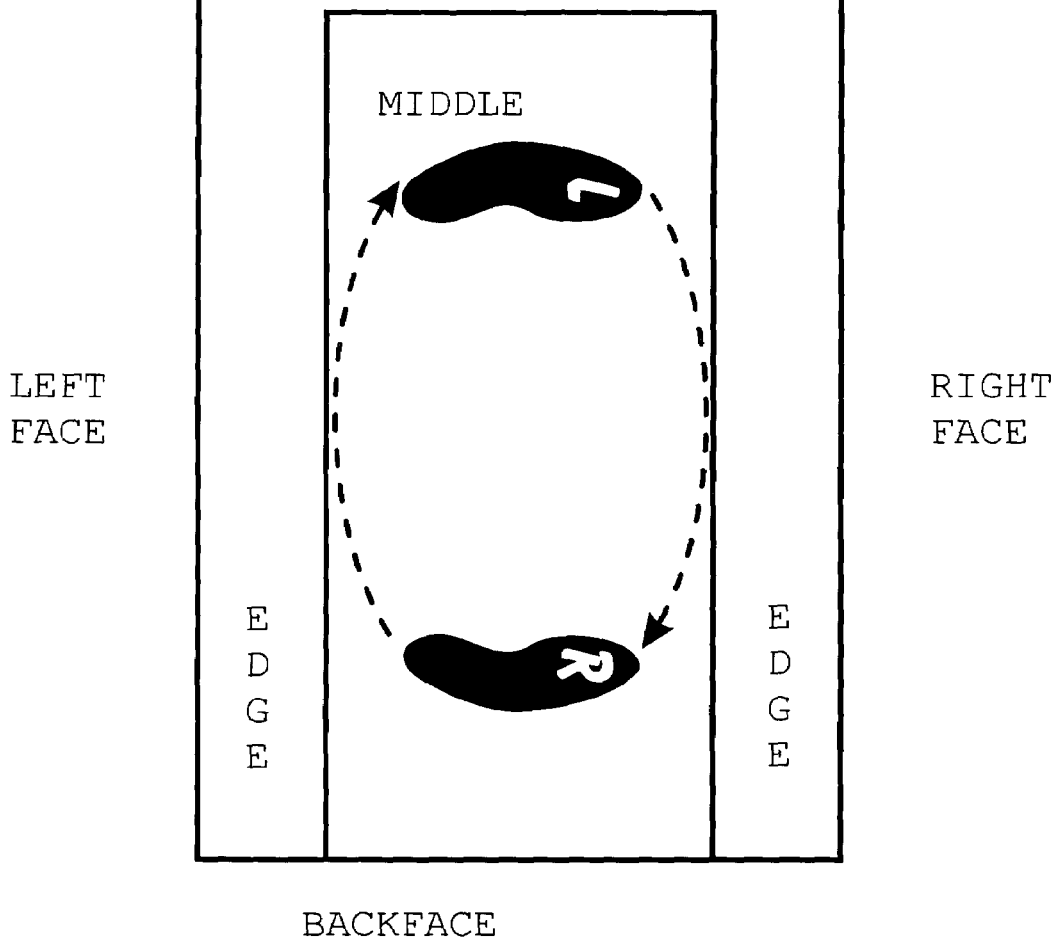
LEFT FACE
RIGHT FACE
BACKFACE
FIGURE 8.B-23

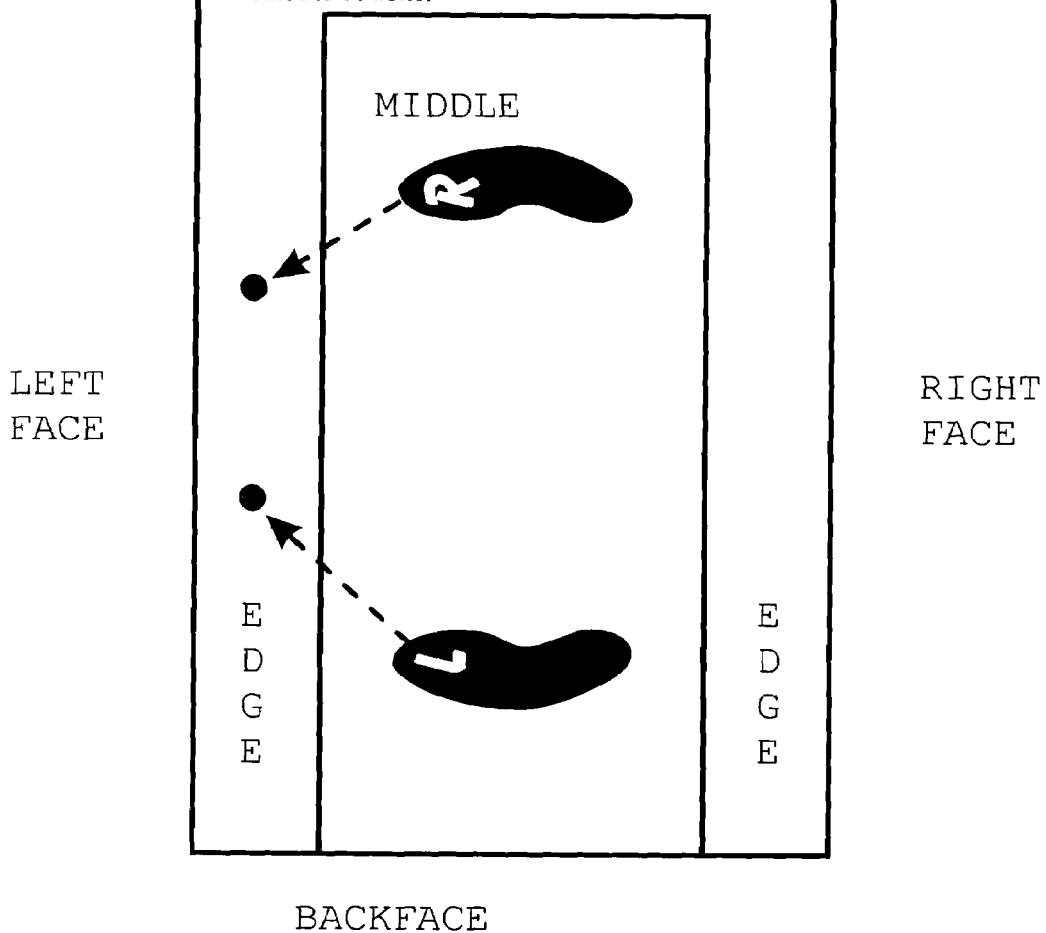
FIGURE 8.B-24

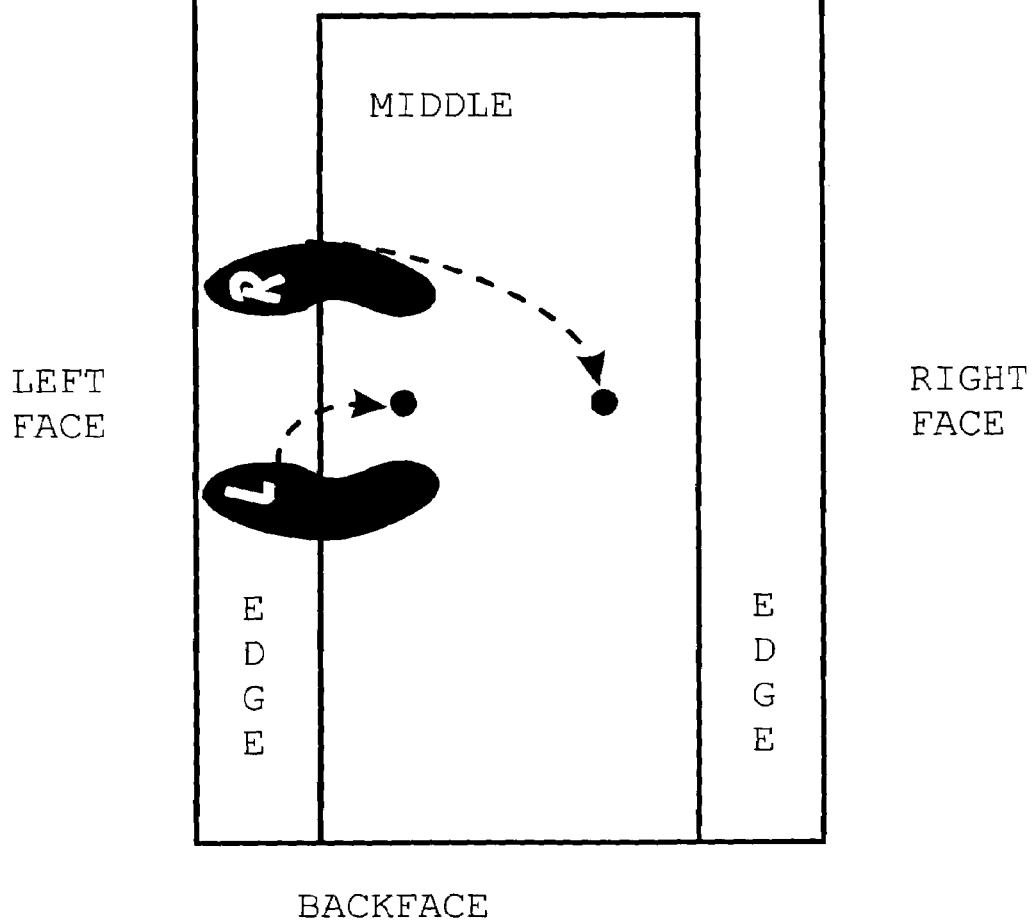
FIGURE 8.B-25

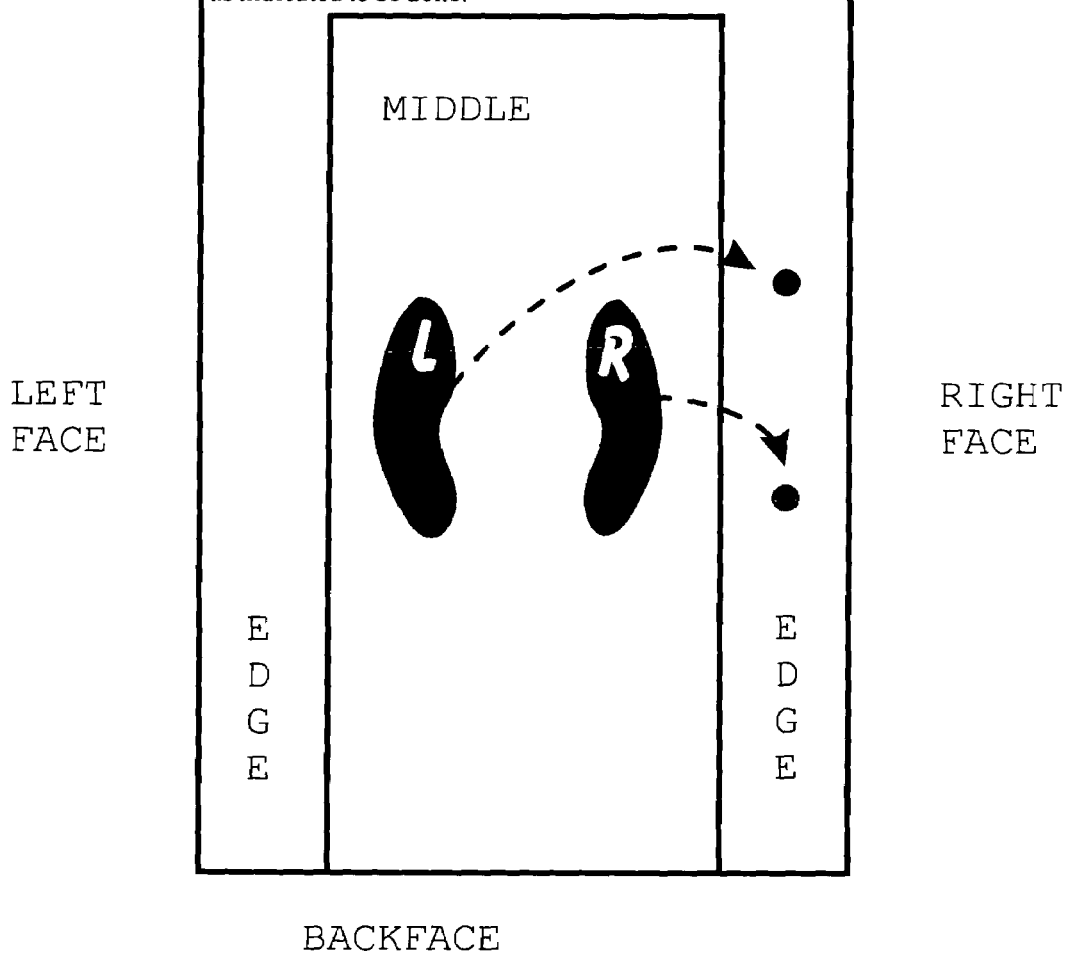
FIGURE 8.B-26

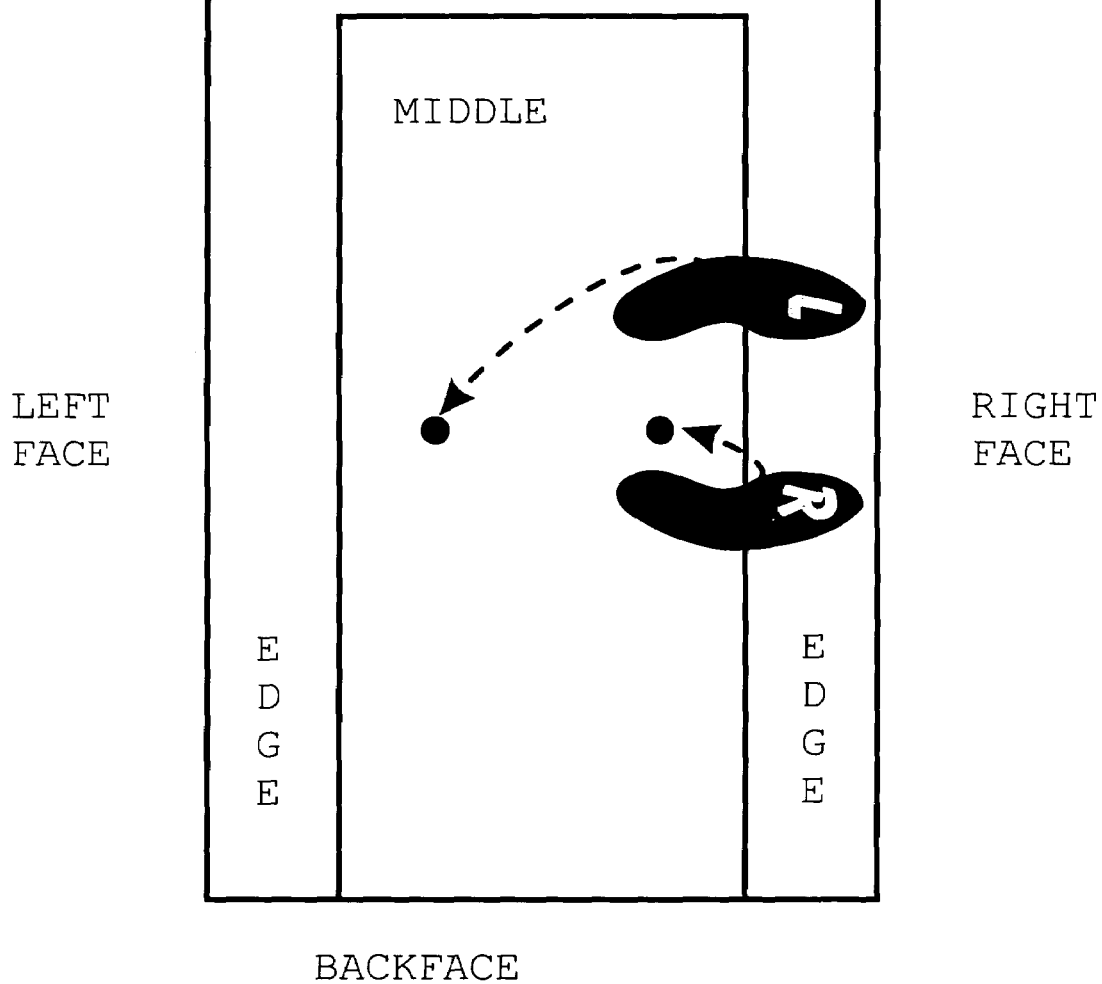
FIGURE 8.B-27

FRONT FACE

3RIGHT, L1 (in one)/3C-PAN-LEFT, R2 (in one)/2SWITCH-LEFT, LEFT FACE/4C-SWITCH-RIGHT, L2 (in one), <u>R2 (in one)</u>, R2 (in one)/PAN-RIGHT, R1 (in one)/B'PAN-LEFT

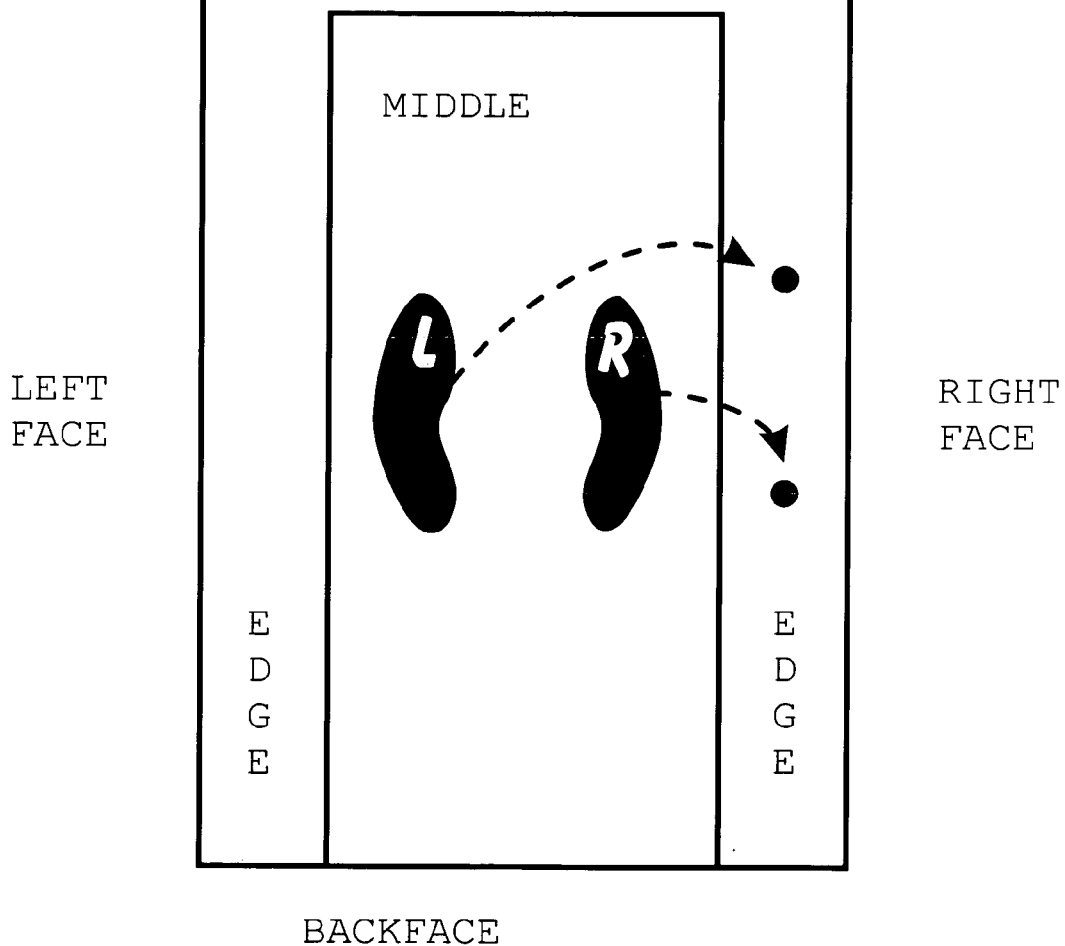

STEP 28 - FRONT FACE is secured by landing on the MIDDLE in FRONT FACE (shown) completing <u>R2 (in one)</u>. To continue with <u>R2 (in one)/PAN-RIGHT</u>, FRONT FACE on the MIDDLE to R2 (in a single MANEUVER) with a forward <u>circular</u> ½right (in one) turn (the ball of your right foot maintaining contact with the EDGE) to R1 immediately after landing on it is executed by hopping clockwise right to R2 (the location) as indicated to be done.

FIGURE 8.B-28

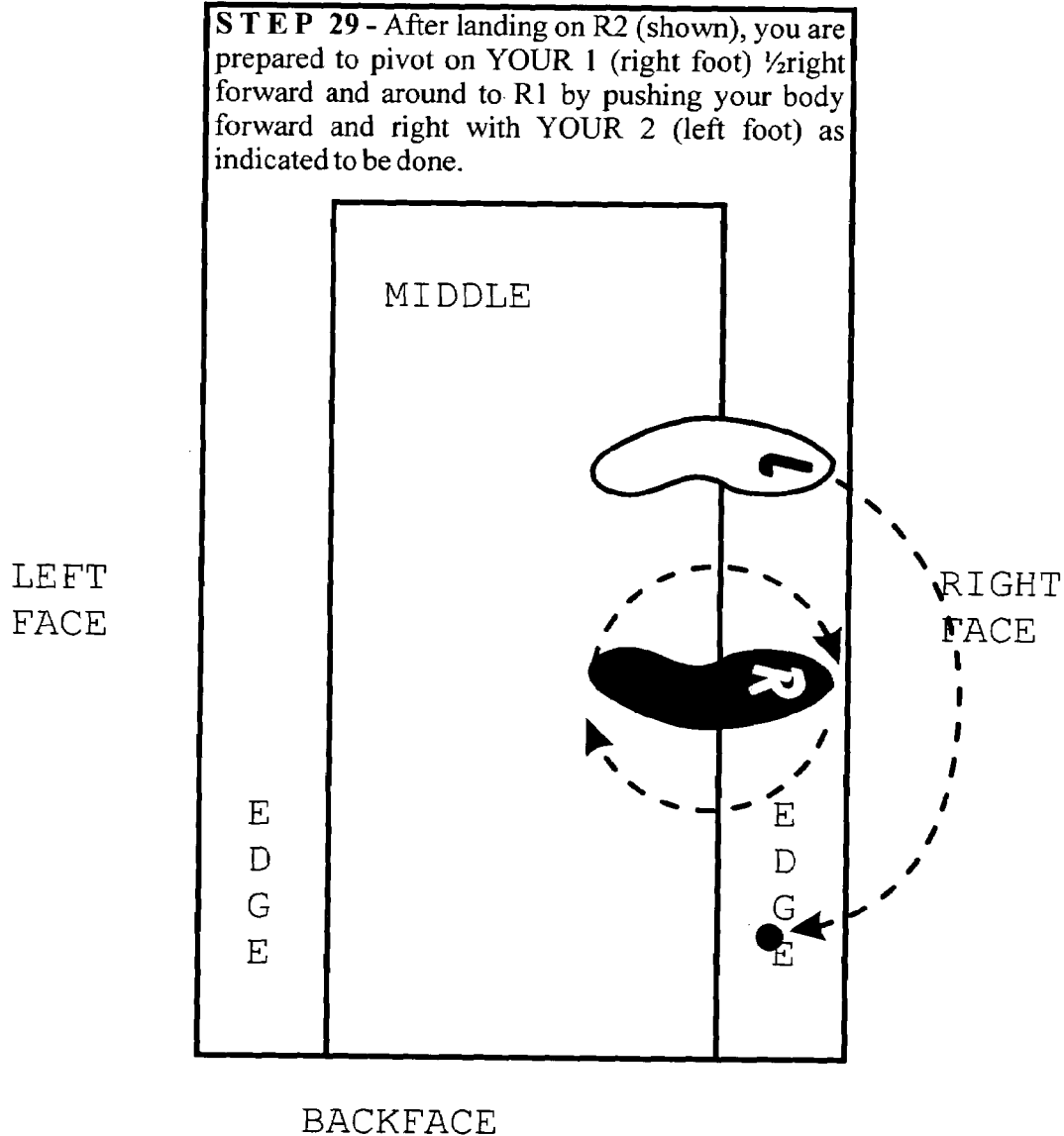
FIGURE 8.B-29

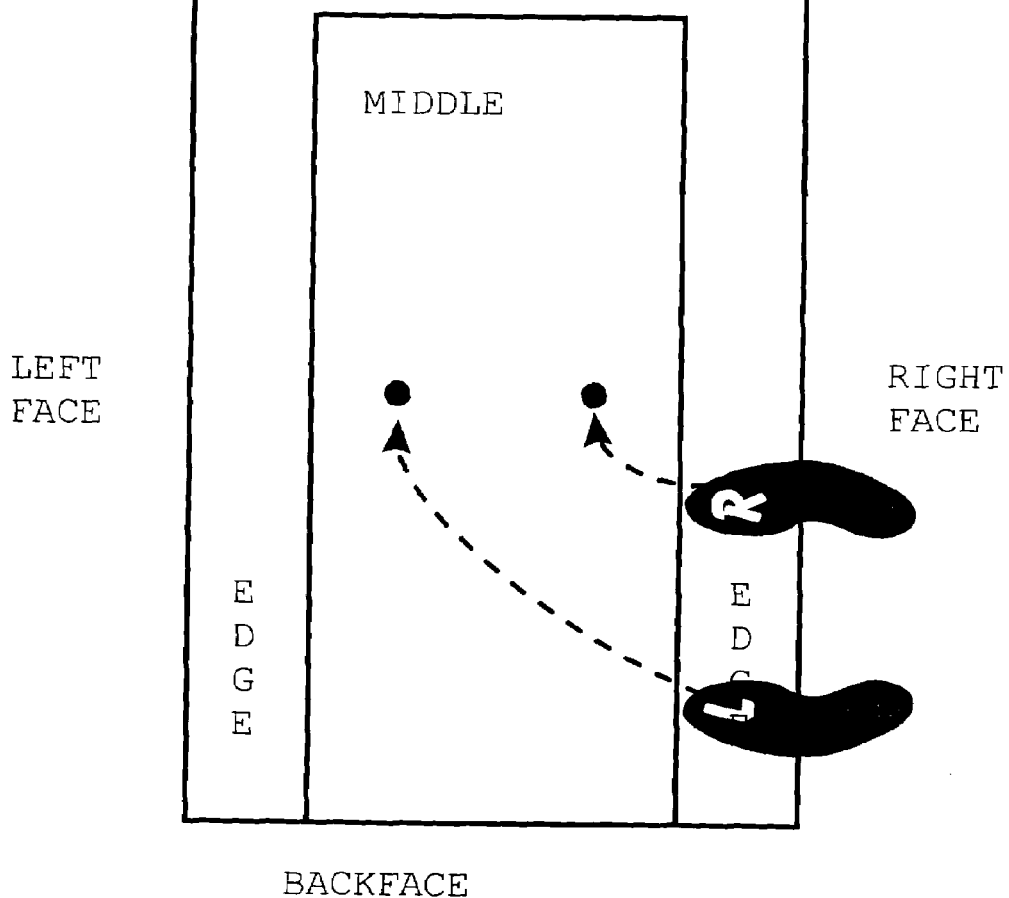
FIGURE 8.B-30

FRONT FACE
3RIGHT, L1 (in one)/3C-PAN-LEFT, R2 (in one)/2SWITCH-LEFT, LEFT FACE/4C-SWITCH-RIGHT, L2 (in one), R2 (in one), <u>R2 (in one)/PAN-RIGHT</u>, R1 (in one)/B'PAN-LEFT

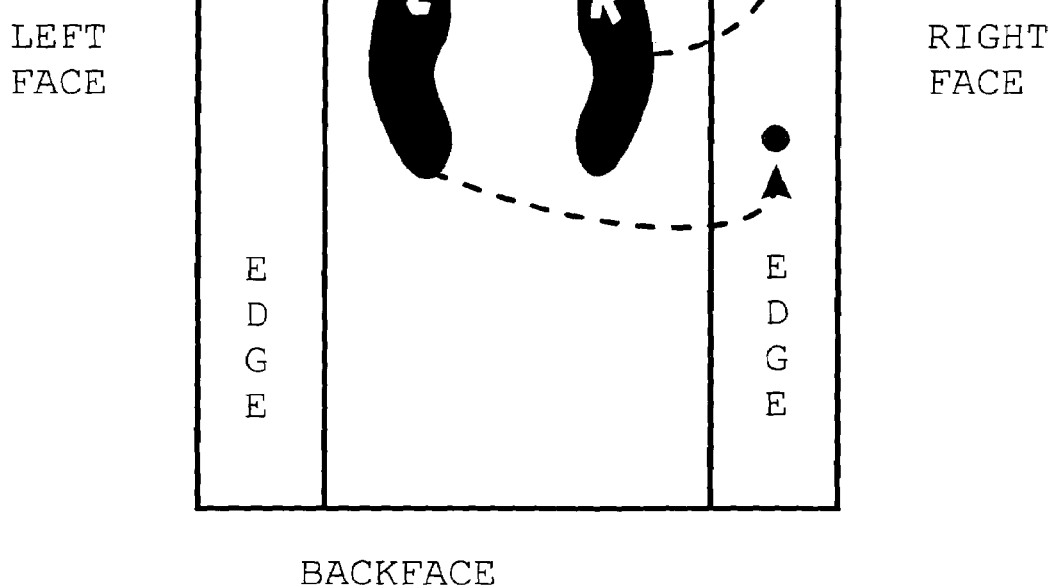

STEP 31 - FRONT FACE is secured by landing on the MIDDLE in FRONT FACE (shown) completing <u>R2 (in one)/PAN-RIGHT</u>. To continue with <u>R1 (in one)/B'PAN-LEFT</u>, FRONT FACE on the MIDDLE to R1 (in a single MANEUVER) with a backward <u>circular</u> ½left (in one) turn (the ball of your right foot maintaining contact with the EDGE) to R2 immediately after landing on it is executed by hopping counterclockwise right to R1 (the location) as indicated to be done.

FIGURE 8.B-31

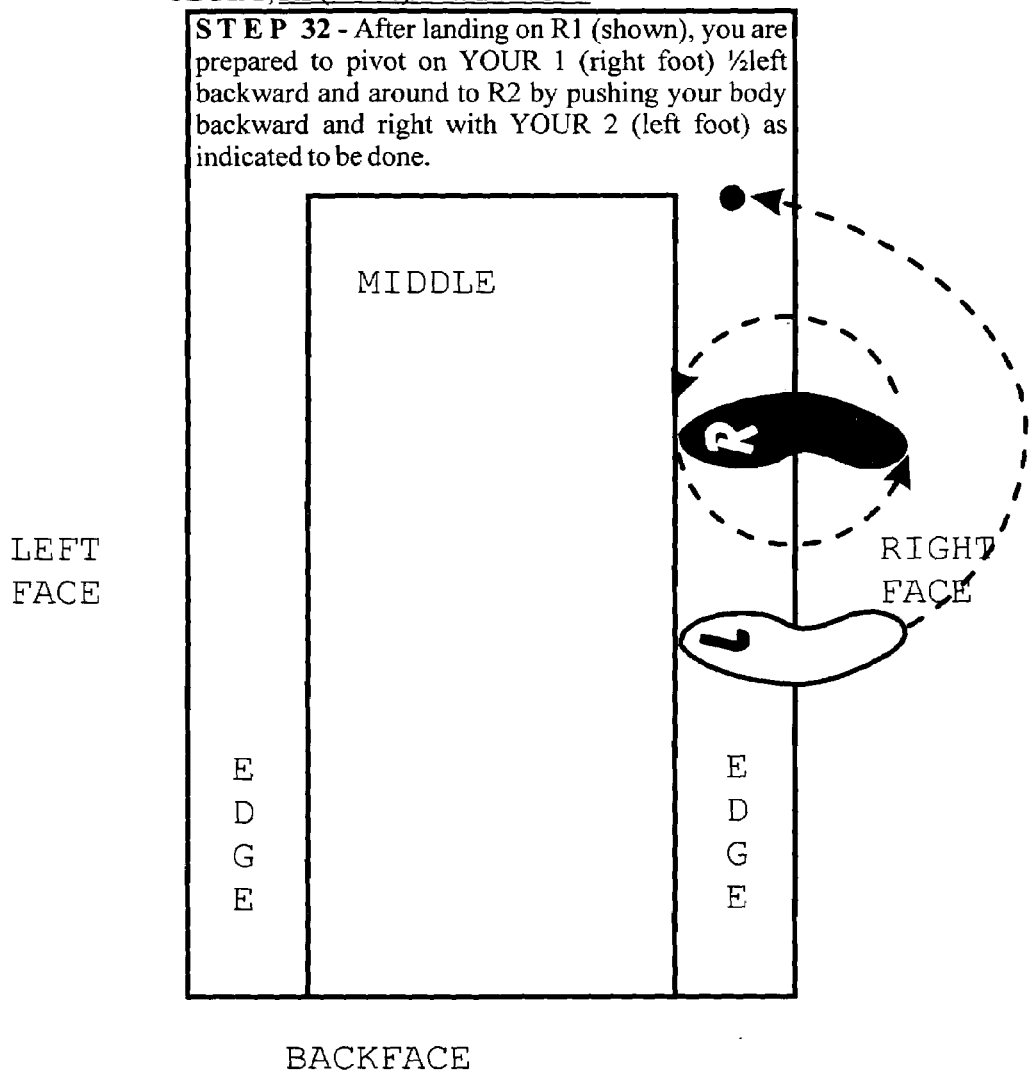
FIGURE 8.B-32

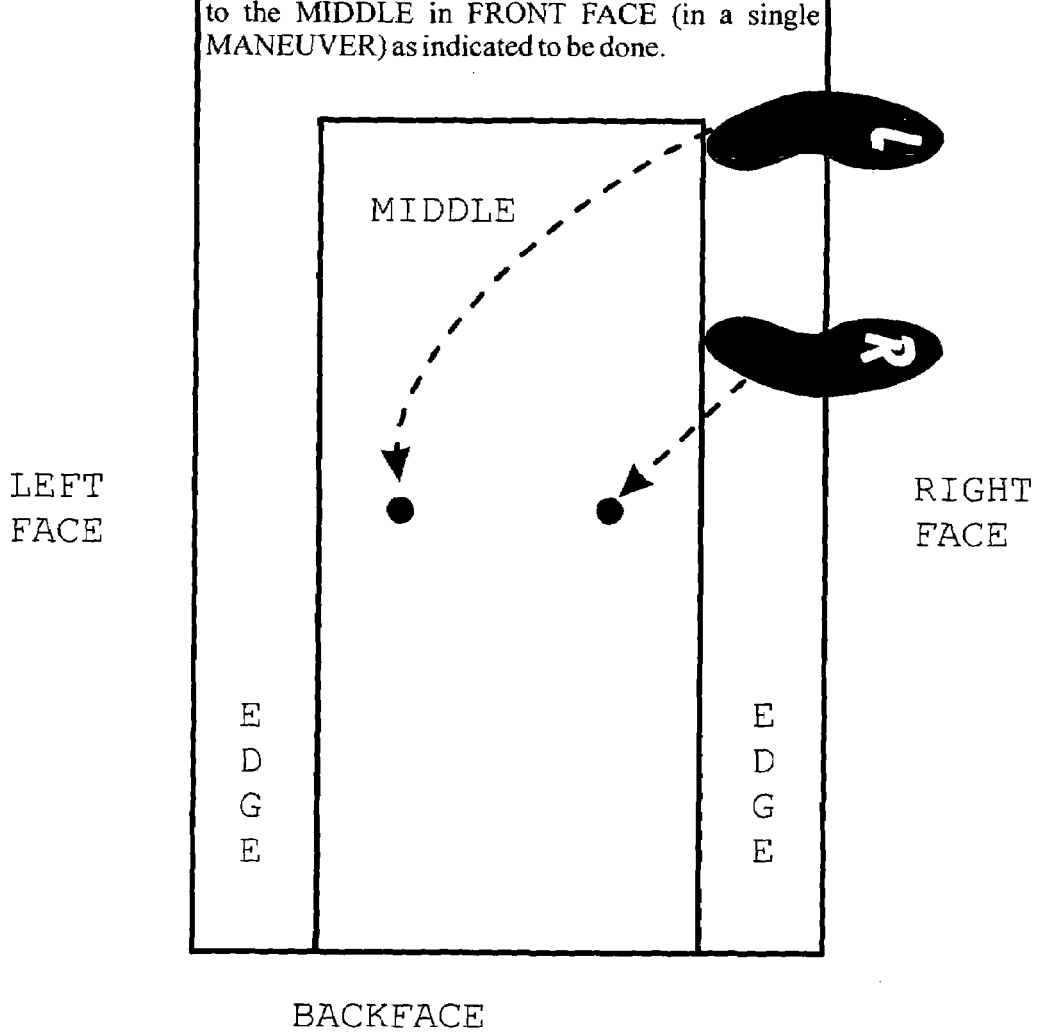
FIGURE 8.B-33

FRONT FACE
3RIGHT, L1 (in one)/3C-PAN-LEFT, R2 (in one)/2SWITCH-LEFT, LEFT FACE/4C-SWITCH-RIGHT, L2 (in one), R2 (in one), R2 (in one)/PAN-RIGHT, R1 (in one)/B'PAN-LEFT
STEP 34 - FRONT FACE is secured by landing on the MIDDLE in FRONT FACE (shown) completing R1 (in one)/B'PAN-LEFT, and the entire series of MANEUVERS... "!"
MIDDLE
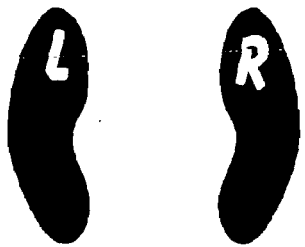
LEFT FACE
RIGHT FACE
E D G E
E D G E
BACKFACE
FIGURE 8.B-34

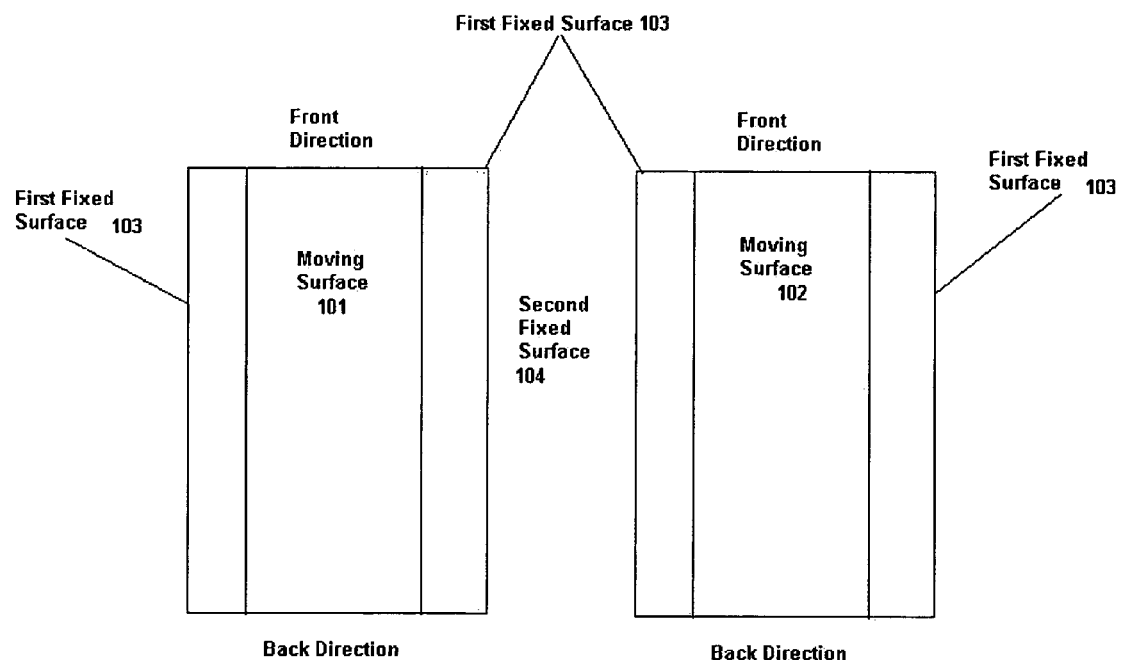

FITNESS METHOD UTILIZING MOVING PLATFORMS

RELATED APPLICATIONS

This application refers back and takes advantage of the filing date of the provisional application 60/370,094 filed on Apr. 4, 2002.

FIELD OF THE INVENTION

The present invention is directed to a fitness method, in particular, to a fitness method and training that utilizes a motorized moving platform to quickly build the user's stamina and speed, while simultaneously drastically improving the user's balance, coordination and agility.

BACKGROUND ART

For years, the treadmill has been one of the most familiar and frequently used pieces of cardiovascular equipment in the gym, physical therapy and sports training facilities worldwide. Running or walking on treadmills is one of the most, if not the most, popular form of cardiovascular workout. While it is an excellent way to lose weight and get in great cardiovascular shape, it is quite monotonous, exercises only a few muscle groups and does nothing to improve an exerciser's dexterity and coordination. For many competitive sports, dexterity, agility and stamina are equally important for amateur and professional athletes alike, and exercising on a treadmill simply does not address improving these characteristics of the exerciser in a systematic manner.

In view of the many shortcomings with the current utilization of treadmills in terms of insufficient muscle volume utilization, monotonous routines, and inadequate dexterity training, a need has arisen to provide an exercise method and routine which overcomes the disadvantages with the prior art systems noted above. In response to this need, the present invention provides a fitness method that addresses these shortcomings in a novel manner.

SUMMARY OF THE INVENTION

Accordingly, it is an object of the invention to provide a fitness method which quickly builds the user's stamina and speed, while simultaneously drastically improving one's balance, coordination, dexterity and agility.

Another object of the invention is a to provide a fitness method that revolutionizes how people use common treadmills found at any gym, athletic or sports training facility or home.

A further object of the invention is to provide a fitness method that permits a user to achieve strength training simultaneously with endurance training and whole body flexibility training.

One other object of the invention is to provide a fitness method that can be used to develop competition sports related skills that is applicable in football, soccer, basketball, hockey, gymnastics, martial arts, racquetball, rock climbing, rowing, rugby, sailing, skateboarding, skiing, snowboarding, surfing, squash, tennis, volleyball, water-skiing, windsurfing and the like.

The above objects is attained through "KAPPEL'S FOOTWORK", a novel system of exercises which serves as the foundation and framework for "FRE FLO DO." This system is termed KAPPEL'S FOOTWORK when the user is learning it, and termed FRE FLO DO when the exerciser masters the basics and practices KAPPEL'S FOOTWORK in freeform on a moving treadmill. The system allows a new user to pick up the basics at his or her own pace, and allows the user to graduate to practicing the exercises on a moving platform when they have the confidence and know-how to do so safely.

Simply put, KAPPEL'S FOOTWORK is like playing connect the dots with your feet. After the user has identified where the dots are, he or she is ready to learn how to connect them. Once he or she has learned how to connect them, the user will learn how to connect them while the dots are moving. The objective is for the user to attain a constant state of readiness which can lead to true spontaneity.

Other objects and advantages of the present invention will become apparent with the following discussion.

BRIEF DESCRIPTION OF THE DRAWINGS

Reference is now made to the drawings of the invention wherein.

Diagram 1 depicts a basic layout of the moving platform.
Diagrams 2a–2f depict Catch Points on the edges of the platform.
Diagrams 3a–3l depict Catch Points on the floor.
Diagrams 4a–4g depict Exercise 1.
Diagrams 4h–4p depict Exercise 2.
Diagrams 4q–4u depict Exercise 3.
Diagrams 4v–4z depict Exercise 4.
Diagrams 5a–5r depict turning in the middle.
Diagrams 5.1 depict a series of maneuvers.
Diagrams 6 depict step or hop to CPs and back.
Diagrams 6.A depict another series of maneuvers.
Diagrams 6.B depict yet another series of maneuvers.
Diagrams 7 depict the switch, standard switches and C-Switches.
Diagrams 7A depict another series of maneuvers.
Diagrams 7B depict yet another series of maneuvers.
Diagrams 8 depict Pans.
Diagrams 8A depicts maneuvers with Pans.
Diagrams 8B depicts another series of maneuvers with pans.
Diagram 9 depict Loose and Tight areas of the moving platform.

DESCRIPTION OF THE PREFERRED EMBODIMENTS

Figure 2B:
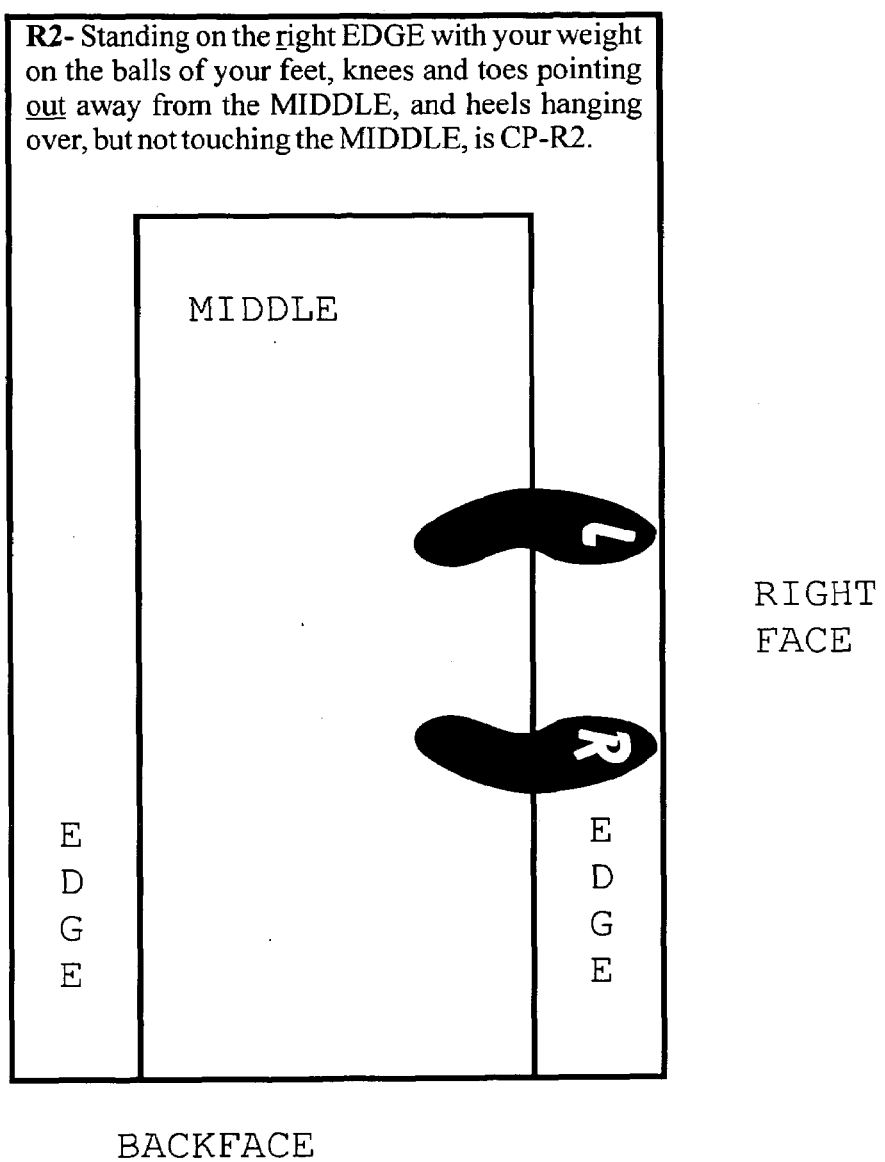
Figure 2C:
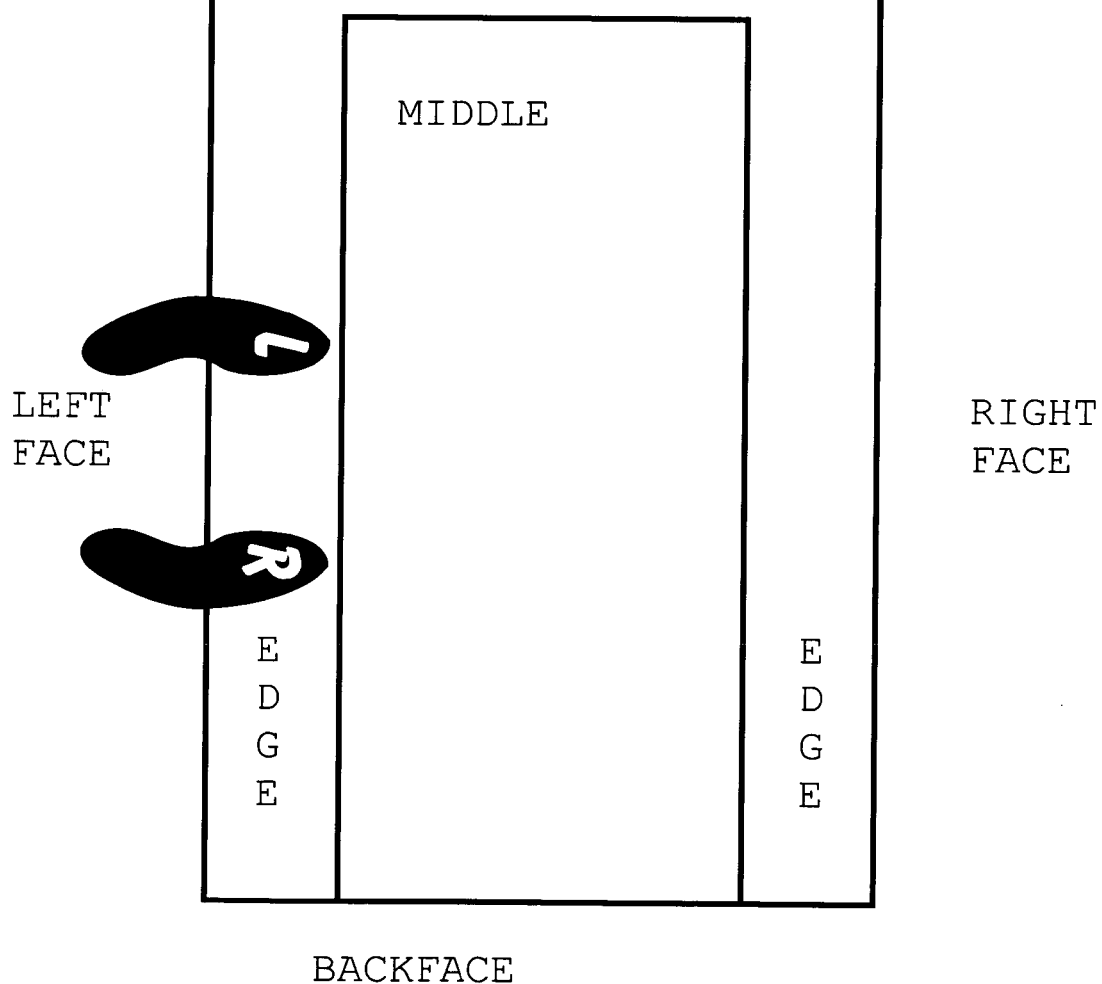
Figure 2D:
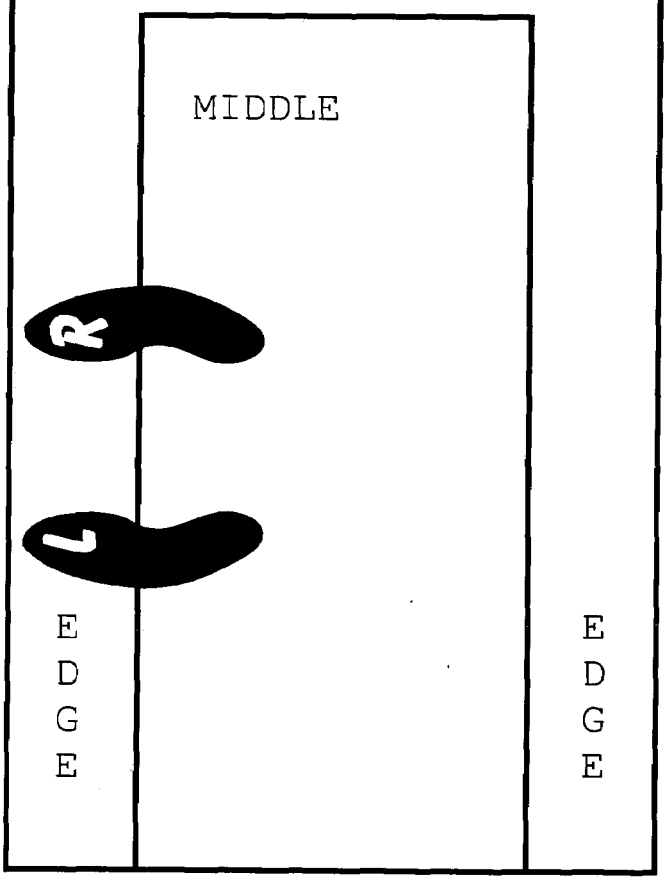
Figure 2E:
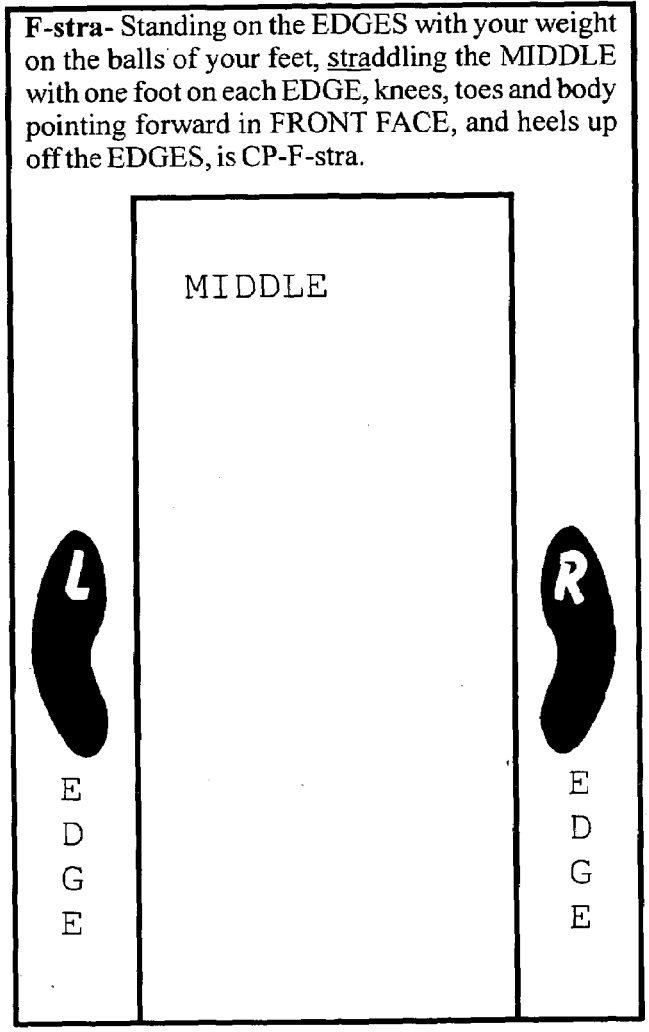
Figure 3A:
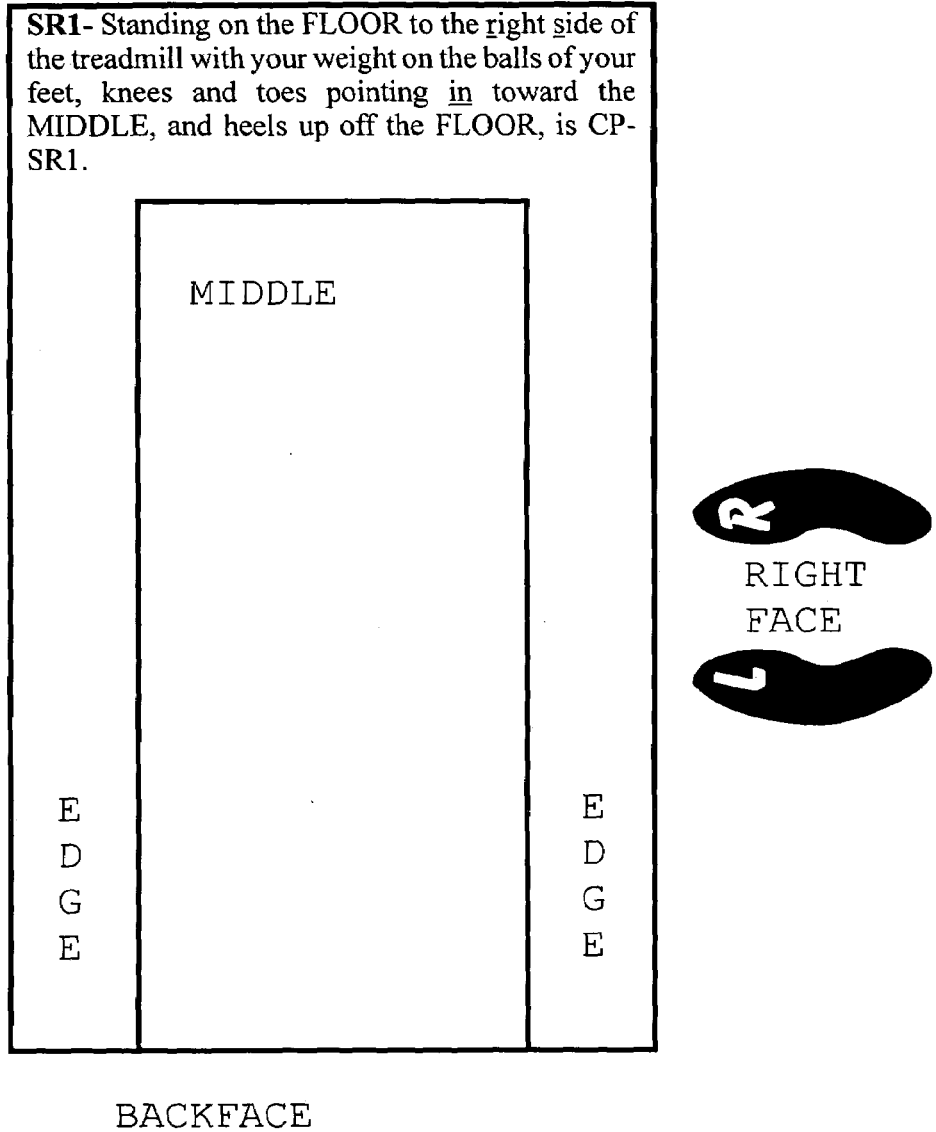
Figure 3B:
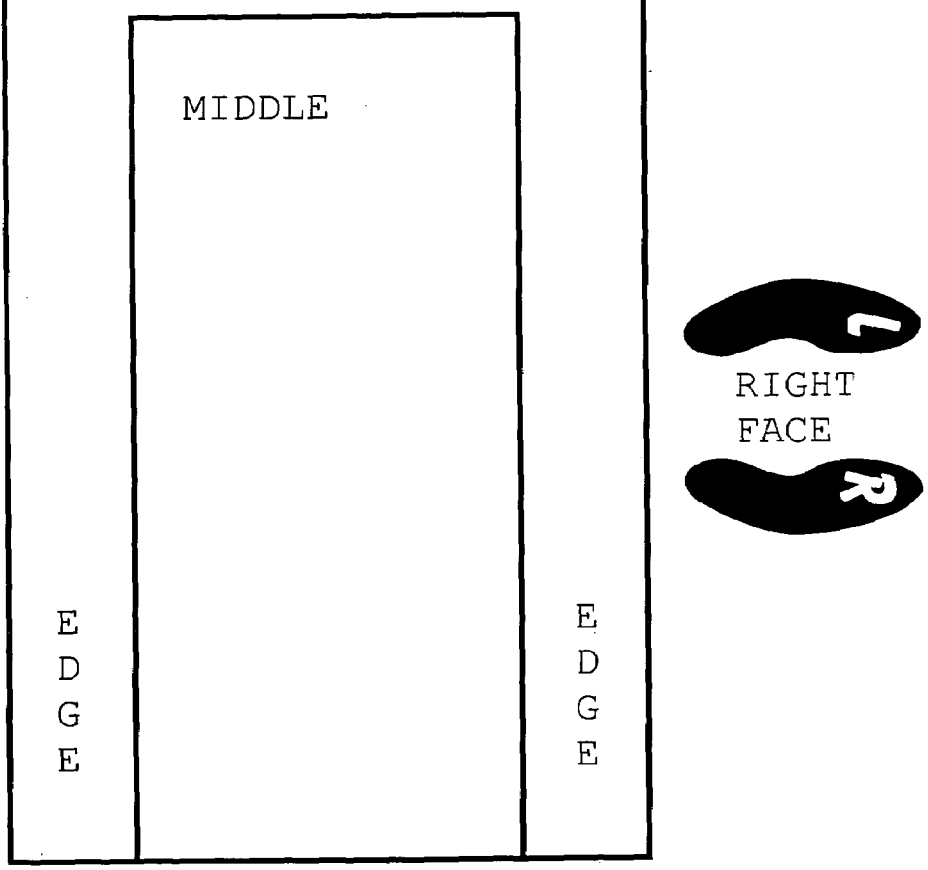
Figure 3C:
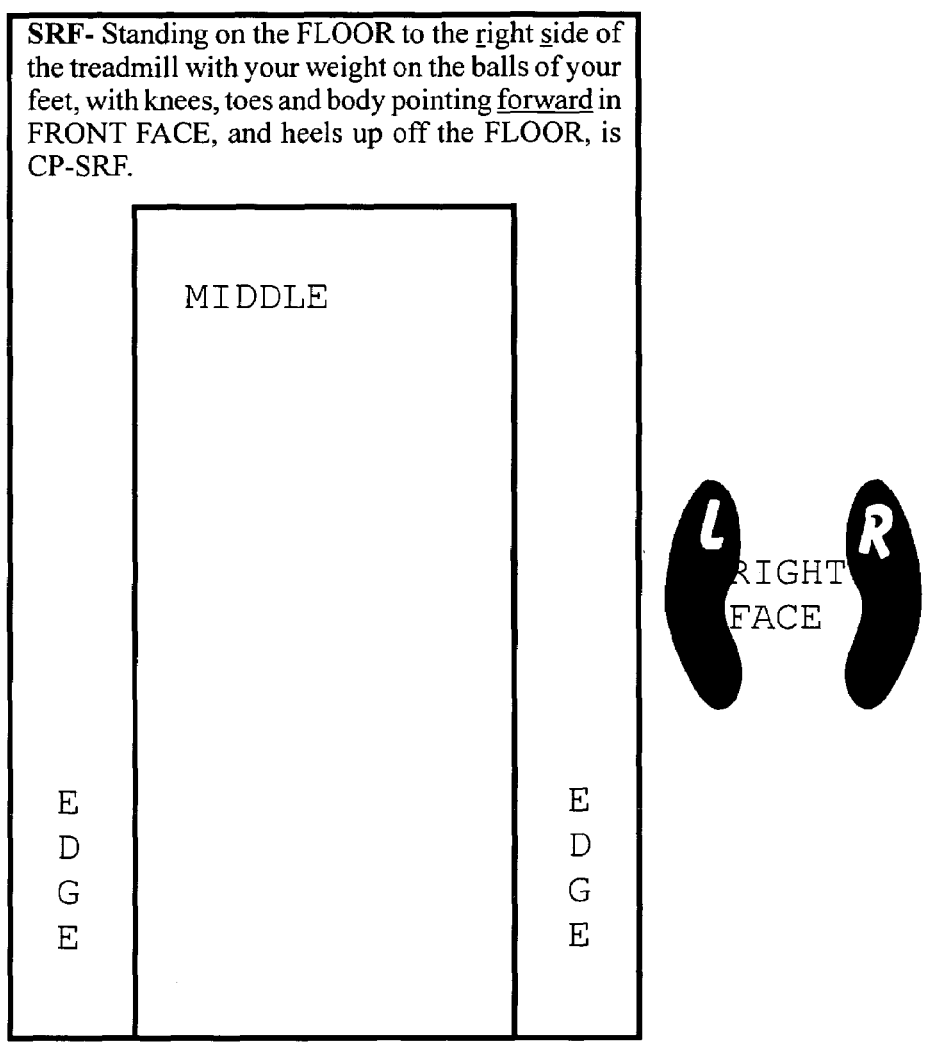
Figure 3D:
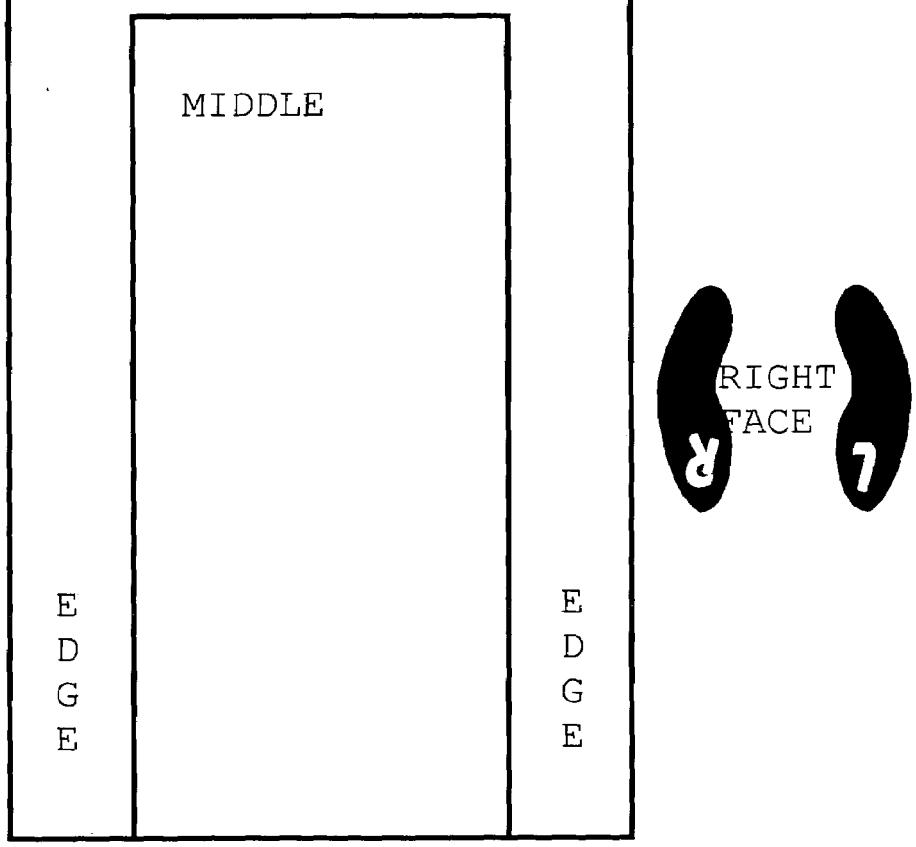
Figure 3E:
Figure 3F:
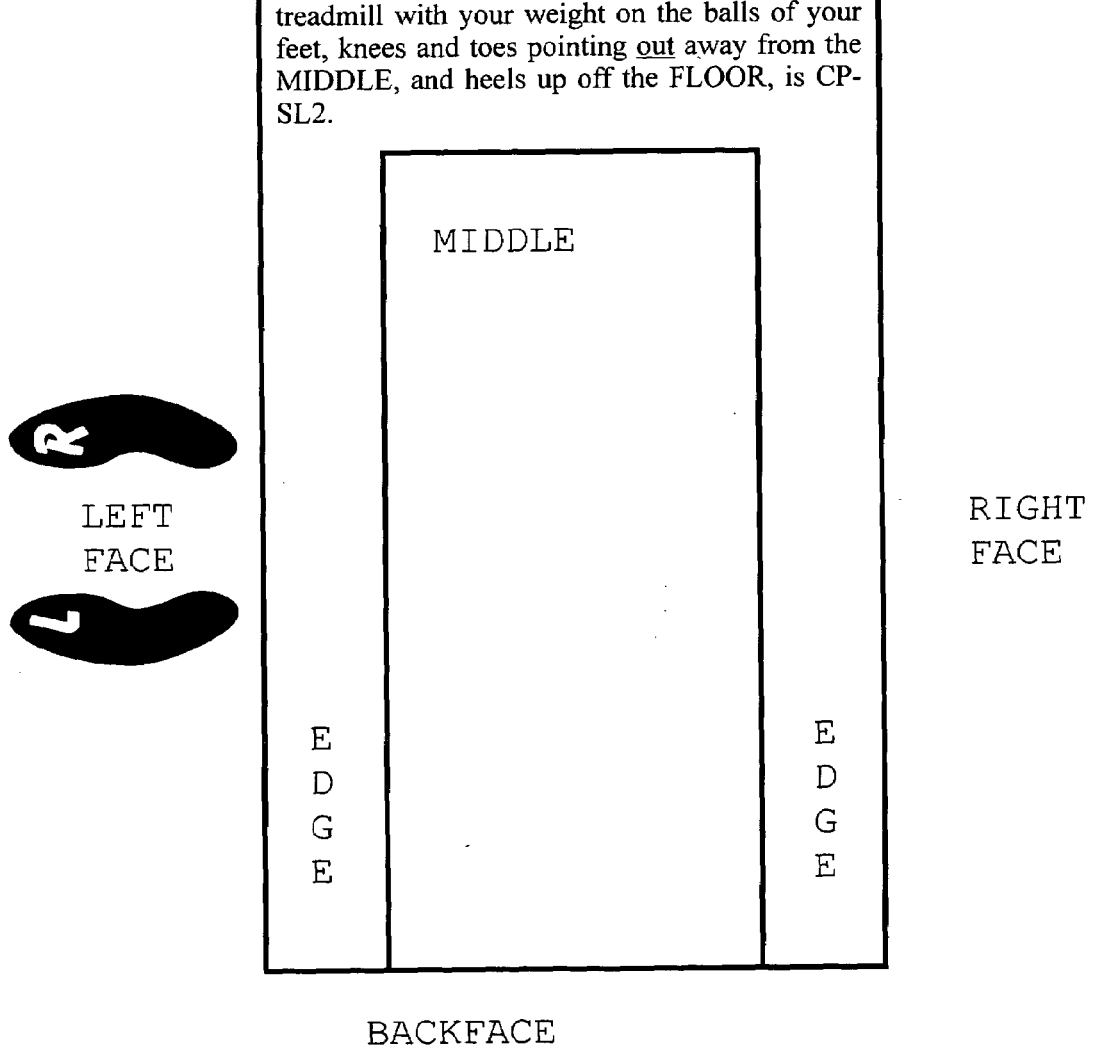
Figure 3G:
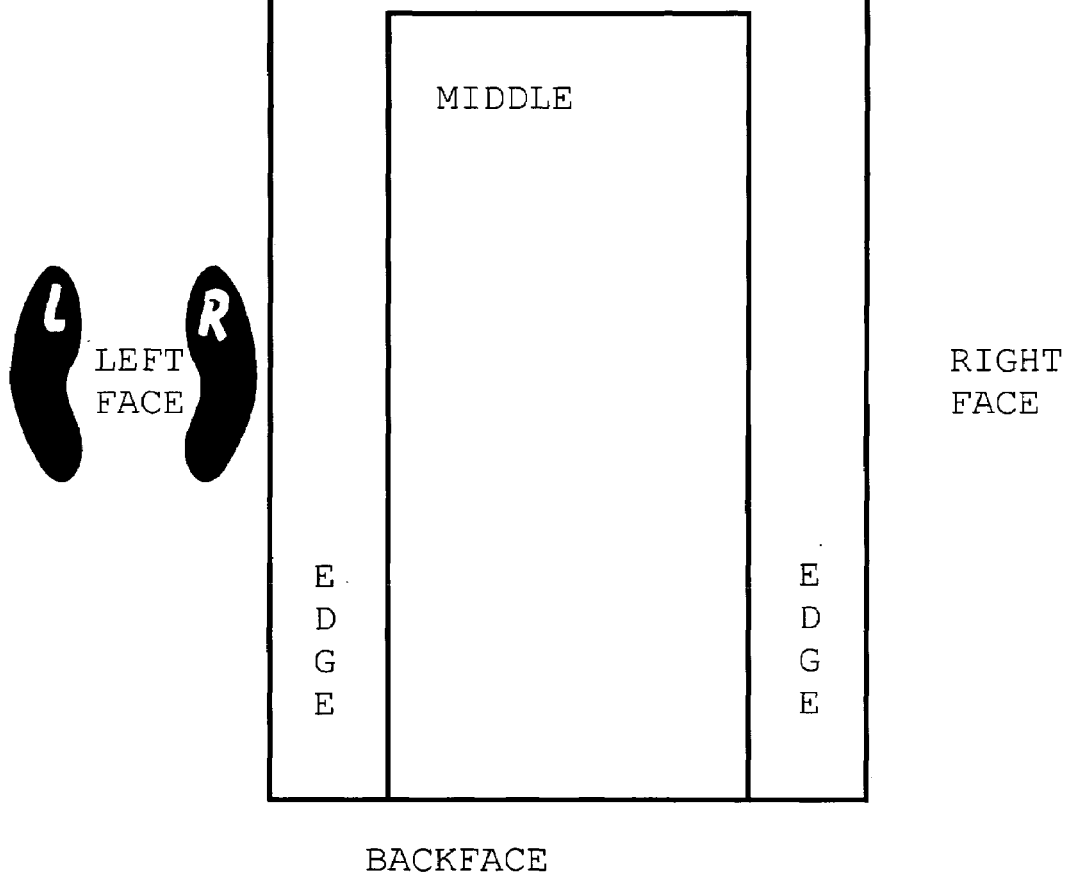
Figure 3H:
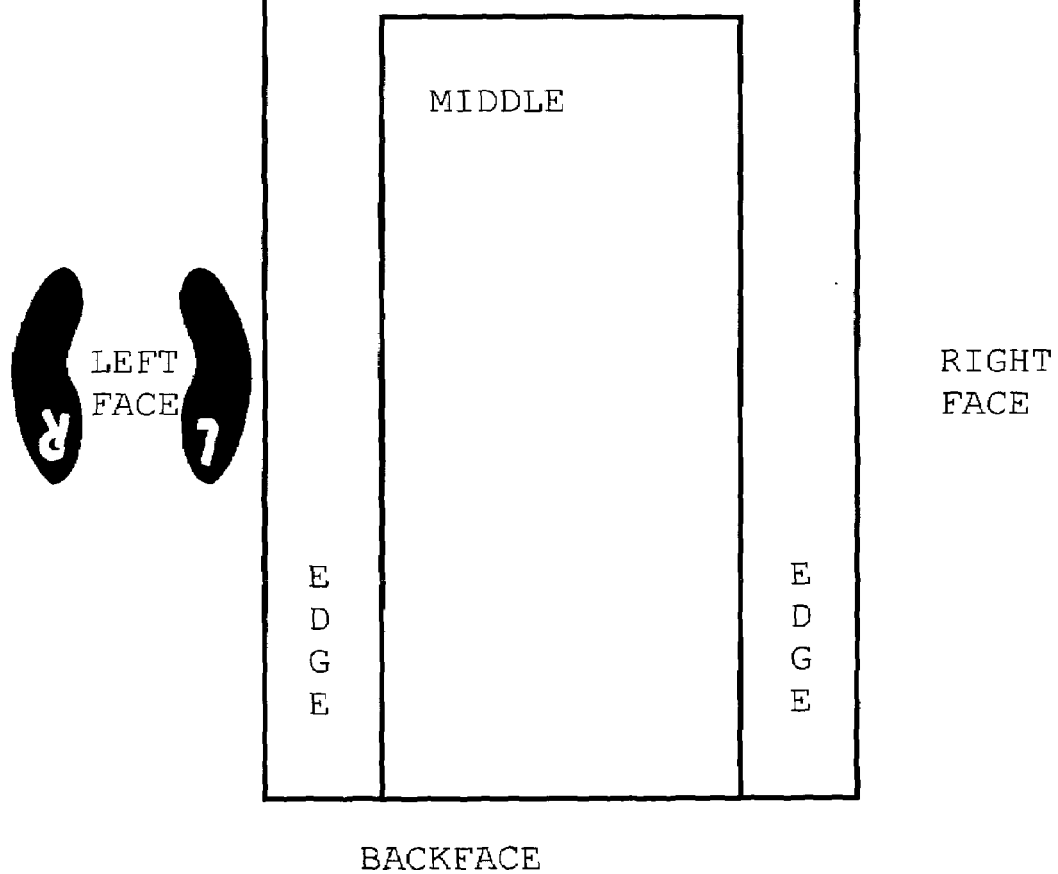
Figure 3I:
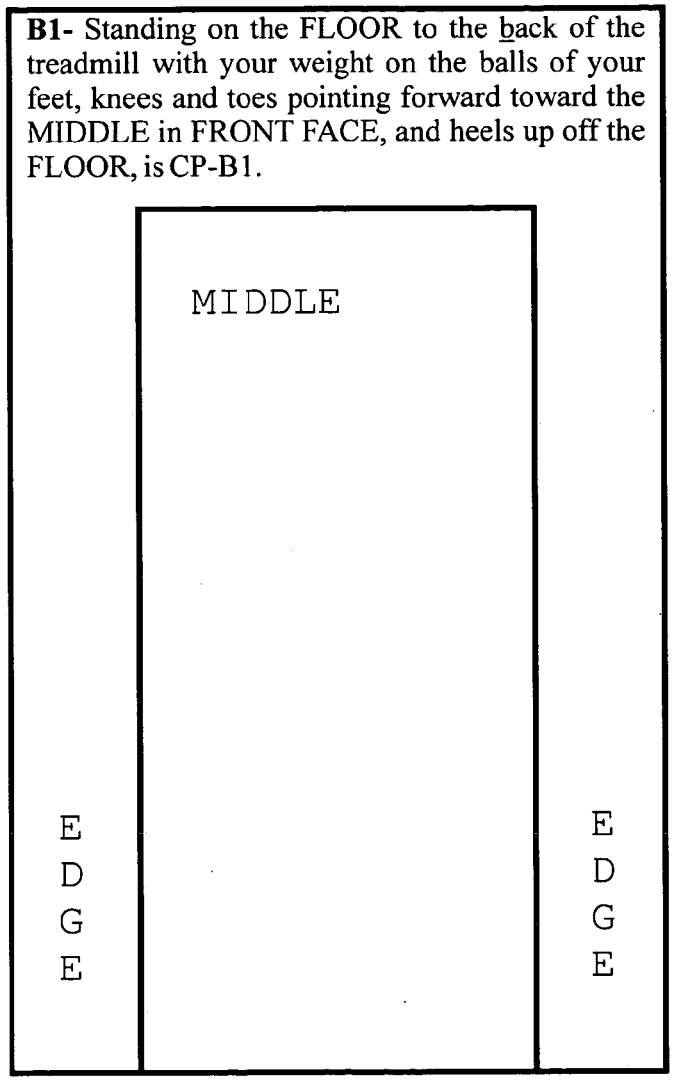
Figure 3J:
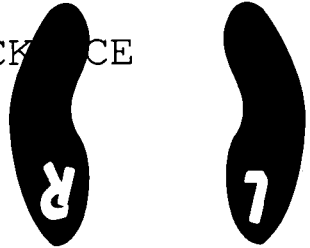
Figure 3K:
Figure 3K:
Figure 3L:
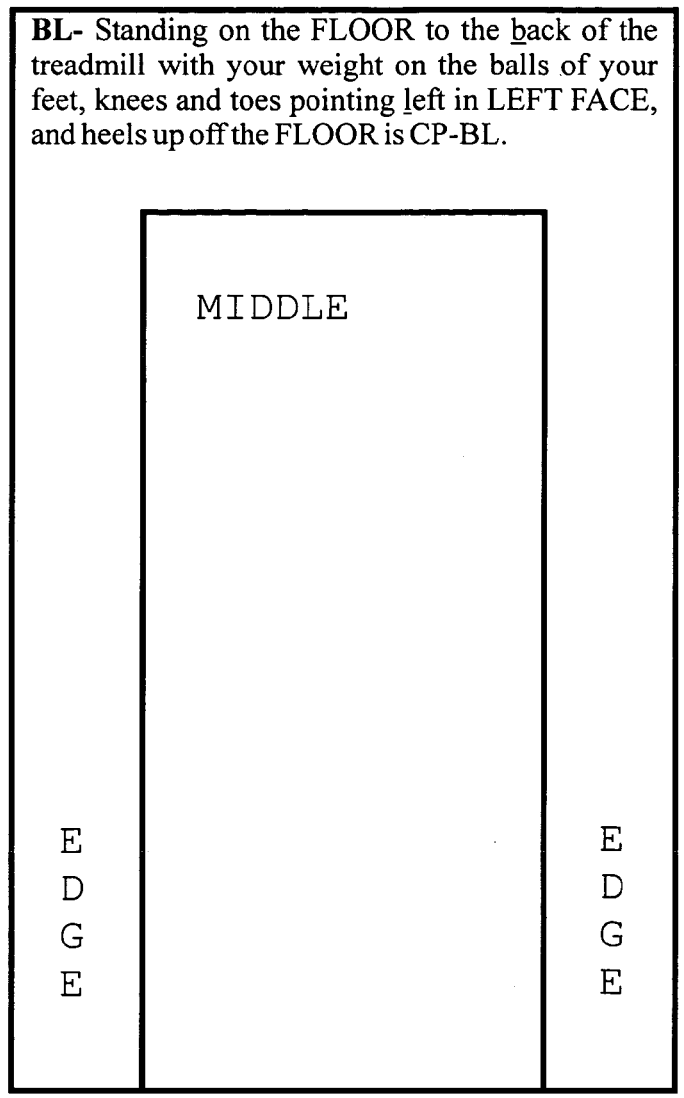
Figure 4A:
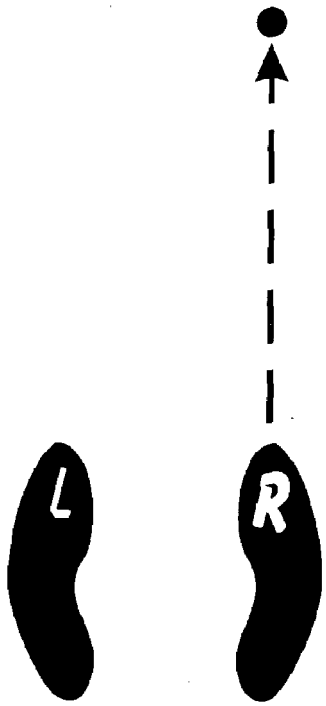
Figure 4B:
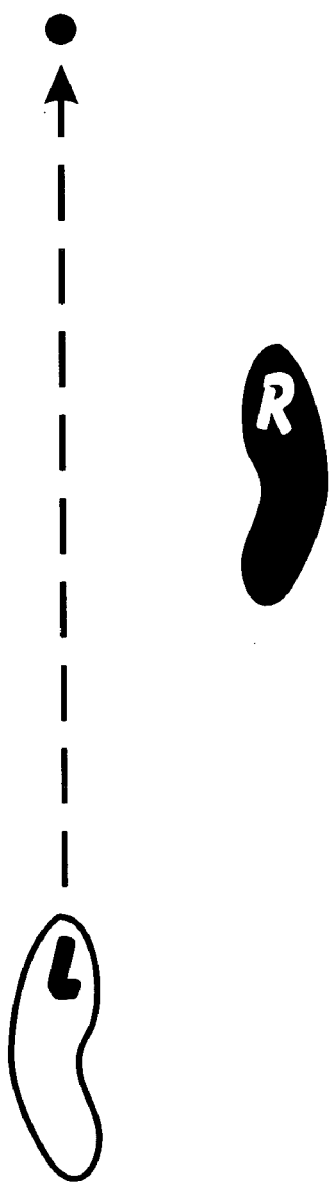
Figure 4C:
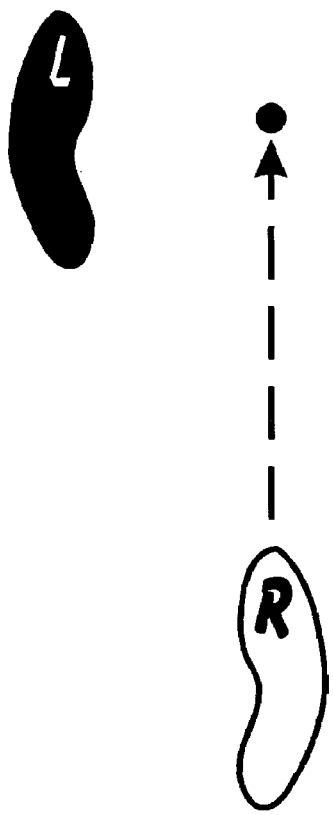
Figure 4D:
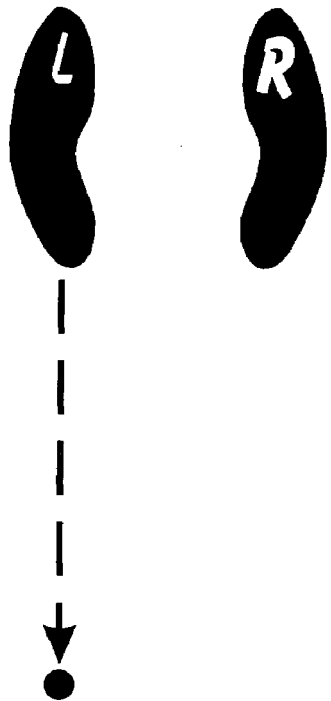
Figure 4E:
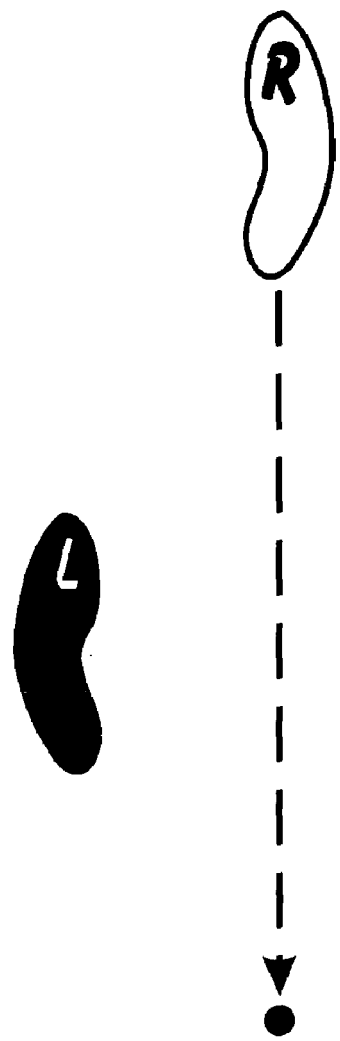
Figure 4F:
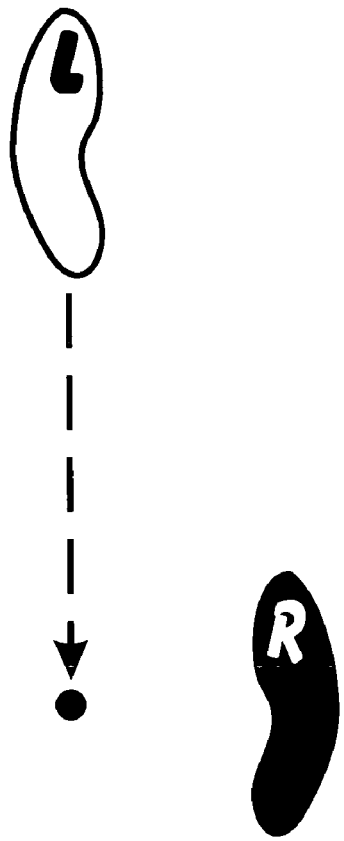
Figure 4G:
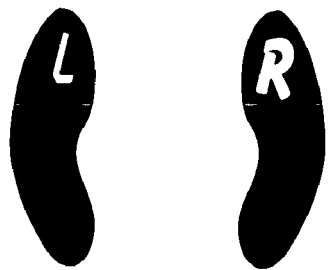
Figure 4H:
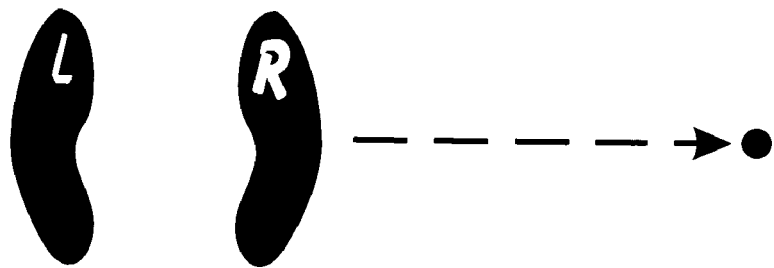
Figure 4I:
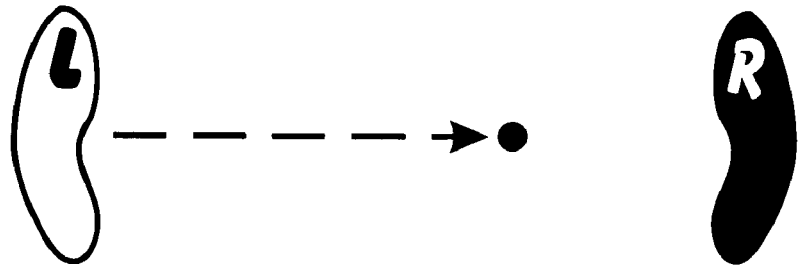
Figure 4J:
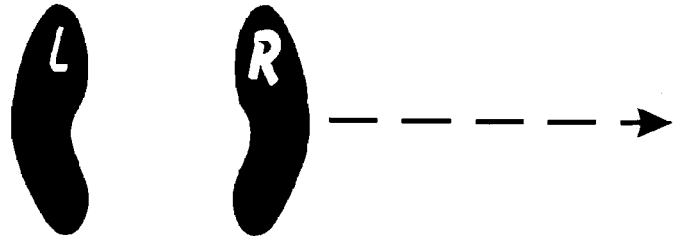
Figure 4K:
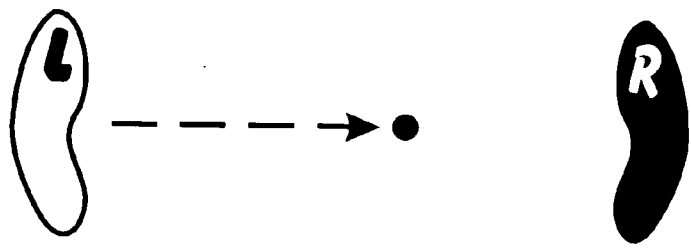
Figure 4L:
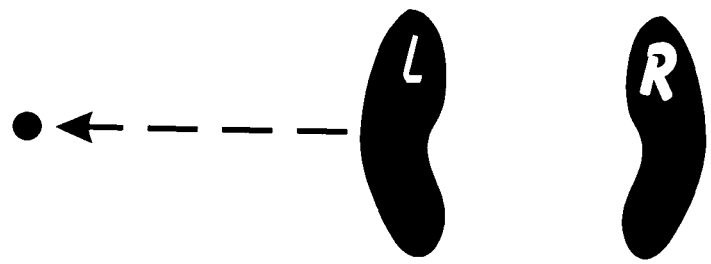
Figure 4M:
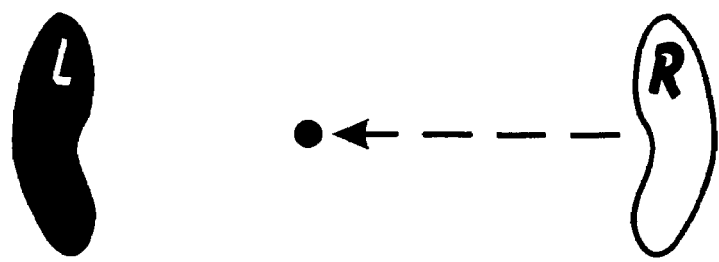
Figure 4N:
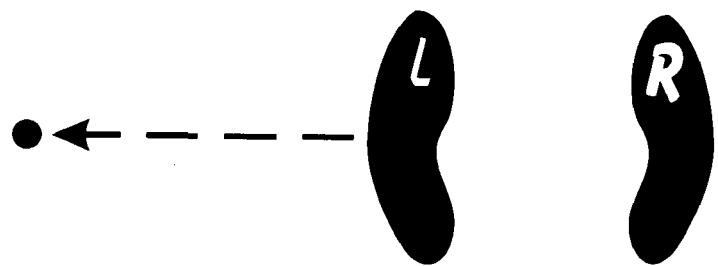
Figure 40:
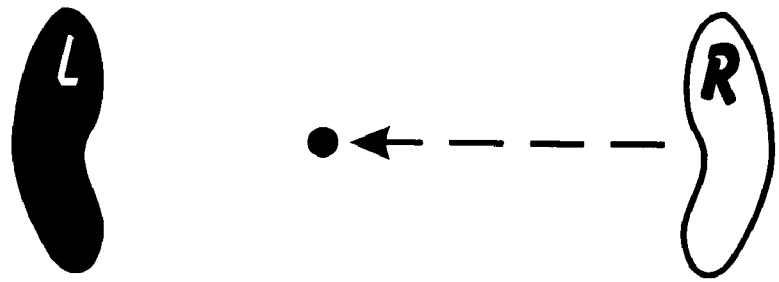
Figure 4P:
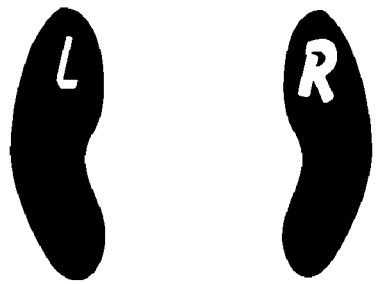
Figure 4Q:
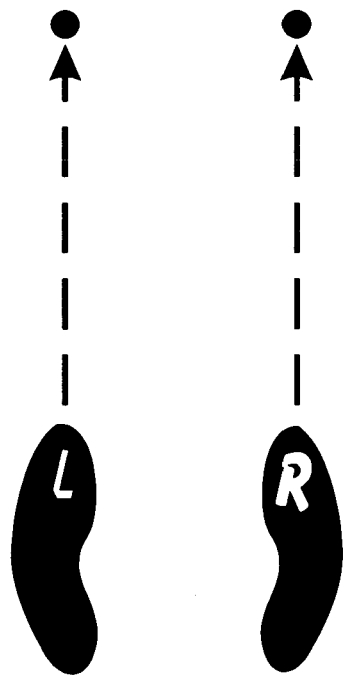
Figure 4R:
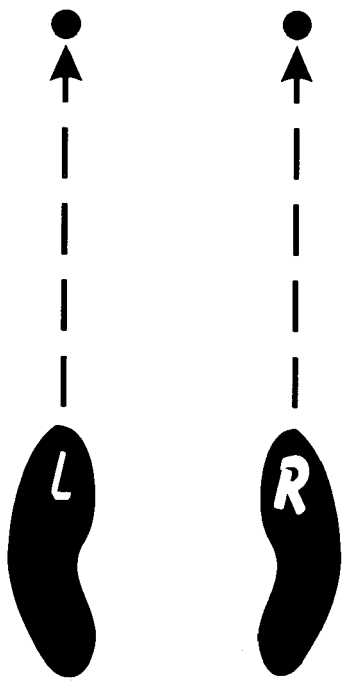
Figure 4S:
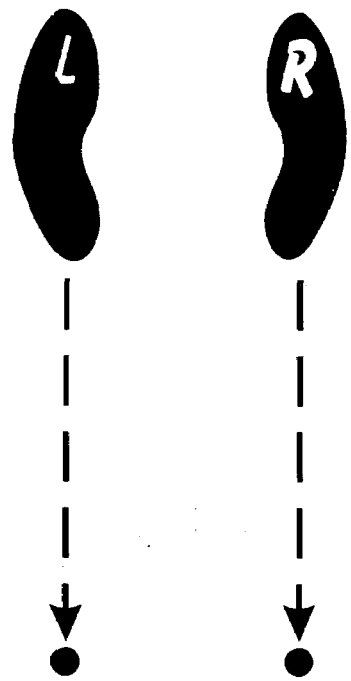
Figure 4T:
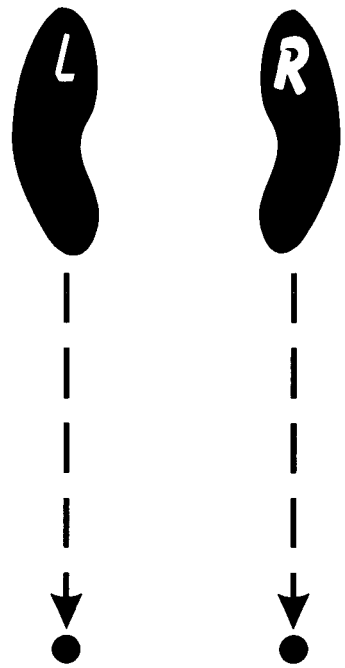
Figure 4U:
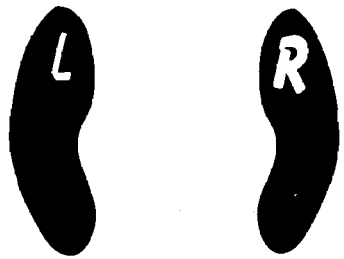
Figure 4V:
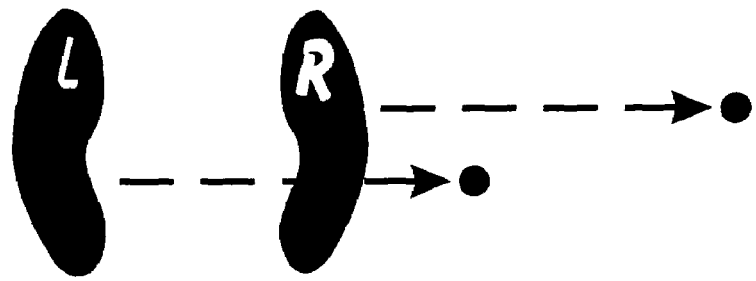
Figure 4W:
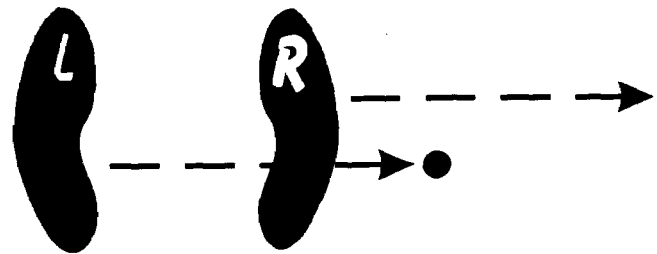
Figure 4X:
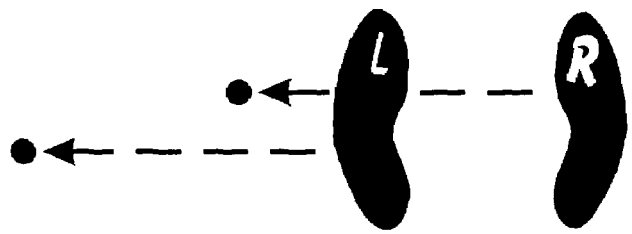
Figure 4Y:
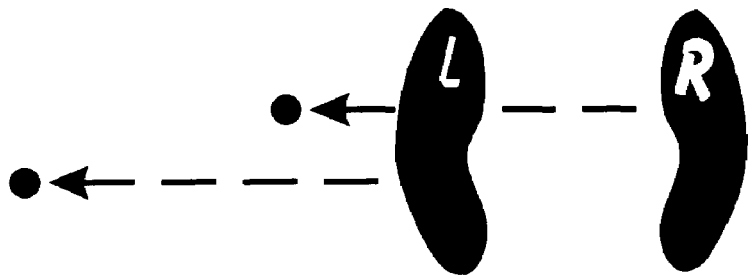
Figure 4Z:
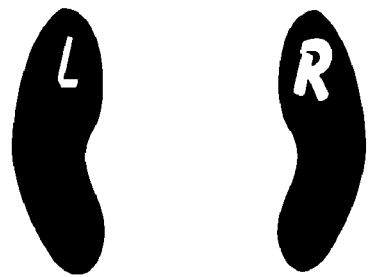
Figure 5B:
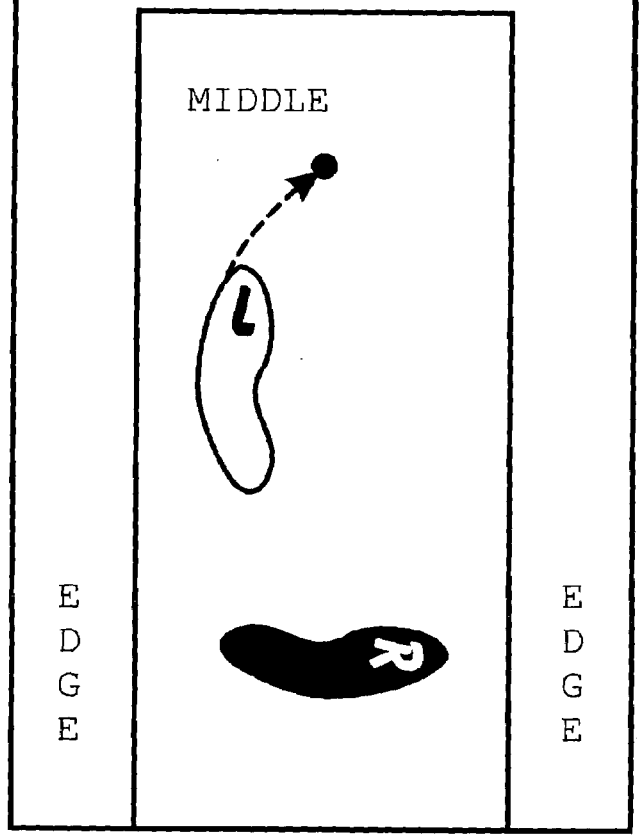
Figure 5C:
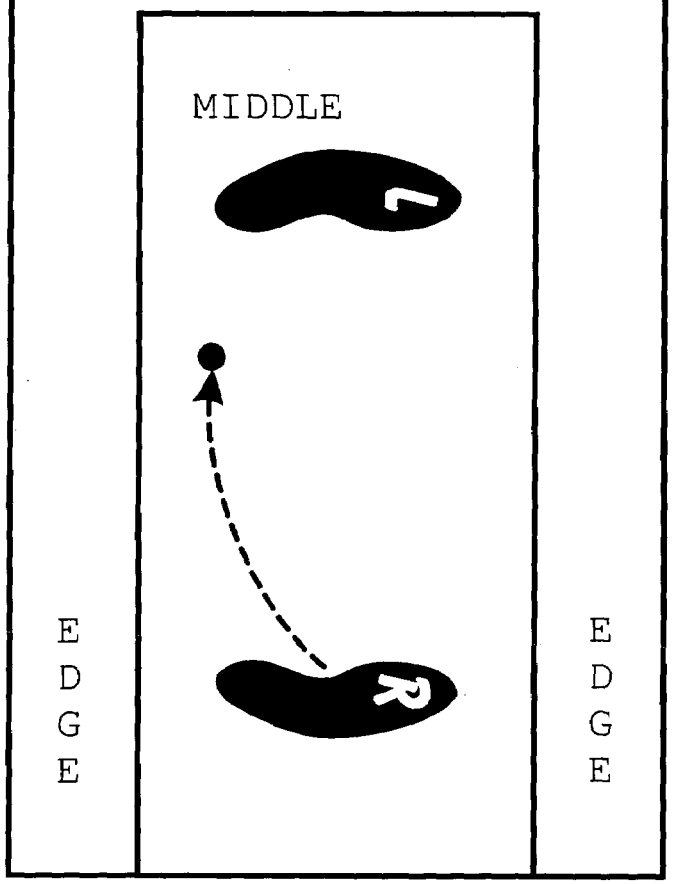
Figure 5D:
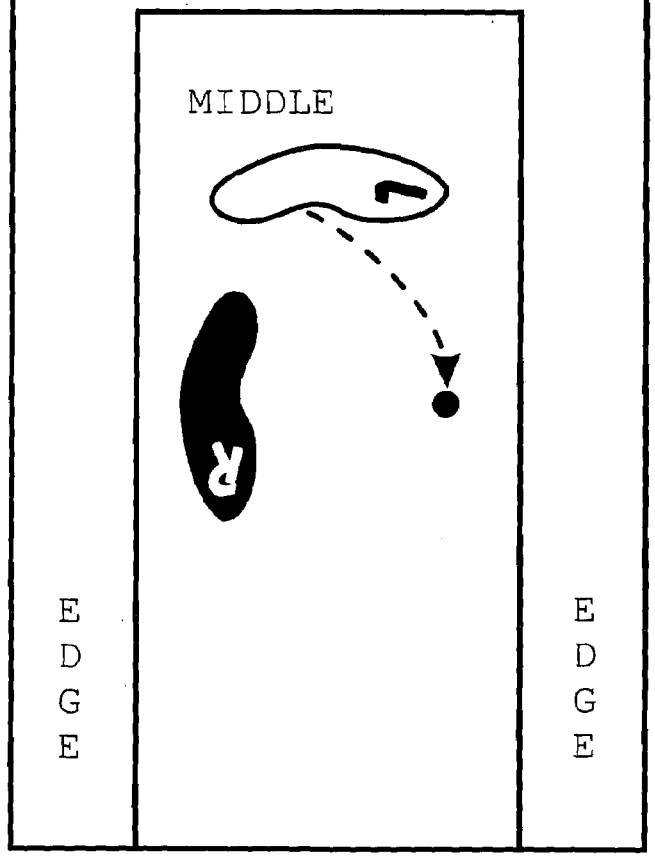
Figure 5E:
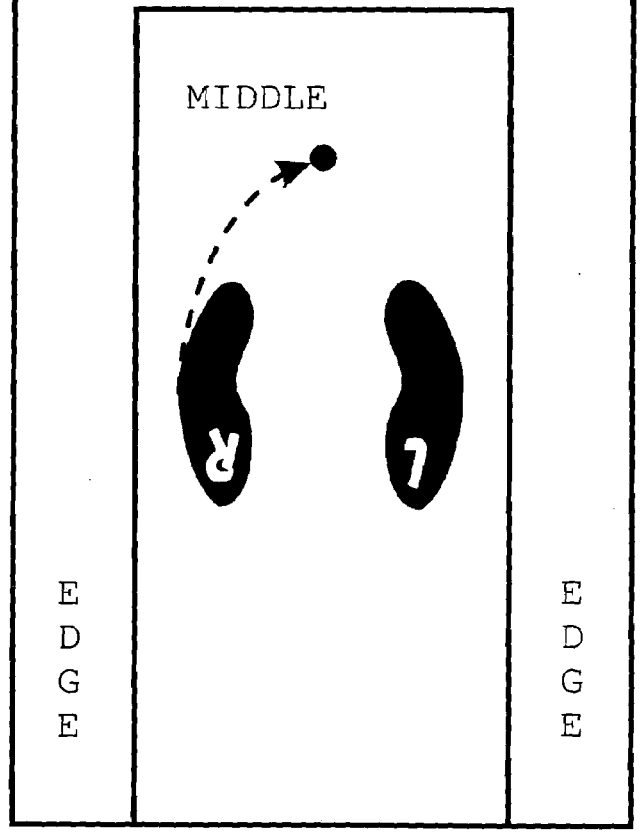
Figure 5G:
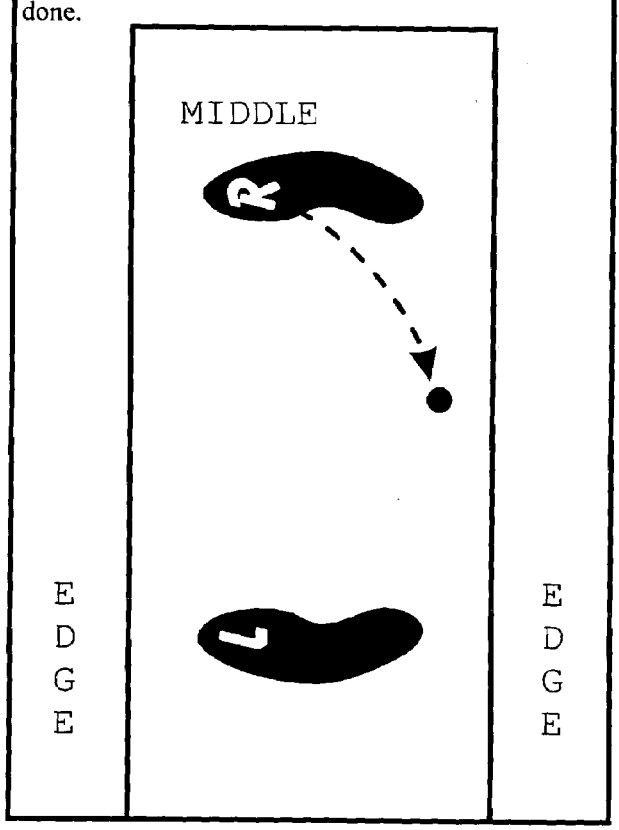
Figure 5H:
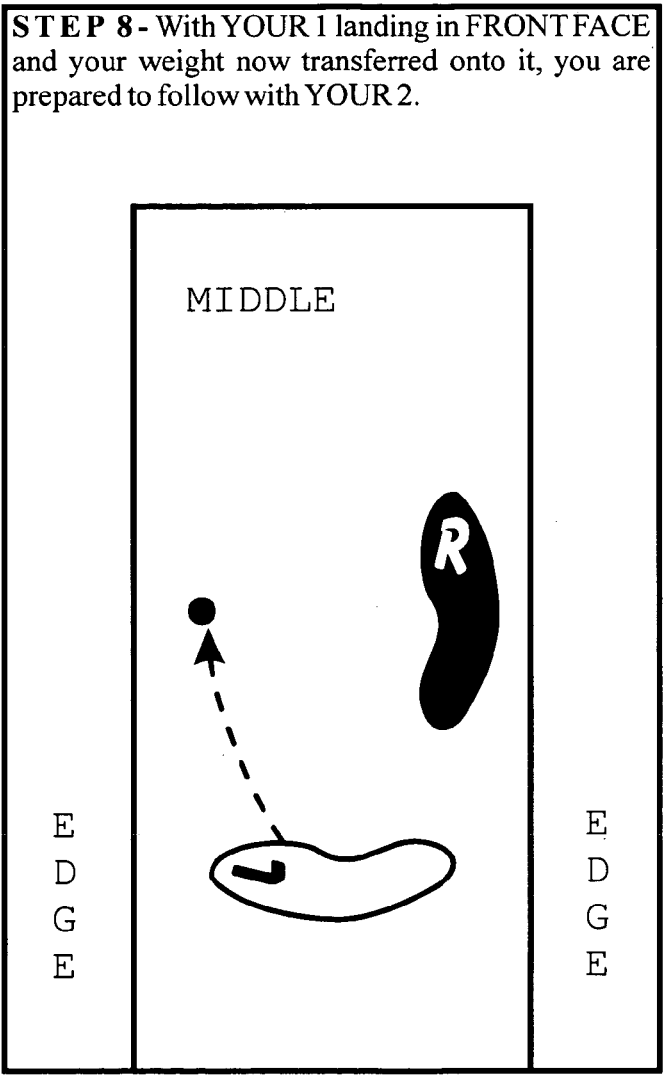
Figure 5I:
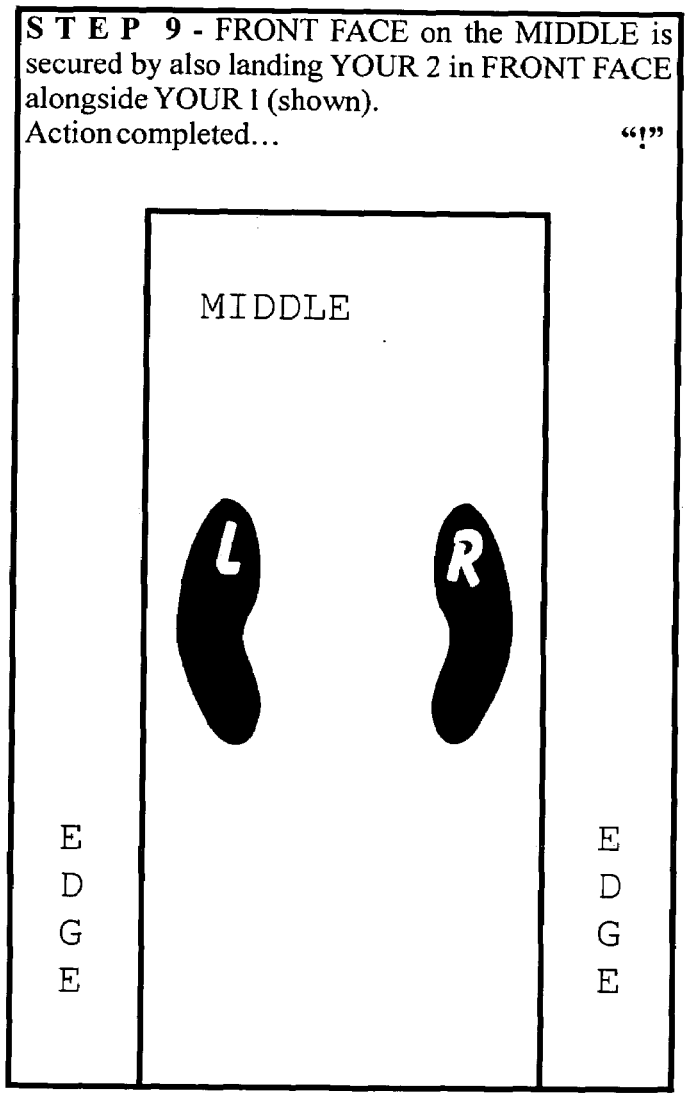
Figure 5J:
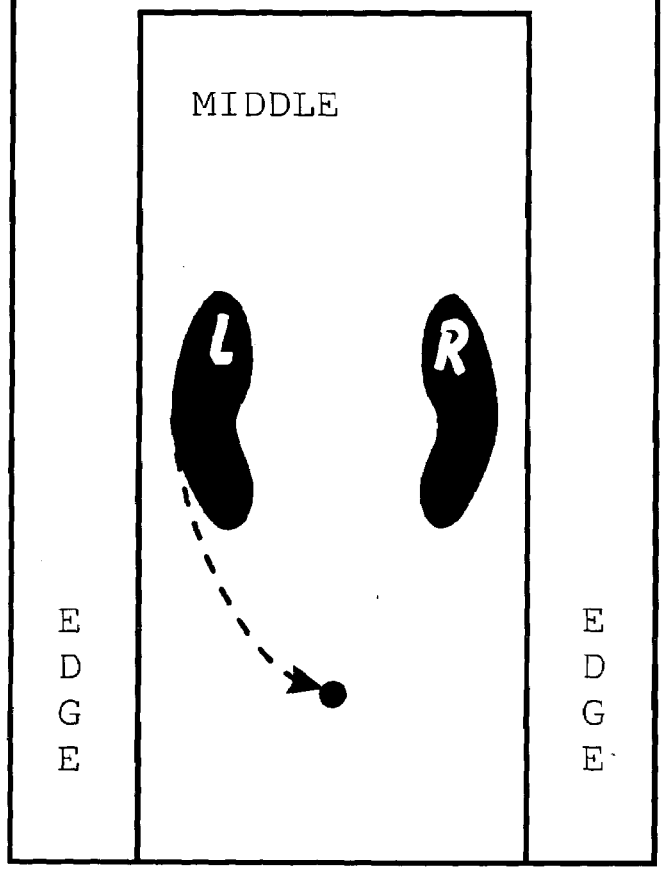
Figure 5K:
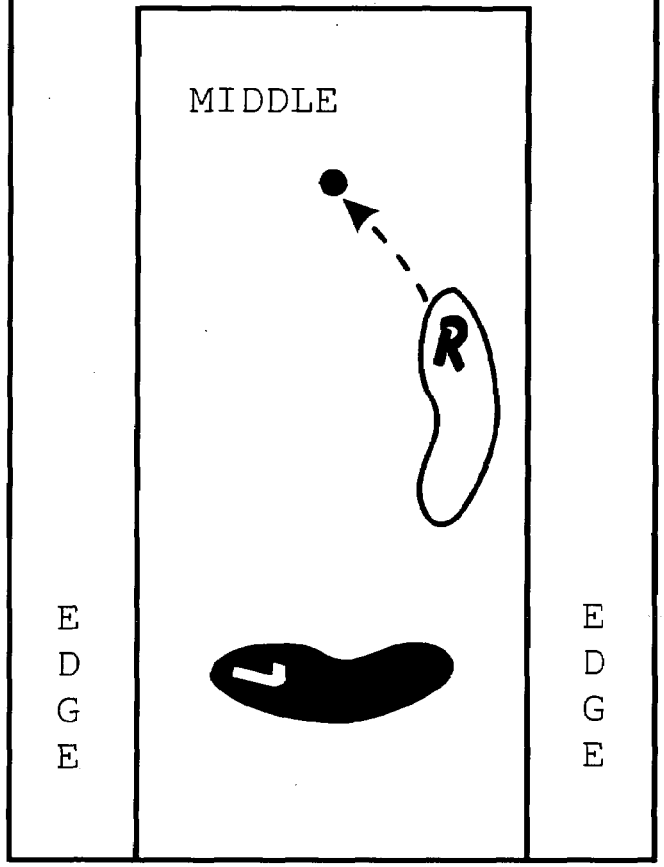
Figure 5L:
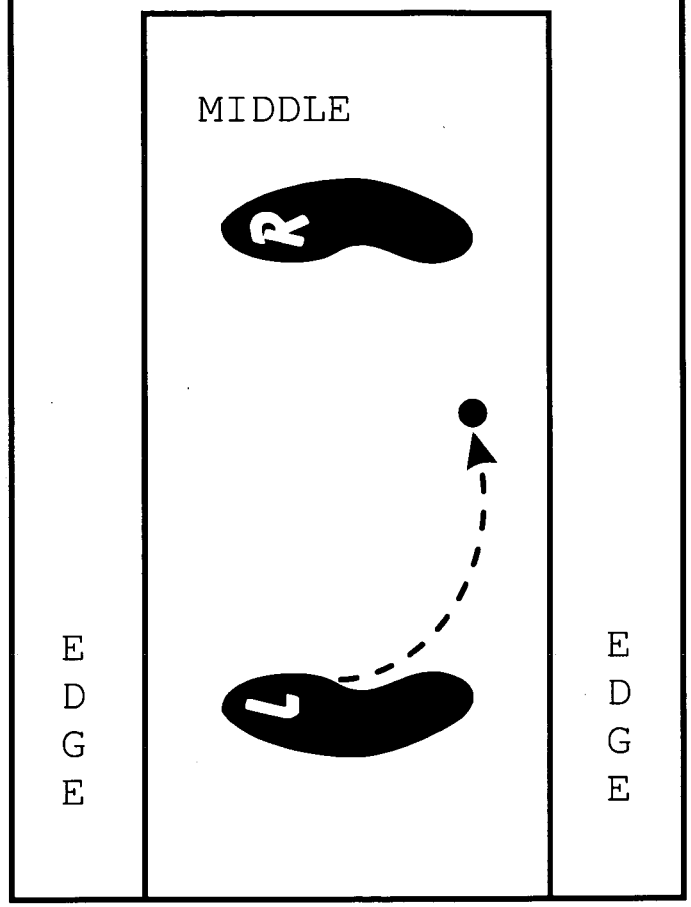
Figure 5M:
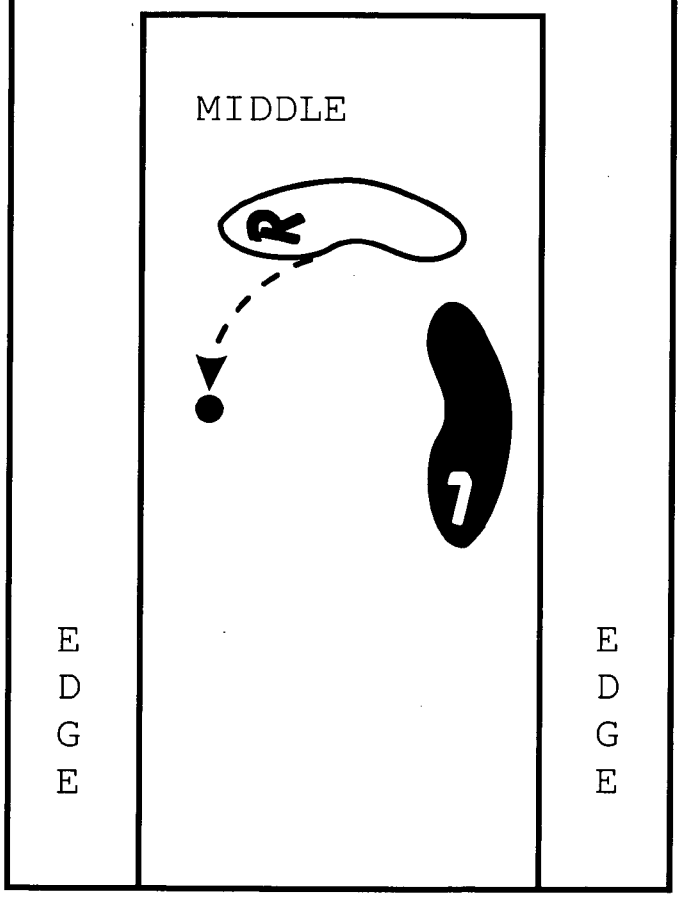
Figure 5N:
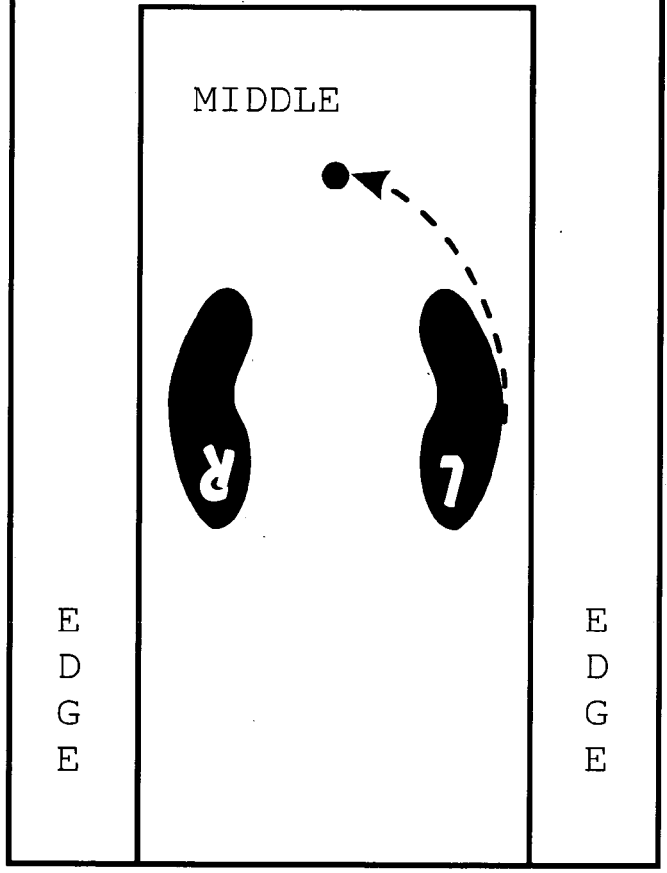
Figure 50:
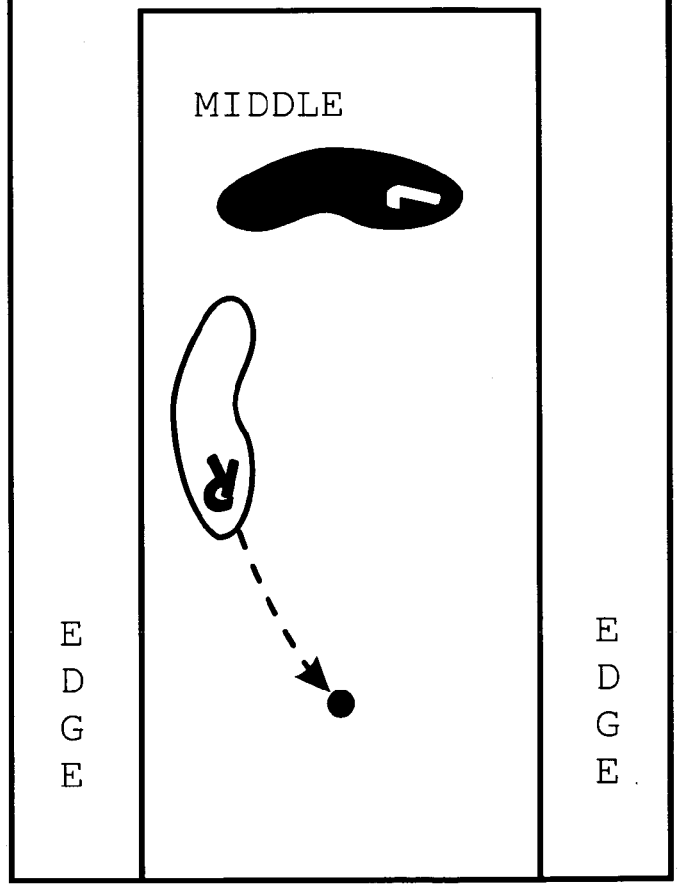
Figure 5P:
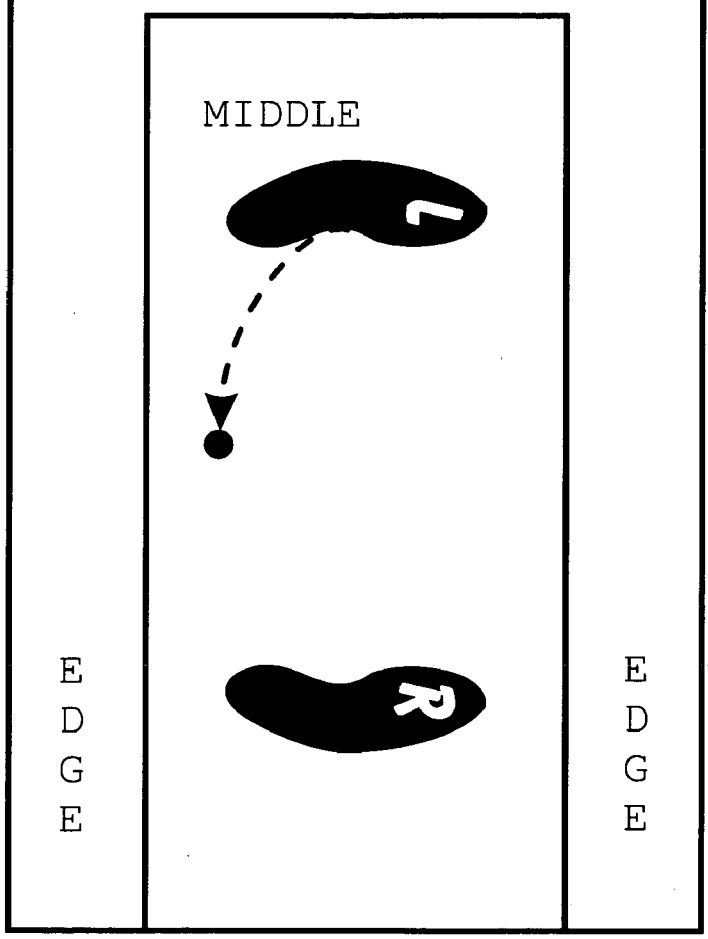
Figure 5Q:
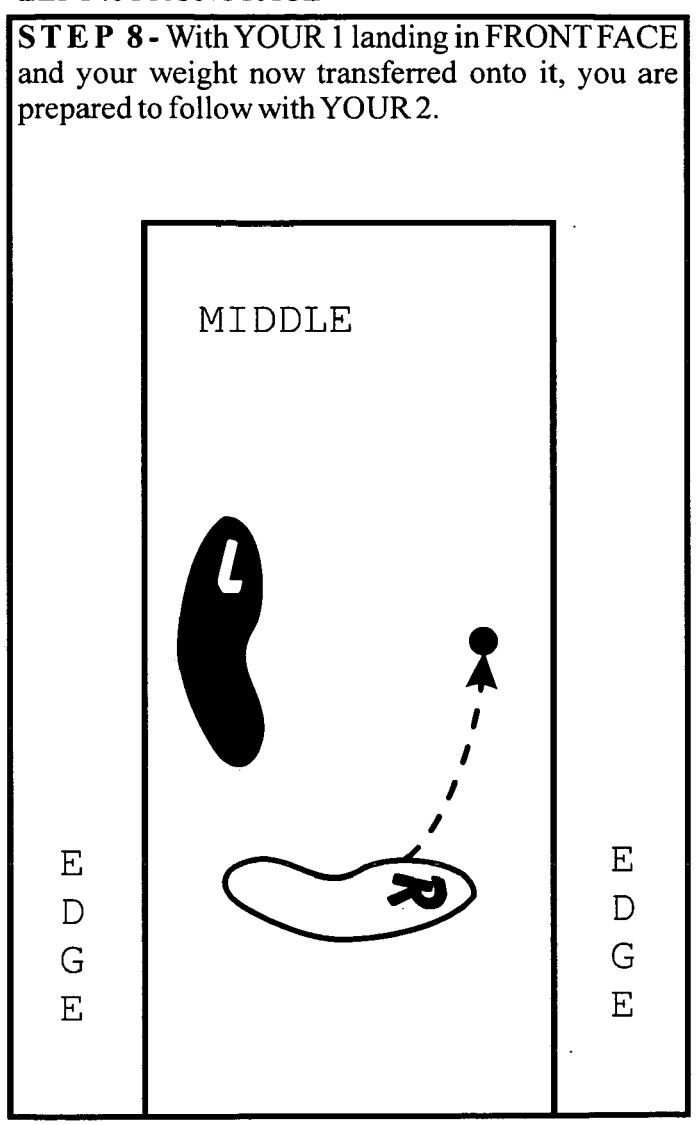
Figure 5R:
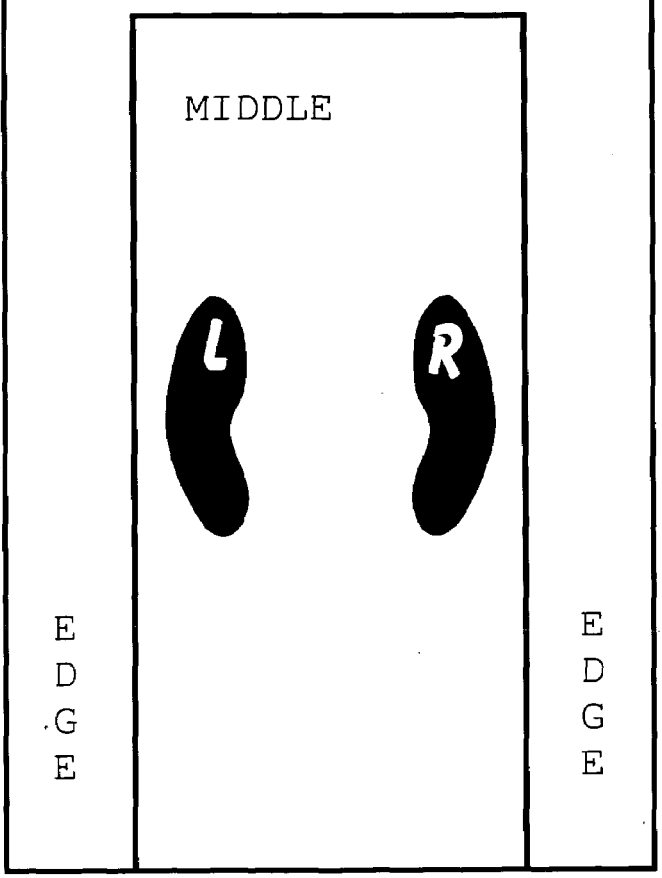
Figure 5S:
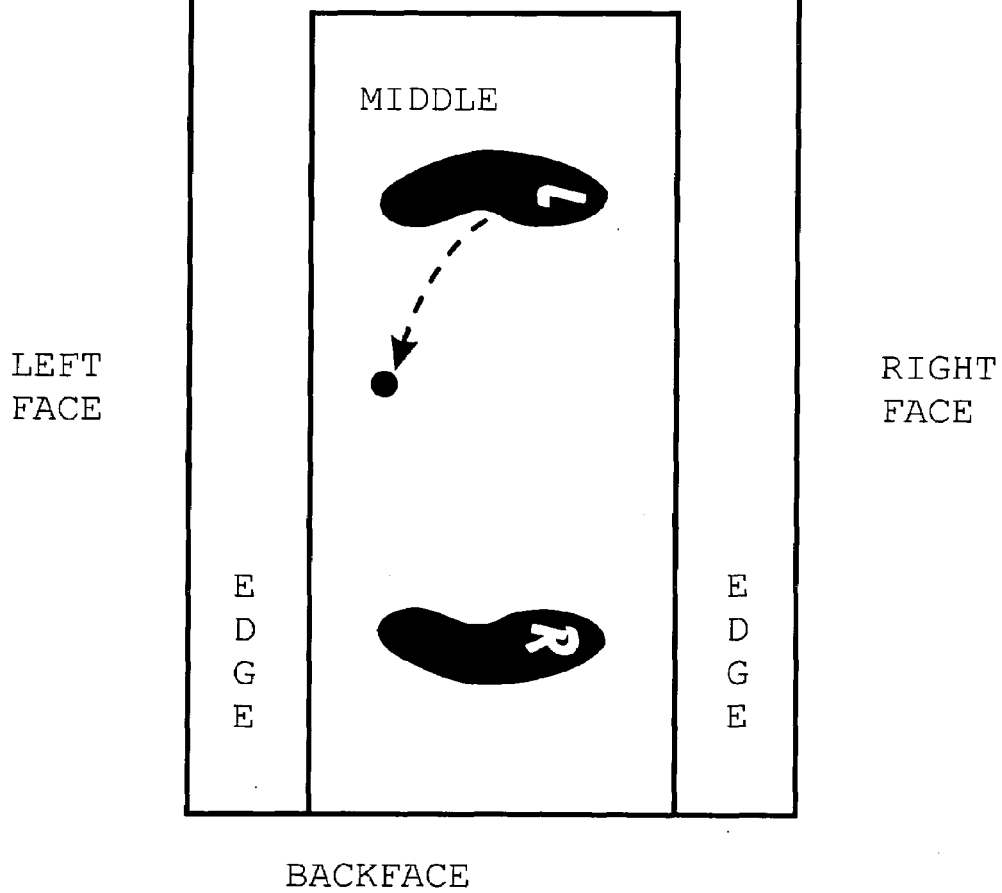
Figure 5W:
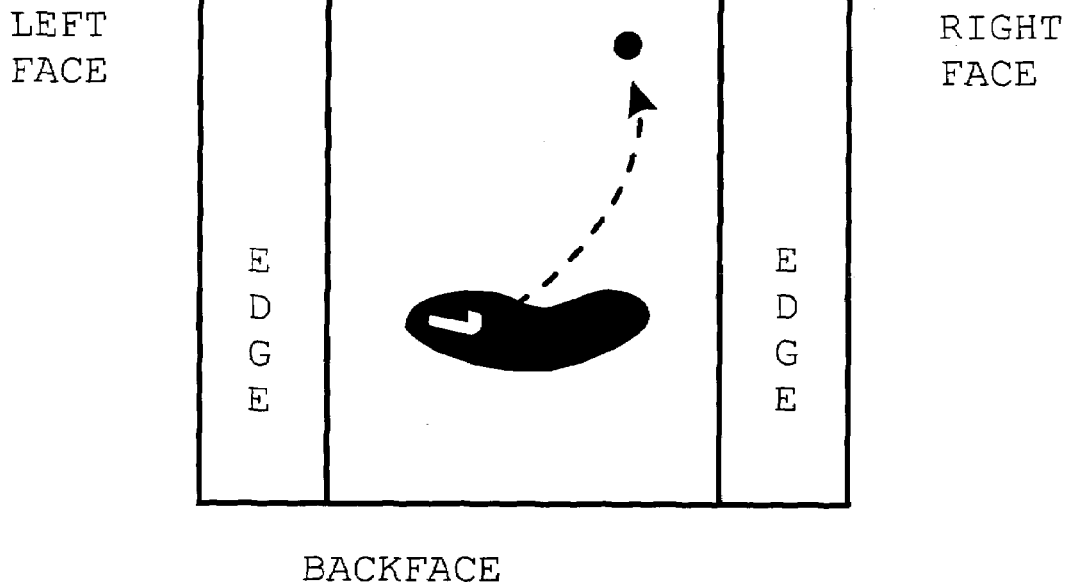
Figure 5X:
Figure 5X:
Figure 5X:
Figure 5Y:
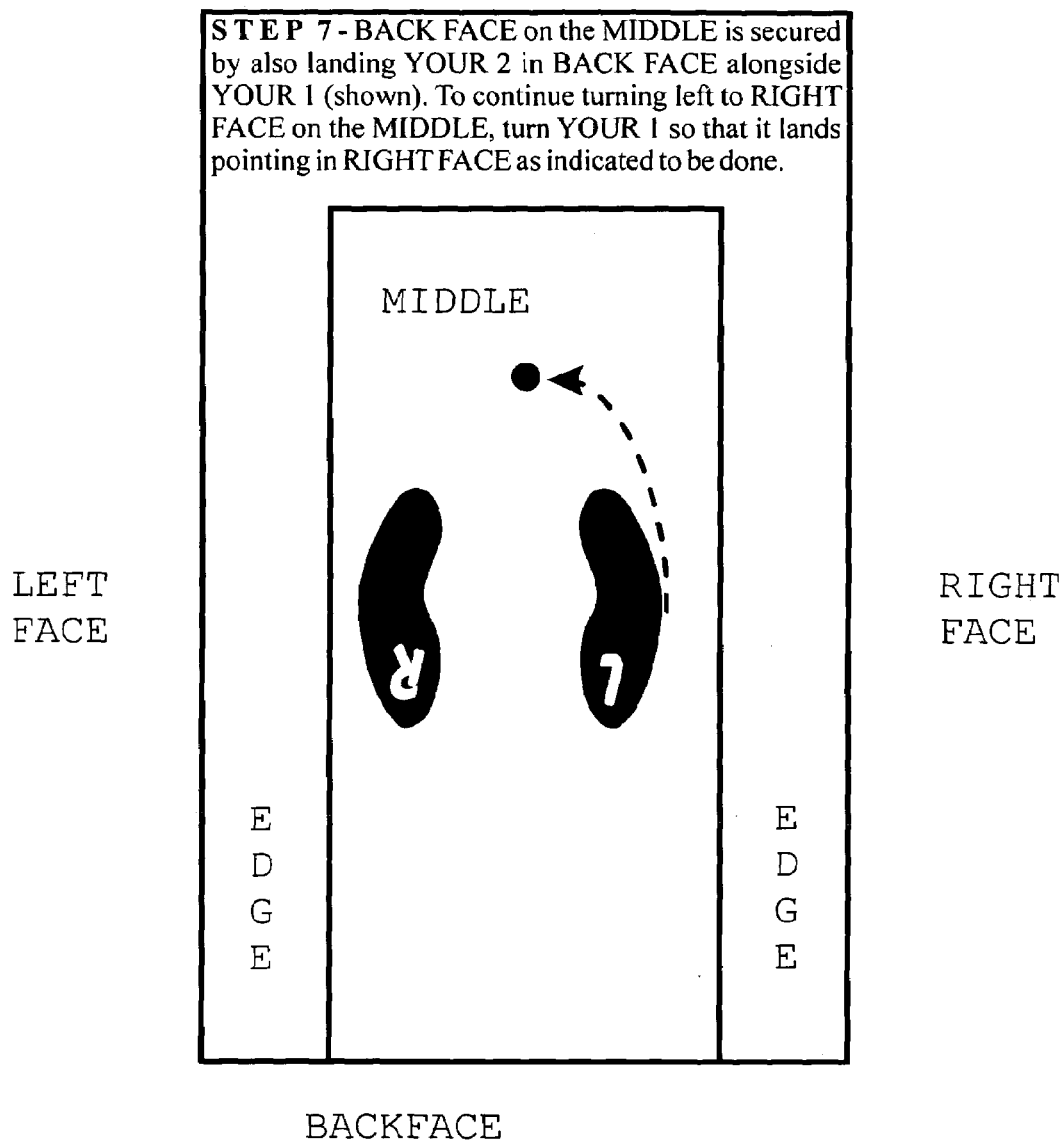
Figure 5Z:
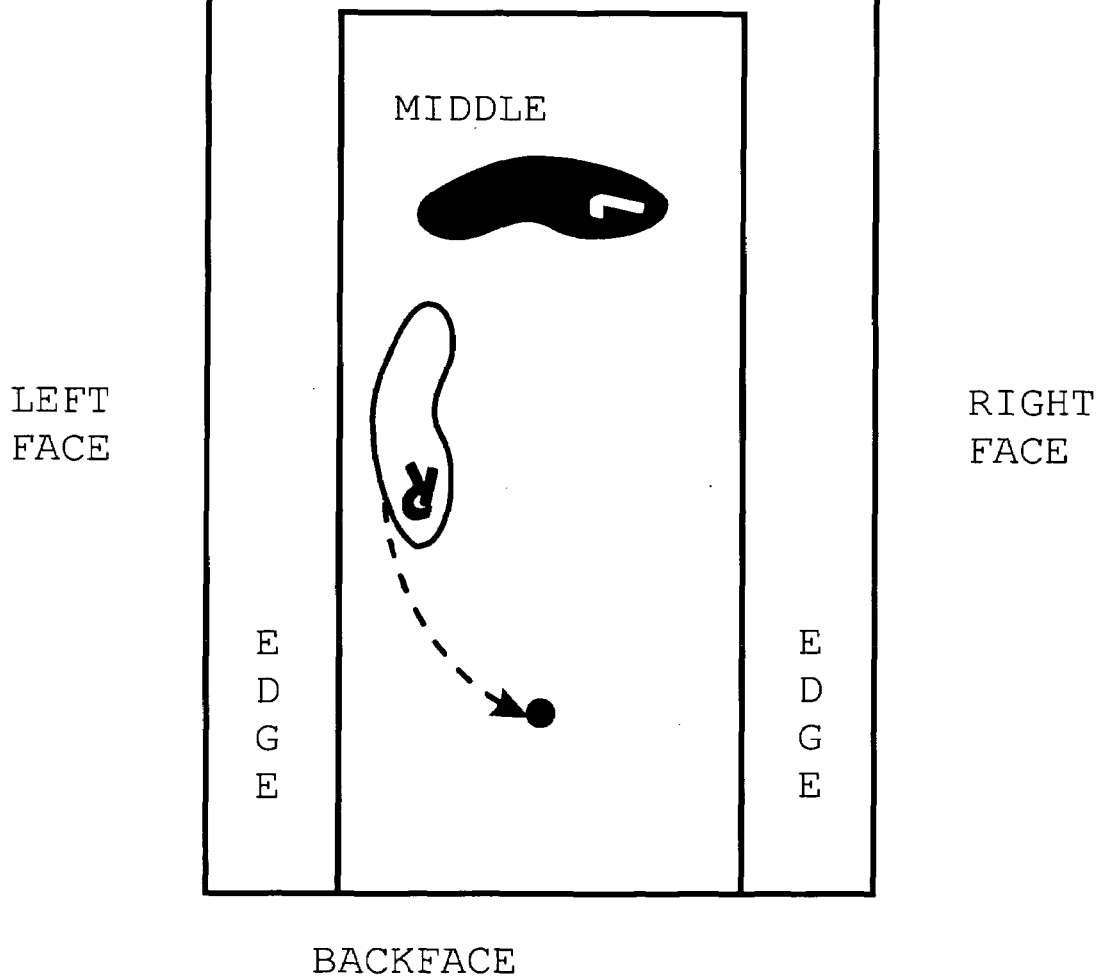
Figure 5A:
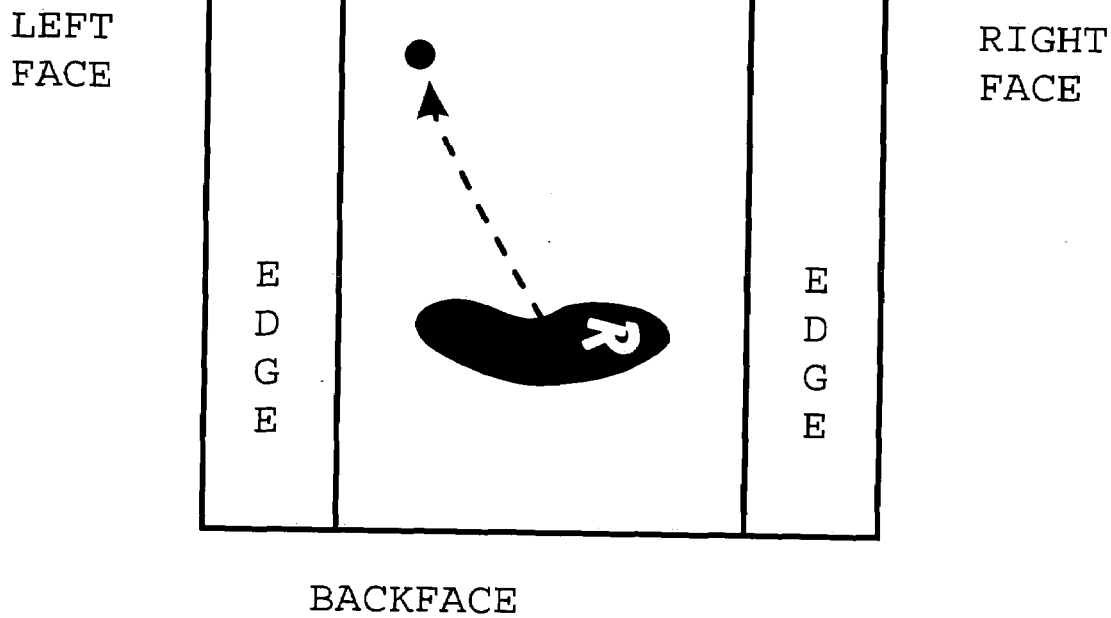
Figure 5A:
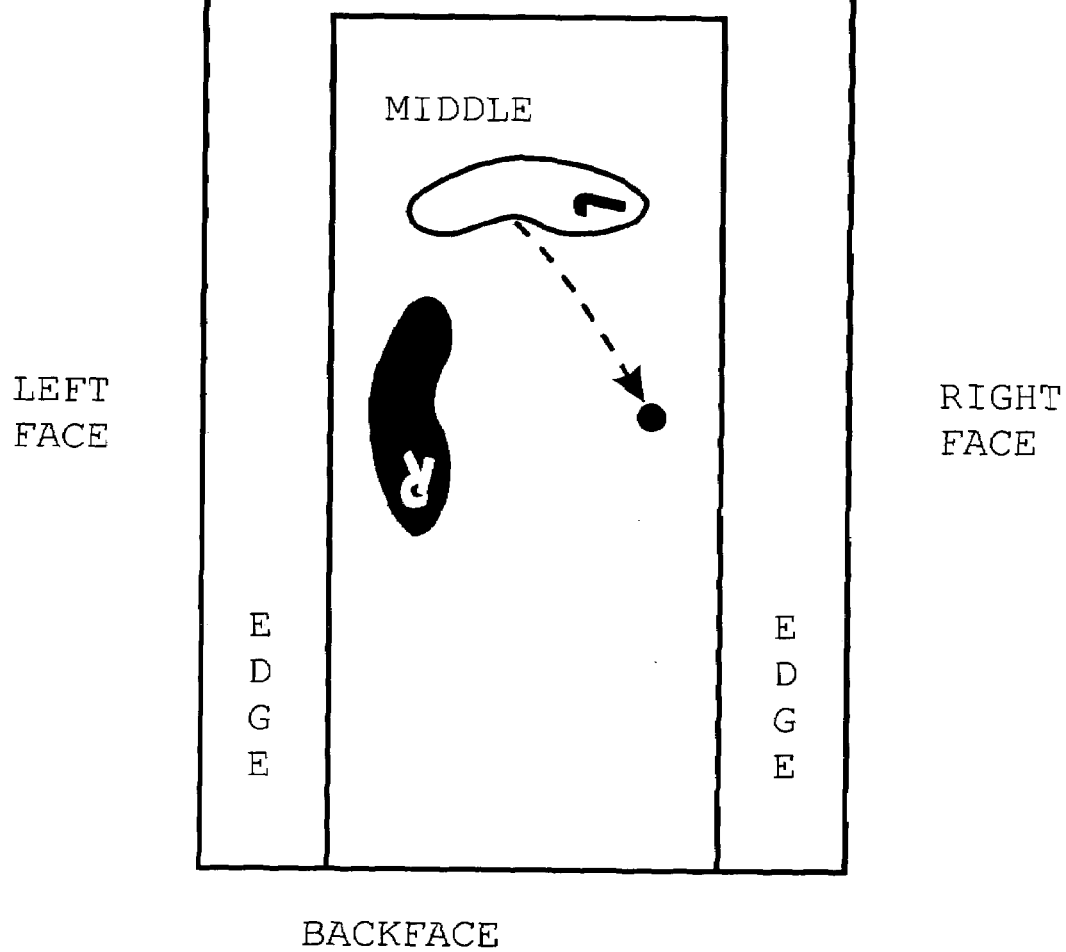
Figure 5A:
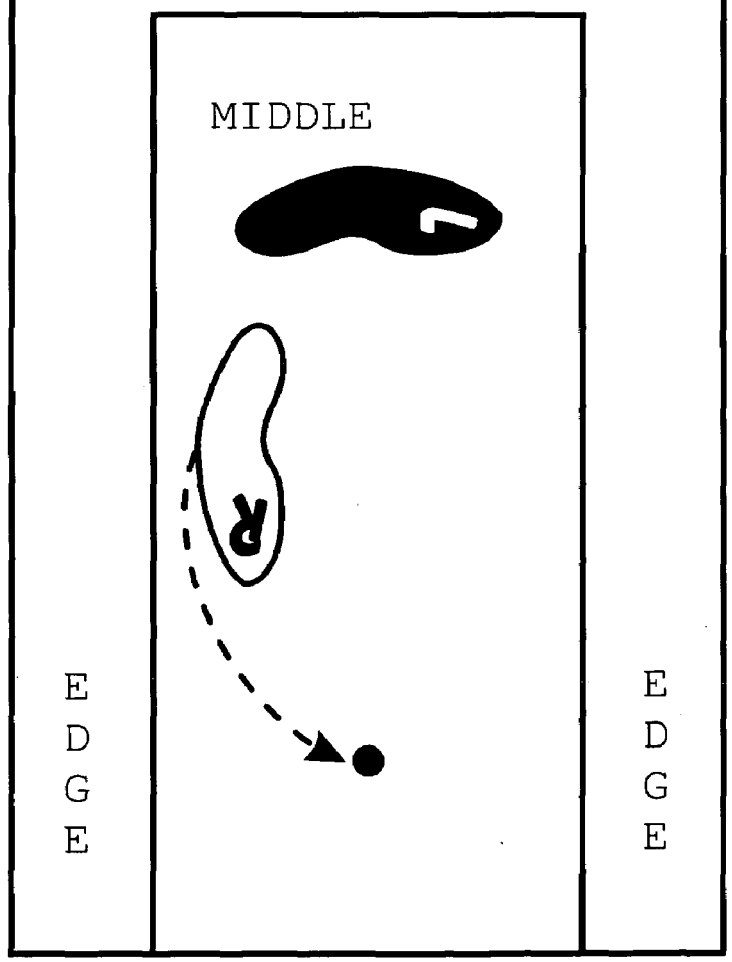
Figure 5A:
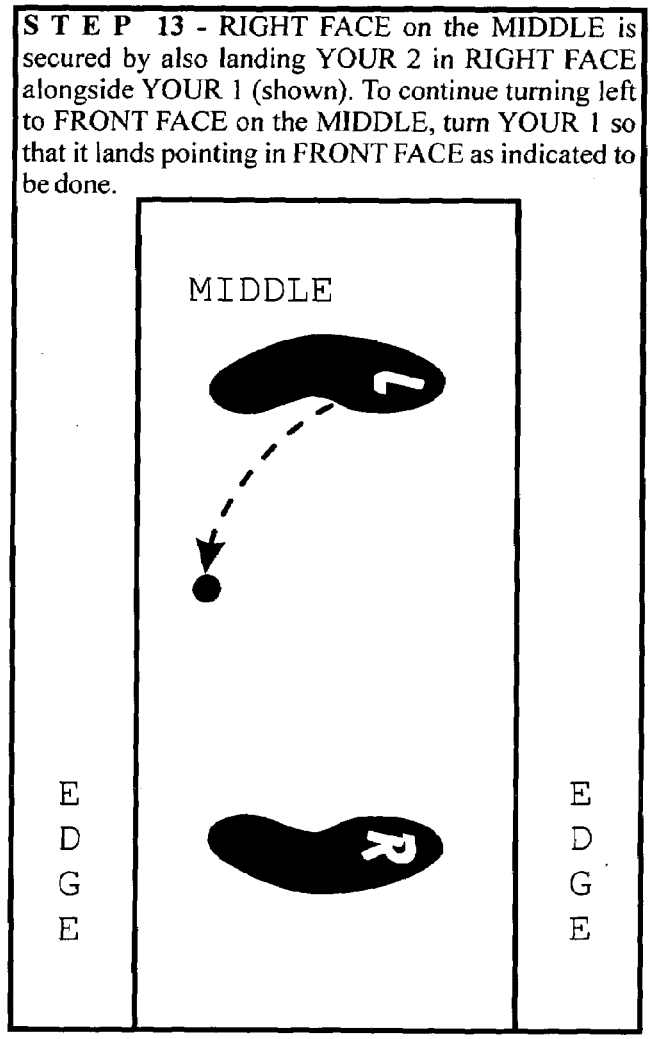
Figure 5A:
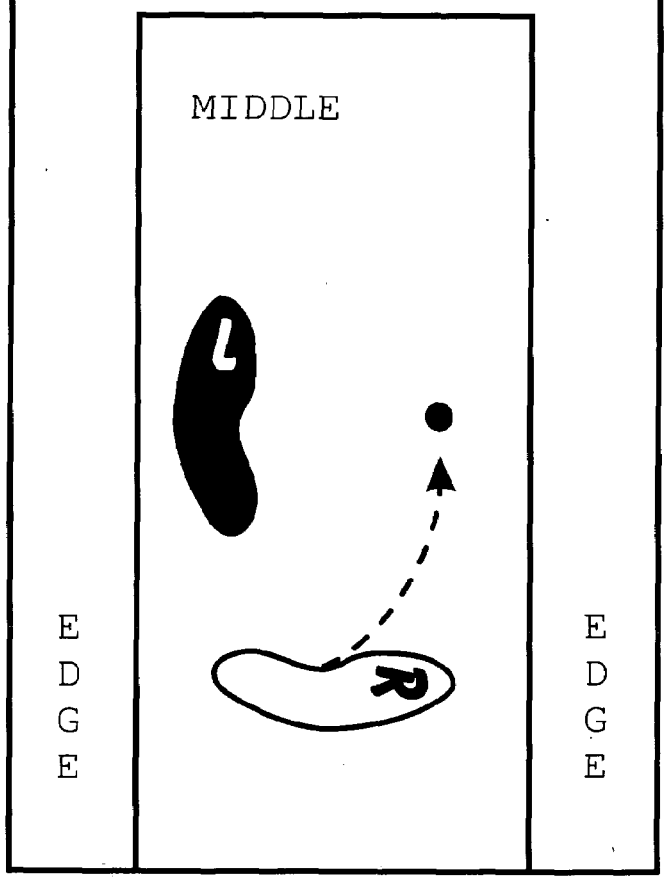
Figure 5A:
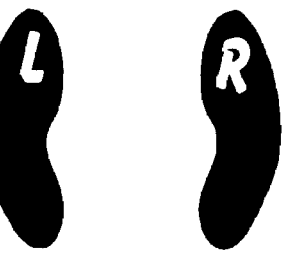
Figure 5A:
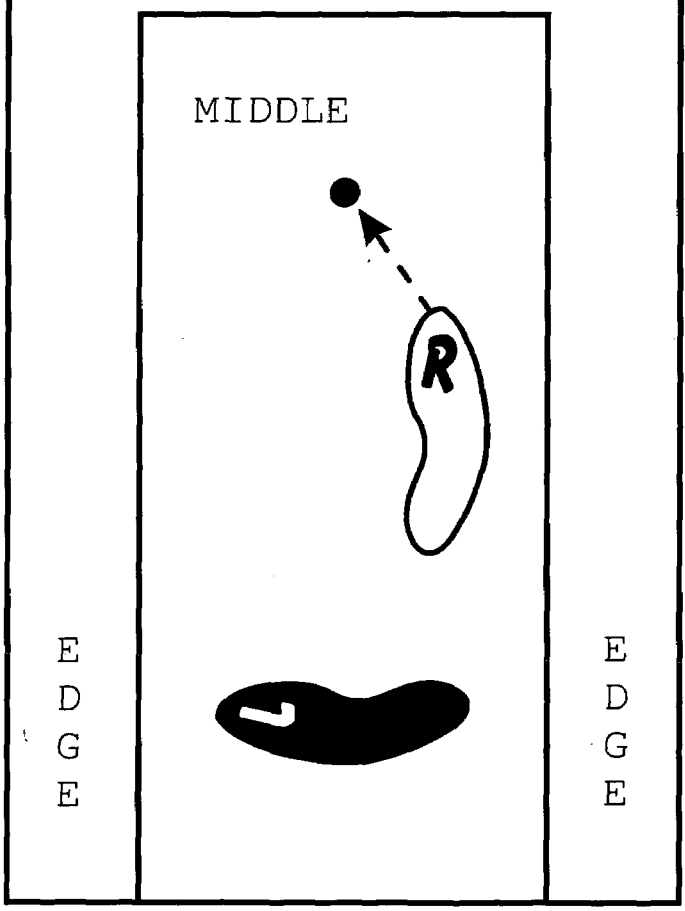
Figure 5A:
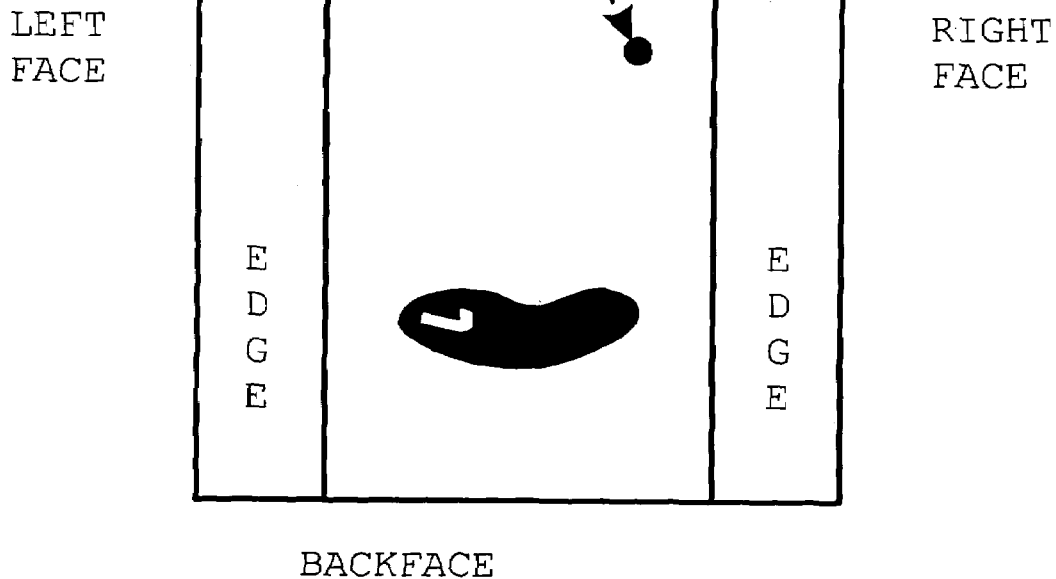
Figure 5A:
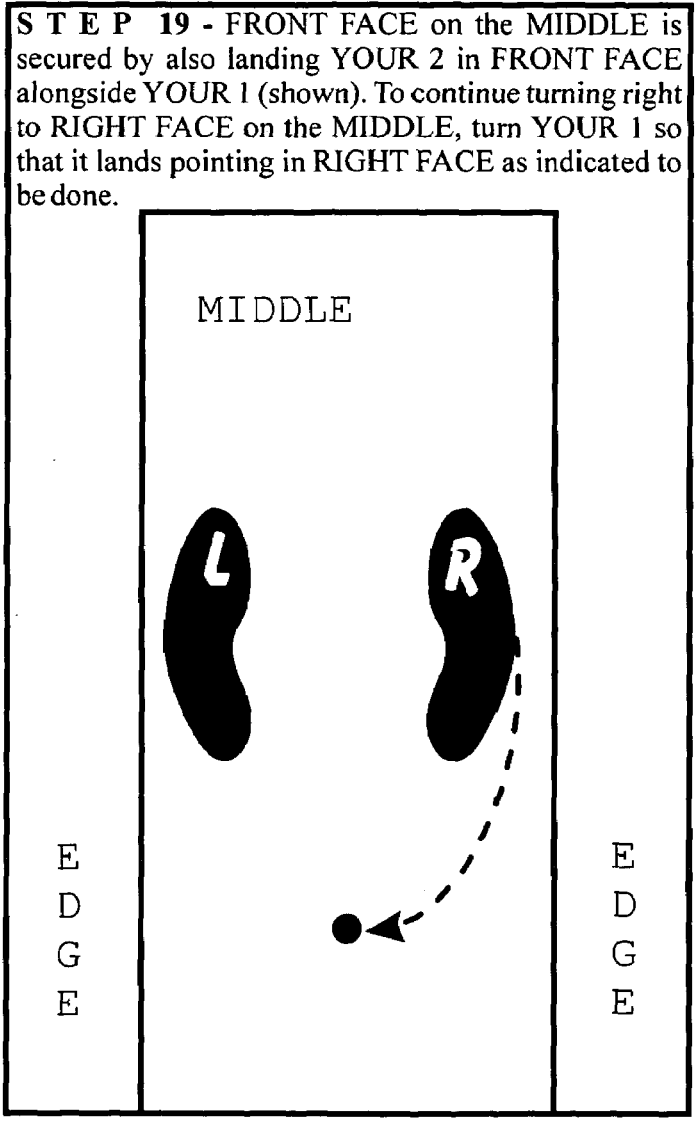
Figure 5A:
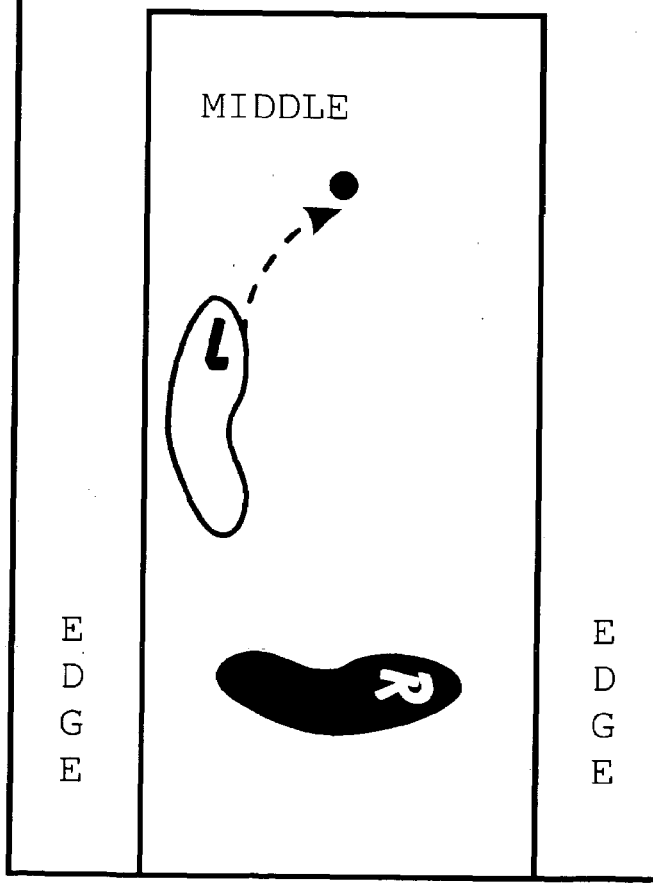
Figure 5A:
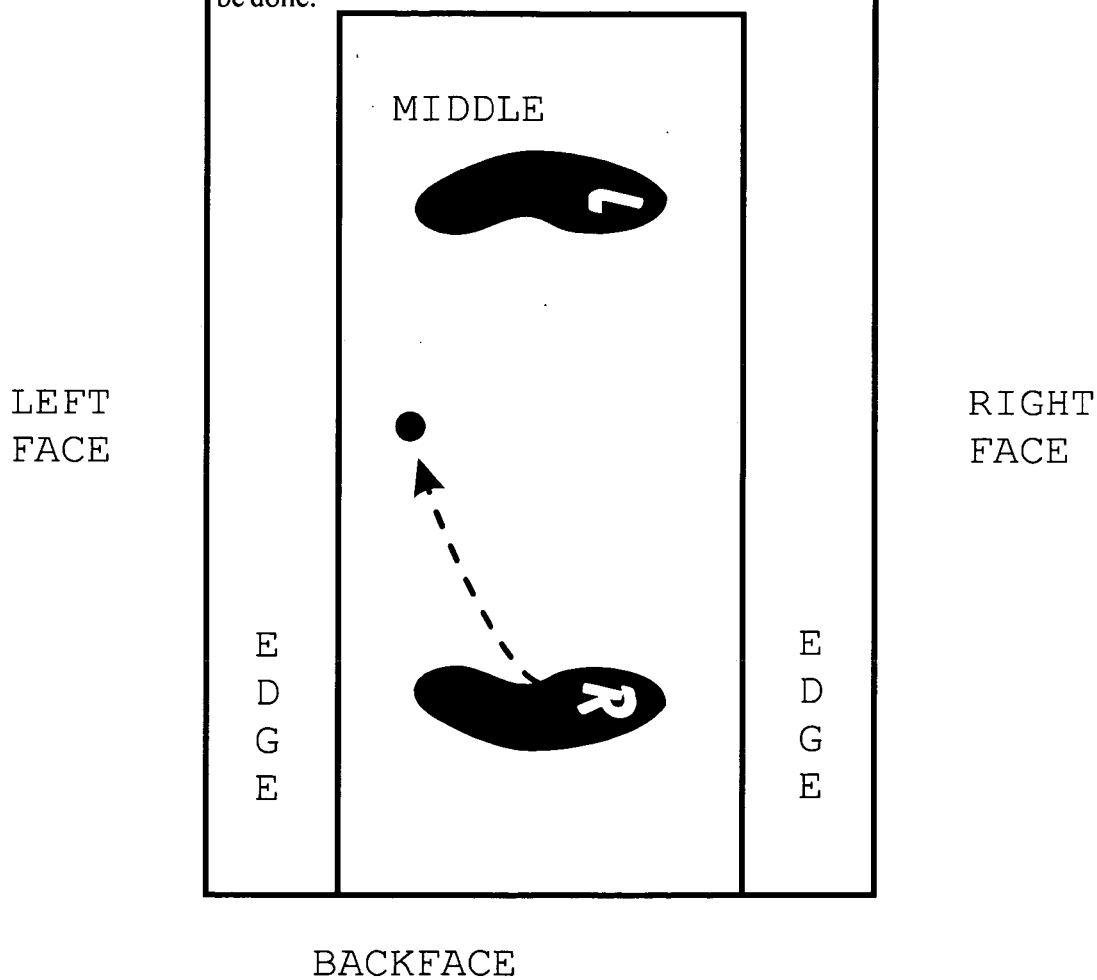
Figure 5A:
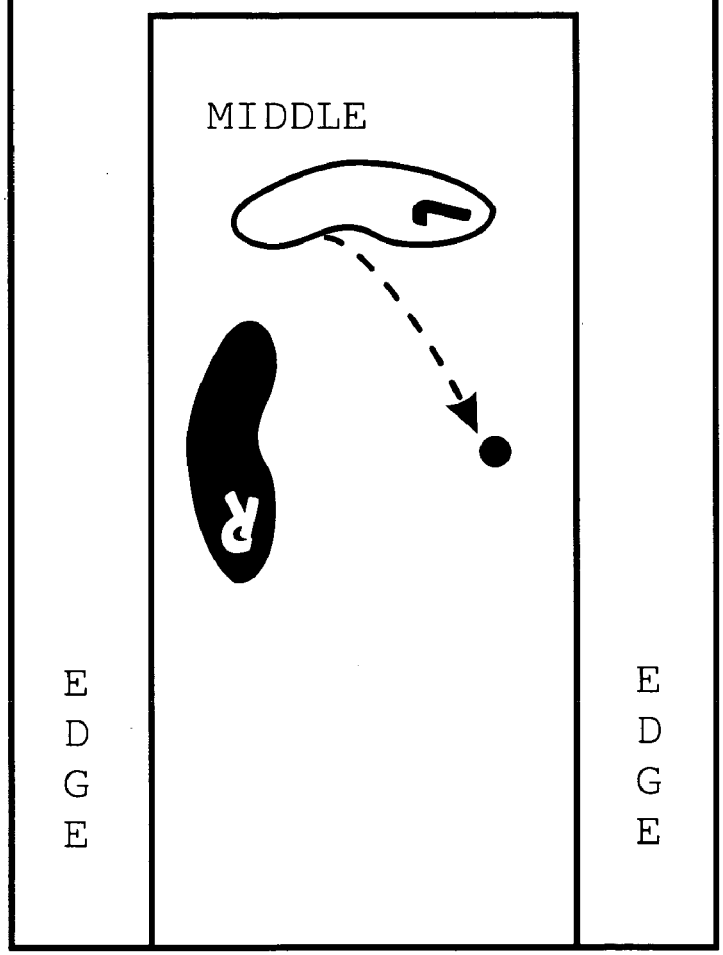
Figure 5A:
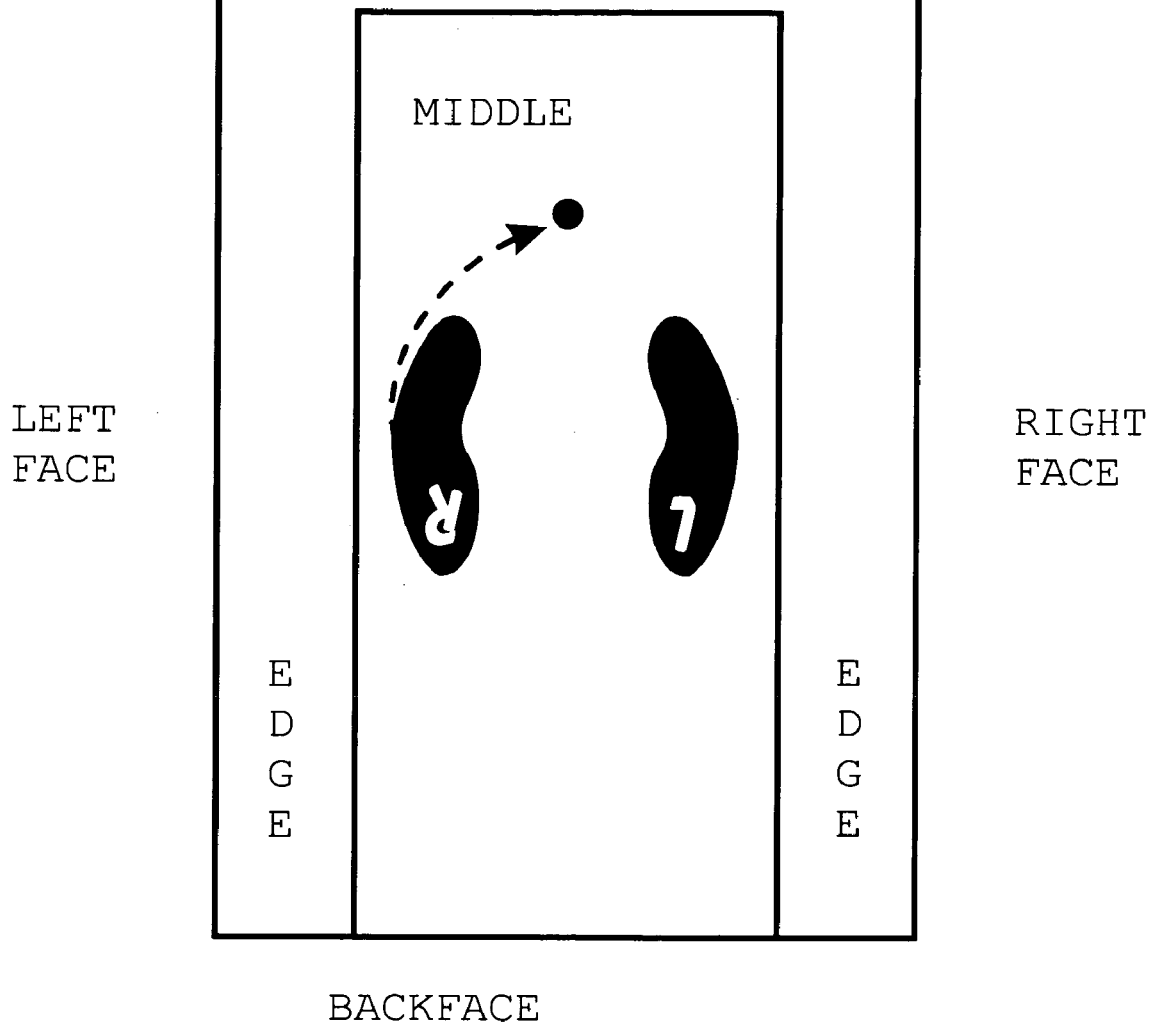
Figure 5A:
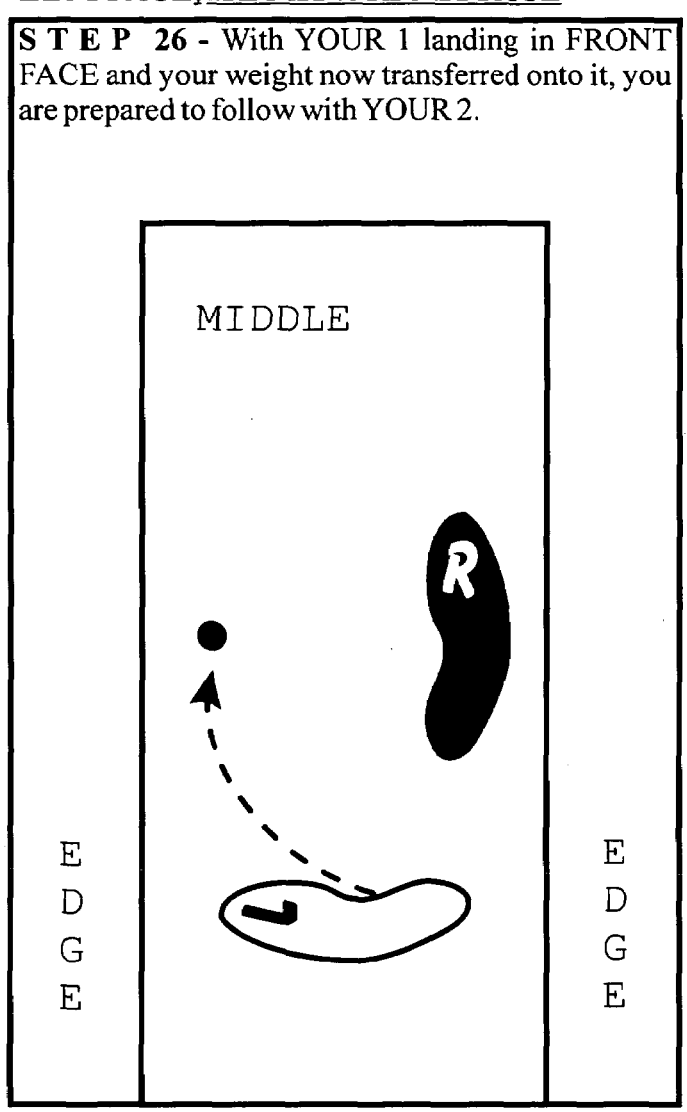
Figure 5A:
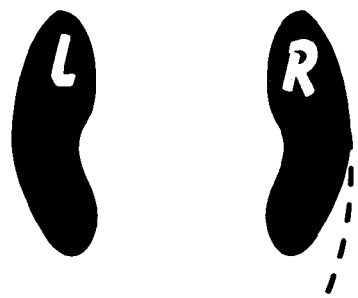
Figure 5A:
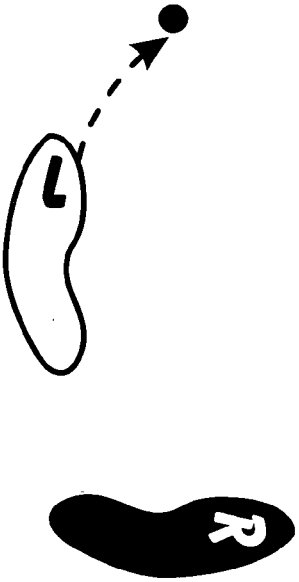
Figure 5A:
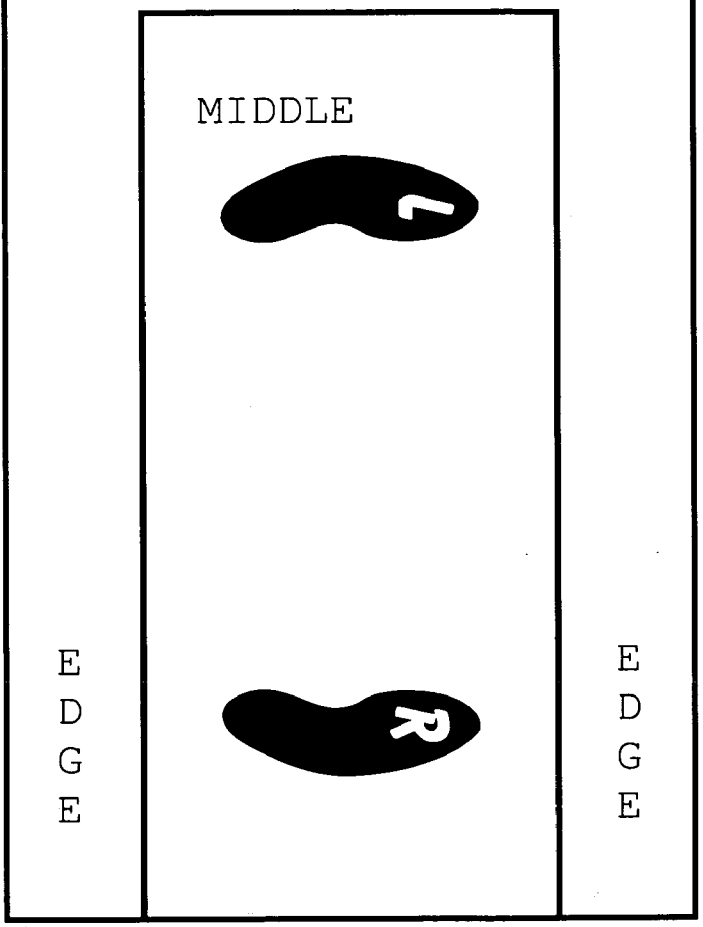
Figures 1, 6:
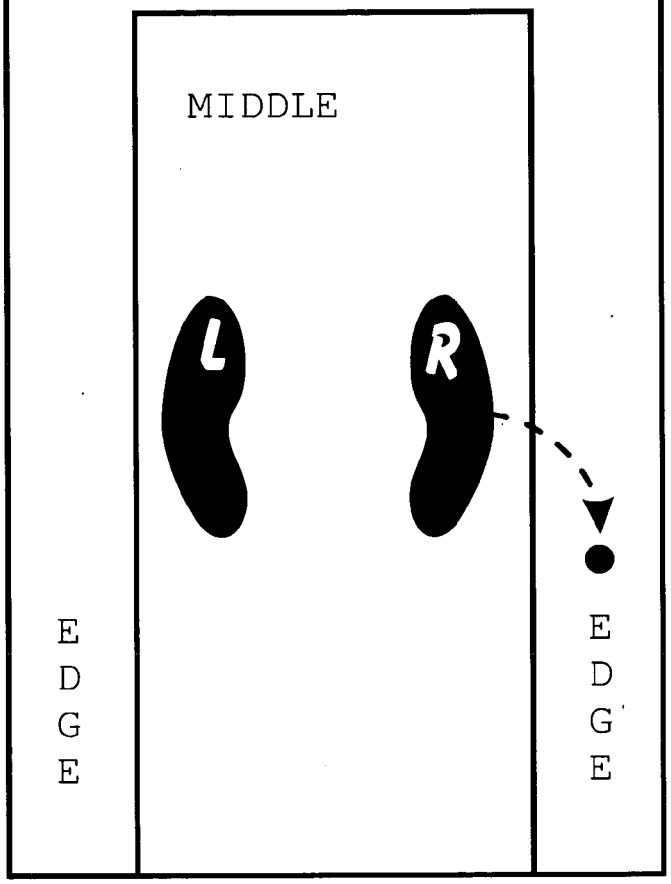
Figures 2, 6:
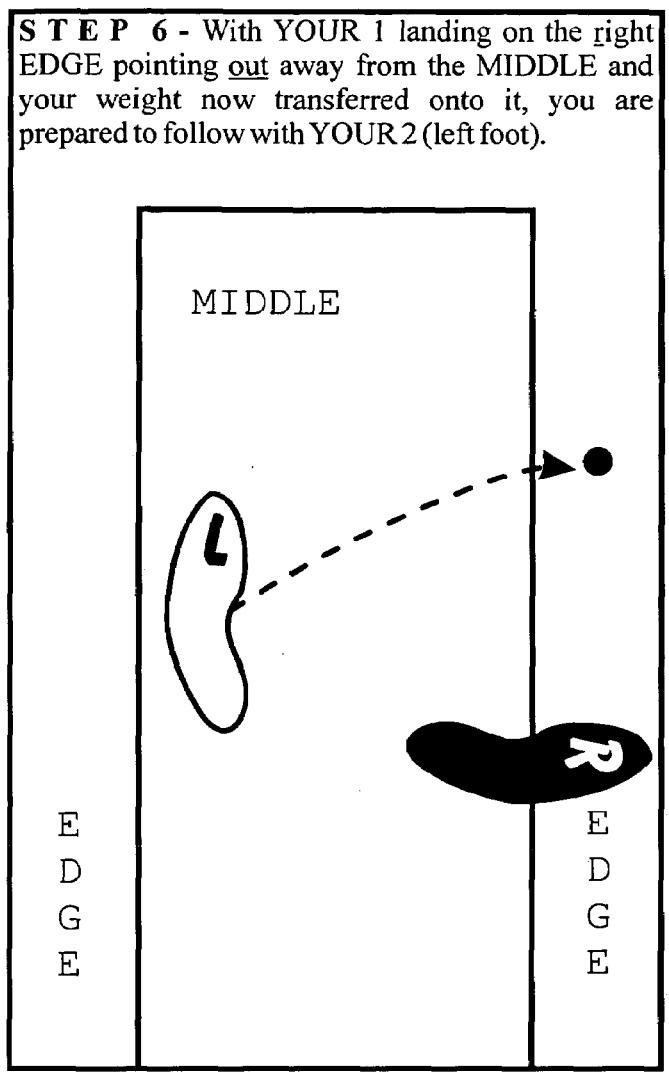
Figures 3, 6:
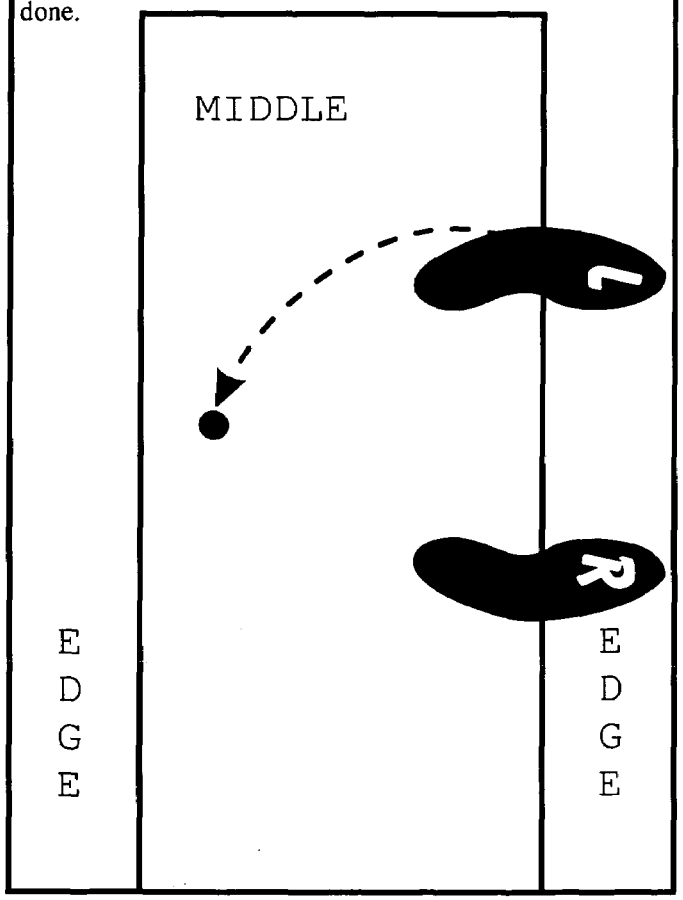
Figure 6:
Figure 4:
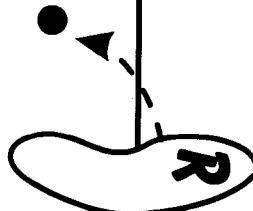
Figure 6:
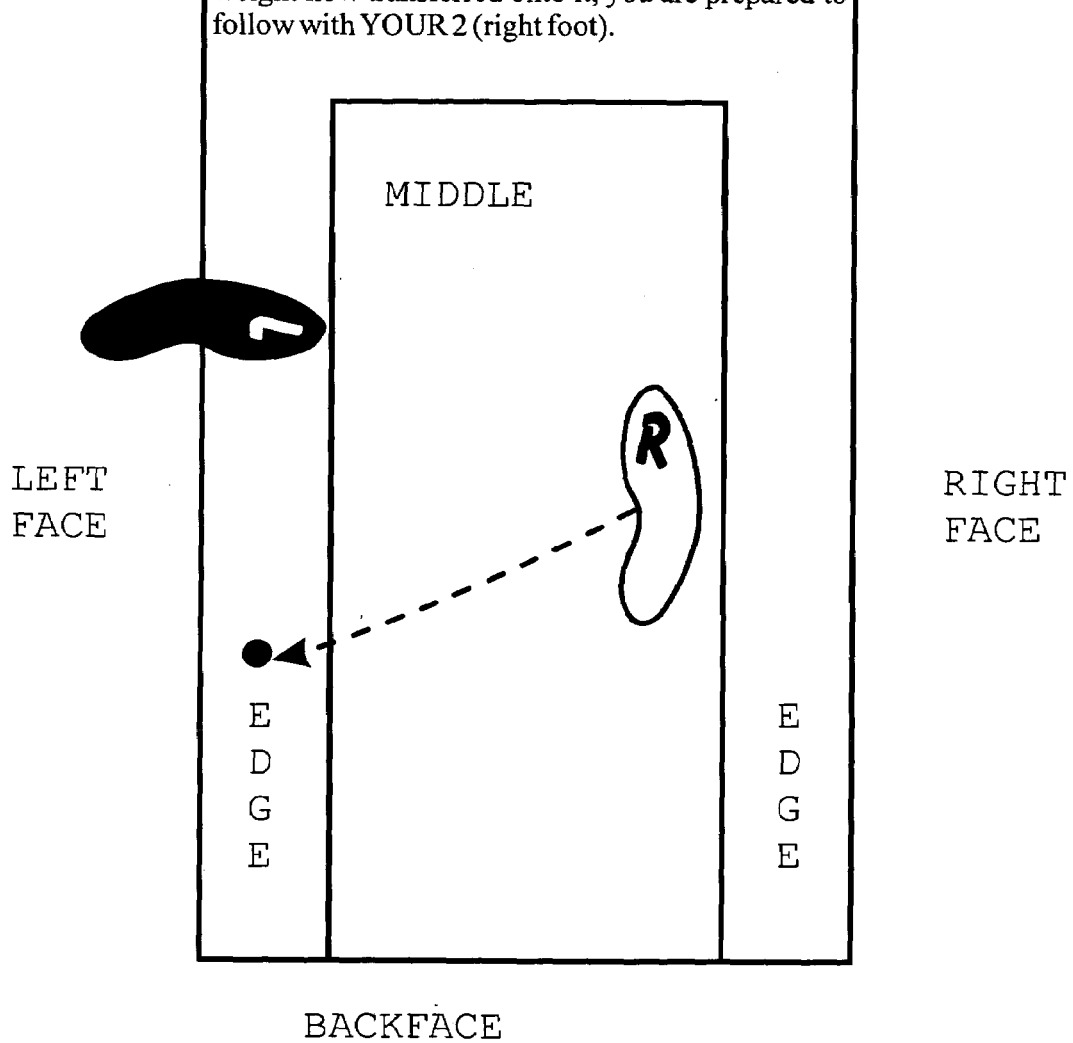
Figures 6, 7:
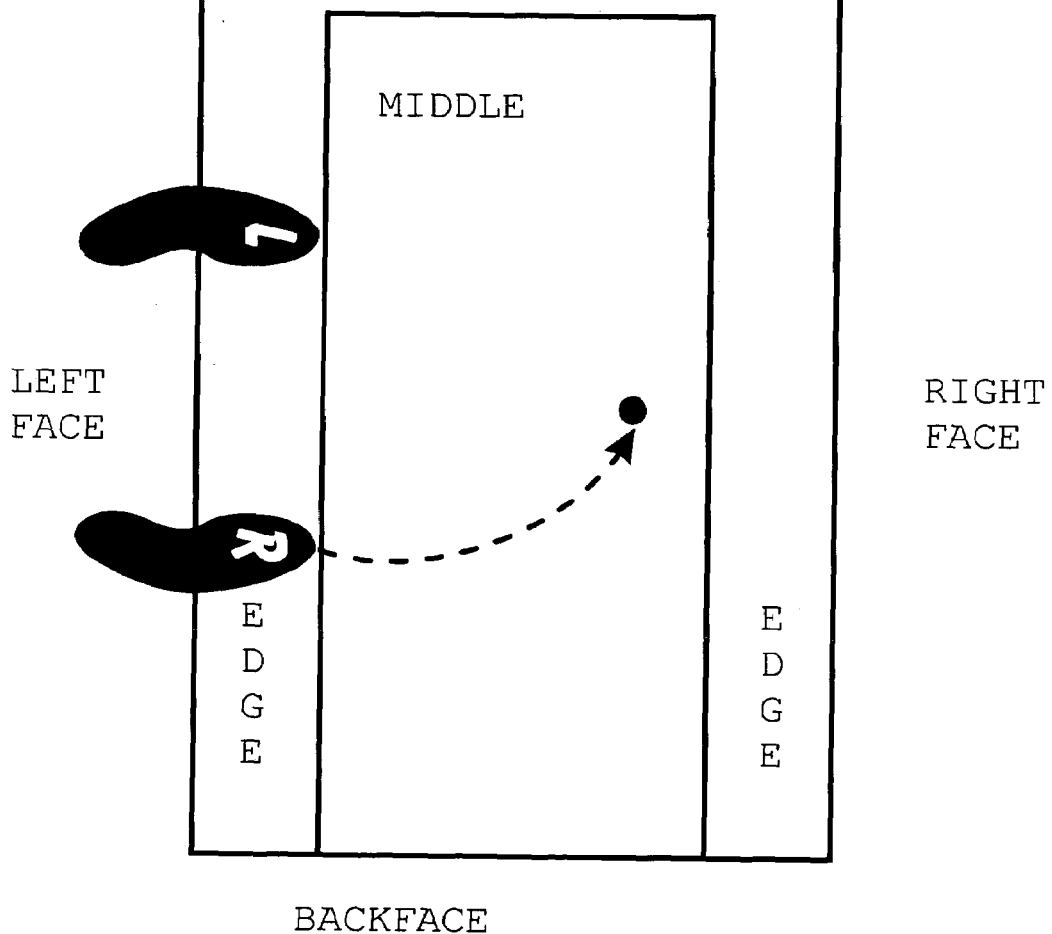
Figures 6, 7, 8:
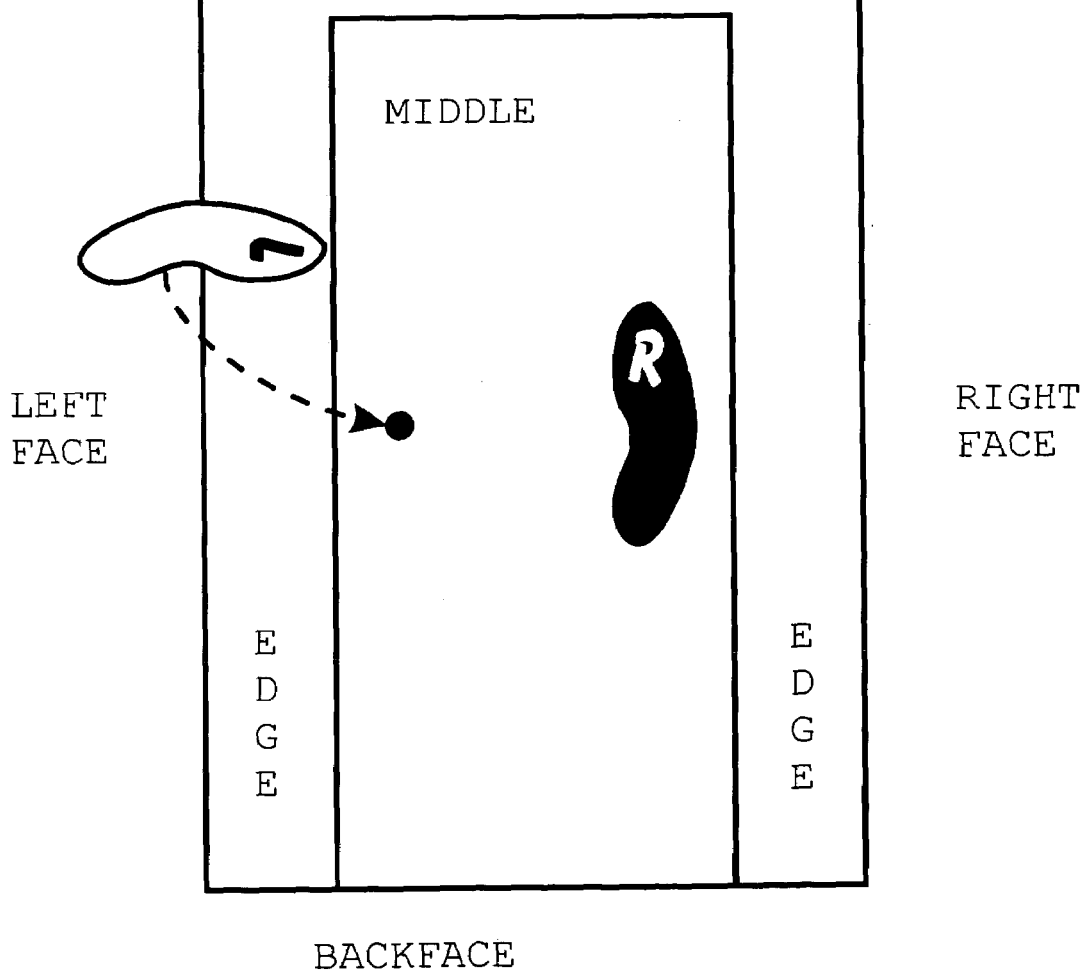
Figures 6, 7, 8, 9:
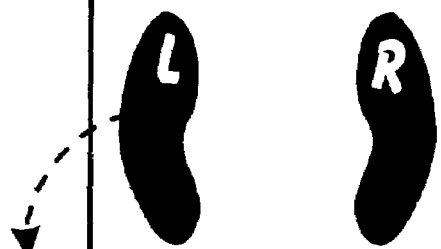
Figures 6, 7, 8, 9, 10:
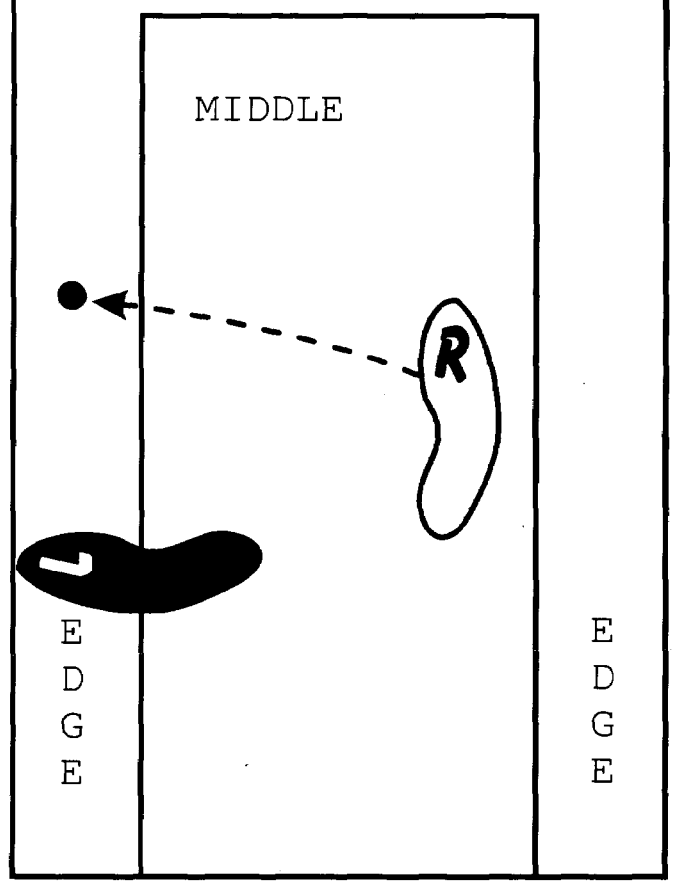
FIG. 10 is a top view of an embodiment of the present invention showing a plurality of moving surfaces 101 and 102 adjacent to each other, first fixed surface 103, and second fixed surface 104.
Figures 6, 7, 8, 9, 10, 11:
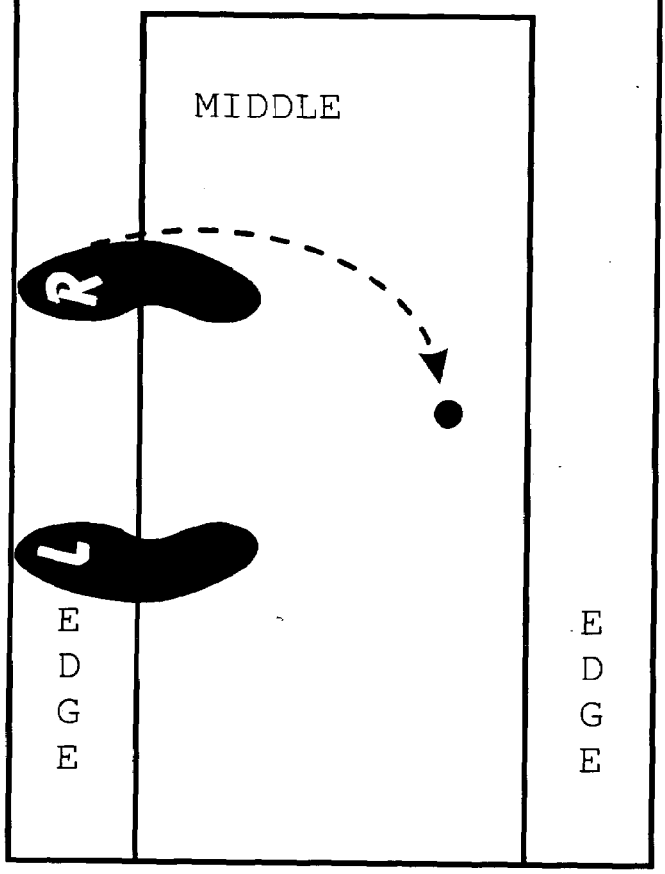
Figures 6, 7, 8, 9, 10, 11, 12:
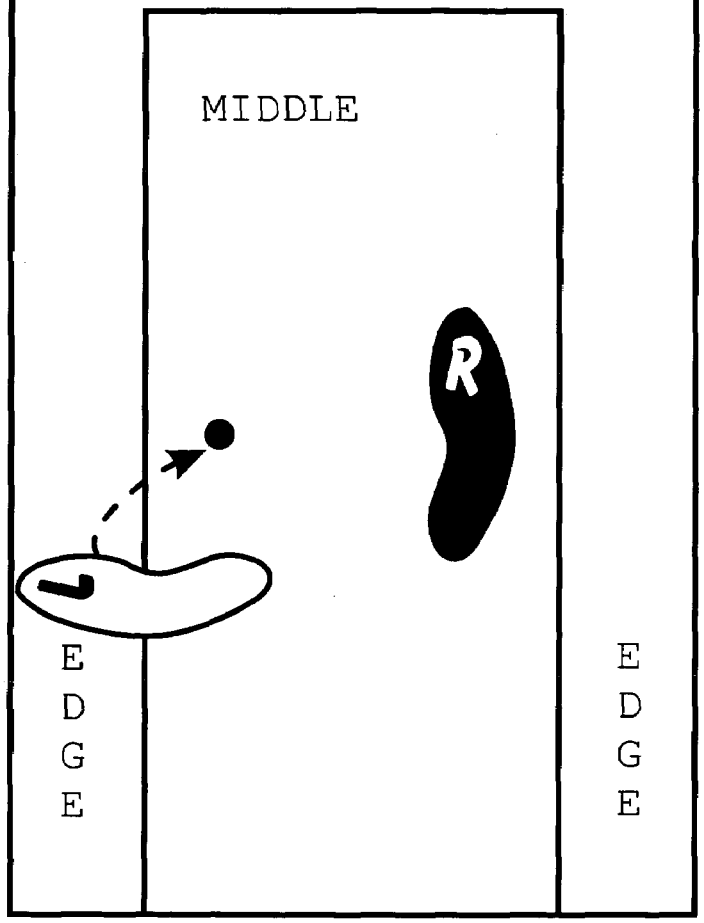
Figures 6, 7, 8, 9, 10, 11, 12, 13, 14:
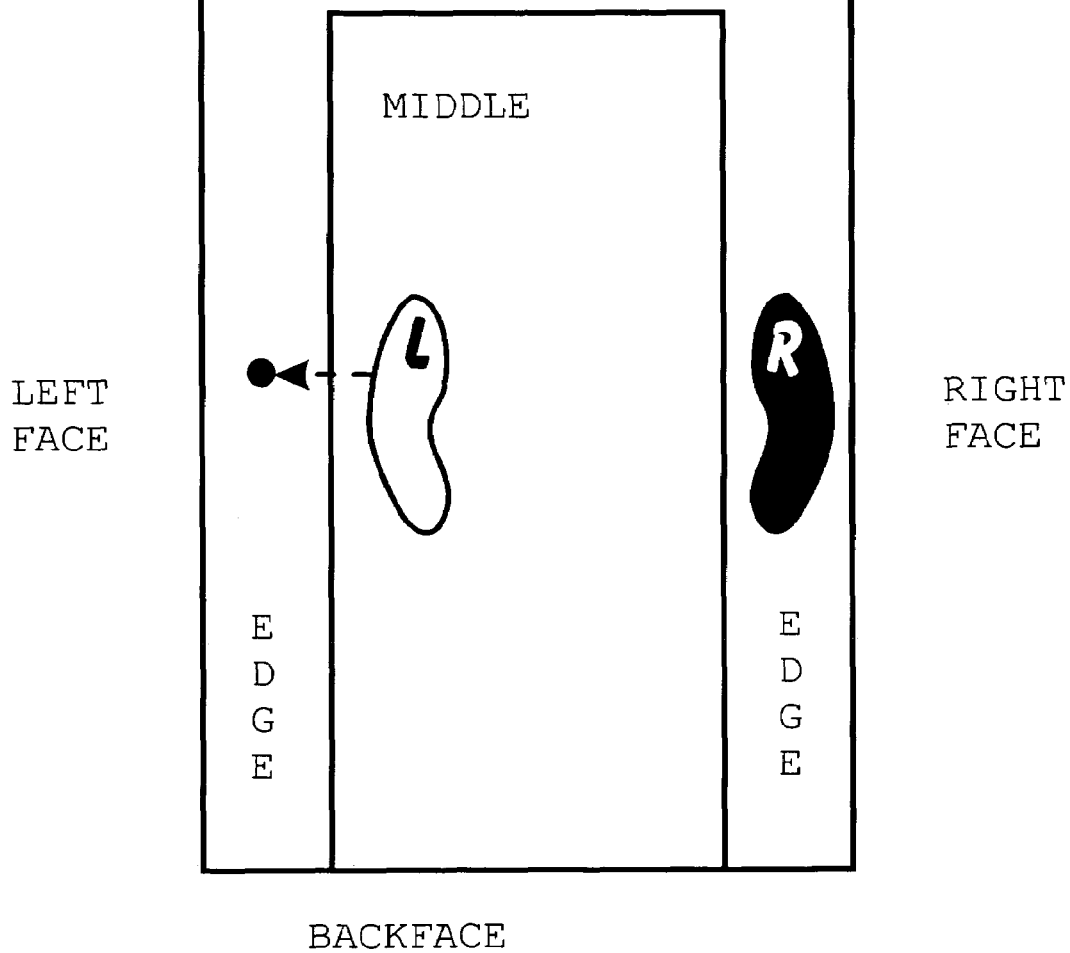
Figures 6, 7, 8, 9, 10, 11, 12, 13, 14, 15:
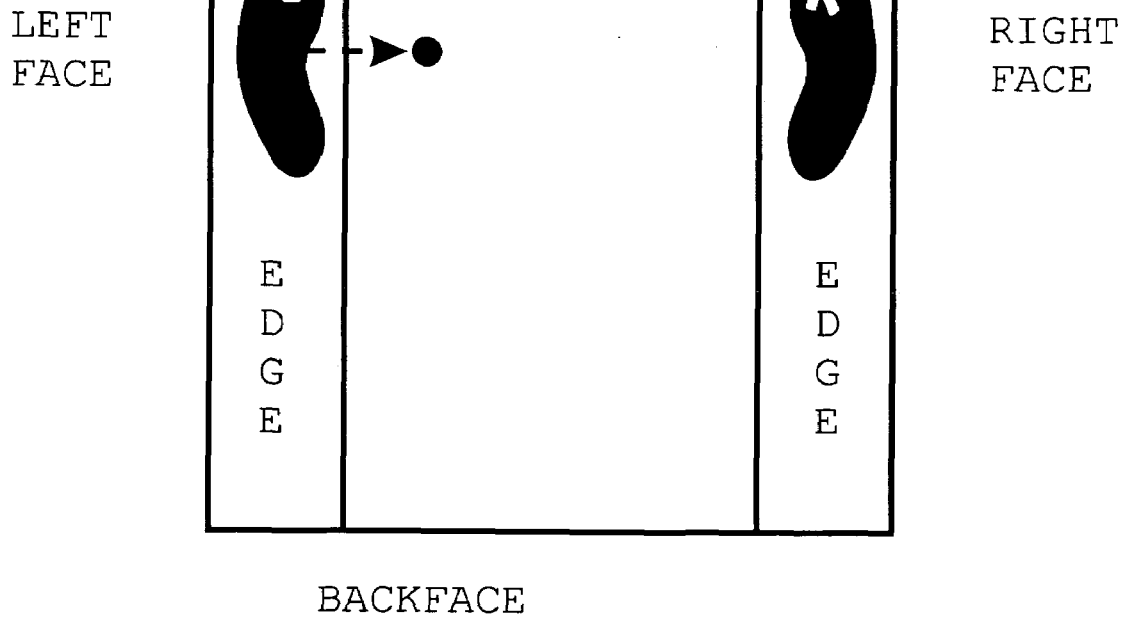
Figures 6, 7, 8, 9, 10, 11, 12, 13, 14, 15, 16:
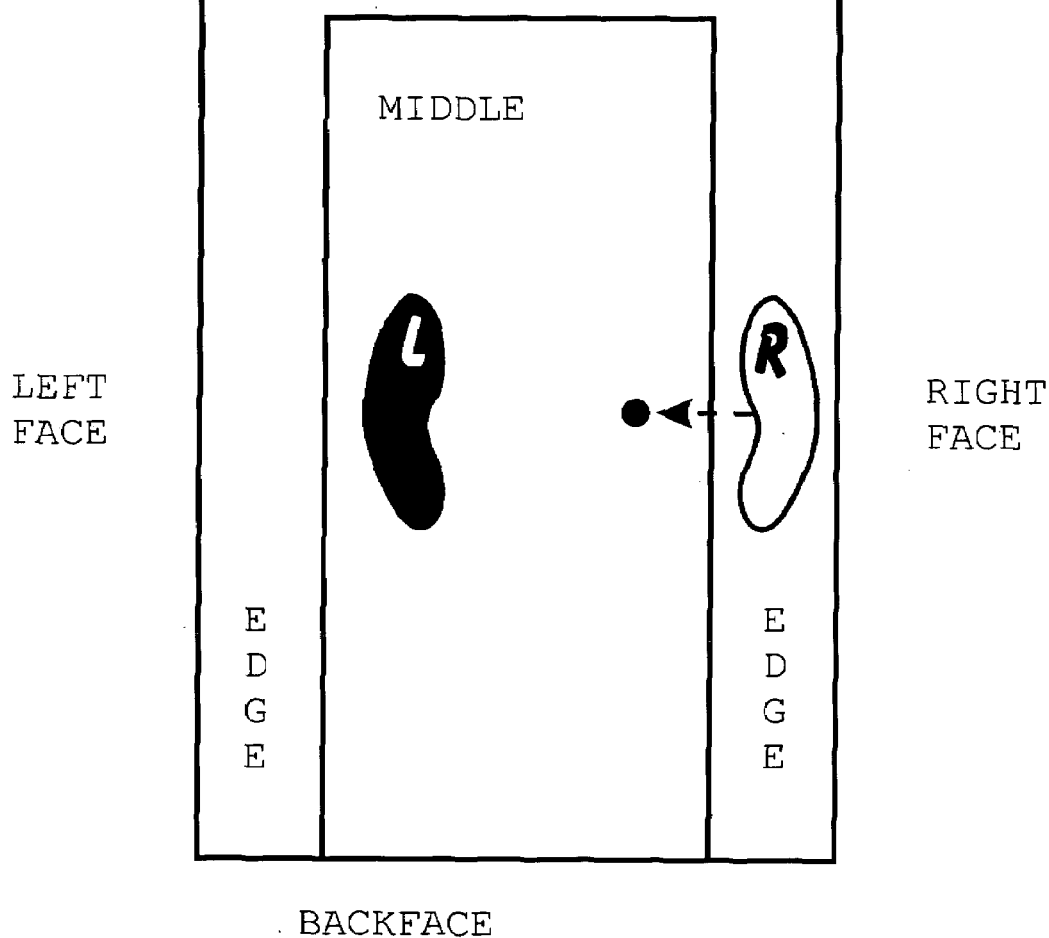
Figures 6, 7, 8, 9, 10, 11, 12, 13, 14, 15, 16, 17, 18, 19, 20:
Figures 6, 7, 8, 9, 10, 11, 12, 13, 14, 15, 16, 17, 18, 19, 20, 21:
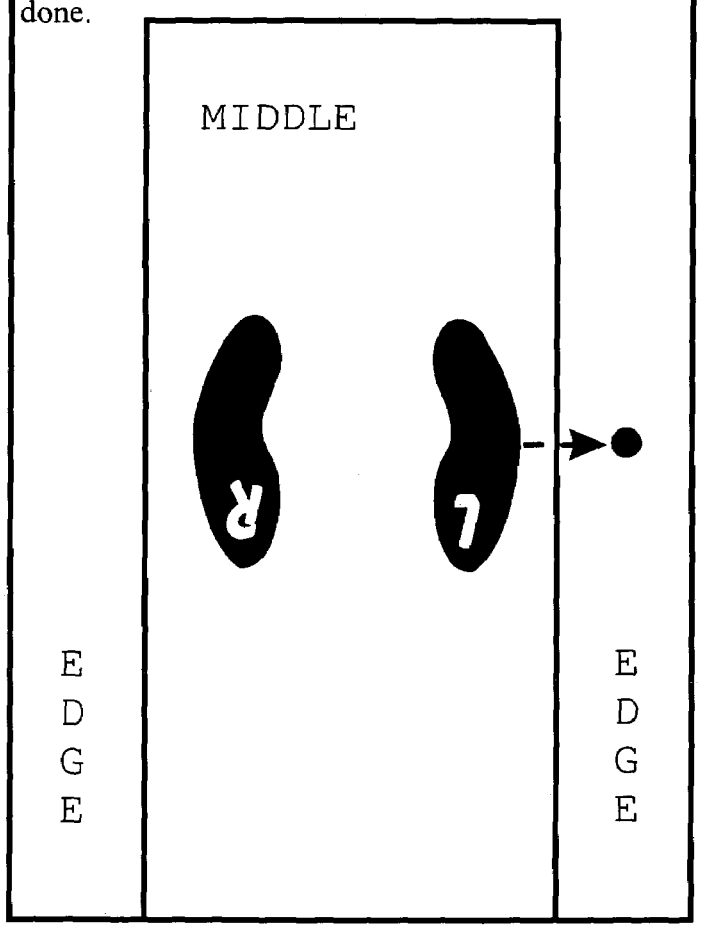
Figures 6, 7, 8, 9, 10, 11, 12, 13, 14, 15, 16, 17, 18, 19, 20, 21, 22:
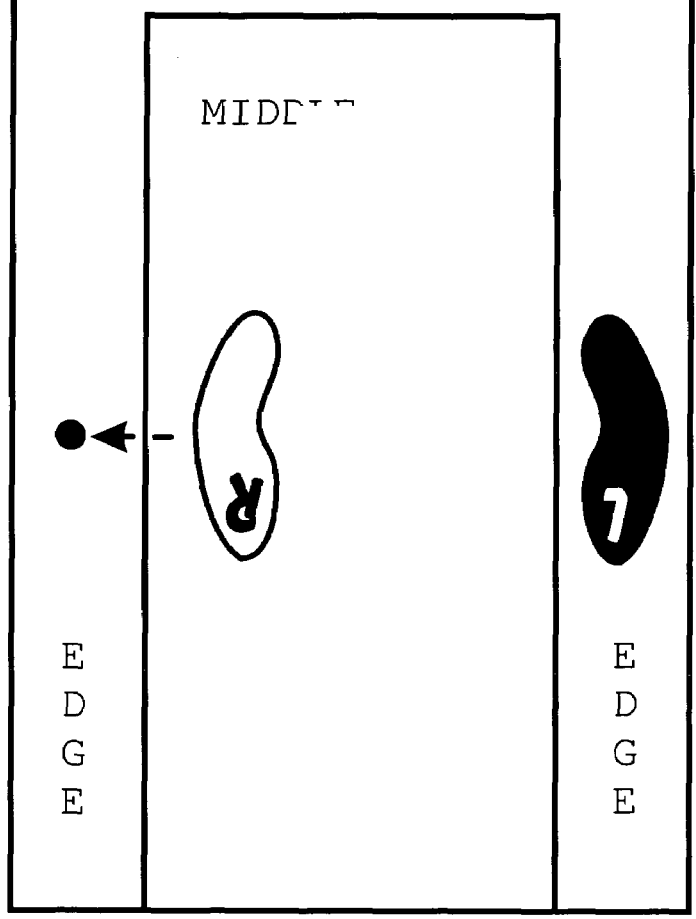
Figures 6, 7, 8, 9, 10, 11, 12, 13, 14, 15, 16, 17, 18, 19, 20, 21, 22, 23:
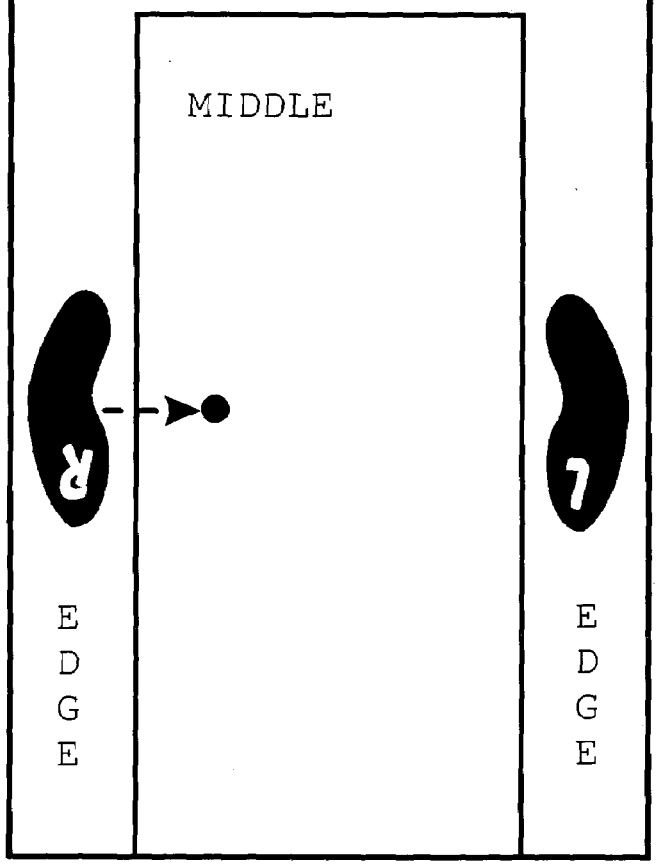
Figures 6, 7, 8, 9, 10, 11, 12, 13, 14, 15, 16, 17, 18, 19, 20, 21, 22, 23, 24, 25:
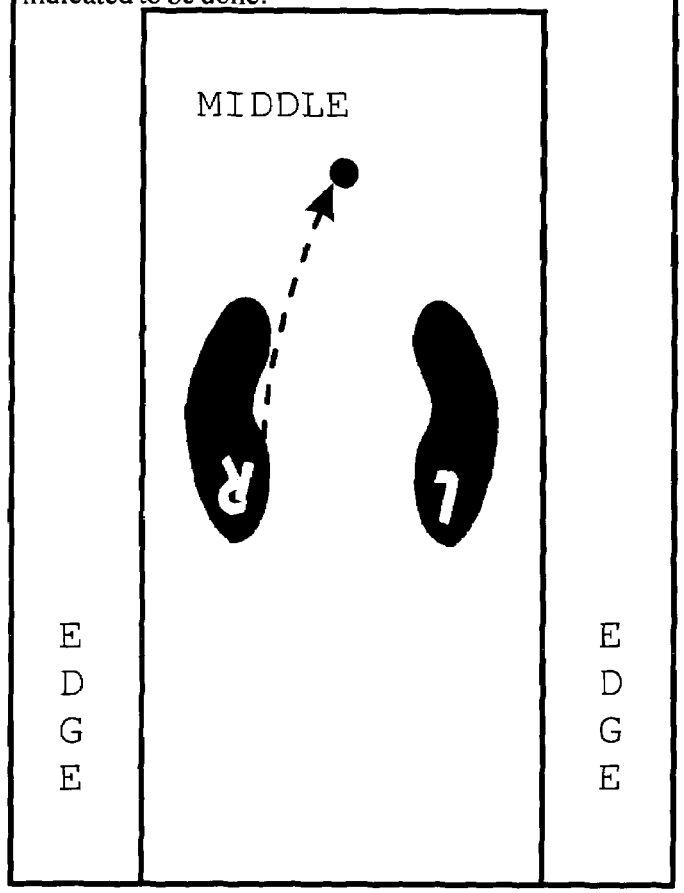
Figures 6, 7, 8, 9, 10, 11, 12, 13, 14, 15, 16, 17, 18, 19, 20, 21, 22, 23, 24, 25, 26, 27:
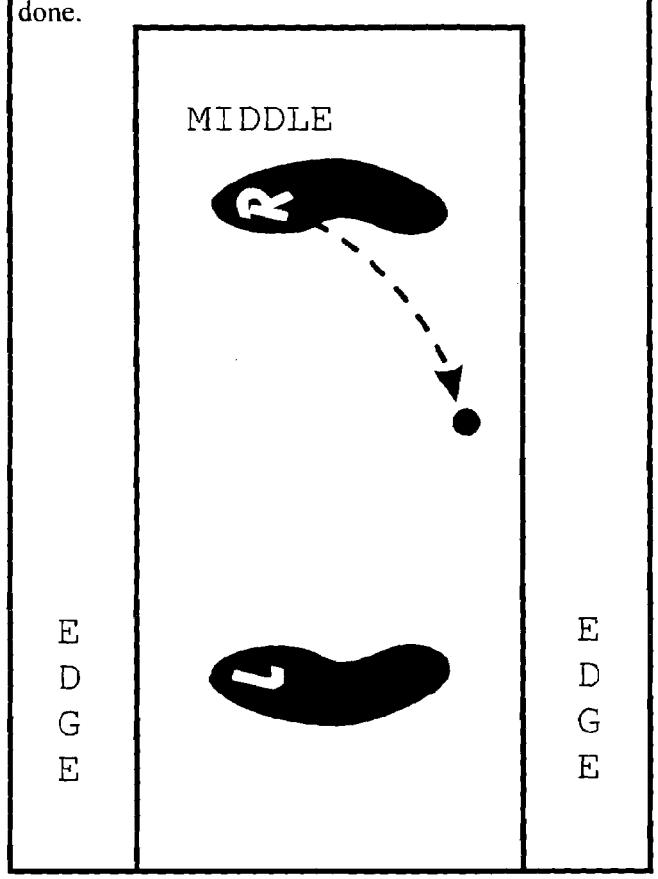
Figures 6, 7, 8, 9, 10, 11, 12, 13, 14, 15, 16, 17, 18, 19, 20, 21, 22, 23, 24, 25, 26, 27, 28:
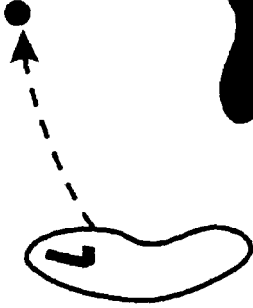
Figures 6, 7, 8, 9, 10, 11, 12, 13, 14, 15, 16, 17, 18, 19, 20, 21, 22, 23, 24, 25, 26, 27, 28, 29:
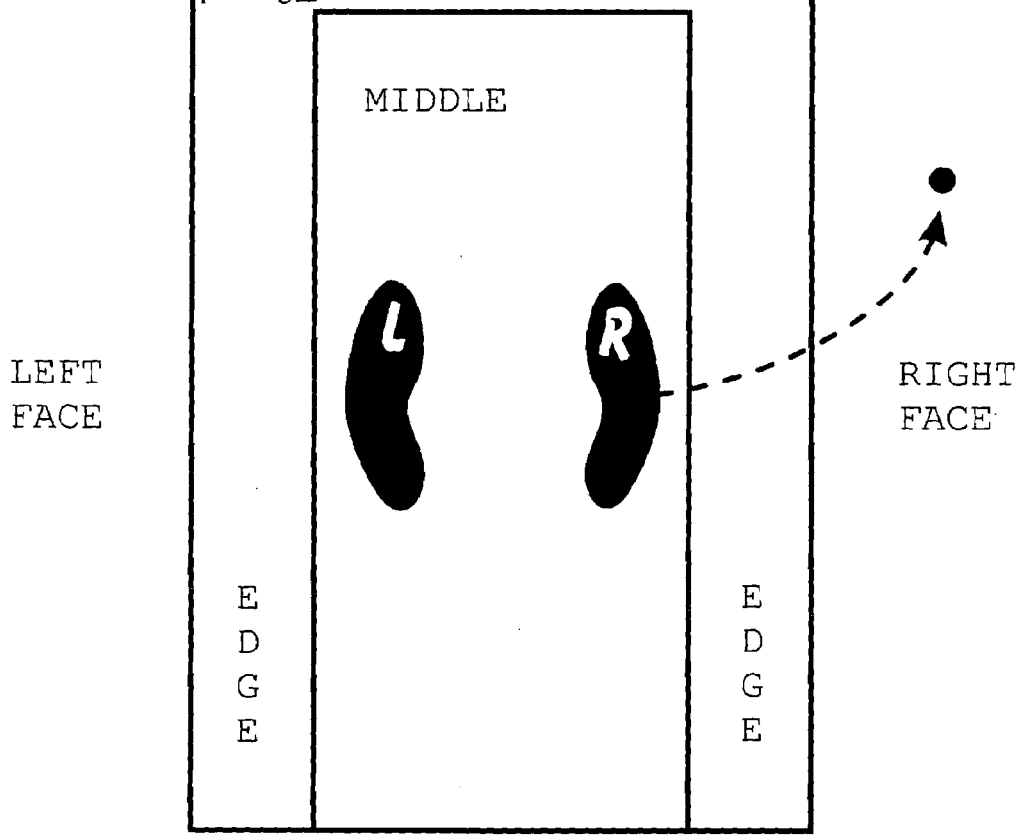
Figures 6, 7, 8, 9, 10, 11, 12, 13, 14, 15, 16, 17, 18, 19, 20, 21, 22, 23, 24, 25, 26, 27, 28, 29, 30, 31, 32, 33:
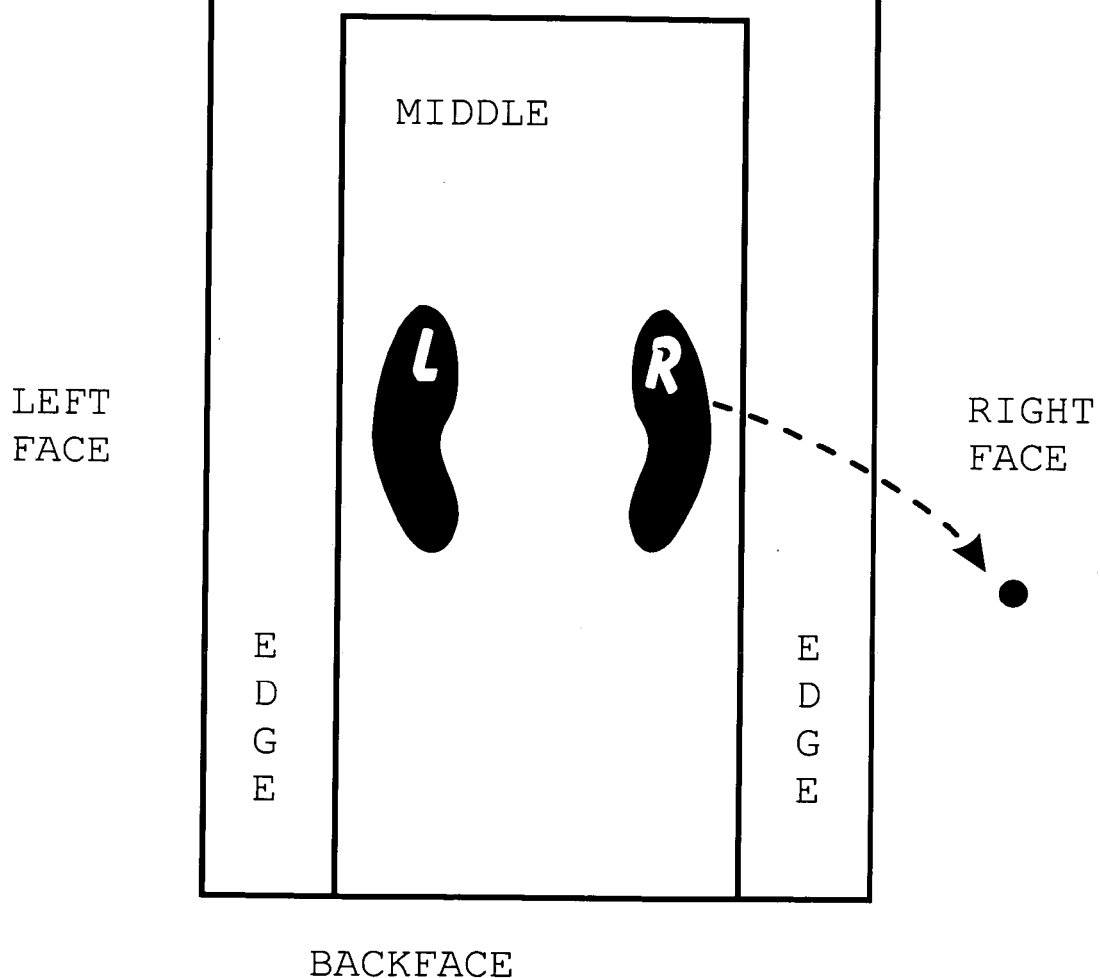
Figures 6, 7, 8, 9, 10, 11, 12, 13, 14, 15, 16, 17, 18, 19, 20, 21, 22, 23, 24, 25, 26, 27, 28, 29, 30, 31, 32, 33, 34:
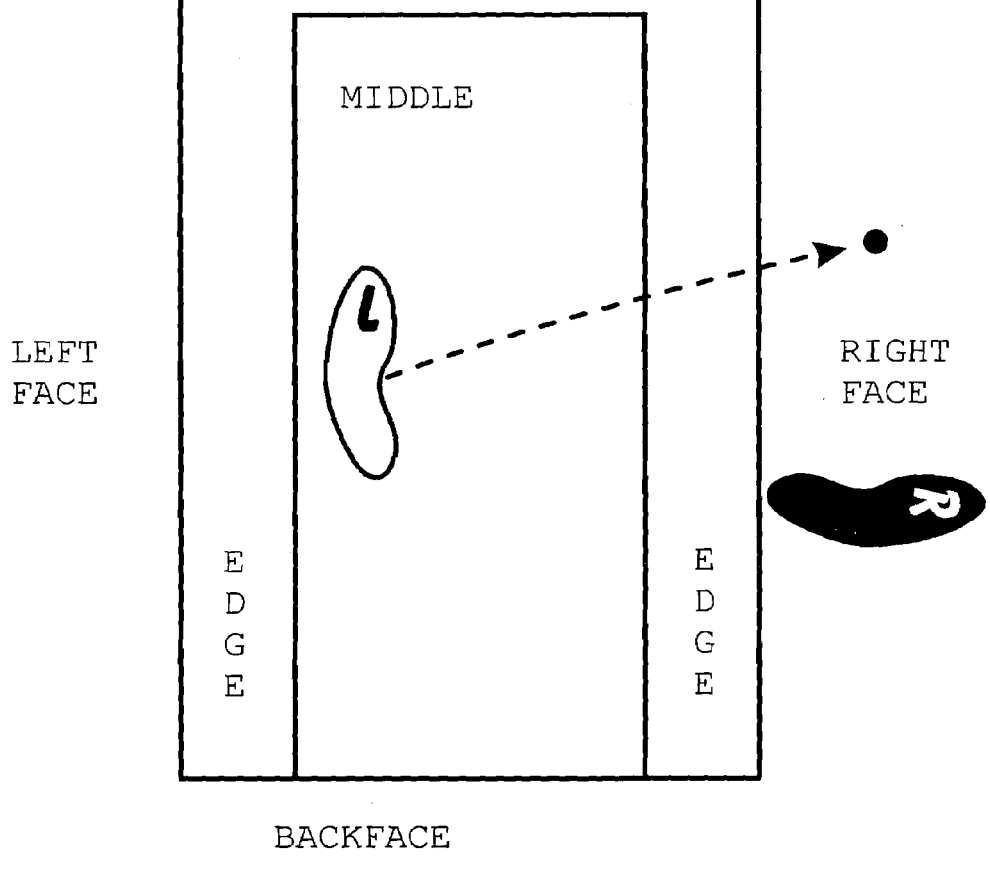
Figures 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36:
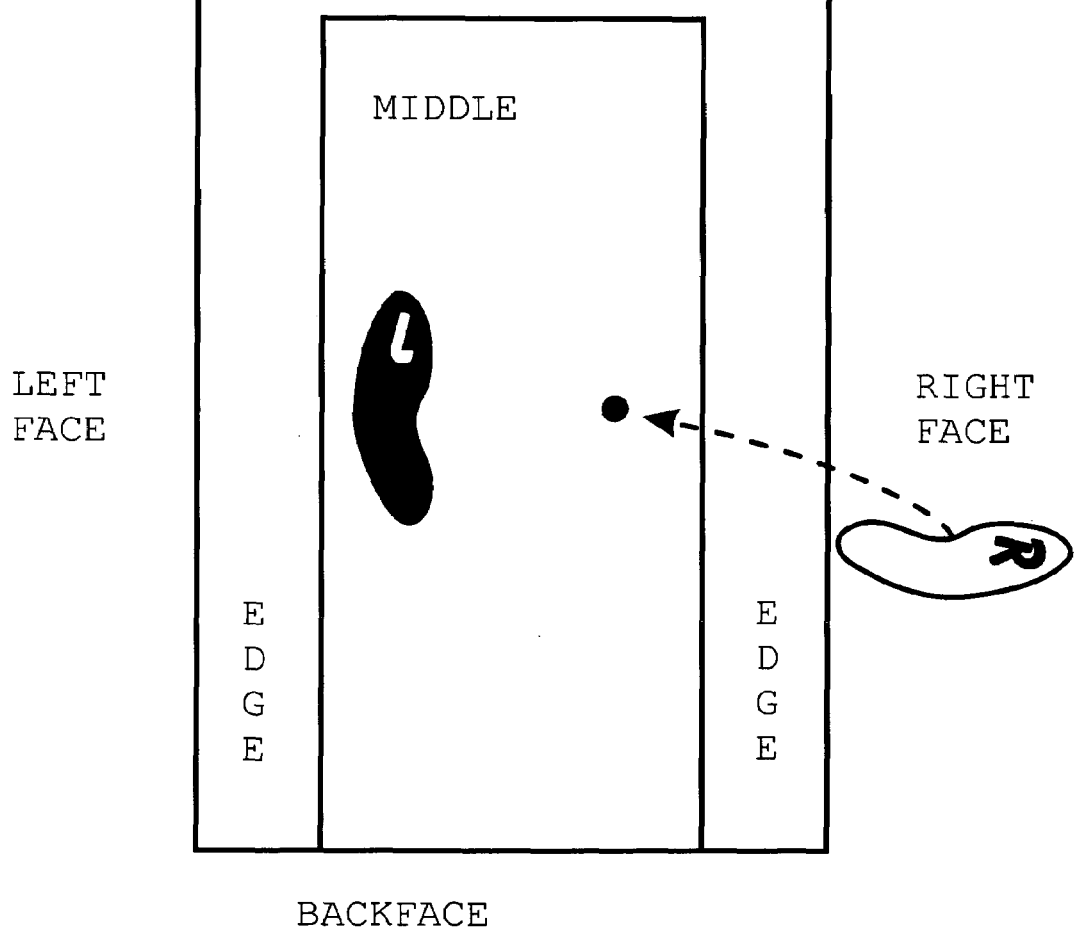
Figures 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37:
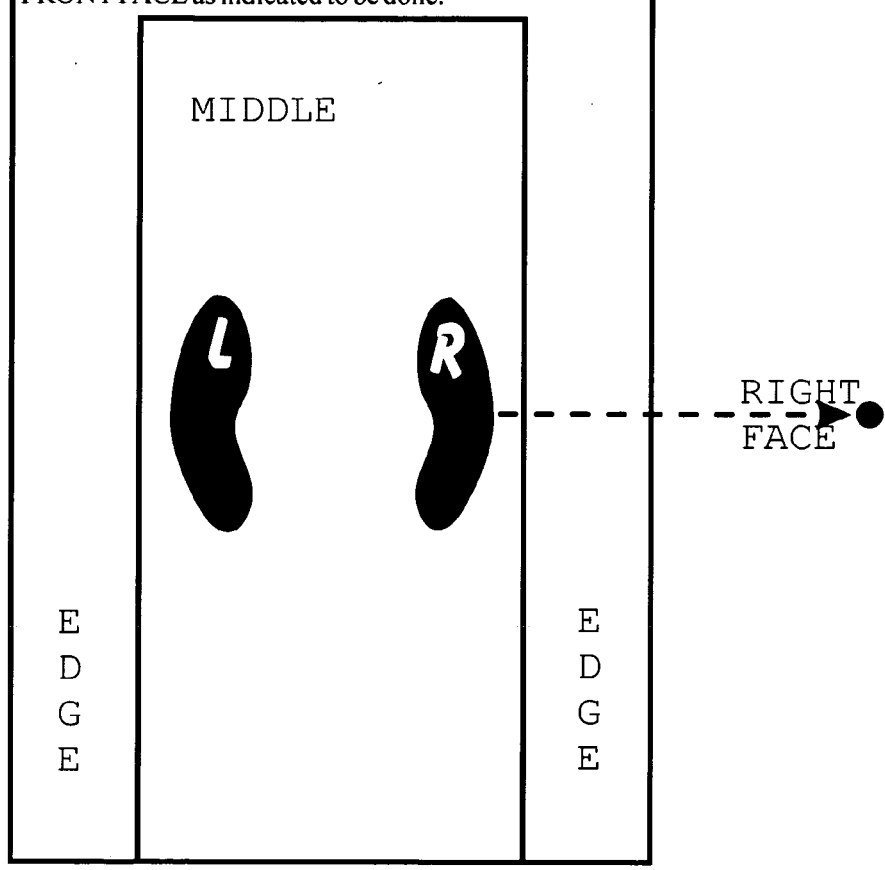
Figures 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40:
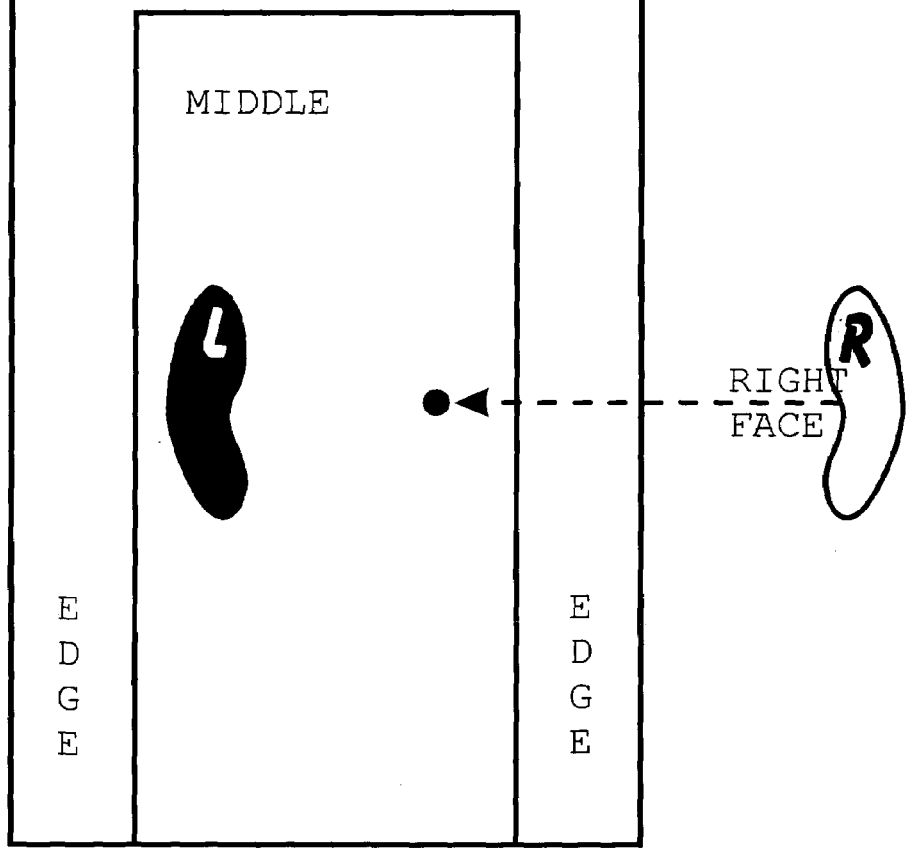
Figures 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41:
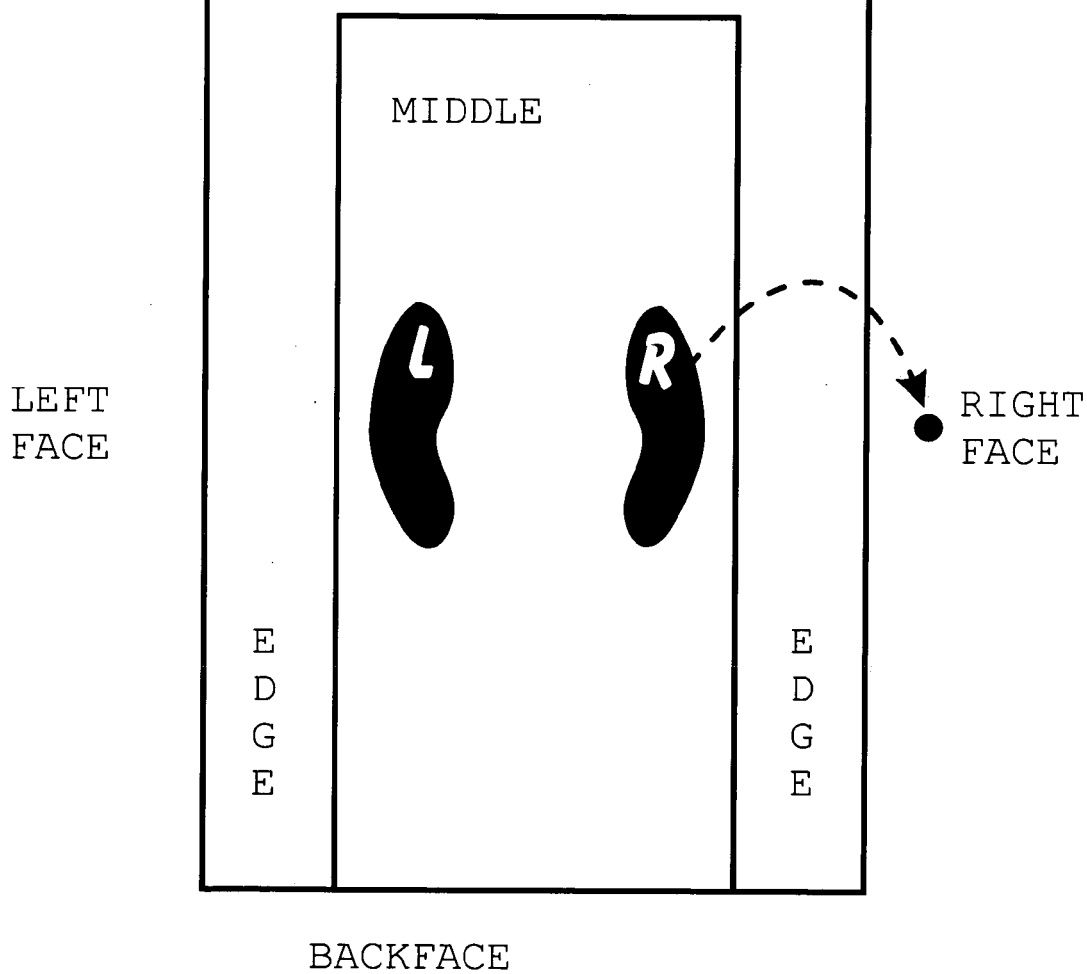
Figures 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42:
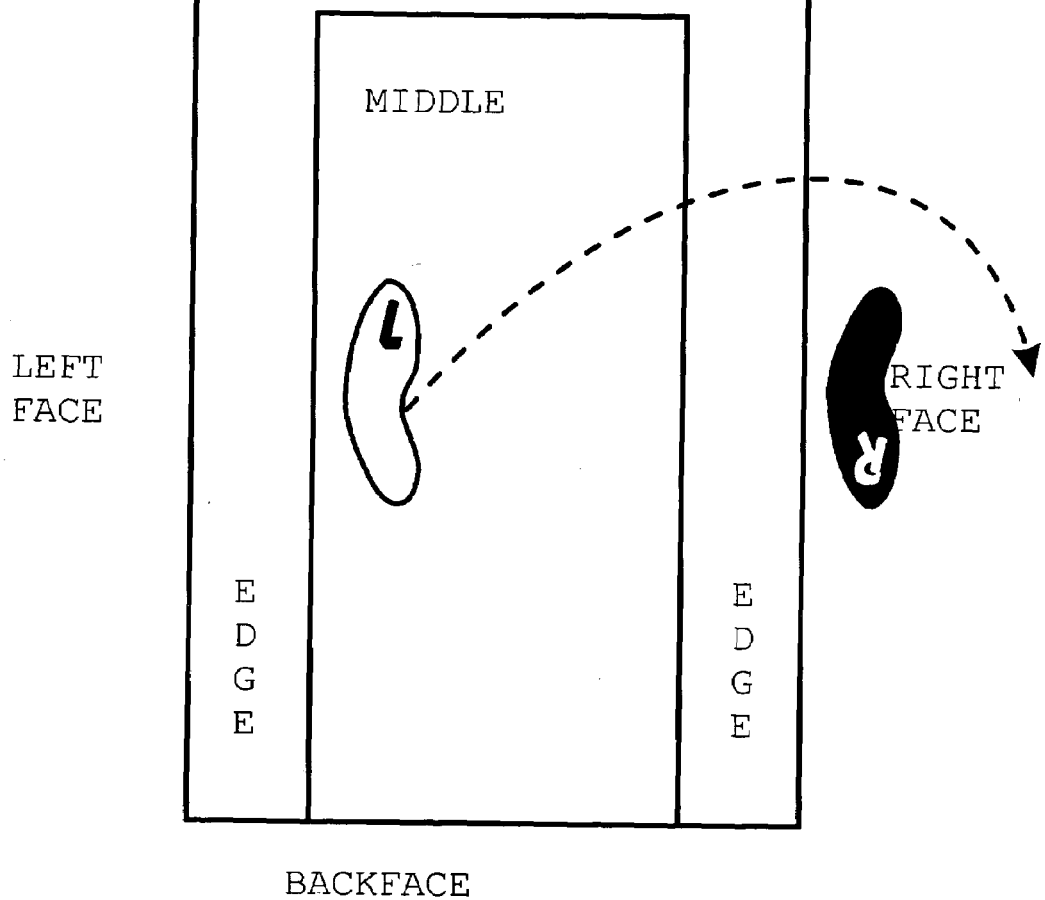
Figures 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43:
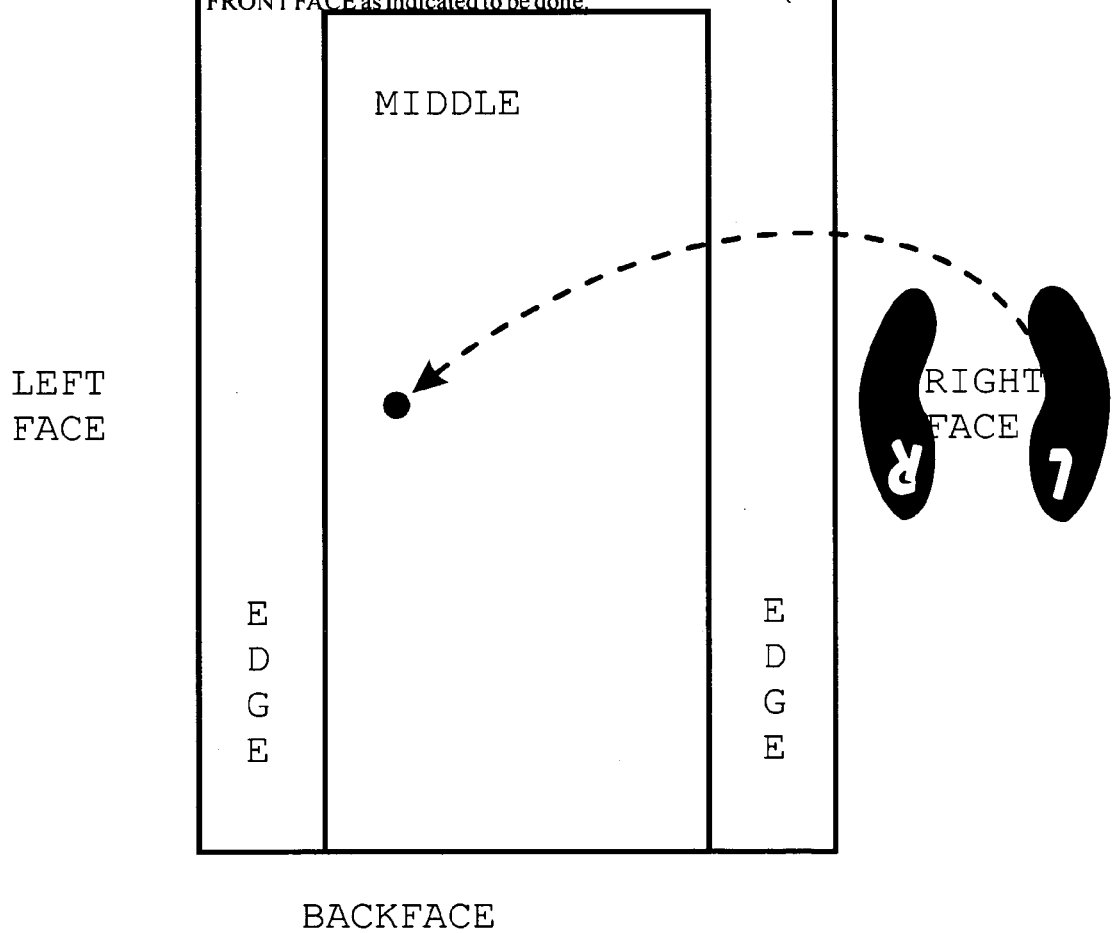
Figures 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45:
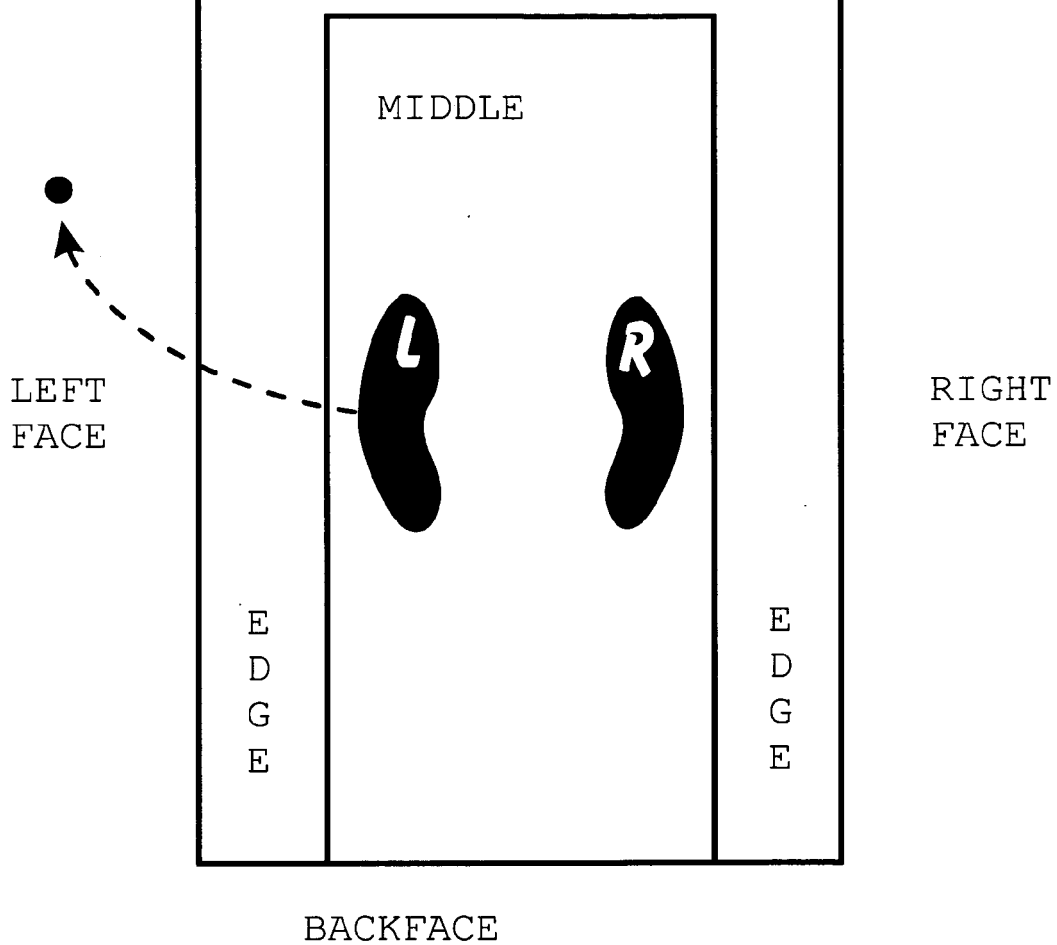
Figures 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46:
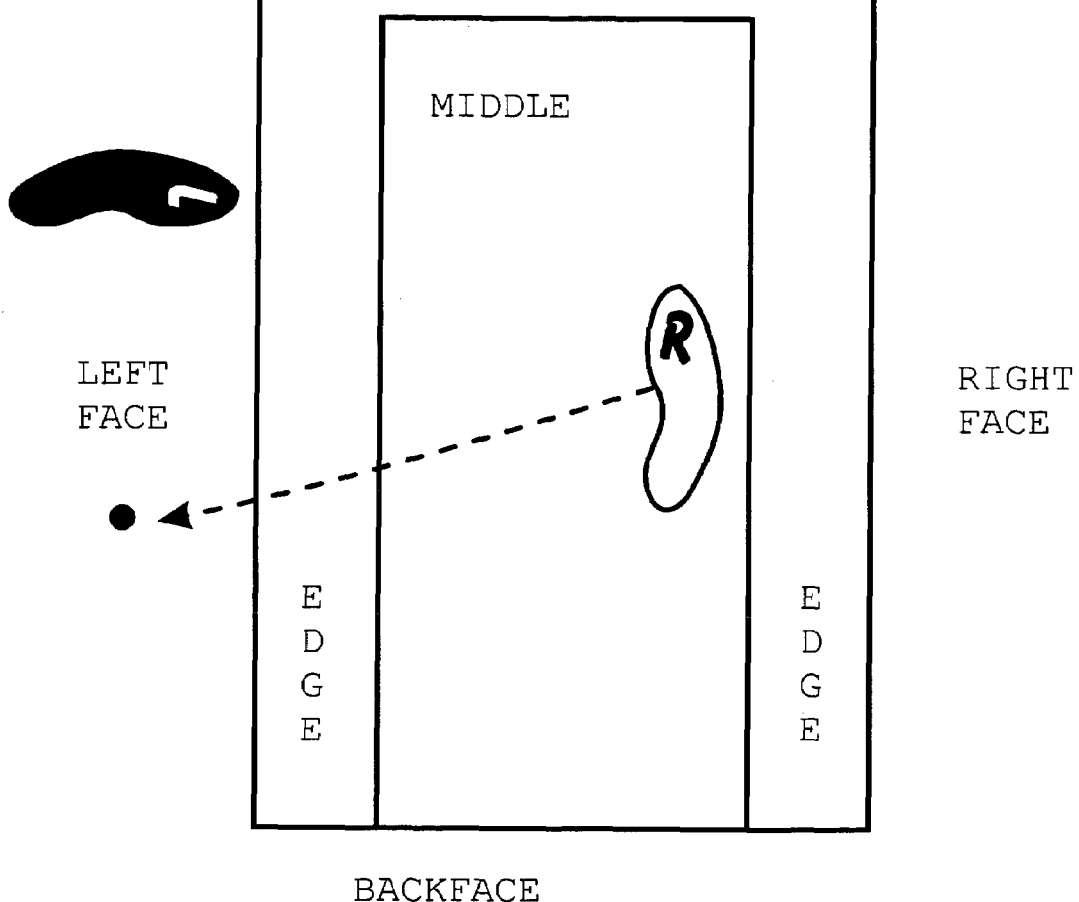
Figures 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47:
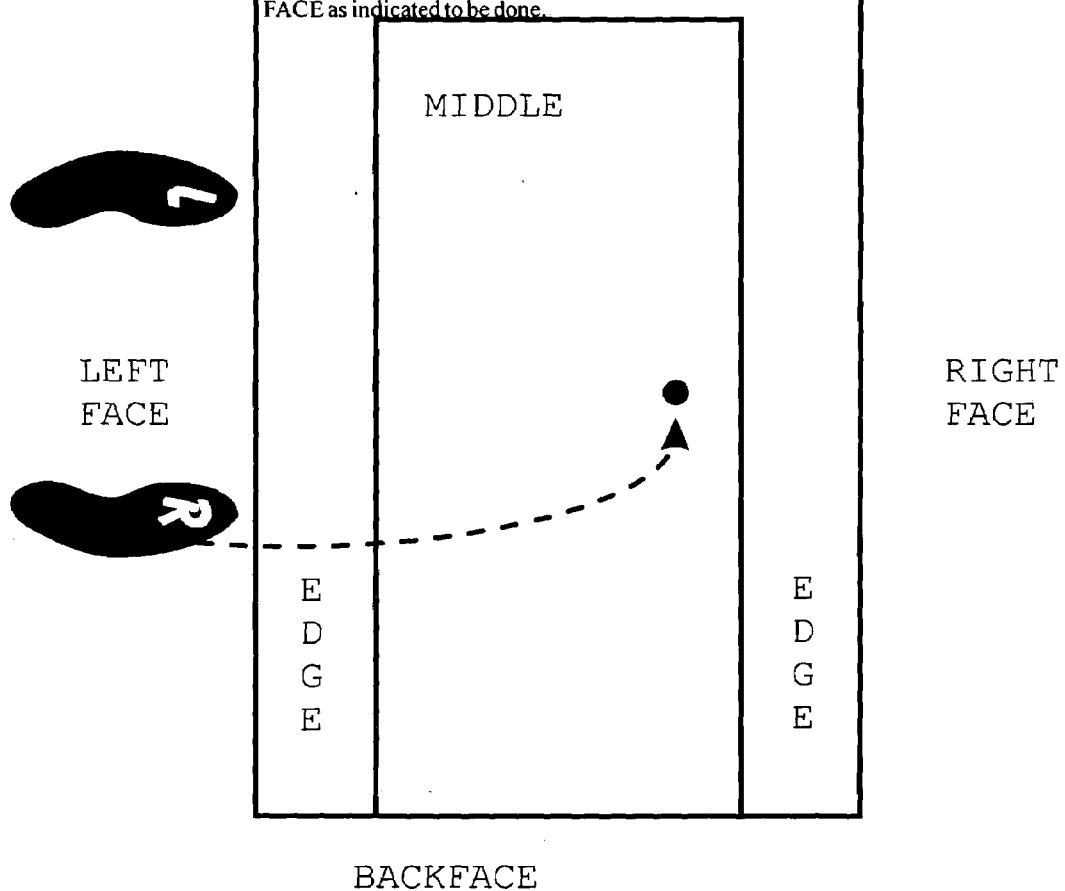
Figures 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48:
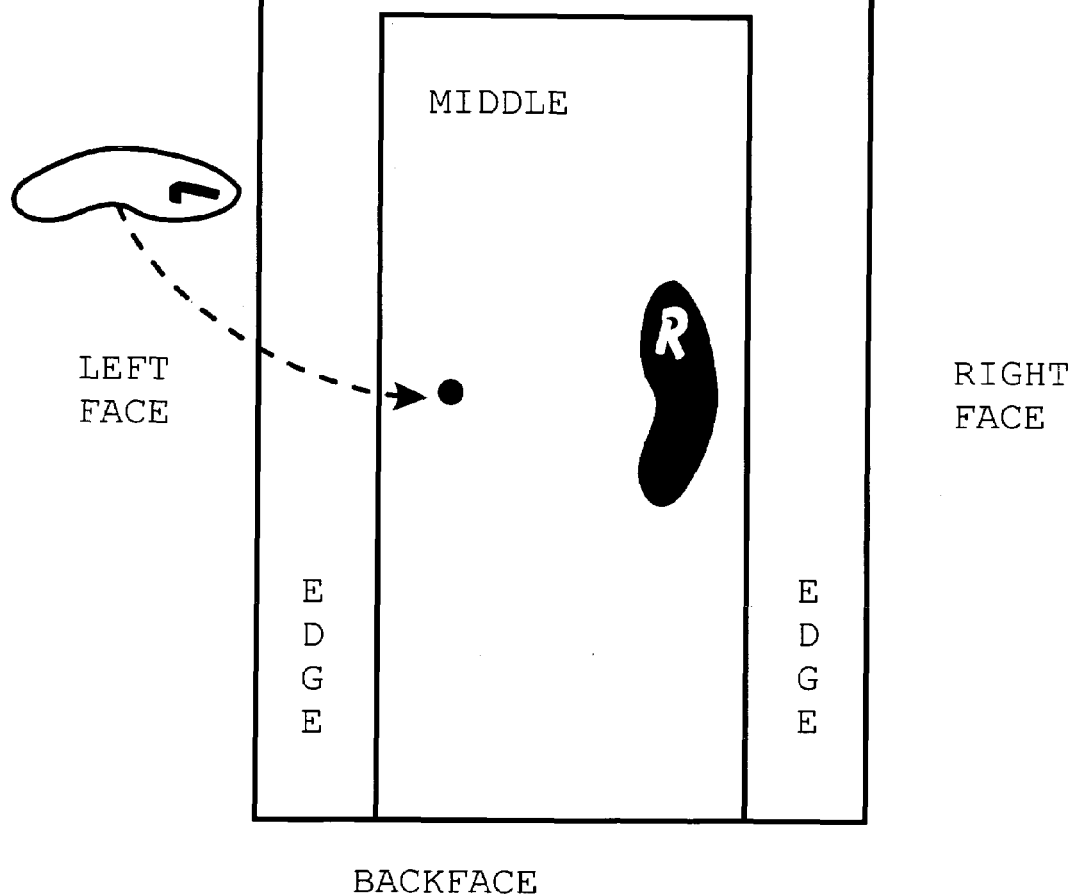
Figures 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49:
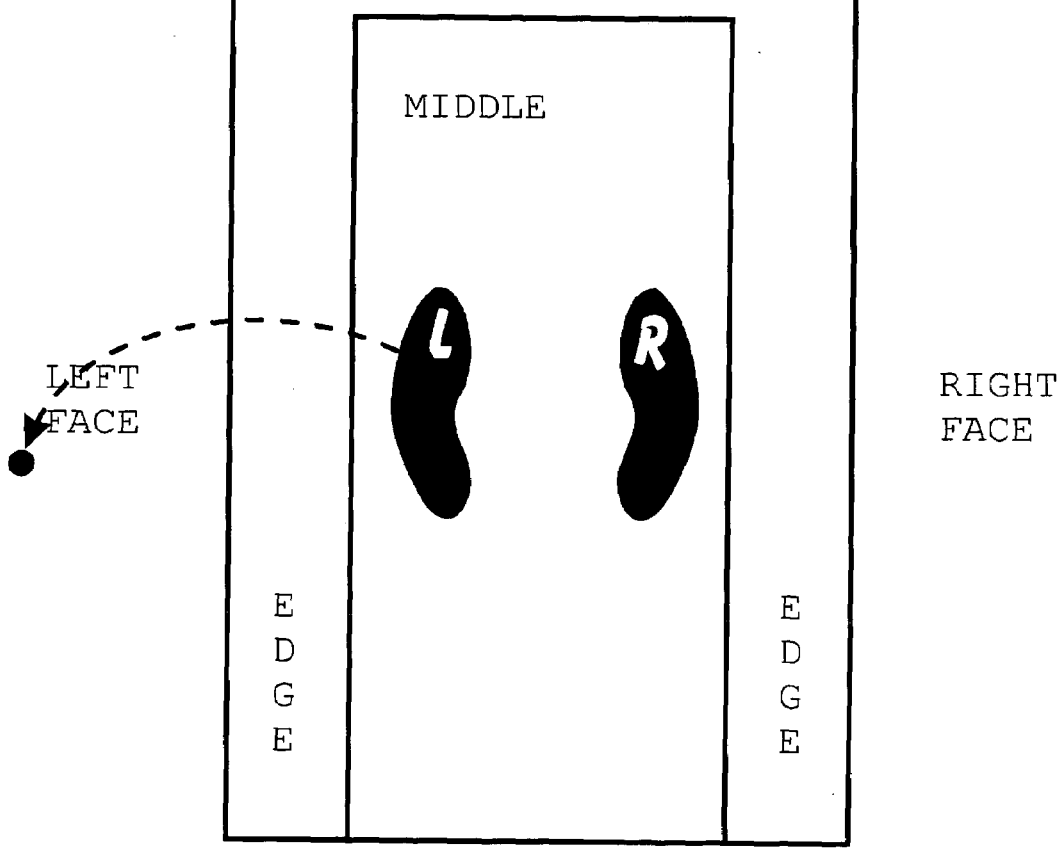
Figures 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50:
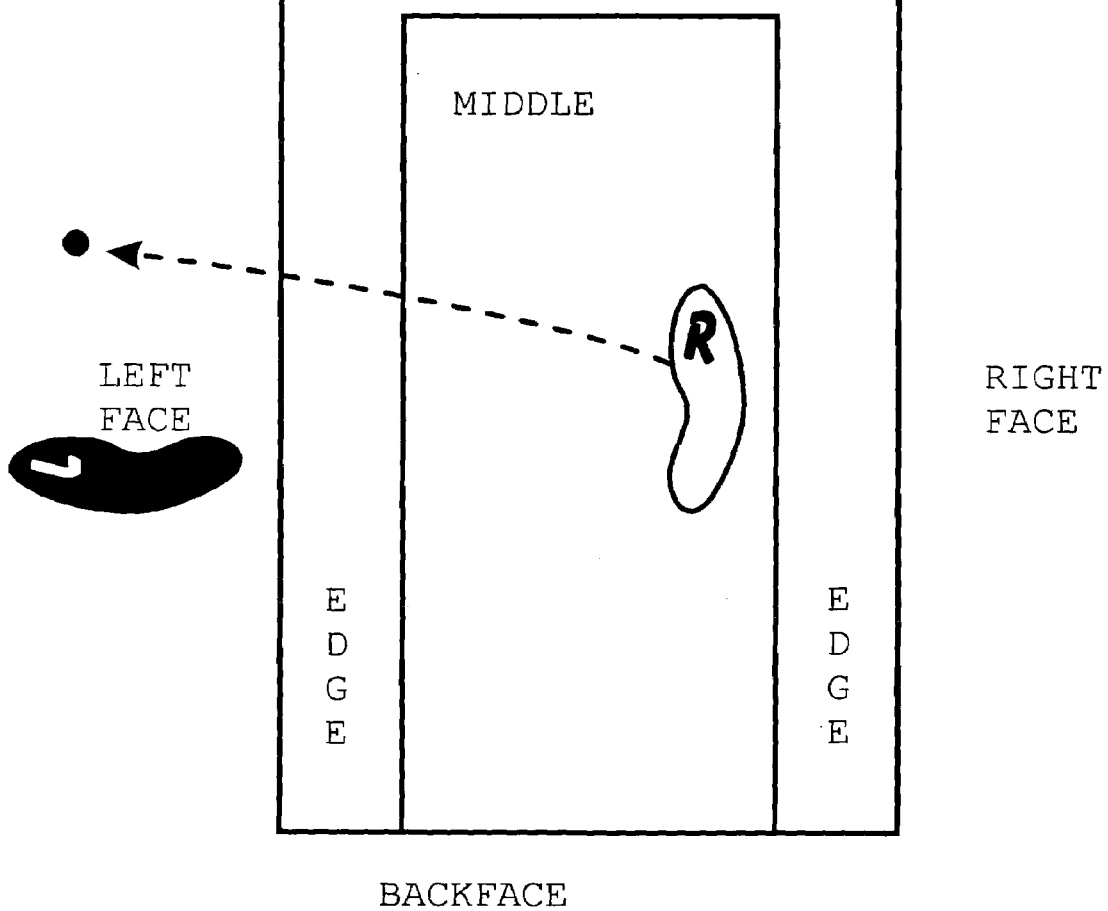
Figures 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51:
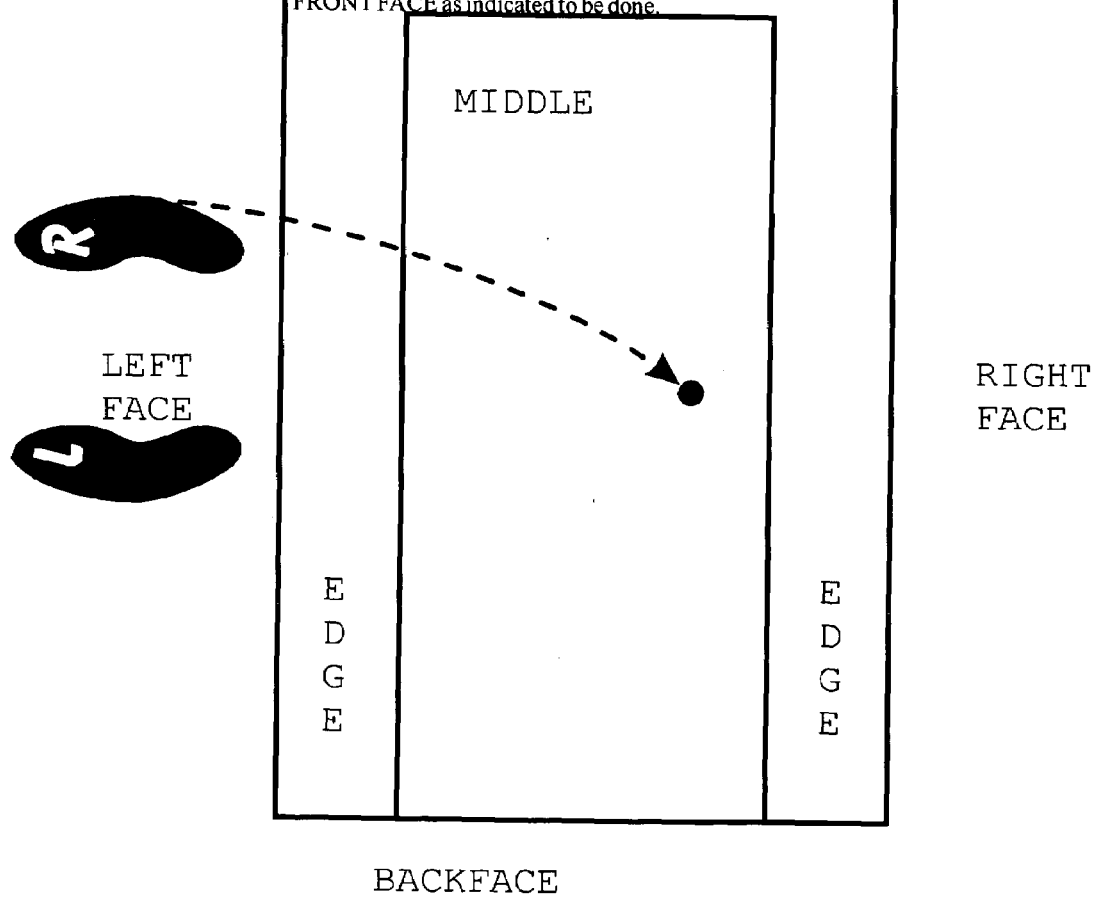
Figures 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52:
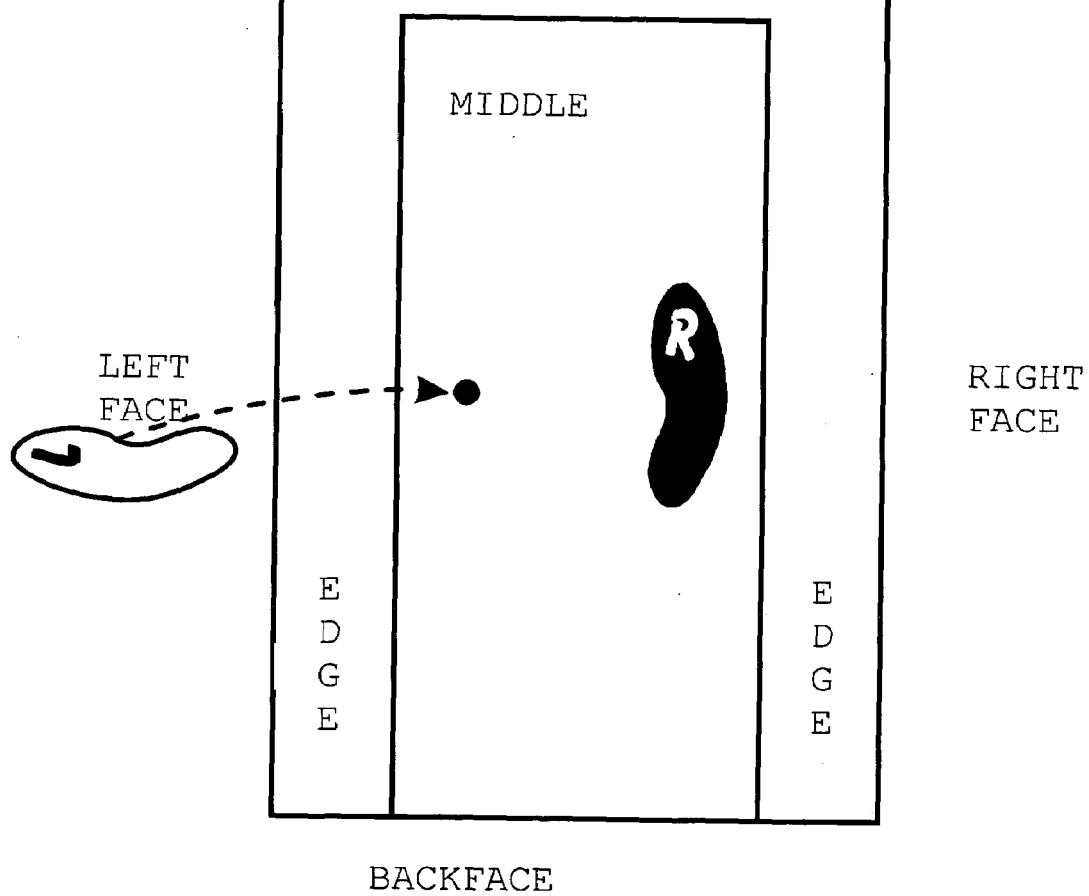
Figures 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53:
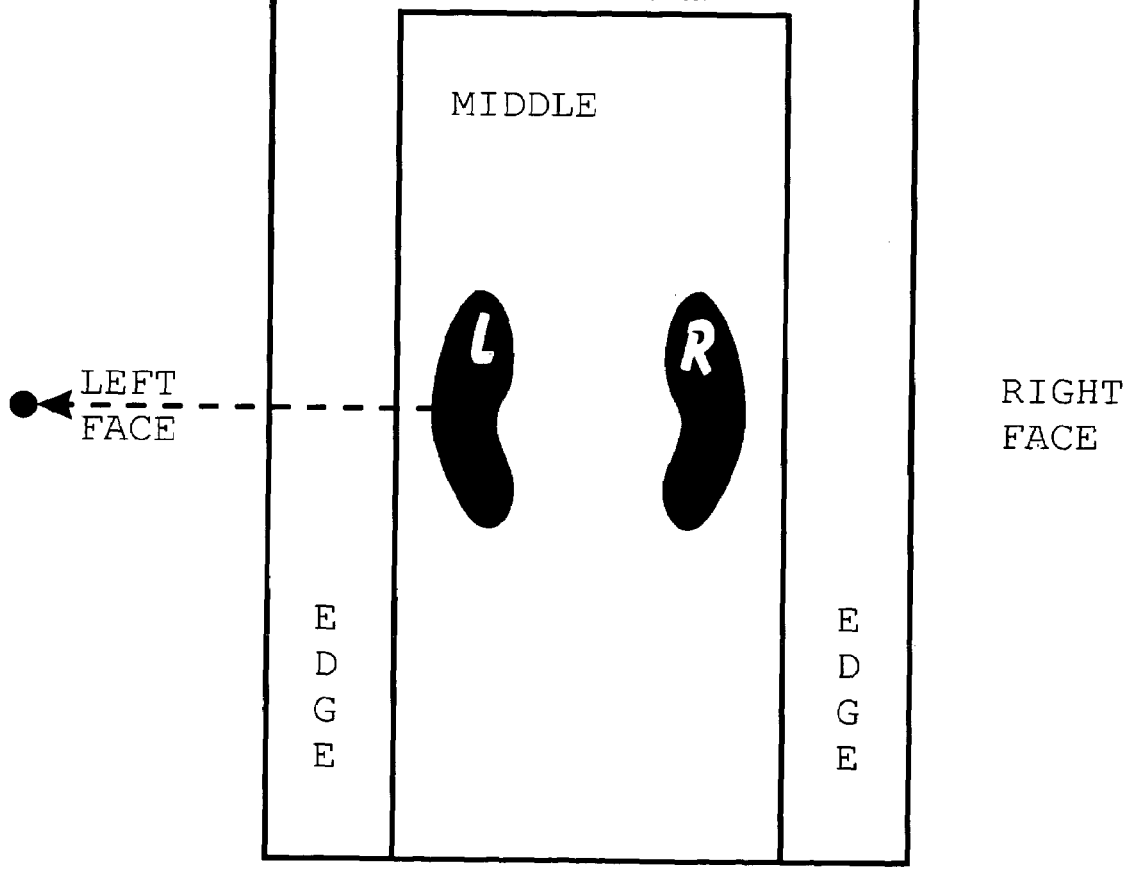
Figures 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54:
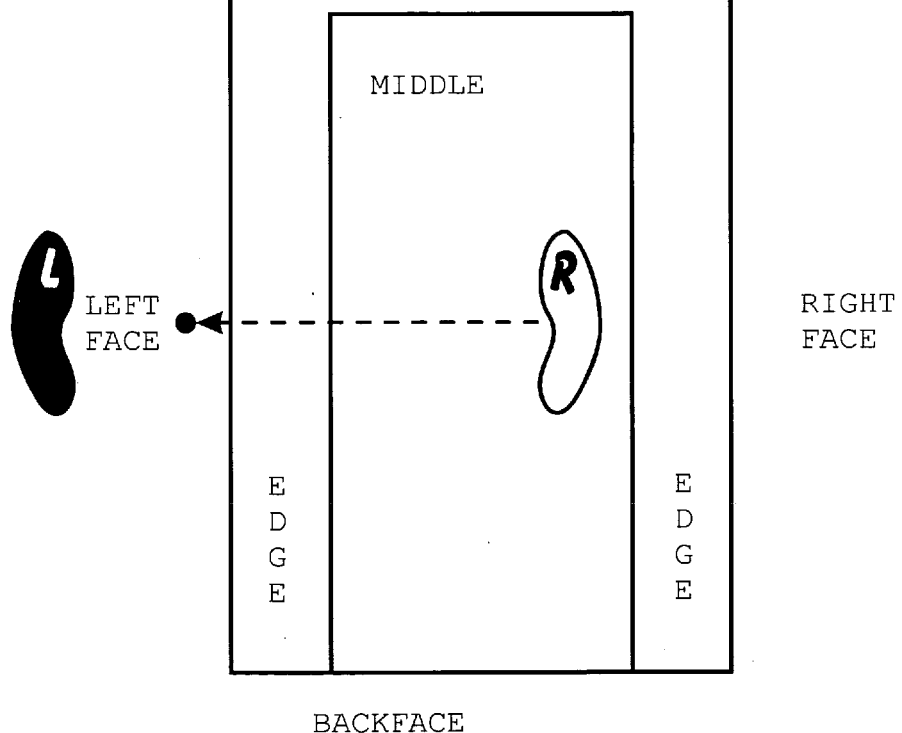
Figures 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55:
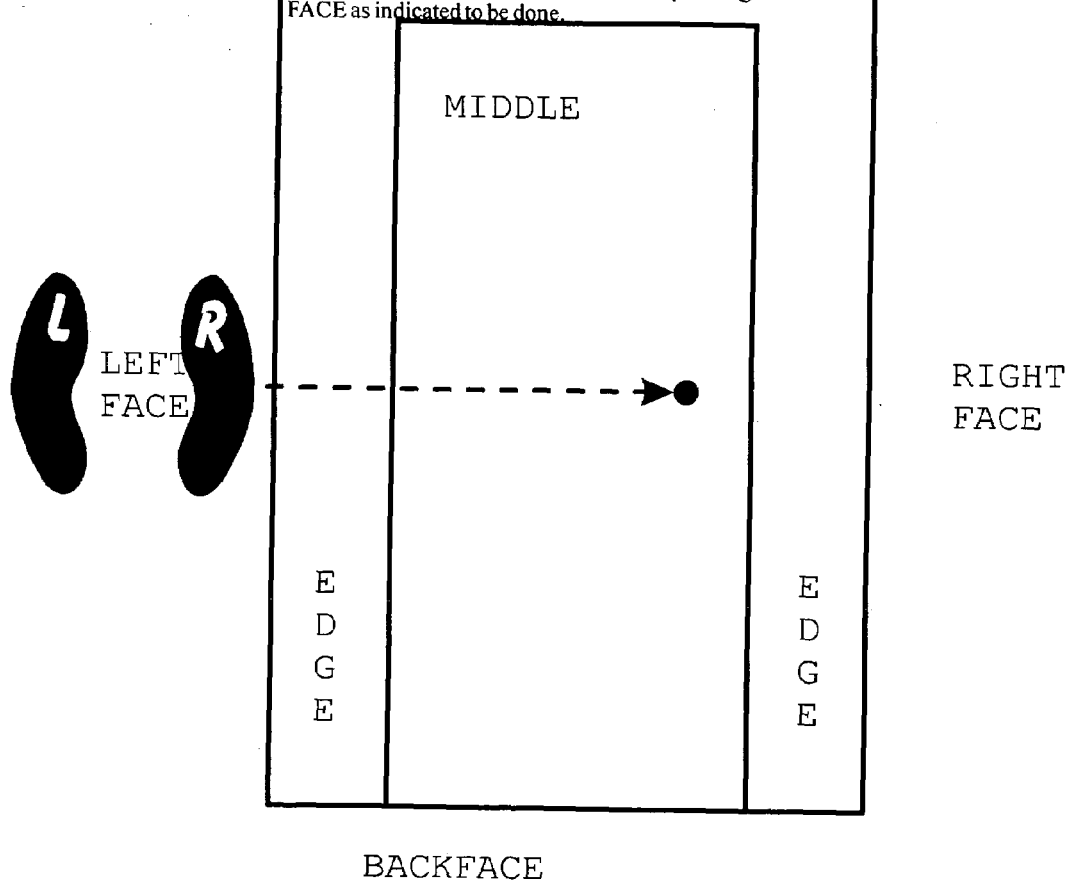
Figures 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56:
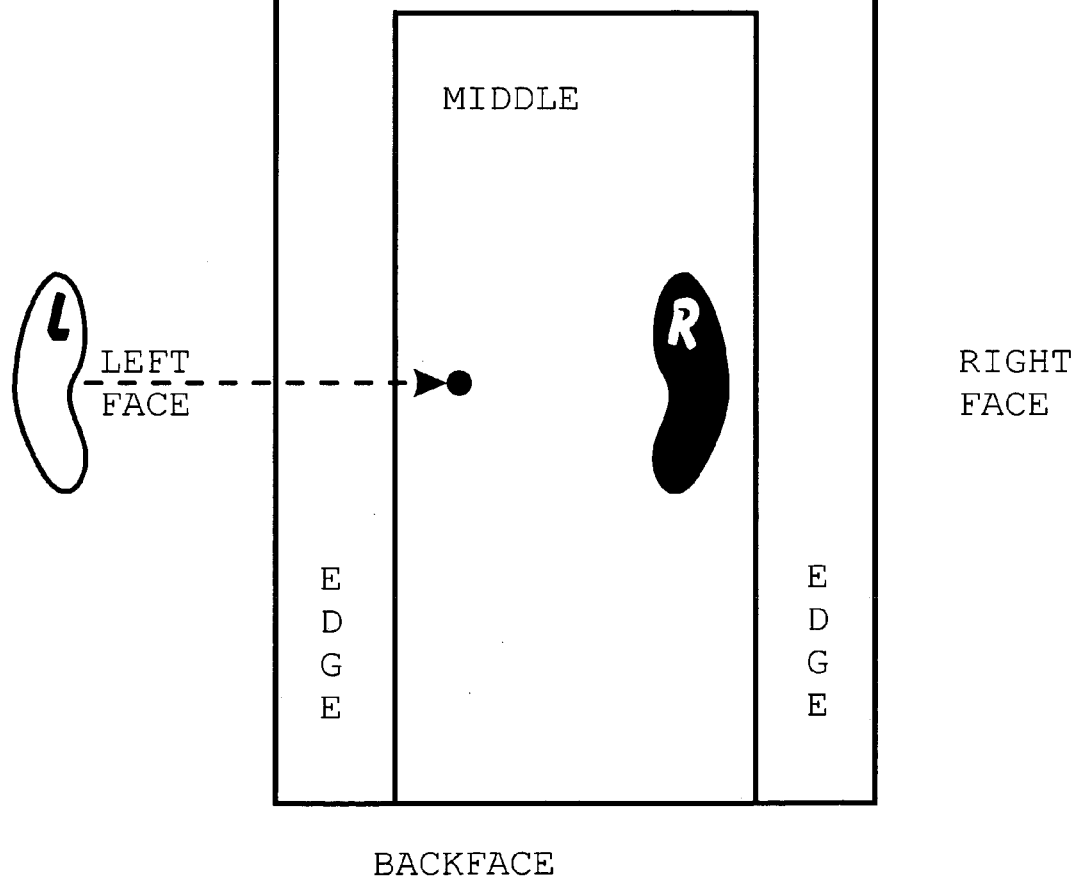
Figures 6, 57:
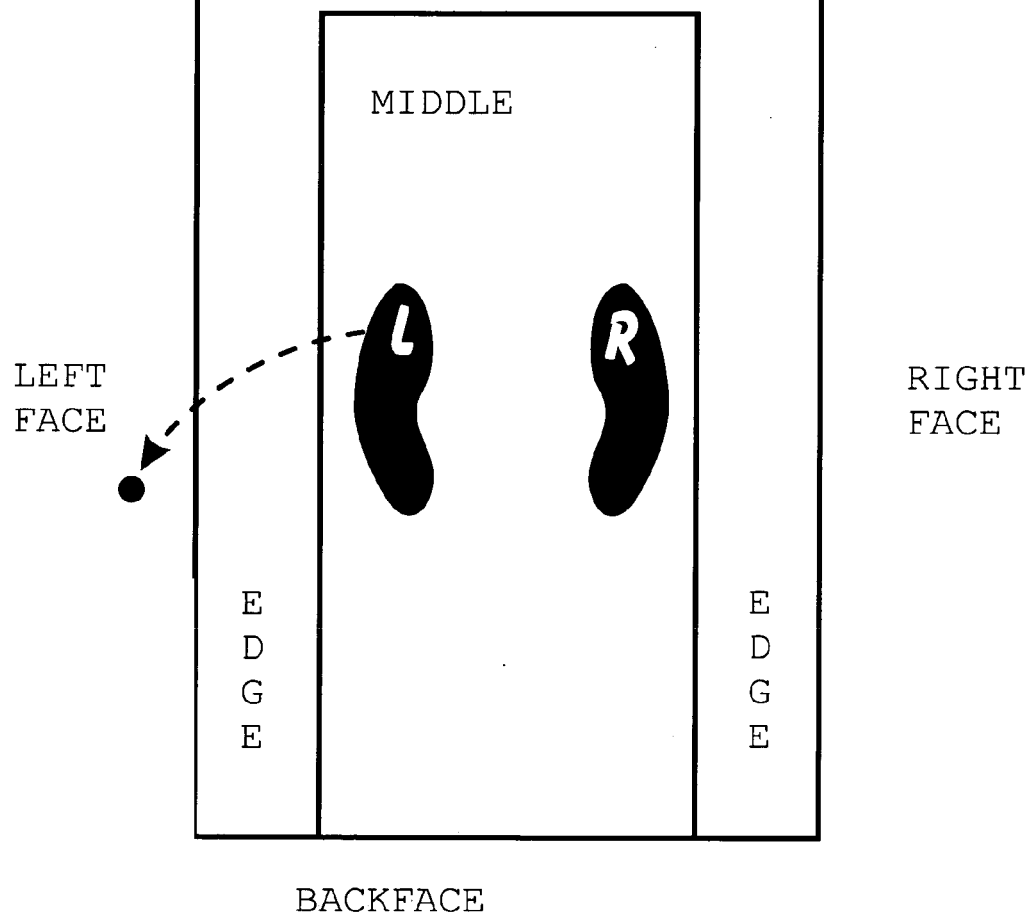
Figures 6, 58:
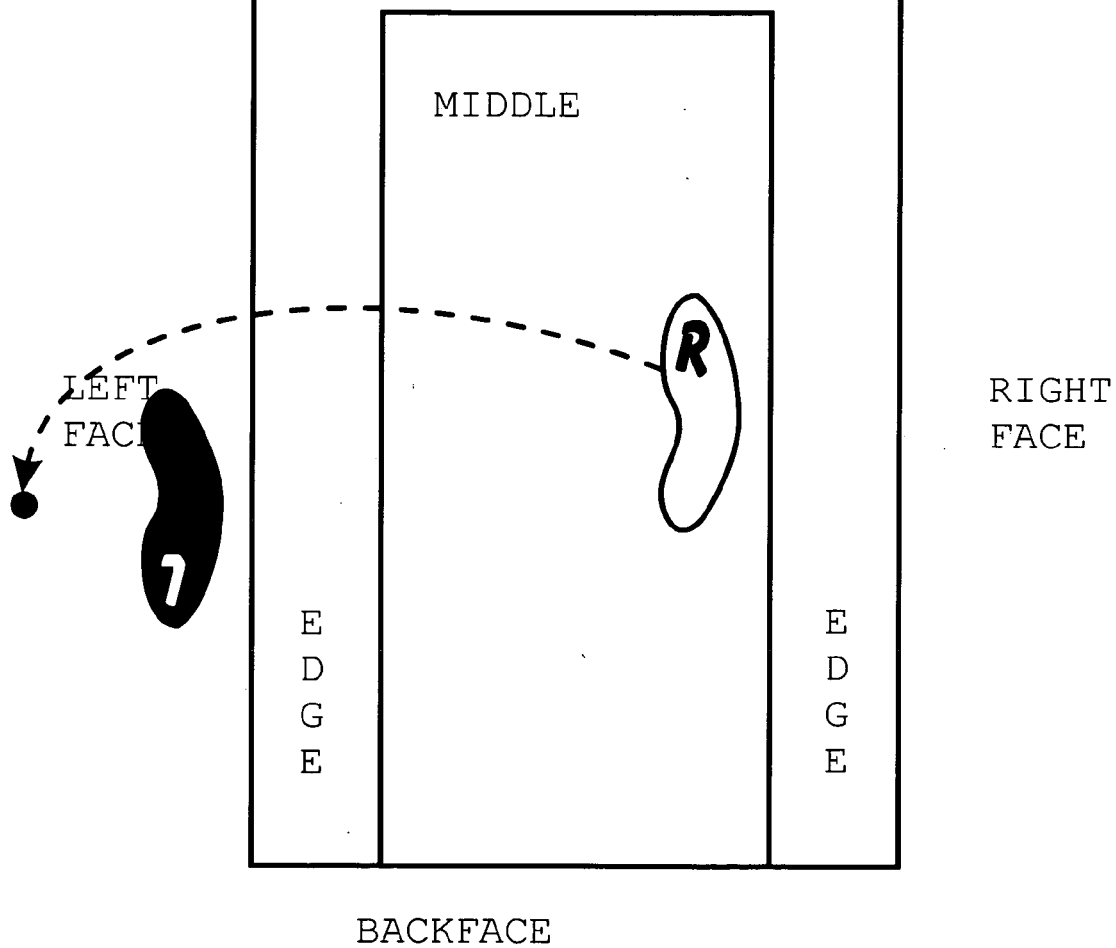
Figures 6, 59:
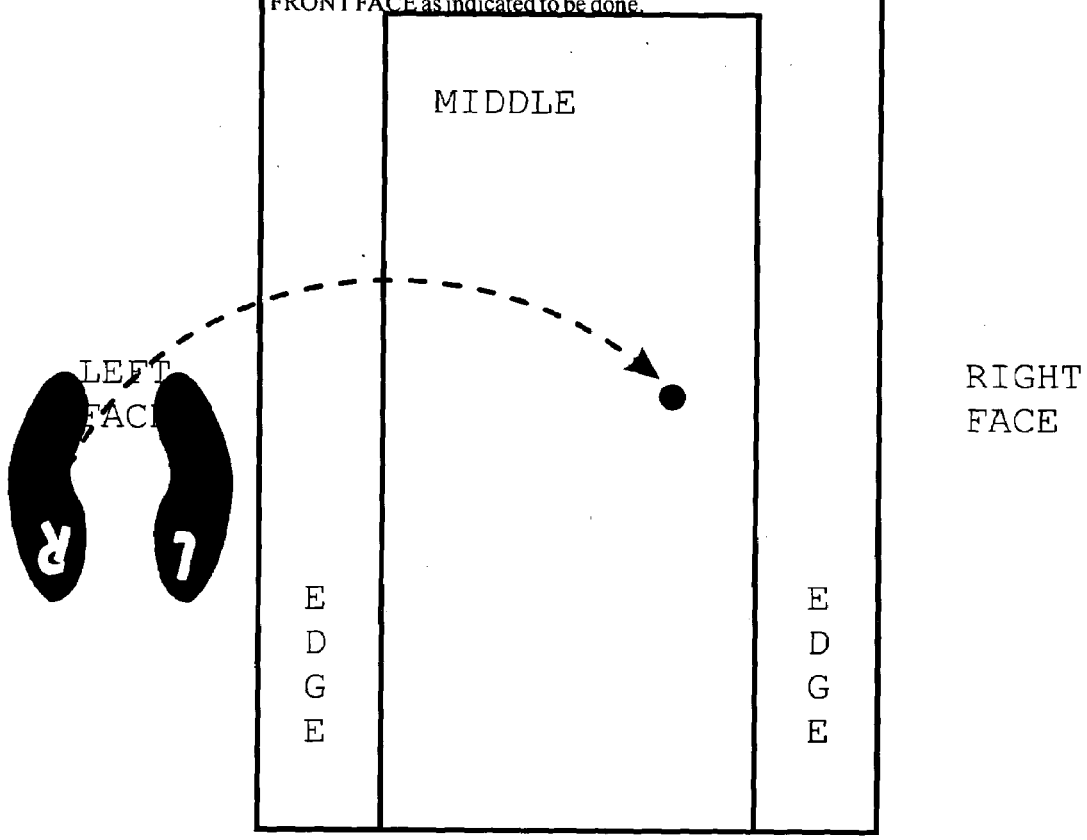
Figures 6, 60:
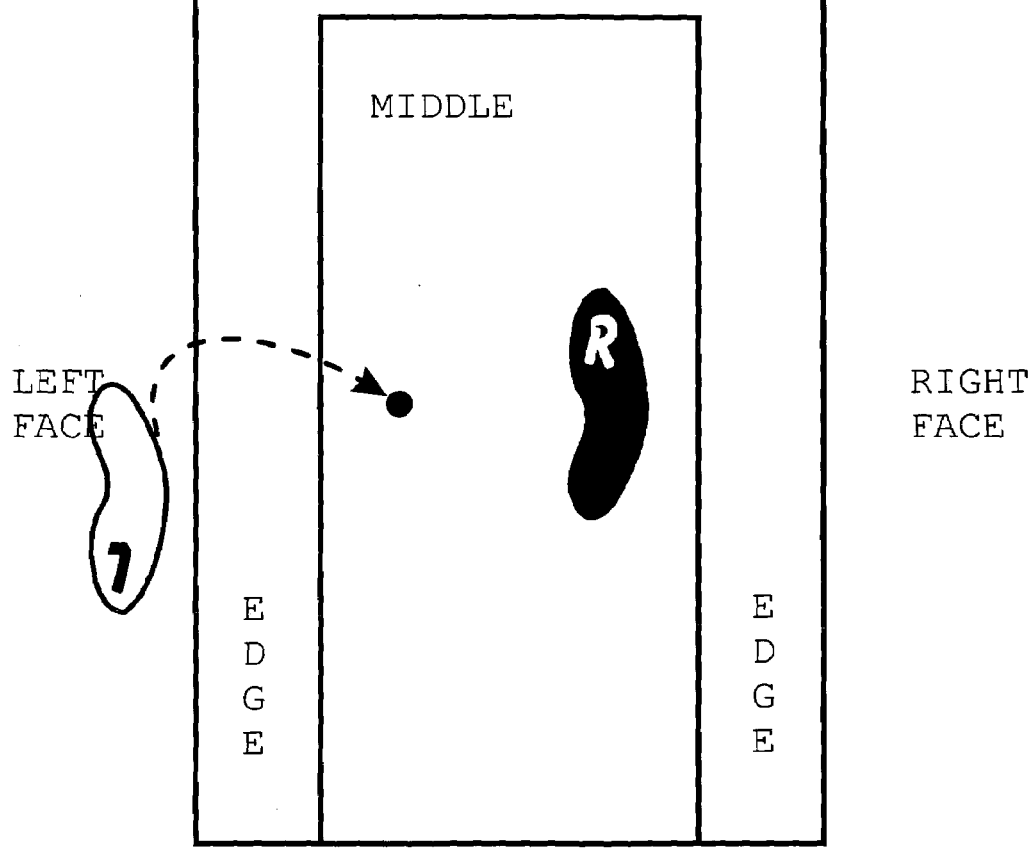
Figures 6, 61:
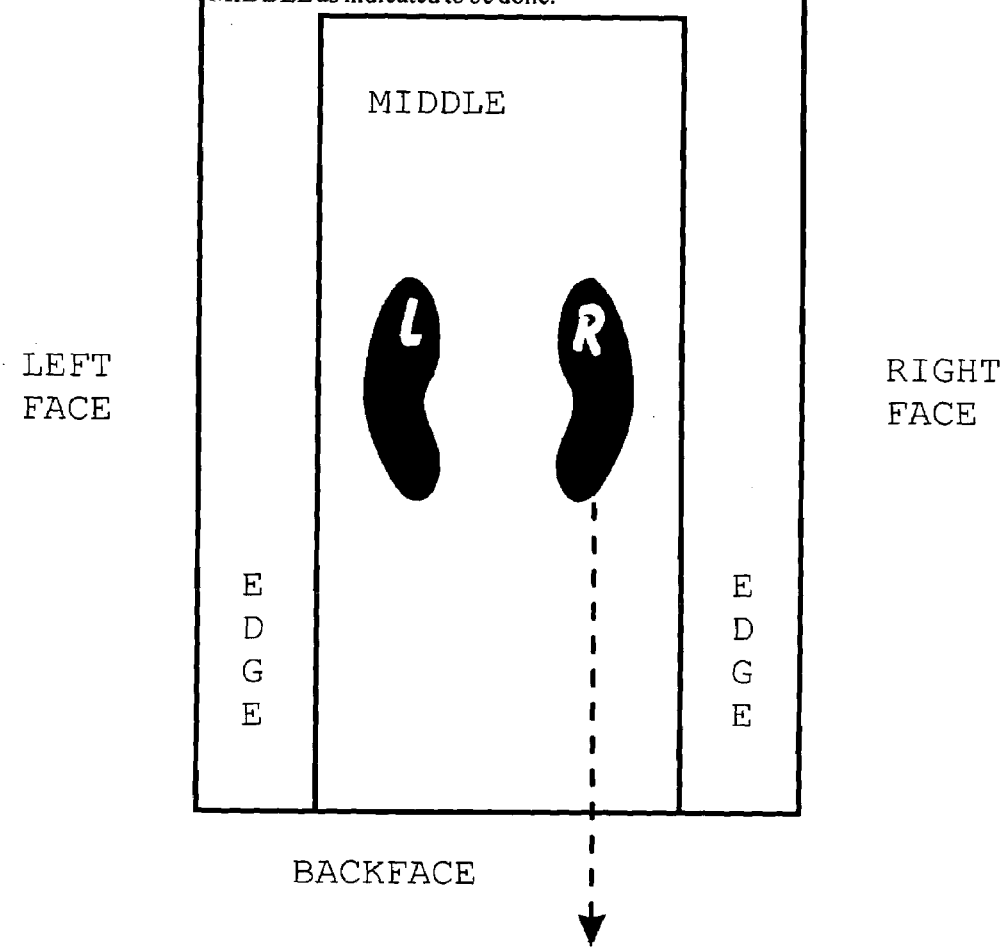
Figures 6, 63:
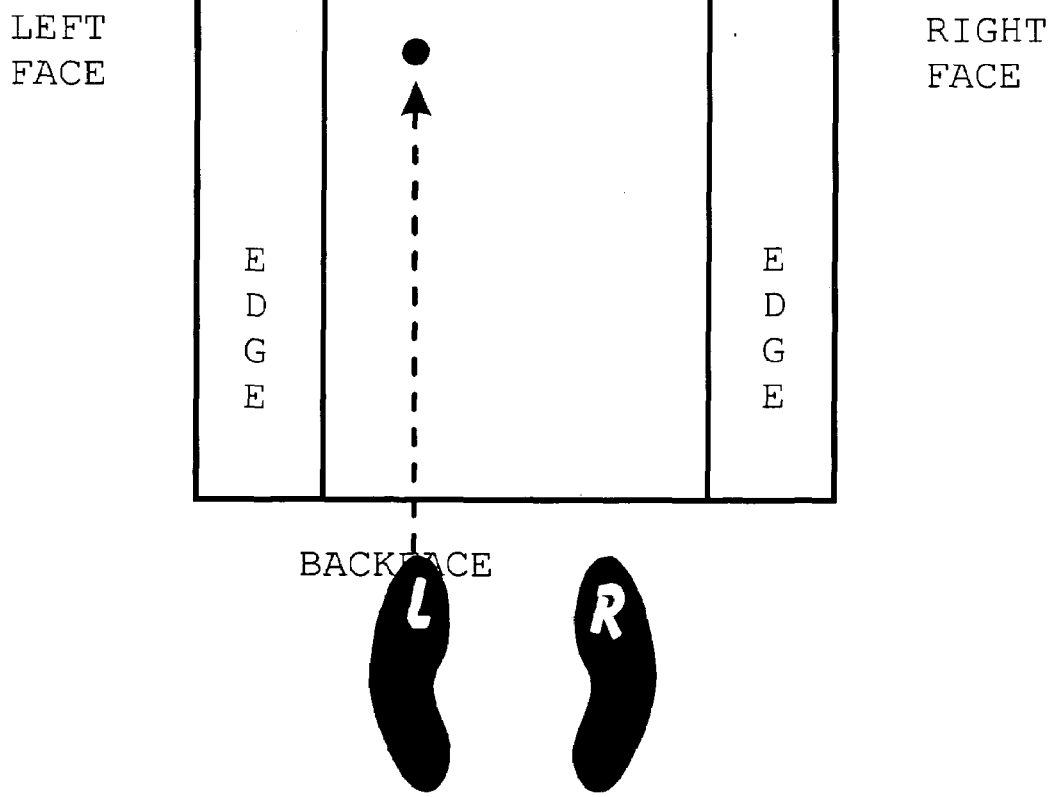
Figures 6, 64:
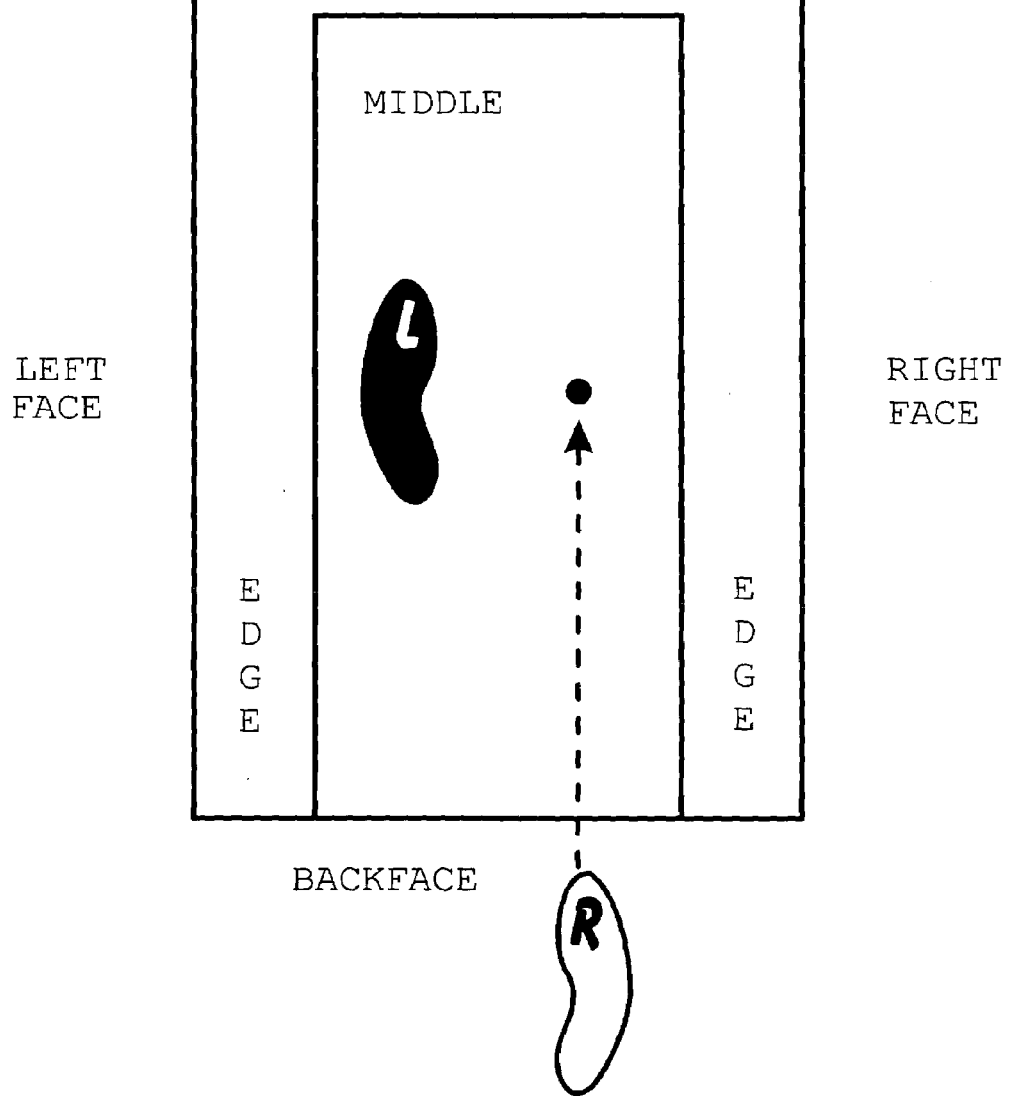
Figures 6, 65:
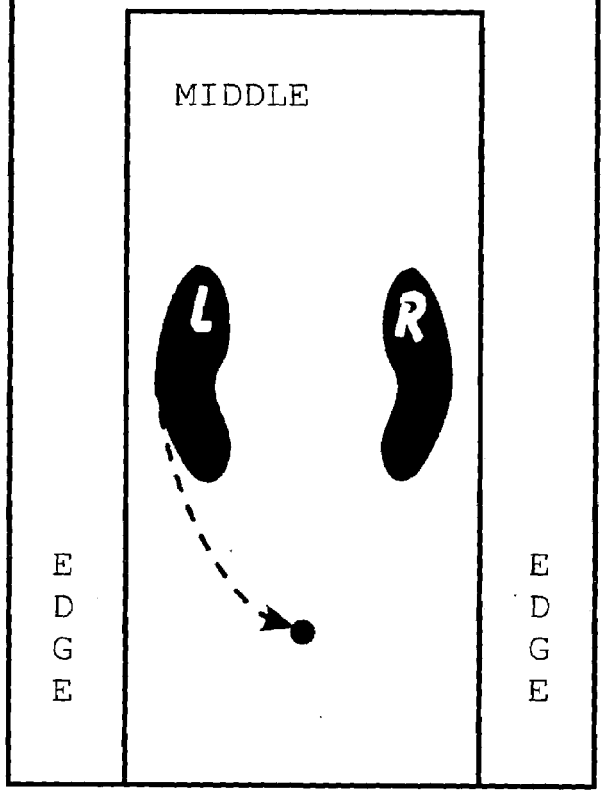
Figures 6, 66:
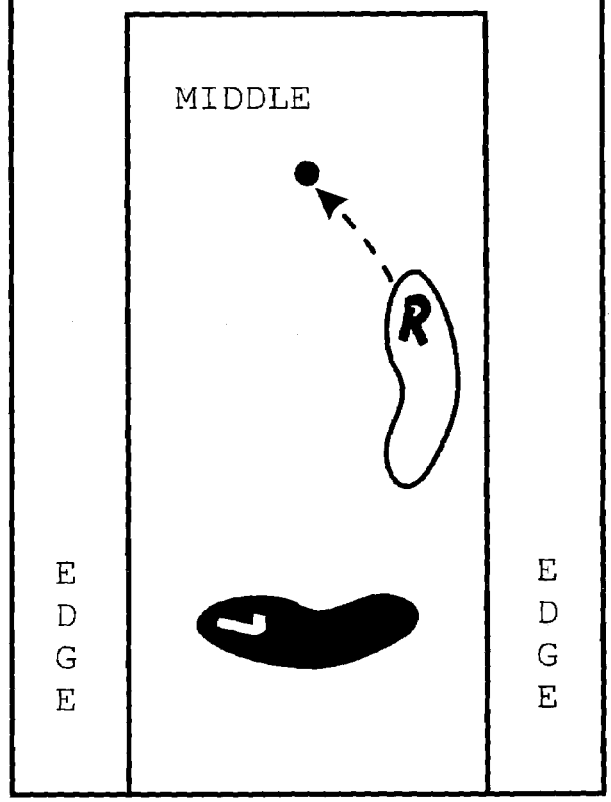
Figures 6, 68:
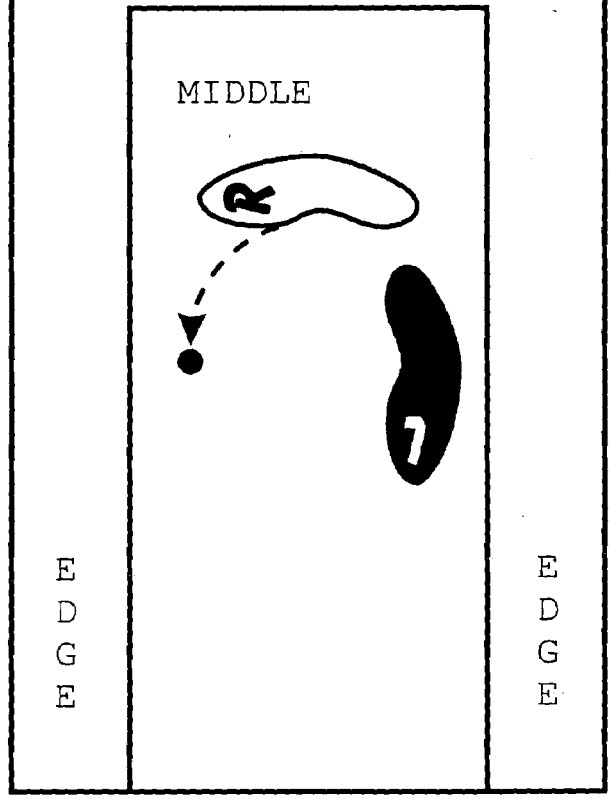
Figures 6, 69:
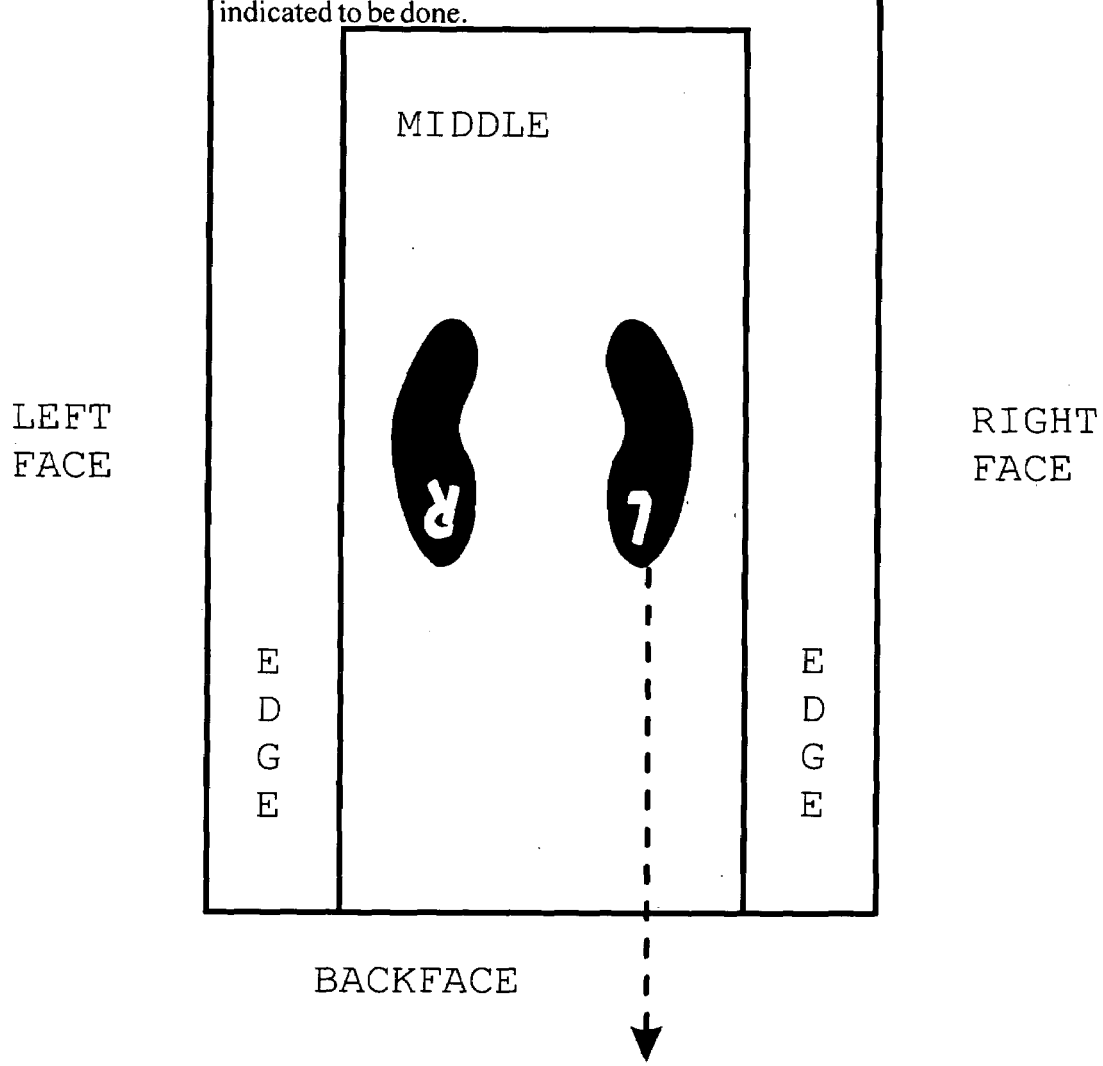
Figures 6, 70:
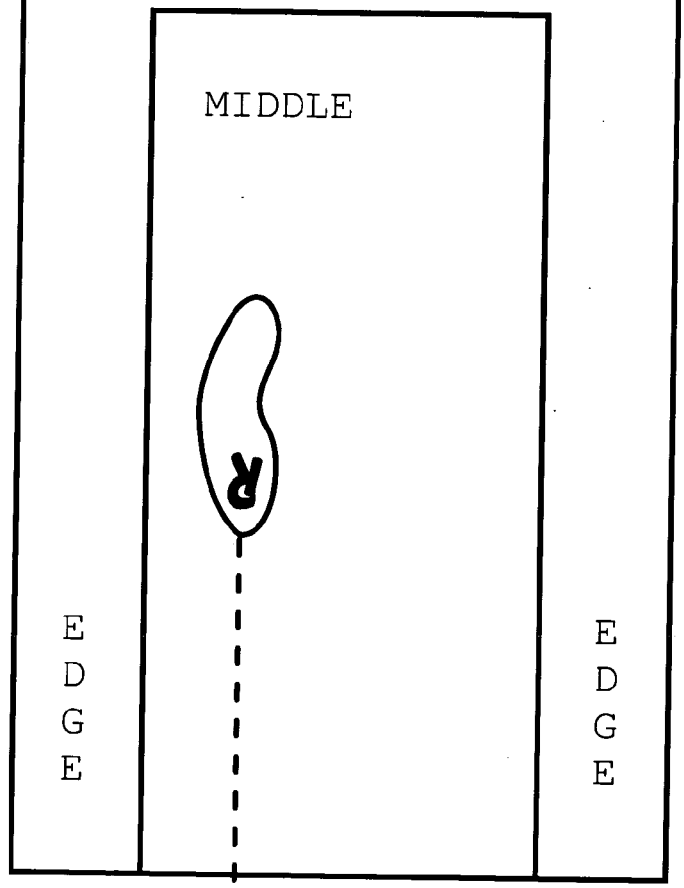
Figures 6, 71:
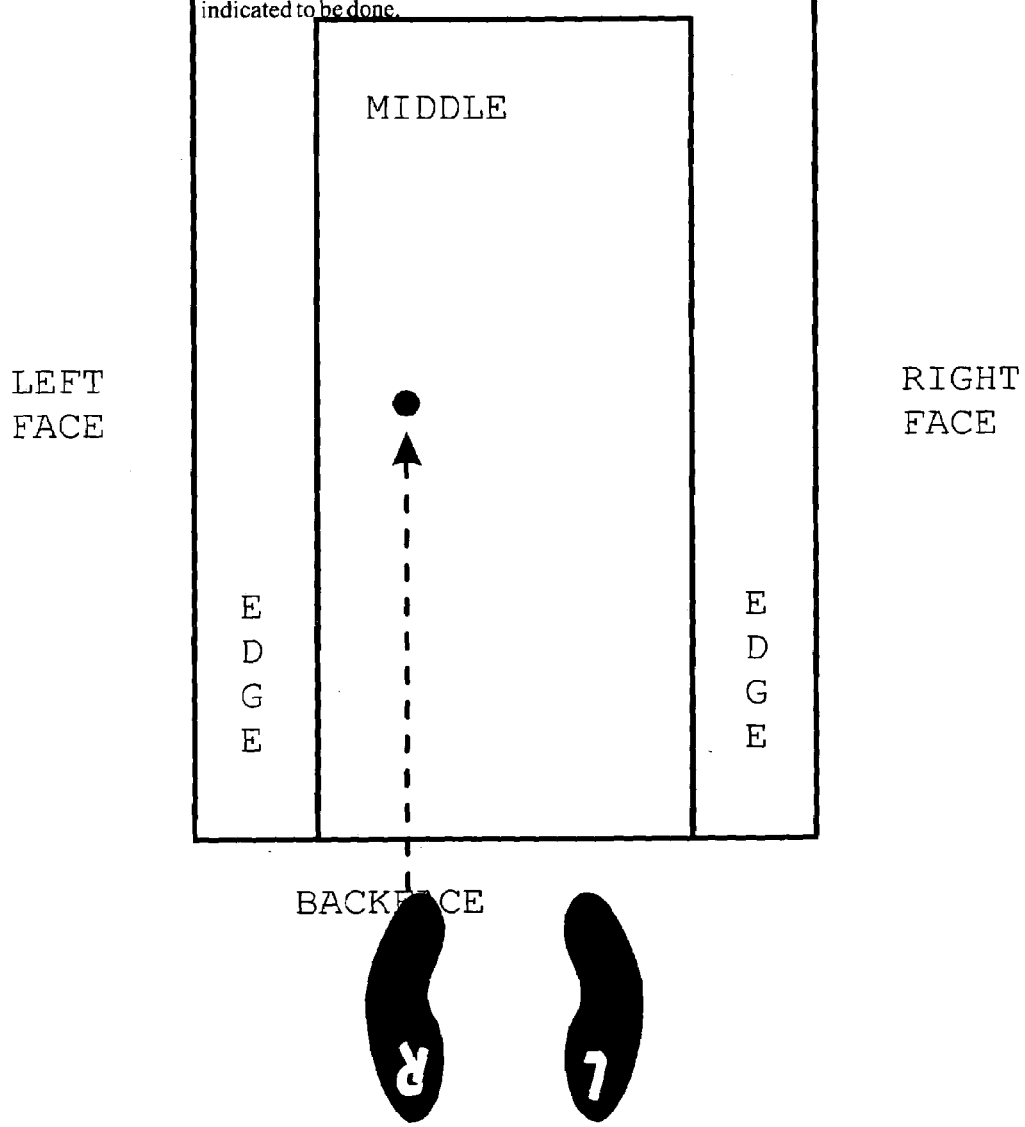
Figures 6, 72:
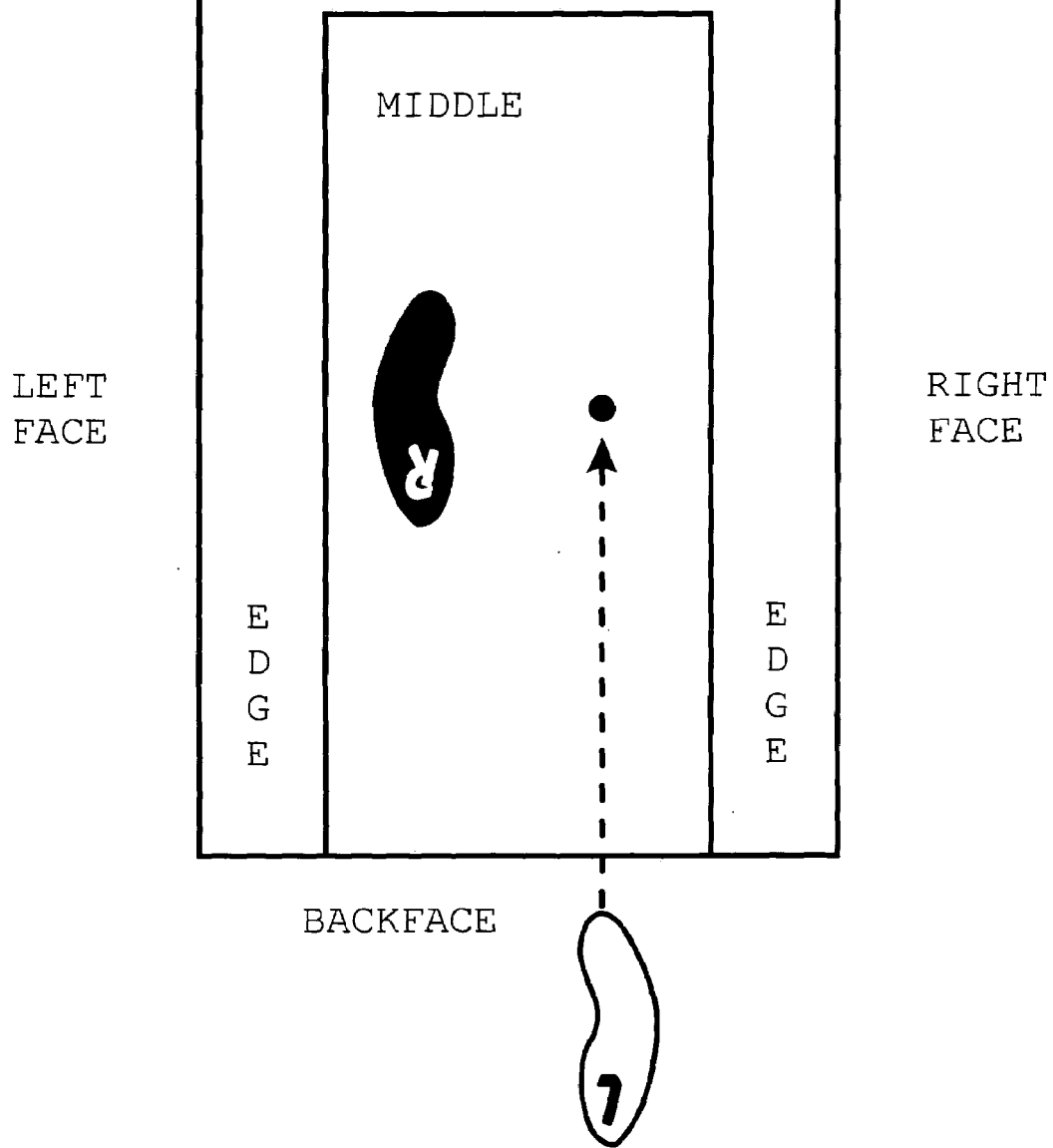
Figures 6, 73:
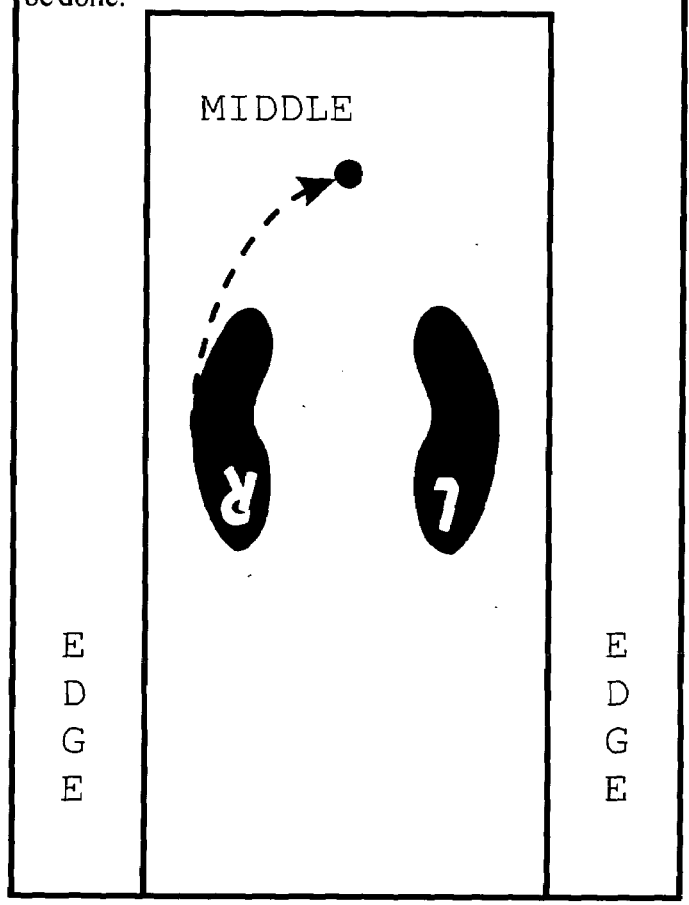
Figures 6, 74:
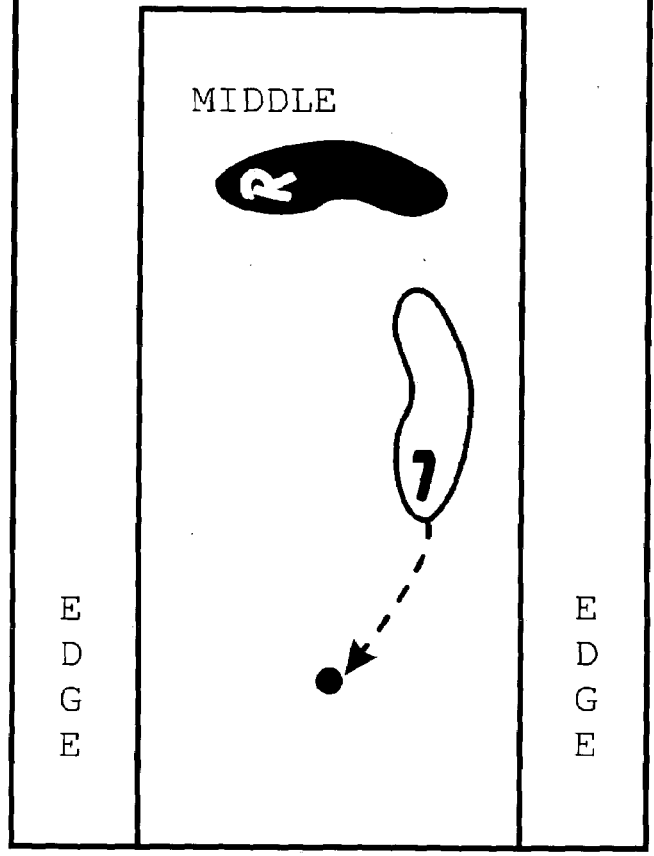
Figures 6, 75:
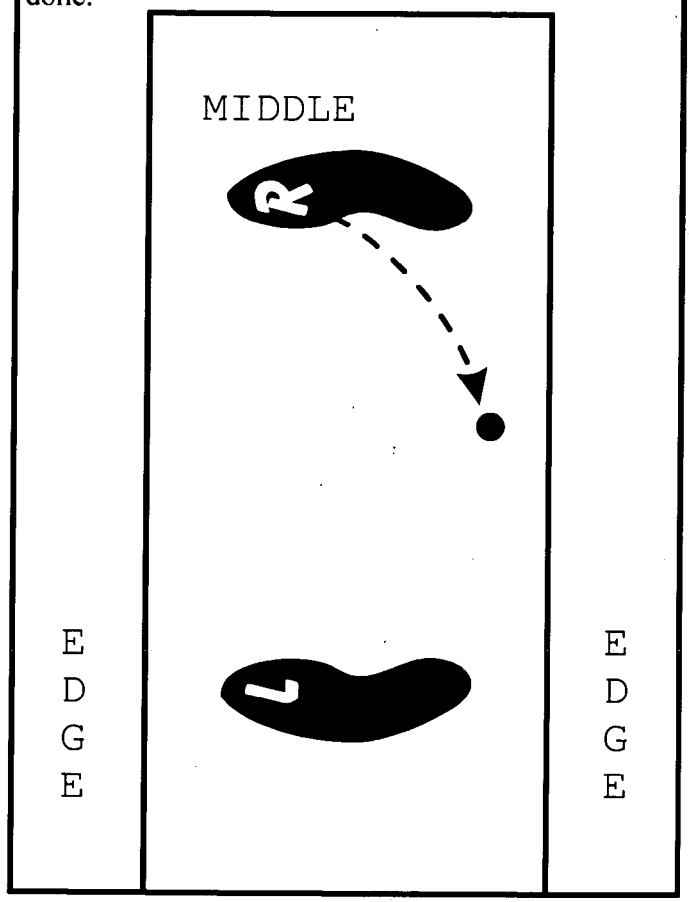
Figures 6, 76:
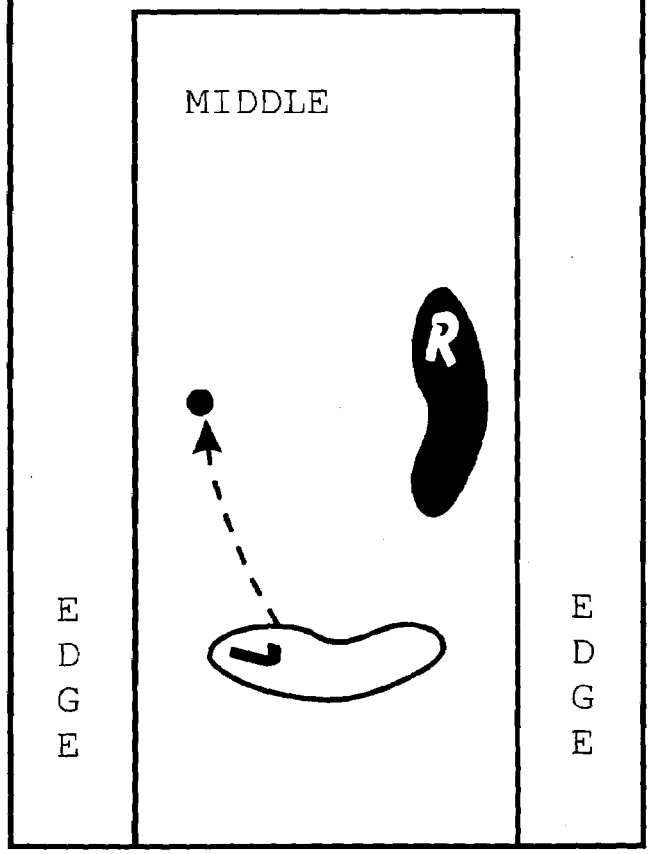
Figures 6, 77:
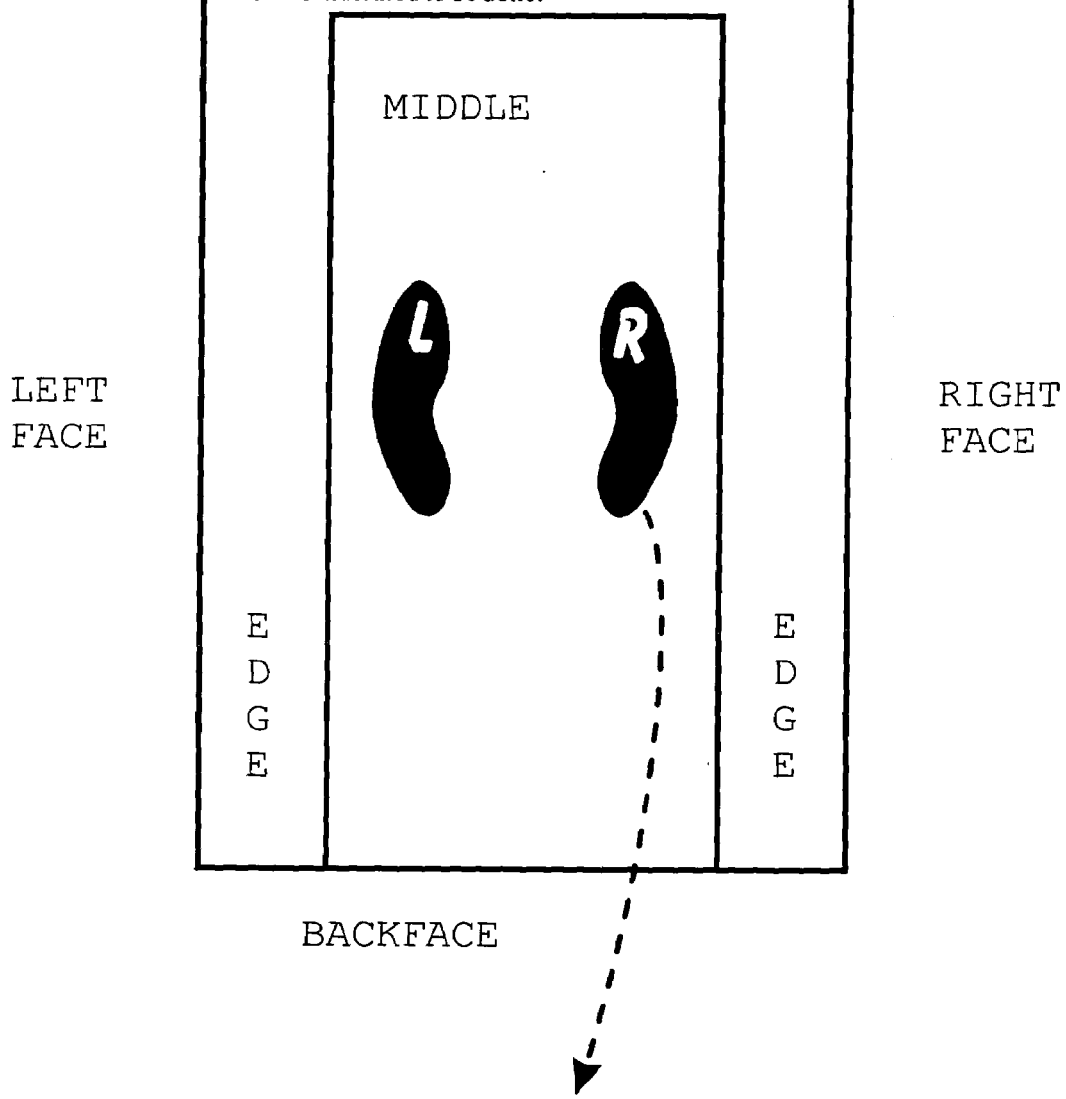
Figures 6, 78:
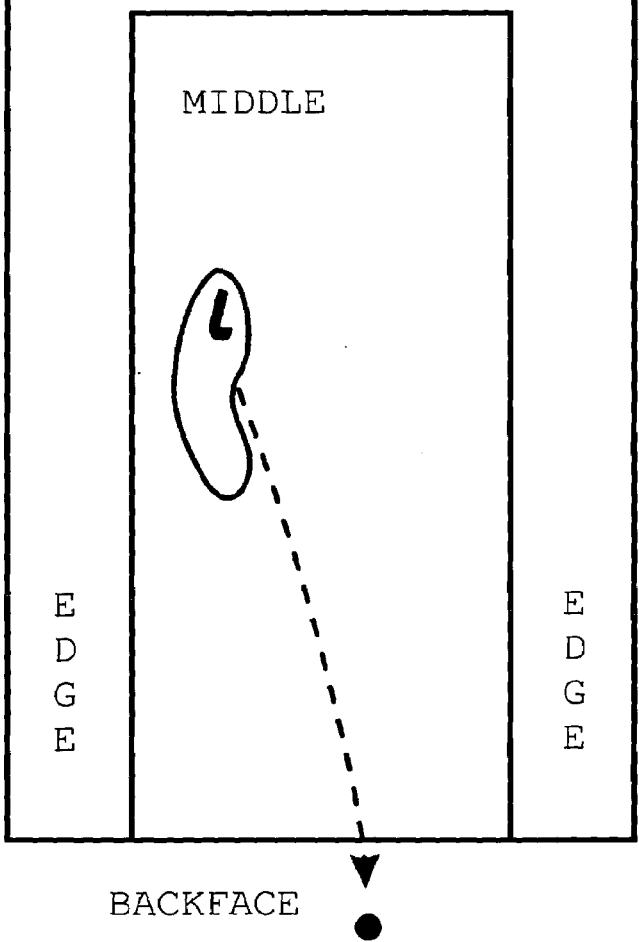
Figures 6, 79:
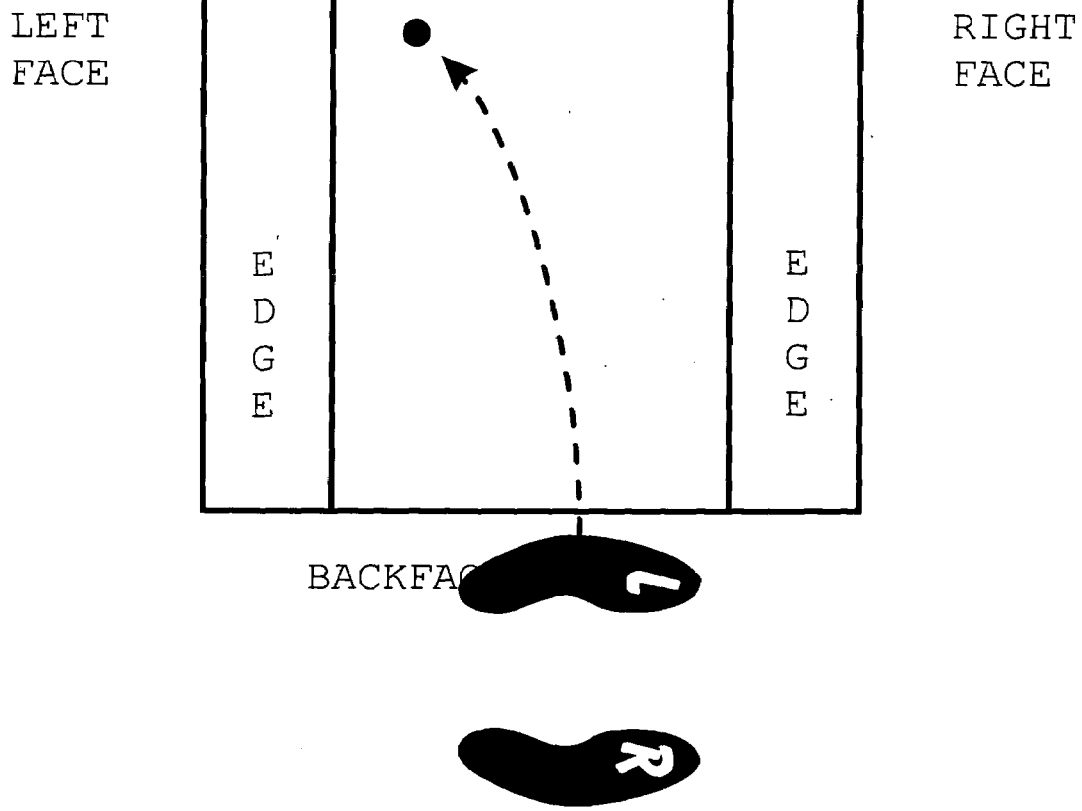
Figures 6, 80:
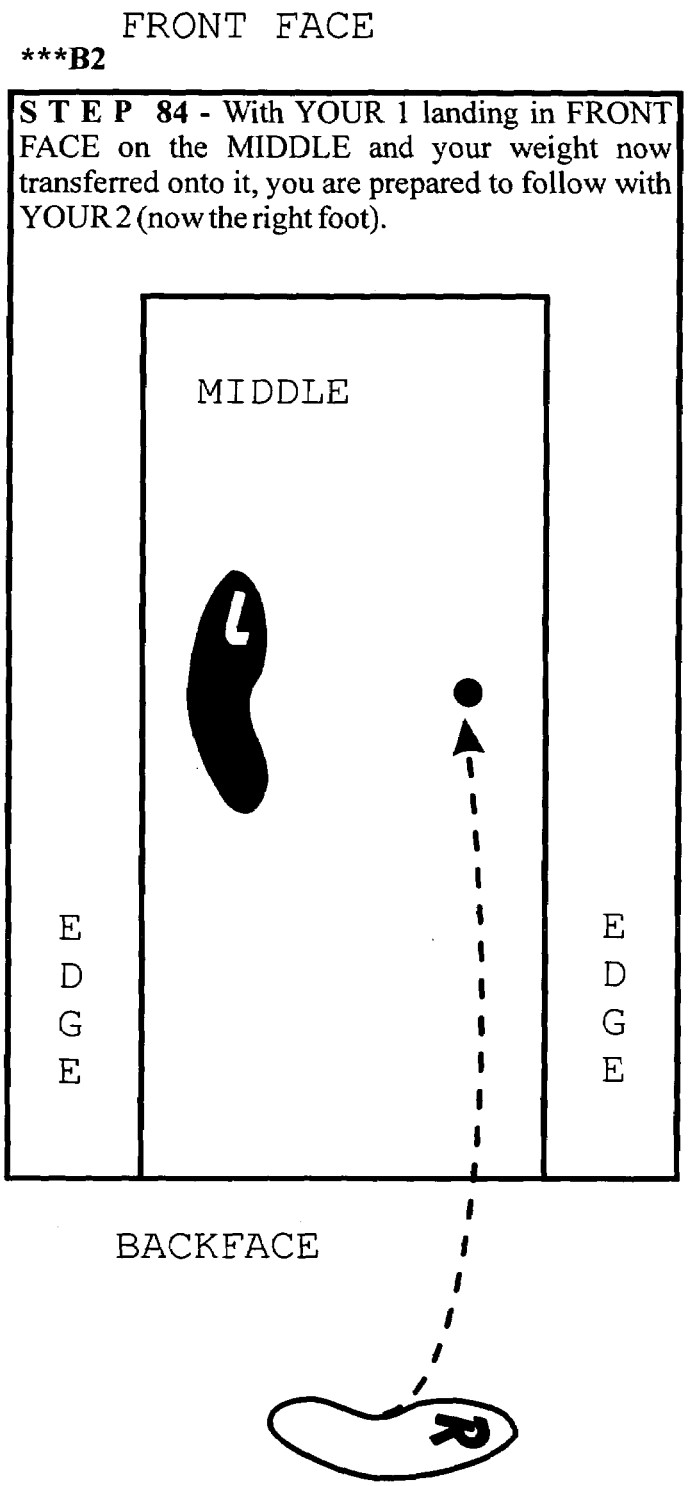
Figures 6, 82:
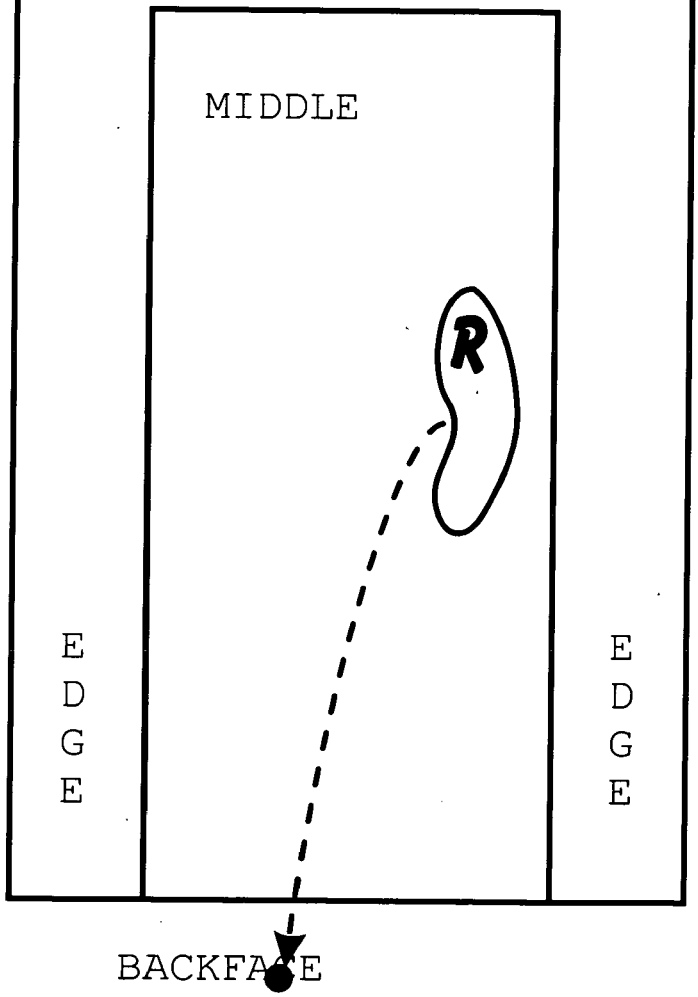
Figures 6, 83:
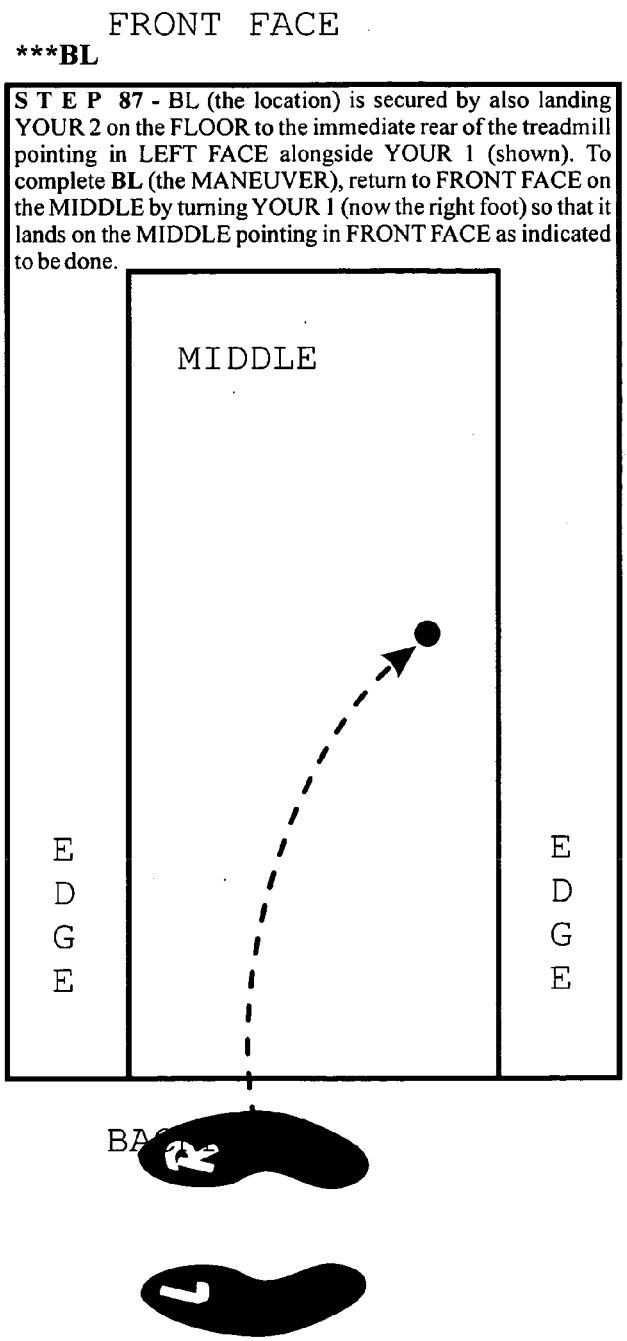
Figures 6, 84:
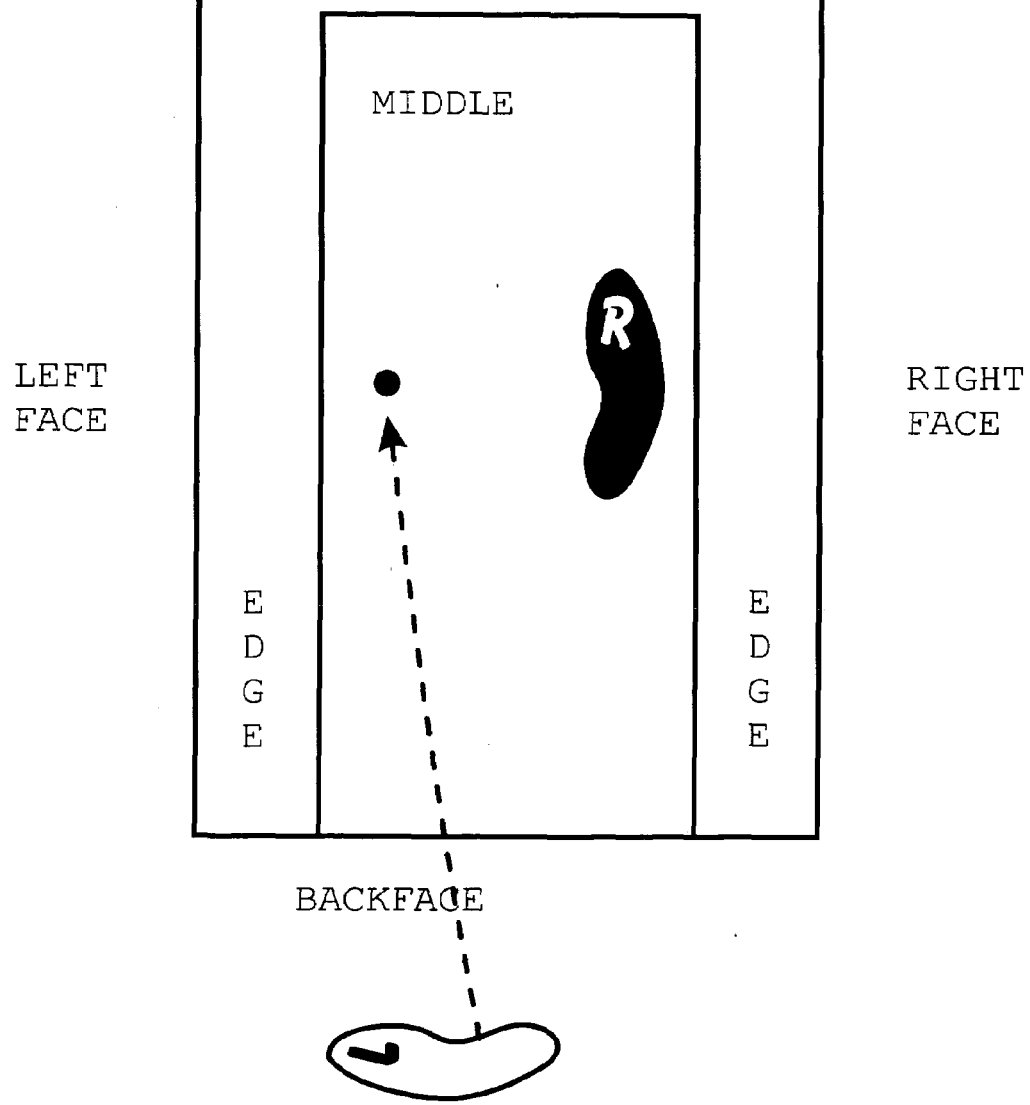
Figures 1, 7:
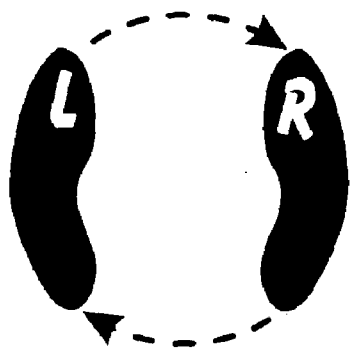
Figures 2, 7:
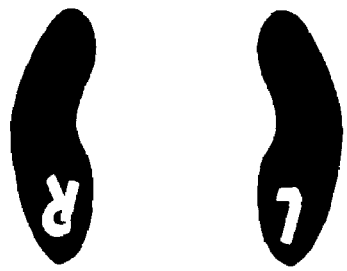
Figures 3, 7:
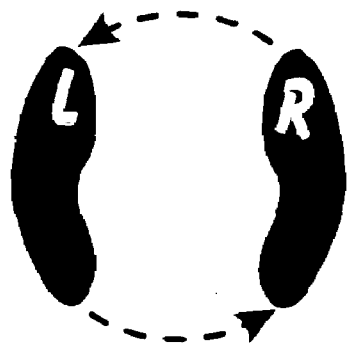
Figures 4, 7:
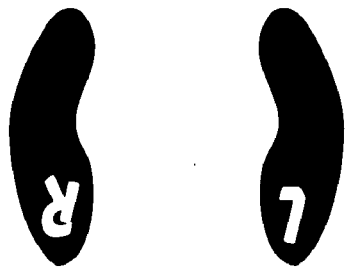
Figures 5, 7:
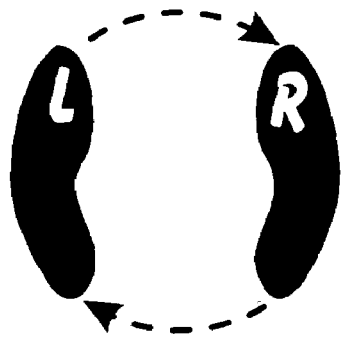
Figures 6, 7:
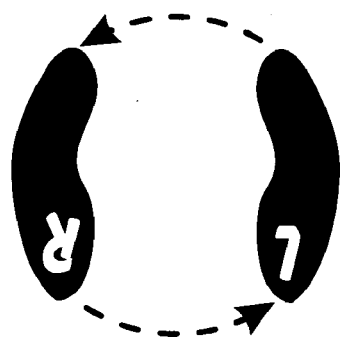
Figure 7:
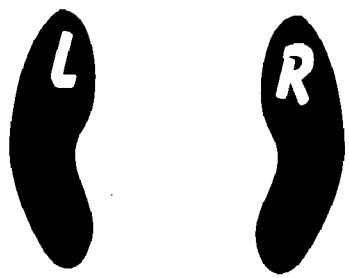
Figures 7, 8:
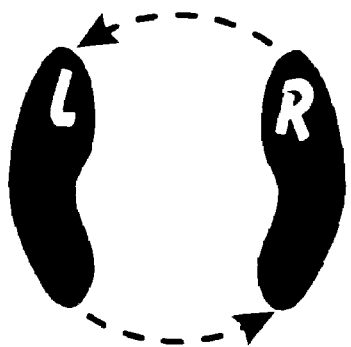
Figures 7, 8, 9:
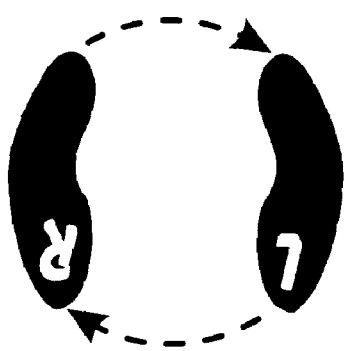
Figures 7, 8, 9, 10:
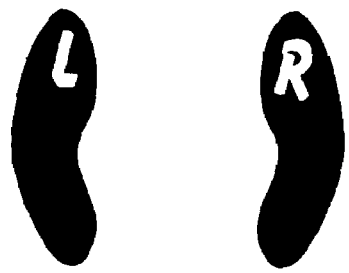
Figures 7, 8, 9, 10, 11:
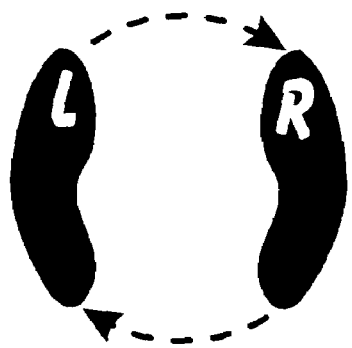
Figures 7, 8, 9, 10, 11, 12:
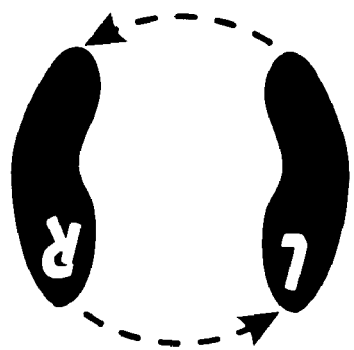
Figures 7, 8, 9, 10, 11, 12, 13:
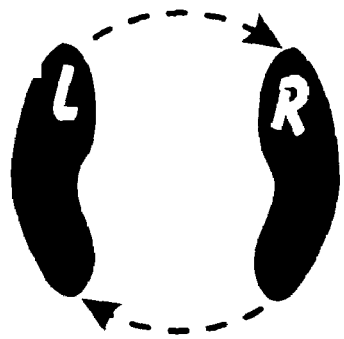
Figures 7, 8, 9, 10, 11, 12, 13, 14:
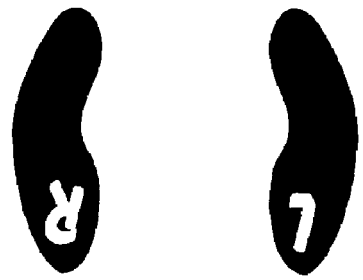
Figures 7, 8, 9, 10, 11, 12, 13, 14, 15:
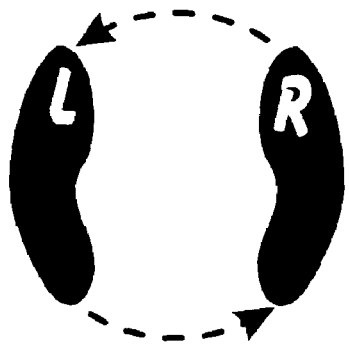
Figures 7, 8, 9, 10, 11, 12, 13, 14, 15, 16:
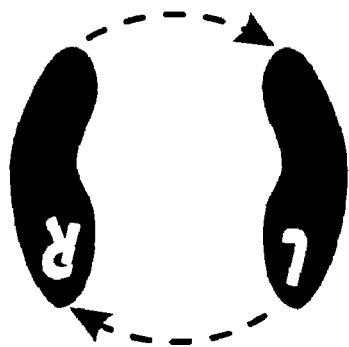
Figures 7, 8, 9, 10, 11, 12, 13, 14, 15, 16, 17:
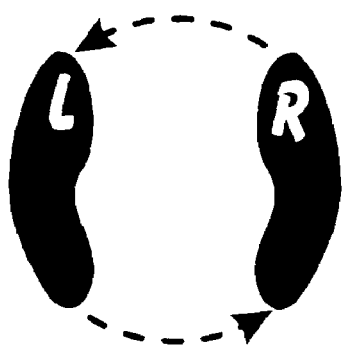
Figures 7, 8, 9, 10, 11, 12, 13, 14, 15, 16, 17, 18:
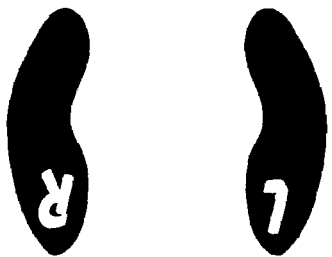
Figures 7, 8, 9, 10, 11, 12, 13, 14, 15, 16, 17, 18, 19:
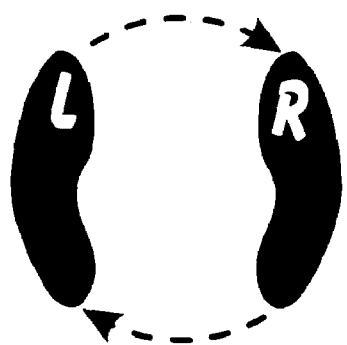
Figures 7, 8, 9, 10, 11, 12, 13, 14, 15, 16, 17, 18, 19, 20:
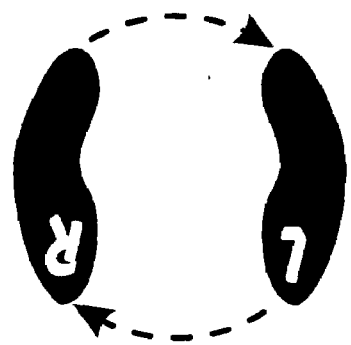
Figures 7, 8, 9, 10, 11, 12, 13, 14, 15, 16, 17, 18, 19, 20, 21:
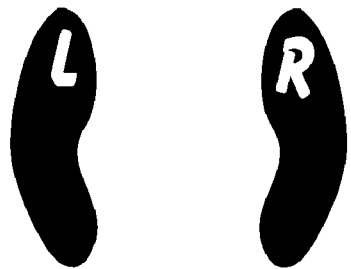
Figures 7, 8, 9, 10, 11, 12, 13, 14, 15, 16, 17, 18, 19, 20, 21, 22:
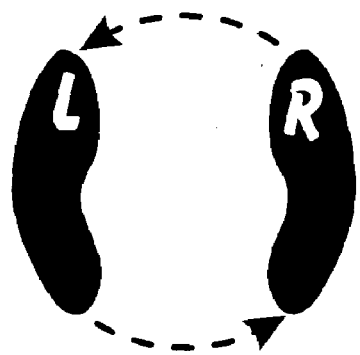
Figures 7, 8, 9, 10, 11, 12, 13, 14, 15, 16, 17, 18, 19, 20, 21, 22, 23:
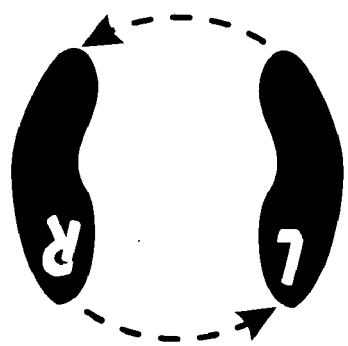
Figures 7, 8, 9, 10, 11, 12, 13, 14, 15, 16, 17, 18, 19, 20, 21, 22, 23, 24:
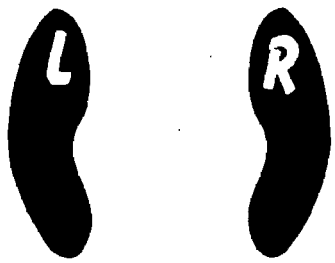
Figures 7, 8, 9, 10, 11, 12, 13, 14, 15, 16, 17, 18, 19, 20, 21, 22, 23, 24, 25:
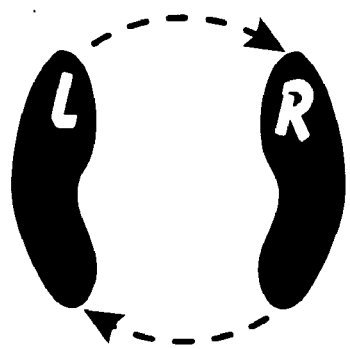
Figures 7, 8, 9, 10, 11, 12, 13, 14, 15, 16, 17, 18, 19, 20, 21, 22, 23, 24, 25, 26:
Figures 7, 8, 9, 10, 11, 12, 13, 14, 15, 16, 17, 18, 19, 20, 21, 22, 23, 24, 25, 26, 27, 28:
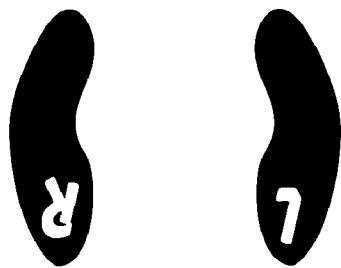
Figures 7, 8, 9, 10, 11, 12, 13, 14, 15, 16, 17, 18, 19, 20, 21, 22, 23, 24, 25, 26, 27, 28, 29:
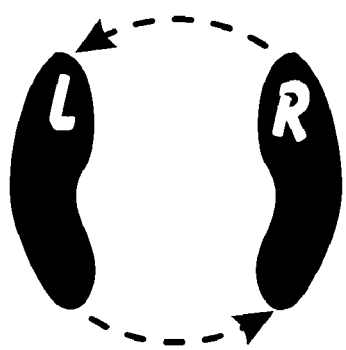
Figures 7, 8, 9, 10, 11, 12, 13, 14, 15, 16, 17, 18, 19, 20, 21, 22, 23, 24, 25, 26, 27, 28, 29, 30:
Figures 7, 8, 9, 10, 11, 12, 13, 14, 15, 16, 17, 18, 19, 20, 21, 22, 23, 24, 25, 26, 27, 28, 29, 30, 31:
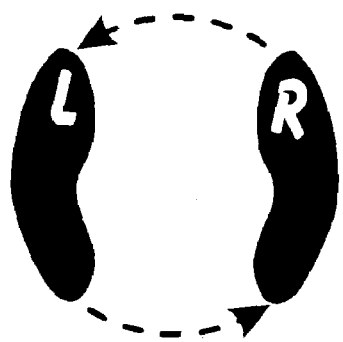
Figures 7, 8, 9, 10, 11, 12, 13, 14, 15, 16, 17, 18, 19, 20, 21, 22, 23, 24, 25, 26, 27, 28, 29, 30, 31, 32:
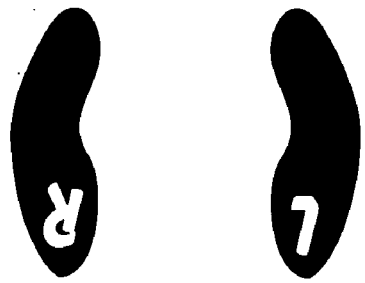
Figures 1, 8:
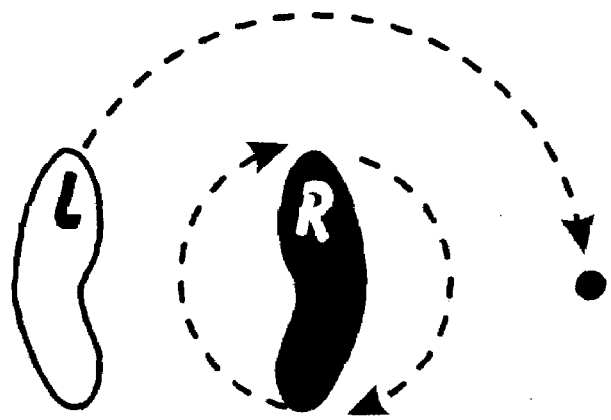
Figures 2, 8:
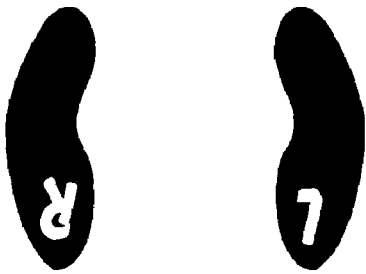
Figures 3, 8:
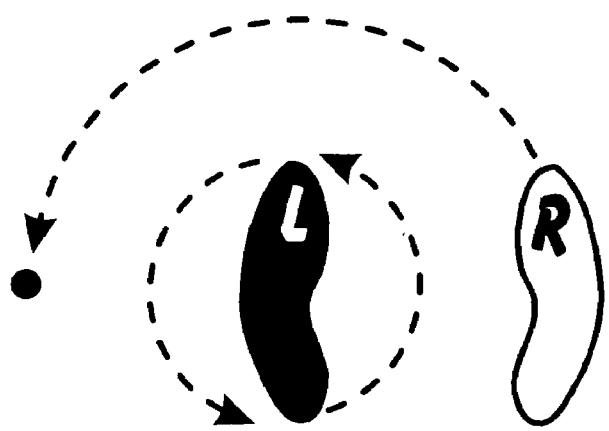
Figures 4, 8:
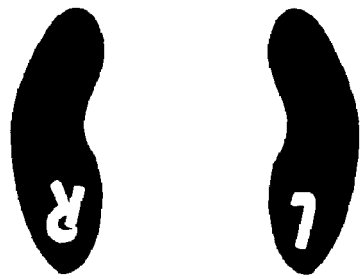
Figures 5, 8:
Figures 6, 8:
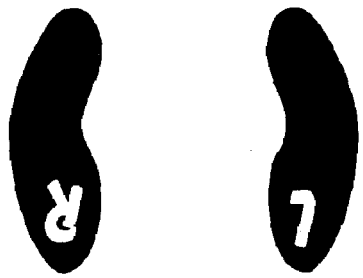
Figures 7, 8:
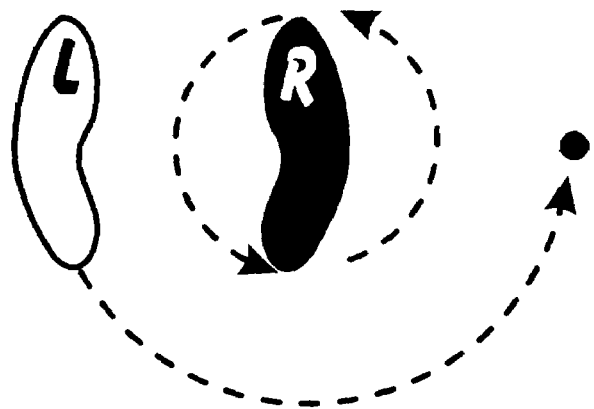
Figure 8:
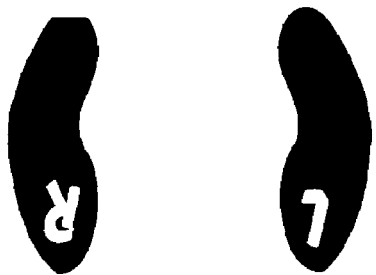
Figures 8, 9, 10:
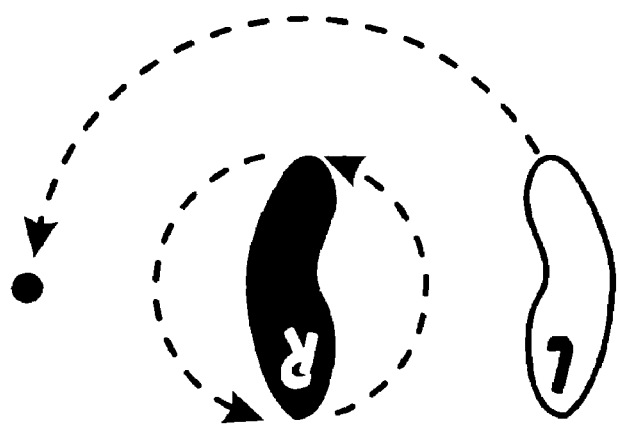
Figures 8, 9, 10, 11:
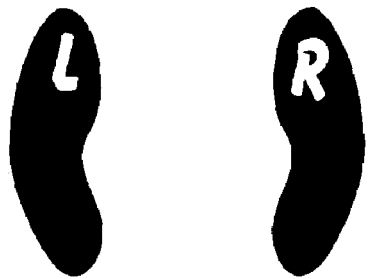
Figures 8, 9, 10, 11, 12, 13:
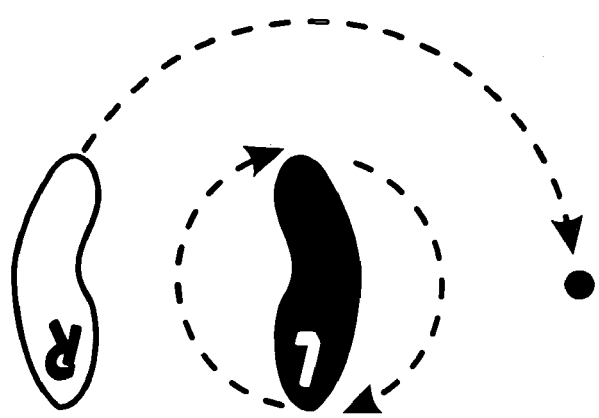
Figures 8, 9, 10, 11, 12, 13, 14:
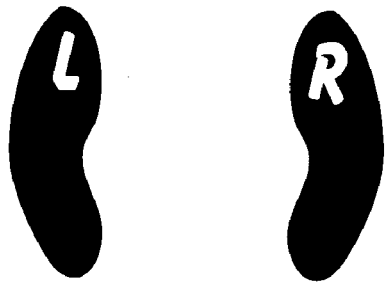
Figures 8, 9, 10, 11, 12, 13, 14, 15, 16:
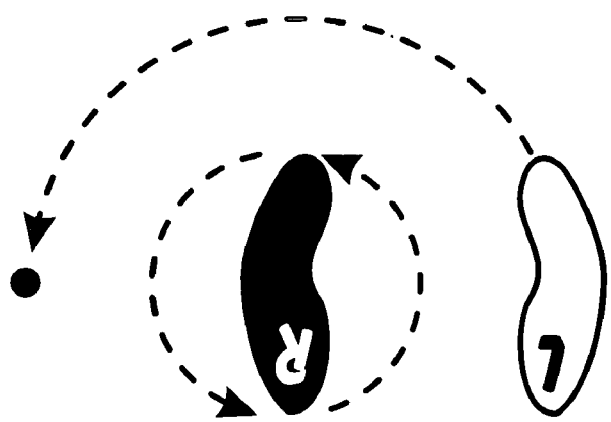
Figures 8, 9, 10, 11, 12, 13, 14, 15, 16, 17:
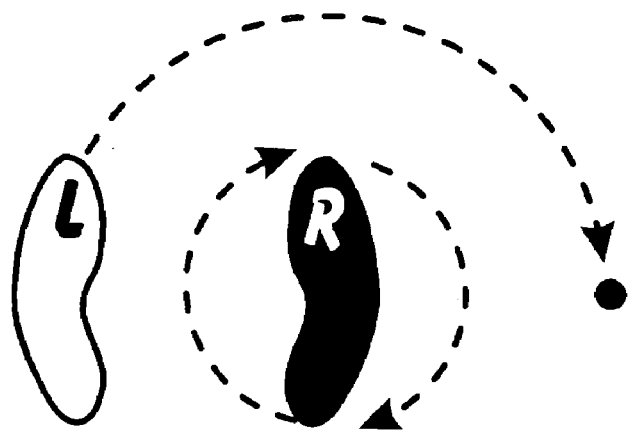
Figures 8, 9, 10, 11, 12, 13, 14, 15, 16, 17, 18:
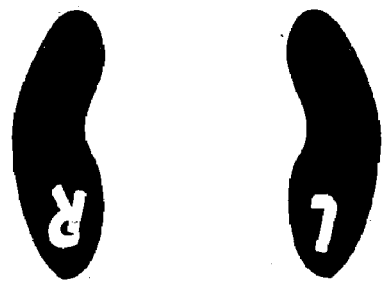
Figures 8, 9, 10, 11, 12, 13, 14, 15, 16, 17, 18, 19, 20:
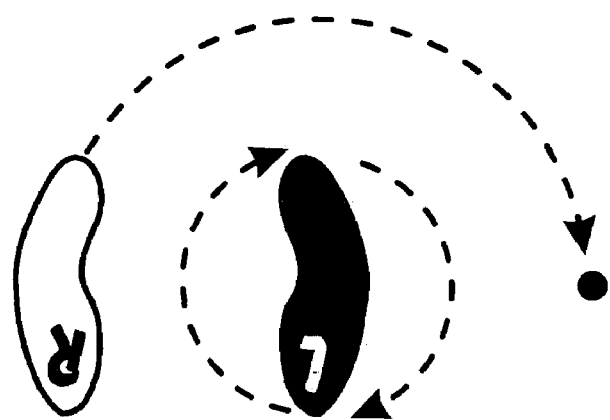
Figures 8, 9, 10, 11, 12, 13, 14, 15, 16, 17, 18, 19, 20, 21:
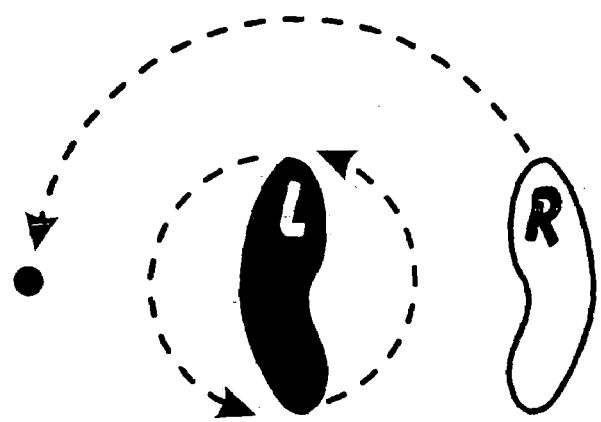
Figures 8, 9, 10, 11, 12, 13, 14, 15, 16, 17, 18, 19, 20, 21, 22:
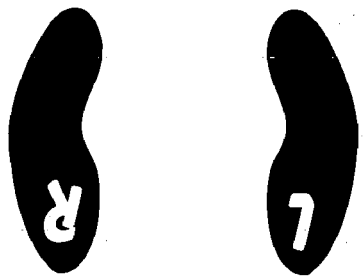
Figures 8, 9, 10, 11, 12, 13, 14, 15, 16, 17, 18, 19, 20, 21, 22, 23, 24:
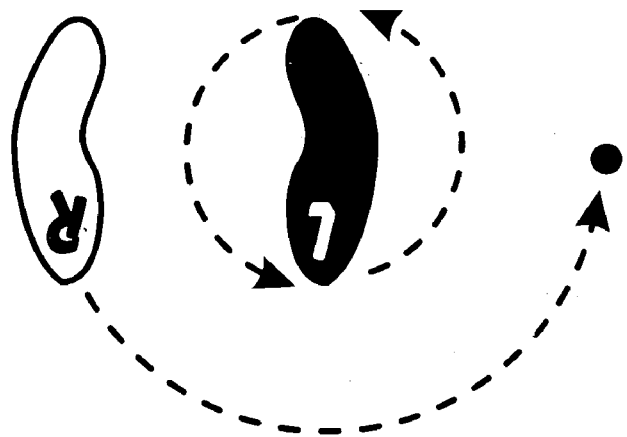
Figures 8, 9, 10, 11, 12, 13, 14, 15, 16, 17, 18, 19, 20, 21, 22, 23, 24, 25:
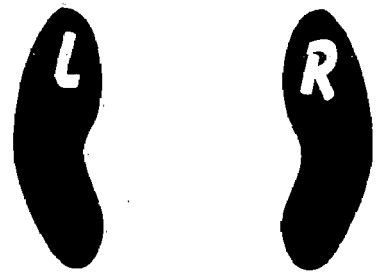
Figures 8, 9, 10, 11, 12, 13, 14, 15, 16, 17, 18, 19, 20, 21, 22, 23, 24, 25, 26, 27:
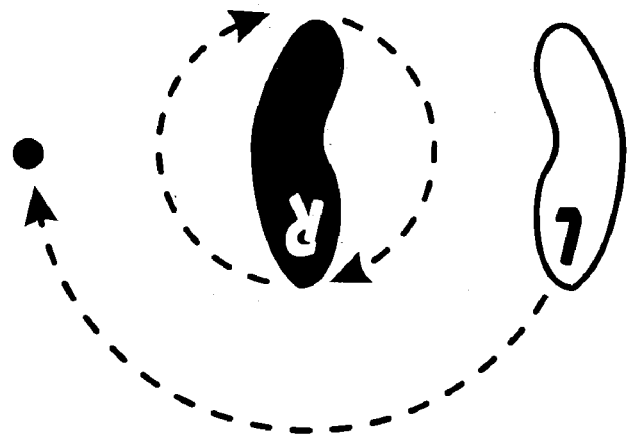
Figures 8, 9, 10, 11, 12, 13, 14, 15, 16, 17, 18, 19, 20, 21, 22, 23, 24, 25, 26, 27, 28:
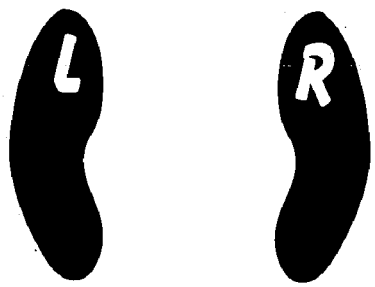
Figures 8, 9, 10, 11, 12, 13, 14, 15, 16, 17, 18, 19, 20, 21, 22, 23, 24, 25, 26, 27, 28, 29, 30:
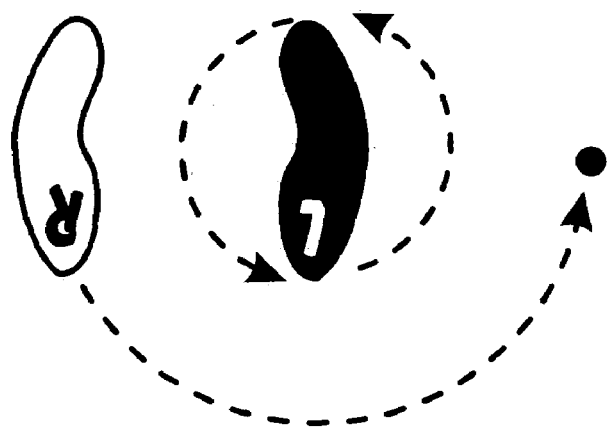
Figures 8, 9, 10, 11, 12, 13, 14, 15, 16, 17, 18, 19, 20, 21, 22, 23, 24, 25, 26, 27, 28, 29, 30, 31:
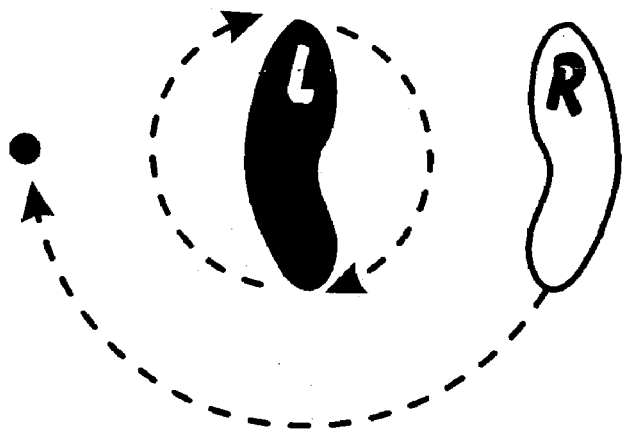
Figures 8, 9, 10, 11, 12, 13, 14, 15, 16, 17, 18, 19, 20, 21, 22, 23, 24, 25, 26, 27, 28, 29, 30, 31, 32:
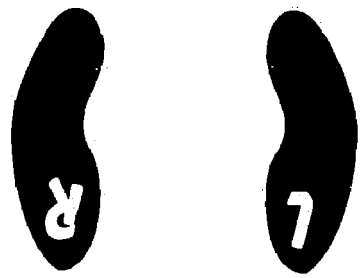
Figures 8, 9, 10, 11, 12, 13, 14, 15, 16, 17, 18, 19, 20, 21, 22, 23, 24, 25, 26, 27, 28, 29, 30, 31, 32, 33, 34:
Figures 8, 9, 10, 11, 12, 13, 14, 15, 16, 17, 18, 19, 20, 21, 22, 23, 24, 25, 26, 27, 28, 29, 30, 31, 32, 33, 34, 35:
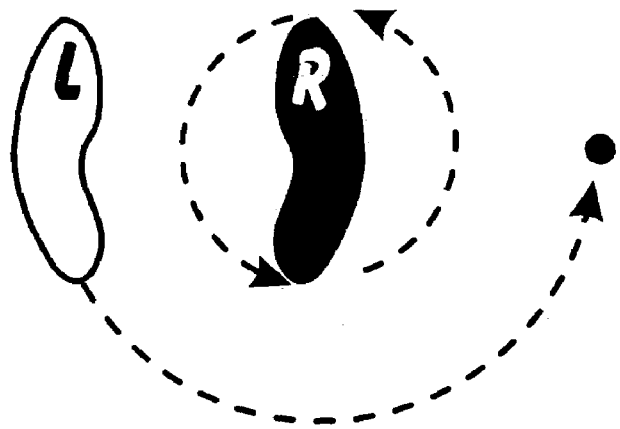
Figures 8, 9, 10, 11, 12, 13, 14, 15, 16, 17, 18, 19, 20, 21, 22, 23, 24, 25, 26, 27, 28, 29, 30, 31, 32, 33, 34, 35, 36:
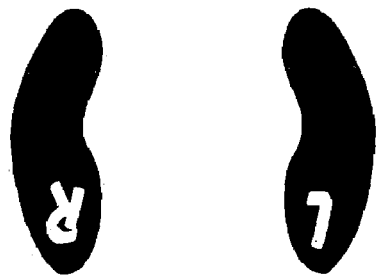
Figures 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38:
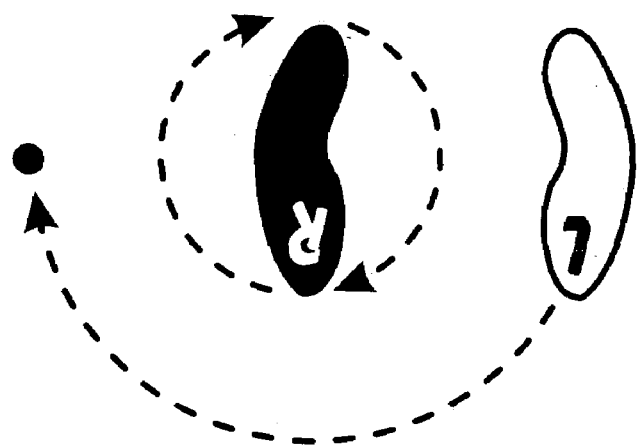
Figures 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39:
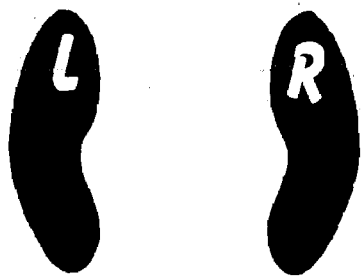
Figures 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41:
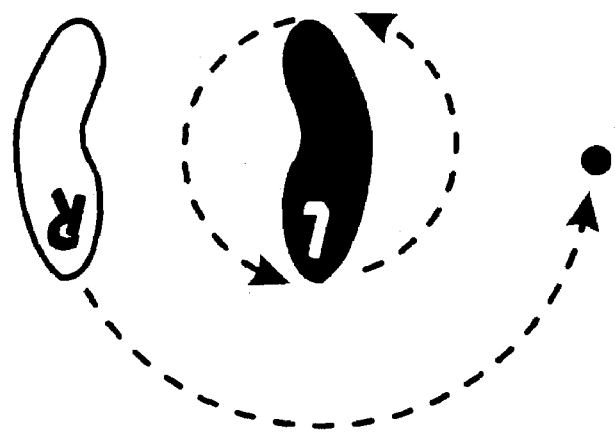
Figures 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42:
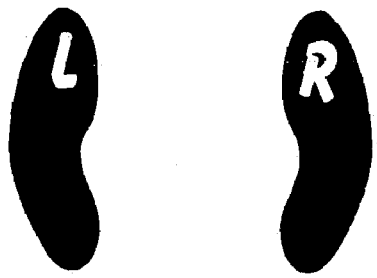
Figures 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44:
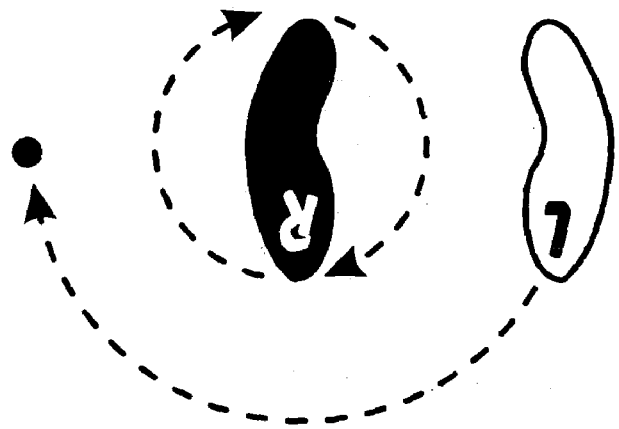
Figures 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45:
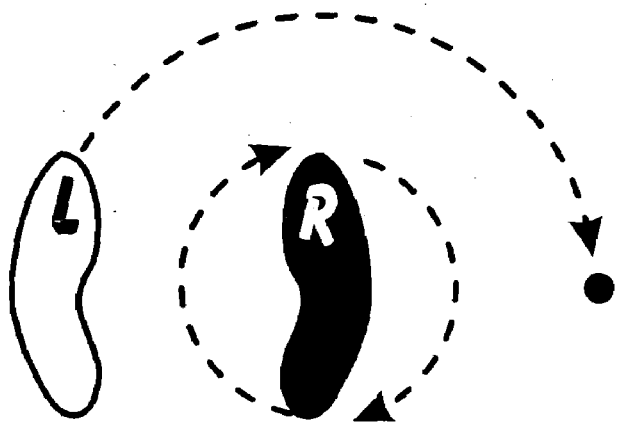
Figures 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46:
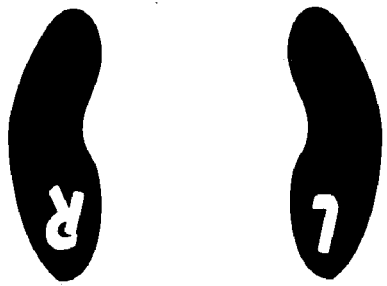
Figures 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48:
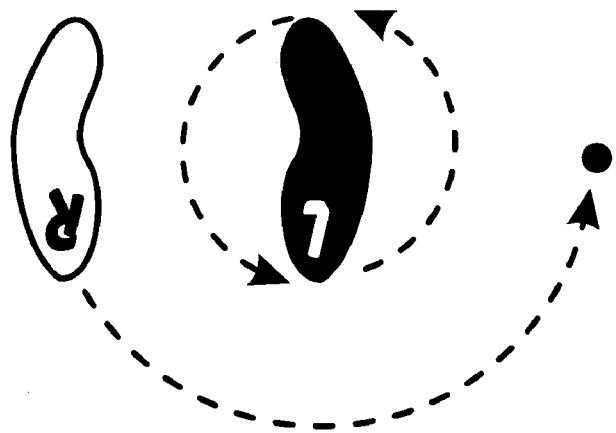
Figures 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49:
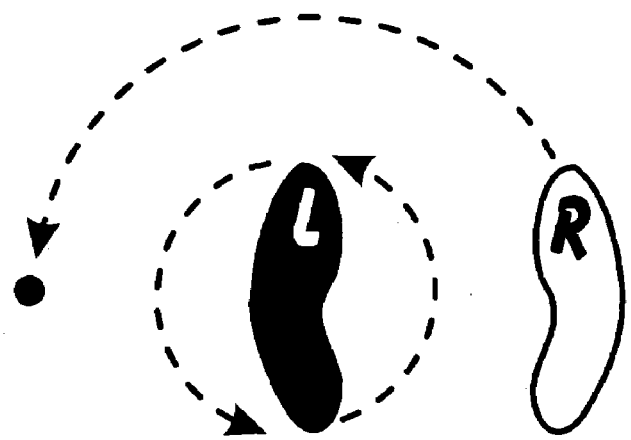
Figures 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50:
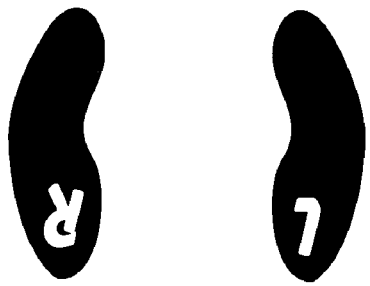
Figures 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52:
Figure 9:
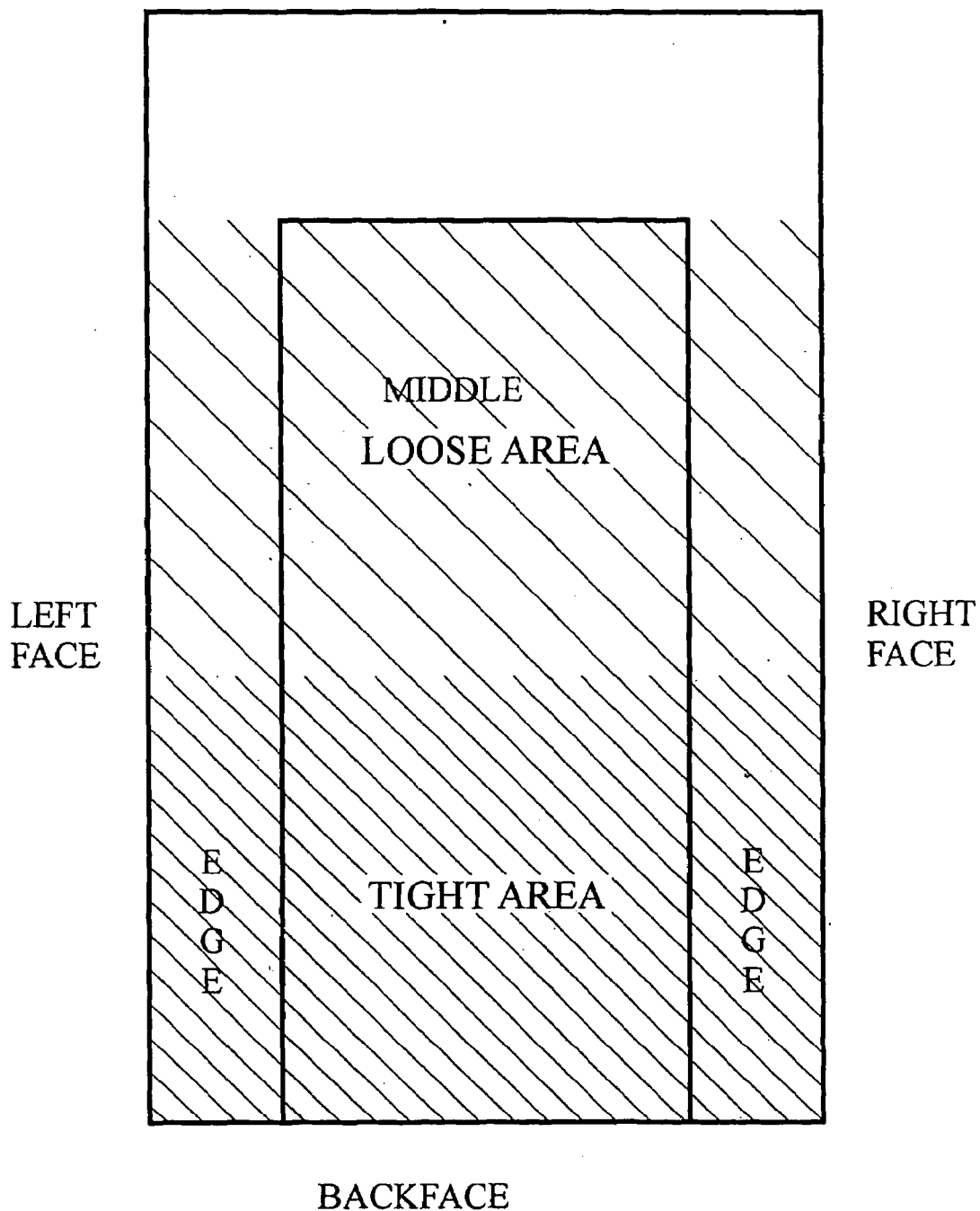

In order to learn the basics of KAPPEL'S FOOTWORK, a few conventions and concepts will be needed:

BEARINGS (directions and locations) will not only enable the user to navigate the exercise area with relative ease, but they will help the user find his or her way should they get lost or disoriented during executions of the format.

In KAPPEL'S FOOTWORK, the treadmill has 4 FACES, or 4 main directions that you can face or turn to, and they are: FRONT FACE, BACK FACE, RIGHT FACE, and LEFT FACE. (See DIAGRAM 1) Since in life we naturally spend more time walking, jogging, or running in a forward or FRONT FACE direction, this will be the designated direction in which to start. This will also be the direction to turn to in those instances, should they occur, when you get uncomfortable with whatever MANEUVERS you happen to be executing at the time.

The MIDDLE, or the moving belt of the treadmill, is the first of the 3 MAIN LOCATIONS in KAPPEL'S FOOTWORK. (See DIAGRAM 1) The MIDDLE (moving belt of the treadmill) will be constantly in motion when the user is using the method The EDGES, or the long narrow fixed platforms along the left and right side of the MIDDLE, make up the second of the 3 MAIN LOCATIONS in KAPPEL'S FOOTWORK. (See DIAGRAM 1).

The EDGES are further subdivided into 6 alternate locations, or positions called CATCH POINTS or CPs. In KAPPEL'S FOOTWORK, CPs are destinations that you are always either leaving the MIDDLE and going to, or returning from. These 6 CPs are: R1, R2, L1, L2, F-stra, and B-stra.

The following is an explanation of the body positions, which constitute each of these 6 CPs. Referring to DIAGRAMS 2a–2f:

R1—Right In—Standing on the right EDGE with your weight on the balls of your feet, knees and toes pointing in toward the MIDDLE, and heels hanging off the EDGE, is CP-R1.

R2—Right Out—Standing on the right EDGE with your weight on the balls of your feet, knees and toes pointing out away from the MIDDLE, and heels hanging over, but not touching the MIDDLE, is CP-R2.

L1—Left In—Standing on the left EDGE with your weight on the balls of your feet, knees and toes pointing in toward the MIDDLE, and heels hanging off the EDGE, is CP-L1.

L2—Left Out—Standing on the left EDGE with your weight on the balls of your feet, knees and toes pointing out away from the MIDDLE, and heels hanging over, but not touching the MIDDLE, is CP-L2.

F-stra—Forward Straddle—Standing on the EDGES with your weight oil the balls of your feet, straddling the MIDDLE with one foot on each EDGE, knees, toes and body pointing forward in FRONT FACE, and heels up off the EDGES, is CP-F-stra.

B-stra—Backward Straddle—Standing on the EDGES with your weight on the balls of your feet, straddling the MIDDLE with one foot on each EDGE, knees, toes and body pointing backward in BACK FACE, and heels up off the EDGES, is CP-B-stra.

The FLOOR immediately surrounding the treadmill on 4 sides (right, left, front and back) is the last of the 3 MAIN LOCATIONS in KAPPEL'S FOOTWORK. (See DIAGRAM 1).

The FLOOR is subdivided into 16 additional CPs, and they are: SR1, SR2, SRF, SRB, SL1, SL2, SLF, SLB, B1, B2, BR, BL, F1, F2, FR and FL.

The following is an explanation of the body positions which constitute each of the remaining 16 CPs. Referring to DIAGRAMS 3a–3l:

SR1—Side Right In—Standing on the FLOOR to the right side of the treadmill with your weight on the balls of your feet, knees and toes pointing in toward the MIDDLE, and heels up off the FLOOR, is CP-SR1.

SR2—Side Right Out—Standing on the FLOOR to the right side of the treadmill with your weight on the balls of your feet, knees and toes pointing out away from the MIDDLE, and heels up off the FLOOR, is CP-SR2.

SRF—Side Right Forward—Standing on the FLOOR to the right side of the treadmill with your weight on the balls of your feet, with knees, toes and body pointing forward in FRONT FACE, and heels up off the FLOOR, is CP-SRF.

SRB—Side Right Backward—Standing on the FLOOR to the right side of the treadmill with your weight on the balls of your feet, with knees, toes and body pointing backward in BACK FACE, and heels up off the FLOOR, is CP-SRB.

SL1—Side Left In—Standing on the FLOOR to the left side of the treadmill with your weight on the balls of your feet, knees and toes pointing in toward the MIDDLE, and heels up off the FLOOR, is CP-SL1.

SL2—Side Left Out—Standing on the FLOOR to the left side of the treadmill with your weight on the balls of your feet, knees and toes pointing out away from the MIDDLE, and heels up off the FLOOR, is CP-SL2.

SLF—Side Left Forward—Standing on the FLOOR to the left side of the treadmill with your weight on the balls of your feet, with knees, toes and body pointing forward in FRONT FACE, and heels up off the FLOOR, is CP-SLF.

SLB—Side Left Backward—Standing on the FLOOR to the left side of the treadmill with your weight on the balls of your feet, with knees, toes and body pointing backward in BACK FACE, and heels up off the FLOOR, is CP-SLB.

B1—Back In—Standing on the FLOOR to the back of the treadmill with your weight on the balls of your feet, knees and toes pointing forward toward the MIDDLE in FRONT FACE, and heels up off the FLOOR, is CP-B1.

B2—Back Out—Standing on the FLOOR to the back of the treadmill with your weight on the balls of your feet, knees and toes pointing backward away from the MIDDLE in BACK FACE, and heels up off the FLOOR, is CP-B2.

BR—Back Right—Standing on the FLOOR to the back of the treadmill with your weight on the balls of your feet, knees and toes pointing right in RIGHT FACE, and heels up off the FLOOR is CP-BR.

BL—Back Left—Standing on the FLOOR to the back of the treadmill with your weight on the balls of your feet, knees and toes pointing left in LEFT FACE, and heels up off the FLOOR is CP-BL.

F1—Front In—Standing on the FLOOR to the front of the treadmill with your weight on the balls of your feet, knees and toes pointing backward toward the MIDDLE in BACK FACE, and heels up off the FLOOR, is CP-F1.

F2—Front Out—Standing on the FLOOR to the front of the treadmill with your weight on the balls of your feet, knees and toes pointing forward away from the MIDDLE in FRONT FACE, and heels up off the FLOOR, is CP-F2.

FR—Front Right—Standing on the FLOOR to the front of the treadmill with your weight on the balls of your feet, knees and toes pointing right in RIGHT FACE, and heels up off the FLOOR is CP-FR.

FL—Front Left—Standing on the FLOOR to the front of the treadmill with your weight on the balls of your feet, knees and toes pointing left in LEFT FACE, and heels up off the FLOOR is CP-FL.

Although CPs F1, F2, FR, and FL are listed above, they are not used in the current embodiment of the invention since there are currently no treadmills available on the market that facilitate access to these alternate locations. In the preferred embodiment, a treadmill that is accessible all around will be used.

We will now discuss the application of this format. PROPER FOOT PLACEMENTS or P.F.Ps will ensure the user be comfortable on his feet so that he can safely execute the various MANEUVERS necessary to navigate the treadmill in KAPPEL'S FOOTWORK.

If you have ever seen the bottom of a track sprinter's shoes, you would only find spikes on the front third of them. The reason for this design is that it has been proven that the traction and spring of the feet are strongest in that area. It also happens to be the area where balance and quickness are more easily found. The heels, however, are best utilized for braking and grounding you in one spot, something that is rarely done in KAPPEL'S FOOTWORK.

If one rule were to be singled out as the most important regarding carrying your weight on your feet in this format, it would be: Always stay up on the balls of your feet where your body will feel its lightest, and your balance and control are more attainable.

Doing the following simple exercises on the floor will introduce you to the concepts YOUR 1 AND YOUR 2, TOUCH TIME or the T, and BEATS, and is the last prerequisite to actually executing the upcoming MANEUVERS. The user should make sure to stay up on the balls of his or her feet, and off of his or her heels during all of these exercises.

EXERCISE 1—(Diagrams 4a–4g) Stepping Forward and Backward—From a standing position up on the balls of the feet take 2 walking steps forward. Now take 2 walking steps backward. Repeat the complete action continuously 10 times, while counting 1, 2 out loud on every first and second step, respectively.

Since this is basically a timing exercise, it doesn't matter which foot you start with as long as you alternate them with each step. When stepping forward or backward 2 steps, your location changes once upon landing YOUR 1 (the first foot down), and twice upon landing YOUR 2 (the second foot down). It can also be said that the contact made by YOUR 2 is at a different location from the contact made by YOUR 1.

EXERCISE 2—(Diagrams 4h–4p) Stepping Sideways—From a standing position up on the balls of your feet take 2 steps to one side. Now take 2 steps to the opposite side. Repeat the complete action continuously 10 times, while counting 1, 2 out loud on every first and second step, respectively.

It doesn't matter which side you step to first, as long as you alternate sides after the second step sideways. When stepping sideways 2 steps, your location only changes once upon landing either or both YOUR 1 and YOUR 2. It can also be said that the contact made by YOUR 2 is at the same location as the contact made by YOUR 1.

EXERCISE 3—(Diagrams 4q–4u) Hopping Forward and Backward—From a standing position up on the balls of your feet take 2 hops forward. Now take 2 hops backward. Repeat the complete action continuously 10 times, while counting 1, 2 out loud on every first and second hop, respectively.

Try to maintain a shoulder width distance between your feet as they both leave and land on the floor together. When hopping forward or backwards 2 hops, your location changes once upon landing the first hop, and twice upon landing the second. It can also be said that the contact made on the second hop is at a different location from the contact made on the first hop.

EXERCISE 4—(Diagrams 4v–4z) Hopping Sideways—From a standing position up on the balls of your feet take 2 hops to one side. Now take 2 hops to the opposite side. Repeat the complete action continuously 10 times, while counting 1, 2 out loud on every first and second hop, respectively.

A shoulder width distance should be maintained between your feet as they both leave and land on the floor together. When hopping sideways 2 hops, your location changes once upon landing the first hop, and twice upon landing the second. It can also be said that the contact made on the second hop is at a different location from the contact made on the first hop.

In KAPPEL'S FOOTWORK, the total number of landings you make on, or the total number of times you make contact with, or touch any one surface of the 3 MAIN LOCATIONS (The MIDDLE, the EDGES or the FLOOR), before moving on to another surface, is referred to as the TOUCH TIME (T), and is measured in units called BEATS. The T, and BEATS play an important role in executing the 5 FORMS OF NAVIGATING THE TREADMILL with KAPPEL'S FOOTWORK, because they include limitations on the time allowed (T-Max in BEATS) in either the FACE you are maneuvering the MIDDLE in, or the on the CPs upon which you are landing on (to be discussed below).

In the four exercises you have just completed, you experimented with stepping and hopping forward, backward and sideways, two at a time in each direction. The following breakdown of those exercises will help you easily identify the T and BEATS in each. Refer to DIAGRAM 4.

In EXERCISE 1, you took 2 walking steps forward and 2 walking steps backward to complete the action. Your location changed twice after landing YOUR 1 and YOUR 2 stepping forward, and twice after landing YOUR 1 and YOUR 2 stepping backward. The 4 landings, contacts or touches made on 4 separate locations make the T on that surface 4 BEATS. Even if the 4 touches were on the same location as a result of stepping in place (which is done often in order to maintain rhythm and timing during MANEUVERS), the T would be 4 BEATS.

In EXERCISE 2, you took 2 steps sideways in one direction and 2 steps sideways in the opposite direction to complete the action. Your location only changed once after the first landing of YOUR 1 and YOUR 2 stepping sideways one way, and once after the first landing of YOUR 1 and YOUR 2 stepping sideways the other way. The 4 landings, contacts or touches made on only 2 separate locations make the T on that surface 2 BEATS. If the 4 touches were on the same location as a result of stepping in place, however, the T would still be 4 BEATS.

In EXERCISE 3, you took 2 hops forward and 2 hops backward to complete the action. Your location changed twice after landing your second hop forward, and twice after landing your second hop backward. The 4 landings, contacts or touches made on 4 separate locations make the T on that surface 4 BEATS. If the 4 touches were on the same location as a result of hopping in place, the T would be 4 BEATS.

In EXERCISE 4, you took 2 hops sideways in one direction and 2 hops sideways in the opposite direction to complete the action. Your location changed twice after landing your second hop sideways in one direction, and twice after landing your second hop sideways in the other direction. The 4 landings, contacts or touches made on 4 separate locations make the T on that surface 4 BEATS. If the 4 touches were on the same location as a result of hopping in place, the T would be 4 BEATS.

The last things to mention before you finally get on the treadmill to apply the method of the invention are the functions of YOUR 1 and YOUR 2, as they pertain to MANEUVERS.

The functions of YOUR 1 are: To get and keep your body in motion by being the first foot down, securing a location upon its landing; to reaffirm your current location by being the first foot to step in place; and to change the FACE of your expression of this format by turning it so that it lands pointing in the desired FACE.

The functions of YOUR 2 are: To bring more balance and control, upon its landing, to a location secured by YOUR 1; to provide additional power to the next step of YOUR 1 with an accelerated push off of it; and to push your body through turns and pivots upon landing YOUR 1.

In order to practice the method, IT IS VERY IMPORTANT THAT THE TREADMILL MODEL YOU USE FOR THIS FORMAT IS FREE OF GUARDRAILS THAT EXTEND ABOVE THE EDGES MORE THAN 30% OF THEM, FRONT TO BACK FROM THE CONTROL PANEL; OR GUARDRAILS THAT DROP DOWN INTO THE EDGES WHICH WOULD HINDER THE FREE MOVEMENT OF YOUR FEET WHILE ON THEM; AND THERE SHOULD BE ABSOLUTELY NO SPACE BETWEEN THE MOVING BELT AND THE EDGES WHERE YOUR FEET COULD ACCIDENTLY TRIP OR GET CAUGHT UNDER IT!!!

FURTHERMORE, BE CERTAIN THAT WHEN EXECUTING THE MANEUVERS WHICH REQUIRE FLOOR SPACE AROUND THE TREADMILL ON 3 SIDES, THAT: THE AREA PROVIDES ADEQUATE ROOM FOR SAFE EXECUTIONS; AND THERE ARE NO PEOPLE, OBJECTS, OR OBSTACLES OF ANY KIND (SUCH AS ADJACENT TREADMILLS WHICH WOULD BE FOUND IN THE CURRENT LAYOUT OF MOST FITNESS CLUBS) WHICH COULD POSE A THREAT OF INJURY TO YOU, OR TO OTHERS AROUND YOU UPON ENTERING INTO THAT SPACE. IF THESE POTENTIAL HAZZARDS DO EXIST, THEN LIMIT YOUR PRACTICE OF THIS FORMAT TO THE MANEUVERS EXCLUSIVE TO THE MIDDLE AND THE EDGES ONLY!!!

In KAPPEL'S FOOTWORK, MANEUVERS are the movements or actions of the body used to navigate the treadmill. They change the FACE of your expression of this format (turning on the MIDDLE, the EDGES and the FLOOR); they get you from one location to another (like the MIDDLE to any of the 22 CPs, or CP to CP) and back; and they keep you in rhythm while staying in one location.

We are now ready to start practicing the method on a treadmill! Follow the procedures you would normally use to get on and start walking on a treadmill; then, for the purpose of safely learning all the MANEUVERS, reduce the speed to the lowest possible setting for walking. Before you know it, all the locations and MANEUVERS will be automatic.

As a rule of thumb, the foot closest to the FACE (direction) to which you are moving or turning, moves first. It is also a wise idea to turn the head to the FACE to which you are moving or turning, since the body tends to follow the head. Lastly, but most importantly, remember that TURNING ON THE MIDDLE (the moving belt of the treadmill) in KAPPEL'S FOOTWORK only changes the FACE, or brings you back to where you were. It does not change your location! Therefore, since you are not on a fixed surface, it is imperative that you keep your feet alive with constant movement.

The following are the names, explanations, and executions of the MANEUVERS that will turn you to all of the FACES, starting from FRONT FACE, while on the MIDDLE. Read through all 8 MANEUVERS before attempting to execute them and then repeat each one at least 10 times before proceeding to the next. Refer to DIAGRAMS 5*a*–5*r* for clarity.

RIGHT to RIGHT FACE—A ¼ right turn from FRONT FACE to RIGHT FACE is executed by turning YOUR 1 (right foot), so that it lands pointing in RIGHT FACE, followed by YOUR 2 (left foot) also landing in RIGHT FACE. Remember to keep your feet moving after completing your turns on the MIDDLE!

RIGHT to BACK FACE—A ½ right turn from FRONT FACE to BACK FACE is executed by turning RIGHT to RIGHT FACE first, and continued by turning YOUR 1 (right foot) so that it lands pointing in BACK FACE, followed by YOUR 2 (left foot) also landing in BACK FACE.

RIGHT to LEFT FACE—A ¾ right turn from FRONT FACE to LEFT FACE is executed by turning RIGHT to BACK FACE first, and continued by turning YOUR 1 (right foot) so that it lands pointing in LEFT FACE, followed by YOUR 2 (left foot) also landing in LEFT FACE.

RIGHT to FRONT FACE also called 1RIGHT—One full right turn from FRONT FACE to FRONT FACE is executed by turning RIGHT to LEFT FACE first, and continued by turning YOUR 1 (right foot) so that it lands pointing in FRONT FACE, followed by YOUR 2 (left foot) also landing in FRONT FACE.

LEFT to LEFT FACE—A ¼ left turn from FRONT FACE to LEFT FACE is executed by turning YOUR 1 (left foot), so that it lands pointing in LEFT FACE, followed by YOUR 2 (right foot) also landing in LEFT FACE.

LEFT to BACK FACE—A ½ left turn from FRONT FACE to BACK FACE is executed by turning LEFT to LEFT FACE first, and continued by turning YOUR 1 (left foot) so that it lands pointing in BACK FACE, followed by YOUR 2 (right foot) also landing in BACK FACE.

LEFT to RIGHT FACE—A ¾ left turn from FRONT FACE to RIGHT FACE is executed by turning LEFT to BACK FACE first, and continued by turning YOUR 1 (left foot) so that it lands pointing in RIGHT FACE, followed by YOUR 2 (right foot) also landing in RIGHT FACE.

LEFT to FRONT FACE also called 1LEFT—One full left turn from FRONT FACE to FRONT FACE is executed by turning LEFT to RIGHT FACE first, and continued by turning YOUR 1 (left foot) so that it lands pointing in FRONT FACE, followed by YOUR 2 (right foot) also landing in FRONT FACE.

Although the above-disclosed MANEUVERS are based on a FRONT FACE start position, they are applicable to all turns made on the MIDDLE regardless of the FACE from which you start. For example, LEFT to LEFT FACE could also be referred to:

One full left turn from LEFT FACE to LEFT FACE, also called 1LEFT, which is executed by turning LEFT to FRONT FACE first, and continued by turning YOUR 1 (left foot) so that it lands pointing in LEFT FACE, followed by YOUR 2 (right foot) also landing in LEFT FACE;

A ¾ left turn from BACK FACE to LEFT FACE which is executed by turning LEFT to FRONT FACE first, and continued by turning YOUR 1 (left foot) so that it lands pointing in LEFT FACE, followed by YOUR 2 (right foot) also landing in LEFT FACE;

A ½ left turn from RIGHT FACE to LEFT FACE which is executed by turning LEFT to FRONT FACE first, and continued by turning YOUR 1 (left foot) so that it lands pointing in LEFT FACE, followed by YOUR 2 (right foot) also landing in LEFT FACE.

As long as you remember to breathe, relax, and establish YOUR 1 and YOUR 2 before TURNING ON THE MIDDLE or CHANGING FACES, you will probably execute these MANEUVERS quite easily.

As a further example, execute the following series of MANEUVERS: RIGHT FACE, execute 2LEFT, RIGHT to BACK FACE, LEFT to LEFT FACE, 1RIGHT to RIGHT FACE. The detailed execution is as follows (Refer to DIAGRAMS 5.1—SERIES OF MANEUVERS for clarity):

2LEFT—2 full left turns from RIGHT FACE to RIGHT FACE are executed by leading with YOUR 1 (left foot) and following with YOUR 2 (right foot) counterclockwise twice around on the MIDDLE, from FACE to FACE, returning to RIGHT FACE; then executing.

RIGHT to BACK FACE—A ¼ right turn from RIGHT FACE to BACK FACE is executed by turning YOUR 1 (right foot) so that it lands pointing in BACK FACE, followed by YOUR 2 (left foot) also landing in BACK FACE; then executing LEFT to LEFT FACE—A ¾ left turn from BACK FACE to LEFT FACE is executed by leading with YOUR 1 (left foot) and following with YOUR 2 (right foot) counterclockwise 3 FACES (passing RIGHT FACE and FRONT FACE) to LEFT FACE; then executing 1RIGHT to RIGHT FACE—A 1½ right turn from LEFT FACE to RIGHT FACE is executed by leading with YOUR 1 (right foot) and following with YOUR 2 (left foot) counterclockwise once around on the MIDDLE, from FACE to FACE, and continuing past LEFT FACE, 2 FACES to RIGHT FACE.

It is helpful to practice these MANEUVERS numerous times until the user is comfortable and proficient at it.

I previously explained the 22 CPs as the combined subdivisions of the EDGES, and the FLOOR that you are always either leaving the MIDDLE and going to, or returning from. For the purpose of physically getting around, however, CPs are no longer simply locations differentiated by the body positions that constitute them, they can also be MANEUVERS.

When executing a CP (as a MANEUVER), the complete action starts and ends on the MIDDLE, with a landing on the same CP (as a location) in between. For example: An R1 would be executed by stepping or hopping from the MIDDLE to R1, then immediately stepping or hopping from R1 back to the MIDDLE.

A series of MANEUVERS consisting of multiple CPs of 2 or more are called CATCH POINT PATTERNS, or CP²s; they also happen to be the basis for POINT CATCHING and BOLTING (two of the 5 FORMS OF NAVIGATING THE TREADMILL WITH KAPPEL'S FOOTWORK), which will be discussed below. For example: An R1, L1, SLB would be executed by stepping or hopping from the MIDDLE to R1, then from R1 back to the MIDDLE; then stepping or hopping from the MIDDLE to L1, then from L1 back to the MIDDLE; and stepping or hopping from the MIDDLE to SLB, then from SLB back to the MIDDLE.

Keep in mind that you will now be stepping or hopping from the MIDDLE, a moving surface, to the EDGES and the FLOOR, fixed surfaces, which may leave you feeling quite unstable at first; eventually this very sensation is what you will thrive on! Try to maintain the foot speed established on the MIDDLE as you step or hop to a CP, and back to the MIDDLE, to ensure a good FLOW as you navigate the treadmill with KAPPEL'S FOOTWORK.

The following are the names, explanations, and executions of the 22 CPs (as MANEUVERS) that will get you to and from all 22 CPs (as locations), starting from FRONT FACE on the MIDDLE. (CPs F1, F2, FR and FL cannot be safely executed on any of the currently available treadmills, until one is designed to accommodate them) Read through all 22 MANEUVERS before attempting to execute them and then repeat each one at least 10 times before proceeding to the next. Remember to talk yourself through them. Refer to DIAGRAM 6 for clarity:

R1—Stepping from the MIDDLE to R1 then back to the MIDDLE is executed by turning YOUR 1 (right foot) so that it lands on the right EDGE pointing in toward the MIDDLE, followed by YOUR 2 (left foot) landing shoulder width from YOUR 1 in the same way, with your weight on the balls of your feet, and heels hanging off the EDGE; then returning to the MIDDLE by turning YOUR 1 (now the left foot because it secures a new location) so that it lands on the MIDDLE pointing in FRONT FACE, followed by YOUR 2 (now the right foot) to complete the MANEUVER. Hopping through this MANEUVER is done by moving both feet at the same time, which results in a much quicker execution than stepping does.

R2—Stepping from the MIDDLE to R2 then back to the MIDDLE is executed by turning YOUR 1 (right foot) so that it lands on the right EDGE pointing out away from the MIDDLE, followed by YOUR 2 (left foot) landing shoulder width from YOUR 1 in the same way, with your weight on the balls of your feet, and heels hanging over, but not touching the MIDDLE; then returning to the MIDDLE by turning YOUR 1 (now the left foot) so that it lands on the MIDDLE pointing in FRONT FACE, followed by YOUR 2 (now the right foot) to complete the MANEUVER. Hopping through this MANEUVER is done by moving both feet at the same time. L1—Stepping from the MIDDLE to L1 then back to the MIDDLE is executed by turning YOUR 1 (left foot) so that it lands on the left EDGE pointing in toward the MIDDLE, followed by YOUR 2 (right foot) landing shoulder width from YOUR 1 in the same way, with your weight on the balls of your feet, and heels hanging off the EDGE; then returning to the MIDDLE by turning YOUR 1 (now the right foot) so that it lands on the MIDDLE pointing in FRONT FACE, followed by YOUR 2 (now the left foot) to complete the MANEUVER. Hopping through this MANEUVER is done by moving both feet at the dame time.

L2—Stepping from the MIDDLE to L2 then back to the MIDDLE is executed by turning YOUR 1 (left foot) so that it lands on the left EDGE pointing out away from the MIDDLE, followed by YOUR 2 (right foot) landing shoulder width from YOUR 1 in the same way, with your weight on the balls of your feet, and heels hanging over, but not touching the MIDDLE; then returning to the MIDDLE by turning YOUR 1 (now the right foot) so that it lands on the MIDDLE pointing in FRONT FACE, followed by YOUR 2 (now the left foot) to complete the MANEUVER. Hopping through this MANEUVER is done by moving both feet at the same time.

F-stra—Stepping from the MIDDLE to F-stra then back to the MIDDLE is executed by landing YOUR 1 (for this MANEUVER it could be either foot) on one EDGE (right foot/right EDGE and left foot/left EDGE) pointing in FRONT FACE, then landing YOUR 2 (the other foot) on the opposite EDGE straddling the MIDDLE, with your weight on the balls of your feet, and heels up off the EDGES; then returning to the MIDDLE by landing YOUR 1 (either foot) on the MIDDLE pointing in FRONT FACE, followed by YOUR 2 (the other foot) to complete the MANEUVER. Hopping through this MANEUVER is done by moving both feet at the same time.

B-stra—Stepping from the MIDDLE to B-stra then back to the MIDDLE is done by first executing either a RIGHT to BACK FACE or a LEFT to BACK FACE (see TURNING ON THE MIDDLE), then landing YOUR 1(either foot) on one EDGE (left foot/RIGHT EDGE and right foot/LEFT EDGE) pointing in BACK FACE, then landing YOUR 2 (the other foot) on the opposite EDGE straddling the MIDDLE, with your weight on the balls of your feet, and heels up off the EDGES; then returning to FRONT FACE on the MIDDLE by landing YOUR 1 (either foot) on the MIDDLE pointing in BACK FACE, followed by YOUR 2 (the other foot), then executing either a RIGHT to FRONT FACE or a LEFT to FRONT FACE to complete the MANEUVER. Hopping through this MANEUVER is done by moving both feet at the same time.

SR1—Stepping from the MIDDLE to SR1 then back to the MIDDLE is executed by turning YOUR 1 (right foot) so that it lands on the FLOOR to the immediate right side of the treadmill pointing in toward the MIDDLE, followed by YOUR 2 (left foot) landing shoulder width from YOUR 1 in the same way, with your weight on the balls of your feet, and heels up off the FLOOR; then returning to the MIDDLE by turning YOUR 1 (now the left foot) so that it lands on the MIDDLE pointing in FRONT FACE, followed by YOUR 2 (now the right foot) to complete the MANEUVER. Hopping through this MANEUVER is done by moving both feet at the same time.

SR2—Stepping from the MIDDLE to SR2 then back to the MIDDLE is executed by turning YOUR 1 (right foot) so that it lands on the FLOOR to the immediate right side of the treadmill pointing out away from the MIDDLE, followed by YOUR 2 (left foot) landing shoulder width from YOUR 1 in the same way, with your weight on the balls of your feet, and heels up off the FLOOR; then returning to the MIDDLE by turning YOUR 1 (now the left foot) so that it lands on the MIDDLE pointing in FRONT FACE, followed by YOUR 2 (now the right foot) to complete the MANEUVER. Hopping through this MANEUVER is done by moving both feet at the same time.

SRF—Stepping from the MIDDLE to SRF then back to the MIDDLE is executed by landing YOUR 1 (right foot) on the FLOOR to the immediate right side of the treadmill pointing forward in FRONT FACE, followed by YOUR 2 (left foot) landing shoulder width from YOUR 1 in the same way, with your weight on the balls of your feet, and heels up off the FLOOR; then returning to the MIDDLE by landing YOUR 1 (now the left foot) on the MIDDLE pointing in FRONT FACE, followed by YOUR 2 (now the right foot) to complete the MANEUVER. Hopping through this MANEUVER is done by moving both feet at the same time.

SRB—Stepping from the MIDDLE to SRB then back to the MIDDLE is executed by turning YOUR 1 (right foot) clockwise so that it lands on the FLOOR to the immediate right side of the treadmill pointing backward in BACK FACE, followed by YOUR 2 (left foot) landing shoulder width from YOUR 1 in the same way, with your weight on the balls of your feet, and heels up off the FLOOR; then returning to the MIDDLE by turning YOUR 1 (now the left foot) counterclockwise so that it lands on the MIDDLE pointing in FRONT FACE, followed by YOUR 2 (now the right foot) to complete the MANEUVER. Hopping through this MANEUVER is done by moving both feet at the same time.

SL1—Stepping from the MIDDLE to SL1 then back to the MIDDLE is executed by turning YOUR 1 (left foot) so that it lands on the FLOOR to the immediate left side of the treadmill pointing in toward the MIDDLE, followed by YOUR 2 (right foot) landing shoulder width from YOUR 1 in the same way, with your weight on the balls of your feet, and heels up off the FLOOR; then returning to the MIDDLE by turning YOUR 1 (now the right foot) so that it lands on the MIDDLE pointing in FRONT FACE, followed by YOUR 2 (now the left foot) to complete the MANEUVER. Hopping through this MANEUVER is done by moving both feet at the same time.

SL2—Stepping from the MIDDLE to SL2 then back to the MIDDLE is executed by turning YOUR 1 (left foot) so that it lands on the FLOOR to the immediate left side of the treadmill pointing out away from the MIDDLE, followed by YOUR 2 (right foot) landing shoulder width from YOUR 1 in the same way, with your weight on the balls of your feet, and heels up off the FLOOR; then returning to the MIDDLE by turning YOUR 1 (now the right foot) so that it lands on the MIDDLE pointing in FRONT FACE, followed by the left foot (now YOUR 2) to complete the MANEUVER. Hopping through this MANEUVER is done by moving both feet at the same time.

SLF—Stepping from the MIDDLE to SLF then back to the MIDDLE is executed by landing YOUR 1 (left foot) on the FLOOR to the immediate left side of the treadmill pointing forward in FRONT FACE, followed by YOUR 2 (right foot) landing shoulder width from YOUR 1 in the same way, with your weight on the balls of your feet, and heels up off the FLOOR; then returning to the MIDDLE by landing YOUR 1 (now the right foot) on the MIDDLE pointing in FRONT FACE, followed by YOUR 2 (now the left foot) to complete the MANEUVER. Hopping through this MANEUVER is done by moving both feet at the same time.

SLB—Stepping from the MIDDLE to SLB then back to the MIDDLE is executed by turning YOUR 1 (left foot) counterclockwise so that it lands on the FLOOR to the immediate left side of the treadmill pointing backward in BACK FACE, followed by YOUR 2 (right foot) landing shoulder width from YOUR 1 in the same way, with your weight on the balls of your feet, and heels up off the FLOOR; then returning to the MIDDLE by turning YOUR 1 (now the right foot) clockwise so that it lands on the MIDDLE pointing in FRONT FACE, followed by YOUR 2 (now the left foot) to complete the MANEUVER. Hopping through this MANEUVER is done by moving both feet at the same time.

B1—Stepping from the MIDDLE to B1 then back to the MIDDLE is executed by landing YOUR 1 (either foot) on the FLOOR to the immediate rear of the treadmill pointing in toward the MIDDLE, followed by YOUR 2 (the other foot) landing shoulder width from YOUR 1 in the same way, with your weight on the balls of your feet, and heels up off the FLOOR; then returning to the MIDDLE by landing YOUR 1 (either foot) on the MIDDLE pointing in FRONT FACE, followed by YOUR 2 (the other foot) to complete the MANEUVER. Hopping through this MANEUVER is done by moving both feet at the same time.

B2—Stepping from the MIDDLE to B2 then back to the MIDDLE is done by first executing either a RIGHT to BACK FACE or a LEFT to BACK FACE then landing YOUR 1 (either foot) on the FLOOR to the immediate rear of the treadmill pointing out away from the MIDDLE, followed by YOUR 2 (the other foot) landing shoulder width from YOUR 1 in the same way, with your weight on the balls of your feet, and heels up off the FLOOR; then returning to the MIDDLE by landing YOUR 1 (either foot) on the MIDDLE pointing in BACK FACE, followed by YOUR 2 (the other foot), then executing either a RIGHT to FRONT FACE or a LEFT to FRONT FACE to complete the MANEUVER. Hopping through this MANEUVER is done by moving both feet at the same time.

BR.—Stepping from the MIDDLE to BR then back to the MIDDLE is executed by turning YOUR 1 (right foot) so that it lands on the FLOOR to the immediate rear of the treadmill pointing in RIGHT FACE, followed quickly (because of lateral momentum) by YOUR 2 (left foot) landing shoulder width from YOUR 1 in the same way, with your weight on the balls of your feet, and heels up off the FLOOR; then returning to the MIDDLE by turning YOUR 1 (now the left foot) so that it lands on the MIDDLE pointing in FRONT FACE, followed by YOUR 2 (now the right foot) to complete the MANEUVER. Hopping through this MANEUVER is done by moving both feet at the same time.

BL.—Stepping from the MIDDLE to BL then back to the MIDDLE is executed by turning YOUR 1 (left foot) so that it lands on the FLOOR to the immediate rear of the treadmill pointing in LEFT FACE, followed quickly (because of lateral momentum) by YOUR 2 (right foot) landing shoulder width from YOUR 1 in the same way, with your weight on the balls of your feet, and heels up off the FLOOR; then returning to the MIDDLE by turning YOUR 1 (now the right foot) so that it lands on the MIDDLE pointing in FRONT FACE, followed by YOUR 2 (now the left foot) to complete the MANEUVER. Hopping through this MANEUVER is done by moving both feet at the same time.

F1—Stepping from the MIDDLE to F1 then back to the MIDDLE is done by first executing either a RIGHT to BACK FACE or a LEFT to BACK FACE then landing YOUR 1 (either foot) on the FLOOR to the immediate front of the treadmill pointing in toward the MIDDLE, followed by YOUR 2 (the other foot) landing shoulder width from YOUR 1 in the same way, with your weight on the balls of your feet, and heels up off the FLOOR; then returning to the MIDDLE by landing YOUR 1 (either foot) on the MIDDLE pointing in BACK FACE, followed by YOUR 2 (the other foot), then executing either a RIGHT to FRONT FACE or a LEFT to FRONT FACE to complete the MANEUVER. Hopping through this MANEUVER is done by moving both feet at the same time.

F2—Stepping from the MIDDLE to F2 then back to the MIDDLE is executed by landing YOUR 1 (either foot) on the FLOOR to the immediate front of the treadmill pointing out away from the MIDDLE, followed by YOUR 2 (the other foot) landing shoulder width from YOUR 1 in the same way, with your weight on the balls of your feet, and heels up off the FLOOR; then returning to the MIDDLE by landing YOUR 1 (either foot) on the MIDDLE pointing in FRONT FACE, followed by YOUR 2 (the other foot) to complete the MANEUVER. Hopping through this MANEUVER is done by moving both feet at the same time.

FR.—Stepping from the MIDDLE to FR then back to the MIDDLE is executed by turning YOUR 1 (right foot) so that it lands on the FLOOR to the immediate front of the treadmill pointing in RIGHT FACE, followed quickly (because of lateral momentum) by YOUR 2 (left foot) landing shoulder width from YOUR 1 in the same way, with your weight on the balls of your feet, and heels up off the FLOOR; then returning to the MIDDLE by turning YOUR 1 (now the left foot) so that it lands on the MIDDLE pointing in FRONT FACE, followed by YOUR 2 (now the right foot) to complete the MANEUVER. Hopping through this MANEUVER is done by moving both feet at the same time.

FL.—Stepping from the MIDDLE to FL then back to the MIDDLE is executed by turning YOUR 1 (left foot) so that it lands on the FLOOR to the immediate front of the treadmill pointing in LEFT FACE, followed quickly (because of lateral momentum) by YOUR 2 (right foot) landing shoulder width from YOUR 1 in the same way, with your weight on the balls of your feet, and heels up off the FLOOR; then returning to the MIDDLE by turning YOUR 1 (now the right foot) so that it lands on the MIDDLE pointing in FRONT FACE, followed by YOUR 2 (now the left foot) to complete the MANEUVER. Hopping through this MANEUVER is done by moving both feet at the same time.

Although the above-mentioned MANEUVERS are based on a FRONT FACE start position, executing a CP can be started from any of the 4 FACES. For example, here are some of the possible MANEUVERS for executing an SR2 starting in LEFT FACE on the MIDDLE:

LEFT to RIGHT FACE, SR2, which is done by executing a ½ left turn to RIGHT FACE, then stepping from the MIDDLE to SR2 then back to the MIDDLE;

RIGHT to RIGHT FACE, SR2, which is done by executing a ½ right turn to RIGHT FACE, then stepping from the MIDDLE to SR2 then back to the MIDDLE;

*SR2 (in one), which is done by either of the following 2 methods: hopping clockwise backwards from LEFT FACE to SR2 then back to the MIDDLE; or hopping counterclockwise backwards from LEFT FACE to SR2 then back to the MIDDLE.

*Any CP (in one) means that the location must be secured in a single MANEUVER, by stepping or hopping (with midair turns if needed) directly to the specified CP, without any preparatory MANEUVERS (like turning to the FACE closest to that particular CP first), regardless of the FACE that you are coming from. Hopping a CP (in one), versus stepping a CP (in one), is recommended not only because its directness allows a smoother FLOW, but also by having both feet underneath you, your balance and control are dramatically increased.

As a further example, execute the following series of MANEUVERS: A—to be executed if the floor space around the treadmill on 3 sides (RIGHT, LEFT, and Back) is available or B—to be executed if the floor space around the treadmill on 3 sides is unavailable:

-A-
Starting in BACK FACE, execute 3RIGHT to LEFT FACE, L1, RIGHT FACE, SLF (in one).

-B-
Starting in BACK FACE, execute 3RIGHT to LEFT FACE, L1, RIGHT FACE, R2 (in one).

-A-
3RIGHT to LEFT FACE, L1, RIGHT FACE, SLF (in one), started from BACK FACE. Refer to DIAGRAMS 6.A for clarity.

3RIGHT to LEFT FACE—3¼ right turns from BACK FACE to LEFT FACE are executed by leading with YOUR 1 (right foot) and following with YOUR 2 (left foot) clockwise three times around on the MIDDLE, from FACE to FACE, and continuing past BACK FACE, 1 FACE to LEFT FACE; then executing L1—LEFT FACE to L1 then back to the MIDDLE is executed by stepping or hopping to L1 then back to the MIDDLE; then executing RIGHT FACE—Assume RIGHT FACE on the MIDDLE by executing any turn that gets you there quickly, or simply holding your position if you returned to the MIDDLE from L1 in RIGHT FACE; then executing SLF (in one)—RIGHT FACE to SLF (in a single MANEUVER) then back to the MIDDLE is executed by hopping clockwise or counterclockwise backwards from RIGHT FACE to SLF, then back to the MIDDLE.

-B-
The executions of 3RIGHT to LEFT FACE, L1, RIGHT FACE, R2 (in one) started from BACK FACE are the same as series -A- through the first 3 MANEUVERS, but ends with R2 (in one) instead of SLF (in one). Refer to DIAGRAMS 6.B for clarity.

R2 (in one)—RIGHT FACE to R2 (in a single MANEUVER) then back to the MIDDLE is executed by hopping to R2 then back to the MIDDLE.

Switching

SWITCHING is a visually enticing MANEUVER. SWITCHES are rapid-fire ½ right (in one) turns or ½ left (in one) turns executed while on the MIDDLE, or immediately after landing on a CP, which enable you to change to an opposite FACE extremely fast and quickly get ready for follow-up MANEUVERS.

The following are the names, explanations, and executions of a single SWITCH (2), and multiple SWITCHES of 2 or more that are done consecutively in either of 2 methods (8). Read through all 10 MANEUVERS before executing them and then repeat each one at least 10 times before proceeding to the next. Refer to DIAGRAMS 7 for clarity.

SWITCH-RIGHT—A single ½ right (in one) turn is executed by hopping ½ right to the opposite FACE in a single MANEUVER, creating a semi-circular motion.

SWITCH-LEFT—A single ½ left (in one) turn is executed by hopping ½ left to the opposite FACE in a single MANEUVER, creating a semi-circular motion.

2SWITCH-RIGHT—2 consecutive right and left SWITCHES done in the STANDARD METHOD as a single MANEUVER is executed by first hopping ½ right to the opposite FACE from which you were in, then immediately hopping ½ left back to the original FACE, repeating the semi-circular motion.

2SWITCH-LEFT—2 consecutive left and right SWITCHES done in the STANDARD METHOD as a single MANEUVER is executed by first hopping ½ left to the opposite FACE from which you were in, then immediately hopping ½ right back to the original FACE, repeating the semi-circular motion.

3SWITCH-RIGHT—3 consecutive right, left, and right SWITCHES done in the STANDARD METHOD as a single MANEUVER, is a 2SWITCH-RIGHT plus a hopping ½ right to the opposite FACE, repeating the semi-circular motion.

3SWITCH-LEFT—3 consecutive left, right, and left SWITCHES done in the STANDARD METHOD as a single MANEUVER, is a 2SWITCH-LEFT plus a hopping ½ left to the opposite FACE, repeating the semi-circular motion.

Regardless of how many times you SWITCH in the STANDARD METHOD, always alternate the direction of all consecutive ½ turns; odd number SWITCHES take you to the opposite FACE, while even number SWITCHES bring you back to the original FACE, repeating a semi-circular motion.

2C-SWITCH-RIGHT—2 right SWITCHES done in the C-SWITCH METHOD as a single MANEUVER, is executed by hopping ½ right twice consecutively in a rotating fashion; first to the opposite FACE, and then continuing right around back to the original FACE, creating a circular motion.

2C-SWITCH-LEFT—2 left SWITCHES done in the C-SWITCH METHOD as a single MANEUVER, is executed by hopping ½ left twice consecutively in a rotating fashion; first to the opposite FACE, and then continuing left around back to the original FACE, creating a circular motion.

3C-SWITCH-RIGHT—3 right SWITCHES done in the C-SWITCH METHOD as a single MANEUVER, is a 2C-SWITCH-RIGHT plus a hopping ½ right to the opposite FACE, continuing right in a circular motion.

3C-SWITCH-LEFT—3 left SWITCHES done in the C-SWITCH METHOD as a single MANEUVER, is a 2C-SWITCH-LEFT plus a hopping ½ left to the opposite FACE, continuing left in a circular motion.

Regardless of how many times you SWITCH in the C-SWITCH METHOD, always keep all ½ turns continuing in the same direction; odd number SWITCHES take you to the opposite FACE, while even number SWITCHES continue around bringing you back to the original FACE in a circular motion.

Initially, for the sole purpose of getting comfortable with SWITCHING on the MIDDLE, or MIDDLE SWITCHING, you can follow the executions for a ½ right or ½ left turn (See RIGHT to BACK FACE and LEFT to BACK FACE in the TURNING ON THE MIDDLE section on pages 13 and 14); eventually, however, you should execute the SWITCH as a single MANEUVER as it is prescribed. SWITCHING on a CP, or CP SWITCHING, is fairly simple to execute since they are all on fixed surfaces; however, your landings should be precise, especially when it comes to CPs on the EDGES.

The following is an example of a series of MANEUVERS: A—to be executed if the floor space around the treadmill on 3 sides (RIGHT, LEFT, and Back) is available or B—to be executed if the floor space around the treadmill on 3 sides is unavailable:

-A-

Starting in FRONT FACE, execute BL (in one)/2C-SWITCH-LEFT, SR1 (in one), LEFT FACE, 2RIGHT, L1 (in one)/SWITCH-LEFT, R1 (in one)/SWITCH-RIGHT

-B-

Starting in FRONT FACE, execute R2 (in one), L2 (in one), R2 (in one)/SWITCH-RIGHT, L2/2C-SWITCH-LEFT, LEFT FACE, 2LEFT to FRONT FACE/2SWITCH-LEFT

-A-

Here are the explanations and executions of BL (in one)/2C-SWITCH-LEFT, SR1 (in one), LEFT FACE, 2RIGHT, L1 (in one)/SWITCH-LEFT, R1 (in one)/SWITCH-RIGHT, started from FRONT FACE. Refer to DIAGRAMS 7.A—SERIES OF MANEUVERS (A) on page 141 as often as you need to for clarity.

BL (in one)/2C-SWITCH-LEFT—FRONT FACE to BL (in a single MANEUVER) with 2 rapid-fire circular ½ left (in one) turns immediately after landing on it, then back to the MIDDLE is executed by hopping clockwise or counterclockwise back to BL, then hopping ½ left twice in a circular motion to BR first, then continuing left around back to BL then back to the MIDDLE, then executing SR1 (in one)—From whichever FACE that you returned to the MIDDLE in, to SR1 (in a single MANEUVER) then back to the MIDDLE is executed by hopping clockwise or counterclockwise right to SR1 then back to the MIDDLE, then executing LEFT FACE—Assume LEFT FACE on the MIDDLE by executing any turn that gets you there quickly, or simply holding your position if you returned to the MIDDLE from SR1 in LEFT FACE, then executing 2RIGHT—2 full right turns from LEFT FACE to LEFT FACE are executed by leading with YOUR 1 (right foot) and following with YOUR 2 (left foot) clockwise twice around oil the MIDDLE, from FACE to FACE, returning to LEFT FACE, then executing L1 (in one)/SWITCH-LEFT—LEFT FACE to L1 (in a single MANEUVER) with a rapid-fire semi-circular ½ left (in one) turn to L2 immediately after landing on it, then back to the MIDDLE is executed by hopping clockwise or counterclockwise left to L1, then hopping ½ left to L2 then back to the MIDDLE, then executing R1 (in one)/SWITCH-RIGHT—From whichever FACE that you returned to the MIDDLE in, to R1 (in a single MANEUVER) with a rapid-fire semi-circular ½ right (in one) turn to R2 immediately after landing on it, then back to the MIDDLE is executed by hopping backward to R1 if you returned to the MIDDLE from L2 in LEFT FACE, or by hopping clockwise or counterclockwise right to R1, then hopping ½ right to R2 then back to the MIDDLE.

-B-

Here are the explanations and executions of R2 (in one), L2 (in one), R2 (in one)/SWITCH-RIGHT, L2/2C-SWITCH-LEFT, LEFT FACE, 2LEFT to FRONT FACE/2SWITCH-LEFT, started from FRONT FACE. Refer to DIAGRAMS 7.B—SERIES OF MANEUVERS (B) on page 149 as often as you need to for clarity.

R2 (in one)—FRONT FACE to R2 (in a single MANEUVER) then back to the MIDDLE is executed by hopping clockwise or counterclockwise right to R2 then back to the MIDDLE, then executing L2 (in one)—From whichever FACE that you returned to the MIDDLE in, to L2 (in a single MANEUVER) then back to the MIDDLE is executed by hopping clockwise or counterclockwise left to L2 then back to the MIDDLE, then executing R2 (in one)/SWITCH-RIGHT—From whichever FACE that you returned to the MIDDLE in, to R2 (in a single MANEUVER) with a rapid-fire semi-circular ½ right (in one) turn to R1 immediately after landing on it, then back to the MIDDLE is executed by hopping clockwise or counterclockwise right to R2, then hopping ½ right to R1 then back to the MIDDLE, then executing L2/2C-SWITCH-LEFT—From whichever FACE that you returned to the MIDDLE in, to L2 with 2 rapid-fire circular ½ left (in one) turns immediately after landing on it, then back to the MIDDLE is executed by stepping or hopping to L2, then hopping ½ left twice in a circular motion to L1 first, then continuing left around back to L2 then back to the MIDDLE, then executing LEFT FACE—Assume LEFT FACE on the MIDDLE by executing any turn that gets you there quickly, or simply holding your position if you returned to the MIDDLE from L2 in LEFT FACE, then executing 2LEFT to FRONT FACE/2SWITCH-LEFT—2¾ left turns from LEFT FACE to FRONT FACE with 2 rapid-fire semi-circular ½ left (in one) then ½ right (in one) turns immediately after landing there is executed by leading with YOUR 1 (left foot) and following with YOUR 2 (right foot) counterclockwise twice around on the MIDDLE, from FACE to FACE continuing past LEFT FACE, 3 FACES to FRONT FACE, and then hopping ½ left to BACK FACE first, then hopping ½ right back to FRONT FACE.

Stepping or hopping from the MIDDLE to L2 in the L2/2C-SWITCH-LEFT MANEUVER is optional; if it were L2 (in one)/2C-SWITCH-LEFT, then L2 would have been executed in a single MANEUVER by hopping (with midair turns if needed) directly to L2, without any preparatory MANEUVERS, regardless of the FACE that you were coming from on the MIDDLE. Also understand that a CP as a MANEUVER followed by a SWITCH of any kind (like series -A- BL (in one)/C-SWITCH-LEFT, L1 (in one)/SWITCH-LEFT, and R1 (in one)/SWITCH-RIGHT, or like series -B- R2 (in one)/SWITCH-RIGHT, and L2/2C-SWITCH-LEFT), requires you to execute the SWITCH prior to returning to the MIDDLE as you normally would after landing a CP by itself.

Panning

PANNING is what one might call a hybrid MANEUVER, blending aspects of stepping through turns with those of SWITCHING. Like stepping through turns, PANS depend on YOUR 2 to push your body through turns and pivots upon landing YOUR 1 and or YOUR 2; but unlike stepping through turns, YOUR 2 is also responsible for changing the FACE of your expression of this format by turning it so that it lands pointing in the desired FACE immediately after its push. PANS, like SWITCHES, are also ½ right (in one) turns or ½ left (in one) turns executed while on the MIDDLE, or immediately after landing on a CP, which enable you to easily change to an opposite FACE and get set for follow-up MANEUVERS; but unlike like SWITCHES, one foot (YOUR 1), which you will use to pivot on, always maintains contact with the surface of a location during the MANEUVER, as opposed to both feet leaving the surface at the same time when hopping. It can also be done as quickly or as slowly as you choose to, increasing the diversity and the smoothness of the exercises.

The following are the names, explanations, and executions of a single forward PAN (2), a single backward PAN (2), and multiple forward and backward PANS of 2 or more that are done consecutively in either of 2 methods (16). Refer to DIAGRAM 8 for clarity.

PAN-RIGHT—A single forward ½ right (in one) turn with YOUR 1 (right foot) maintaining contact with the surface of a location is executed by putting your weight oil the ball of YOUR 1, and pivoting on it ½ right forward and around to the opposite FACE, by pushing your body forward and right with YOUR 2 (left foot), creating a semi-circular motion.

PAN-LEFT—A single forward ½ left (in one) turn with YOUR 1 (left foot) maintaining contact with the surface of a location is executed by putting your weight on the ball of YOUR 1, and pivoting on it ½ left forward and around to the opposite FACE, by pushing your body forward and left with YOUR 2 (right foot), creating a semi-circular motion.

B'PAN-RIGHT—A single backward ½ right (in one) turn with YOUR 1 (left foot) maintaining contact with the surface of a location is executed by putting your weight on the ball of YOUR 1, and pivoting on it ½ right backward and around to the opposite FACE, by pushing your body backward and left with YOUR 2 (right foot), creating a semi-circular motion; notice, however, that your body enters into the opposite FACE from the right side, henceforth completing B'PAN-RIGHT B'PAN-LEFT—A single backward ½ left (in one) turning with YOUR 1 (right foot) maintaining contact with the surface of a location is executed by putting your weight on the ball of YOUR 1, and pivoting on it ½ left backward and around to the opposite FACE, by pushing your body backward and right with YOUR 2 (left foot) creating a semi-circular motion; notice that your body enters into the opposite FACE from the left side, henceforth completing B'PAN-LEFT 2PAN-RIGHT—2 consecutive forward right and backward left PANS done in the STANDARD METHOD as a single MANEUVER is executed by putting your weight on the ball of YOUR 1 (right foot), and first pivoting on it ½ right forward and around to the opposite FACE, by pushing your body forward and right with YOUR 2 (left foot); and then immediately pivoting ½ left backward and around to the original FACE, by pushing your body backward and right with YOUR 2, repeating the semi-circular motion; which is also an explanation and execution of PAN-RIGHT, B'PAN-LEFT 2PAN-LEFT—2 consecutive forward left and backward right PANS done in the STANDARD METHOD as a single MANEUVER is executed by putting your weight on the ball of YOUR 1 (left foot), and first pivoting on it ½ left forward and around to the opposite FACE, by pushing your body forward and left with YOUR 2 (right foot); and then immediately pivoting ½ right backward and around to the original FACE, by pushing your body backward and left with YOUR 2, repeating the semi-circular motion; which is also an explanation and execution of PAN-LEFT, B'PAN-RIGHT 3PAN-RIGHT—3 consecutive forward right, backward left, and forward right PANS done in the STANDARD METHOD as a single MANEUVER is a 2PAN-RIGHT plus a pivoting ½ right forward and around to the opposite FACE, repeating the semi-circular motion; which is also an execution of PAN-RIGHT, B'PAN-LEFT, PAN-RIGHT, 2PAN-RIGHT, PAN-RIGHT, and PAN-RIGHT, 2B'PAN-LEFT 3PAN-LEFT—3 consecutive forward left, backward right, and forward left PANS done in the STANDARD METHOD as a single MANEUVER is a 2PAN-LEFT plus a pivoting ½ left forward and around to the opposite FACE, repeating the semi-circular motion; which is also an execution of PAN-LEFT, B'PAN-RIGHT, PAN-LEFT, 2PAN-LEFT, PAN-LEFT, and PAN-LEFT, 2B'PAN-RIGHT 2B'PAN-RIGHT—2 consecutive backward right and forward left PANS done in the STANDARD METHOD as a single MANEUVER is executed by putting your weight on the ball of YOUR 1 (left foot), and first pivoting on it ½ right backward and around to the opposite FACE, by pushing your body backward and left with YOUR 2 (right foot); and then immediately pivoting ½ left forward and around to the original FACE, by pushing your body forward and left with YOUR 2, repeating the semi-circular motion; which is also an explanation and execution of B'PAN-RIGHT, PAN-LEFT 2B'PAN-LEFT—2 consecutive backward left and forward right PANS done in the STANDARD METHOD as a single MANEUVER is executed by putting your weight on the ball of YOUR 1 (right foot), and first pivoting on it ½ left backward and around to the opposite FACE, by pushing your body backward and right with YOUR 2 (left foot); and then immediately pivoting ½ right forward and around to the original FACE, by pushing your body forward and right with YOUR 2, repeating the semi-circular motion; which is also an explanation and execution of B'PAN-LEFT, PAN-RIGHT 3B'PAN-RIGHT—3 consecutive backward right, forward left, and backward right PANS done in the STANDARD METHOD as a single MANEUVER is a 2B'PAN-RIGHT plus a pivoting ½ right backward and around to the opposite FACE, repeating the semi-circular motion; which is also an explanation and execution of B'PAN-RIGHT, PAN-LEFT, B'PAN-RIGHT, 2B'PAN-RIGHT, B'PAN-RIGHT, and B'PAN-RIGHT, 2PAN-LEFT 3B'PAN-LEFT—3 consecutive backward left, forward right, and backward left PANS done in the STANDARD METHOD as a single MANEUVER is a 2B'PAN-LEFT plus a pivoting ½ left backward and around to the opposite FACE, repeating the semi-circular motion; which is also an explanation and execution of B'PAN-LEFT, PAN-RIGHT, B'PAN-LEFT, 2B'PAN-LEFT, B'PAN-LEFT, and B'PAN-LEFT, 2PAN-RIGHT Regardless of how many times you PAN in the STANDARD METHOD always alternate the direction of all consecutive ½ turns; odd number PANS take you to the opposite FACE, while even number PANS bring you back to the original FACE, repeating a semi-circular motion.

2C-PAN-RIGHT—2 forward right PANS done in the C-PAN METHOD as a single MANEUVER is executed by putting your weight on the ball of YOUR 1 (right foot), and pivoting ½ right forward and around twice consecutively in a rotating fashion; first to the opposite FACE, and then continuing right around to the original FACE, by pushing your body forward and right with YOUR 2 (left foot), creating a circular motion; which is also an explanation and execution of PAN-RIGHT, PAN-RIGHT 2C-PAN-LEFT—2 forward left PANS done in the C-PAN METHOD as a single MANEUVER is executed by putting your weight on the ball of YOUR 1 (left foot), and pivoting ½ left forward and around twice consecutively in a rotating fashion; first to the opposite FACE, and then continuing left around to the original FACE, by pushing your body forward and left with YOUR 2 (right foot), creating a circular motion; which is also an explanation and execution of PAN-LEFT, PAN-LEFT 3C-PAN-RIGHT—3 forward right PANS done in the C-PAN METHOD as a single MANEUVER is a 2C-PAN-RIGHT plus a pivoting ½ right forward and around to the opposite FACE, repeating the circular motion; which is also an explanation and execution of PAN-RIGHT, PAN-RIGHT, PAN-RIGHT, 2PAN-RIGHT, PAN-RIGHT, PAN-RIGHT, 2C-PAN-RIGHT 3C-PAN-LEFT—3 forward left PANS done in the C-PAN METHOD as a single MANEUVER is a 2C-PAN-LEFT plus a pivoting ½ left forward and around to the opposite FACE, repeating the circular motion; which is also an explanation and execution of PAN-LEFT, PAN-LEFT, PAN-LEFT 2C-B'PAN-RIGHT—2 backward right PANS done in the C-PAN METHOD as a single MANEUVER is executed by putting your weight on the ball of YOUR 1 (left foot), and pivoting ½ right backward and around twice consecutively in a rotating fashion; first to the opposite FACE, and then continuing right around back to the original FACE, by pushing your body backward and left with YOUR 2 (right foot), creating a circular motion; which is also an explanation and execution of B'PAN-RIGHT, B'PAN-RIGHT 2C-B'PAN-LEFT—2 backward left PANS done in the C-PAN METHOD as a single MANEUVER is executed by putting your weight on the ball of YOUR 1 (right foot), and pivoting ½ left backward and around twice consecutively in a rotating fashion; first to the opposite FACE, and then continuing left around back to the original FACE, by pushing your body backward and right with YOUR 2 (left foot), creating a circular motion; which is also an explanation and execution of B'PAN-LEFT, B'PAN-LEFT 3C-B'PAN-RIGHT—3 backward right PANS done in the C-PAN METHOD as a single MANEUVER is a 2C-B'PAN-RIGHT plus a pivoting ½ right backward and around to the opposite FACE repeating the circular motion; which is also an explanation and execution of B'PAN-RIGHT, B'PAN-RIGHT, B'PAN-RIGHT, 2C-B'PAN-RIGHT, B'PAN-RIGHT, and B'PAN-RIGHT, 2C-B'PAN-RIGHT 3C-B'PAN-LEFT—3 backward left PANS done in the C-PAN METHOD as a single MANEUVER is a 2C-B'PAN-LEFT plus a pivoting ½ left backward and around to the opposite FACE repeating the circular motion; which is also an explanation and execution of B'PAN-LEFT, B'PAN-LEFT, B'PAN-LEFT, 2C-B'PAN-LEFT, B'PAN-LEFT, and B'PAN-LEFT, 2C-B'PAN-LEFT Regardless of how many times you PAN in the C-PAN METHOD, always keep all ½ turns continuing in the same direction; odd number PANS take you to the opposite FACE, while even number PANS continue around bringing you back to the original FACE in a circular motion.

Although PANNING can, but does not necessarily have to be, executed as a rapid-fire ½ turn, remember that it is still a single MANEUVER and should be done as such. Additionally, remember that PANNING on the MIDDLE, or MIDDLE PANNING is on a moving surface and does require some speed and precision; if you take too long to execute a PAN there, you could be thrown completely off the MIDDLE! PANNING on a CP, or CP PANNING, is less time-sensitive because you are executing the MANEUVER on a fixed surface, which can buy you some time, but that is not the objective of FRE FLO DO! Pay particular attention to keep the ball of YOUR 1 centered on the EDGES when pivoting on it so that you do not accidentally spin off of them.

The following is an example of another series of MANEUVERS: A—to be executed if the floor space around the treadmill on 3 sides (RIGHT, LEFT, and Back) is available or B—to be executed if the floor space around the treadmill on 3 sides is unavailable:

-A-

Starting in LEFT FACE, execute SL2 (in one), RIGHT FACE, 5LEFT to FRONT FACE, R1 (in one), R2 (in one)/2C-B'PAN-LEFT, L2 (in one)/2SWITCH-LEFT, BR (in one)/SWITCH-LEFT, L1 (in one)/3C-PAN-RIGHT

-B-

Starting in LEFT FACE, execute 3RIGHT, L1 (in one)/3C-PAN-LEFT, R2 (in one)/2SWITCH-LEFT, LEFT, FACE/4C-SWITCH-RIGHT, L2 (in one), R2 (in one), R2 (in one)/PAN-RIGHT, R1 (in one)/B'PAN-LEFT

-A-

SL2 (in one), RIGHT FACE, 5LEFT to FRONT FACE, R1 (in one), R2 (in one)/2C-B'PAN-LEFT, L2 (in one)/2SWITCH-LEFT, BR (in one)/SWITCH-LEFT, L1 (in one)/3C-PAN-RIGHT, started from LEFT FACE. Refer to DIAGRAMS 8.A—SERIES OF MANEUVERS (A) on page 177 as often as you need to for clarity.

SL2 (in one)—LEFT FACE to SL2 (in a single MANEUVER) then back to the MIDDLE is executed by hopping forward from LEFT FACE to SL2, then back to the MIDDLE, then executing RIGHT FACE—Assume RIGHT FACE on the MIDDLE by executing any turn that gets you there quickly, or simply holding your position if you returned to the MIDDLE from SL2 in RIGHT FACE; then executing 5LEFT to FRONT FACE—5¼ left turns from RIGHT FACE to FRONT FACE are executed by leading with YOUR 1 (left foot) and following with YOUR 2 (right foot) counterclockwise five times around on the MIDDLE, from FACE to FACE, and continuing past RIGHT FACE, 1 FACE to FRONT FACE; then executing R1 (in one)—FRONT FACE to R1 (in a single MANEUVER) then back to the MIDDLE is executed by hopping clockwise or counterclockwise right to R1 then back to the MIDDLE; then executing R2 (in one)/2C-B'PAN-LEFT—From whichever FACE that you returned to the MIDDLE in, to R2 (in a single MANEUVER) with 2 backward circular ½ left (in one) turns (right foot maintaining contact with the EDGE) immediately after landing on it, then back to the MIDDLE is executed by hopping clockwise or counterclockwise right to R2, then pivoting on YOUR 1 (right foot) ½ left backward and around twice in a circular motion to R1 first, and then continuing left around back to R2, by pushing your body backward and right with YOUR 2 (left foot) then back to the MIDDLE; then executing L2 (in one)/2SWITCH-LEFT—From whichever FACE that you returned to the MIDDLE in, to L2 (in a single MANEUVER) with 2 rapid-fire semi-circular ½ left (in one) then ½ right (in one) turns immediately after landing on it, then back to the MIDDLE is executed by hopping clockwise or counterclockwise left to L2, then hopping ½ left to L1 first, then hopping ½ right back to L2 then back to the MIDDLE; then executing BR (in one)/SWITCH-LEFT—From whichever FACE that you returned to the MIDDLE in, to BR (in a single MANEUVER) with a rapid-fire semi-circular ½ left (in one) turn immediately after landing on it, then back to the MIDDLE is executed by hopping clockwise or counterclockwise back to BR, then hopping ½ left to BL then back to the MIDDLE; then executing L1 (in one)/3C-PAN-RIGHT—From whichever FACE that you returned to the MIDDLE in, to L1 (in a single MANEUVER) with 3 forward circular ½ right (in one) turns (right foot maintaining contact with the EDGE) immediately after landing on it, then back to the MIDDLE is executed by hopping clockwise or counterclockwise left to L1, then pivoting on YOUR 1 (right foot) ½ right forward and around three times in a circular motion to L2 first, then to L1 second, and then continuing right around to L2, by pushing your body forward and right with YOUR 2 (left foot) then back to the MIDDLE.

-B-

Explanations and executions of 3RIGHT, L1 (in one)/3C-PAN-LEFT, R2 (in one)/2SWITCH-LEFT, LEFT, FACE/4C-SWITCH-RIGHT, L2 (in one), R2 (in one), R2 (in one)/PAN-RIGHT, R1 (in one)/B'PAN-LEFT, started from LEFT FACE. Refer to DIAGRAMS 8.B—SERIES OF MANEUVERS (B) for clarity.

3RIGHT—3 full right turns from LEFT FACE to LEFT FACE are executed by leading with YOUR 1 (right foot) and following with YOUR 2 (left foot) clockwise three times around on the MIDDLE, from FACE to FACE, returning to LEFT FACE, then executing L1 (in one)/3C-PAN-LEFT—LEFT FACE to L1 (in a single MANEUVER) with 3 forward circular ½ left (in one) turns (left foot maintaining contact with the EDGE) immediately after landing on it, then back to the MIDDLE is executed by hopping clockwise or counterclockwise forward from LEFT FACE to L1, then pivoting on YOUR 1 (left foot) ½ left forward and around three times in a circular motion to L2 first, then to L1 second, and then continuing left around to L2, by pushing your body forward and left with YOUR 2 (right foot) then back to the MIDDLE, then executing R2 (in one)/2SWITCH-LEFT—From whichever FACE that you returned to the MIDDLE in, to R2 (in a single MANEUVER) with 2 rapid-fire semi-circular ½ left (in one) then ½ right (in one) turns immediately after landing on it, then back to the MIDDLE is executed by hopping clockwise or counterclockwise right to R2, then hopping ½ left to R1 first, then hopping ½ right back to R2 then back to the MIDDLE, then executing LEFT FACE/4C-SWITCH-RIGHT—Assume LEFT FACE on the MIDDLE by executing any turn that gets you there quickly, or simply holding your position if you returned to the MIDDLE from R2 in LEFT FACE, then hopping ½ right four times in a circular motion to RIGHT FACE first, then to LEFT FACE second, then to RIGHT FACE third, then back to LEFT FACE then executing L2 (in one)—LEFT FACE to L2 (in a single MANEUVER) then back to the MIDDLE is executed by hopping forward from LEFT FACE to L2 then back to the MIDDLE, then executing R2 (in one)—From whichever FACE that you returned to the MIDDLE in, to R2 (in a single MANEUVER) then back to the MIDDLE is executed by hopping clockwise or counterclockwise right to R2 then back to the MIDDLE, then executing R2 (in one)/PAN-RIGHT—From whichever FACE that you returned to the MIDDLE in, to R2 (in a single MANEUVER) with a forward semi-circular ½ right (in one) turn (right foot maintaining contact with the EDGE) immediately after landing on it, then back to the MIDDLE is executed by hopping clockwise or counterclockwise right to R2, then pivoting on YOUR 1 (right foot) ½ right forward and around to R1, by pushing your body forward and right with YOUR 2 (left foot) then back to the MIDDLE, then executing R1 (in one)/B'PAN-LEFT—From whichever FACE that you returned to the MIDDLE in, to R1 (in a single MANEUVER) with a backward semi-circular ½ left (in one) turn (right foot maintaining contact with the EDGE) immediately after landing on it, then back to the MIDDLE is executed by hopping clockwise or counterclockwise right to R1, then pivoting on YOUR 1 (right foot) ½ left backward and around to R2, by pushing your body backward and right with YOUR 2 (left foot) then back to the MIDDLE.

Drops

DROPS are rapid-fire descents from an upright position to a very low squat position and a quick spring back to the upright position while on the MIDDLE, or immediately after landing on a CP. It is a defensive MANEUVER within a MANEUVER that can help protect you from potential harm because a lower center of gravity increases balance and stabilization. Instinctively, when most people suffer a momentary loss of balance, they do everything possible to stay upright; consequently, in the instance of swift or spontaneous losses of balance it is often too late to recover and all too often the individual is then subject to a much harder fall as a result of staying up off balance longer. Instead, as is practiced in martial art forms such as Aikido and Judo or in sports like football and soccer, and gymnastics individuals are taught to drop and roll which serves to minimize or even eliminate impact on the body by shortening the distance between the body's center of gravity and the surface supporting it. DROPS can save the practitioner from serious injury especially when they are practiced frequently enough to become a trained response.

Sticking

STICKING is a momentary delay or pause that highlights a position while on the MIDDLE, or immediately after landing on a CP, which actually slows down your expression of KAPPEL'S FOOTWORK. In essence, it is a defensive MANEUVER within a MANEUVER that can help protect you from potential harm. If you are executing a MANEUVER and run into a little difficulty such as a loss of balance, or BEARINGS, STICKING the surface of the location that you happen to be on at the time may be all you need to do to recover and keep yourself from falling or being thrown! But if you are creative, STICKING can be another means by which you can add some color and variety to your FRE FLO DO.

STICKING is executed by freezing your position for a moment while on the MIDDLE, or immediately after landing on a CP, just as you are. Bending the knees and lowering your body can really pronounce the action by creating a cool slow motion effect. It also stabilizes your center of gravity, which is crucial in recovering lost balance. You may notice that STICKING the surface of the MIDDLE, the EDGES, or the FLOOR during an execution can offer quite a challenge to your speed and momentum control, depending on how quickly you are executing $CP^2$s (CATCH POINT PATTERNS), or MANEUVERS on the MIDDLE.

Suppose you are executing a $CP^2$ in which all left CPs are presumed to be 'STICKY'. What exactly does that mean? All that this really means is that immediately after landing on any CP to the left of the MIDDLE, including BL in the BACK, you must STICK IT (freeze for a moment exactly as you landed on it, or bend your knees and drop in slow motion) before returning to the MIDDLE. For example: In STICK/L2 (in one), R1 (in one), STICK/SL1 (in one), STICK/L1 (in one)/SWITCH-RIGHT, SR2, you would execute the series as you would any other; however, you would have to freeze or drop in slow motion momentarily after landing on L2, SL1, and after landing on L1, but before SWITCHING RIGHT to L2. The R1 (in one) portion of the series is not STICKY; therefore it is executed in the usual way.

The following is an example of executing a $CP^2$: STICK/R2 (in one)/SWITCH-LEFT/and STICK, L1 (in one)/B'PAN-LEFT/and STICK, STICK/L2 (in one)/2C-PAN-RIGHT/and STICK.

The explanations and executions of STICK/R2 (in one)/SWITCH-LEFT/and STICK, L1 (in one)/B'PAN-LEFT/and STICK, STICK/L2 (in one)/2C-PAN-RIGHT/and STICK are as follows:

STICK/R2 (in one)/SWITCH-LEFT/and STICK—From the MIDDLE to a STICKY R2 (in a single MANEUVER) with a rapid-fire ½ left (in one) turn to a STICKY R1 immediately after landing and STICKING it, then back to the MIDDLE is executed by hopping clockwise or counterclockwise right to R2 and freezing for a moment exactly as you land on it, or bending your knees and dropping in slow motion, then hopping ½ left to R1 and freezing for a moment exactly as you land on it, or bending your knees and dropping in slow motion then back to the MIDDLE, then executing L1 (in one)/B'PAN-LEFT/and STICK—From whichever FACE that you returned to the MIDDLE in, to L1 (in a single MANEUVER) with a backward semi-circular ½ left (in one) turn (right foot maintaining contact with the EDGE) to a STICKY L2 immediately after landing on it, then back to the MIDDLE is executed by hopping clockwise or counterclockwise left to L1, then pivoting on YOUR 1 (right foot) ½ left backward and around to L2, by pushing your body backward and right with YOUR 2 (left foot) and freezing for a moment exactly as you land on it, or bending your knees and dropping in slow motion, then back to the MIDDLE STICK/L2 (in one)/2C-PAN-RIGHT/and STICK—From whichever FACE that you returned to the MIDDLE in, to a STICKY L2 (in a single MANEUVER) with 2 forward circular ½right (in one) turns (right foot maintaining contact with the EDGE) to a STICKY L2 immediately after landing and STICKING it, then back to the MIDDLE is executed by hopping clockwise or counterclockwise left to L2 and freezing for a moment exactly as you land oil it, or bending your knees and dropping in slow motion, then pivoting on YOUR 1 (right foot) ½ right twice in a circular motion to L1 first, and then continuing right around to L2 by pushing your body forward and right with YOUR 2 (left foot) and freezing for a moment exactly as you land on it, or bending your knees and dropping in slow motion then back to the MIDDLE.

Each of the 3 portions of the previous $CP^2$ ends with 'and STICK', which as you just read, means that you must STICK the CP before returning to the MIDDLE; even after executing SWITCHES and PANS. If you are clear on STICKING, move on! If not, review this section a few times until you do. (Remember, talking yourself through the MANEUVERS as you execute them increases your retention significantly.)

Loosening Up and Tightening Down

LOOSENING UP, and TIGHTENING DOWN are the terms used to describe the changing proximity of your FRE FLO DO exercise on the MIDDLE, and or the EDGES, from the back end of the treadmill. The front half of the unrestricted usable area of the treadmill is referred to as 'LOOSE', and the back half as 'TIGHT'. See DIAGRAM 9—LOOSE AND TIGHT AREAS In the LOOSE area exists the most distance between you and the back end of the treadmill. In KAPPEL'S FOOTWORK, this abundance of space translates into extra room and time for safely executing MANEUVERS. In the TIGHT area, the distance between you and the back end of the treadmill is little to none. This shortage of space translates into zero room or time for error while executing MANEUVERS!

Working your way forward to the LOOSE area from the TIGHT area while executing MANEUVERS is called, LOOSENING UP your FRE FLO DO. LOOSENING UP, like STICKING, is also a defensive MANEUVER that can help get you out of trouble spots by increasing your navigating space; hence affording you more time to recover lost balance or BEARINGS, and keep yourself from failing or being thrown! It also slows down your FRE FLO DO, or at least it gives the appearance of slowing it down.

Working your way backward to the TIGHT area from the LOOSE area while executing MANEUVERS is called, TIGHTENING DOWN your FRE FLO DO. TIGHTENING DOWN is an aggressive offensive MANEUVER that intensifies your expression of KAPPEL'S FOOTWORK with a sense of urgency! It simultaneously increases all of the risks and the benefits of this format. The risks are obvious, greater chances of falling more frequently. The benefits are in the development of faster feet, better balance, and sharpened reflexes, which in turn, drastically decrease the chances of falling at all!

The user is now ready to complete P.F.Ps AND MANEUVERS—GETTING AROUND. RUNNING CPs AND $CP^2$s RUNNING a CP is the repeated execution of a MANEUVER involving a single CP. RUNNING a $CP^2$ is the repeated execution of a series of MANEUVERS involving 2 or more CPs. The main purposes of RUNNING CPs and $CP^2$s are: to practice smooth transitions from the MIDDLE to CPs and back to the MIDDLE, making them automatic; to work on awkward turns or hops so that you can eventually bypass getting set for follow-up MANEUVERS; and to venture into FRE FLO DO at higher speeds with ease.

Bailing Out

Quitting, stopping, discontinuing, or aborting your FRE FLO DO for reasons other than being finished with your workout or tying loose shoelaces, is called BAILING OUT! BAILING OUT is a sound emergency exit and granted the precipitating factors may be valid, true FRE FLO DO is alive with movement, and dead in stillness! The objective is to stay in FRE FLO DO no matter what.

In the discussion so far, the practitioner was taught the positions and techniques to start you on your way to FRE FLO DO. We will now finally discuss the forms that will allow the practitioner to practice KAPPEL'S FOOTWORK in free form, and without conscious effort.

THE 5 FORMS OF NAVIGATING THE TREADMILL WITH KAPPEL'S FOOTWORK are: BEATING, WORKING THE MIDDLE, EDGING, POINT CATCHING, and BOLTING.

BEATING is the most basic form of navigating the treadmill in this format. This form, or method of MANEUVERING, is rooted in BEATS, which was covered in the ON YOUR FEET section of the last chapter on pages 9, 10, and 11. BEATS, as you know, are units by which the "T" (TOUCH TIME) is measured. The "T", as you may recall, refers to the total number of landings you make on, or the total number of times you make contact with, or touch any one surface of the 3 MAIN LOCATIONS (The MIDDLE, the EDGES or the FLOOR), before moving on to another surface. Since a BEAT reflects a landing, contact, or touch of a single surface before advancing to the next, BEATING is synonymous with landing, contacting, or touching a surface repeatedly.

When BEATING (i.e., continuously landing, contacting, or touching the same surface) the MIDDLE, the EDGES, or the FLOOR, you are basically stepping or hopping in place, in the same FACE for a T of 4 BEATS or more, before moving on to another surface or into another FACE. Review Exercises 1 through 4, and the respective breakdowns of each in the ON YOUR FEET section of Chapter 2 (also on pages 9–11), if you need to refresh your memory oil how to identify and count the "T" and BEATS as you step or hop in place.

BEATING is generally done to warm-up and cool down. Although it is the simplest of forms, it is probably the most useful tool in KAPPEL'S FOOTWORK, as it helps you to quickly establish your rhythm and tempo, get set for transitions from one location to another, as well as recover lost balance and regain your BEARINGS.

Be aware that although BEATING is relatively easy to execute, the risk associated with allowing the body to slip into a rhythm in a single FACE for an extended period of time, is that the body can literally feel locked into it, making any transition out somewhat precarious. Unless you are warming up, cooling down, or ironing the kinks out of a weak point, variety is key to the method of FRE FLO DO.

WORKING THE MIDDLE is a more aggressive form of navigating the treadmill. This method of MANEUVERING encompasses all turn variations (singular, 'in-one', multiple, SWITCHES, C-SWITCHES, PANS, B'PANS, C-PANS, and C-B'PANS), as well as a T-MAX of 3 BEATS (Maximum TOUCH TIME of 3 BEATS) to a FACE, while solely on the MIDDLE.

WORKING THE MIDDLE is similar to BEATING THE MIDDLE with the exception of one key rule. When BEATING THE MIDDLE, you remain in one FACE for a T of 4 BEATS or more, however, when WORKING THE MIDDLE, you only remain in one FACE for a T-MAX of 3 BEATS before executing a mandatory turn to another FACE.

Exceeding 3 BEATS in one FACE is a violation of this method of MANEUVERING.

WORKING THE MIDDLE can be a terrific warm-up, but with its T-MAX of 3 BEATS to a FACE challenging the fluidity of your FLOW, it is an even better tool for sharpening your ability to turn freely to any FACE while on the MIDDLE, at any time, without hesitation. It is also offers tremendous preparation for the next 3 levels of forms, EDGING, POINT CATCHING and BOLTING.

Remember that the foot closest to the FACE to which you are turning moves first; and that you should initially practice turning your head to the FACE to which you are moving as well, since the body tends to follow the head. Obviously, it is also a good idea to avoid executing too many turns in the same direction without a change, as dizziness could occur, creating a major safety risk! Should dizziness occur as a result of turning in one direction for too long, try either turning in the opposite direction for a few turns, or simply staying in one FACE for a little while. If neither option reduces this effect, step off of the MIDDLE or the treadmill entirely, and breathe calmly until the dizziness subsides. If the dizziness came about for reasons other than the one mentioned above, BAIL OUT and see a physician before resuming FRE FLO DO, or doing any other exercises.

EDGING is an aggressive and tricky form of navigating the treadmill. Like WORKING THE MIDDLE, this method of MANEUVERING also encompasses all turn variations (singular, 'in-one', multiple, SWITCHES, C-SWITCHES, PANS, B'PANS, C-PANS, and C-B'PANS), as well as a T-MAX of 3 BEATS (Maximum TOUCH TIME of 3 BEATS) to a FACE, while solely on the EDGES, however.

EDGING is similar to BEATING THE EDGES with the exception of one rule. When BEATING THE EDGES, you remain in one FACE for a T of 4 BEATS or more, however, when EDGING, you only remain in one FACE for a T-MAX of 3 BEATS before executing a mandatory turn to another FACE. Exceeding 3 BEATS in one FACE is a violation of this method of MANEUVERING.

EDGING and BOLTING (the last form) are the only forms in which you can step or hop from one EDGE to the opposite EDGE (from the right over the MIDDLE to the left, or from the left over the MIDDLE to the right) without first making contact with the MIDDLE; as a result, it is also the only instance when the "T" from opposite EDGES can be counted up together into one total. For example: If you were to hop twice on L1, and then hop over the MIDDLE to R2, the 2 landings on the left EDGE making a T of 2 BEATS, plus the 1 landing on the right EDGE making a T of 1 BEAT, would combine for a T of 3 BEATS.

Suppose that in this same example you happened to be in LEFT FACE for the T of 2 BEATS on the left EDGE (or on L2), as well as for the T of 1 BEAT on the right EDGE (or on R1). What mandatory MANEUVER must be executed next according to the rules for EDGING? The correct answer is any turn that will bring you to a FACE other than LEFT FACE. This obviously rules out full turns, as they always bring you back to the original FACE. Since the combined total, a T of 3 BEATS, despite having been executed on 2 separate surfaces (right and left EDGES) also happened to be in the same FACE, the maximum TOUCH TIME of 3 BEATS to a FACE would have been fulfilled, henceforth requiring you to execute a mandatory turn. Keep in mind that the T-MAX of 3 BEATS only obligates you to a limit of 3 BEATS to a FACE, it does not require you to actually stay in the same FACE for 3 BEATS; you may choose to only stay in it for 1, or 2 BEATS. It's entirely up to you.

EDGING, with its T-MAX of 3 BEATS to a FACE not only challenges the fluidity of your FRE FLO DO and sharpens your ability to turn freely to any FACE while on the EDGES, but it also offers countless opportunities in which to improve the precision of your P.F.Ps. Strengths in WORKING THE MIDDLE and EDGING will pay huge dividends in your FLOW of the next and last 2 levels of forms, POINT CATCHING and BOLTING.

Since this form is done exclusively on the narrowest surfaces of this format, P.F.Ps are crucial to executing all of the MANEUVERS successfully. Checking the EDGES periodically to be sure that they are dry and free from too much perspiration or any other moisture which may cause you to slip, is strongly recommended!

POINTING CATCHING is a very intense and exciting form of navigating the treadmill. Like WORKING THE MIDDLE and EDGING, this method of MANEUVERING encompasses all turn variations (singular, 'in-one', multiple, SWITCHES, C-SWITCHES, PANS, B'PANS, C-PANS, and C-B'PANS), however, the T-MAX of 3 BEATS (Maximum TOUCH TIME of 3 BEATS) is not applied to any of the 4 FACES, but instead, to every surface of the 3 MAIN LOCATIONS.

In other words, you are limited to a T-MAX of 3 BEATS while on the MIDDLE before making a mandatory step or hop to any of the 18 CPs. Upon landing on any of them, you will also be limited to a T-MAX of 3 BEATS before making a mandatory step or hop back to the MIDDLE; continuously repeating this sequence is POINT CATCHING and the essence of FRE FLO DO! In fact, if you applied the T-MAX of 3 BEATS to any of the $CP^2s$ that you have already executed so far in this guide, you will get a taste of the POINT CATCHING form. Remember that the CPs on the FLOOR are only to be executed if the floor space around the treadmill on 3 sides (Right, Left, and Back) is available.

POINT CATCHING, from a functional standpoint, is a vital tool for the enhancement of athletic prowess and can improve performance attributes such as: acceleration; agility; balance; coordination; inertia control; light-footedness; nimbleness; reflexes; and speed!

BOLTING is the most extreme form of navigating the treadmill. BOLTING, as in POINT CATCHING, limits you to a T-MAX of 3 BEATS: while on the MIDDLE before making a mandatory step or hop to any of the 18 CPs; and upon landing on any of the 18 CPs, before making a mandatory step or hop back to the MIDDLE.

The following 2 exceptions distinguish BOLTING from POINT CATCHING:

1—This is the only form in which you can step or hop from the MIDDLE to a CP on the EDGE and or on the FLOOR, on the same or opposite side for a combined T of 3 BEATS. For example: If you were to step or hop from the MIDDLE to the FLOOR on one side, making a T of 1 BEAT, then to the EDGE on the same side, making a T of 1 BEAT on it, followed by a hop over the MIDDLE to the FLOOR on the opposite side, making a T of 1 BEAT on it, all 3 landings would combine for a T of 3 BEATS, fulfilling the mandatory contact of a CP, or CPs in this case, but not exceeding the T-MAX of 3 BEATS, before returning to the MIDDLE.

2—This is the only form in which you can step or hop from the FLOOR on one side to the FLOOR on the opposite side (from the right side over the treadmill to the left side, or from the left side over the treadmill to the right side) without first making contact with the MIDDLE; as a result, it is also the only instance when the "T" from the FLOOR on opposite sides can be counted up together into one total. For example: If you were to hop to the FLOOR on the right side, and then hop over the treadmill to the FLOOR on left side and SWITCH-LEFT after landing on it, the 1 landing on the right making a T of 1 BEAT, plus the 2 landings on the left making a T of 2 BEATS, would combine for a T of 3 BEATS, fulfilling the mandatory contact of a CP, or CPs in this case, but not exceeding the T-MAX of 3 BEATS, before returning to the MIDDLE.

As you can see, BOLTING is a form packed with many options to consider before you hit your T-MAX of 3 BEATS, which only obligates you to a limit of 3 BEATS per surface. It does not require you to actually touch a surface 3 times; you may choose to only touch it once or twice before moving on to another surface. Again, it is entirely up to the practitioner.

BOLTING, a level of difficulty above POINT CATCHING is a comprehensive asset-building tool for just about any athlete or performing artist. The most noticeable functional feature that BOLTING has over POINT CATCHING is the intensified plyometric work, which is great for building power throughout the body, particularly in the legs.

Other applications of this invention, including additional exercises, shall become apparent as it is adapted to diverse environments and uses. Thus, it is neither the neither the purpose nor the intent of this disclosure to delineate the scope of this invention, which is set forth in the following claims.

I claim:

1. An exercise method for an individual that utilizes a linearly moving surface and two types of fixed surfaces, the method comprising the following steps:
   a) an individual stepping onto a linearly moving surface;
   b) the individual momentarily and alternatively stepping from the moving surface to either a first or second fixed surface and back again onto the moving surface in a continuous motion; and
   c) repeating steps (a) and (b) as part of the exercise method wherein the first fixed surface is comprised of platform edges that run along on either side of the moving surface and the second fixed surface is comprised of floor space immediately surrounding the moving surface.

2. The exercise method of claim 1, further comprising initial steps of mastering stepping on a stationary surface, before stepping onto the moving surface.

3. The exercise method of claim 1, wherein said method is practiced over a plurality of linearly moving surfaces adjacent to each other, separated by first and second types of fixed surfaces.

4. An exercise method for an individual that utilizes a linearly moving surface and two types of fixed surfaces, the method comprising the following steps:
   a) an individual stepping onto a linearly moving surface;
   b) the individual momentarily and alternatively stepping from the moving surface to both a first fixed surface and a second fixed surface and back again onto the moving surface; and
   c) repeating steps (a) and (b) as part of the exercise method wherein the first fixed surface is comprised of platform edges that run along on either side of the moving surface and the second fixed surface is comprised of floor space immediately surrounding the moving surface.

5. An exercise method for an individual that utilizes a linearly moving surface and at least one fixed surface, the method comprising the following steps:
   a) an individual stepping onto a linearly moving surface;
   b) the individual momentarily and alternatively stepping from the moving surface to a fixed surface and back again onto the moving surface; and
   c) repeating steps (a) and (b) as part of the exercise method wherein the fixed surface is comprised of platform edges that run along on either side of the moving surface.

* * * * *